US008130825B2

(12) United States Patent
Scheuermann

(10) Patent No.: US 8,130,825 B2
(45) Date of Patent: *Mar. 6, 2012

(54) PROCESSOR FOR VIDEO DATA ENCODING/DECODING

(75) Inventor: W. James Scheuermann, Saratoga, CA (US)

(73) Assignee: NVIDIA Corporation, Santa Clara, CA (US)

(*) Notice: Subject to any disclaimer, the term of this patent is extended or adjusted under 35 U.S.C. 154(b) by 867 days.

This patent is subject to a terminal disclaimer.

(21) Appl. No.: 11/125,854

(22) Filed: May 9, 2005

(65) Prior Publication Data

US 2008/0130742 A1 Jun. 5, 2008

Related U.S. Application Data

(60) Provisional application No. 60/570,087, filed on May 10, 2004.

(51) Int. Cl.
*H04N 7/12* (2006.01)
*H04N 7/18* (2006.01)

(52) U.S. Cl. .................................. 375/240.02; 348/390

(58) Field of Classification Search .................. 348/699, 348/415.1, 416.1, 413.1, 700, 390, 443, 447, 348/449; 375/240.16, 240.17, 240.24, 240.18, 375/240.29, 240.02, 240.01; 382/236, 238, 382/243, 248, 109, 111

See application file for complete search history.

(56) References Cited

U.S. PATENT DOCUMENTS 5,574,504 A * 11/1996 Yagasaki et al. ......... 375/240.13
5,646,618 A 7/1997 Walsh
5,903,674 A 5/1999 Ooi
5,943,242 A 8/1999 Vorbach et al.
5,973,742 A 10/1999 Gardyne et al.
5,987,178 A 11/1999 Anesko et al.
6,021,490 A 2/2000 Vorbach et al.
6,041,078 A 3/2000 Rao
6,081,903 A 6/2000 Vorbach et al.
6,119,181 A 9/2000 Vorbach et al.
6,295,089 B1 * 9/2001 Hoang ....................... 348/390.1
6,338,106 B1 1/2002 Vorbach et al.

(Continued)

FOREIGN PATENT DOCUMENTS

JP 2003-009149 10/2003

(Continued)

OTHER PUBLICATIONS

English Translation of JP 2004-046499 (provided as explanation of relevance of JP 2004-046499).

(Continued)

*Primary Examiner* — Behrooz Senfi

(74) *Attorney, Agent, or Firm* — Patterson & Sheridan, LLP

(57) ABSTRACT

A video processor uses attributes of video data to perform encoding and decoding. Some embodiments dynamically configure the processor via a sequence of instructions, where the instructions include information on the attributes of the current video data. Some embodiments include a dynamically configurable adder array that computes difference functions thereby generating error vectors. Some embodiments include a dynamically configurable adder array that computes filtering functions applied to the video data, e.g. interpolation or decimation of the incoming video prior to motion detection. Some embodiments of the invention provide dynamically configurable hardware searches, for example, for detecting motion. Some embodiments of the invention are implemented using an adaptive computing machines (ACMs). An ACM includes a plurality of heterogeneous computational elements, each coupled to an interconnection network.

10 Claims, 164 Drawing Sheets

ELEMENTS OF AN ACM NODE

U.S. PATENT DOCUMENTS

| | | | | |
|---|---|---|---|---|
| 6,404,815 | B1 * | 6/2002 | Sekiguchi et al. | 375/240.16 |
| 6,405,299 | B1 | 6/2002 | Vorbach et al. | |
| 6,425,068 | B1 | 7/2002 | Vorbach et al. | |
| 6,480,937 | B1 | 11/2002 | Vorbach et al. | |
| 6,542,998 | B1 | 4/2003 | Vorbach et al. | |
| 6,571,381 | B1 | 5/2003 | Vorbach et al. | |
| 6,697,979 | B1 | 2/2004 | Vorbach et al. | |
| 6,968,008 | B1 | 11/2005 | Ribas-Corbera et al. | |
| 7,003,660 | B2 | 2/2006 | Vorbach et al. | |
| 7,103,226 | B1 | 9/2006 | Frank et al. | |
| 7,210,129 | B2 | 4/2007 | May et al. | |
| 7,266,725 | B2 | 9/2007 | Vorbach et al. | |
| 7,394,284 | B2 | 7/2008 | Vorbach | |
| 7,434,191 | B2 | 10/2008 | Vorbach et al. | |
| 7,444,531 | B2 | 10/2008 | Vorbach et al. | |
| 2004/0131267 | A1 * | 7/2004 | Adiletta et al. | 382/236 |
| 2005/0027970 | A1 * | 2/2005 | Arnold et al. | 712/226 |
| 2005/0206784 | A1 * | 9/2005 | Li et al. | 348/441 |
| 2007/0200857 | A1 * | 8/2007 | Scheuermann | 345/502 |
| 2008/0111923 | A1 * | 5/2008 | Scheuermann | 348/607 |

FOREIGN PATENT DOCUMENTS

| | | |
|---|---|---|
| JP | 2004-046499 | 2/2004 |

OTHER PUBLICATIONS

Office Action, U.S. Appl. No. 11/125,852. Dated Mar. 18, 2009.

Final Office Action, U.S. Appl. No. 11/125,852, dated Dec. 18, 2009.

Bose, et al. "A Single Chip Multistandard Video Codec," IEEE 1993 Custom Integrated Circuits Conference, 1993.

Lin, et al. "A 14-gops Programmable Motion Estimator for H.26X Video Coding," IEEE Journal of Solid-State Circuits, vol. 31, No. 11, Nov. 1996.

Khawam, et al. "Embedded Reconfigurable Array Targeting Motion Estimation Applications," Circuits and Systems, ISCAS 2003.

English translation of JP 2003-009149, provided as explanation of relevance.

* cited by examiner

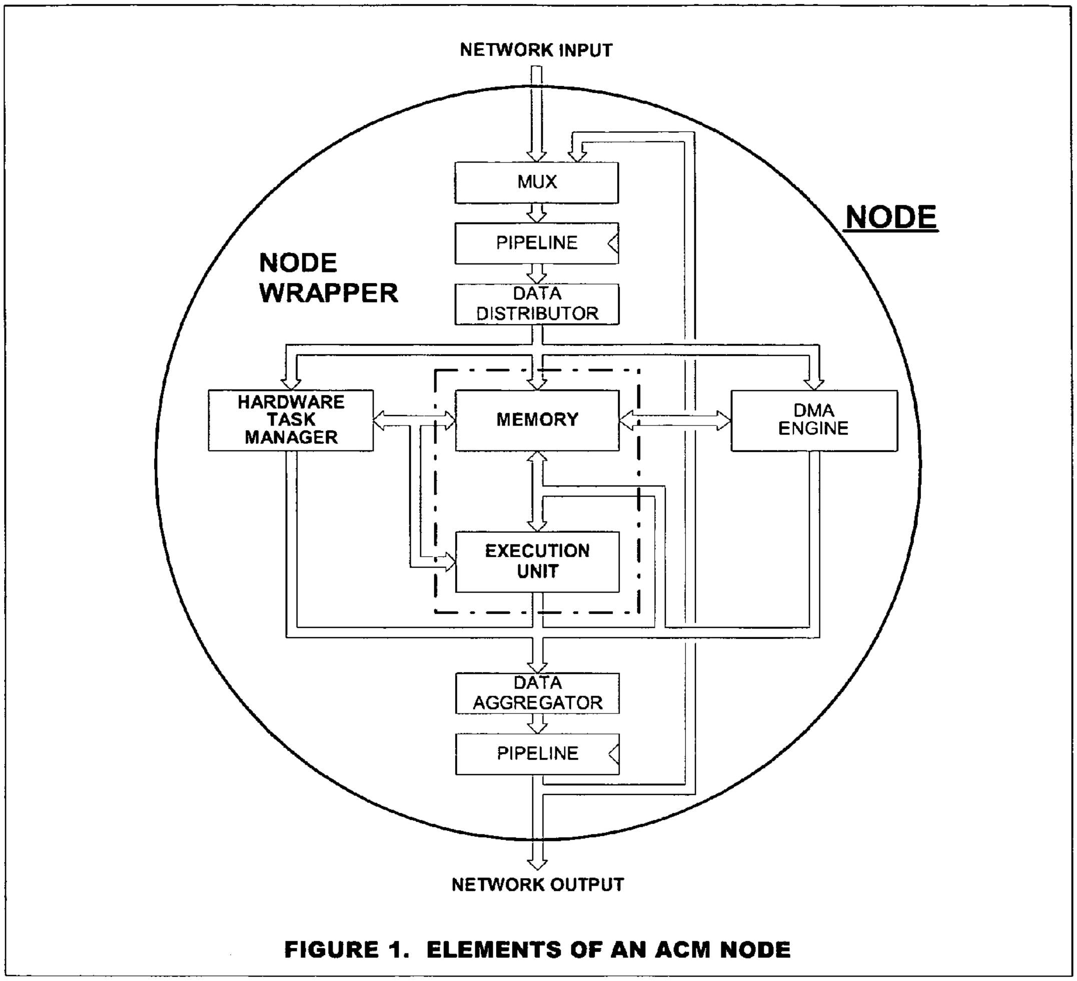
FIGURE 1. ELEMENTS OF AN ACM NODE

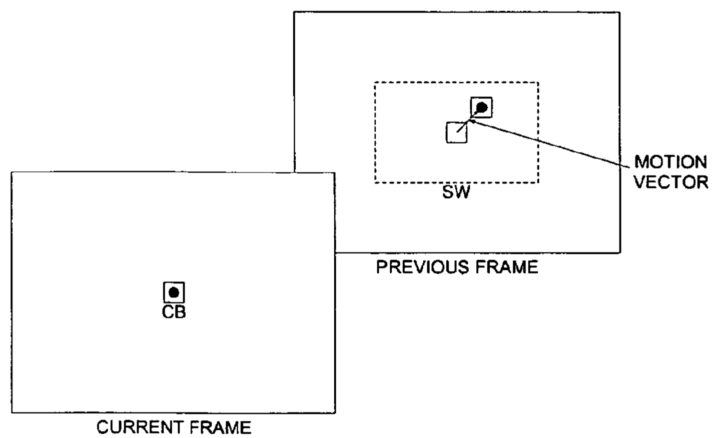
FIGURE 2. BLOCK MATCHING MOTION ESTIMATION

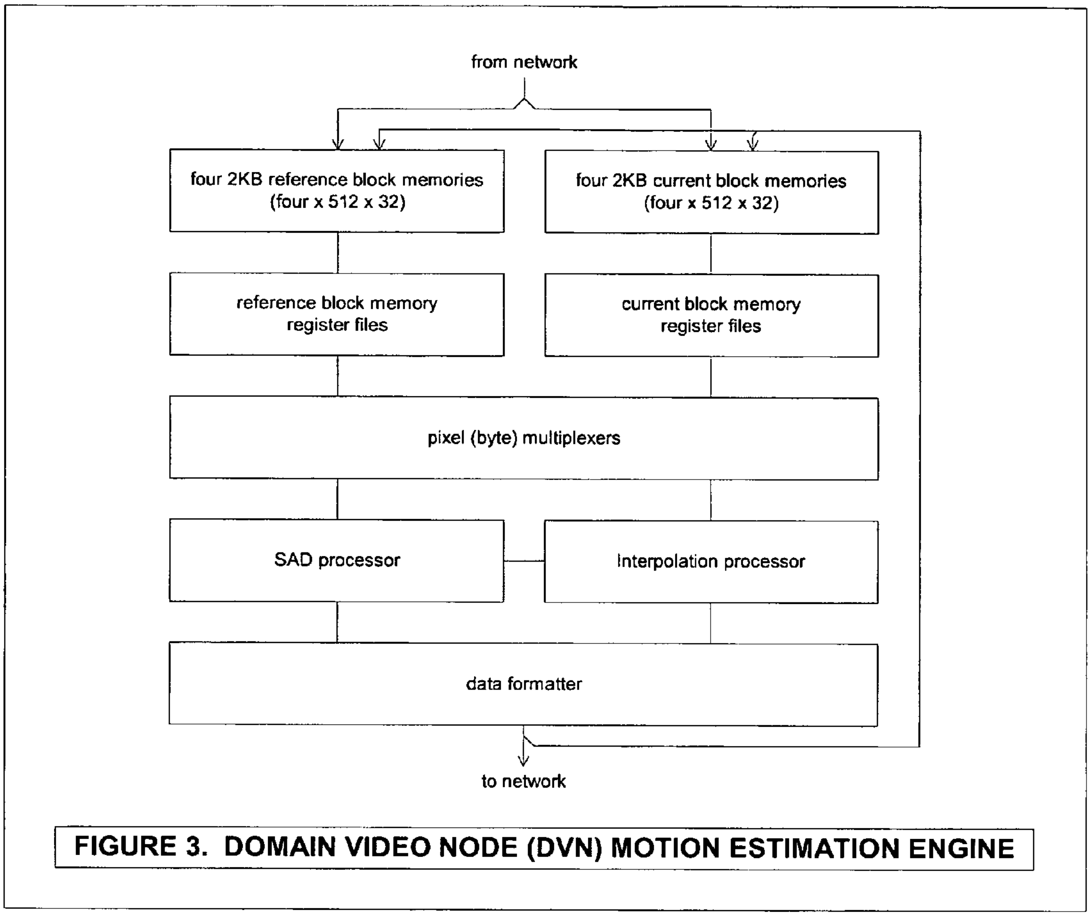
FIGURE 3. DOMAIN VIDEO NODE (DVN) MOTION ESTIMATION ENGINE

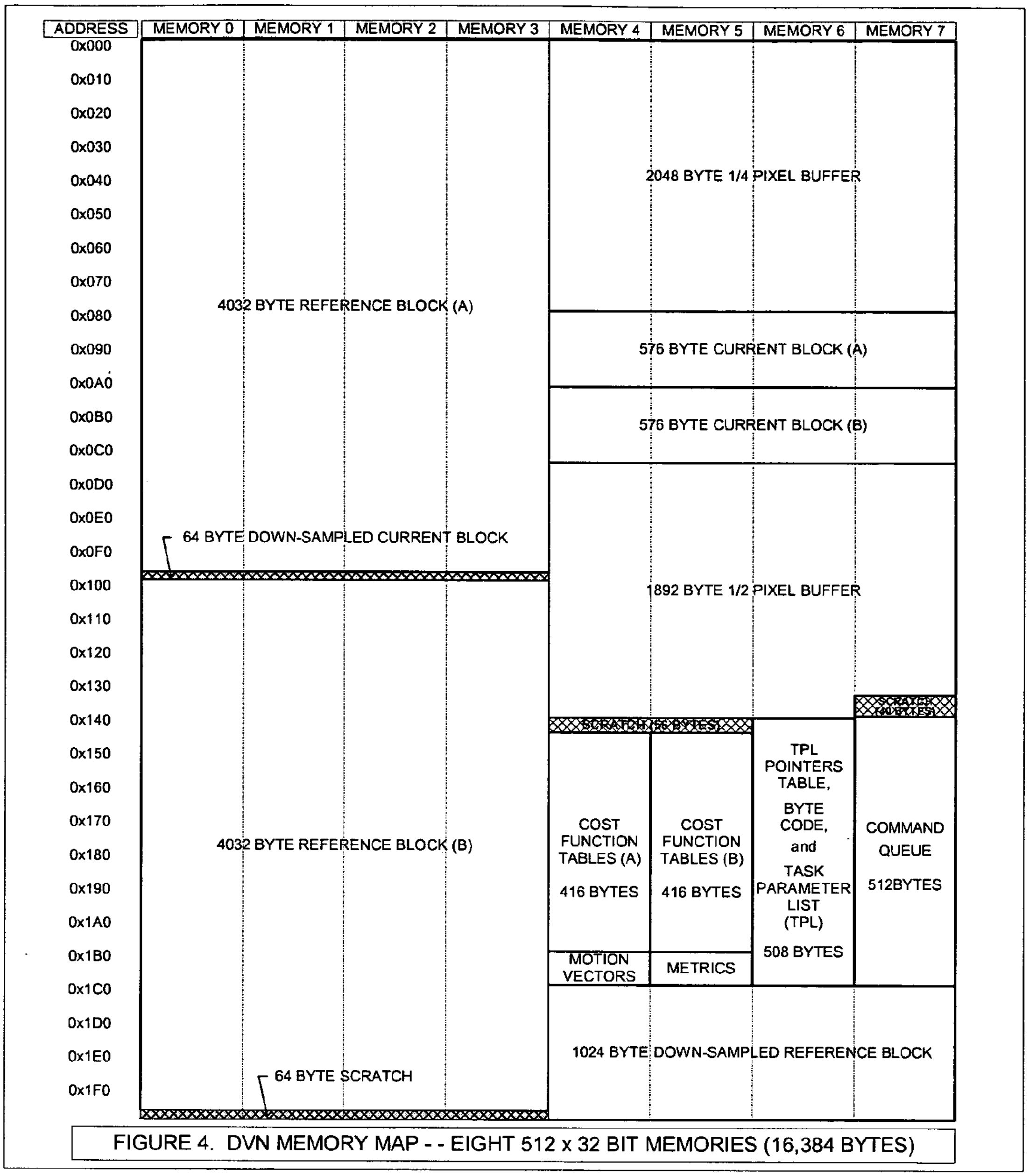
FIGURE 4. DVN MEMORY MAP - - EIGHT 512 x 32 BIT MEMORIES (16,384 BYTES)

| NUMBER OF PIXELS PER COLUMN (NUMBER OF ROWS) | NUMBER OF PIXELS PER ROW (NUMBER OF COLUMNS) | | | | | | | | | | | | | | | | | |
|---|---|---|---|---|---|---|---|---|---|---|---|---|---|---|---|---|---|---|
| | 29-32 | 33-36 | 37-40 | 41-44 | 45-48 | 49-52 | 53-56 | 57-60 | 61-64 | 65-68 | 69-72 | 73-76 | 77-80 | 81-84 | 85-88 | 89-92 | 93-96 | 97-100 |
| 29-32 | **64** | 72 | 80 | 88 | 96 | 104 | 112 | 120 | 128 | 136 | 144 | 152 | 160 | 168 | 176 | 184 | 192 | 200 |
| 33-36 | 72 | **81** | 90 | 99 | 108 | 117 | 126 | 135 | 144 | 153 | 162 | 171 | 180 | 189 | 198 | 207 | 216 | 225 |
| 37-40 | 80 | 90 | **100** | 110 | 120 | 130 | 140 | 150 | 160 | 170 | 180 | 190 | 200 | 210 | 220 | 230 | 240 | 250 |
| 41-44 | 88 | 99 | 110 | **121** | 132 | 143 | 154 | 165 | 176 | 187 | 198 | 209 | 220 | 231 | 242 | | | |
| 45-48 | 96 | 108 | 120 | 132 | **144** | 156 | 168 | 180 | 192 | 204 | 216 | 228 | 240 | 252 | | | | |
| 49-52 | 104 | 117 | 130 | 143 | 156 | **169** | 182 | 195 | 208 | 221 | 234 | 247 | | | | | | |
| 53-56 | 112 | 126 | 140 | 154 | 168 | 182 | **196** | 210 | 224 | 238 | 252 | | | | | | | |
| 57-60 | 120 | 135 | 150 | 165 | 180 | 195 | 210 | **225** | 240 | | | | | | | | | |
| 61-64 | 128 | 144 | 160 | 176 | 192 | 208 | 224 | 240 | | | | | | | | | | |
| 65-68 | 136 | 153 | 170 | 187 | 204 | 221 | 238 | | | | | | | | | | | |
| 69-72 | 144 | 162 | 180 | 198 | 216 | 234 | 252 | | | | | | | | | | | |
| 73-76 | 152 | 171 | 190 | 209 | 228 | 247 | | | | | | | | | | | | |
| 77-80 | 160 | 180 | 200 | 220 | 240 | | | | | | | | | | | | | |
| 81-84 | 168 | 189 | 210 | 231 | 252 | | | | | | | | | | | | | |
| 85-88 | 176 | 198 | 220 | 242 | | | | | | | | | | | | | | |
| 89-92 | 184 | 207 | 230 | | | | | | | | | | | | | | | |
| 93-96 | 192 | 216 | 240 | | | | | | | | | | | | | | | |
| 97-100 | 200 | 225 | 250 | | | | | | | | | | | | | | | |

TABLE ENTRIES ARE NUMBER OF LONGWORDS PER SINGLE MEMORY (MAXIMUM CAPACITY IS 252)

FIGURE 5. ALLOWABLE COMBINATIONS FOR (FOUR-by-252-by-4) 4032 BYTE REFERENCE BLOCKS

HORIZONTAL SEARCH / VERTICAL SEARCH

| n (x5) sets | search range | rows | rows/memory \ m (x5) sets | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|---|---|
| | | | search range | 5 | 10 | 15 | 20 | 25 | 30 | 35 | 40 | 45 | 50 | 55 | 60 | 65 | 70 | 75 | 80 | 85 |
| | | | columns | 20 | 25 | 30 | 35 | 40 | 45 | 50 | 55 | 60 | 65 | 70 | 75 | 80 | 85 | 90 | 95 | 100 |
| | | | longwords | 5 | 7 | 8 | 9 | 10 | 12 | 13 | 14 | 15 | 17 | 18 | 19 | 20 | 22 | 23 | 24 | 25 |
| 1 | 5 | 20 | 5 | **25 (40)** | 35 (80) | 40 (120) | 45 (160) | 50 (200) | 60 (240) | 65 (280) | 70 (320) | 75 (360) | 85 (400) | 90 (440) | 95 (480) | 100 (520) | 110 (560) | 115 (600) | 120 (640) | 125 (680 |
| 2 | 10 | 25 | 7 | 35 (80) | **49 (160)** | 56 (240) | 63 (320) | 70 (400) | 84 (480) | 91 (560) | 98 (640) | 105 (720) | 119 (800) | 126 (880) | 133 (960) | 140 (1040) | 154 (1120) | 161 (1200) | 168 (1280) | 175 (1360 |
| 3 | 15 | 30 | 8 | 40 (120) | 56 (240) | **64 (360)** | 72 (480) | 80 (600) | 96 (720) | 104 (840) | 112 (960) | 120 (1080) | 136 (1200) | 144 (1320) | 152 (1440) | 160 (1560) | 176 (1680) | 184 (1800) | 192 (1920) | 200 (2040 |
| 4 | 20 | 35 | 9 | 45 (160) | 63 (320) | 72 (480) | **81 (640)** | 90 (800) | 108 (960) | 117 (1120) | 126 (1280) | 135 (1440) | 153 (1600) | 162 (1760) | 171 (1920) | 180 (2080) | 198 (2240) | 207 (2400) | 216 (2560) | 225 (2720 |
| 5 | 25 | 40 | 10 | 50 (200) | 70 (400) | 80 (600) | 90 (800) | **100 (1000)** | 120 (1200) | 130 (1400) | 140 (1600) | 150 (1800) | 170 (2000) | 180 (2200) | 190 (2400) | 200 (2600) | 220 (2800) | 230 (3000) | 240 (3200) | 250 (3400 |
| 6 | 30 | 45 | 12 | 60 (240) | 84 (480) | 96 (720) | 108 (960) | 120 (1200) | **144 (1440)** | 156 (1680) | 168 (1920) | 180 (2160) | 204 (2400) | 216 (2640) | 228 (2880) | 240 (3120) | *264* (3360) | *276* (3600) | *288* (3840) | *300* (4080 |
| 7 | 35 | 50 | 13 | 65 (280) | 91 (560) | 104 (840) | 117 (1120) | 130 (1400) | 156 (1680) | **169 (1960)** | 182 (2240) | 195 (2520) | 221 (2800) | 234 (3080) | *247* (3360) | *260* (3640) | *286* (3920) | *299* (4200) | *312* (4480) | *325* (4760 |
| 8 | 40 | 55 | 14 | 70 (320) | 98 (640) | 112 (960) | 126 (1280) | 140 (1600) | 168 (1920) | 182 (2240) | **196 (2560)** | 210 (2880) | 238 (3200) | *252* (3520) | *266* (3840) | *280* (4160) | *308* (4480) | *322* (4800) | *336* (5120) | *350* (5440 |
| 9 | 45 | 60 | 15 | 75 (360) | 105 (720) | 120 (1080) | 135 (1440) | 150 (1800) | 180 (2160) | 195 (2520) | 210 (2880) | **225 (3240)** | *255* (3600) | *270* (3960) | *285* (4320) | *300* (4680) | *330* (5040) | *345* (5400) | *360* (5760) | *375* (6120 |
| 10 | 50 | 65 | 17 | 85 (400) | 119 (800) | 136 (1200) | 153 (1600) | 170 (2000) | 204 (2400) | 221 (2800) | 238 (3200) | *255* (3600) | *289* (4000) | *306* (4400) | *323* (4800) | *340* (5200) | *374* (5600) | *391* (6000) | *408* (6400) | *425* (6800 |

NOTES:
1) SINGLE MEMORY MAXIMUM CAPACITY FOR REFERENCE BLOCK IS 252 LONGWORDS (bold-italics-underlined NOT SUPPORTED)
2) AVG. NO. OF PROCESSING CYCLES AVAILABLE FOR D1, 30 FRAMES PER SECOND, AND 200 MHz DVN CLOCK FREQUENCY= 4938.

FIGURE 6. REFERENCE BLOCK LWORDS per MEMORY (AND CLOCK CYCLES) for m-by-n 5x5 SEARCH RANGES

| N = REFERENCE BLOCK PIXELS PER COLUMN (2,4 / 6/ 8 TAPS) | M = REFERENCE BLOCK PIXELS PER ROW (2,4 / 6 / 8 TAPS) | | | | | | | |
|---|---|---|---|---|---|---|---|---|
| | 26/28/30 | 36/38/40 | 46/48/50 | 56/58/60 | 66/68/70 | 76/78/80 | 86/88/90 | 96/98/100 |
| 26/28/30 | 12x12 (1x1) | 17x12 (2x1) | 22x12 (3x1) | 27x12 (4x1) | 32x12 (5x1) | 37x12 (6x1) | 42x12 (7x1) | 47x12 (8x1) |
| 36/38/40 | 12x17 (1x2) | 17x17 (2x2) | 22x17 (3x2) | 27x17 (4x2) | 32x17 (5x2) | 37x17 (6x2) | 42x17 (7x2) | 47x17 (8x2) |
| 46/48/50 | 12x22 (1x3) | 17x22 (2x3) | 22x22 (3x3) | 27x22 (4x3) | 32x22 (5x3) | 37x22* (6x3)* | | |
| 56/58/60 | 12x27 (1x4) | 17x27 (2x4) | 22x27 (3x4) | 27x27 (4x4) | 32x27# (5x4)# | | | |
| 66/68/70 | 12x32 (1x5) | 17x32 (2x5) | 22x32 (3x5) | 27x32# (4x5)# | | | | |
| 76/78/80 | 12x37 (1x6) | 17x37 (2x6) | 22x37* (3x6)* | | | | | |
| 86/88/90 | 12x42 (1x7) | 17x42 (2x7) | | | | | | |
| 96/98/100 | 12x47 (1x8) | 17x47 (2x8) | | | | | | |

TABLE ENTRIES ARE (HORIZONTAL x VERTICAL) DOUBLE PIXEL ARRAY SIZES AND ATTENDANT (m-by-n) 5x5 SEARCH RANGES WITH 8x8 DOWN-SAMPLED CURRENT BLOCK ( * EXCEEDS REFERENCE BLOCK BUFFER CAPACITY FOR 8-TAP FILTER )

( # EXCEEDS REFERENCE BLOCK BUFFER CAPACITY FOR 6-TAP, 8-TAP FILTERS )

FIGURE 7. ALLOWED REFERENCE BLOCK COMBINATIONS AND RESULTING DOUBLE PIXEL BLOCK SIZES FOR 2 or 4-TAP, 6-TAP, and 8-TAP DECIMATION FILTERS

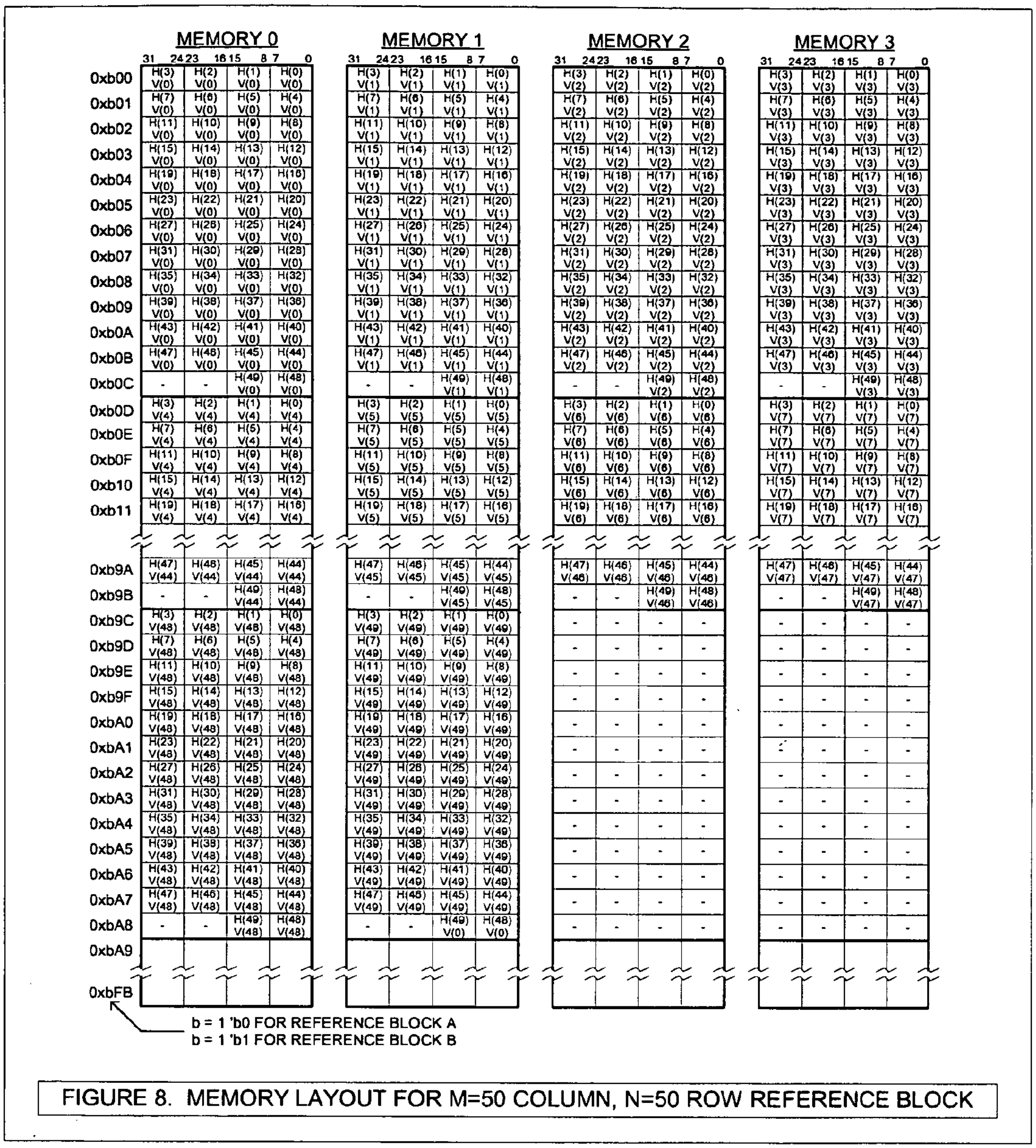
b = 1 'b0 FOR REFERENCE BLOCK A
b = 1 'b1 FOR REFERENCE BLOCK B
FIGURE 8. MEMORY LAYOUT FOR M=50 COLUMN, N=50 ROW REFERENCE BLOCK

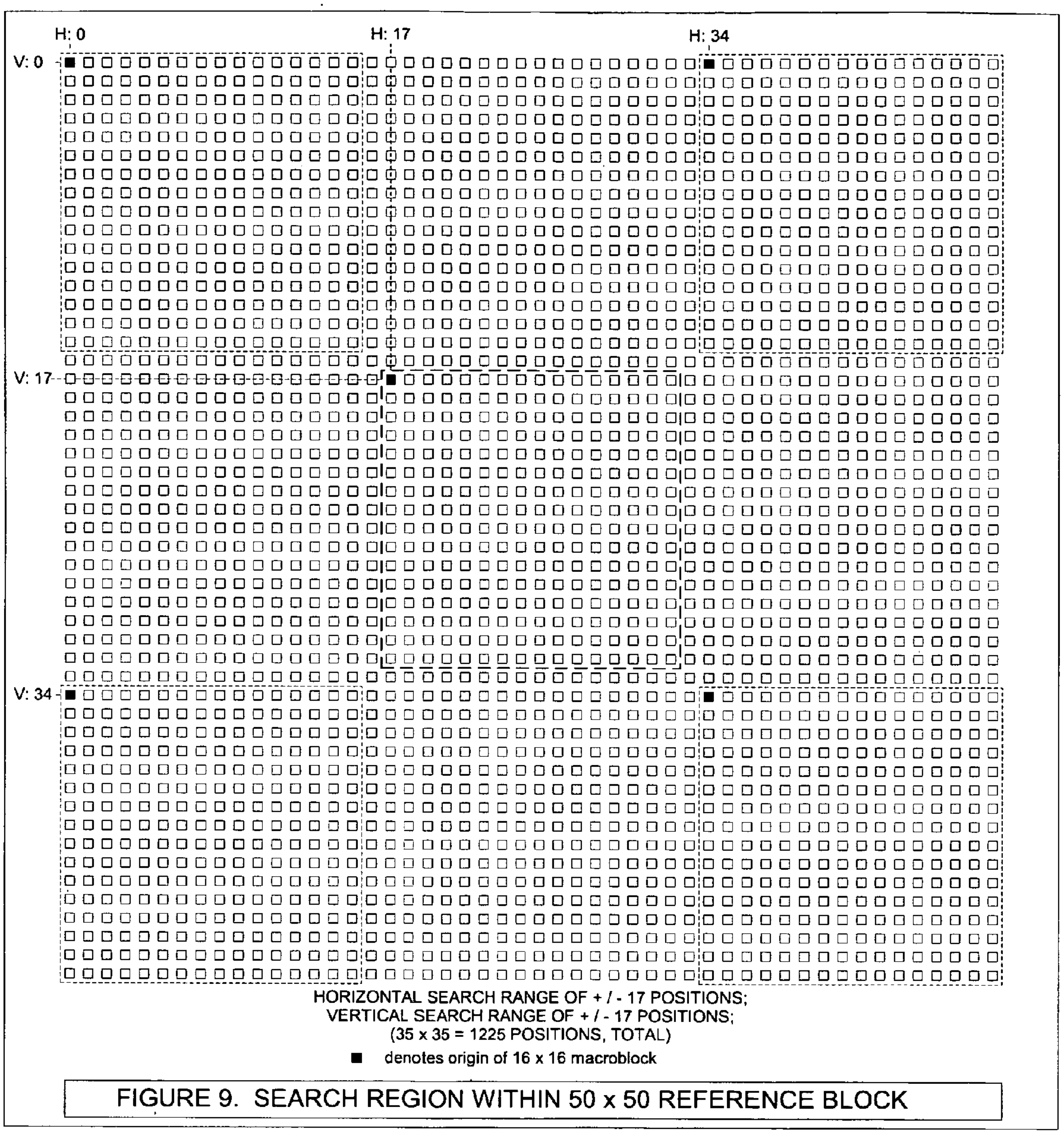
FIGURE 9. SEARCH REGION WITHIN 50 x 50 REFERENCE BLOCK

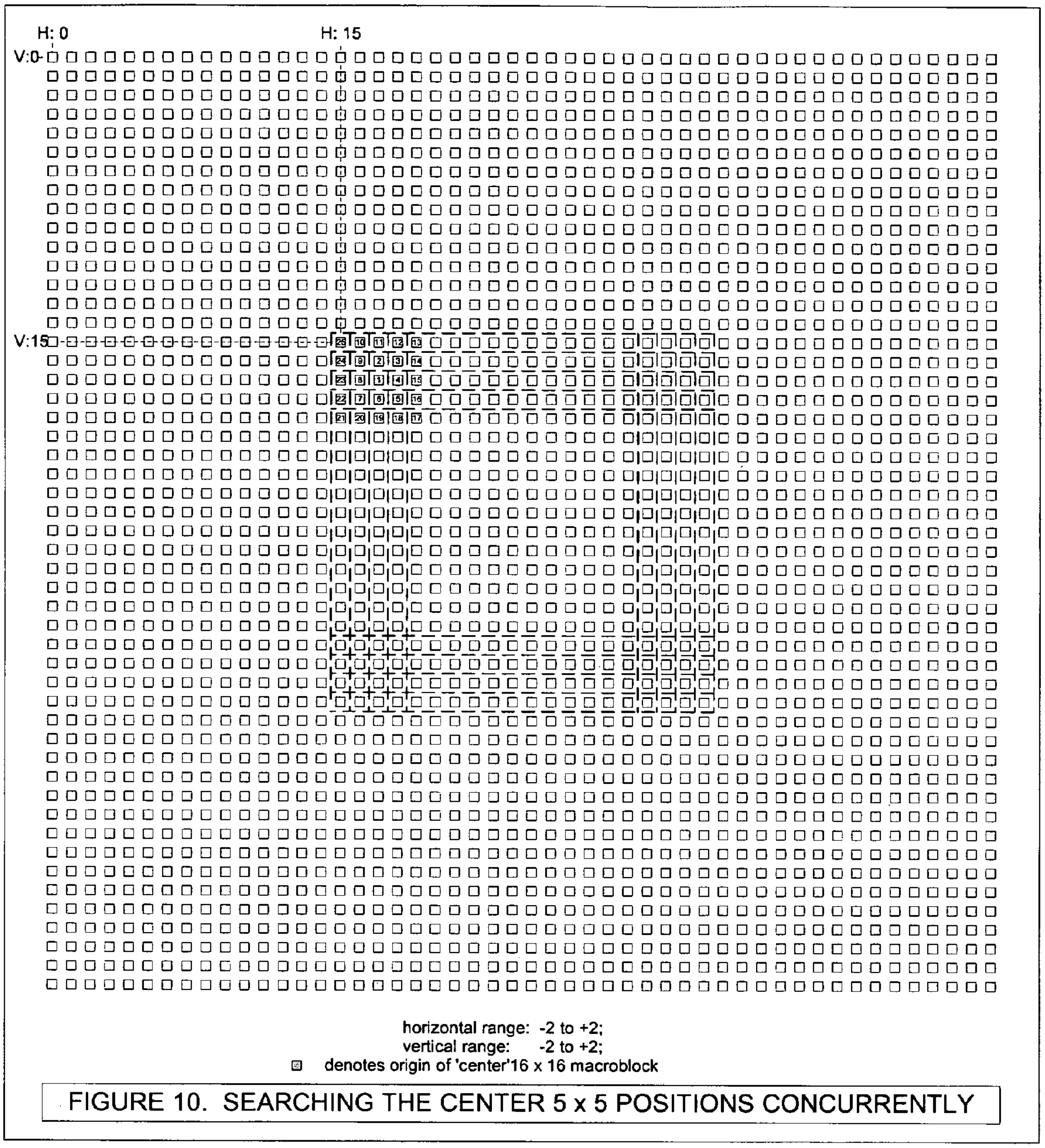
FIGURE 10. SEARCHING THE CENTER 5 x 5 POSITIONS CONCURRENTLY

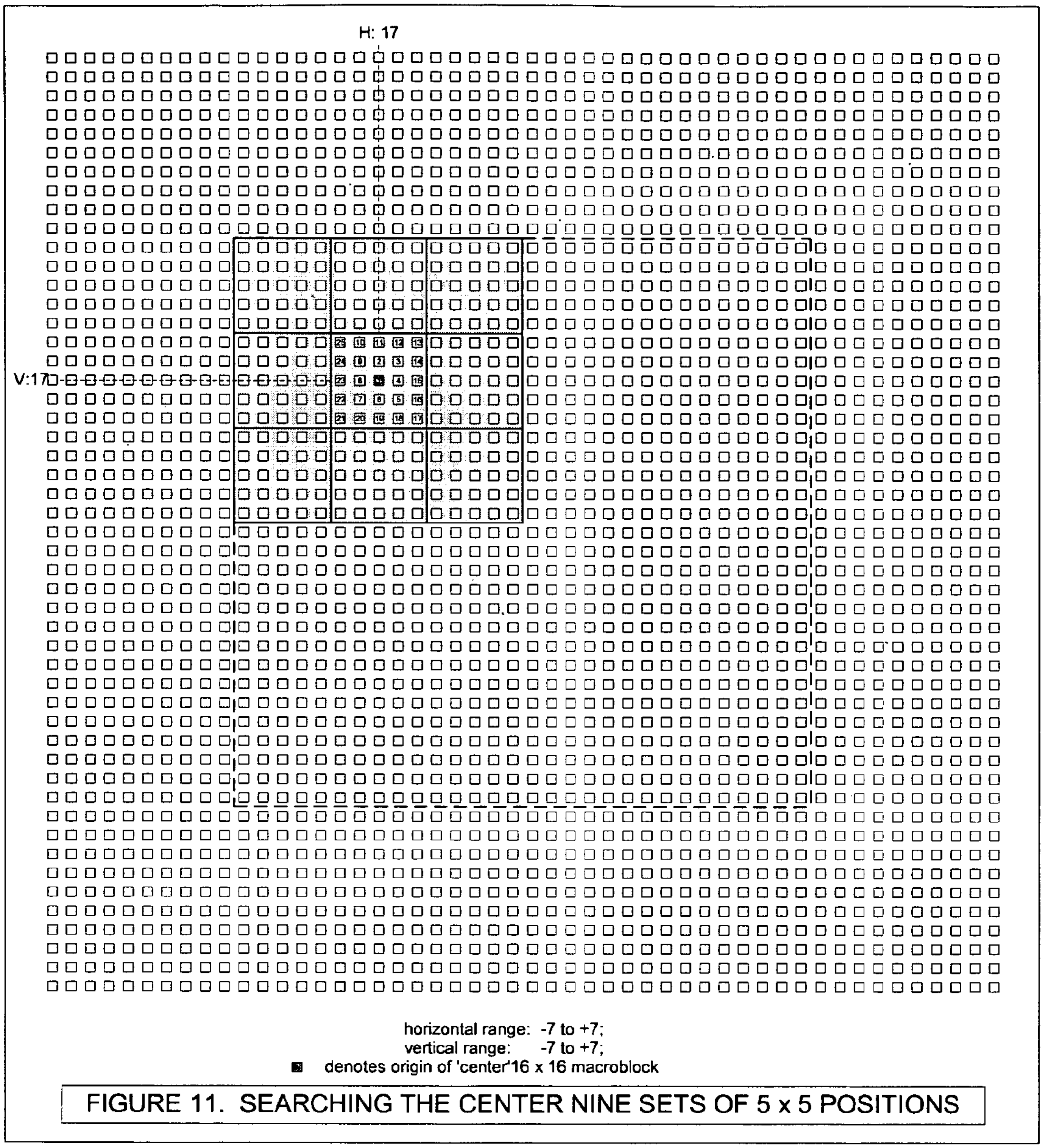
FIGURE 11. SEARCHING THE CENTER NINE SETS OF 5 x 5 POSITIONS

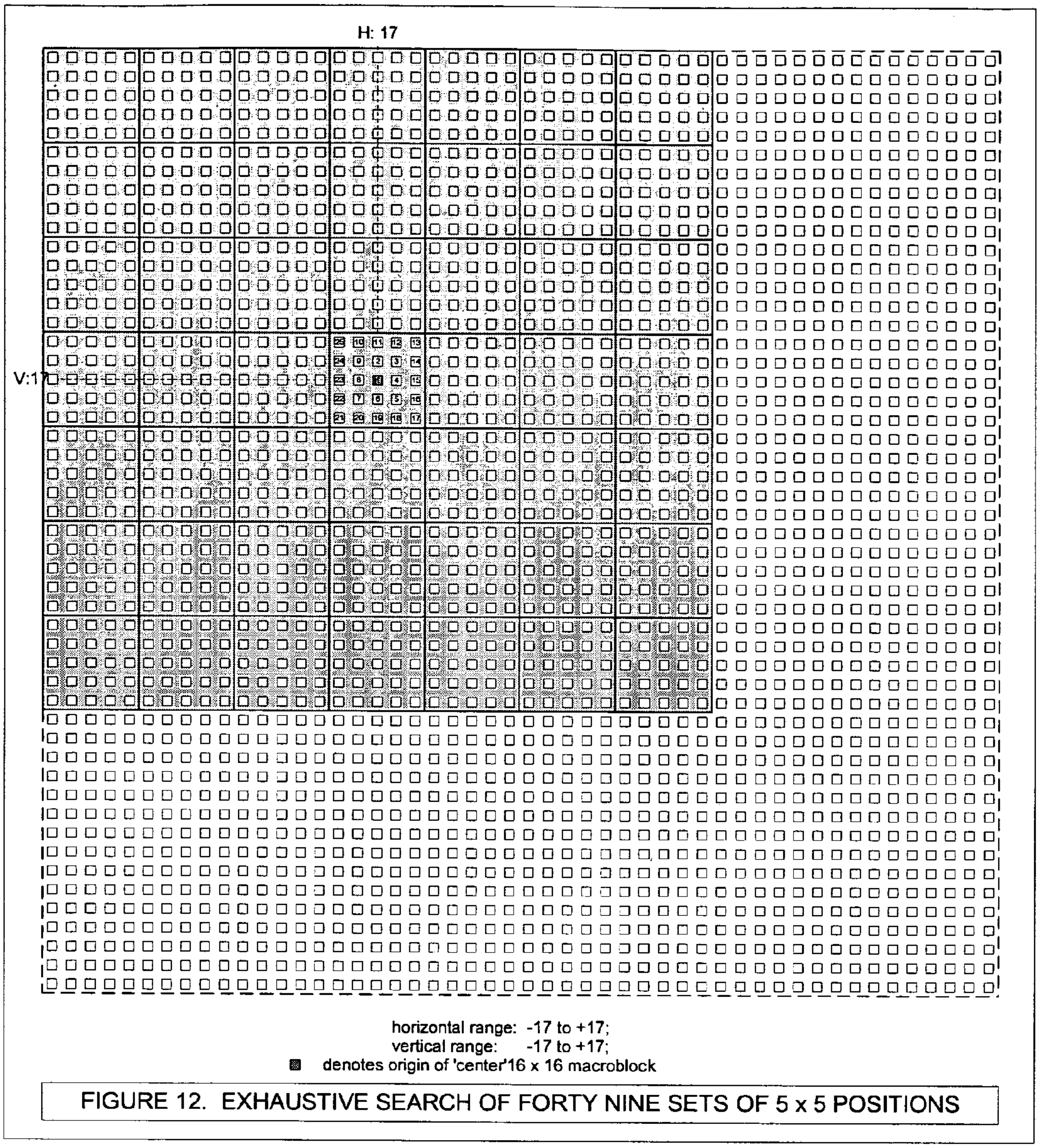
FIGURE 12. EXHAUSTIVE SEARCH OF FORTY NINE SETS OF 5 x 5 POSITIONS

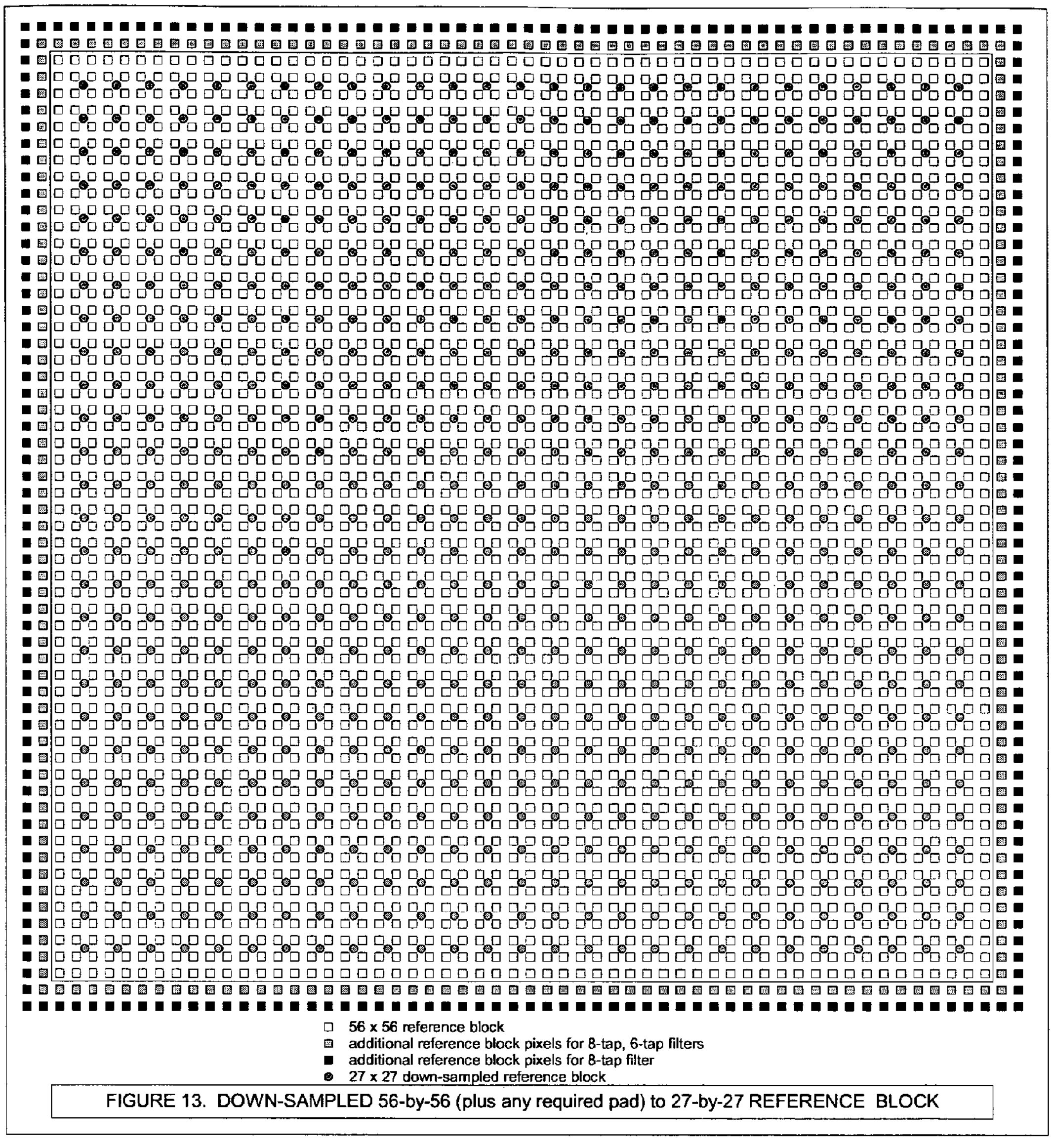
FIGURE 13. DOWN-SAMPLED 56-by-56 (plus any required pad) to 27-by-27 REFERENCE BLOCK

MEMORY 4

| | 31 24 | 23 16 | 15 8 | 7 0 |
|---|---|---|---|---|
| 0x9C0 | H(3) V(0) | H(2) V(0) | H(1) V(0) | H(0) V(0) |
| 0x9C1 | H(7) V(0) | H(6) V(0) | H(5) V(0) | H(4) V(0) |
| 0x9C2 | H(11) V(0) | H(10) V(0) | H(9) V(0) | H(8) V(0) |
| 0x9C3 | H(15) V(0) | H(14) V(0) | H(13) V(0) | H(12) V(0) |
| 0x9C4 | H(19) V(0) | H(18) V(0) | H(17) V(0) | H(16) V(0) |
| 0x9C5 | H(23) V(0) | H(22) V(0) | H(21) V(0) | H(20) V(0) |
| 0x9C6 | - | H(26) V(0) | H(25) V(0) | H(24) V(0) |
| 0x9C7 | H(3) V(4) | H(2) V(4) | H(1) V(4) | H(0) V(4) |
| 0x9C8 | H(7) V(4) | H(6) V(4) | H(5) V(4) | H(4) V(4) |
| 0x9C9 | H(11) V(4) | H(10) V(4) | H(9) V(4) | H(8) V(4) |
| 0x9CA | H(15) V(4) | H(14) V(4) | H(13) V(4) | H(12) V(4) |
| 0x9CB | H(19) V(4) | H(18) V(4) | H(17) V(4) | H(16) V(4) |
| 0x9CC | H(23) V(4) | H(22) V(4) | H(21) V(4) | H(20) V(4) |
| 0x9CD | - | H(26) V(4) | H(25) V(4) | H(24) V(4) |
| 0x9CE | H(3) V(8) | H(2) V(8) | H(1) V(8) | H(0) V(8) |
| 0x9CF | H(7) V(8) | H(6) V(8) | H(5) V(8) | H(4) V(8) |
| 0x9D0 | H(11) V(8) | H(10) V(8) | H(9) V(8) | H(8) V(8) |
| 0x9D1 | H(15) V(8) | H(14) V(8) | H(13) V(8) | H(12) V(8) |
| 0x9D2 | H(19) V(8) | H(18) V(8) | H(17) V(8) | H(16) V(8) |
| 0x9D3 | H(23) V(8) | H(22) V(8) | H(21) V(8) | H(20) V(8) |
| 0x9D4 | - | H(26) V(8) | H(25) V(8) | H(24) V(8) |
| 0x9D5 | H(3) V(12) | H(2) V(12) | H(1) V(12) | H(0) V(12) |
| 0x9D6 | H(7) V(12) | H(6) V(12) | H(5) V(12) | H(4) V(12) |
| 0x9D7 | | | | |
| 0x9E8 | | | | |
| 0x9E9 | - | H(26) V(20) | H(25) V(20) | H(24) V(20) |
| 0x9EA | H(3) V(24) | H(2) V(24) | H(1) V(24) | H(0) V(24) |
| 0x9EB | H(7) V(24) | H(6) V(24) | H(5) V(24) | H(4) V(24) |
| 0x9EC | H(11) V(24) | H(10) V(24) | H(9) V(24) | H(8) V(24) |
| 0x9ED | H(15) V(24) | H(14) V(24) | H(13) V(24) | H(12) V(24) |
| 0x9EE | H(19) V(24) | H(18) V(24) | H(17) V(24) | H(16) V(24) |
| 0x9EF | H(23) V(24) | H(22) V(24) | H(21) V(24) | H(20) V(24) |
| 0x9F0 | - | H(26) V(24) | H(25) V(24) | H(24) V(24) |
| 0x9F1 | | | | |
| 0x9FF | | | | |

MEMORY 5

| | 31 24 | 23 16 | 15 8 | 7 0 |
|---|---|---|---|---|
| 0xBC0 | H(3) V(1) | H(2) V(1) | H(1) V(1) | H(0) V(1) |
| 0xBC1 | H(7) V(1) | H(6) V(1) | H(5) V(1) | H(4) V(1) |
| 0xBC2 | H(11) V(1) | H(10) V(1) | H(9) V(1) | H(8) V(1) |
| 0xBC3 | H(15) V(1) | H(14) V(1) | H(13) V(1) | H(12) V(1) |
| 0xBC4 | H(19) V(1) | H(18) V(1) | H(17) V(1) | H(16) V(1) |
| 0xBC5 | H(23) V(1) | H(22) V(1) | H(21) V(1) | H(20) V(1) |
| 0xBC6 | - | H(26) V(1) | H(25) V(1) | H(24) V(1) |
| 0xBC7 | H(3) V(5) | H(2) V(5) | H(1) V(5) | H(0) V(5) |
| 0xBC8 | H(7) V(5) | H(6) V(5) | H(5) V(5) | H(4) V(5) |
| 0xBC9 | H(11) V(5) | H(10) V(5) | H(9) V(5) | H(8) V(5) |
| 0xBCA | H(15) V(5) | H(14) V(5) | H(13) V(5) | H(12) V(5) |
| 0xBCB | H(19) V(5) | H(18) V(5) | H(17) V(5) | H(16) V(5) |
| 0xBCC | H(23) V(5) | H(22) V(5) | H(21) V(5) | H(20) V(5) |
| 0xBCD | - | H(26) V(5) | H(25) V(5) | H(24) V(5) |
| 0xBCE | H(3) V(9) | H(2) V(9) | H(1) V(9) | H(0) V(9) |
| 0xBCF | H(7) V(9) | H(6) V(9) | H(5) V(9) | H(4) V(9) |
| 0xBD0 | H(11) V(9) | H(10) V(9) | H(9) V(9) | H(8) V(9) |
| 0xBD1 | H(15) V(9) | H(14) V(9) | H(13) V(9) | H(12) V(9) |
| 0xBD2 | H(19) V(9) | H(18) V(9) | H(17) V(9) | H(16) V(9) |
| 0xBD3 | H(23) V(9) | H(22) V(9) | H(21) V(9) | H(20) V(9) |
| 0xBD4 | - | H(26) V(9) | H(25) V(9) | H(24) V(9) |
| 0xBD5 | H(3) V(13) | H(2) V(13) | H(1) V(13) | H(0) V(13) |
| 0xBD6 | H(7) V(13) | H(6) V(13) | H(5) V(13) | H(4) V(13) |
| 0xBD7 | | | | |
| 0xBE8 | | | | |
| 0xBE9 | - | H(26) V(21) | H(25) V(21) | H(24) V(21) |
| 0xBEA | H(3) V(25) | H(2) V(25) | H(1) V(25) | H(0) V(25) |
| 0xBEB | H(7) V(25) | H(6) V(25) | H(5) V(25) | H(4) V(25) |
| 0xBEC | H(11) V(25) | H(10) V(25) | H(9) V(25) | H(8) V(25) |
| 0xBED | H(15) V(25) | H(14) V(25) | H(13) V(25) | H(12) V(25) |
| 0xBEE | H(19) V(25) | H(18) V(25) | H(17) V(25) | H(16) V(25) |
| 0xBEF | H(23) V(25) | H(22) V(25) | H(21) V(25) | H(20) V(25) |
| 0xBF0 | - | H(26) V(25) | H(25) V(25) | H(24) V(25) |
| 0xBF1 | | | | |
| 0xBFF | | | | |

MEMORY 6

| | 31 24 | 23 16 | 15 8 | 7 0 |
|---|---|---|---|---|
| 0xDC0 | H(3) V(2) | H(2) V(2) | H(1) V(2) | H(0) V(2) |
| 0xDC1 | H(7) V(2) | H(6) V(2) | H(5) V(2) | H(4) V(2) |
| 0xDC2 | H(11) V(2) | H(10) V(2) | H(9) V(2) | H(8) V(2) |
| 0xDC3 | H(15) V(2) | H(14) V(2) | H(13) V(2) | H(12) V(2) |
| 0xDC4 | H(19) V(2) | H(18) V(2) | H(17) V(2) | H(16) V(2) |
| 0xDC5 | H(23) V(2) | H(22) V(2) | H(21) V(2) | H(20) V(2) |
| 0xDC6 | - | H(26) V(2) | H(25) V(2) | H(24) V(2) |
| 0xDC7 | H(3) V(6) | H(2) V(6) | H(1) V(6) | H(0) V(6) |
| 0xDC8 | H(7) V(6) | H(6) V(6) | H(5) V(6) | H(4) V(6) |
| 0xDC9 | H(11) V(6) | H(10) V(6) | H(9) V(6) | H(8) V(6) |
| 0xDCA | H(15) V(6) | H(14) V(6) | H(13) V(6) | H(12) V(6) |
| 0xDCB | H(19) V(6) | H(18) V(6) | H(17) V(6) | H(16) V(6) |
| 0xDCC | H(23) V(6) | H(22) V(6) | H(21) V(6) | H(20) V(6) |
| 0xDCD | - | H(26) V(6) | H(25) V(6) | H(24) V(6) |
| 0xDCE | H(3) V(10) | H(2) V(10) | H(1) V(10) | H(0) V(10) |
| 0xDCF | H(7) V(10) | H(6) V(10) | H(5) V(10) | H(4) V(10) |
| 0xDD0 | H(11) V(10) | H(10) V(10) | H(9) V(10) | H(8) V(10) |
| 0xDD1 | H(15) V(10) | H(14) V(10) | H(13) V(10) | H(12) V(10) |
| 0xDD2 | H(19) V(10) | H(18) V(10) | H(17) V(10) | H(16) V(10) |
| 0xDD3 | H(23) V(10) | H(22) V(10) | H(21) V(10) | H(20) V(10) |
| 0xDD4 | - | H(26) V(10) | H(25) V(10) | H(24) V(10) |
| 0xDD5 | H(3) V(14) | H(2) V(14) | H(1) V(14) | H(0) V(14) |
| 0xDD6 | H(7) V(14) | H(6) V(14) | H(5) V(14) | H(4) V(14) |
| 0xDD7 | | | | |
| 0xDE8 | | | | |
| 0xDE9 | - | H(26) V(22) | H(25) V(22) | H(24) V(22) |
| 0xDEA | H(3) V(26) | H(2) V(26) | H(1) V(26) | H(0) V(26) |
| 0xDEB | H(7) V(26) | H(6) V(26) | H(5) V(26) | H(4) V(26) |
| 0xDEC | H(11) V(26) | H(10) V(26) | H(9) V(26) | H(8) V(26) |
| 0xDED | H(15) V(26) | H(14) V(26) | H(13) V(26) | H(12) V(26) |
| 0xDEE | H(19) V(26) | H(18) V(26) | H(17) V(26) | H(16) V(26) |
| 0xDEF | H(23) V(26) | H(22) V(26) | H(21) V(26) | H(20) V(26) |
| 0xDF0 | - | H(26) V(26) | H(25) V(26) | H(24) V(26) |
| 0xDF1 | | | | |
| 0xDFF | | | | |

MEMORY 7

| | 31 24 | 23 16 | 15 8 | 7 0 |
|---|---|---|---|---|
| 0xFC0 | H(3) V(3) | H(2) V(3) | H(1) V(3) | H(0) V(3) |
| 0xFC1 | H(7) V(3) | H(6) V(3) | H(5) V(3) | H(4) V(3) |
| 0xFC2 | H(11) V(3) | H(10) V(3) | H(9) V(3) | H(8) V(3) |
| 0xFC3 | H(15) V(3) | H(14) V(3) | H(13) V(3) | H(12) V(3) |
| 0xFC4 | H(19) V(3) | H(18) V(3) | H(17) V(3) | H(16) V(3) |
| 0xFC5 | H(23) V(3) | H(22) V(3) | H(21) V(3) | H(20) V(3) |
| 0xFC6 | - | H(26) V(3) | H(25) V(3) | H(24) V(3) |
| 0xFC7 | H(3) V(7) | H(2) V(7) | H(1) V(7) | H(0) V(7) |
| 0xFC8 | H(7) V(7) | H(6) V(7) | H(5) V(7) | H(4) V(7) |
| 0xFC9 | H(11) V(7) | H(10) V(7) | H(9) V(7) | H(8) V(7) |
| 0xFCA | H(15) V(7) | H(14) V(7) | H(13) V(7) | H(12) V(7) |
| 0xFCB | H(19) V(7) | H(18) V(7) | H(17) V(7) | H(16) V(7) |
| 0xFCC | H(23) V(7) | H(22) V(7) | H(21) V(7) | H(20) V(7) |
| 0xFCD | - | H(26) V(7) | H(25) V(7) | H(24) V(7) |
| 0xFCE | H(3) V(11) | H(2) V(11) | H(1) V(11) | H(0) V(11) |
| 0xFCF | H(7) V(11) | H(6) V(11) | H(5) V(11) | H(4) V(11) |
| 0xFD0 | H(11) V(11) | H(10) V(11) | H(9) V(11) | H(8) V(11) |
| 0xFD1 | H(15) V(11) | H(14) V(11) | H(13) V(11) | H(12) V(11) |
| 0xFD2 | H(19) V(11) | H(18) V(11) | H(17) V(11) | H(16) V(11) |
| 0xFD3 | H(23) V(11) | H(22) V(11) | H(21) V(11) | H(20) V(11) |
| 0xFD4 | - | H(26) V(11) | H(25) V(11) | H(24) V(11) |
| 0xFD5 | H(3) V(15) | H(2) V(15) | H(1) V(15) | H(0) V(15) |
| 0xFD6 | H(7) V(15) | H(6) V(15) | H(5) V(15) | H(4) V(15) |
| 0xFD7 | | | | |
| 0xFE8 | | | | |
| 0xFE9 | - | H(26) V(23) | H(25) V(23) | H(24) V(23) |
| 0xFEA | | | | |
| 0xFEB | | | | |
| 0xFEC | | | | |
| 0xFED | | | | |
| 0xFEE | | | | |
| 0xFEF | | | | |
| 0xFF0 | | | | |
| 0xFF1 | | | | |
| 0xFFF | | | | |

FIGURE 14. MEMORY LAYOUT FOR M=27 COLUMN, N=27 ROW DOUBLE PIXEL ARRAY

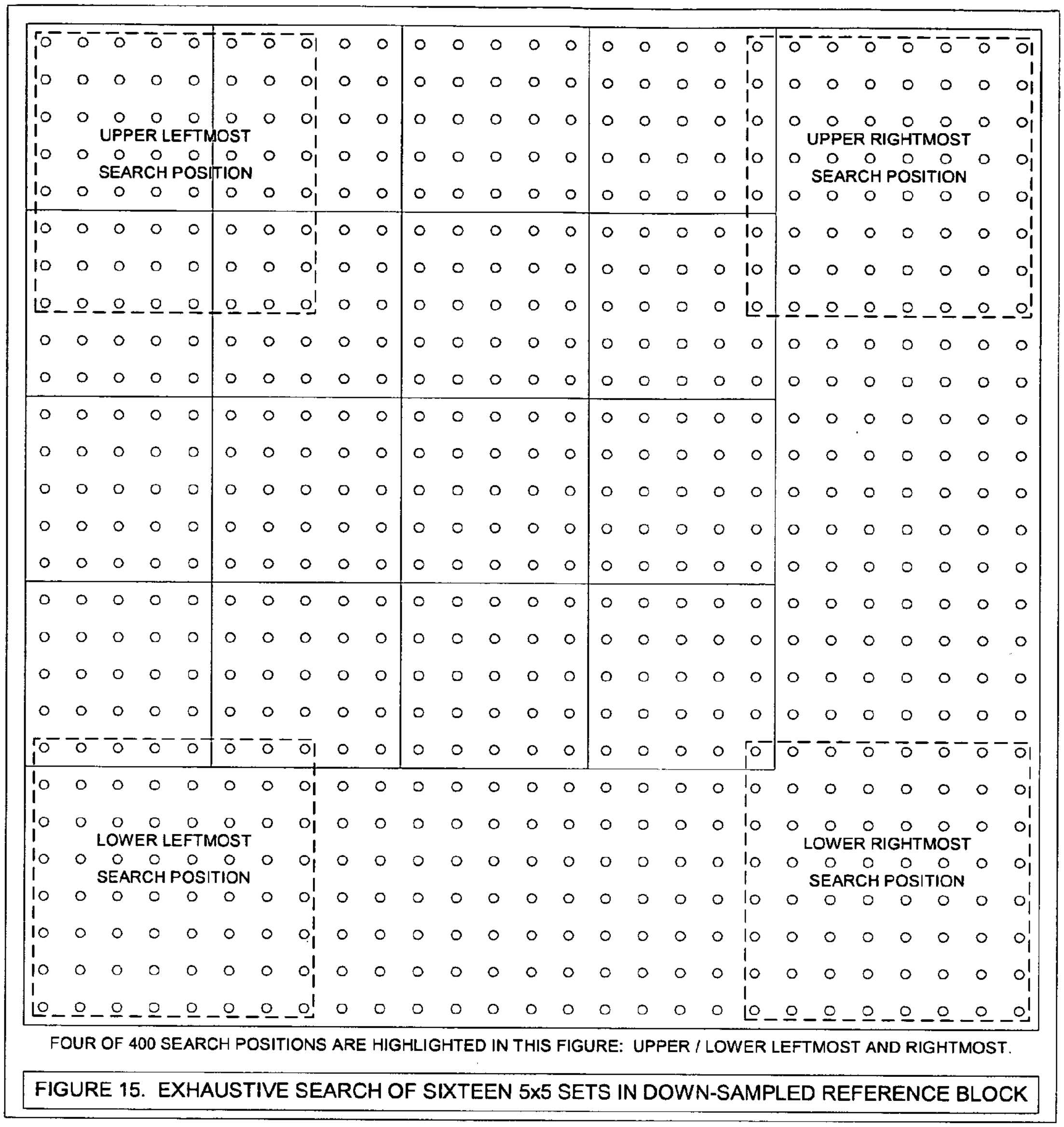
FOUR OF 400 SEARCH POSITIONS ARE HIGHLIGHTED IN THIS FIGURE: UPPER / LOWER LEFTMOST AND RIGHTMOST.
FIGURE 15. EXHAUSTIVE SEARCH OF SIXTEEN 5x5 SETS IN DOWN-SAMPLED REFERENCE BLOCK

MEMORY 4 (b=8)

| BUFFER A / B | 31–24 | 23–16 | 15–8 | 7–0 |
|---|---|---|---|---|
| 0xb80 / 0xbA4 | H(3) V(0) | H(2) V(0) | H(1) V(0) | H(0) V(0) |
| 0xb81 / 0xbA5 | H(7) V(0) | H(6) V(0) | H(5) V(0) | H(4) V(0) |
| 0xb82 / 0xbA6 | H(11) V(0) | H(10) V(0) | H(9) V(0) | H(8) V(0) |
| 0xb83 / 0xbA7 | H(15) V(0) | H(14) V(0) | H(13) V(0) | H(12) V(0) |
| 0xb84 / 0xbA8 | H(3) V(4) | H(2) V(4) | H(1) V(4) | H(0) V(4) |
| 0xb85 / 0xbA9 | H(7) V(4) | H(6) V(4) | H(5) V(4) | H(4) V(4) |
| 0xb86 / 0xbAA | H(11) V(4) | H(10) V(4) | H(9) V(4) | H(8) V(4) |
| 0xb87 / 0xbAB | H(15) V(4) | H(14) V(4) | H(13) V(4) | H(12) V(4) |
| 0xb88 / 0xbAC | H(3) V(8) | H(2) V(8) | H(1) V(8) | H(0) V(8) |
| 0xb89 / 0xbAD | H(7) V(8) | H(6) V(8) | H(5) V(8) | H(4) V(8) |
| 0xb8A / 0xbAE | H(11) V(8) | H(10) V(8) | H(9) V(8) | H(8) V(8) |
| 0xb8B / 0xbAF | H(15) V(8) | H(14) V(8) | H(13) V(8) | H(12) V(8) |
| 0xb8C / 0xbB0 | H(3) V(12) | H(2) V(12) | H(1) V(12) | H(0) V(12) |
| 0xb8D / 0xbB1 | H(7) V(12) | H(6) V(12) | H(5) V(12) | H(4) V(12) |
| 0xb8E / 0xbB2 | H(11) V(12) | H(10) V(12) | H(9) V(12) | H(8) V(12) |
| 0xb8F / 0xbB3 | H(15) V(12) | H(14) V(12) | H(13) V(12) | H(12) V(12) |

MEMORY 5 (b=A)

| BUFFER A / B | 31–24 | 23–16 | 15–8 | 7–0 |
|---|---|---|---|---|
| 0xb80 / 0xbA4 | H(3) V(1) | H(2) V(1) | H(1) V(1) | H(0) V(1) |
| 0xb81 / 0xbA5 | H(7) V(1) | H(6) V(1) | H(5) V(1) | H(4) V(1) |
| 0xb82 / 0xbA6 | H(11) V(1) | H(10) V(1) | H(9) V(1) | H(8) V(1) |
| 0xb83 / 0xbA7 | H(15) V(1) | H(14) V(1) | H(13) V(1) | H(12) V(1) |
| 0xb84 / 0xbA8 | H(3) V(5) | H(2) V(5) | H(1) V(5) | H(0) V(5) |
| 0xb85 / 0xbA9 | H(7) V(5) | H(6) V(5) | H(5) V(5) | H(4) V(5) |
| 0xb86 / 0xbAA | H(11) V(5) | H(10) V(5) | H(9) V(5) | H(8) V(5) |
| 0xb87 / 0xbAB | H(15) V(5) | H(14) V(5) | H(13) V(5) | H(12) V(5) |
| 0xb88 / 0xbAC | H(3) V(9) | H(2) V(9) | H(1) V(9) | H(0) V(9) |
| 0xb89 / 0xbAD | H(7) V(9) | H(6) V(9) | H(5) V(9) | H(4) V(9) |
| 0xb8A / 0xbAE | H(11) V(9) | H(10) V(9) | H(9) V(9) | H(8) V(9) |
| 0xb8B / 0xbAF | H(15) V(9) | H(14) V(9) | H(13) V(9) | H(12) V(9) |
| 0xb8C / 0xbB0 | H(3) V(13) | H(2) V(13) | H(1) V(13) | H(0) V(13) |
| 0xb8D / 0xbB1 | H(7) V(13) | H(6) V(13) | H(5) V(13) | H(4) V(13) |
| 0xb8E / 0xbB2 | H(11) V(13) | H(10) V(13) | H(9) V(13) | H(8) V(13) |
| 0xb8F / 0xbB3 | H(15) V(13) | H(14) V(13) | H(13) V(13) | H(12) V(13) |

MEMORY 6 (b=C)

| BUFFER A / B | 31–24 | 23–16 | 15–8 | 7–0 |
|---|---|---|---|---|
| 0xb80 / 0xbA4 | H(3) V(2) | H(2) V(2) | H(1) V(2) | H(0) V(2) |
| 0xb81 / 0xbA5 | H(7) V(2) | H(6) V(2) | H(5) V(2) | H(4) V(2) |
| 0xb82 / 0xbA6 | H(11) V(2) | H(10) V(2) | H(9) V(2) | H(8) V(2) |
| 0xb83 / 0xbA7 | H(15) V(2) | H(14) V(2) | H(13) V(2) | H(12) V(2) |
| 0xb84 / 0xbA8 | H(3) V(6) | H(2) V(6) | H(1) V(6) | H(0) V(6) |
| 0xb85 / 0xbA9 | H(7) V(6) | H(6) V(6) | H(5) V(6) | H(4) V(6) |
| 0xb86 / 0xbAA | H(11) V(6) | H(10) V(6) | H(9) V(6) | H(8) V(6) |
| 0xb87 / 0xbAB | H(15) V(6) | H(14) V(6) | H(13) V(6) | H(12) V(6) |
| 0xb88 / 0xbAC | H(3) V(10) | H(2) V(10) | H(1) V(10) | H(0) V(10) |
| 0xb89 / 0xbAD | H(7) V(10) | H(6) V(10) | H(5) V(10) | H(4) V(10) |
| 0xb8A / 0xbAE | H(11) V(10) | H(10) V(10) | H(9) V(10) | H(8) V(10) |
| 0xb8B / 0xbAF | H(15) V(10) | H(14) V(10) | H(13) V(10) | H(12) V(10) |
| 0xb8C / 0xbB0 | H(3) V(14) | H(2) V(14) | H(1) V(14) | H(0) V(14) |
| 0xb8D / 0xbB1 | H(7) V(14) | H(6) V(14) | H(5) V(14) | H(4) V(14) |
| 0xb8E / 0xbB2 | H(11) V(14) | H(10) V(14) | H(9) V(14) | H(8) V(14) |
| 0xb8F / 0xbB3 | H(15) V(14) | H(14) V(14) | H(13) V(14) | H(12) V(14) |

MEMORY 7 (b=E)

| BUFFER A / B | 31–24 | 23–16 | 15–8 | 7–0 |
|---|---|---|---|---|
| 0xb80 / 0xbA4 | H(3) V(3) | H(2) V(3) | H(1) V(3) | H(0) V(3) |
| 0xb81 / 0xbA5 | H(7) V(3) | H(6) V(3) | H(5) V(3) | H(4) V(3) |
| 0xb82 / 0xbA6 | H(11) V(3) | H(10) V(3) | H(9) V(3) | H(8) V(3) |
| 0xb83 / 0xbA7 | H(15) V(3) | H(14) V(3) | H(13) V(3) | H(12) V(3) |
| 0xb84 / 0xbA8 | H(3) V(7) | H(2) V(7) | H(1) V(7) | H(0) V(7) |
| 0xb85 / 0xbA9 | H(7) V(7) | H(6) V(7) | H(5) V(7) | H(4) V(7) |
| 0xb86 / 0xbAA | H(11) V(7) | H(10) V(7) | H(9) V(7) | H(8) V(7) |
| 0xb87 / 0xbAB | H(15) V(7) | H(14) V(7) | H(13) V(7) | H(12) V(7) |
| 0xb88 / 0xbAC | H(3) V(11) | H(2) V(11) | H(1) V(11) | H(0) V(11) |
| 0xb89 / 0xbAD | H(7) V(11) | H(6) V(11) | H(5) V(11) | H(4) V(11) |
| 0xb8A / 0xbAE | H(11) V(11) | H(10) V(11) | H(9) V(11) | H(8) V(11) |
| 0xb8B / 0xbAF | H(15) V(11) | H(14) V(11) | H(13) V(11) | H(12) V(11) |
| 0xb8C / 0xbB0 | H(3) V(15) | H(2) V(15) | H(1) V(15) | H(0) V(15) |
| 0xb8D / 0xbB1 | H(7) V(15) | H(6) V(15) | H(5) V(15) | H(4) V(15) |
| 0xb8E / 0xbB2 | H(11) V(15) | H(10) V(15) | H(9) V(15) | H(8) V(15) |
| 0xb8F / 0xbB3 | H(15) V(15) | H(14) V(15) | H(13) V(15) | H(12) V(15) |

FIGURE 16-1. MEMORY LAYOUT FOR 16 x 16 CURRENT BLOCKS A / B

MEMORY 4 (b=8)

| BUFFER A / B | 31 24 | 23 16 | 15 8 | 7 0 |
|---|---|---|---|---|
| 0xb80 / 0xbA4 | - | - | - | - |
| 0xb81 / 0xbA5 | - | - | - | - |
| 0xb82 / 0xbA6 | - | - | - | - |
| 0xb83 / 0xbA7 | - | - | - | - |
| 0xb84 / 0xbA8 | - | - | - | - |
| 0xb85 / 0xbA9 | - | - | - | - |
| 0xb86 / 0xbAA | H(-1) V(0) | - | - | - |
| 0xb87 / 0xbAB | H(3) V(0) | H(2) V(0) | H(1) V(0) | H(0) V(0) |
| 0xb88 / 0xbAC | H(7) V(0) | H(6) V(0) | H(5) V(0) | H(4) V(0) |
| 0xb89 / 0xbAD | H(11) V(0) | H(10) V(0) | H(9) V(0) | H(8) V(0) |
| 0xb8A / 0xbAE | H(15) V(0) | H(14) V(0) | H(13) V(0) | H(12) V(0) |
| 0xb8B / 0xbAF | - | - | - | H(16) V(0) |
| 0xb8C / 0xbB0 | H(-1) V(4) | - | - | - |
| 0xb8D / 0xbB1 | H(3) V(4) | H(2) V(4) | H(1) V(4) | H(0) V(4) |
| 0xb8E / 0xbB2 | H(7) V(4) | H(6) V(4) | H(5) V(4) | H(4) V(4) |
| 0xb8F / 0xbB3 | H(11) V(4) | H(10) V(4) | H(9) V(4) | H(8) V(4) |
| 0xb90 / 0xbB4 | H(15) V(4) | H(14) V(4) | H(13) V(4) | H(12) V(4) |
| 0xb91 / 0xbB5 | - | - | - | H(16) V(4) |
| 0xb92 / 0xbB6 | H(-1) V(8) | - | - | - |
| 0xb93 / 0xbB7 | H(3) V(8) | H(2) V(8) | H(1) V(8) | H(0) V(8) |
| 0xb94 / 0xbB8 | H(7) V(8) | H(6) V(8) | H(5) V(8) | H(4) V(8) |
| 0xb95 / 0xbB9 | H(11) V(8) | H(10) V(8) | H(9) V(8) | H(8) V(8) |
| 0xb96 / 0xbBA | H(15) V(8) | H(14) V(8) | H(13) V(8) | H(12) V(8) |
| 0xb97 / 0xbBB | - | - | - | H(16) V(8) |
| 0xb98 / 0xbBC | H(-1) V(12) | - | - | - |
| 0xb99 / 0xbBD | H(3) V(12) | H(2) V(12) | H(1) V(12) | H(0) V(12) |
| 0xb9A / 0xbBE | H(7) V(12) | H(6) V(12) | H(5) V(12) | H(4) V(12) |
| 0xb9B / 0xbBF | H(11) V(12) | H(10) V(12) | H(9) V(12) | H(8) V(12) |
| 0xb9C / 0xbC0 | H(15) V(12) | H(14) V(12) | H(13) V(12) | H(12) V(12) |
| 0xb9D / 0xbC1 | - | - | - | H(16) V(12) |
| 0xb9E / 0xbC2 | H(-1) V(16) | - | - | - |
| 0xb9F / 0xbC3 | H(3) V(16) | H(2) V(16) | H(1) V(16) | H(0) V(16) |
| 0xbA0 / 0xbC4 | H(7) V(16) | H(6) V(16) | H(5) V(16) | H(4) V(16) |
| 0xbA1 / 0xbC5 | H(11) V(16) | H(10) V(16) | H(9) V(16) | H(8) V(16) |
| 0xbA2 / 0xbC6 | H(15) V(16) | H(14) V(16) | H(13) V(16) | H(12) V(16) |
| 0xbA3 / 0xbC7 | - | - | - | H(16) V(16) |

MEMORY 5 (b=A)

| BUFFER A / B | 31 24 | 23 16 | 15 8 | 7 0 |
|---|---|---|---|---|
| 0xb80 / 0xbA4 | - | - | - | - |
| 0xb81 / 0xbA5 | - | - | - | - |
| 0xb82 / 0xbA6 | - | - | - | - |
| 0xb83 / 0xbA7 | - | - | - | - |
| 0xb84 / 0xbA8 | - | - | - | - |
| 0xb85 / 0xbA9 | - | - | - | - |
| 0xb86 / 0xbAA | H(-1) V(1) | - | - | - |
| 0xb87 / 0xbAB | H(3) V(1) | H(2) V(1) | H(1) V(1) | H(0) V(1) |
| 0xb88 / 0xbAC | H(7) V(1) | H(6) V(1) | H(5) V(1) | H(4) V(1) |
| 0xb89 / 0xbAD | H(11) V(1) | H(10) V(1) | H(9) V(1) | H(8) V(1) |
| 0xb8A / 0xbAE | H(15) V(1) | H(14) V(1) | H(13) V(1) | H(12) V(1) |
| 0xb8B / 0xbAF | - | - | - | H(16) V(1) |
| 0xb8C / 0xbB0 | H(-1) V(5) | - | - | - |
| 0xb8D / 0xbB1 | H(3) V(5) | H(2) V(5) | H(1) V(5) | H(0) V(5) |
| 0xb8E / 0xbB2 | H(7) V(5) | H(6) V(5) | H(5) V(5) | H(4) V(5) |
| 0xb8F / 0xbB3 | H(11) V(5) | H(10) V(5) | H(9) V(5) | H(8) V(5) |
| 0xb90 / 0xbB4 | H(15) V(5) | H(14) V(5) | H(13) V(5) | H(12) V(5) |
| 0xb91 / 0xbB5 | - | - | - | H(16) V(5) |
| 0xb92 / 0xbB6 | H(-1) V(9) | - | - | - |
| 0xb93 / 0xbB7 | H(3) V(9) | H(2) V(9) | H(1) V(9) | H(0) V(9) |
| 0xb94 / 0xbB8 | H(7) V(9) | H(6) V(9) | H(5) V(9) | H(4) V(9) |
| 0xb95 / 0xbB9 | H(11) V(9) | H(10) V(9) | H(9) V(9) | H(8) V(9) |
| 0xb96 / 0xbBA | H(15) V(9) | H(14) V(9) | H(13) V(9) | H(12) V(9) |
| 0xb97 / 0xbBB | - | - | - | H(16) V(9) |
| 0xb98 / 0xbBC | H(-1) V(13) | - | - | - |
| 0xb99 / 0xbBD | H(3) V(13) | H(2) V(13) | H(1) V(13) | H(0) V(13) |
| 0xb9A / 0xbBE | H(7) V(13) | H(6) V(13) | H(5) V(13) | H(4) V(13) |
| 0xb9B / 0xbBF | H(11) V(13) | H(10) V(13) | H(9) V(13) | H(8) V(13) |
| 0xb9C / 0xbC0 | H(15) V(13) | H(14) V(13) | H(13) V(13) | H(12) V(13) |
| 0xb9D / 0xbC1 | - | - | - | H(16) V(13) |
| 0xb9E / 0xbC2 | - | - | - | - |
| 0xb9F / 0xbC3 | - | - | - | - |
| 0xbA0 / 0xbC4 | - | - | - | - |
| 0xbA1 / 0xbC5 | - | - | - | - |
| 0xbA2 / 0xbC6 | - | - | - | - |
| 0xbA3 / 0xbC7 | - | - | - | - |

MEMORY 6 (b=C)

| BUFFER A / B | 31 24 | 23 16 | 15 8 | 7 0 |
|---|---|---|---|---|
| 0xb80 / 0xbA4 | - | - | - | - |
| 0xb81 / 0xbA5 | - | - | - | - |
| 0xb82 / 0xbA6 | - | - | - | - |
| 0xb83 / 0xbA7 | - | - | - | - |
| 0xb84 / 0xbA8 | - | - | - | - |
| 0xb85 / 0xbA9 | - | - | - | - |
| 0xb86 / 0xbAA | H(-1) V(2) | - | - | - |
| 0xb87 / 0xbAB | H(3) V(2) | H(2) V(2) | H(1) V(2) | H(0) V(2) |
| 0xb88 / 0xbAC | H(7) V(2) | H(6) V(2) | H(5) V(2) | H(4) V(2) |
| 0xb89 / 0xbAD | H(11) V(2) | H(10) V(2) | H(9) V(2) | H(8) V(2) |
| 0xb8A / 0xbAE | H(15) V(2) | H(14) V(2) | H(13) V(2) | H(12) V(2) |
| 0xb8B / 0xbAF | - | - | - | H(16) V(2) |
| 0xb8C / 0xbB0 | H(-1) V(6) | - | - | - |
| 0xb8D / 0xbB1 | H(3) V(6) | H(2) V(6) | H(1) V(6) | H(0) V(6) |
| 0xb8E / 0xbB2 | H(7) V(6) | H(6) V(6) | H(5) V(6) | H(4) V(6) |
| 0xb8F / 0xbB3 | H(11) V(6) | H(10) V(6) | H(9) V(6) | H(8) V(6) |
| 0xb90 / 0xbB4 | H(15) V(6) | H(14) V(6) | H(13) V(6) | H(12) V(6) |
| 0xb91 / 0xbB5 | - | - | - | H(16) V(6) |
| 0xb92 / 0xbB6 | H(-1) V(10) | - | - | - |
| 0xb93 / 0xbB7 | H(3) V(10) | H(2) V(10) | H(1) V(10) | H(0) V(10) |
| 0xb94 / 0xbB8 | H(7) V(10) | H(6) V(10) | H(5) V(10) | H(4) V(10) |
| 0xb95 / 0xbB9 | H(11) V(10) | H(10) V(10) | H(9) V(10) | H(8) V(10) |
| 0xb96 / 0xbBA | H(15) V(10) | H(14) V(10) | H(13) V(10) | H(12) V(10) |
| 0xb97 / 0xbBB | - | - | - | H(16) V(10) |
| 0xb98 / 0xbBC | H(-1) V(14) | - | - | - |
| 0xb99 / 0xbBD | H(3) V(14) | H(2) V(14) | H(1) V(14) | H(0) V(14) |
| 0xb9A / 0xbBE | H(7) V(14) | H(6) V(14) | H(5) V(14) | H(4) V(14) |
| 0xb9B / 0xbBF | H(11) V(14) | H(10) V(14) | H(9) V(14) | H(8) V(14) |
| 0xb9C / 0xbC0 | H(15) V(14) | H(14) V(14) | H(13) V(14) | H(12) V(14) |
| 0xb9D / 0xbC1 | - | - | - | H(16) V(14) |
| 0xb9E / 0xbC2 | - | - | - | - |
| 0xb9F / 0xbC3 | - | - | - | - |
| 0xbA0 / 0xbC4 | - | - | - | - |
| 0xbA1 / 0xbC5 | - | - | - | - |
| 0xbA2 / 0xbC6 | - | - | - | - |
| 0xbA3 / 0xbC7 | - | - | - | - |

MEMORY 7 (b=E)

| BUFFER A / B | 31 24 | 23 16 | 15 8 | 7 0 |
|---|---|---|---|---|
| 0xb80 / 0xbA4 | H(-1) V(-1) | - | - | - |
| 0xb81 / 0xbA5 | H(3) V(-1) | H(2) V(-1) | H(1) V(-1) | H(0) V(-1) |
| 0xb82 / 0xbA6 | H(7) V(-1) | H(6) V(-1) | H(5) V(-1) | H(4) V(-1) |
| 0xb83 / 0xbA7 | H(11) V(-1) | H(10) V(-1) | H(9) V(-1) | H(8) V(-1) |
| 0xb84 / 0xbA8 | H(15) V(-1) | H(14) V(-1) | H(13) V(-1) | H(12) V(-1) |
| 0xb85 / 0xbA9 | - | - | - | H(16) V(-1) |
| 0xb86 / 0xbAA | H(-1) V(3) | - | - | - |
| 0xb87 / 0xbAB | H(3) V(3) | H(2) V(3) | H(1) V(3) | H(0) V(3) |
| 0xb88 / 0xbAC | H(7) V(3) | H(6) V(3) | H(5) V(3) | H(4) V(3) |
| 0xb89 / 0xbAD | H(11) V(3) | H(10) V(3) | H(9) V(3) | H(8) V(3) |
| 0xb8A / 0xbAE | H(15) V(3) | H(14) V(3) | H(13) V(3) | H(12) V(3) |
| 0xb8B / 0xbAF | - | - | - | H(16) V(3) |
| 0xb8C / 0xbB0 | H(-1) V(7) | - | - | - |
| 0xb8D / 0xbB1 | H(3) V(7) | H(2) V(7) | H(1) V(7) | H(0) V(7) |
| 0xb8E / 0xbB2 | H(7) V(7) | H(6) V(7) | H(5) V(7) | H(4) V(7) |
| 0xb8F / 0xbB3 | H(11) V(7) | H(10) V(7) | H(9) V(7) | H(8) V(7) |
| 0xb90 / 0xbB4 | H(15) V(7) | H(14) V(7) | H(13) V(7) | H(12) V(7) |
| 0xb91 / 0xbB5 | - | - | - | H(16) V(7) |
| 0xb92 / 0xbB6 | H(-1) V(11) | - | - | - |
| 0xb93 / 0xbB7 | H(3) V(11) | H(2) V(11) | H(1) V(11) | H(0) V(11) |
| 0xb94 / 0xbB8 | H(7) V(11) | H(6) V(11) | H(5) V(11) | H(4) V(11) |
| 0xb95 / 0xbB9 | H(11) V(11) | H(10) V(11) | H(9) V(11) | H(8) V(11) |
| 0xb96 / 0xbBA | H(15) V(11) | H(14) V(11) | H(13) V(11) | H(12) V(11) |
| 0xb97 / 0xbBB | - | - | - | H(16) V(11) |
| 0xb98 / 0xbBC | H(-1) V(15) | - | - | - |
| 0xb99 / 0xbBD | H(3) V(15) | H(2) V(15) | H(1) V(15) | H(0) V(15) |
| 0xb9A / 0xbBE | H(7) V(15) | H(6) V(15) | H(5) V(15) | H(4) V(15) |
| 0xb9B / 0xbBF | H(11) V(15) | H(10) V(15) | H(9) V(15) | H(8) V(15) |
| 0xb9C / 0xbC0 | H(15) V(15) | H(14) V(15) | H(13) V(15) | H(12) V(15) |
| 0xb9D / 0xbC1 | - | - | - | H(16) V(15) |
| 0xb9E / 0xbC2 | - | - | - | - |
| 0xb9F / 0xbC3 | - | - | - | - |
| 0xbA0 / 0xbC4 | - | - | - | - |
| 0xbA1 / 0xbC5 | - | - | - | - |
| 0xbA2 / 0xbC6 | - | - | - | - |
| 0xbA3 / 0xbC7 | - | - | - | - |

FIGURE 16-2. MEMORY LAYOUT FOR 18 x 18 CURRENT BLOCKS A / B

| BUFFER A / B | MEMORY 4 (b=8) 31 24 | 23 16 | 15 8 | 7 0 | MEMORY 5 (b=A) 31 24 | 23 16 | 15 8 | 7 0 | MEMORY 6 (b=C) 31 24 | 23 16 | 15 8 | 7 0 | MEMORY 7 (b=E) 31 24 | 23 16 | 15 8 | 7 0 |
|---|---|---|---|---|---|---|---|---|---|---|---|---|---|---|---|---|
| 0xb80 / 0xbA4 | - | - | - | - | - | - | - | - | H(-1) V(-2) | H(-2) V(-2) | - | - | H(-1) V(-1) | H(-2) V(-1) | - | - |
| 0xb81 / 0xbA5 | - | - | - | - | - | - | - | - | H(3) V(-2) | H(2) V(-2) | H(1) V(-2) | H(0) V(-2) | H(3) V(-1) | H(2) V(-1) | H(1) V(-1) | H(0) V(-1) |
| 0xb82 / 0xbA6 | - | - | - | - | - | - | - | - | H(7) V(-2) | H(6) V(-2) | H(5) V(-2) | H(4) V(-2) | H(7) V(-1) | H(6) V(-1) | H(5) V(-1) | H(4) V(-1) |
| 0xb83 / 0xbA7 | - | - | - | - | - | - | - | - | H(11) V(-2) | H(10) V(-2) | H(9) V(-2) | H(8) V(-2) | H(11) V(-1) | H(10) V(-1) | H(9) V(-1) | H(8) V(-1) |
| 0xb84 / 0xbA8 | - | - | - | - | - | - | - | - | H(15) V(-2) | H(14) V(-2) | H(13) V(-2) | H(12) V(-2) | H(15) V(-1) | H(14) V(-1) | H(13) V(-1) | H(12) V(-1) |
| 0xb85 / 0xbA9 | - | - | - | - | - | - | - | - | - | - | H(17) V(-2) | H(16) V(-2) | - | - | H(17) V(-1) | H(16) V(-1) |
| 0xb86 / 0xbAA | H(-1) V(0) | H(-2) V(0) | - | - | H(-1) V(1) | H(-2) V(1) | - | - | H(-1) V(2) | H(-2) V(2) | - | - | H(-1) V(3) | H(-2) V(3) | - | - |
| 0xb87 / 0xbAB | H(3) V(0) | H(2) V(0) | H(1) V(0) | H(0) V(0) | H(3) V(1) | H(2) V(1) | H(1) V(1) | H(0) V(1) | H(3) V(2) | H(2) V(2) | H(1) V(2) | H(0) V(2) | H(3) V(3) | H(2) V(3) | H(1) V(3) | H(0) V(3) |
| 0xb88 / 0xbAC | H(7) V(0) | H(6) V(0) | H(5) V(0) | H(4) V(0) | H(7) V(1) | H(6) V(1) | H(5) V(1) | H(4) V(1) | H(7) V(2) | H(6) V(2) | H(5) V(2) | H(4) V(2) | H(7) V(3) | H(6) V(3) | H(5) V(3) | H(4) V(3) |
| 0xb89 / 0xbAD | H(11) V(0) | H(10) V(0) | H(9) V(0) | H(8) V(0) | H(11) V(1) | H(10) V(1) | H(9) V(1) | H(8) V(1) | H(11) V(2) | H(10) V(2) | H(9) V(2) | H(8) V(2) | H(11) V(3) | H(10) V(3) | H(9) V(3) | H(8) V(3) |
| 0xb8A / 0xbAE | H(15) V(0) | H(14) V(0) | H(13) V(0) | H(12) V(0) | H(15) V(1) | H(14) V(1) | H(13) V(1) | H(12) V(1) | H(15) V(2) | H(14) V(2) | H(13) V(2) | H(12) V(2) | H(15) V(3) | H(14) V(3) | H(13) V(3) | H(12) V(3) |
| 0xb8B / 0xbAF | - | - | H(17) V(0) | H(16) V(0) | - | - | H(17) V(1) | H(16) V(1) | - | - | H(17) V(2) | H(16) V(2) | - | - | H(17) V(3) | H(16) V(3) |
| 0xb8C / 0xbB0 | H(-1) V(4) | H(-2) V(4) | - | - | H(-1) V(5) | H(-2) V(5) | - | - | H(-1) V(6) | H(-2) V(6) | - | - | H(-1) V(7) | H(-2) V(7) | - | - |
| 0xb8D / 0xbB1 | H(3) V(4) | H(2) V(4) | H(1) V(4) | H(0) V(4) | H(3) V(5) | H(2) V(5) | H(1) V(5) | H(0) V(5) | H(3) V(6) | H(2) V(6) | H(1) V(6) | H(0) V(6) | H(3) V(7) | H(2) V(7) | H(1) V(7) | H(0) V(7) |
| 0xb8E / 0xbB2 | H(7) V(4) | H(6) V(4) | H(5) V(4) | H(4) V(4) | H(7) V(5) | H(6) V(5) | H(5) V(5) | H(4) V(5) | H(7) V(6) | H(6) V(6) | H(5) V(6) | H(4) V(6) | H(7) V(7) | H(6) V(7) | H(5) V(7) | H(4) V(7) |
| 0xb8F / 0xbB3 | H(11) V(4) | H(10) V(4) | H(9) V(4) | H(8) V(4) | H(11) V(5) | H(10) V(5) | H(9) V(5) | H(8) V(5) | H(11) V(6) | H(10) V(6) | H(9) V(6) | H(8) V(6) | H(11) V(7) | H(10) V(7) | H(9) V(7) | H(8) V(7) |
| 0xb90 / 0xbB4 | H(15) V(4) | H(14) V(4) | H(13) V(4) | H(12) V(4) | H(15) V(5) | H(14) V(5) | H(13) V(5) | H(12) V(5) | H(15) V(6) | H(14) V(6) | H(13) V(6) | H(12) V(6) | H(15) V(7) | H(14) V(7) | H(13) V(7) | H(12) V(7) |
| 0xb91 / 0xbB5 | - | - | H(17) V(4) | H(16) V(4) | - | - | H(17) V(5) | H(16) V(5) | - | - | H(17) V(6) | H(16) V(6) | - | - | H(17) V(7) | H(16) V(7) |
| 0xb92 / 0xbB6 | H(-1) V(8) | H(-2) V(8) | - | - | H(-1) V(9) | H(-2) V(9) | - | - | H(-1) V(10) | H(-2) V(10) | - | - | H(-1) V(11) | H(-2) V(11) | - | - |
| 0xb93 / 0xbB7 | H(3) V(8) | H(2) V(8) | H(1) V(8) | H(0) V(8) | H(3) V(9) | H(2) V(9) | H(1) V(9) | H(0) V(9) | H(3) V(10) | H(2) V(10) | H(1) V(10) | H(0) V(10) | H(3) V(11) | H(2) V(11) | H(1) V(11) | H(0) V(11) |
| 0xb94 / 0xbB8 | H(7) V(8) | H(6) V(8) | H(5) V(8) | H(4) V(8) | H(7) V(9) | H(6) V(9) | H(5) V(9) | H(4) V(9) | H(7) V(10) | H(6) V(10) | H(5) V(10) | H(4) V(10) | H(7) V(11) | H(6) V(11) | H(5) V(11) | H(4) V(11) |
| 0xb95 / 0xbB9 | H(11) V(8) | H(10) V(8) | H(9) V(8) | H(8) V(8) | H(11) V(9) | H(10) V(9) | H(9) V(9) | H(8) V(9) | H(11) V(10) | H(10) V(10) | H(9) V(10) | H(8) V(10) | H(11) V(11) | H(10) V(11) | H(9) V(11) | H(8) V(11) |
| 0xb96 / 0xbBA | H(15) V(8) | H(14) V(8) | H(13) V(8) | H(12) V(8) | H(15) V(9) | H(14) V(9) | H(13) V(9) | H(12) V(9) | H(15) V(10) | H(14) V(10) | H(13) V(10) | H(12) V(10) | H(15) V(11) | H(14) V(11) | H(13) V(11) | H(12) V(11) |
| 0xb97 / 0xbBB | - | - | H(17) V(8) | H(16) V(8) | - | - | H(17) V(9) | H(16) V(9) | - | - | H(17) V(10) | H(16) V(10) | - | - | H(17) V(11) | H(16) V(11) |
| 0xb98 / 0xbBC | H(-1) V(12) | H(-2) V(12) | - | - | H(-1) V(13) | H(-2) V(13) | - | - | H(-1) V(14) | H(-2) V(14) | - | - | H(-1) V(15) | H(-2) V(15) | - | - |
| 0xb99 / 0xbBD | H(3) V(12) | H(2) V(12) | H(1) V(12) | H(0) V(12) | H(3) V(13) | H(2) V(13) | H(1) V(13) | H(0) V(13) | H(3) V(14) | H(2) V(14) | H(1) V(14) | H(0) V(14) | H(3) V(15) | H(2) V(15) | H(1) V(15) | H(0) V(15) |
| 0xb9A / 0xbBE | H(7) V(12) | H(6) V(12) | H(5) V(12) | H(4) V(12) | H(7) V(13) | H(6) V(13) | H(5) V(13) | H(4) V(13) | H(7) V(14) | H(6) V(14) | H(5) V(14) | H(4) V(14) | H(7) V(15) | H(6) V(15) | H(5) V(15) | H(4) V(15) |
| 0xb9B / 0xbBF | H(11) V(12) | H(10) V(12) | H(9) V(12) | H(8) V(12) | H(11) V(13) | H(10) V(13) | H(9) V(13) | H(8) V(13) | H(11) V(14) | H(10) V(14) | H(9) V(14) | H(8) V(14) | H(11) V(15) | H(10) V(15) | H(9) V(15) | H(8) V(15) |
| 0xb9C / 0xbC0 | H(15) V(12) | H(14) V(12) | H(13) V(12) | H(12) V(12) | H(15) V(13) | H(14) V(13) | H(13) V(13) | H(12) V(13) | H(15) V(14) | H(14) V(14) | H(13) V(14) | H(12) V(14) | H(15) V(15) | H(14) V(15) | H(13) V(15) | H(12) V(15) |
| 0xb9D / 0xbC1 | - | - | H(17) V(12) | H(16) V(12) | - | - | H(17) V(13) | H(16) V(13) | - | - | H(17) V(14) | H(16) V(14) | - | - | H(17) V(15) | H(16) V(15) |
| 0xb9E / 0xbC2 | H(-1) V(16) | H(-2) V(16) | - | - | H(-1) V(17) | H(-2) V(17) | - | - | - | - | - | - | - | - | - | - |
| 0xb9F / 0xbC3 | H(3) V(16) | H(2) V(16) | H(1) V(16) | H(0) V(16) | H(3) V(17) | H(2) V(17) | H(1) V(17) | H(0) V(17) | - | - | - | - | - | - | - | - |
| 0xbA0 / 0xbC4 | H(7) V(16) | H(6) V(16) | H(5) V(16) | H(4) V(16) | H(7) V(17) | H(6) V(17) | H(5) V(17) | H(4) V(17) | - | - | - | - | - | - | - | - |
| 0xbA1 / 0xbC5 | H(11) V(16) | H(10) V(16) | H(9) V(16) | H(8) V(16) | H(11) V(17) | H(10) V(17) | H(9) V(17) | H(8) V(17) | - | - | - | - | - | - | - | - |
| 0xbA2 / 0xbC6 | H(15) V(16) | H(14) V(16) | H(13) V(16) | H(12) V(16) | H(15) V(17) | H(14) V(17) | H(13) V(17) | H(12) V(17) | - | - | - | - | - | - | - | - |
| 0xbA3 / 0xbC7 | - | - | H(17) V(16) | H(16) V(16) | - | - | H(17) V(17) | H(16) V(17) | - | - | - | - | - | - | - | - |

FIGURE 16-3. MEMORY LAYOUT FOR 20 x 20 CURRENT BLOCKS A / B

MEMORY 4 (b=8)

| BUFFER A / B | 31 24 | 23 16 | 15 8 | 7 0 |
|---|---|---|---|---|
| 0xb80 / 0xbA4 | - | - | - | - |
| 0xb81 / 0xbA5 | - | - | - | - |
| 0xb82 / 0xbA6 | - | - | - | - |
| 0xb83 / 0xbA7 | - | - | - | - |
| 0xb84 / 0xbA8 | - | - | - | - |
| 0xb85 / 0xbA9 | - | - | - | - |
| 0xb86 / 0xbAA | H(-1) V(0) | H(-2) V(0) | H(-3) V(0) | - |
| 0xb87 / 0xbAB | H(3) V(0) | H(2) V(0) | H(1) V(0) | H(0) V(0) |
| 0xb88 / 0xbAC | H(7) V(0) | H(6) V(0) | H(5) V(0) | H(4) V(0) |
| 0xb89 / 0xbAD | H(11) V(0) | H(10) V(0) | H(9) V(0) | H(8) V(0) |
| 0xb8A / 0xbAE | H(15) V(0) | H(14) V(0) | H(13) V(0) | H(12) V(0) |
| 0xb8B / 0xbAF | - | H(18) V(0) | H(17) V(0) | H(16) V(0) |
| 0xb8C / 0xbB0 | H(-1) V(4) | H(-2) V(4) | H(-3) V(4) | - |
| 0xb8D / 0xbB1 | H(3) V(4) | H(2) V(4) | H(1) V(4) | H(0) V(4) |
| 0xb8E / 0xbB2 | H(7) V(4) | H(6) V(4) | H(5) V(4) | H(4) V(4) |
| 0xb8F / 0xbB3 | H(11) V(4) | H(10) V(4) | H(9) V(4) | H(8) V(4) |
| 0xb90 / 0xbB4 | H(15) V(4) | H(14) V(4) | H(13) V(4) | H(12) V(4) |
| 0xb91 / 0xbB5 | - | H(18) V(4) | H(17) V(4) | H(16) V(4) |
| 0xb92 / 0xbB6 | H(-1) V(8) | H(-2) V(8) | H(-3) V(8) | - |
| 0xb93 / 0xbB7 | H(3) V(8) | H(2) V(8) | H(1) V(8) | H(0) V(8) |
| 0xb94 / 0xbB8 | H(7) V(8) | H(6) V(8) | H(5) V(8) | H(4) V(8) |
| 0xb95 / 0xbB9 | H(11) V(8) | H(10) V(8) | H(9) V(8) | H(8) V(8) |
| 0xb96 / 0xbBA | H(15) V(8) | H(14) V(8) | H(13) V(8) | H(12) V(8) |
| 0xb97 / 0xbBB | - | H(18) V(8) | H(17) V(8) | H(16) V(8) |
| 0xb98 / 0xbBC | H(-1) V(12) | H(-2) V(12) | H(-3) V(12) | - |
| 0xb99 / 0xbBD | H(3) V(12) | H(2) V(12) | H(1) V(12) | H(0) V(12) |
| 0xb9A / 0xbBE | H(7) V(12) | H(6) V(12) | H(5) V(12) | H(4) V(12) |
| 0xb9B / 0xbBF | H(11) V(12) | H(10) V(12) | H(9) V(12) | H(8) V(12) |
| 0xb9C / 0xbC0 | H(15) V(12) | H(14) V(12) | H(13) V(12) | H(12) V(12) |
| 0xb9D / 0xbC1 | - | H(18) V(12) | H(17) V(12) | H(16) V(12) |
| 0xb9E / 0xbC2 | H(-1) V(16) | H(-2) V(16) | H(-3) V(16) | - |
| 0xb9F / 0xbC3 | H(3) V(16) | H(2) V(16) | H(1) V(16) | H(0) V(16) |
| 0xbA0 / 0xbC4 | H(7) V(16) | H(6) V(16) | H(5) V(16) | H(4) V(16) |
| 0xbA1 / 0xbC5 | H(11) V(16) | H(10) V(16) | H(9) V(16) | H(8) V(16) |
| 0xbA2 / 0xbC6 | H(15) V(16) | H(14) V(16) | H(13) V(16) | H(12) V(16) |
| 0xbA3 / 0xbC7 | - | H(18) V(16) | H(17) V(16) | H(16) V(16) |

MEMORY 5 (b=A)

| BUFFER A / B | 31 24 | 23 16 | 15 8 | 7 0 |
|---|---|---|---|---|
| 0xb80 / 0xbA4 | H(-1) V(-3) | H(-2) V(-3) | H(-3) V(-3) | - |
| 0xb81 / 0xbA5 | H(3) V(-3) | H(2) V(-3) | H(1) V(-3) | H(0) V(-3) |
| 0xb82 / 0xbA6 | H(7) V(-3) | H(6) V(-3) | H(5) V(-3) | H(4) V(-3) |
| 0xb83 / 0xbA7 | H(11) V(-3) | H(10) V(-3) | H(9) V(-3) | H(8) V(-3) |
| 0xb84 / 0xbA8 | H(15) V(-3) | H(14) V(-3) | H(13) V(-3) | H(12) V(-3) |
| 0xb85 / 0xbA9 | - | H(18) V(-3) | H(17) V(-3) | H(16) V(-3) |
| 0xb86 / 0xbAA | H(-1) V(1) | H(-2) V(1) | H(-3) V(1) | - |
| 0xb87 / 0xbAB | H(3) V(1) | H(2) V(1) | H(1) V(1) | H(0) V(1) |
| 0xb88 / 0xbAC | H(7) V(1) | H(6) V(1) | H(5) V(1) | H(4) V(1) |
| 0xb89 / 0xbAD | H(11) V(1) | H(10) V(1) | H(9) V(1) | H(8) V(1) |
| 0xb8A / 0xbAE | H(15) V(1) | H(14) V(1) | H(13) V(1) | H(12) V(1) |
| 0xb8B / 0xbAF | - | H(18) V(1) | H(17) V(1) | H(16) V(1) |
| 0xb8C / 0xbB0 | H(-1) V(5) | H(-2) V(5) | H(-3) V(5) | - |
| 0xb8D / 0xbB1 | H(3) V(5) | H(2) V(5) | H(1) V(5) | H(0) V(5) |
| 0xb8E / 0xbB2 | H(7) V(5) | H(6) V(5) | H(5) V(5) | H(4) V(5) |
| 0xb8F / 0xbB3 | H(11) V(5) | H(10) V(5) | H(9) V(5) | H(8) V(5) |
| 0xb90 / 0xbB4 | H(15) V(5) | H(14) V(5) | H(13) V(5) | H(12) V(5) |
| 0xb91 / 0xbB5 | - | H(18) V(5) | H(17) V(5) | H(16) V(5) |
| 0xb92 / 0xbB6 | H(-1) V(9) | H(-2) V(9) | H(-3) V(9) | - |
| 0xb93 / 0xbB7 | H(3) V(9) | H(2) V(9) | H(1) V(9) | H(0) V(9) |
| 0xb94 / 0xbB8 | H(7) V(9) | H(6) V(9) | H(5) V(9) | H(4) V(9) |
| 0xb95 / 0xbB9 | H(11) V(9) | H(10) V(9) | H(9) V(9) | H(8) V(9) |
| 0xb96 / 0xbBA | H(15) V(9) | H(14) V(9) | H(13) V(9) | H(12) V(9) |
| 0xb97 / 0xbBB | - | H(18) V(9) | H(17) V(9) | H(16) V(9) |
| 0xb98 / 0xbBC | H(-1) V(13) | H(-2) V(13) | H(-3) V(13) | - |
| 0xb99 / 0xbBD | H(3) V(13) | H(2) V(13) | H(1) V(13) | H(0) V(13) |
| 0xb9A / 0xbBE | H(7) V(13) | H(6) V(13) | H(5) V(13) | H(4) V(13) |
| 0xb9B / 0xbBF | H(11) V(13) | H(10) V(13) | H(9) V(13) | H(8) V(13) |
| 0xb9C / 0xbC0 | H(15) V(13) | H(14) V(13) | H(13) V(13) | H(12) V(13) |
| 0xb9D / 0xbC1 | - | H(18) V(13) | H(17) V(13) | H(16) V(13) |
| 0xb9E / 0xbC2 | H(-1) V(17) | H(-2) V(17) | H(-3) V(17) | - |
| 0xb9F / 0xbC3 | H(3) V(17) | H(2) V(17) | H(1) V(17) | H(0) V(17) |
| 0xbA0 / 0xbC4 | H(7) V(17) | H(6) V(17) | H(5) V(17) | H(4) V(17) |
| 0xbA1 / 0xbC5 | H(11) V(17) | H(10) V(17) | H(9) V(17) | H(8) V(17) |
| 0xbA2 / 0xbC6 | H(15) V(17) | H(14) V(17) | H(13) V(17) | H(12) V(17) |
| 0xbA3 / 0xbC7 | - | H(18) V(17) | H(17) V(17) | H(16) V(17) |

MEMORY 6 (b=C)

| BUFFER A / B | 31 24 | 23 16 | 15 8 | 7 0 |
|---|---|---|---|---|
| 0xb80 / 0xbA4 | H(-1) V(-2) | H(-2) V(-2) | H(-3) V(-2) | - |
| 0xb81 / 0xbA5 | H(3) V(-2) | H(2) V(-2) | H(1) V(-2) | H(0) V(-2) |
| 0xb82 / 0xbA6 | H(7) V(-2) | H(6) V(-2) | H(5) V(-2) | H(4) V(-2) |
| 0xb83 / 0xbA7 | H(11) V(-2) | H(10) V(-2) | H(9) V(-2) | H(8) V(-2) |
| 0xb84 / 0xbA8 | H(15) V(-2) | H(14) V(-2) | H(13) V(-2) | H(12) V(-2) |
| 0xb85 / 0xbA9 | - | H(18) V(-2) | H(17) V(-2) | H(16) V(-2) |
| 0xb86 / 0xbAA | H(-1) V(2) | H(-2) V(2) | H(-3) V(2) | - |
| 0xb87 / 0xbAB | H(3) V(2) | H(2) V(2) | H(1) V(2) | H(0) V(2) |
| 0xb88 / 0xbAC | H(7) V(2) | H(6) V(2) | H(5) V(2) | H(4) V(2) |
| 0xb89 / 0xbAD | H(11) V(2) | H(10) V(2) | H(9) V(2) | H(8) V(2) |
| 0xb8A / 0xbAE | H(15) V(2) | H(14) V(2) | H(13) V(2) | H(12) V(2) |
| 0xb8B / 0xbAF | - | H(18) V(2) | H(17) V(2) | H(16) V(2) |
| 0xb8C / 0xbB0 | H(-1) V(6) | H(-2) V(6) | H(-3) V(6) | - |
| 0xb8D / 0xbB1 | H(3) V(6) | H(2) V(6) | H(1) V(6) | H(0) V(6) |
| 0xb8E / 0xbB2 | H(7) V(6) | H(6) V(6) | H(5) V(6) | H(4) V(6) |
| 0xb8F / 0xbB3 | H(11) V(6) | H(10) V(6) | H(9) V(6) | H(8) V(6) |
| 0xb90 / 0xbB4 | H(15) V(6) | H(14) V(6) | H(13) V(6) | H(12) V(6) |
| 0xb91 / 0xbB5 | - | H(18) V(6) | H(17) V(6) | H(16) V(6) |
| 0xb92 / 0xbB6 | H(-1) V(10) | H(-2) V(10) | H(-3) V(10) | - |
| 0xb93 / 0xbB7 | H(3) V(10) | H(2) V(10) | H(1) V(10) | H(0) V(10) |
| 0xb94 / 0xbB8 | H(7) V(10) | H(6) V(10) | H(5) V(10) | H(4) V(10) |
| 0xb95 / 0xbB9 | H(11) V(10) | H(10) V(10) | H(9) V(10) | H(8) V(10) |
| 0xb96 / 0xbBA | H(15) V(10) | H(14) V(10) | H(13) V(10) | H(12) V(10) |
| 0xb97 / 0xbBB | - | H(18) V(10) | H(17) V(10) | H(16) V(10) |
| 0xb98 / 0xbBC | H(-1) V(14) | H(-2) V(14) | H(-3) V(14) | - |
| 0xb99 / 0xbBD | H(3) V(14) | H(2) V(14) | H(1) V(14) | H(0) V(14) |
| 0xb9A / 0xbBE | H(7) V(14) | H(6) V(14) | H(5) V(14) | H(4) V(14) |
| 0xb9B / 0xbBF | H(11) V(14) | H(10) V(14) | H(9) V(14) | H(8) V(14) |
| 0xb9C / 0xbC0 | H(15) V(14) | H(14) V(14) | H(13) V(14) | H(12) V(14) |
| 0xb9D / 0xbC1 | - | H(18) V(14) | H(17) V(14) | H(16) V(14) |
| 0xb9E / 0xbC2 | H(-1) V(18) | H(-2) V(18) | H(-3) V(18) | - |
| 0xb9F / 0xbC3 | H(3) V(18) | H(2) V(18) | H(1) V(18) | H(0) V(18) |
| 0xbA0 / 0xbC4 | H(7) V(18) | H(6) V(18) | H(5) V(18) | H(4) V(18) |
| 0xbA1 / 0xbC5 | H(11) V(18) | H(10) V(18) | H(9) V(18) | H(8) V(18) |
| 0xbA2 / 0xbC6 | H(15) V(18) | H(14) V(18) | H(13) V(18) | H(12) V(18) |
| 0xbA3 / 0xbC7 | - | H(18) V(18) | H(17) V(18) | H(16) V(18) |

MEMORY 7 (b=E)

| BUFFER A / B | 31 24 | 23 16 | 15 8 | 7 0 |
|---|---|---|---|---|
| 0xb80 / 0xbA4 | H(-1) V(-1) | H(-2) V(-1) | H(-3) V(-1) | - |
| 0xb81 / 0xbA5 | H(3) V(-1) | H(2) V(-1) | H(1) V(-1) | H(0) V(-1) |
| 0xb82 / 0xbA6 | H(7) V(-1) | H(6) V(-1) | H(5) V(-1) | H(4) V(-1) |
| 0xb83 / 0xbA7 | H(11) V(-1) | H(10) V(-1) | H(9) V(-1) | H(8) V(-1) |
| 0xb84 / 0xbA8 | H(15) V(-1) | H(14) V(-1) | H(13) V(-1) | H(12) V(-1) |
| 0xb85 / 0xbA9 | - | H(18) V(-1) | H(17) V(-1) | H(16) V(-1) |
| 0xb86 / 0xbAA | H(-1) V(3) | H(-2) V(3) | H(-3) V(3) | - |
| 0xb87 / 0xbAB | H(3) V(3) | H(2) V(3) | H(1) V(3) | H(0) V(3) |
| 0xb88 / 0xbAC | H(7) V(3) | H(6) V(3) | H(5) V(3) | H(4) V(3) |
| 0xb89 / 0xbAD | H(11) V(3) | H(10) V(3) | H(9) V(3) | H(8) V(3) |
| 0xb8A / 0xbAE | H(15) V(3) | H(14) V(3) | H(13) V(3) | H(12) V(3) |
| 0xb8B / 0xbAF | - | H(18) V(3 | H(17) V(3) | H(16) V(3) |
| 0xb8C / 0xbB0 | H(-1) V(7) | H(-2) V(7) | H(-3) V(7) | - |
| 0xb8D / 0xbB1 | H(3) V(7) | H(2) V(7) | H(1) V(7) | H(0) V(7) |
| 0xb8E / 0xbB2 | H(7) V(7) | H(6) V(7) | H(5) V(7) | H(4) V(7) |
| 0xb8F / 0xbB3 | H(11) V(7) | H(10) V(7) | H(9) V(7) | H(8) V(7) |
| 0xb90 / 0xbB4 | H(15) V(7) | H(14) V(7) | H(13) V(7) | H(12) V(7) |
| 0xb91 / 0xbB5 | - | H(18) V(7) | H(17) V(7) | H(16) V(7) |
| 0xb92 / 0xbB6 | H(-1) V(11) | H(-2) V(11) | H(-3) V(11) | - |
| 0xb93 / 0xbB7 | H(3) V(11) | H(2) V(11) | H(1) V(11) | H(0) V(11) |
| 0xb94 / 0xbB8 | H(7) V(11) | H(6) V(11) | H(5) V(11) | H(4) V(11) |
| 0xb95 / 0xbB9 | H(11) V(11) | H(10) V(11) | H(9) V(11) | H(8) V(11) |
| 0xb96 / 0xbBA | H(15) V(11) | H(14) V(11) | H(13) V(11) | H(12) V(11) |
| 0xb97 / 0xbBB | - | H(18) V(11) | H(17) V(11) | H(16) V(11) |
| 0xb98 / 0xbBC | H(-1) V(15) | H(-2) V(15) | H(-3) V(15) | - |
| 0xb99 / 0xbBD | H(3) V(15) | H(2) V(15) | H(1) V(15) | H(0) V(15) |
| 0xb9A / 0xbBE | H(7) V(15) | H(6) V(15) | H(5) V(15) | H(4) V(15) |
| 0xb9B / 0xbBF | H(11) V(15) | H(10) V(15) | H(9) V(15) | H(8) V(15) |
| 0xb9C / 0xbC0 | H(15) V(15) | H(14) V(15) | H(13) V(15) | H(12) V(15) |
| 0xb9D / 0xbC1 | - | H(18) V(15) | H(17) V(15) | H(16) V(15) |
| 0xb9E / 0xbC2 | - | - | - | - |
| 0xb9F / 0xbC3 | - | - | - | - |
| 0xbA0 / 0xbC4 | - | - | - | - |
| 0xbA1 / 0xbC5 | - | - | - | - |
| 0xbA2 / 0xbC6 | - | - | - | - |
| 0xbA3 / 0xbC7 | - | - | - | - |

FIGURE 16-4. MEMORY LAYOUT FOR 22 x 22 CURRENT BLOCKS A / B

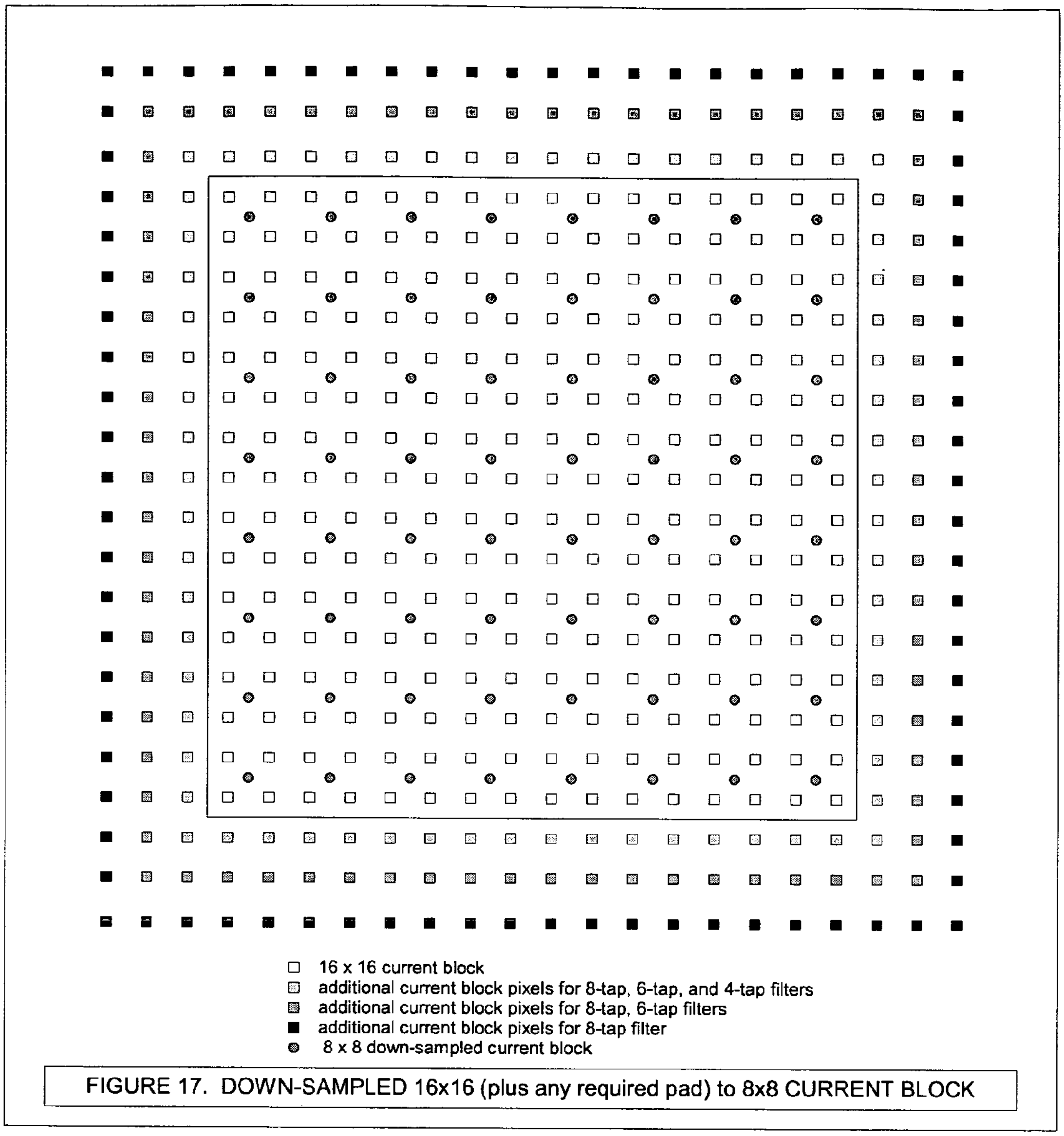
FIGURE 17. DOWN-SAMPLED 16x16 (plus any required pad) to 8x8 CURRENT BLOCK

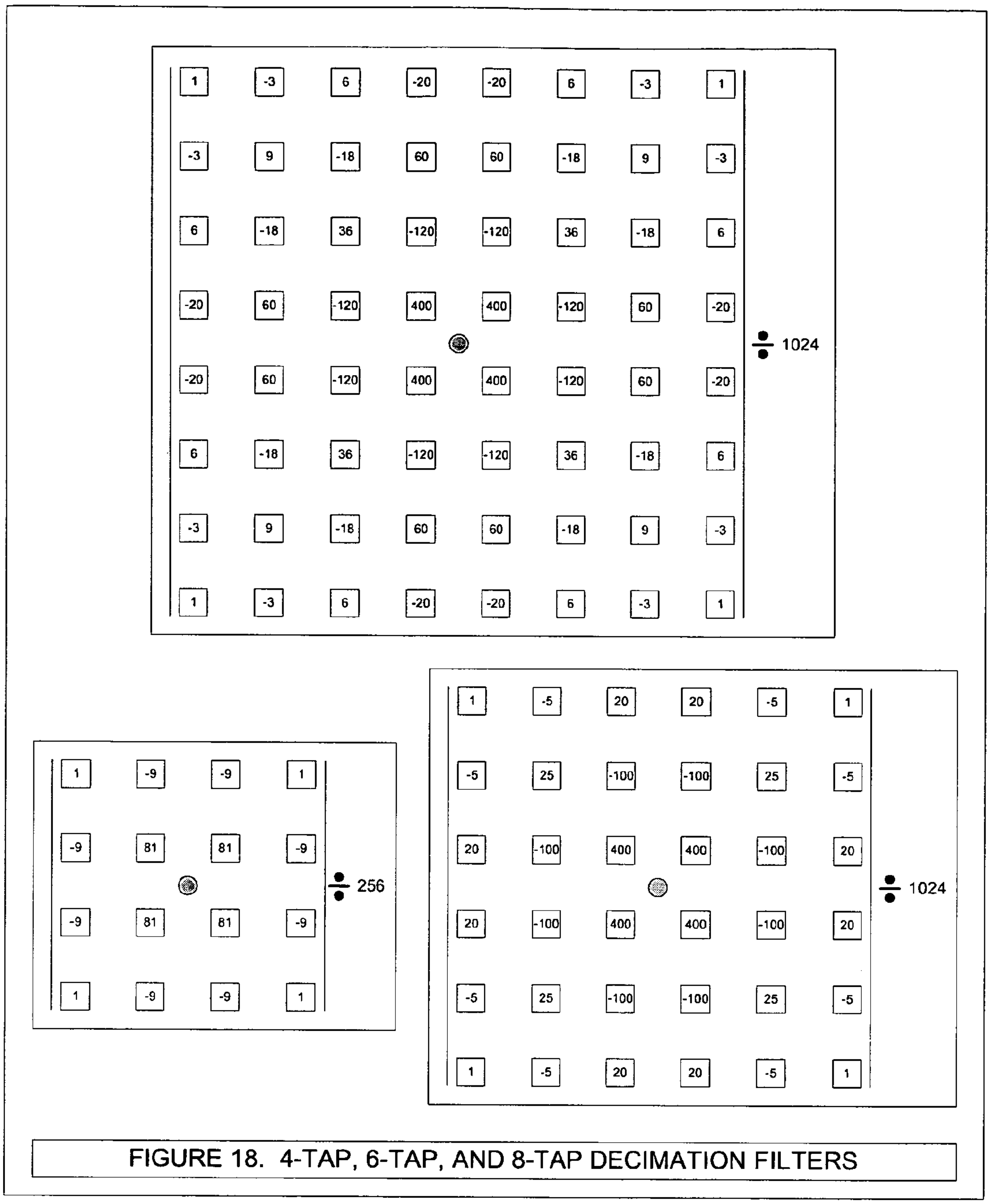
FIGURE 18. 4-TAP, 6-TAP, AND 8-TAP DECIMATION FILTERS

MEMORY 0

| | 31 24 | 23 16 | 15 8 | 7 0 |
|---|---|---|---|---|
| 0x0FC | H(3) V(0) | H(2) V(0) | H(1) V(0) | H(0) V(0) |
| 0x0FD | H(7) V(0) | H(6) V(0) | H(5) V(0) | H(4) V(0) |
| 0x0FE | H(3) V(4) | H(2) V(4) | H(1) V(4) | H(0) V(4) |
| 0x0FF | H(7) V(4) | H(6) V(4) | H(5) V(4) | H(4) V(4) |

MEMORY 1

| | 31 24 | 23 16 | 15 8 | 7 0 |
|---|---|---|---|---|
| 0x2FC | H(3) V(1) | H(2) V(1) | H(1) V(1) | H(0) V(1) |
| 0x2FD | H(7) V(1) | H(6) V(1) | H(5) V(1) | H(4) V(1) |
| 0x2FE | H(3) V(5) | H(2) V(5) | H(1) V(5) | H(0) V(5) |
| 0x2FF | H(7) V(5) | H(6) V(5) | H(5) V(5) | H(4) V(5) |

MEMORY 2

| | 31 24 | 23 16 | 15 8 | 7 0 |
|---|---|---|---|---|
| 0x4FC | H(3) V(2) | H(2) V(2) | H(1) V(2) | H(0) V(2) |
| 0x4FD | H(7) V(2) | H(6) V(2) | H(5) V(2) | H(4) V(2) |
| 0x4FE | H(3) V(6) | H(2) V(6) | H(1) V(6) | H(0) V(6) |
| 0x4FF | H(7) V(6) | H(6) V(6) | H(5) V(6) | H(4) V(6) |

MEMORY 3

| | 31 24 | 23 16 | 15 8 | 7 0 |
|---|---|---|---|---|
| 0x6FC | H(3) V(3) | H(2) V(3) | H(1) V(3) | H(0) V(3) |
| 0x6FD | H(7) V(3) | H(6) V(3) | H(5) V(3) | H(4) V(3) |
| 0x6FE | H(3) V(7) | H(2) V(7) | H(1) V(7) | H(0) V(7) |
| 0x6FF | H(7) V(7) | H(6) V(7) | H(5) V(7) | H(4) V(7) |

FIGURE 19. MEMORY LAYOUT FOR DOWN-SAMPLED 8x8 CURRENT BLOCK

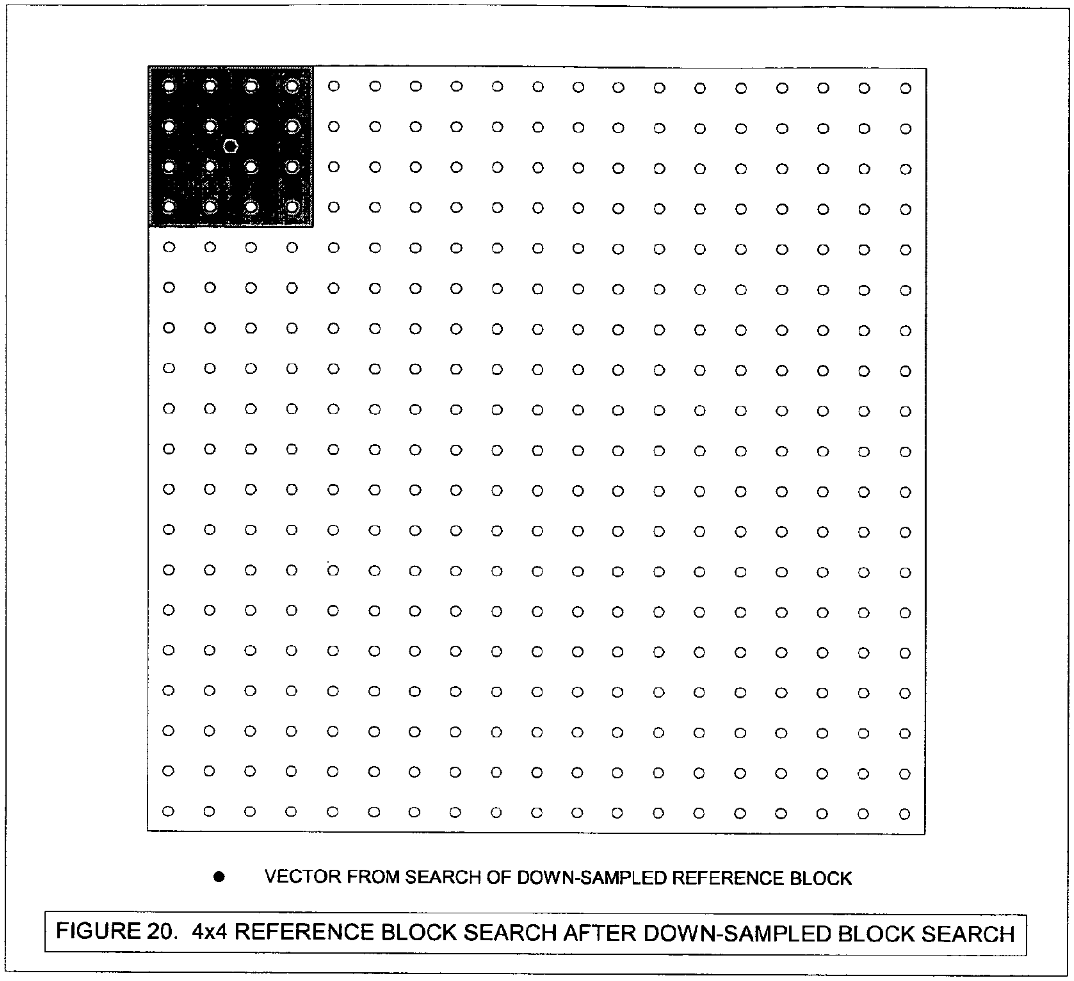
FIGURE 20. 4x4 REFERENCE BLOCK SEARCH AFTER DOWN-SAMPLED BLOCK SEARCH

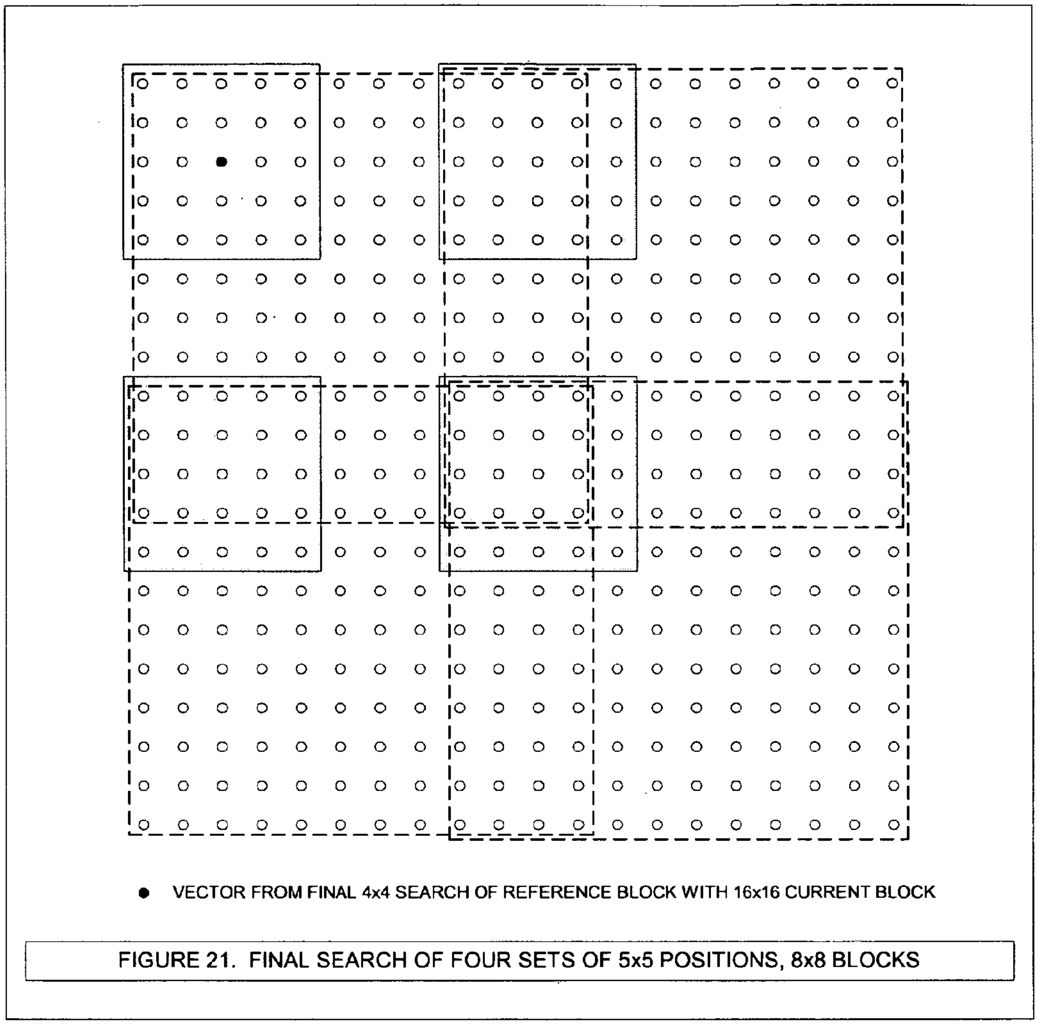
FIGURE 21. FINAL SEARCH OF FOUR SETS OF 5x5 POSITIONS, 8x8 BLOCKS

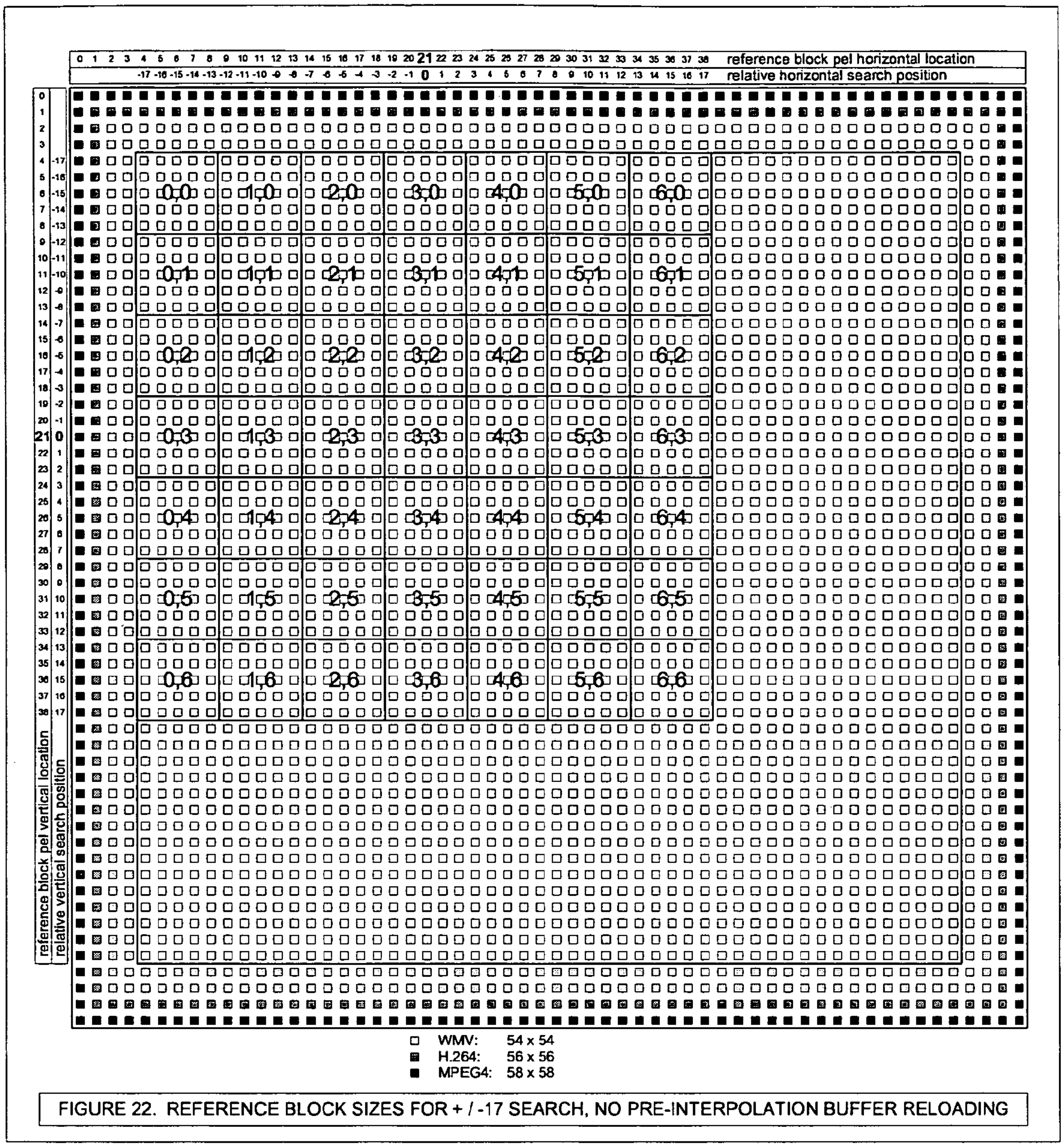
FIGURE 22. REFERENCE BLOCK SIZES FOR + / -17 SEARCH, NO PRE-INTERPOLATION BUFFER RELOADING

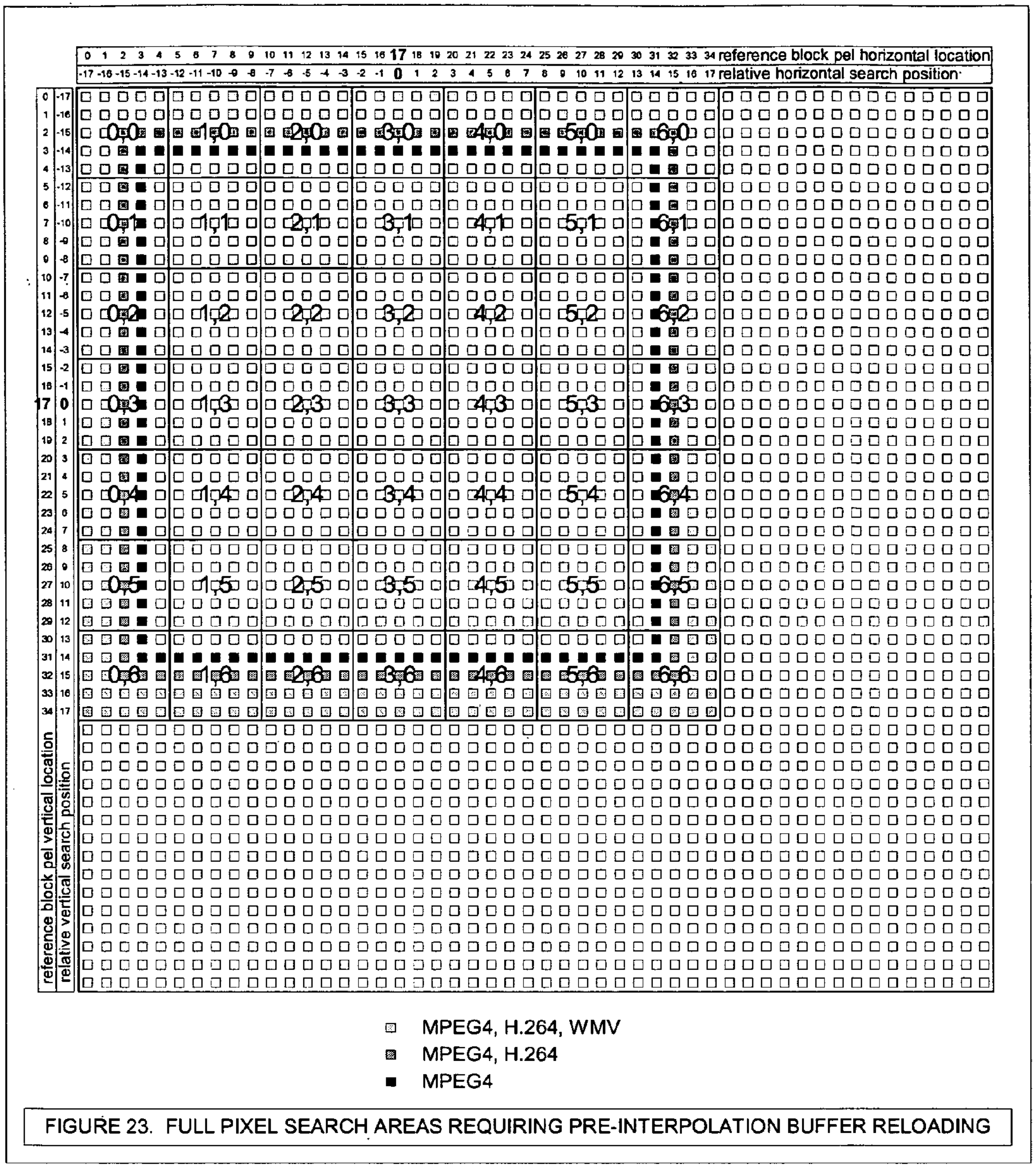
FIGURE 23. FULL PIXEL SEARCH AREAS REQUIRING PRE-INTERPOLATION BUFFER RELOADING

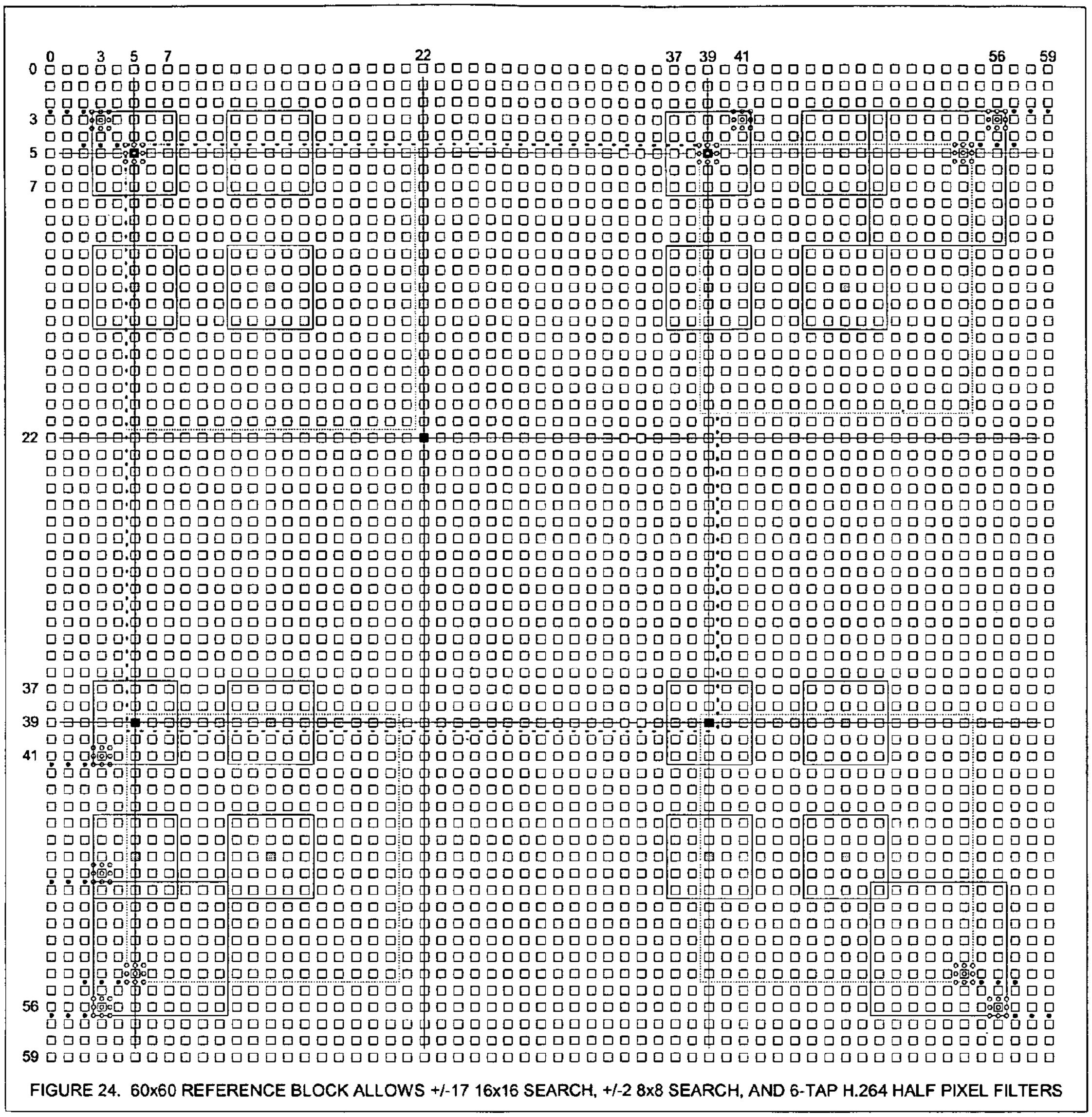
FIGURE 24. 60x60 REFERENCE BLOCK ALLOWS +/-17 16x16 SEARCH, +/-2 8x8 SEARCH, AND 6-TAP H.264 HALF PIXEL FILTERS

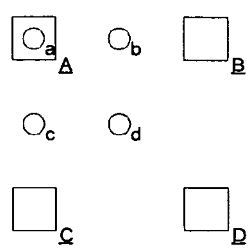
A,B,C,D: FULL PIXEL POSITIONS
a,b,c,d: half pixel positions
$a = A;$
$b = (A + B + 1) / 2;$
$c = (A + C + 1) / 2;$
$d = (A + B + C + D + 2) / 4;$
FIGURE 25. FULL PIXEL-to-HALF PIXEL BILINEAR INTERPOLATION

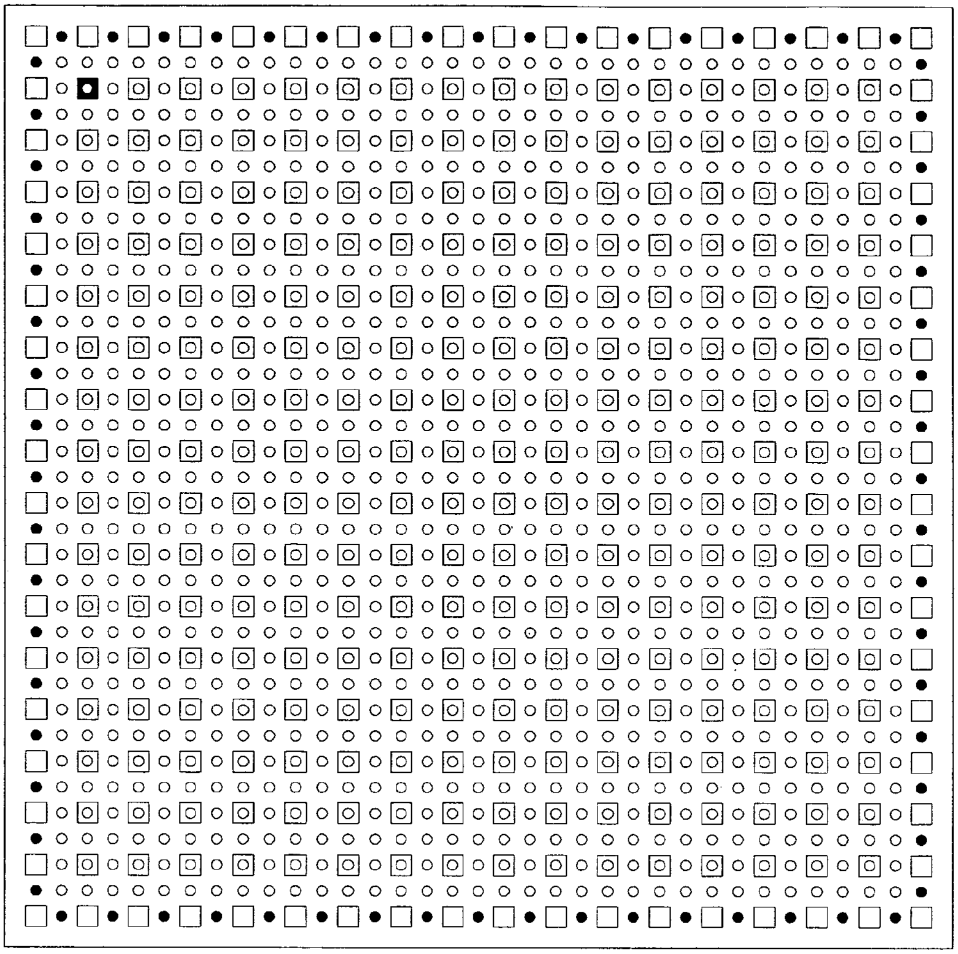
LEGEND:
■ ORIGIN (UPPER-LEFT FULL PEL) FOR 'BEST DISTORTION METRIC' 16 x 16 MACROBLOCK
□ FULL PIXEL
○ HALF PIXEL
● ADDITIONAL HALF PIXEL REQUIRED FOR QUARTER PIXEL INTERPOLATION
FIGURE 26. HALF PIXEL BILINEAR INTERPOLATION FOR 16X16 MACROBLOCK

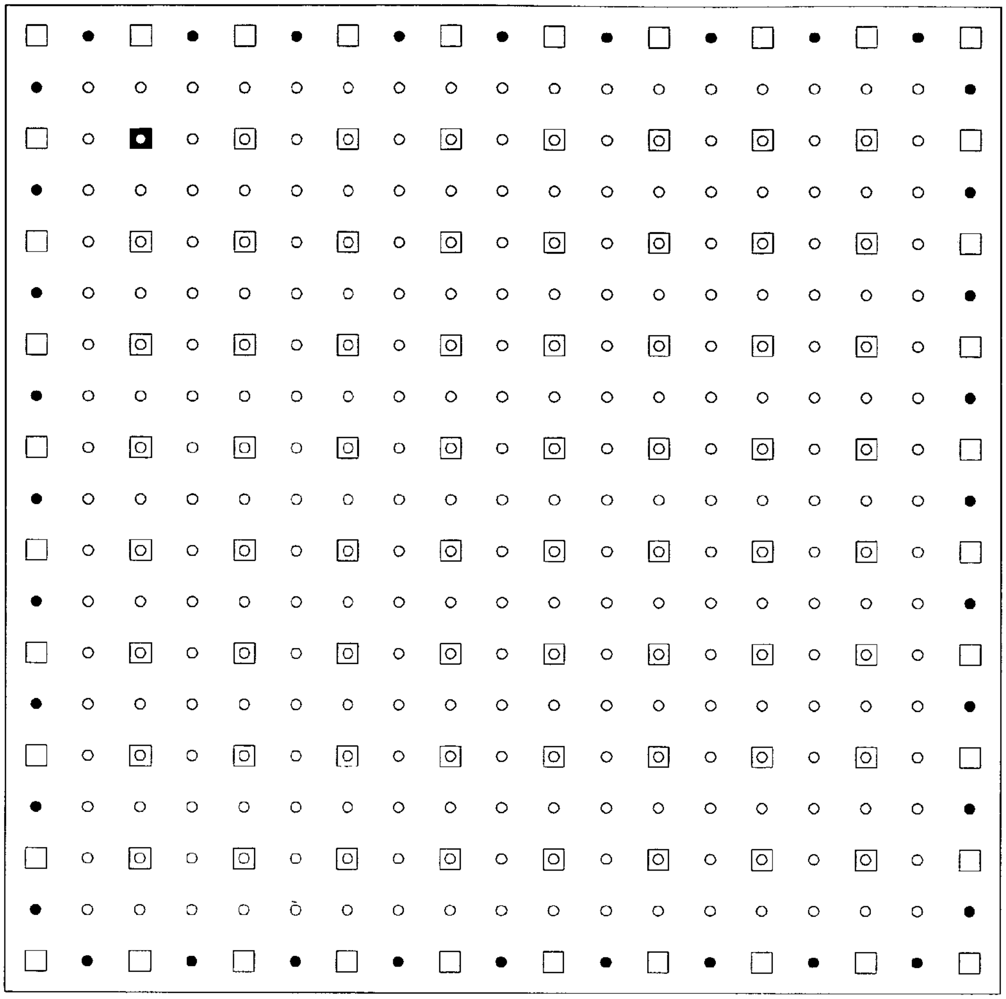
LEGEND:
■ ORIGIN (UPPER-LEFT FULL PEL) FOR 'BEST METRIC' 8 x 8 MACROBLOCK PARTITION
□ FULL PIXEL (10 x 10)
○ HALF PIXEL
● ADDITIONAL HALF PIXELS REQUIRED FOR QUARTER PIXEL INTERPOLATION
FIGURE 27. HALF-PIXEL BILINEAR INTERPOLATION OF 8 x 8 BLOCK

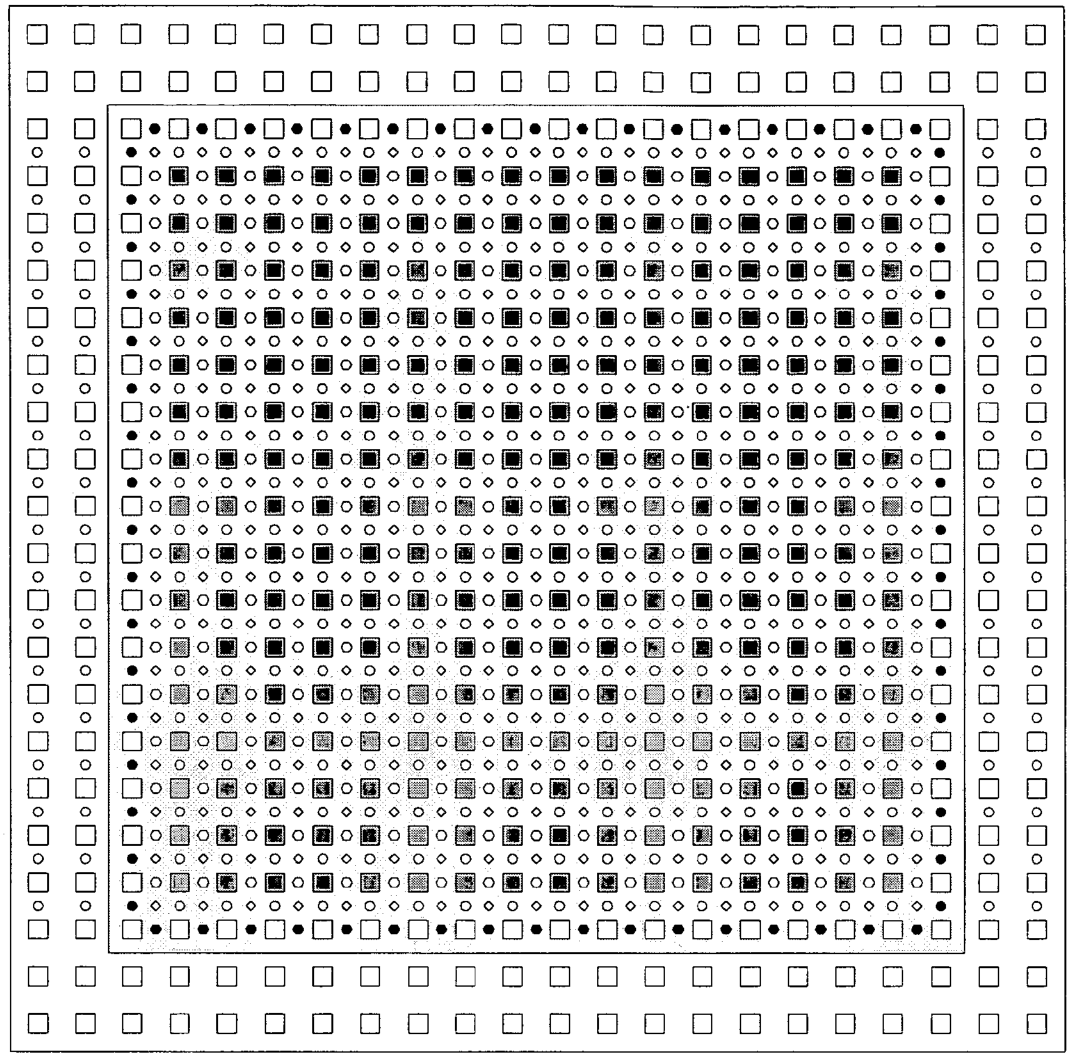

<u>LEGEND:</u>

- 'BEST DISTORTION METRIC' 16 x 16 MACROBLOCK WITHIN 35 x 35 HALF PIXEL ARRAY
- ADDITIONAL FULL PIXEL REQUIRED FOR 6-TAP FILTERS
- HALF PIXELS INTERPOLATED IN VERTICAL DIRECTION
- HALF PIXELS INTERPOLATED IN HORIZONTAL DIRECTION
- HALF PIXELS INTERPOLATED IN HORIZONTAL DIRECTION FROM INTERPOLATED VALUES
- ADDITIONAL HALF PIXEL REQUIRED FOR QUARTER PIXEL INTERPOLATION

FIGURE 28. H.264 6-TAP-FILTER-BASED HALF PIXEL INTERPOLATION

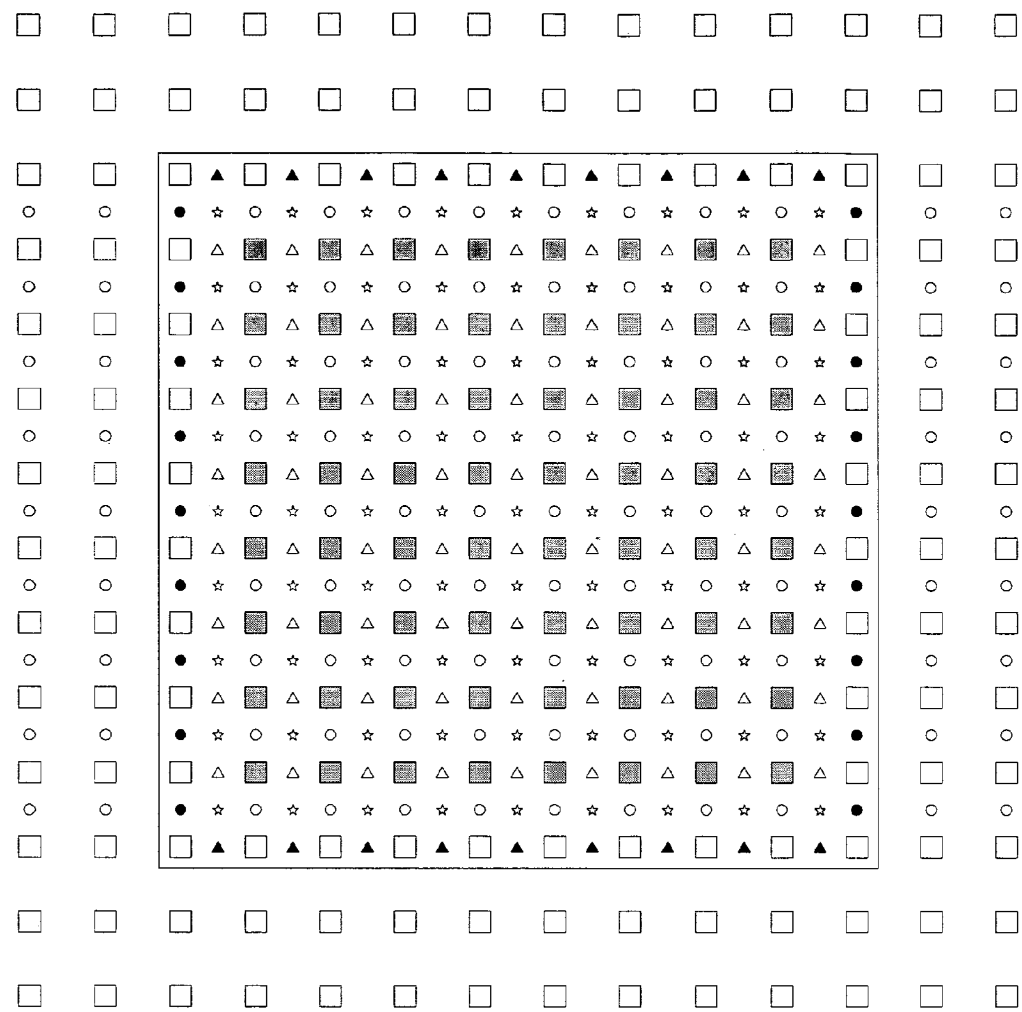

LEGEND:

- 'BEST METRIC' 8 x 8 BLOCK PARTITION WITHIN 19 x 19 HALF PIXEL ARRAY
- ADDITIONAL FULL PIXELS REQUIRED FOR 6-TAP FILTERS
- ○ HALF PIXELS INTERPOLATED IN VERTICAL DIRECTION
- △ HALF PIXELS INTERPOLATED IN HORIZONTAL DIRECTION
- ☆ HALF PIXELS INTERPOLATED IN HORIZONTAL DIRECTION FROM INTERPOLATED VALUES
- ●▲ ADDITIONAL HALF PIXELS REQUIRED FOR QUARTER PIXEL INTERPOLATION

FIGURE 29. H.264 6-TAP-FILTER-BASED INTERPOLATION OF 8 x 8 BLOCK

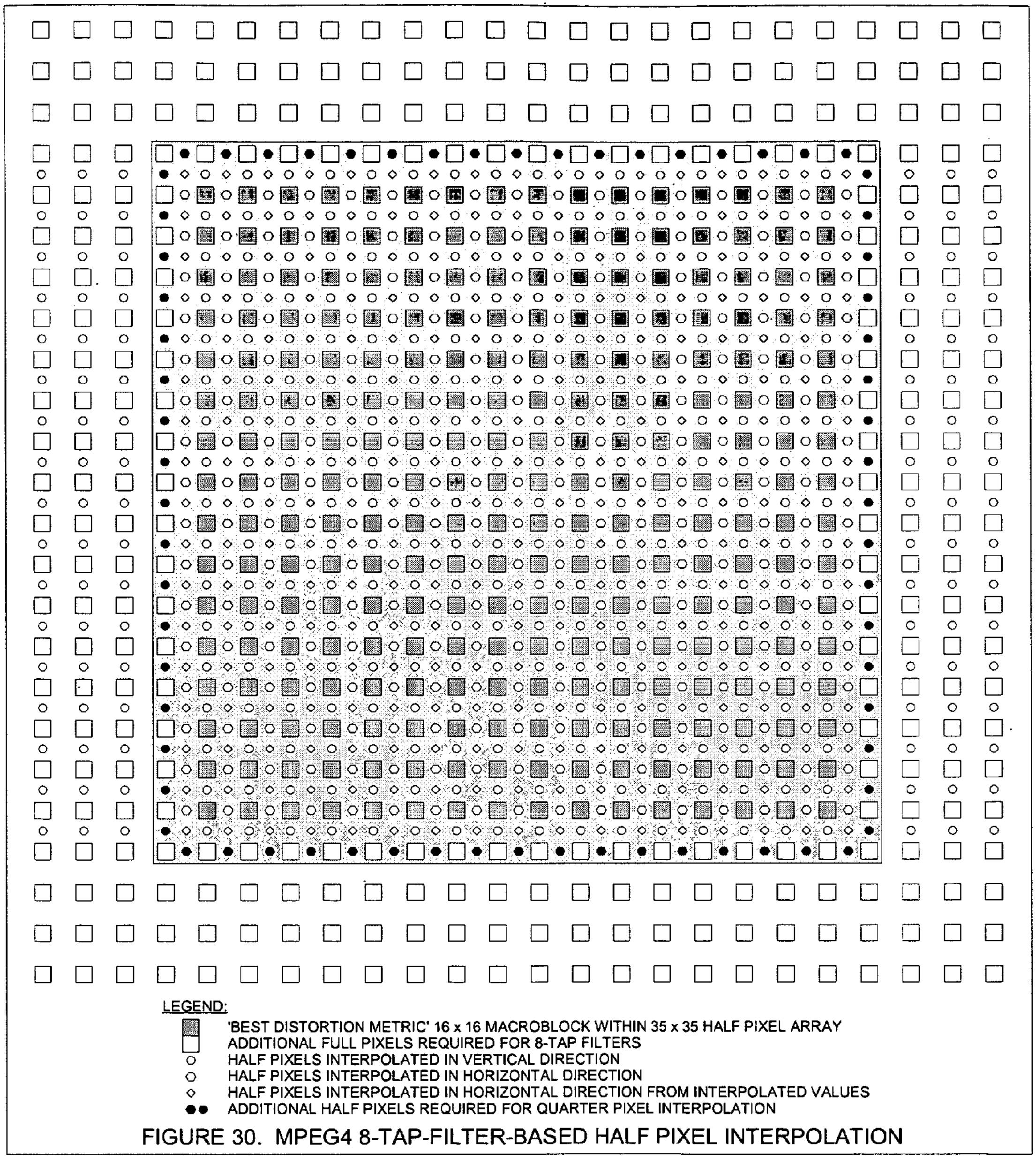
FIGURE 30. MPEG4 8-TAP-FILTER-BASED HALF PIXEL INTERPOLATION

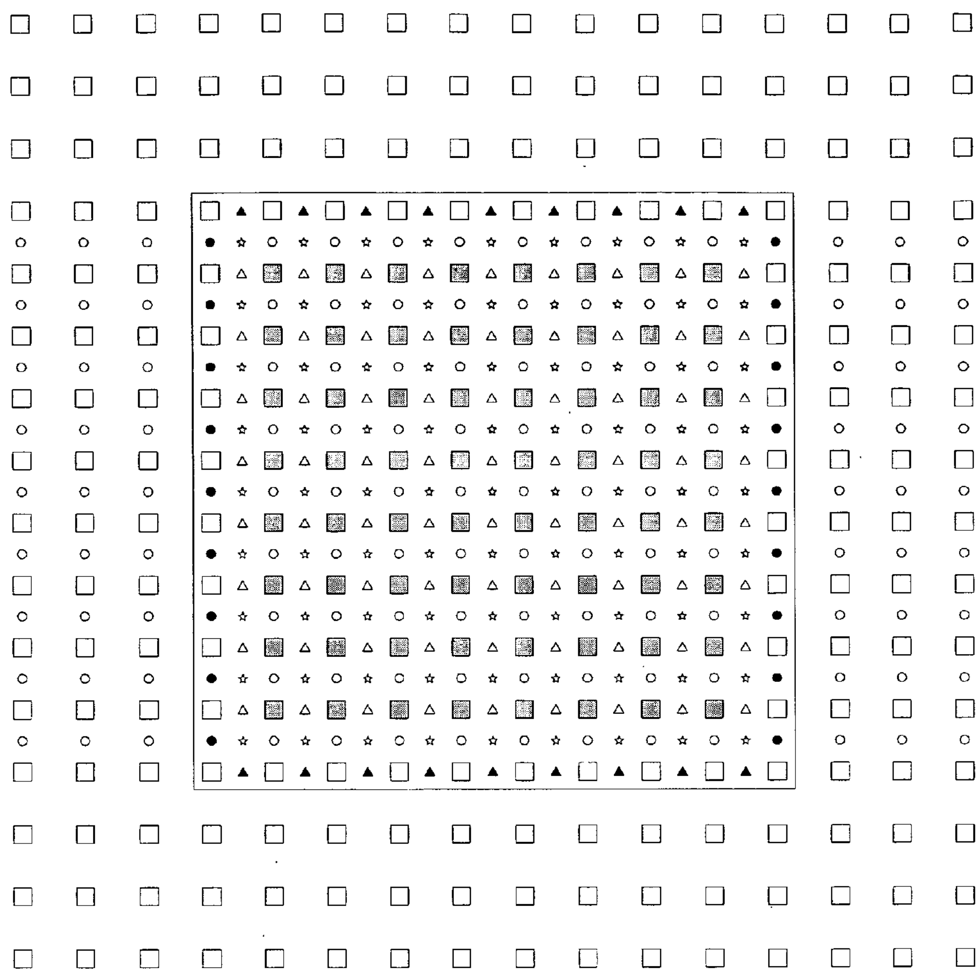

LEGEND:

- 'BEST METRIC' 8 x 8 BLOCK WITHIN 19 x 19 HALF PIXEL ARRAY
- ADDITIONAL FULL PIXELS REQUIRED FOR 8-TAP FILTERS
- ○ HALF PIXELS INTERPOLATED IN VERTICAL DIRECTION
- △ HALF PIXELS INTERPOLATED IN HORIZONTAL DIRECTION
- ☆ HALF PIXELS INTERPOLATED IN HORIZONTAL DIRECTION FROM INTERPOLATED VALUES
- ●▲ ADDITIONAL HALF PIXELS REQUIRED FOR QUARTER PIXEL INTERPOLATION

FIGURE 31. MPEG4 8-TAP-FILTER-BASED INTERPOLATION OF 8 x 8 BLOCK

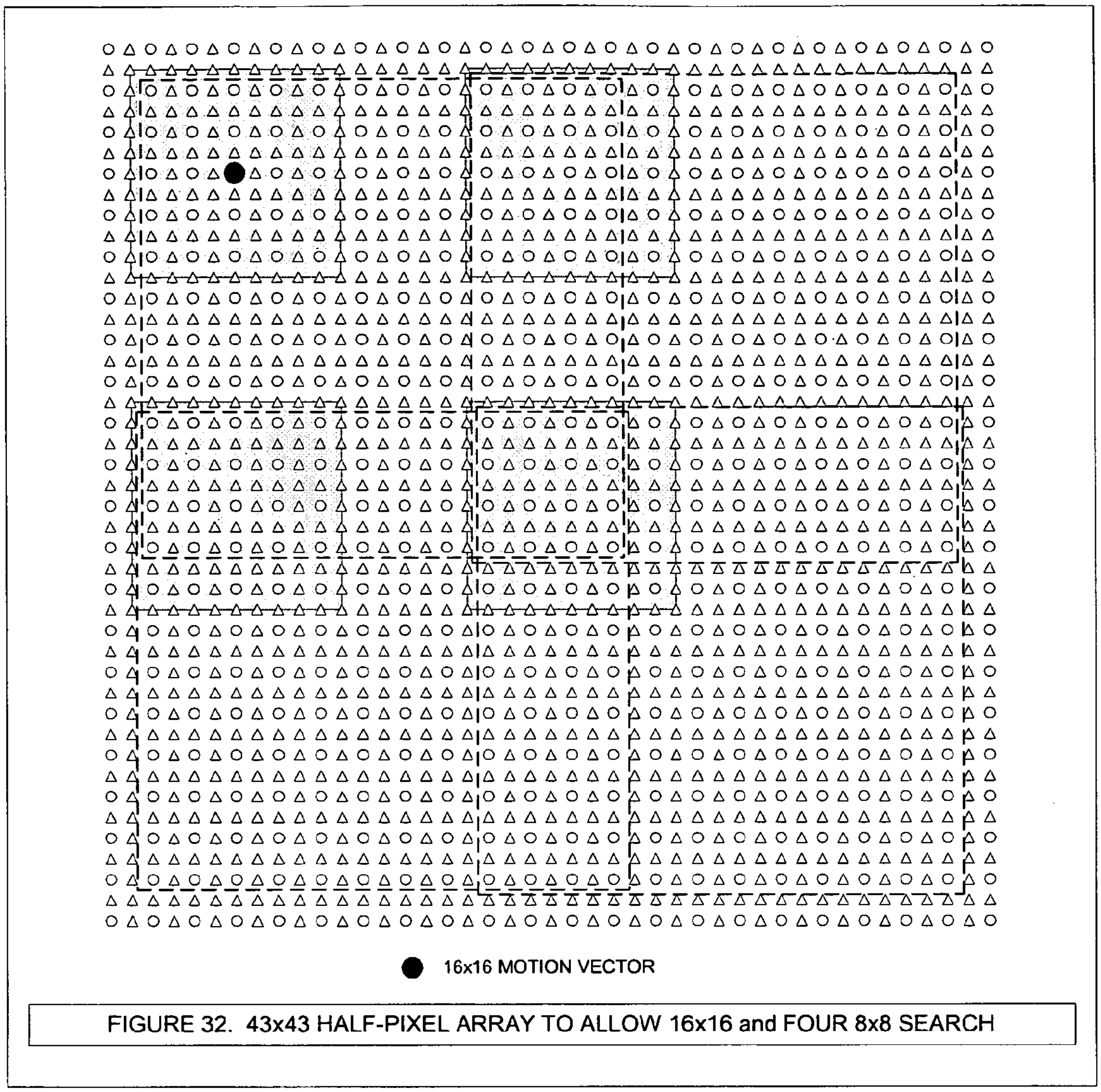
FIGURE 32. 43x43 HALF-PIXEL ARRAY TO ALLOW 16x16 and FOUR 8x8 SEARCH

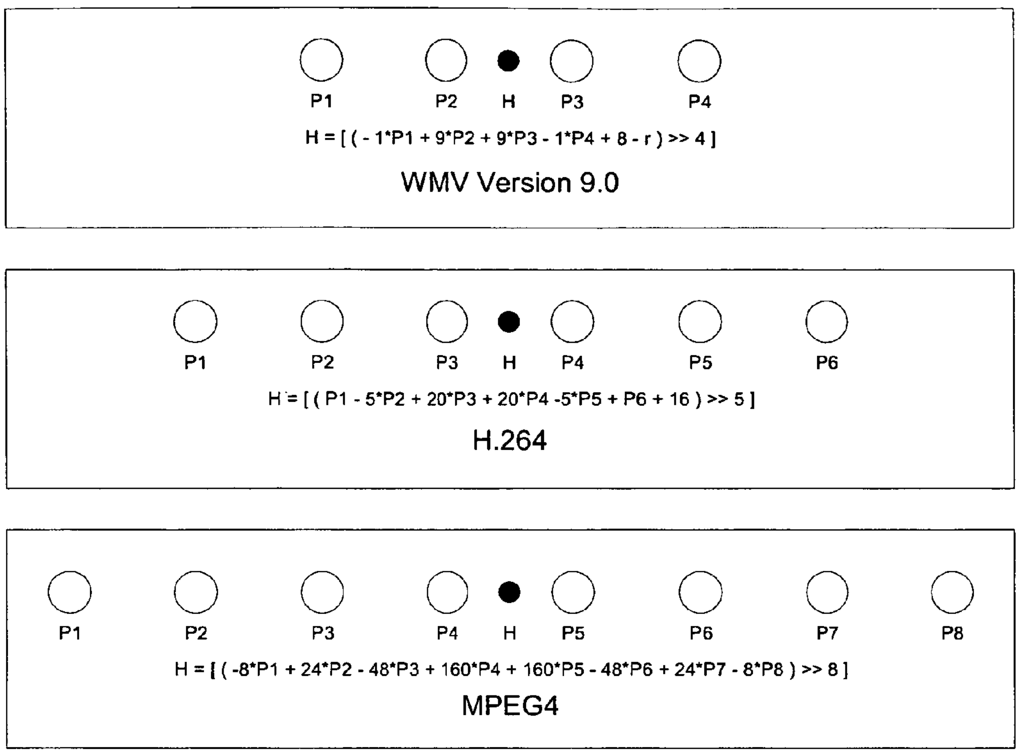
- P1 through P8 represent full pixel positions.
- H represents the half pixel position.
- r depends on R, a frame-level round control value
FIGURE 33. HALF PIXEL INTERPOLATION FIR FILTER SUMMARY

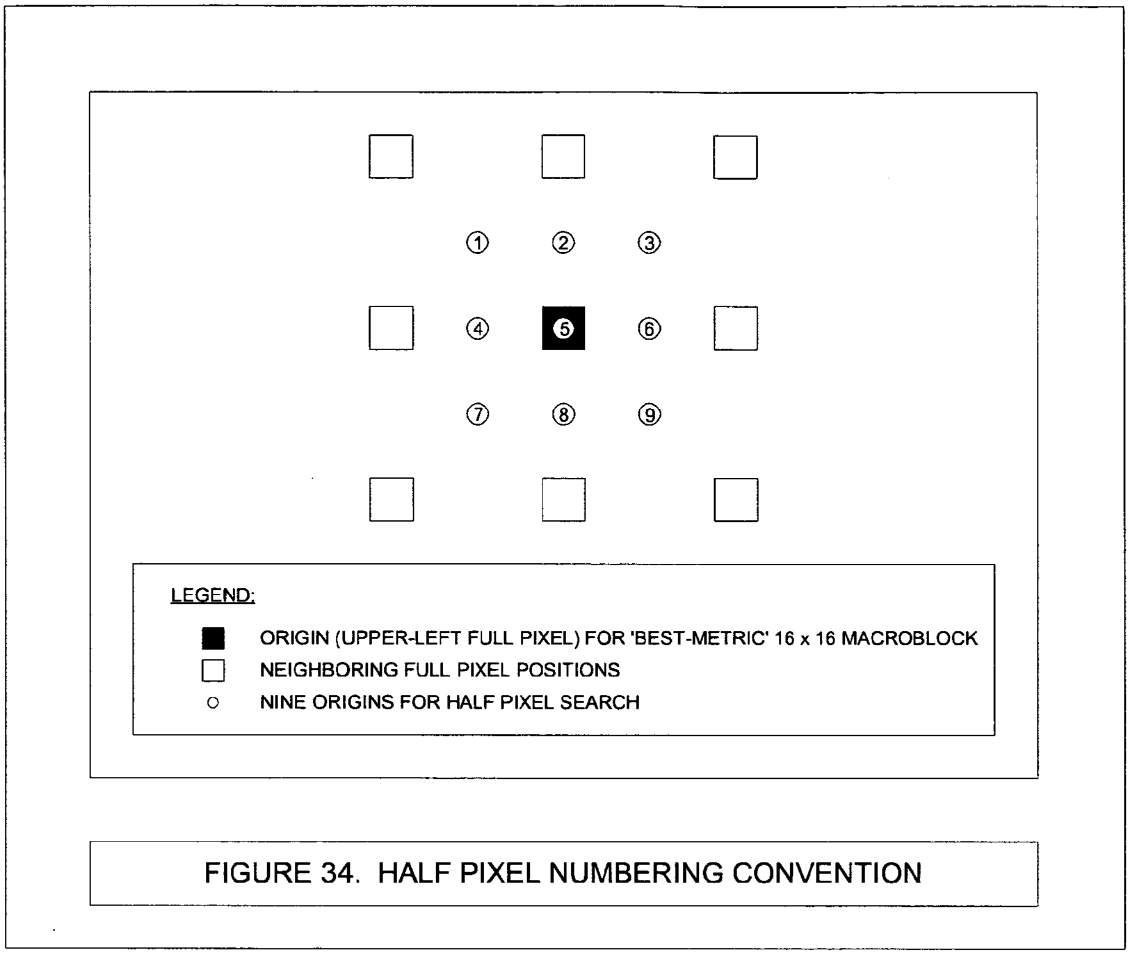
FIGURE 34. HALF PIXEL NUMBERING CONVENTION

MEMORY 4 (b=8,c=9)

| | 31 24 | 23 16 | 15 8 | 7 0 |
|---|---|---|---|---|
| 0xbC8 | H(3) V(0) | H(2) V(0) | H(1) V(0) | H(0) V(0) |
| 0xbC9 | H(7) V(0) | H(6) V(0) | H(5) V(0) | H(4) V(0) |
| 0xbCA | H(11) V(0) | H(10) V(0) | H(9) V(0) | H(8) V(0) |
| 0xbCB | H(15) V(0) | H(14) V(0) | H(13) V(0) | H(12) V(0) |
| 0xbCC | H(19) V(0) | H(18) V(0) | H(17) V(0) | H(16) V(0) |
| 0xbCD | H(23) V(0) | H(22) V(0) | H(21) V(0) | H(20) V(0) |
| 0xbCE | H(27) V(0) | H(26) V(0) | H(25) V(0) | H(24) V(0) |
| 0xbCF | H(31) V(0) | H(30) V(0) | H(29) V(0) | H(28) V(0) |
| 0xbD0 | H(35) V(0) | H(34) V(0) | H(33) V(0) | H(32) V(0) |
| 0xbD1 | H(39) V(0) | H(38) V(0) | H(37) V(0) | H(36) V(0) |
| 0xbD2 | - | H(42) V(0) | H(41) V(0) | H(40) V(0) |
| 0xbD3 | H(3) V(4) | H(2) V(4) | H(1) V(4) | H(0) V(4) |
| 0xbD4 | H(7) V(4) | H(6) V(4) | H(5) V(4) | H(4) V(4) |
| 0xbD5 | H(11) V(4) | H(10) V(4) | H(9) V(4) | H(8) V(4) |
| 0xbD6 | H(15) V(4) | H(14) V(4) | H(13) V(4) | H(12) V(4) |
| 0xbD7 | H(19) V(4) | H(18) V(4) | H(17) V(4) | H(16) V(4) |
| 0xbD8 | H(23) V(4) | H(22) V(4) | H(21) V(4) | H(20) V(4) |
| 0xbD9 | H(27) V(4) | H(26) V(4) | H(25) V(4) | H(24) V(4) |
| 0xbDA | H(31) V(4) | H(30) V(4) | H(29) V(4) | H(28) V(4) |
| 0xbDB | H(35) V(4) | H(34) V(4) | H(33) V(4) | H(32) V(4) |
| 0xbDC | H(39) V(4) | H(38) V(4) | H(37) V(4) | H(36) V(4) |
| 0xbDD | - | H(42) V(4) | H(41) V(4) | H(40) V(4) |
| 0xbDE | H(3) V(8) | H(2) V(8) | H(1) V(8) | H(0) V(8) |
| 0xbDF | | | | |
| 0xc34 | | | | |
| 0xc35 | - | H(42) V(36) | H(41) V(36) | H(40) V(36) |
| 0xc36 | H(3) V(40) | H(2) V(40) | H(1) V(40) | H(0) V(40) |
| 0xc37 | H(7) V(40) | H(6) V(40) | H(5) V(40) | H(4) V(40) |
| 0xc38 | H(11) V(40) | H(10) V(40) | H(9) V(40) | H(8) V(40) |
| 0xc39 | H(15) V(40) | H(14) V(40) | H(13) V(40) | H(12) V(40) |
| 0xc3A | H(19) V(40) | H(18) V(40) | H(17) V(40) | H(16) V(40) |
| 0xc3B | H(23) V(40) | H(22) V(40) | H(21) V(40) | H(20) V(40) |
| 0xc3C | H(27) V(40) | H(26) V(40) | H(25) V(40) | H(24) V(40) |
| 0xc3D | H(31) V(40) | H(30) V(40) | H(29) V(40) | H(28) V(40) |
| 0xc3E | H(35) V(40) | H(34) V(40) | H(33) V(40) | H(32) V(40) |
| 0xc3F | H(39) V(40) | H(38) V(40) | H(37) V(40) | H(36) V(40) |
| 0xc40 | - | H(42) V(40) | H(41) V(40) | H(40) V(40) |

MEMORY 5 (b=A,c=B)

| | 31 24 | 23 16 | 15 8 | 7 0 |
|---|---|---|---|---|
| 0xbC8 | H(3) V(1) | H(2) V(1) | H(1) V(1) | H(0) V(1) |
| 0xbC9 | H(7) V(1) | H(6) V(1) | H(5) V(1) | H(4) V(1) |
| 0xbCA | H(11) V(1) | H(10) V(1) | H(9) V(1) | H(8) V(1) |
| 0xbCB | H(15) V(1) | H(14) V(1) | H(13) V(1) | H(12) V(1) |
| 0xbCC | H(19) V(1) | H(18) V(1) | H(17) V(1) | H(16) V(1) |
| 0xbCD | H(23) V(1) | H(22) V(1) | H(21) V(1) | H(20) V(1) |
| 0xbCE | H(27) V(1) | H(26) V(1) | H(25) V(1) | H(24) V(1) |
| 0xbCF | H(31) V(1) | H(30) V(1) | H(29) V(1) | H(28) V(1) |
| 0xbD0 | H(35) V(1) | H(34) V(1) | H(33) V(1) | H(32) V(1) |
| 0xbD1 | H(39) V(1) | H(38) V(1) | H(37) V(1) | H(36) V(1) |
| 0xbD2 | - | H(42) V(1) | H(41) V(1) | H(40) V(1) |
| 0xbD3 | H(3) V(5) | H(2) V(5) | H(1) V(5) | H(0) V(5) |
| 0xbD4 | H(7) V(5) | H(6) V(5) | H(5) V(5) | H(4) V(5) |
| 0xbD5 | H(11) V(5) | H(10) V(5) | H(9) V(5) | H(8) V(5) |
| 0xbD6 | H(15) V(5) | H(14) V(5) | H(13) V(5) | H(12) V(5) |
| 0xbD7 | H(19) V(5) | H(18) V(5) | H(17) V(5) | H(16) V(5) |
| 0xbD8 | H(23) V(5) | H(22) V(5) | H(21) V(5) | H(20) V(5) |
| 0xbD9 | H(27) V(5) | H(26) V(5) | H(25) V(5) | H(24) V(5) |
| 0xbDA | H(31) V(5) | H(30) V(5) | H(29) V(5) | H(28) V(5) |
| 0xbDB | H(35) V(5) | H(34) V(5) | H(33) V(5) | H(32) V(5) |
| 0xbDC | H(39) V(5) | H(38) V(5) | H(37) V(5) | H(36) V(5) |
| 0xbDD | - | H(42) V(5) | H(41) V(5) | H(40) V(5) |
| 0xbDE | H(3) V(9) | H(2) V(9) | H(1) V(9) | H(0) V(9) |
| 0xbDF | | | | |
| 0xc34 | | | | |
| 0xc35 | - | H(42) V(37) | H(41) V(37) | H(40) V(37) |
| 0xc36 | H(3) V(41) | H(2) V(41) | H(1) V(41) | H(0) V(41) |
| 0xc37 | H(7) V(41) | H(6) V(41) | H(5) V(41) | H(4) V(41) |
| 0xc38 | H(11) V(41) | H(10) V(41) | H(9) V(41) | H(8) V(41) |
| 0xc39 | H(15) V(41) | H(14) V(41) | H(13) V(41) | H(12) V(41) |
| 0xc3A | H(19) V(41) | H(18) V(41) | H(17) V(41) | H(16) V(41) |
| 0xc3B | H(23) V(41) | H(22) V(41) | H(21) V(41) | H(20) V(41) |
| 0xc3C | H(27) V(41) | H(26) V(41) | H(25) V(41) | H(24) V(41) |
| 0xc3D | H(31) V(41) | H(30) V(41) | H(29) V(41) | H(28) V(41) |
| 0xc3E | H(35) V(41) | H(34) V(41) | H(33) V(41) | H(32) V(41) |
| 0xc3F | H(39) V(41) | H(38) V(41) | H(37) V(41) | H(36) V(41) |
| 0xc40 | - | H(42) V(41) | H(41) V(41) | H(40) V(41) |

MEMORY 6 (b=C,c=D)

| | 31 24 | 23 16 | 15 8 | 7 0 |
|---|---|---|---|---|
| 0xbC8 | H(3) V(2) | H(2) V(2) | H(1) V(2) | H(0) V(2) |
| 0xbC9 | H(7) V(2) | H(6) V(2) | H(5) V(2) | H(4) V(2) |
| 0xbCA | H(11) V(2) | H(10) V(2) | H(9) V(2) | H(8) V(2) |
| 0xbCB | H(15) V(2) | H(14) V(2) | H(13) V(2) | H(12) V(2) |
| 0xbCC | H(19) V(2) | H(18) V(2) | H(17) V(2) | H(16) V(2) |
| 0xbCD | H(23) V(2) | H(22) V(2) | H(21) V(2) | H(20) V(2) |
| 0xbCE | H(27) V(2) | H(26) V(2) | H(25) V(2) | H(24) V(2) |
| 0xbCF | H(31) V(2) | H(30) V(2) | H(29) V(2) | H(28) V(2) |
| 0xbD0 | H(35) V(2) | H(34) V(2) | H(33) V(2) | H(32) V(2) |
| 0xbD1 | H(39) V(2) | H(38) V(2) | H(37) V(2) | H(36) V(2) |
| 0xbD2 | - | H(42) V(2) | H(41) V(2) | H(40) V(2) |
| 0xbD3 | H(3) V(6) | H(2) V(6) | H(1) V(6) | H(0) V(6) |
| 0xbD4 | H(7) V(6) | H(6) V(6) | H(5) V(6) | H(4) V(6) |
| 0xbD5 | H(11) V(6) | H(10) V(6) | H(9) V(6) | H(8) V(6) |
| 0xbD6 | H(15) V(6) | H(14) V(6) | H(13) V(6) | H(12) V(6) |
| 0xbD7 | H(19) V(6) | H(18) V(6) | H(17) V(6) | H(16) V(6) |
| 0xbD8 | H(23) V(6) | H(22) V(6) | H(21) V(6) | H(20) V(6) |
| 0xbD9 | H(27) V(6) | H(26) V(6) | H(25) V(6) | H(24) V(6) |
| 0xbDA | H(31) V(6) | H(30) V(6) | H(29) V(6) | H(28) V(6) |
| 0xbDB | H(35) V(6) | H(34) V(6) | H(33) V(6) | H(32) V(6) |
| 0xbDC | H(39) V(6) | H(38) V(6) | H(37) V(6) | H(36) V(6) |
| 0xbDD | - | H(42) V(6) | H(41) V(6) | H(40) V(6) |
| 0xbDE | H(3) V(10) | H(2) V(10) | H(1) V(10) | H(0) V(10) |
| 0xbDF | | | | |
| 0xc34 | | | | |
| 0xc35 | - | H(42) V(38) | H(41) V(38) | H(40) V(38) |
| 0xc36 | H(3) V(42) | H(2) V(42) | H(1) V(42) | H(0) V(42) |
| 0xc37 | H(7) V(42) | H(6) V(42) | H(5) V(42) | H(4) V(42) |
| 0xc38 | H(11) V(42) | H(10) V(42) | H(9) V(42) | H(8) V(42) |
| 0xc39 | H(15) V(42) | H(14) V(42) | H(13) V(42) | H(12) V(42) |
| 0xc3A | H(19) V(42) | H(18) V(42) | H(17) V(42) | H(16) V(42) |
| 0xc3B | H(23) V(42) | H(22) V(42) | H(21) V(42) | H(20) V(42) |
| 0xc3C | H(27) V(42) | H(26) V(42) | H(25) V(42) | H(24) V(42) |
| 0xc3D | H(31) V(42) | H(30) V(42) | H(29) V(42) | H(28) V(42) |
| 0xc3E | H(35) V(42) | H(34) V(42) | H(33) V(42) | H(32) V(42) |
| 0xc3F | H(39) V(42) | H(38) V(42) | H(37) V(42) | H(36) V(42) |
| 0xc40 | - | H(42) V(42) | H(41) V(42) | H(40) V(42) |

MEMORY 7 (b=E,c=F)

| | 31 24 | 23 16 | 15 8 | 7 0 |
|---|---|---|---|---|
| 0xbC8 | H(3) V(3) | H(2) V(3) | H(1) V(3) | H(0) V(3) |
| 0xbC9 | H(7) V(3) | H(6) V(3) | H(5) V(3) | H(4) V(3) |
| 0xbCA | H(11) V(3) | H(10) V(3) | H(9) V(3) | H(8) V(3) |
| 0xbCB | H(15) V(3) | H(14) V(3) | H(13) V(3) | H(12) V(3) |
| 0xbCC | H(19) V(3) | H(18) V(3) | H(17) V(3) | H(16) V(3) |
| 0xbCD | H(23) V(3) | H(22) V(3) | H(21) V(3) | H(20) V(3) |
| 0xbCE | H(27) V(3) | H(26) V(3) | H(25) V(3) | H(24) V(3) |
| 0xbCF | H(31) V(3) | H(30) V(3) | H(29) V(3) | H(28) V(3) |
| 0xbD0 | H(35) V(3) | H(34) V(3) | H(33) V(3) | H(32) V(3) |
| 0xbD1 | H(39) V(3) | H(38) V(3) | H(37) V(3) | H(36) V(3) |
| 0xbD2 | - | H(42) V(3) | H(41) V(3) | H(40) V(3) |
| 0xbD3 | H(3) V(7) | H(2) V(7) | H(1) V(7) | H(0) V(7) |
| 0xbD4 | H(7) V(7) | H(6) V(7) | H(5) V(7) | H(4) V(7) |
| 0xbD5 | H(11) V(7) | H(10) V(7) | H(9) V(7) | H(8) V(7) |
| 0xbD6 | H(15) V(7) | H(14) V(7) | H(13) V(7) | H(12) V(7) |
| 0xbD7 | H(19) V(7) | H(18) V(7) | H(17) V(7) | H(16) V(7) |
| 0xbD8 | H(23) V(7) | H(22) V(7) | H(21) V(7) | H(20) V(7) |
| 0xbD9 | H(27) V(7) | H(26) V(7) | H(25) V(7) | H(24) V(7) |
| 0xbDA | H(31) V(7) | H(30) V(7) | H(29) V(7) | H(28) V(7) |
| 0xbDB | H(35) V(7) | H(34) V(7) | H(33) V(7) | H(32) V(7) |
| 0xbDC | H(39) V(7) | H(38) V(7) | H(37) V(7) | H(36) V(7) |
| 0xbDD | - | H(42) V(7) | H(41) V(7) | H(40) V(7) |
| 0xbDE | H(3) V(11) | H(2) V(11) | H(1) V(11) | H(0) V(11) |
| 0xbDF | | | | |
| 0xc34 | | | | |
| 0xc35 | - | H(42) V(39) | H(41) V(39) | H(40) V(39) |
| 0xc36 | - | - | - | - |
| 0xc37 | - | - | - | - |
| 0xc38 | - | - | - | - |
| 0xc39 | - | - | - | - |
| 0xc3A | - | - | - | - |
| 0xc3B | - | - | - | - |
| 0xc3C | - | - | - | - |
| 0xc3D | - | - | - | - |
| 0xc3E | - | - | - | - |
| 0xc3F | - | - | - | - |
| 0xc40 | - | - | - | - |

FIGURE 35. MEMORY LAYOUT FOR 43x43 HALF PIXEL ARRAY (1MV / 4MV MODE)

MEMORY 4 (b=8,c=9)

| Address | 31–24 | 23–16 | 15–8 | 7–0 |
|---|---|---|---|---|
| 0xbC8 | H(3) V(0) | H(2) V(0) | H(1) V(0) | H(0) V(0) |
| 0xbC9 | H(7) V(0) | H(6) V(0) | H(5) V(0) | H(4) V(0) |
| 0xbCA | H(11) V(0) | H(10) V(0) | H(9) V(0) | H(8) V(0) |
| 0xbCB | H(15) V(0) | H(14) V(0) | H(13) V(0) | H(12) V(0) |
| 0xbCC | H(19) V(0) | H(18) V(0) | H(17) V(0) | H(16) V(0) |
| 0xbCD | H(23) V(0) | H(22) V(0) | H(21) V(0) | H(20) V(0) |
| 0xbCE | H(27) V(0) | H(26) V(0) | H(25) V(0) | H(24) V(0) |
| 0xbCF | H(31) V(0) | H(30) V(0) | H(29) V(0) | H(28) V(0) |
| 0xbD0 | - | H(34) V(0) | H(33) V(0) | H(32) V(0) |
| 0xbD1 | H(3) V(4) | H(2) V(4) | H(1) V(4) | H(0) V(4) |
| 0xbD2 | H(7) V(4) | H(6) V(4) | H(5) V(4) | H(4) V(4) |
| 0xbD3 | H(11) V(4) | H(10) V(4) | H(9) V(4) | H(8) V(4) |
| 0xbD4 | H(15) V(4) | H(14) V(4) | H(13) V(4) | H(12) V(4) |
| 0xbD5 | H(19) V(4) | H(18) V(4) | H(17) V(4) | H(16) V(4) |
| 0xbD6 | H(23) V(4) | H(22) V(4) | H(21) V(4) | H(20) V(4) |
| 0xbD7 | H(27) V(4) | H(26) V(4) | H(25) V(4) | H(24) V(4) |
| 0xbD8 | H(31) V(4) | H(30) V(4) | H(29) V(4) | H(28) V(4) |
| 0xbD9 | - | H(34) V(4) | H(33) V(4) | H(32) V(4) |
| 0xbDA | H(3) V(8) | H(2) V(8) | H(1) V(8) | H(0) V(8) |
| 0xc0F | - | H(34) V(28) | H(33) V(28) | H(32) V(28) |
| 0xc10 | H(3) V(32) | H(2) V(32) | H(1) V(32) | H(0) V(32) |
| 0xc11 | H(7) V(32) | H(6) V(32) | H(5) V(32) | H(4) V(32) |
| 0xc12 | H(11) V(32) | H(10) V(32) | H(9) V(32) | H(8) V(32) |
| 0xc13 | H(15) V(32) | H(14) V(32) | H(13) V(32) | H(12) V(32) |
| 0xc14 | H(19) V(32) | H(18) V(32) | H(17) V(32) | H(16) V(32) |
| 0xc15 | H(23) V(32) | H(22) V(32) | H(21) V(32) | H(20) V(32) |
| 0xc16 | H(27) V(32) | H(26) V(32) | H(25) V(32) | H(24) V(32) |
| 0xc17 | H(31) V(32) | H(30) V(32) | H(29) V(32) | H(28) V(32) |
| 0xc18 | - | H(34) V(32) | H(33) V(32) | H(32) V(32) |
| 0xc19 | - | - | - | - |
| 0xc3E | | | | |
| 0xc3F | - | - | - | - |
| 0xc40 | - | - | - | - |

MEMORY 5 (b=A,c=B)

| Address | 31–24 | 23–16 | 15–8 | 7–0 |
|---|---|---|---|---|
| 0xbC8 | H(3) V(1) | H(2) V(1) | H(1) V(1) | H(0) V(1) |
| 0xbC9 | H(7) V(1) | H(6) V(1) | H(5) V(1) | H(4) V(1) |
| 0xbCA | H(11) V(1) | H(10) V(1) | H(9) V(1) | H(8) V(1) |
| 0xbCB | H(15) V(1) | H(14) V(1) | H(13) V(1) | H(12) V(1) |
| 0xbCC | H(19) V(1) | H(18) V(1) | H(17) V(1) | H(16) V(1) |
| 0xbCD | H(23) V(1) | H(22) V(1) | H(21) V(1) | H(20) V(1) |
| 0xbCE | H(27) V(1) | H(26) V(1) | H(25) V(1) | H(24) V(1) |
| 0xbCF | H(31) V(1) | H(30) V(1) | H(29) V(1) | H(28) V(1) |
| 0xbD0 | - | H(34) V(1) | H(33) V(1) | H(32) V(1) |
| 0xbD1 | H(3) V(5) | H(2) V(5) | H(1) V(5) | H(0) V(5) |
| 0xbD2 | H(7) V(5) | H(6) V(5) | H(5) V(5) | H(4) V(5) |
| 0xbD3 | H(11) V(5) | H(10) V(5) | H(9) V(5) | H(8) V(5) |
| 0xbD4 | H(15) V(5) | H(14) V(5) | H(13) V(5) | H(12) V(5) |
| 0xbD5 | H(19) V(5) | H(18) V(5) | H(17) V(5) | H(16) V(5) |
| 0xbD6 | H(23) V(5) | H(22) V(5) | H(21) V(5) | H(20) V(5) |
| 0xbD7 | H(27) V(5) | H(26) V(5) | H(25) V(5) | H(24) V(5) |
| 0xbD8 | H(31) V(5) | H(30) V(5) | H(29) V(5) | H(28) V(5) |
| 0xbD9 | - | H(34) V(5) | H(33) V(5) | H(32) V(5) |
| 0xbDA | H(3) V(9) | H(2) V(9) | H(1) V(9) | H(0) V(9) |
| 0xc0F | - | H(34) V(29) | H(33) V(29) | H(32) V(29) |
| 0xc10 | H(3) V(33) | H(2) V(33) | H(1) V(33) | H(0) V(33) |
| 0xc11 | H(7) V(33) | H(6) V(33) | H(5) V(33) | H(4) V(33) |
| 0xc12 | H(11) V(33) | H(10) V(33) | H(9) V(33) | H(8) V(33) |
| 0xc13 | H(15) V(33) | H(14) V(33) | H(13) V(33) | H(12) V(33) |
| 0xc14 | H(19) V(33) | H(18) V(33) | H(17) V(33) | H(16) V(33) |
| 0xc15 | H(23) V(33) | H(22) V(33) | H(21) V(33) | H(20) V(33) |
| 0xc16 | H(27) V(33) | H(26) V(33) | H(25) V(33) | H(24) V(33) |
| 0xc17 | H(31) V(33) | H(30) V(33) | H(29) V(33) | H(28) V(33) |
| 0xc18 | - | H(34) V(33) | H(33) V(33) | H(32) V(33) |
| 0xc19 | - | - | - | - |
| 0xc3E | | | | |
| 0xc3F | - | - | - | - |
| 0xc40 | - | - | - | - |

MEMORY 6 (b=C,c=D)

| Address | 31–24 | 23–16 | 15–8 | 7–0 |
|---|---|---|---|---|
| 0xbC8 | H(3) V(2) | H(2) V(2) | H(1) V(2) | H(0) V(2) |
| 0xbC9 | H(7) V(2) | H(6) V(2) | H(5) V(2) | H(4) V(2) |
| 0xbCA | H(11) V(2) | H(10) V(2) | H(9) V(2) | H(8) V(2) |
| 0xbCB | H(15) V(2) | H(14) V(2) | H(13) V(2) | H(12) V(2) |
| 0xbCC | H(19) V(2) | H(18) V(2) | H(17) V(2) | H(16) V(2) |
| 0xbCD | H(23) V(2) | H(22) V(2) | H(21) V(2) | H(20) V(2) |
| 0xbCE | H(27) V(2) | H(26) V(2) | H(25) V(2) | H(24) V(2) |
| 0xbCF | H(31) V(2) | H(30) V(2) | H(29) V(2) | H(28) V(2) |
| 0xbD0 | - | H(34) V(2) | H(33) V(2) | H(32) V(2) |
| 0xbD1 | H(3) V(6) | H(2) V(6) | H(1) V(6) | H(0) V(6) |
| 0xbD2 | H(7) V(6) | H(6) V(6) | H(5) V(6) | H(4) V(6) |
| 0xbD3 | H(11) V(6) | H(10) V(6) | H(9) V(6) | H(8) V(6) |
| 0xbD4 | H(15) V(6) | H(14) V(6) | H(13) V(6) | H(12) V(6) |
| 0xbD5 | H(19) V(6) | H(18) V(6) | H(17) V(6) | H(16) V(6) |
| 0xbD6 | H(23) V(6) | H(22) V(6) | H(21) V(6) | H(20) V(6) |
| 0xbD7 | H(27) V(6) | H(26) V(6) | H(25) V(6) | H(24) V(6) |
| 0xbD8 | H(31) V(6) | H(30) V(6) | H(29) V(6) | H(28) V(6) |
| 0xbD9 | - | H(34) V(6) | H(33) V(6) | H(32) V(6) |
| 0xbDA | H(3) V(10) | H(2) V(10) | H(1) V(10) | H(0) V(10) |
| 0xc0F | - | H(34) V(30) | H(33) V(30) | H(32) V(30) |
| 0xc10 | H(3) V(34) | H(2) V(34) | H(1) V(34) | H(0) V(34) |
| 0xc11 | H(7) V(34) | H(6) V(34) | H(5) V(34) | H(4) V(34) |
| 0xc12 | H(11) V(34) | H(10) V(34) | H(9) V(34) | H(8) V(34) |
| 0xc13 | H(15) V(34) | H(14) V(34) | H(13) V(34) | H(12) V(34) |
| 0xc14 | H(19) V(34) | H(18) V(34) | H(17) V(34) | H(16) V(34) |
| 0xc15 | H(23) V(34) | H(22) V(34) | H(21) V(34) | H(20) V(34) |
| 0xc16 | H(27) V(34) | H(26) V(34) | H(25) V(34) | H(24) V(34) |
| 0xc17 | H(31) V(34) | H(30) V(34) | H(29) V(34) | H(28) V(34) |
| 0xc18 | - | H(34) V(34) | H(33) V(34) | H(32) V(34) |
| 0xc19 | - | - | - | - |
| 0xc3E | | | | |
| 0xc3F | - | - | - | - |
| 0xc40 | - | - | - | - |

MEMORY 7 (b=E,c=F)

| Address | 31–24 | 23–16 | 15–8 | 7–0 |
|---|---|---|---|---|
| 0xbC8 | H(3) V(3) | H(2) V(3) | H(1) V(3) | H(0) V(3) |
| 0xbC9 | H(7) V(3) | H(6) V(3) | H(5) V(3) | H(4) V(3) |
| 0xbCA | H(11) V(3) | H(10) V(3) | H(9) V(3) | H(8) V(3) |
| 0xbCB | H(15) V(3) | H(14) V(3) | H(13) V(3) | H(12) V(3) |
| 0xbCC | H(19) V(3) | H(18) V(3) | H(17) V(3) | H(16) V(3) |
| 0xbCD | H(23) V(3) | H(22) V(3) | H(21) V(3) | H(20) V(3) |
| 0xbCE | H(27) V(3) | H(26) V(3) | H(25) V(3) | H(24) V(3) |
| 0xbCF | H(31) V(3) | H(30) V(3) | H(29) V(3) | H(28) V(3) |
| 0xbD0 | - | H(34) V(3) | H(33) V(3) | H(32) V(3) |
| 0xbD1 | H(3) V(7) | H(2) V(7) | H(1) V(7) | H(0) V(7) |
| 0xbD2 | H(7) V(7) | H(6) V(7) | H(5) V(7) | H(4) V(7) |
| 0xbD3 | H(11) V(7) | H(10) V(7) | H(9) V(7) | H(8) V(7) |
| 0xbD4 | H(15) V(7) | H(14) V(7) | H(13) V(7) | H(12) V(7) |
| 0xbD5 | H(19) V(7) | H(18) V(7) | H(17) V(7) | H(16) V(7) |
| 0xbD6 | H(23) V(7) | H(22) V(7) | H(21) V(7) | H(20) V(7) |
| 0xbD7 | H(27) V(7) | H(26) V(7) | H(25) V(7) | H(24) V(7) |
| 0xbD8 | H(31) V(7) | H(30) V(7) | H(29) V(7) | H(28) V(7) |
| 0xbD9 | - | H(34) V(7) | H(33) V(7) | H(32) V(7) |
| 0xbDA | H(3) V(11) | H(2) V(11) | H(1) V(11) | H(0) V(11) |
| 0xc0F | - | H(34) V(31) | H(33) V(31) | H(32) V(31) |
| 0xc10 | - | - | - | - |
| 0xc11 | - | - | - | - |
| 0xc12 | - | - | - | - |
| 0xc13 | - | - | - | - |
| 0xc14 | - | - | - | - |
| 0xc15 | - | - | - | - |
| 0xc16 | - | - | - | - |
| 0xc17 | - | - | - | - |
| 0xc18 | - | - | - | - |
| 0xc19 | - | - | - | - |
| 0xc3E | | | | |
| 0xc3F | - | - | - | - |
| 0xc40 | - | - | - | - |

FIGURE 36. MEMORY LAYOUT FOR 35x35 HALF PIXEL ARRAY FROM 16x16 MACROBLOCK

| BUFFER 1 / 2 / 3 / 4 | MEMORY 4 (b=8,c=9) | | | | MEMORY 5 (b=A,c=B) | | | | MEMORY 6 (b=C,c=D) | | | | MEMORY 7 (b=E,c=F) | | | |
|---|---|---|---|---|---|---|---|---|---|---|---|---|---|---|---|---|
| | 31 24 | 23 16 | 15 8 | 7 0 | 31 24 | 23 16 | 15 8 | 7 0 | 31 24 | 23 16 | 15 8 | 7 0 | 31 24 | 23 16 | 15 8 | 7 0 |
| 0xbC8 / 0xbE4 / 0xc00 / 0xc1C | H(3) V(0) | H(2) V(0) | H(1) V(0) | H(0) V(0) | H(3) V(1) | H(2) V(1) | H(1) V(1) | H(0) V(1) | H(3) V(2) | H(2) V(2) | H(1) V(2) | H(0) V(2) | H(3) V(3) | H(2) V(3) | H(1) V(3) | H(0) V(3) |
| 0xbC9 / 0xbE5 / 0xc01 / 0xc1D | H(7) V(0) | H(6) V(0) | H(5) V(0) | H(4) V(0) | H(7) V(1) | H(6) V(1) | H(5) V(1) | H(4) V(1) | H(7) V(2) | H(6) V(2) | H(5) V(2) | H(4) V(2) | H(7) V(3) | H(6) V(3) | H(5) V(3) | H(4) V(3) |
| 0xbCA / 0xbE6 / 0xc02 / 0xc1E | H(11) V(0) | H(10) V(0) | H(9) V(0) | H(8) V(0) | H(11) V(1) | H(10) V(1) | H(9) V(1) | H(8) V(1) | H(11) V(2) | H(10) V(2) | H(9) V(2) | H(8) V(2) | H(11) V(3) | H(10) V(3) | H(9) V(3) | H(8) V(3) |
| 0xbCB / 0xbE7 / 0xc03 / 0xc1F | H(15) V(0) | H(14) V(0) | H(13) V(0) | H(12) V(0) | H(15) V(1) | H(14) V(1) | H(13) V(1) | H(12) V(1) | H(15) V(2) | H(14) V(2) | H(13) V(2) | H(12) V(2) | H(15) V(3) | H(14) V(3) | H(13) V(3) | H(12) V(3) |
| 0xbCC / 0xbE8 / 0xc04 / 0xc20 | - | H(18) V(0) | H(17) V(0) | H(16) V(0) | - | H(18) V(1) | H(17) V(1) | H(16) V(1) | - | H(18) V(2) | H(17) V(2) | H(16) V(2) | | H(18) V(3) | H(17) V(3) | H(16) V(3) |
| 0xbCD / 0xbE9 / 0xc05 / 0xc21 | H(3) V(4) | H(2) V(4) | H(1) V(4) | H(0) V(4) | H(3) V(5) | H(2) V(5) | H(1) V(5) | H(0) V(5) | H(3) V(6) | H(2) V(6) | H(1) V(6) | H(0) V(6) | H(3) V(7) | H(2) V(7) | H(1) V(7) | H(0) V(7) |
| 0xbCE / 0xbEA / 0xc06 / 0xc22 | H(7) V(4) | H(6) V(4) | H(5) V(4) | H(4) V(4) | H(7) V(5) | H(6) V(5) | H(5) V(5) | H(4) V(5) | H(7) V(6) | H(6) V(6) | H(5) V(6) | H(4) V(6) | H(7) V(7) | H(6) V(7) | H(5) V(7) | H(4) V(7) |
| 0xbCF / 0xbEB / 0xc07 / 0xc23 | H(11) V(4) | H(10) V(4) | H(9) V(4) | H(8) V(4) | H(11) V(5) | H(10) V(5) | H(9) V(5) | H(8) V(5) | H(11) V(6) | H(10) V(6) | H(9) V(6) | H(8) V(6) | H(11) V(7) | H(10) V(7) | H(9) V(7) | H(8) V(7) |
| 0xbD0 / 0xbEC / 0xc08 / 0xc24 | H(15) V(4) | H(14) V(4) | H(13) V(4) | H(12) V(4) | H(15) V(5) | H(14) V(5) | H(13) V(5) | H(12) V(5) | H(15) V(6) | H(14) V(6) | H(13) V(6) | H(12) V(6) | H(15) V(7) | H(14) V(7) | H(13) V(7) | H(12) V(7) |
| 0xbD1 / 0xbED / 0xc09 / 0xc25 | - | H(18) V(4) | H(17) V(4) | H(16) V(4) | - | H(18) V(5) | H(17) V(5) | H(16) V(5) | - | H(18) V(6) | H(17) V(6) | H(16) V(6) | - | H(18) V(7) | H(17) V(7) | H(16) V(7) |
| 0xbD2 / 0xbEE / 0xc0A / 0xc26 | H(3) V(8) | H(2) V(8) | H(1) V(8) | H(0) V(8) | H(3) V(9) | H(2) V(9) | H(1) V(9) | H(0) V(9) | H(3) V(10) | H(2) V(10) | H(1) V(10) | H(0) V(10) | H(3) V(11) | H(2) V(11) | H(1) V(11) | H(0) V(11) |
| 0xbD3 / 0xbEF / 0xc0B / 0xc27 | H(7) V(8) | H(6) V(8) | H(5) V(8) | H(4) V(8) | H(7) V(9) | H(6) V(9) | H(5) V(9) | H(4) V(9) | H(7) V(10) | H(6) V(10) | H(5) V(10) | H(4) V(10) | H(7) V(11) | H(6) V(11) | H(5) V(11) | H(4) V(11) |
| 0xbD4 / 0xbF0 / 0xc0C / 0xc28 | H(11) V(8) | H(10) V(8) | H(9) V(8) | H(8) V(8) | H(11) V(9) | H(10) V(9) | H(9) V(9) | H(8) V(9) | H(11) V(10) | H(10) V(10) | H(9) V(10) | H(8) V(10) | H(11) V(11) | H(10) V(11) | H(9) V(11) | H(8) V(11) |
| 0xbD5 / 0xbF1 / 0xc0D / 0xc29 | H(15) V(8) | H(14) V(8) | H(13) V(8) | H(12) V(8) | H(15) V(9) | H(14) V(9) | H(13) V(9) | H(12) V(9) | H(15) V(10) | H(14) V(10) | H(13) V(10) | H(12) V(10) | H(15) V(11) | H(14) V(11) | H(13) V(11) | H(12) V(11) |
| 0xbD6 / 0xbF2 / 0xc0E / 0xc2A | - | H(18) V(8) | H(17) V(8) | H(16) V(8) | - | H(18) V(9) | H(17) V(9) | H(16) V(9) | - | H(18) V(10) | H(17) V(10) | H(16) V(10) | - | H(18) V(11) | H(17) V(11) | H(16) V(11) |
| 0xbD7 / 0xbF3 / 0xc0F / 0xc2B | H(3) V(12) | H(2) V(12) | H(1) V(12) | H(0) V(12) | H(3) V(13) | H(2) V(13) | H(1) V(13) | H(0) V(13) | H(3) V(14) | H(2) V(14) | H(1) V(14) | H(0) V(14) | H(3) V(15) | H(2) V(15) | H(1) V(15) | H(0) V(15) |
| 0xbD8 / 0xbF4 / 0xc10 / 0xc2C | H(7) V(12) | H(6) V(12) | H(5) V(12) | H(4) V(12) | H(7) V(13) | H(6) V(13) | H(5) V(13) | H(4) V(13) | H(7) V(14) | H(6) V(14) | H(5) V(14) | H(4) V(14) | H(7) V(15) | H(6) V(15) | H(5) V(15) | H(4) V(15) |
| 0xbD9 / 0xbF5 / 0xc11 / 0xc2D | H(11) V(12) | H(10) V(12) | H(9) V(12) | H(8) V(12) | H(11) V(13) | H(10) V(13) | H(9) V(13) | H(8) V(13) | H(11) V(14) | H(10) V(14) | H(9) V(14) | H(8) V(14) | H(11) V(15) | H(10) V(15) | H(9) V(15) | H(8) V(15) |
| 0xbDA / 0xbF6 / 0xc12 / 0xc2E | H(15) V(12) | H(14) V(12) | H(13) V(12) | H(12) V(12) | H(15) V(13) | H(14) V(13) | H(13) V(13) | H(12) V(13) | H(15) V(14) | H(14) V(14) | H(13) V(14) | H(12) V(14) | H(15) V(15) | H(14) V(15) | H(13) V(15) | H(12) V(15) |
| 0xbDB / 0xbF7 / 0xc13 / 0xc2F | - | H(18) V(12) | H(17) V(12) | H(16) V(12) | - | H(18) V(13) | H(17) V(13) | H(16) V(13) | - | H(18) V(14) | H(17) V(14) | H(16) V(14) | - | H(18) V(15) | H(17) V(15) | H(16) V(15) |
| 0xbDC / 0xbF8 / 0xc14 / 0xc30 | H(3) V(16) | H(2) V(16) | H(1) V(16) | H(0) V(16) | H(3) V(17) | H(2) V(17) | H(1) V(17) | H(0) V(17) | H(3) V(18) | H(2) V(18) | H(1) V(18) | H(0) V(18) | - | - | - | - |
| 0xbDD / 0xbF9 / 0xc15 / 0xc31 | H(7) V(16) | H(6) V(16) | H(5) V(16) | H(4) V(16) | H(7) V(17) | H(6) V(17) | H(5) V(17) | H(4) V(17) | H(7) V(18) | H(6) V(18) | H(5) V(18) | H(4) V(18) | - | - | - | - |
| 0xbDE / 0xbFA / 0xc16 / 0xc32 | H(11) V(16) | H(10) V(16) | H(9) V(16) | H(8) V(16) | H(11) V(17) | H(10) V(17) | H(9) V(17) | H(8) V(17) | H(11) V(18) | H(10) V(18) | H(9) V(18) | H(8) V(18) | - | - | - | - |
| 0xbDF / 0xbFB / 0xc17 / 0xc33 | H(15) V(16) | H(14) V(16) | H(13) V(16) | H(12) V(16) | H(15) V(17) | H(14) V(17) | H(13) V(17) | H(12) V(17) | H(15) V(18) | H(14) V(18) | H(13) V(18) | H(12) V(18) | - | - | - | - |
| 0xbE0 / 0xbFC / 0xc18 / 0xc34 | - | H(18) V(16) | H(17) V(16) | H(16) V(16) | - | H(18) V(17) | H(17) V(17) | H(16) V(17) | - | H(18) V(18) | H(17) V(18) | H(16) V(18) | - | - | - | - |

FIGURE 37. MEMORY LAYOUT FOR 19x19 HALF PIXEL ARRAY FROM 8x8 BLOCK

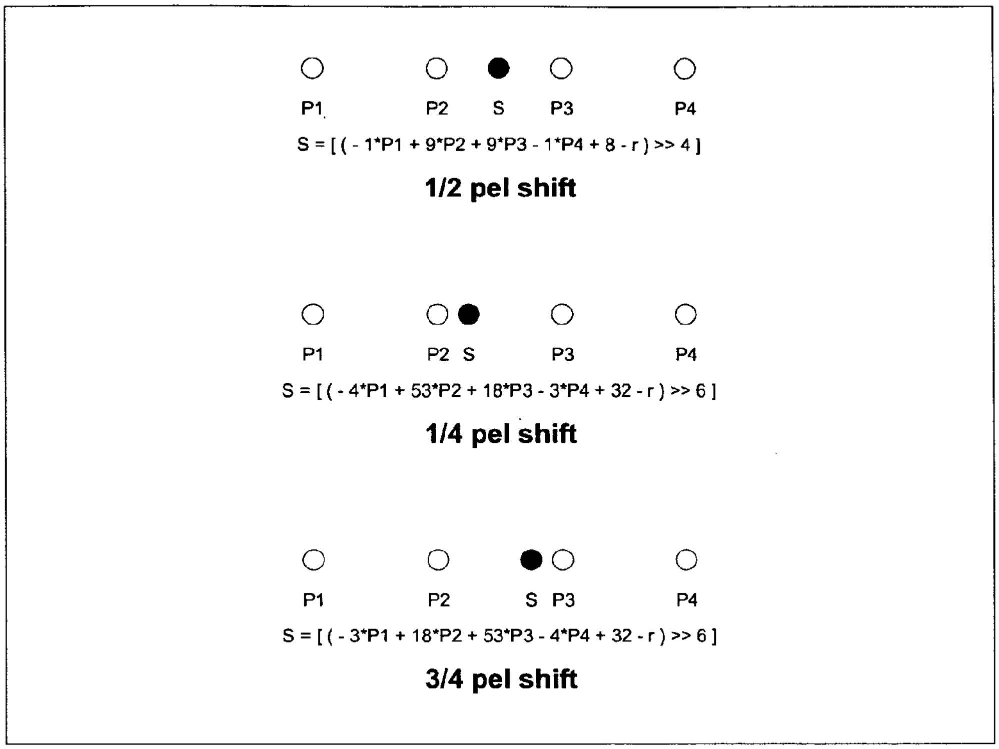
- P1 through P4 represent full pixel positions.
- S represents the sub-pixel positions.
- r depends on R, a frame-level round control value (See Windows Media Video V9 Decoding Specification, revision 87, section 4.4.7, page 109)
FIGURE 38. WMV SUB-PIXEL INTERPOLATION FIR FILTER SUMMARY

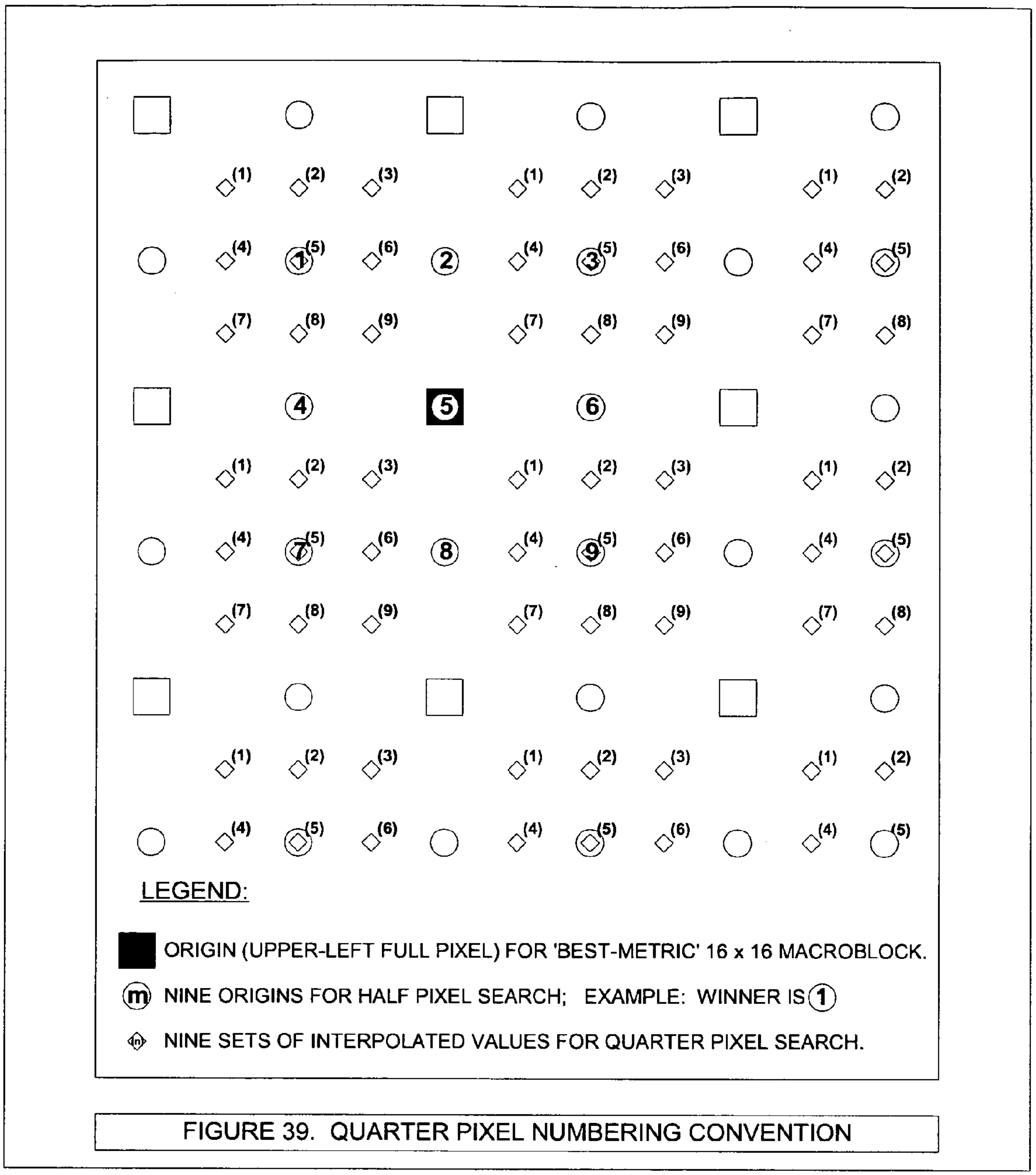
FIGURE 39. QUARTER PIXEL NUMBERING CONVENTION

| Address | MEMORY 4 (b=8)<br>31 24 23 16 15 8 7 0 | MEMORY 5 (b=A)<br>31 24 23 16 15 8 7 0 | MEMORY 6 (b=C)<br>31 24 23 16 15 8 7 0 | MEMORY 7 (b=E)<br>31 24 23 16 15 8 7 0 |
|---|---|---|---|---|
| 0xb00 | ROW(0), COLUMN(0)<br>P-4 P-3 P-2 P-1 | ROW(0), COLUMN(1)<br>P-4 P-3 P-2 P-1 | ROW(0), COLUMN(2)<br>P-4 P-3 P-2 P-1 | ROW(0), COLUMN(3)<br>P-4 P-3 P-2 P-1 |
| 0xb01 | ROW(0), COLUMN(0)<br>P-9 P-8 P-7 P-6 | ROW(0), COLUMN(1)<br>P-9 P-8 P-7 P-6 | ROW(0), COLUMN(2)<br>P-9 P-8 P-7 P-6 | ROW(0), COLUMN(3)<br>P-9 P-8 P-7 P-6 |
| 0xb02 | ROW(0), COLUMN(4)<br>P-4 P-3 P-2 P-1 | ROW(0), COLUMN(5)<br>P-4 P-3 P-2 P-1 | ROW(0), COLUMN(6)<br>P-4 P-3 P-2 P-1 | ROW(0), COLUMN(7)<br>P-4 P-3 P-2 P-1 |
| 0xb03 | ROW(0), COLUMN(4)<br>P-9 P-8 P-7 P-6 | ROW(0), COLUMN(5)<br>P-9 P-8 P-7 P-6 | ROW(0), COLUMN(6)<br>P-9 P-8 P-7 P-6 | ROW(0), COLUMN(7)<br>P-9 P-8 P-7 P-6 |
| 0xb04 | ROW(0), COLUMN(8)<br>P-4 P-3 P-2 P-1 | ROW(0), COLUMN(9)<br>P-4 P-3 P-2 P-1 | ROW(0), COLUMN(10)<br>P-4 P-3 P-2 P-1 | ROW(0), COLUMN(11)<br>P-4 P-3 P-2 P-1 |
| 0xb05 | ROW(0), COLUMN(8)<br>P-9 P-8 P-7 P-6 | ROW(0), COLUMN(9)<br>P-9 P-8 P-7 P-6 | ROW(0), COLUMN(10)<br>P-9 P-8 P-7 P-6 | ROW(0), COLUMN(11)<br>P-9 P-8 P-7 P-6 |
| 0xb06 | ROW(0), COLUMN(12)<br>P-4 P-3 P-2 P-1 | ROW(0), COLUMN(13)<br>P-4 P-3 P-2 P-1 | ROW(0), COLUMN(14)<br>P-4 P-3 P-2 P-1 | ROW(0), COLUMN(15)<br>P-4 P-3 P-2 P-1 |
| 0xb07 | ROW(0), COLUMN(12)<br>P-9 P-8 P-7 P-6 | ROW(0), COLUMN(13)<br>P-9 P-8 P-7 P-6 | ROW(0), COLUMN(14)<br>P-9 P-8 P-7 P-6 | ROW(0), COLUMN(15)<br>P-9 P-8 P-7 P-6 |
| 0xb08 | ROW(1), COLUMN(0)<br>P-4 P-3 P-2 P-1 | ROW(1), COLUMN(1)<br>P-4 P-3 P-2 P-1 | ROW(1), COLUMN(2)<br>P-4 P-3 P-2 P-1 | ROW(1), COLUMN(3)<br>P-4 P-3 P-2 P-1 |
| 0xb09 | ROW(1), COLUMN(0)<br>P-9 P-8 P-7 P-6 | ROW(1), COLUMN(1)<br>P-9 P-8 P-7 P-6 | ROW(1), COLUMN(2)<br>P-9 P-8 P-7 P-6 | ROW(1), COLUMN(3)<br>P-9 P-8 P-7 P-6 |
| 0xb0A | ROW(1), COLUMN(4)<br>P-4 P-3 P-2 P-1 | ROW(1), COLUMN(5)<br>P-4 P-3 P-2 P-1 | ROW(1), COLUMN(6)<br>P-4 P-3 P-2 P-1 | ROW(1), COLUMN(7)<br>P-4 P-3 P-2 P-1 |
| 0xb0B | ROW(1), COLUMN(4)<br>P-9 P-8 P-7 P-6 | ROW(1), COLUMN(5)<br>P-9 P-8 P-7 P-6 | ROW(1), COLUMN(6)<br>P-9 P-8 P-7 P-6 | ROW(1), COLUMN(7)<br>P-9 P-8 P-7 P-6 |
| 0xb0C | ROW(1), COLUMN(8)<br>P-4 P-3 P-2 P-1 | ROW(1), COLUMN(9)<br>P-4 P-3 P-2 P-1 | ROW(1), COLUMN(10)<br>P-4 P-3 P-2 P-1 | ROW(1), COLUMN(11)<br>P-4 P-3 P-2 P-1 |
| 0xb0D | ROW(1), COLUMN(8)<br>P-9 P-8 P-7 P-6 | ROW(1), COLUMN(9)<br>P-9 P-8 P-7 P-6 | ROW(1), COLUMN(10)<br>P-9 P-8 P-7 P-6 | ROW(1), COLUMN(11)<br>P-9 P-8 P-7 P-6 |
| 0xb0E | ROW(1), COLUMN(12)<br>P-4 P-3 P-2 P-1 | ROW(1), COLUMN(13)<br>P-4 P-3 P-2 P-1 | ROW(1), COLUMN(14)<br>P-4 P-3 P-2 P-1 | ROW(1), COLUMN(15)<br>P-4 P-3 P-2 P-1 |
| 0xb0F | ROW(1), COLUMN(12)<br>P-9 P-8 P-7 P-6 | ROW(1), COLUMN(13)<br>P-9 P-8 P-7 P-6 | ROW(1), COLUMN(14)<br>P-9 P-8 P-7 P-6 | ROW(1), COLUMN(15)<br>P-9 P-8 P-7 P-6 |
| 0xb10 | ROW(2), COLUMN(0)<br>P-4 P-3 P-2 P-1 | ROW(2), COLUMN(1)<br>P-4 P-3 P-2 P-1 | ROW(2), COLUMN(2)<br>P-4 P-3 P-2 P-1 | ROW(2), COLUMN(3)<br>P-4 P-3 P-2 P-1 |
| 0xb11 | ROW(2), COLUMN(0)<br>P-9 P-8 P-7 P-6 | ROW(2), COLUMN(1)<br>P-9 P-8 P-7 P-6 | ROW(2), COLUMN(2)<br>P-9 P-8 P-7 P-6 | ROW(2), COLUMN(3)<br>P-9 P-8 P-7 P-6 |
| ≈ | ≈ | ≈ | ≈ | ≈ |
| 0xb6E | ROW(13), COLUMN(12)<br>P-4 P-3 P-2 P-1 | ROW(13), COLUMN(13)<br>P-4 P-3 P-2 P-1 | ROW(13), COLUMN(14)<br>P-4 P-3 P-2 P-1 | ROW(13), COLUMN(15)<br>P-4 P-3 P-2 P-1 |
| 0xb6F | ROW(13), COLUMN(12)<br>P-9 P-8 P-7 P-6 | ROW(13), COLUMN(13)<br>P-9 P-8 P-7 P-6 | ROW(13), COLUMN(14)<br>P-9 P-8 P-7 P-6 | ROW(13), COLUMN(15)<br>P-9 P-8 P-7 P-6 |
| 0xb70 | ROW(14), COLUMN(0)<br>P-4 P-3 P-2 P-1 | ROW(14), COLUMN(1)<br>P-4 P-3 P-2 P-1 | ROW(14), COLUMN(2)<br>P-4 P-3 P-2 P-1 | ROW(14), COLUMN(3)<br>P-4 P-3 P-2 P-1 |
| 0xb71 | ROW(14), COLUMN(0)<br>P-9 P-8 P-7 P-6 | ROW(14), COLUMN(1)<br>P-9 P-8 P-7 P-6 | ROW(14), COLUMN(2)<br>P-9 P-8 P-7 P-6 | ROW(14), COLUMN(3)<br>P-9 P-8 P-7 P-6 |
| 0xb72 | ROW(14), COLUMN(4)<br>P-4 P-3 P-2 P-1 | ROW(14), COLUMN(5)<br>P-4 P-3 P-2 P-1 | ROW(14), COLUMN(6)<br>P-4 P-3 P-2 P-1 | ROW(14), COLUMN(7)<br>P-4 P-3 P-2 P-1 |
| 0xb73 | ROW(14), COLUMN(4)<br>P-9 P-8 P-7 P-6 | ROW(14), COLUMN(5)<br>P-9 P-8 P-7 P-6 | ROW(14), COLUMN(6)<br>P-9 P-8 P-7 P-6 | ROW(14, COLUMN(7)<br>P-9 P-8 P-7 P-6 |
| 0xb74 | ROW(14), COLUMN(8)<br>P-4 P-3 P-2 P-1 | ROW(14), COLUMN(9)<br>P-4 P-3 P-2 P-1 | ROW(14), COLUMN(10)<br>P-4 P-3 P-2 P-1 | ROW(14), COLUMN(11)<br>P-4 P-3 P-2 P-1 |
| 0xb75 | ROW(14), COLUMN(8)<br>P-9 P-8 P-7 P-6 | ROW(14), COLUMN(9)<br>P-9 P-8 P-7 P-6 | ROW(14), COLUMN(10)<br>P-9 P-8 P-7 P-6 | ROW(14, COLUMN(11)<br>P-9 P-8 P-7 P-6 |
| 0xb76 | ROW(14), COLUMN(12)<br>P-4 P-3 P-2 P-1 | ROW(14), COLUMN(13)<br>P-4 P-3 P-2 P-1 | ROW(14), COLUMN(14)<br>P-4 P-3 P-2 P-1 | ROW(14), COLUMN(15)<br>P-4 P-3 P-2 P-1 |
| 0xb77 | ROW(14), COLUMN(12)<br>P-9 P-8 P-7 P-6 | ROW(14, COLUMN(13)<br>P-9 P-8 P-7 P-6 | ROW(14), COLUMN(14)<br>P-9 P-8 P-7 P-6 | ROW(14), COLUMN(15)<br>P-9 P-8 P-7 P-6 |
| 0xb78 | ROW(15), COLUMN(0)<br>P-4 P-3 P-2 P-1 | ROW(15), COLUMN(1)<br>P-4 P-3 P-2 P-1 | ROW(15), COLUMN(2)<br>P-4 P-3 P-2 P-1 | ROW(15), COLUMN(3)<br>P-4 P-3 P-2 P-1 |
| 0xb79 | ROW(15), COLUMN(0)<br>P-9 P-8 P-7 P-6 | ROW(15), COLUMN(1)<br>P-9 P-8 P-7 P-6 | ROW(15), COLUMN(2)<br>P-9 P-8 P-7 P-6 | ROW(15), COLUMN(3)<br>P-9 P-8 P-7 P-6 |
| 0xb7A | ROW(15), COLUMN(4)<br>P-4 P-3 P-2 P-1 | ROW(15), COLUMN(5)<br>P-4 P-3 P-2 P-1 | ROW(15), COLUMN(6)<br>P-4 P-3 P-2 P-1 | ROW(15), COLUMN(7)<br>P-4 P-3 P-2 P-1 |
| 0xb7B | ROW(15), COLUMN(4)<br>P-9 P-8 P-7 P-6 | ROW(15), COLUMN(5)<br>P-9 P-8 P-7 P-6 | ROW(15), COLUMN(6)<br>P-9 P-8 P-7 P-6 | ROW(15), COLUMN(7)<br>P-9 P-8 P-7 P-6 |
| 0xb7C | ROW(15), COLUMN(8)<br>P-4 P-3 P-2 P-1 | ROW(15), COLUMN(9)<br>P-4 P-3 P-2 P-1 | ROW(15), COLUMN(10)<br>P-4 P-3 P-2 P-1 | ROW(15), COLUMN(11)<br>P-4 P-3 P-2 P-1 |
| 0xb7D | ROW(15), COLUMN(8)<br>P-9 P-8 P-7 P-6 | ROW(15), COLUMN(9)<br>P-9 P-8 P-7 P-6 | ROW(15), COLUMN(10)<br>P-9 P-8 P-7 P-6 | ROW(15), COLUMN(11)<br>P-9 P-8 P-7 P-6 |
| 0xb7E | ROW(15), COLUMN(12)<br>P-4 P-3 P-2 P-1 | ROW(15), COLUMN(13)<br>P-4 P-3 P-2 P-1 | ROW(15), COLUMN(14)<br>P-4 P-3 P-2 P-1 | ROW(15), COLUMN(15)<br>P-4 P-3 P-2 P-1 |
| 0xb7F | ROW(15), COLUMN(12)<br>P-9 P-8 P-7 P-6 | ROW(15), COLUMN(13)<br>P-9 P-8 P-7 P-6 | ROW(15), COLUMN(14)<br>P-9 P-8 P-7 P-6 | ROW(15), COLUMN(15)<br>P-9 P-8 P-7 P-6 |

FIGURE 40. MEMORY LAYOUT FOR 2048 BYTE QUARTER PIXEL BUFFER

| | | COLUMN | | | | | | | | | | | | | | | |
|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| ROW | 0 | 0xAC8 [15:8] | 0xAC8 [31:24] | 0xAC9 [15:8] | 0xAC9 [31:24] | 0xACA [15:8] | 0xACA [31:24] | 0xACB [15:8] | 0xACB [31:24] | 0xACC [15:8] | 0xACC [31:24] | 0xACD [15:8] | 0xACD [31:24] | 0xACE [15:8] | 0xACE [31:24] | 0xACF [15:8] | 0xACF [31:24] |
| | 1 | 0xEC8 [15:8] | 0xEC8 [31:24] | 0xEC9 [15:8] | 0xEC9 [31:24] | 0xECA [15:8] | 0xECA [31:24] | 0xECB [15:8] | 0xECB [31:24] | 0xECC [15:8] | 0xECC [31:24] | 0xECD [15:8] | 0xECD [31:24] | 0xECE [15:8] | 0xECE [31:24] | 0xECF [15:8] | 0xECF [31:24] |
| | 2 | 0xAD1 [15:8] | 0xAD1 [31:24] | 0xAD2 [15:8] | 0xAD2 [31:24] | 0xAD3 [15:8] | 0xAD3 [31:24] | 0xAD4 [15:8] | 0xAD4 [31:24] | 0xAD5 [15:8] | 0xAD5 [31:24] | 0xAD6 [15:8] | 0xAD6 [31:24] | 0xAD7 [15:8] | 0xAD7 [31:24] | 0xAD8 [15:8] | 0xAD8 [31:24] |
| | 3 | 0xED1 [15:8] | 0xED1 [31:24] | 0xED2 [15:8] | 0xED2 [31:24] | 0xED3 [15:8] | 0xED3 [31:24] | 0xED4 [15:8] | 0xED4 [31:24] | 0xED5 [15:8] | 0xED5 [31:24] | 0xED6 [15:8] | 0xED6 [31:24] | 0xED7 [15:8] | 0xED7 [31:24] | 0xED8 [15:8] | 0xED8 [31:24] |
| | 4 | 0xADA [15:8] | 0xADA [31:24] | 0xADB [15:8] | 0xADB [31:24] | 0xADC [15:8] | 0xADC [31:24] | 0xADD [15:8] | 0xADD [31:24] | 0xADE [15:8] | 0xADE [31:24] | 0xADF [15:8] | 0xADF [31:24] | 0xAE0 [15:8] | 0xAE0 [31:24] | 0xAE1 [15:8] | 0xAE1 [31:24] |
| | 5 | 0xEDA [15:8] | 0xEDA [31:24] | 0xEDB [15:8] | 0xEDB [31:24] | 0xEDC [15:8] | 0xEDC [31:24] | 0xEDD [15:8] | 0xEDD [31:24] | 0xEDE [15:8] | 0xEDE [31:24] | 0xEDF [15:8] | 0xEDF [31:24] | 0xEE0 [15:8] | 0xEE0 [31:24] | 0xEE1 [15:8] | 0xEE1 [31:24] |
| | 6 | 0xAE3 [15:8] | 0xAE3 [31:24] | 0xAE4 [15:8] | 0xAE4 [31:24] | 0xAE5 [15:8] | 0xAE5 [31:24] | 0xAE6 [15:8] | 0xAE6 [31:24] | 0xAE7 [15:8] | 0xAE7 [31:24] | 0xAE8 [15:8] | 0xAE8 [31:24] | 0xAE9 [15:8] | 0xAE9 [31:24] | 0xAEA [15:8] | 0xAEA [31:24] |
| | 7 | 0xEE3 [15:8] | 0xEE3 [31:24] | 0xEE4 [15:8] | 0xEE4 [31:24] | 0xEE5 [15:8] | 0xEE5 [31:24] | 0xEE6 [15:8] | 0xEE6 [31:24] | 0xEE7 [15:8] | 0xEE7 [31:24] | 0xEE8 [15:8] | 0xEE8 [31:24] | 0xEE9 [15:8] | 0xEE9 [31:24] | 0xEEA [15:8] | 0xEEA [31:24] |
| | 8 | 0xAEC [15:8] | 0xAEC [31:24] | 0xAED [15:8] | 0xAED [31:24] | 0xAEE [15:8] | 0xAEE [31:24] | 0xAEF [15:8] | 0xAEF [31:24] | 0xAF0 [15:8] | 0xAF0 [31:24] | 0xAF1 [15:8] | 0xAF1 [31:24] | 0xAF2 [15:8] | 0xAF2 [31:24] | 0xAF3 [15:8] | 0xAF3 [31:24] |
| | 9 | 0xEEC [15:8] | 0xEEC [31:24] | 0xEED [15:8] | 0xEED [31:24] | 0xEEE [15:8] | 0xEEE [31:24] | 0xEEF [15:8] | 0xEEF [31:24] | 0xEF0 [15:8] | 0xEF0 [31:24] | 0xEF1 [15:8] | 0xEF1 [31:24] | 0xEF2 [15:8] | 0xEF2 [31:24] | 0xEF3 [15:8] | 0xEF3 [31:24] |
| | 10 | 0xAF5 [15:8] | 0xAF5 [31:24] | 0xAF6 [15:8] | 0xAF6 [31:24] | 0xAF7 [15:8] | 0xAF7 [31:24] | 0xAF8 [15:8] | 0xAF8 [31:24] | 0xAF9 [15:8] | 0xAF9 [31:24] | 0xAFA [15:8] | 0xAFA [31:24] | 0xAFB [15:8] | 0xAFB [31:24] | 0xAFC [15:8] | 0xAFC [31:24] |
| | 11 | 0xEF5 [15:8] | 0xEF5 [31:24] | 0xEF6 [15:8] | 0xEF6 [31:24] | 0xEF7 [15:8] | 0xEF7 [31:24] | 0xEF8 [15:8] | 0xEF8 [31:24] | 0xEF9 [15:8] | 0xEF9 [31:24] | 0xEFA [15:8] | 0xEFA [31:24] | 0xEFB [15:8] | 0xEFB [31:24] | 0xEFC [15:8] | 0xEFC [31:24] |
| | 12 | 0xAFE [15:8] | 0xAFE [31:24] | 0xAFF [15:8] | 0xAFF [31:24] | 0xB00 [15:8] | 0xB00 [31:24] | 0xB01 [15:8] | 0xB01 [31:24] | 0xB02 [15:8] | 0xB02 [31:24] | 0xB03 [15:8] | 0xB03 [31:24] | 0xB04 [15:8] | 0xB04 [31:24] | 0xB05 [15:8] | 0xB05 [31:24] |
| | 13 | 0xEFE [15:8] | 0xEFE [31:24] | 0xEFF [15:8] | 0xEFF [31:24] | 0xF00 [15:8] | 0xF00 [31:24] | 0xF01 [15:8] | 0xF01 [31:24] | 0xF02 [15:8] | 0xF02 [31:24] | 0xF03 [15:8] | 0xF03 [31:24] | 0xF04 [15:8] | 0xF04 [31:24] | 0xF05 [15:8] | 0xF05 [31:24] |
| | 14 | 0xB07 [15:8] | 0xB07 [31:24] | 0xB08 [15:8] | 0xB08 [31:24] | 0xB09 [15:8] | 0xB09 [31:24] | 0xB0A [15:8] | 0xB0A [31:24] | 0xB0B [15:8] | 0xB0B [31:24] | 0xB0C [15:8] | 0xB0C [31:24] | 0xB0D [15:8] | 0xB0D [31:24] | 0xB0E [15:8] | 0xB0E [31:24] |
| | 15 | 0xF07 [15:8] | 0xF07 [31:24] | 0xF08 [15:8] | 0xF08 [31:24] | 0xF09 [15:8] | 0xF09 [31:24] | 0xF0A [15:8] | 0xF0A [31:24] | 0xF0B [15:8] | 0xF0B [31:24] | 0xF0C [15:8] | 0xF0C [31:24] | 0xF0D [15:8] | 0xF0D [31:24] | 0xF0E [15:8] | 0xF0E [31:24] |

FIGURE 41. BYTE MAP FOR 'CENTER' QUARTER PIXEL 16x16 MACROBLOCK--POSITION 1-of-9

| | | COLUMN | | | | | | | | | | | | | | | |
|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| ROW | 0 | 0xAC8 [23:16] | 0xAC9 [7:0] | 0xAC9 [23:16] | 0xACA [7:0] | 0xACA [23:16] | 0xACB [7:0] | 0xACB [23:16] | 0xACC [7:0] | 0xACC [23:16] | 0xACD [7:0] | 0xACD [23:16] | 0xACE [7:0] | 0xACE [23:16] | 0xACF [7:0] | 0xACF [23:16] | 0xAD0 [7:0] |
| | 1 | 0xEC8 [23:16] | 0xEC9 [7:0] | 0xEC9 [23:16] | 0xECA [7:0] | 0xECA [23:16] | 0xECB [7:0] | 0xECB [23:16] | 0xECC [7:0] | 0xECC [23:16] | 0xECD [7:0] | 0xECD [23:16] | 0xECE [7:0] | 0xECE [23:16] | 0xECF [7:0] | 0xECF [23:16] | 0xED0 [7:0] |
| | 2 | 0xAD1 [23:16] | 0xAD2 [7:0] | 0xAD2 [23:16] | 0xAD3 [7:0] | 0xAD3 [23:16] | 0xAD4 [7:0] | 0xAD4 [23:16] | 0xAD5 [7:0] | 0xAD5 [23:16] | 0xAD6 [7:0] | 0xAD6 [23:16] | 0xAD7 [7:0] | 0xAD7 [23:16] | 0xAD8 [7:0] | 0xAD8 [23:16] | 0xAD9 [7:0] |
| | 3 | 0xED1 [23:16] | 0xED2 [7:0] | 0xED2 [23:16] | 0xED3 [7:0] | 0xED3 [23:16] | 0xED4 [7:0] | 0xED4 [23:16] | 0xED5 [7:0] | 0xED5 [23:16] | 0xED6 [7:0] | 0xED6 [23:16] | 0xED7 [7:0] | 0xED7 [23:16] | 0xED8 [7:0] | 0xED8 [23:16] | 0xED9 [7:0] |
| | 4 | 0xADA [23:16] | 0xADB [7:0] | 0xADB [23:16] | 0xADC [7:0] | 0xADC [23:16] | 0xADD [7:0] | 0xADD [23:16] | 0xADE [7:0] | 0xADE [23:16] | 0xADF [7:0] | 0xADF [23:16] | 0xAE0 [7:0] | 0xAE0 [23:16] | 0xAE1 [7:0] | 0xAE1 [23:16] | 0xAE2 [7:0] |
| | 5 | 0xEDA [23:16] | 0xEDB [7:0] | 0xEDB [23:16] | 0xEDC [7:0] | 0xEDC [23:16] | 0xEDD [7:0] | 0xEDD [23:16] | 0xEDE [7:0] | 0xEDE [23:16] | 0xEDF [7:0] | 0xEDF [23:16] | 0xEE0 [7:0] | 0xEE0 [23:16] | 0xEE1 [7:0] | 0xEE1 [23:16] | 0xEE2 [7:0] |
| | 6 | 0xAE3 [23:16] | 0xAE4 [7:0] | 0xAE4 [23:16] | 0xAE5 [7:0] | 0xAE5 [23:16] | 0xAE6 [7:0] | 0xAE6 [23:16] | 0xAE7 [7:0] | 0xAE7 [23:16] | 0xAE8 [7:0] | 0xAE8 [23:16] | 0xAE9 [7:0] | 0xAE9 [23:16] | 0xAEA [7:0] | 0xAEA [23:16] | 0xAEB [7:0] |
| | 7 | 0xEE3 [23:16] | 0xEE4 [7:0] | 0xEE4 [23:16] | 0xEE5 [7:0] | 0xEE5 [23:16] | 0xEE6 [7:0] | 0xEE6 [23:16] | 0xEE7 [7:0] | 0xEE7 [23:16] | 0xEE8 [7:0] | 0xEE8 [23:16] | 0xEE9 [7:0] | 0xEE9 [23:16] | 0xEEA [7:0] | 0xEEA [23:16] | 0xEEB [7:0] |
| | 8 | 0xAEC [23:16] | 0xAED [7:0] | 0xAED [23:16] | 0xAEE [7:0] | 0xAEE [23:16] | 0xAEF [7:0] | 0xAEF [23:16] | 0xAF0 [7:0] | 0xAF0 [23:16] | 0xAF1 [7:0] | 0xAF1 [23:16] | 0xAF2 [7:0] | 0xAF2 [23:16] | 0xAF3 [7:0] | 0xAF3 [23:16] | 0xAF4 [7:0] |
| | 9 | 0xEEC [23:16] | 0xEED [7:0] | 0xEED [23:16] | 0xEEE [7:0] | 0xEEE [23:16] | 0xEEF [7:0] | 0xEEF [23:16] | 0xEF0 [7:0] | 0xEF0 [23:16] | 0xEF1 [7:0] | 0xEF1 [23:16] | 0xEF2 [7:0] | 0xEF2 [23:16] | 0xEF3 [7:0] | 0xEF3 [23:16] | 0xEF4 [7:0] |
| | 10 | 0xAF5 [23:16] | 0xAF6 [7:0] | 0xAF6 [23:16] | 0xAF7 [7:0] | 0xAF7 [23:16] | 0xAF8 [7:0] | 0xAF8 [23:16] | 0xAF9 [7:0] | 0xAF9 [23:16] | 0xAFA [7:0] | 0xAFA [23:16] | 0xAFB [7:0] | 0xAFB [23:16] | 0xAFC [7:0] | 0xAFC [23:16] | 0xAFD [7:0] |
| | 11 | 0xEF5 [23:16] | 0xEF6 [7:0] | 0xEF6 [23:16] | 0xEF7 [7:0] | 0xEF7 [23:16] | 0xEF8 [7:0] | 0xEF8 [23:16] | 0xEF9 [7:0] | 0xEF9 [23:16] | 0xEFA [7:0] | 0xEFA [23:16] | 0xEFB [7:0] | 0xEFB [23:16] | 0xEFC [7:0] | 0xEFC [23:16] | 0xEFD [7:0] |
| | 12 | 0xAFE [23:16] | 0xAFF [7:0] | 0xAFF [23:16] | 0xB00 [7:0] | 0xB00 [23:16] | 0xB01 [7:0] | 0xB01 [23:16] | 0xB02 [7:0] | 0xB02 [23:16] | 0xB03 [7:0] | 0xB03 [23:16] | 0xB04 [7:0] | 0xB04 [23:16] | 0xB05 [7:0] | 0xB05 [23:16] | 0xB06 [7:0] |
| | 13 | 0xEFE [23:16] | 0xEFF [7:0] | 0xEFF [23:16] | 0xF00 [7:0] | 0xF00 [23:16] | 0xF01 [7:0] | 0xF01 [23:16] | 0xF02 [7:0] | 0xF02 [23:16] | 0xF03 [7:0] | 0xF03 [23:16] | 0xF04 [7:0] | 0xF04 [23:16] | 0xF05 [7:0] | 0xF05 [23:16] | 0xF06 [7:0] |
| | 14 | 0xB07 [23:16] | 0xB08 [7:0] | 0xB08 [23:16] | 0xB09 [7:0] | 0xB09 [23:16] | 0xB0A [7:0] | 0xB0A [23:16] | 0xB0B [7:0] | 0xB0B [23:16] | 0xB0C [7:0] | 0xB0C [23:16] | 0xB0D [7:0] | 0xB0D [23:16] | 0xB0E [7:0] | 0xB0E [23:16] | 0xB0F [7:0] |
| | 15 | 0xF07 [23:16] | 0xF08 [7:0] | 0xF08 [23:16] | 0xF09 [7:0] | 0xF09 [23:16] | 0xF0A [7:0] | 0xF0A [23:16] | 0xF0B [7:0] | 0xF0B [23:16] | 0xF0C [7:0] | 0xF0C [23:16] | 0xF0D [7:0] | 0xF0D [23:16] | 0xF0E [7:0] | 0xF0E [23:16] | 0xF0F [7:0] |

FIGURE 42. BYTE MAP FOR 'CENTER' QUARTER PIXEL 16x16 MACROBLOCK--POSITION 2-of-9

| ROW | COLUMN 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 0xAC8 [31:24] | 0xAC9 [15:8] | 0xAC9 [31:24] | 0xACA [15:8] | 0xACA [31:24] | 0xACB [15:8] | 0xACB [31:24] | 0xACC [15:8] | 0xACC [31:24] | 0xACD [15:8] | 0xACD [31:24] | 0xACE [15:8] | 0xACE [31:24] | 0xACF [15:8] | 0xACF [31:24] | 0xAD0 [15:8] |
| 1 | 0xEC8 [31:24] | 0xEC9 [15:8] | 0xEC9 [31:24] | 0xECA [15:8] | 0xECA [31:24] | 0xECB [15:8] | 0xECB [31:24] | 0xECC [15:8] | 0xECC [31:24] | 0xECD [15:8] | 0xECD [31:24] | 0xECE [15:8] | 0xECE [31:24] | 0xECF [15:8] | 0xECF [31:24] | 0xED0 [15:8] |
| 2 | 0xAD1 [31:24] | 0xAD2 [15:8] | 0xAD2 [31:24] | 0xAD3 [15:8] | 0xAD3 [31:24] | 0xAD4 [15:8] | 0xAD4 [31:24] | 0xAD5 [15:8] | 0xAD5 [31:24] | 0xAD6 [15:8] | 0xAD6 [31:24] | 0xAD7 [15:8] | 0xAD7 [31:24] | 0xAD8 [15:8] | 0xAD8 [31:24] | 0xAD9 [15:8] |
| 3 | 0xED1 [31:24] | 0xED2 [15:8] | 0xED2 [31:24] | 0xED3 [15:8] | 0xED3 [31:24] | 0xED4 [15:8] | 0xED4 [31:24] | 0xED5 [15:8] | 0xED5 [31:24] | 0xED6 [15:8] | 0xED6 [31:24] | 0xED7 [15:8] | 0xED7 [31:24] | 0xED8 [15:8] | 0xED8 [31:24] | 0xED9 [15:8] |
| 4 | 0xADA [31:24] | 0xADB [15:8] | 0xADB [31:24] | 0xADC [15:8] | 0xADC [31:24] | 0xADD [15:8] | 0xADD [31:24] | 0xADE [15:8] | 0xADE [31:24] | 0xADF [15:8] | 0xADF [31:24] | 0xAE0 [15:8] | 0xAE0 [31:24] | 0xAE1 [15:8] | 0xAE1 [31:24] | 0xAE2 [15:8] |
| 5 | 0xEDA [31:24] | 0xEDB [15:8] | 0xEDB [31:24] | 0xEDC [15:8] | 0xEDC [31:24] | 0xEDD [15:8] | 0xEDD [31:24] | 0xEDE [15:8] | 0xEDE [31:24] | 0xEDF [15:8] | 0xEDF [31:24] | 0xEE0 [15:8] | 0xEE0 [31:24] | 0xEE1 [15:8] | 0xEE1 [31:24] | 0xEE2 [15:8] |
| 6 | 0xAE3 [31:24] | 0xAE4 [15:8] | 0xAE4 [31:24] | 0xAE5 [15:8] | 0xAE5 [31:24] | 0xAE6 [15:8] | 0xAE6 [31:24] | 0xAE7 [15:8] | 0xAE7 [31:24] | 0xAE8 [15:8] | 0xAE8 [31:24] | 0xAE9 [15:8] | 0xAE9 [31:24] | 0xAEA [15:8] | 0xAEA [31:24] | 0xAEB [15:8] |
| 7 | 0xEE3 [31:24] | 0xEE4 [15:8] | 0xEE4 [31:24] | 0xEE5 [15:8] | 0xEE5 [31:24] | 0xEE6 [15:8] | 0xEE6 [31:24] | 0xEE7 [15:8] | 0xEE7 [31:24] | 0xEE8 [15:8] | 0xEE8 [31:24] | 0xEE9 [15:8] | 0xEE9 [31:24] | 0xEEA [15:8] | 0xEEA [31:24] | 0xEEB [15:8] |
| 8 | 0xAEC [31:24] | 0xAED [15:8] | 0xAED [31:24] | 0xAEE [15:8] | 0xAEE [31:24] | 0xAEF [15:8] | 0xAEF [31:24] | 0xAF0 [15:8] | 0xAF0 [31:24] | 0xAF1 [15:8] | 0xAF1 [31:24] | 0xAF2 [15:8] | 0xAF2 [31:24] | 0xAF3 [15:8] | 0xAF3 [31:24] | 0xAF4 [15:8] |
| 9 | 0xEEC [31:24] | 0xEED [15:8] | 0xEED [31:24] | 0xEEE [15:8] | 0xEEE [31:24] | 0xEEF [15:8] | 0xEEF [31:24] | 0xEF0 [15:8] | 0xEF0 [31:24] | 0xEF1 [15:8] | 0xEF1 [31:24] | 0xEF2 [15:8] | 0xEF2 [31:24] | 0xEF3 [15:8] | 0xEF3 [31:24] | 0xEF4 [15:8] |
| 10 | 0xAF5 [31:24] | 0xAF6 [15:8] | 0xAF6 [31:24] | 0xAF7 [15:8] | 0xAF7 [31:24] | 0xAF8 [15:8] | 0xAF8 [31:24] | 0xAF9 [15:8] | 0xAF9 [31:24] | 0xAFA [15:8] | 0xAFA [31:24] | 0xAFB [15:8] | 0xAFB [31:24] | 0xAFC [15:8] | 0xAFC [31:24] | 0xAFD [15:8] |
| 11 | 0xEF5 [31:24] | 0xEF6 [15:8] | 0xEF6 [31:24] | 0xEF7 [15:8] | 0xEF7 [31:24] | 0xEF8 [15:8] | 0xEF8 [31:24] | 0xEF9 [15:8] | 0xEF9 [31:24] | 0xEFA [15:8] | 0xEFA [31:24] | 0xEFB [15:8] | 0xEFB [31:24] | 0xEFC [15:8] | 0xEFC [31:24] | 0xEFD [15:8] |
| 12 | 0xAFE [31:24] | 0xAFF [15:8] | 0xAFF [31:24] | 0xB00 [15:8] | 0xB00 [31:24] | 0xB01 [15:8] | 0xB01 [31:24] | 0xB02 [15:8] | 0xB02 [31:24] | 0xB03 [15:8] | 0xB03 [31:24] | 0xB04 [15:8] | 0xB04 [31:24] | 0xB05 [15:8] | 0xB05 [31:24] | 0xB06 [15:8] |
| 13 | 0xEFE [31:24] | 0xEFF [15:8] | 0xEFF [31:24] | 0xF00 [15:8] | 0xF00 [31:24] | 0xF01 [15:8] | 0xF01 [31:24] | 0xF02 [15:8] | 0xF02 [31:24] | 0xF03 [15:8] | 0xF03 [31:24] | 0xF04 [15:8] | 0xF04 [31:24] | 0xF05 [15:8] | 0xF05 [31:24] | 0xF06 [15:8] |
| 14 | 0xB07 [31:24] | 0xB08 [15:8] | 0xB08 [31:24] | 0xB09 [15:8] | 0xB09 [31:24] | 0xB0A [15:8] | 0xB0A [31:24] | 0xB0B [15:8] | 0xB0B [31:24] | 0xB0C [15:8] | 0xB0C [31:24] | 0xB0D [15:8] | 0xB0D [31:24] | 0xB0E [15:8] | 0xB0E [31:24] | 0xB0F [15:8] |
| 15 | 0xF07 [31:24] | 0xF08 [15:8] | 0xF08 [31:24] | 0xF09 [15:8] | 0xF09 [31:24] | 0xF0A [15:8] | 0xF0A [31:24] | 0xF0B [15:8] | 0xF0B [31:24] | 0xF0C [15:8] | 0xF0C [31:24] | 0xF0D [15:8] | 0xF0D [31:24] | 0xF0E [15:8] | 0xF0E [31:24] | 0xF0F [15:8] |

FIGURE 43. BYTE MAP FOR 'CENTER' QUARTER PIXEL 16x16 MACROBLOCK--POSITION 3-of-9

| ROW | COLUMN 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 0xCC8 [15:8] | 0xCC8 [31:24] | 0xCC9 [15:8] | 0xCC9 [31:24] | 0xCCA [15:8] | 0xCCA [31:24] | 0xCCB [15:8] | 0xCCB [31:24] | 0xCCC [15:8] | 0xCCC [31:24] | 0xCCD [15:8] | 0xCCD [31:24] | 0xCCE [15:8] | 0xCCE [31:24] | 0xCCF [15:8] | 0xCCF [31:24] |
| 1 | 0x8D1 [15:8] | 0x8D1 [31:24] | 0x8D2 [15:8] | 0x8D2 [31:24] | 0x8D3 [15:8] | 0x8D3 [31:24] | 0x8D4 [15:8] | 0x8D4 [31:24] | 0x8D5 [15:8] | 0x8D5 [31:24] | 0x8D6 [15:8] | 0x8D6 [31:24] | 0x8D7 [15:8] | 0x8D7 [31:24] | 0x8D8 [15:8] | 0x8D8 [31:24] |
| 2 | 0xCD1 [15:8] | 0xCD1 [31:24] | 0xCD2 [15:8] | 0xCD2 [31:24] | 0xCD3 [15:8] | 0xCD3 [31:24] | 0xCD4 [15:8] | 0xCD4 [31:24] | 0xCD5 [15:8] | 0xCD5 [31:24] | 0xCD6 [15:8] | 0xCD6 [31:24] | 0xCD7 [15:8] | 0xCD7 [31:24] | 0xCD8 [15:8] | 0xCD8 [31:24] |
| 3 | 0x8DA [15:8] | 0x8DA [31:24] | 0x8DB [15:8] | 0x8DB [31:24] | 0x8DC [15:8] | 0x8DC [31:24] | 0x8DD [15:8] | 0x8DD [31:24] | 0x8DE [15:8] | 0x8DE [31:24] | 0x8DF [15:8] | 0x8DF [31:24] | 0x8E0 [15:8] | 0x8E0 [31:24] | 0x8E1 [15:8] | 0x8E1 [31:24] |
| 4 | 0xCDA [15:8] | 0xCDA [31:24] | 0xCDB [15:8] | 0xCDB [31:24] | 0xCDC [15:8] | 0xCDC [31:24] | 0xCDD [15:8] | 0xCDD [31:24] | 0xCDE [15:8] | 0xCDE [31:24] | 0xCDF [15:8] | 0xCDF [31:24] | 0xCE0 [15:8] | 0xCE0 [31:24] | 0xCE1 [15:8] | 0xCE1 [31:24] |
| 5 | 0x8E3 [15:8] | 0x8E3 [31:24] | 0x8E4 [15:8] | 0x8E4 [31:24] | 0x8E5 [15:8] | 0x8E5 [31:24] | 0x8E6 [15:8] | 0x8E6 [31:24] | 0x8E7 [15:8] | 0x8E7 [31:24] | 0x8E8 [15:8] | 0x8E8 [31:24] | 0x8E9 [15:8] | 0x8E9 [31:24] | 0x8EA [15:8] | 0x8EA [31:24] |
| 6 | 0xCE3 [15:8] | 0xCE3 [31:24] | 0xCE4 [15:8] | 0xCE4 [31:24] | 0xCE5 [15:8] | 0xCE5 [31:24] | 0xCE6 [15:8] | 0xCE6 [31:24] | 0xCE7 [15:8] | 0xCE7 [31:24] | 0xCE8 [15:8] | 0xCE8 [31:24] | 0xCE9 [15:8] | 0xCE9 [31:24] | 0xCEA [15:8] | 0xCEA [31:24] |
| 7 | 0x8EC [15:8] | 0x8EC [31:24] | 0x8ED [15:8] | 0x8ED [31:24] | 0x8EE [15:8] | 0x8EE [31:24] | 0x8EF [15:8] | 0x8EF [31:24] | 0x8F0 [15:8] | 0x8F0 [31:24] | 0x8F1 [15:8] | 0x8F1 [31:24] | 0x8F2 [15:8] | 0x8F2 [31:24] | 0x8F3 [15:8] | 0x8F3 [31:24] |
| 8 | 0xCEC [15:8] | 0xCEC [31:24] | 0xCED [15:8] | 0xCED [31:24] | 0xCEE [15:8] | 0xCEE [31:24] | 0xCEF [15:8] | 0xCEF [31:24] | 0xCF0 [15:8] | 0xCF0 [31:24] | 0xCF1 [15:8] | 0xCF1 [31:24] | 0xCF2 [15:8] | 0xCF2 [31:24] | 0xCF3 [15:8] | 0xCF3 [31:24] |
| 9 | 0x8F5 [15:8] | 0x8F5 [31:24] | 0x8F6 [15:8] | 0x8F6 [31:24] | 0x8F7 [15:8] | 0x8F7 [31:24] | 0x8F8 [15:8] | 0x8F8 [31:24] | 0x8F9 [15:8] | 0x8F9 [31:24] | 0x8FA [15:8] | 0x8FA [31:24] | 0x8FB [15:8] | 0x8FB [31:24] | 0x8FC [15:8] | 0x8FC [31:24] |
| 10 | 0xCF5 [15:8] | 0xCF5 [31:24] | 0xCF6 [15:8] | 0xCF6 [31:24] | 0xCF7 [15:8] | 0xCF7 [31:24] | 0xCF8 [15:8] | 0xCF8 [31:24] | 0xCF9 [15:8] | 0xCF9 [31:24] | 0xCFA [15:8] | 0xCFA [31:24] | 0xCFB [15:8] | 0xCFB [31:24] | 0xCFC [15:8] | 0xCFC [31:24] |
| 11 | 0x8FE [15:8] | 0x8FE [31:24] | 0x8FF [15:8] | 0x8FF [31:24] | 0x900 [15:8] | 0x900 [31:24] | 0x901 [15:8] | 0x901 [31:24] | 0x902 [15:8] | 0x902 [31:24] | 0x903 [15:8] | 0x903 [31:24] | 0x904 [15:8] | 0x904 [31:24] | 0x905 [15:8] | 0x905 [31:24] |
| 12 | 0xCFE [15:8] | 0xCFE [31:24] | 0xCFF [15:8] | 0xCFF [31:24] | 0xD00 [15:8] | 0xD00 [31:24] | 0xD01 [15:8] | 0xD01 [31:24] | 0xD02 [15:8] | 0xD02 [31:24] | 0xD03 [15:8] | 0xD03 [31:24] | 0xD04 [15:8] | 0xD04 [31:24] | 0xD05 [15:8] | 0xD05 [31:24] |
| 13 | 0x907 [15:8] | 0x907 [31:24] | 0x908 [15:8] | 0x908 [31:24] | 0x909 [15:8] | 0x909 [31:24] | 0x90A [15:8] | 0x90A [31:24] | 0x90B [15:8] | 0x90B [31:24] | 0x90C [15:8] | 0x90C [31:24] | 0x90D [15:8] | 0x90D [31:24] | 0x90E [15:8] | 0x90E [31:24] |
| 14 | 0xD07 [15:8] | 0xD07 [31:24] | 0xD08 [15:8] | 0xD08 [31:24] | 0xD09 [15:8] | 0xD09 [31:24] | 0xD0A [15:8] | 0xD0A [31:24] | 0xD0B [15:8] | 0xD0B [31:24] | 0xD0C [15:8] | 0xD0C [31:24] | 0xD0D [15:8] | 0xD0D [31:24] | 0xD0E [15:8] | 0xD0E [31:24] |
| 15 | 0x910 [15:8] | 0x910 [31:24] | 0x911 [15:8] | 0x911 [31:24] | 0x912 [15:8] | 0x912 [31:24] | 0x913 [15:8] | 0x913 [31:24] | 0x914 [15:8] | 0x914 [31:24] | 0x915 [15:8] | 0x915 [31:24] | 0x916 [15:8] | 0x916 [31:24] | 0x917 [15:8] | 0x917 [31:24] |

FIGURE 44. BYTE MAP FOR 'CENTER' QUARTER PIXEL 16x16 MCCROBLOCK--POSITION 4-of-9

| ROW | COLUMN 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 0xCC8 [23:16] | 0xCC9 [7:0] | 0xCC9 [23:16] | 0xCCA [7:0] | 0xCCA [23:16] | 0xCCB [7:0] | 0xCCB [23:16] | 0xCCC [7:0] | 0xCCC [23:16] | 0xCCD [7:0] | 0xCCD [23:16] | 0xCCE [7:0] | 0xCCE [23:16] | 0xCCF [7:0] | 0xCCF [23:16] | 0xCD0 [7:0] |
| 1 | 0x8D1 [23:16] | 0x8D2 [7:0] | 0x8D2 [23:16] | 0x8D3 [7:0] | 0x8D3 [23:16] | 0x8D4 [7:0] | 0x8D4 [23:16] | 0x8D5 [7:0] | 0x8D5 [23:16] | 0x8D6 [7:0] | 0x8D6 [23:16] | 0x8D7 [7:0] | 0x8D7 [23:16] | 0x8D8 [7:0] | 0x8D8 [23:16] | 0x8D9 [7:0] |
| 2 | 0xCD1 [23:16] | 0xCD2 [7:0] | 0xCD2 [23:16] | 0xCD3 [7:0] | 0xCD3 [23:16] | 0xCD4 [7:0] | 0xCD4 [23:16] | 0xCD5 [7:0] | 0xCD5 [23:16] | 0xCD6 [7:0] | 0xCD6 [23:16] | 0xCD7 [7:0] | 0xCD7 [23:16] | 0xCD8 [7:0] | 0xCD8 [23:16] | 0xCD9 [7:0] |
| 3 | 0x8DA [23:16] | 0x8DB [7:0] | 0x8DB [23:16] | 0x8DC [7:0] | 0x8DC [23:16] | 0x8DD [7:0] | 0x8DD [23:16] | 0x8DE [7:0] | 0x8DE [23:16] | 0x8DF [7:0] | 0x8DF [23:16] | 0x8E0 [7:0] | 0x8E0 [23:16] | 0x8E1 [7:0] | 0x8E1 [23:16] | 0x8E2 [7:0] |
| 4 | 0xCDA [23:16] | 0xCDB [7:0] | 0xCDB [23:16] | 0xCDC [7:0] | 0xCDC [23:16] | 0xCDD [7:0] | 0xCDD [23:16] | 0xCDE [7:0] | 0xCDE [23:16] | 0xCDF [7:0] | 0xCDF [23:16] | 0xCE0 [7:0] | 0xCE0 [23:16] | 0xCE1 [7:0] | 0xCE1 [23:16] | 0xCE2 [7:0] |
| 5 | 0x8E3 [23:16] | 0x8E4 [7:0] | 0x8E4 [23:16] | 0x8E5 [7:0] | 0x8E5 [23:16] | 0x8E6 [7:0] | 0x8E6 [23:16] | 0x8E7 [7:0] | 0x8E7 [23:16] | 0x8E8 [7:0] | 0x8E8 [23:16] | 0x8E9 [7:0] | 0x8E9 [23:16] | 0x8EA [7:0] | 0x8EA [23:16] | 0x8EB [7:0] |
| 6 | 0xCE3 [23:16] | 0xCE4 [7:0] | 0xCE4 [23:16] | 0xCE5 [7:0] | 0xCE5 [23:16] | 0xCE6 [7:0] | 0xCE6 [23:16] | 0xCE7 [7:0] | 0xCE7 [23:16] | 0xCE8 [7:0] | 0xCE8 [23:16] | 0xCE9 [7:0] | 0xCE9 [23:16] | 0xCEA [7:0] | 0xCEA [23:16] | 0xCEB [7:0] |
| 7 | 0x8EC [23:16] | 0x8ED [7:0] | 0x8ED [23:16] | 0x8EE [7:0] | 0x8EE [23:16] | 0x8EF [7:0] | 0x8EF [23:16] | 0x8F0 [7:0] | 0x8F0 [23:16] | 0x8F1 [7:0] | 0x8F1 [23:16] | 0x8F2 [7:0] | 0x8F2 [23:16] | 0x8F3 [7:0] | 0x8F3 [23:16] | 0x8F4 [7:0] |
| 8 | 0xCEC [23:16] | 0xCED [7:0] | 0xCED [23:16] | 0xCEE [7:0] | 0xCEE [23:16] | 0xCEF [7:0] | 0xCEF [23:16] | 0xCF0 [7:0] | 0xCF0 [23:16] | 0xCF1 [7:0] | 0xCF1 [23:16] | 0xCF2 [7:0] | 0xCF2 [23:16] | 0xCF3 [7:0] | 0xCF3 [23:16] | 0xCF4 [7:0] |
| 9 | 0x8F5 [23:16] | 0x8F6 [7:0] | 0x8F6 [23:16] | 0x8F7 [7:0] | 0x8F7 [23:16] | 0x8F8 [7:0] | 0x8F8 [23:16] | 0x8F9 [7:0] | 0x8F9 [23:16] | 0x8FA [7:0] | 0x8FA [23:16] | 0x8FB [7:0] | 0x8FB [23:16] | 0x8FC [7:0] | 0x8FC [23:16] | 0x8FD [7:0] |
| 10 | 0xCF5 [23:16] | 0xCF6 [7:0] | 0xCF6 [23:16] | 0xCF7 [7:0] | 0xCF7 [23:16] | 0xCF8 [7:0] | 0xCF8 [23:16] | 0xCF9 [7:0] | 0xCF9 [23:16] | 0xCFA [7:0] | 0xCFA [23:16] | 0xCFB [7:0] | 0xCFB [23:16] | 0xCFC [7:0] | 0xCFC [23:16] | 0xCFD [7:0] |
| 11 | 0x8FE [23:16] | 0x8FF [7:0] | 0x8FF [23:16] | 0x900 [7:0] | 0x900 [23:16] | 0x901 [7:0] | 0x901 [23:16] | 0x902 [7:0] | 0x902 [23:16] | 0x903 [7:0] | 0x903 [23:16] | 0x904 [7:0] | 0x904 [23:16] | 0x905 [7:0] | 0x905 [23:16] | 0x906 [7:0] |
| 12 | 0xCFE [23:16] | 0xCFF [7:0] | 0xCFF [23:16] | 0xD00 [7:0] | 0xD00 [23:16] | 0xD01 [7:0] | 0xD01 [23:16] | 0xD02 [7:0] | 0xD02 [23:16] | 0xD03 [7:0] | 0xD03 [23:16] | 0xD04 [7:0] | 0xD04 [23:16] | 0xD05 [7:0] | 0xD05 [23:16] | 0xD06 [7:0] |
| 13 | 0x907 [23:16] | 0x908 [7:0] | 0x908 [23:16] | 0x909 [7:0] | 0x909 [23:16] | 0x90A [7:0] | 0x90A [23:16] | 0x90B [7:0] | 0x90B [23:16] | 0x90C [7:0] | 0x90C [23:16] | 0x90D [7:0] | 0x90D [23:16] | 0x90E [7:0] | 0x90E [23:16] | 0x90F [7:0] |
| 14 | 0xD07 [23:16] | 0xD08 [7:0] | 0xD08 [23:16] | 0xD09 [7:0] | 0xD09 [23:16] | 0xD0A [7:0] | 0xD0A [23:16] | 0xD0B [7:0] | 0xD0B [23:16] | 0xD0C [7:0] | 0xD0C [23:16] | 0xD0D [7:0] | 0xD0D [23:16] | 0xD0E [7:0] | 0xD0E [23:16] | 0xD0F [7:0] |
| 15 | 0x910 [23:16] | 0x911 [7:0] | 0x911 [23:16] | 0x912 [7:0] | 0x912 [23:16] | 0x913 [7:0] | 0x913 [23:16] | 0x914 [7:0] | 0x914 [23:16] | 0x915 [7:0] | 0x915 [23:16] | 0x916 [7:0] | 0x916 [23:16] | 0x917 [7:0] | 0x917 [23:16] | 0x918 [7:0] |

FIGURE 45. BYTE MAP FOR 'CENTER' QUARTER PIXEL 16x16 MCCROBLOCK--POSITION 5-of-9

| | COLUMN | | | | | | | | | | | | | | | |
|---|---|---|---|---|---|---|---|---|---|---|---|---|---|---|---|---|
| ROW | 0 | 1 | 2 | 3 | 4 | 5 | 6 | 7 | 8 | 9 | 10 | 11 | 12 | 13 | 14 | 15 |
| 0 | 0xCC8 [31:24] | 0xCC9 [15:8] | 0xCC9 [31:24] | 0xCCA [15:8] | 0xCCA [31:24] | 0xCCB [15:8] | 0xCCB [31:24] | 0xCCC [15:8] | 0xCCC [31:24] | 0xCCD [15:8] | 0xCCD [31:24] | 0xCCE [15:8] | 0xCCE [31:24] | 0xCCF [15:8] | 0xCCF [31:24] | 0xCD0 [15:8] |
| 1 | 0x8D1 [31:24] | 0x8D2 [15:8] | 0x8D2 [31:24] | 0x8D3 [15:8] | 0x8D3 [31:24] | 0x8D4 [15:8] | 0x8D4 [31:24] | 0x8D5 [15:8] | 0x8D5 [31:24] | 0x8D6 [15:8] | 0x8D6 [31:24] | 0x8D7 [15:8] | 0x8D7 [31:24] | 0x8D8 [15:8] | 0x8D8 [31:24] | 0x8D9 [15:8] |
| 2 | 0xCD1 [31:24] | 0xCD2 [15:8] | 0xCD2 [31:24] | 0xCD3 [15:8] | 0xCD3 [31:24] | 0xCD4 [15:8] | 0xCD4 [31:24] | 0xCD5 [15:8] | 0xCD5 [31:24] | 0xCD6 [15:8] | 0xCD6 [31:24] | 0xCD7 [15:8] | 0xCD7 [31:24] | 0xCD8 [15:8] | 0xCD8 [31:24] | 0xCD9 [15:8] |
| 3 | 0x8DA [31:24] | 0x8DB [15:8] | 0x8DB [31:24] | 0x8DC [15:8] | 0x8DC [31:24] | 0x8DD [15:8] | 0x8DD [31:24] | 0x8DE [15:8] | 0x8DE [31:24] | 0x8DF [15:8] | 0x8DF [31:24] | 0x8E0 [15:8] | 0x8E0 [31:24] | 0x8E1 [15:8] | 0x8E1 [31:24] | 0x8E2 [15:8] |
| 4 | 0xCDA [31:24] | 0xCDB [15:8] | 0xCDB [31:24] | 0xCDC [15:8] | 0xCDC [31:24] | 0xCDD [15:8] | 0xCDD [31:24] | 0xCDE [15:8] | 0xCDE [31:24] | 0xCDF [15:8] | 0xCDF [31:24] | 0xCE0 [15:8] | 0xCE0 [31:24] | 0xCE1 [15:8] | 0xCE1 [31:24] | 0xCE2 [15:8] |
| 5 | 0x8E3 [31:24] | 0x8E4 [15:8] | 0x8E4 [31:24] | 0x8E5 [15:8] | 0x8E5 [31:24] | 0x8E6 [15:8] | 0x8E6 [31:24] | 0x8E7 [15:8] | 0x8E7 [31:24] | 0x8E8 [15:8] | 0x8E8 [31:24] | 0x8E9 [15:8] | 0x8E9 [31:24] | 0x8EA [15:8] | 0x8EA [31:24] | 0x8EB [15:8] |
| 6 | 0xCE3 [31:24] | 0xCE4 [15:8] | 0xCE4 [31:24] | 0xCE5 [15:8] | 0xCE5 [31:24] | 0xCE6 [15:8] | 0xCE6 [31:24] | 0xCE7 [15:8] | 0xCE7 [31:24] | 0xCE8 [15:8] | 0xCE8 [31:24] | 0xCE9 [15:8] | 0xCE9 [31:24] | 0xCEA [15:8] | 0xCEA [31:24] | 0xCEB [15:8] |
| 7 | 0x8EC [31:24] | 0x8ED [15:8] | 0x8ED [31:24] | 0x8EE [15:8] | 0x8EE [31:24] | 0x8EF [15:8] | 0x8EF [31:24] | 0x8F0 [15:8] | 0x8F0 [31:24] | 0x8F1 [15:8] | 0x8F1 [31:24] | 0x8F2 [15:8] | 0x8F2 [31:24] | 0x8F3 [15:8] | 0x8F3 [31:24] | 0x8F4 [15:8] |
| 8 | 0xCEC [31:24] | 0xCED [15:8] | 0xCED [31:24] | 0xCEE [15:8] | 0xCEE [31:24] | 0xCEF [15:8] | 0xCEF [31:24] | 0xCF0 [15:8] | 0xCF0 [31:24] | 0xCF1 [15:8] | 0xCF1 [31:24] | 0xCF2 [15:8] | 0xCF2 [31:24] | 0xCF3 [15:8] | 0xCF3 [31:24] | 0xCF4 [15:8] |
| 9 | 0x8F5 [31:24] | 0x8F6 [15:8] | 0x8F6 [31:24] | 0x8F7 [15:8] | 0x8F7 [31:24] | 0x8F8 [15:8] | 0x8F8 [31:24] | 0x8F9 [15:8] | 0x8F9 [31:24] | 0x8FA [15:8] | 0x8FA [31:24] | 0x8FB [15:8] | 0x8FB [31:24] | 0x8FC [15:8] | 0x8FC [31:24] | 0x8FD [15:8] |
| 10 | 0xCF5 [31:24] | 0xCF6 [15:8] | 0xCF6 [31:24] | 0xCF7 [15:8] | 0xCF7 [31:24] | 0xCF8 [15:8] | 0xCF8 [31:24] | 0xCF9 [15:8] | 0xCF9 [31:24] | 0xCFA [15:8] | 0xCFA [31:24] | 0xCFB [15:8] | 0xCFB [31:24] | 0xCFC [15:8] | 0xCFC [31:24] | 0xCFD [15:8] |
| 11 | 0x8FE [31:24] | 0x8FF [15:8] | 0x8FF [31:24] | 0x900 [15:8] | 0x900 [31:24] | 0x901 [15:8] | 0x901 [31:24] | 0x902 [15:8] | 0x902 [31:24] | 0x903 [15:8] | 0x903 [31:24] | 0x904 [15:8] | 0x904 [31:24] | 0x905 [15:8] | 0x905 [31:24] | 0x906 [15:8] |
| 12 | 0xCFE [31:24] | 0xCFF [15:8] | 0xCFF [31:24] | 0xD00 [15:8] | 0xD00 [31:24] | 0xD01 [15:8] | 0xD01 [31:24] | 0xD02 [15:8] | 0xD02 [31:24] | 0xD03 [15:8] | 0xD03 [31:24] | 0xD04 [15:8] | 0xD04 [31:24] | 0xD05 [15:8] | 0xD05 [31:24] | 0xD06 [15:8] |
| 13 | 0x907 [31:24] | 0x908 [15:8] | 0x908 [31:24] | 0x909 [15:8] | 0x909 [31:24] | 0x90A [15:8] | 0x90A [31:24] | 0x90B [15:8] | 0x90B [31:24] | 0x90C [15:8] | 0x90C [31:24] | 0x90D [15:8] | 0x90D [31:24] | 0x90E [15:8] | 0x90E [31:24] | 0x90F [15:8] |
| 14 | 0xD07 [31:24] | 0xD08 [15:8] | 0xD08 [31:24] | 0xD09 [15:8] | 0xD09 [31:24] | 0xD0A [15:8] | 0xD0A [31:24] | 0xD0B [15:8] | 0xD0B [31:24] | 0xD0C [15:8] | 0xD0C [31:24] | 0xD0D [15:8] | 0xD0D [31:24] | 0xD0E [15:8] | 0xD0E [31:24] | 0xD0F [15:8] |
| 15 | 0x910 [31:24] | 0x911 [15:8] | 0x911 [31:24] | 0x912 [15:8] | 0x912 [31:24] | 0x913 [15:8] | 0x913 [31:24] | 0x914 [15:8] | 0x914 [31:24] | 0x915 [15:8] | 0x915 [31:24] | 0x916 [15:8] | 0x916 [31:24] | 0x917 [15:8] | 0x917 [31:24] | 0x918 [15:8] |

FIGURE 46. BYTE MAP FOR 'CENTER' QUARTER PIXEL 16x16 MCCROBLOCK--POSITION 6-of-9

| | | COLUMN | | | | | | | | | | | | | | | |
|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| ROW | 0 | 0xEC8 [15:8] | 0xEC8 [31:24] | 0xEC9 [15:8] | 0xEC9 [31:24] | 0xECA [15:8] | 0xECA [31:24] | 0xECB [15:8] | 0xECB [31:24] | 0xECC [15:8] | 0xECC [31:24] | 0xECD [15:8] | 0xECD [31:24] | 0xECE [15:8] | 0xECE [31:24] | 0xECF [15:8] | 0xECF [31:24] |
| | 1 | 0xAD1 [15:8] | 0xAD1 [31:24] | 0xAD2 [15:8] | 0xAD2 [31:24] | 0xAD3 [15:8] | 0xAD3 [31:24] | 0xAD4 [15:8] | 0xAD4 [31:24] | 0xAD5 [15:8] | 0xAD5 [31:24] | 0xAD6 [15:8] | 0xAD6 [31:24] | 0xAD7 [15:8] | 0xAD7 [31:24] | 0xAD8 [15:8] | 0xAD8 [31:24] |
| | 2 | 0xED1 [15:8] | 0xED1 [31:24] | 0xED2 [15:8] | 0xED2 [31:24] | 0xED3 [15:8] | 0xED3 [31:24] | 0xED4 [15:8] | 0xED4 [31:24] | 0xED5 [15:8] | 0xED5 [31:24] | 0xED6 [15:8] | 0xED6 [31:24] | 0xED7 [15:8] | 0xED7 [31:24] | 0xED8 [15:8] | 0xED8 [31:24] |
| | 3 | 0xADA [15:8] | 0xADA [31:24] | 0xADB [15:8] | 0xADB [31:24] | 0xADC [15:8] | 0xADC [31:24] | 0xADD [15:8] | 0xADD [31:24] | 0xADE [15:8] | 0xADE [31:24] | 0xADF [15:8] | 0xADF [31:24] | 0xAE0 [15:8] | 0xAE0 [31:24] | 0xAE1 [15:8] | 0xAE1 [31:24] |
| | 4 | 0xEDA [15:8] | 0xEDA [31:24] | 0xEDB [15:8] | 0xEDB [31:24] | 0xEDC [15:8] | 0xEDC [31:24] | 0xEDD [15:8] | 0xEDD [31:24] | 0xEDE [15:8] | 0xEDE [31:24] | 0xEDF [15:8] | 0xEDF [31:24] | 0xEE0 [15:8] | 0xEE0 [31:24] | 0xEE1 [15:8] | 0xEE1 [31:24] |
| | 5 | 0xAE3 [15:8] | 0xAE3 [31:24] | 0xAE4 [15:8] | 0xAE4 [31:24] | 0xAE5 [15:8] | 0xAE5 [31:24] | 0xAE6 [15:8] | 0xAE6 [31:24] | 0xAE7 [15:8] | 0xAE7 [31:24] | 0xAE8 [15:8] | 0xAE8 [31:24] | 0xAE9 [15:8] | 0xAE9 [31:24] | 0xAEA [15:8] | 0xAEA [31:24] |
| | 6 | 0xEE3 [15:8] | 0xEE3 [31:24] | 0xEE4 [15:8] | 0xEE4 [31:24] | 0xEE5 [15:8] | 0xEE5 [31:24] | 0xEE6 [15:8] | 0xEE6 [31:24] | 0xEE7 [15:8] | 0xEE7 [31:24] | 0xEE8 [15:8] | 0xEE8 [31:24] | 0xEE9 [15:8] | 0xEE9 [31:24] | 0xEEA [15:8] | 0xEEA [31:24] |
| | 7 | 0xAEC [15:8] | 0xAEC [31:24] | 0xAED [15:8] | 0xAED [31:24] | 0xAEE [15:8] | 0xAEE [31:24] | 0xAEF [15:8] | 0xAEF [31:24] | 0xAF0 [15:8] | 0xAF0 [31:24] | 0xAF1 [15:8] | 0xAF1 [31:24] | 0xAF2 [15:8] | 0xAF2 [31:24] | 0xAF3 [15:8] | 0xAF3 [31:24] |
| | 8 | 0xEEC [15:8] | 0xEEC [31:24] | 0xEED [15:8] | 0xEED [31:24] | 0xEEE [15:8] | 0xEEE [31:24] | 0xEEF [15:8] | 0xEEF [31:24] | 0xEF0 [15:8] | 0xEF0 [31:24] | 0xEF1 [15:8] | 0xEF1 [31:24] | 0xEF2 [15:8] | 0xEF2 [31:24] | 0xEF3 [15:8] | 0xEF3 [31:24] |
| | 9 | 0xAF5 [15:8] | 0xAF5 [31:24] | 0xAF6 [15:8] | 0xAF6 [31:24] | 0xAF7 [15:8] | 0xAF7 [31:24] | 0xAF8 [15:8] | 0xAF8 [31:24] | 0xAF9 [15:8] | 0xAF9 [31:24] | 0xAFA [15:8] | 0xAFA [31:24] | 0xAFB [15:8] | 0xAFB [31:24] | 0xAFC [15:8] | 0xAFC [31:24] |
| | 10 | 0xEF5 [15:8] | 0xEF5 [31:24] | 0xEF6 [15:8] | 0xEF6 [31:24] | 0xEF7 [15:8] | 0xEF7 [31:24] | 0xEF8 [15:8] | 0xEF8 [31:24] | 0xEF9 [15:8] | 0xEF9 [31:24] | 0xEFA [15:8] | 0xEFA [31:24] | 0xEFB [15:8] | 0xEFB [31:24] | 0xEFC [15:8] | 0xEFC [31:24] |
| | 11 | 0xAFE [15:8] | 0xAFE [31:24] | 0xAFF [15:8] | 0xAFF [31:24] | 0xB00 [15:8] | 0xB00 [31:24] | 0xB01 [15:8] | 0xB01 [31:24] | 0xB02 [15:8] | 0xB02 [31:24] | 0xB03 [15:8] | 0xB03 [31:24] | 0xB04 [15:8] | 0xB04 [31:24] | 0xB05 [15:8] | 0xB05 [31:24] |
| | 12 | 0xEFE [15:8] | 0xEFE [31:24] | 0xEFF [15:8] | 0xEFF [31:24] | 0xF00 [15:8] | 0xF00 [31:24] | 0xF01 [15:8] | 0xF01 [31:24] | 0xF02 [15:8] | 0xF02 [31:24] | 0xF03 [15:8] | 0xF03 [31:24] | 0xF04 [15:8] | 0xF04 [31:24] | 0xF05 [15:8] | 0xF05 [31:24] |
| | 13 | 0xB07 [15:8] | 0xB07 [31:24] | 0xB08 [15:8] | 0xB08 [31:24] | 0xB09 [15:8] | 0xB09 [31:24] | 0xB0A [15:8] | 0xB0A [31:24] | 0xB0B [15:8] | 0xB0B [31:24] | 0xB0C [15:8] | 0xB0C [31:24] | 0xB0D [15:8] | 0xB0D [31:24] | 0xB0E [15:8] | 0xB0E [31:24] |
| | 14 | 0xF07 [15:8] | 0xF07 [31:24] | 0xF08 [15:8] | 0xF08 [31:24] | 0xF09 [15:8] | 0xF09 [31:24] | 0xF0A [15:8] | 0xF0A [31:24] | 0xF0B [15:8] | 0xF0B [31:24] | 0xF0C [15:8] | 0xF0C [31:24] | 0xF0D [15:8] | 0xF0D [31:24] | 0xF0E [15:8] | 0xF0E [31:24] |
| | 15 | 0xB10 [15:8] | 0xB10 [31:24] | 0xB11 [15:8] | 0xB11 [31:24] | 0xB12 [15:8] | 0xB12 [31:24] | 0xB13 [15:8] | 0xB13 [31:24] | 0xB14 [15:8] | 0xB14 [31:24] | 0xB15 [15:8] | 0xB15 [31:24] | 0xB16 [15:8] | 0xB16 [31:24] | 0xB17 [15:8] | 0xB17 [31:24] |

FIGURE 47. BYTE MAP FOR 'CENTER' QUARTER PIXEL 16x16 MACROBLOCK--POSITION 7-of-9

| ROW | | COLUMN 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| ROW | 0 | 0xEC8 [23:16] | 0xEC9 [7:0] | 0xEC9 [23:16] | 0xECA [7:0] | 0xECA [23:16] | 0xECB [7:0] | 0xECB [23:16] | 0xECC [7:0] | 0xECC [23:16] | 0xECD [7:0] | 0xECD [23:16] | 0xECE [7:0] | 0xECE [23:16] | 0xECF [7:0] | 0xECF [23:16] | 0xED0 [7:0] |
| | 1 | 0xAD1 [23:16] | 0xAD2 [7:0] | 0xAD2 [23:16] | 0xAD3 [7:0] | 0xAD3 [23:16] | 0xAD4 [7:0] | 0xAD4 [23:16] | 0xAD5 [7:0] | 0xAD5 [23:16] | 0xAD6 [7:0] | 0xAD6 [23:16] | 0xAD7 [7:0] | 0xAD7 [23:16] | 0xAD8 [7:0] | 0xAD8 [23:16] | 0xAD9 [7:0] |
| | 2 | 0xED1 [23:16] | 0xED2 [7:0] | 0xED2 [23:16] | 0xED3 [7:0] | 0xED3 [23:16] | 0xED4 [7:0] | 0xED4 [23:16] | 0xED5 [7:0] | 0xED5 [23:16] | 0xED6 [7:0] | 0xED6 [23:16] | 0xED7 [7:0] | 0xED7 [23:16] | 0xED8 [7:0] | 0xED8 [23:16] | 0xED9 [7:0] |
| | 3 | 0xADA [23:16] | 0xADB [7:0] | 0xADB [23:16] | 0xADC [7:0] | 0xADC [23:16] | 0xADD [7:0] | 0xADD [23:16] | 0xADE [7:0] | 0xADE [23:16] | 0xADF [7:0] | 0xADF [23:16] | 0xAE0 [7:0] | 0xAE0 [23:16] | 0xAE1 [7:0] | 0xAE1 [23:16] | 0xAE2 [7:0] |
| | 4 | 0xEDA [23:16] | 0xEDB [7:0] | 0xEDB [23:16] | 0xEDC [7:0] | 0xEDC [23:16] | 0xEDD [7:0] | 0xEDD [23:16] | 0xEDE [7:0] | 0xEDE [23:16] | 0xEDF [7:0] | 0xEDF [23:16] | 0xEE0 [7:0] | 0xEE0 [23:16] | 0xEE1 [7:0] | 0xEE1 [23:16] | 0xEE2 [7:0] |
| | 5 | 0xAE3 [23:16] | 0xAE4 [7:0] | 0xAE4 [23:16] | 0xAE5 [7:0] | 0xAE5 [23:16] | 0xAE6 [7:0] | 0xAE6 [23:16] | 0xAE7 [7:0] | 0xAE7 [23:16] | 0xAE8 [7:0] | 0xAE8 [23:16] | 0xAE9 [7:0] | 0xAE9 [23:16] | 0xAEA [7:0] | 0xAEA [23:16] | 0xAEB [7:0] |
| | 6 | 0xEE3 [23:16] | 0xEE4 [7:0] | 0xEE4 [23:16] | 0xEE5 [7:0] | 0xEE5 [23:16] | 0xEE6 [7:0] | 0xEE6 [23:16] | 0xEE7 [7:0] | 0xEE7 [23:16] | 0xEE8 [7:0] | 0xEE8 [23:16] | 0xEE9 [7:0] | 0xEE9 [23:16] | 0xEEA [7:0] | 0xEEA [23:16] | 0xEEB [7:0] |
| | 7 | 0xAEC [23:16] | 0xAED [7:0] | 0xAED [23:16] | 0xAEE [7:0] | 0xAEE [23:16] | 0xAEF [7:0] | 0xAEF [23:16] | 0xAF0 [7:0] | 0xAF0 [23:16] | 0xAF1 [7:0] | 0xAF1 [23:16] | 0xAF2 [7:0] | 0xAF2 [23:16] | 0xAF3 [7:0] | 0xAF3 [23:16] | 0xAF4 [7:0] |
| | 8 | 0xEEC [23:16] | 0xEED [7:0] | 0xEED [23:16] | 0xEEE [7:0] | 0xEEE [23:16] | 0xEEF [7:0] | 0xEEF [23:16] | 0xEF0 [7:0] | 0xEF0 [23:16] | 0xEF1 [7:0] | 0xEF1 [23:16] | 0xEF2 [7:0] | 0xEF2 [23:16] | 0xEF3 [7:0] | 0xEF3 [23:16] | 0xEF4 [7:0] |
| | 9 | 0xAF5 [23:16] | 0xAF6 [7:0] | 0xAF6 [23:16] | 0xAF7 [7:0] | 0xAF7 [23:16] | 0xAF8 [7:0] | 0xAF8 [23:16] | 0xAF9 [7:0] | 0xAF9 [23:16] | 0xAFA [7:0] | 0xAFA [23:16] | 0xAFB [7:0] | 0xAFB [23:16] | 0xAFC [7:0] | 0xAFC [23:16] | 0xAFD [7:0] |
| | 10 | 0xEF5 [23:16] | 0xEF6 [7:0] | 0xEF6 [23:16] | 0xEF7 [7:0] | 0xEF7 [23:16] | 0xEF8 [7:0] | 0xEF8 [23:16] | 0xEF9 [7:0] | 0xEF9 [23:16] | 0xEFA [7:0] | 0xEFA [23:16] | 0xEFB [7:0] | 0xEFB [23:16] | 0xEFC [7:0] | 0xEFC [23:16] | 0xEFD [7:0] |
| | 11 | 0xAFE [23:16] | 0xAFF [7:0] | 0xAFF [23:16] | 0xB00 [7:0] | 0xB00 [23:16] | 0xB01 [7:0] | 0xB01 [23:16] | 0xB02 [7:0] | 0xB02 [23:16] | 0xB03 [7:0] | 0xB03 [23:16] | 0xB04 [7:0] | 0xB04 [23:16] | 0xB05 [7:0] | 0xB05 [23:16] | 0xB06 [7:0] |
| | 12 | 0xEFE [23:16] | 0xEFF [7:0] | 0xEFF [23:16] | 0xF00 [7:0] | 0xF00 [23:16] | 0xF01 [7:0] | 0xF01 [23:16] | 0xF02 [7:0] | 0xF02 [23:16] | 0xF03 [7:0] | 0xF03 [23:16] | 0xF04 [7:0] | 0xF04 [23:16] | 0xF05 [7:0] | 0xF05 [23:16] | 0xF06 [7:0] |
| | 13 | 0xB07 [23:16] | 0xB08 [7:0] | 0xB08 [23:16] | 0xB09 [7:0] | 0xB09 [23:16] | 0xB0A [7:0] | 0xB0A [23:16] | 0xB0B [7:0] | 0xB0B [23:16] | 0xB0C [7:0] | 0xB0C [23:16] | 0xB0D [7:0] | 0xB0D [23:16] | 0xB0E [7:0] | 0xB0E [23:16] | 0xB0F [7:0] |
| | 14 | 0xF07 [23:16] | 0xF08 [7:0] | 0xF08 [23:16] | 0xF09 [7:0] | 0xF09 [23:16] | 0xF0A [7:0] | 0xF0A [23:16] | 0xF0B [7:0] | 0xF0B [23:16] | 0xF0C [7:0] | 0xF0C [23:16] | 0xF0D [7:0] | 0xF0D [23:16] | 0xF0E [7:0] | 0xF0E [23:16] | 0xF0F [7:0] |
| | 15 | 0xB10 [23:16] | 0xB11 [7:0] | 0xB11 [23:16] | 0xB12 [7:0] | 0xB12 [23:16] | 0xB13 [7:0] | 0xB13 [23:16] | 0xB14 [7:0] | 0xB14 [23:16] | 0xB15 [7:0] | 0xB15 [23:16] | 0xB16 [7:0] | 0xB16 [23:16] | 0xB17 [7:0] | 0xB17 [23:16] | 0xB18 [7:0] |

FIGURE 48. BYTE MAP FOR 'CENTER' QUARTER PIXEL 16x16 MACROBLOCK--POSITION 8-of-9

| ROW | | COLUMN | | | | | | | | | | | | | | | |
|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| ROW | 0 | 0xEC8<br>[31:24] | 0xEC9<br>[15:8] | 0xEC9<br>[31:24] | 0xECA<br>[15:8] | 0xECA<br>[31:24] | 0xECB<br>[15:8] | 0xECB<br>[31:24] | 0xECC<br>[15:8] | 0xECC<br>[31:24] | 0xECD<br>[15:8] | 0xECD<br>[31:24] | 0xECE<br>[15:8] | 0xECE<br>[31:24] | 0xECF<br>[15:8] | 0xECF<br>[31:24] | 0xED0<br>[15:8] |
| | 1 | 0xAD1<br>[31:24] | 0xAD2<br>[15:8] | 0xAD2<br>[31:24] | 0xAD3<br>[15:8] | 0xAD3<br>[31:24] | 0xAD4<br>[15:8] | 0xAD4<br>[31:24] | 0xAD5<br>[15:8] | 0xAD5<br>[31:24] | 0xAD6<br>[15:8] | 0xAD6<br>[31:24] | 0xAD7<br>[15:8] | 0xAD7<br>[31:24] | 0xAD8<br>[15:8] | 0xAD8<br>[31:24] | 0xAD9<br>[15:8] |
| | 2 | 0xED1<br>[31:24] | 0xED2<br>[15:8] | 0xED2<br>[31:24] | 0xED3<br>[15:8] | 0xED3<br>[31:24] | 0xED4<br>[15:8] | 0xED4<br>[31:24] | 0xED5<br>[15:8] | 0xED5<br>[31:24] | 0xED6<br>[15:8] | 0xED6<br>[31:24] | 0xED7<br>[15:8] | 0xED7<br>[31:24] | 0xED8<br>[15:8] | 0xED8<br>[31:24] | 0xED9<br>[15:8] |
| | 3 | 0xADA<br>[31:24] | 0xADB<br>[15:8] | 0xADB<br>[31:24] | 0xADC<br>[15:8] | 0xADC<br>[31:24] | 0xADD<br>[15:8] | 0xADD<br>[31:24] | 0xADE<br>[15:8] | 0xADE<br>[31:24] | 0xADF<br>[15:8] | 0xADF<br>[31:24] | 0xAE0<br>[15:8] | 0xAE0<br>[31:24] | 0xAE1<br>[15:8] | 0xAE1<br>[31:24] | 0xAE2<br>[15:8] |
| | 4 | 0xEDA<br>[31:24] | 0xEDB<br>[15:8] | 0xEDB<br>[31:24] | 0xEDC<br>[15:8] | 0xEDC<br>[31:24] | 0xEDD<br>[15:8] | 0xEDD<br>[31:24] | 0xEDE<br>[15:8] | 0xEDE<br>[31:24] | 0xEDF<br>[15:8] | 0xEDF<br>[31:24] | 0xEE0<br>[15:8] | 0xEE0<br>[31:24] | 0xEE1<br>[15:8] | 0xEE1<br>[31:24] | 0xEE2<br>[15:8] |
| | 5 | 0xAE3<br>[31:24] | 0xAE4<br>[15:8] | 0xAE4<br>[31:24] | 0xAE5<br>[15:8] | 0xAE5<br>[31:24] | 0xAE6<br>[15:8] | 0xAE6<br>[31:24] | 0xAE7<br>[15:8] | 0xAE7<br>[31:24] | 0xAE8<br>[15:8] | 0xAE8<br>[31:24] | 0xAE9<br>[15:8] | 0xAE9<br>[31:24] | 0xAEA<br>[15:8] | 0xAEA<br>[31:24] | 0xAEB<br>[15:8] |
| | 6 | 0xEE3<br>[31:24] | 0xEE4<br>[15:8] | 0xEE4<br>[31:24] | 0xEE5<br>[15:8] | 0xEE5<br>[31:24] | 0xEE6<br>[15:8] | 0xEE6<br>[31:24] | 0xEE7<br>[15:8] | 0xEE7<br>[31:24] | 0xEE8<br>[15:8] | 0xEE8<br>[31:24] | 0xEE9<br>[15:8] | 0xEE9<br>[31:24] | 0xEEA<br>[15:8] | 0xEEA<br>[31:24] | 0xEEB<br>[15:8] |
| | 7 | 0xAEC<br>[31:24] | 0xAED<br>[15:8] | 0xAED<br>[31:24] | 0xAEE<br>[15:8] | 0xAEE<br>[31:24] | 0xAEF<br>[15:8] | 0xAEF<br>[31:24] | 0xAF0<br>[15:8] | 0xAF0<br>[31:24] | 0xAF1<br>[15:8] | 0xAF1<br>[31:24] | 0xAF2<br>[15:8] | 0xAF2<br>[31:24] | 0xAF3<br>[15:8] | 0xAF3<br>[31:24] | 0xAF4<br>[15:8] |
| | 8 | 0xEEC<br>[31:24] | 0xEED<br>[15:8] | 0xEED<br>[31:24] | 0xEEE<br>[15:8] | 0xEEE<br>[31:24] | 0xEEF<br>[15:8] | 0xEEF<br>[31:24] | 0xEF0<br>[15:8] | 0xEF0<br>[31:24] | 0xEF1<br>[15:8] | 0xEF1<br>[31:24] | 0xEF2<br>[15:8] | 0xEF2<br>[31:24] | 0xEF3<br>[15:8] | 0xEF3<br>[31:24] | 0xEF4<br>[15:8] |
| | 9 | 0xAF5<br>[31:24] | 0xAF6<br>[15:8] | 0xAF6<br>[31:24] | 0xAF7<br>[15:8] | 0xAF7<br>[31:24] | 0xAF8<br>[15:8] | 0xAF8<br>[31:24] | 0xAF9<br>[15:8] | 0xAF9<br>[31:24] | 0xAFA<br>[15:8] | 0xAFA<br>[31:24] | 0xAFB<br>[15:8] | 0xAFB<br>[31:24] | 0xAFC<br>[15:8] | 0xAFC<br>[31:24] | 0xAFD<br>[15:8] |
| | 10 | 0xEF5<br>[31:24] | 0xEF6<br>[15:8] | 0xEF6<br>[31:24] | 0xEF7<br>[15:8] | 0xEF7<br>[31:24] | 0xEF8<br>[15:8] | 0xEF8<br>[31:24] | 0xEF9<br>[15:8] | 0xEF9<br>[31:24] | 0xEFA<br>[15:8] | 0xEFA<br>[31:24] | 0xEFB<br>[15:8] | 0xEFB<br>[31:24] | 0xEFC<br>[15:8] | 0xEFC<br>[31:24] | 0xEFD<br>[15:8] |
| | 11 | 0xAFE<br>[31:24] | 0xAFF<br>[15:8] | 0xAFF<br>[31:24] | 0xB00<br>[15:8] | 0xB00<br>[31:24] | 0xB01<br>[15:8] | 0xB01<br>[31:24] | 0xB02<br>[15:8] | 0xB02<br>[31:24] | 0xB03<br>[15:8] | 0xB03<br>[31:24] | 0xB04<br>[15:8] | 0xB04<br>[31:24] | 0xB05<br>[15:8] | 0xB05<br>[31:24] | 0xB06<br>[15:8] |
| | 12 | 0xEFE<br>[31:24] | 0xEFF<br>[15:8] | 0xEFF<br>[31:24] | 0xF00<br>[15:8] | 0xF00<br>[31:24] | 0xF01<br>[15:8] | 0xF01<br>[31:24] | 0xF02<br>[15:8] | 0xF02<br>[31:24] | 0xF03<br>[15:8] | 0xF03<br>[31:24] | 0xF04<br>[15:8] | 0xF04<br>[31:24] | 0xF05<br>[15:8] | 0xF05<br>[31:24] | 0xF06<br>[15:8] |
| | 13 | 0xB07<br>[31:24] | 0xB08<br>[15:8] | 0xB08<br>[31:24] | 0xB09<br>[15:8] | 0xB09<br>[31:24] | 0xB0A<br>[15:8] | 0xB0A<br>[31:24] | 0xB0B<br>[15:8] | 0xB0B<br>[31:24] | 0xB0C<br>[15:8] | 0xB0C<br>[31:24] | 0xB0D<br>[15:8] | 0xB0D<br>[31:24] | 0xB0E<br>[15:8] | 0xB0E<br>[31:24] | 0xB0F<br>[15:8] |
| | 14 | 0xF07<br>[31:24] | 0xF08<br>[15:8] | 0xF08<br>[31:24] | 0xF09<br>[15:8] | 0xF09<br>[31:24] | 0xF0A<br>[15:8] | 0xF0A<br>[31:24] | 0xF0B<br>[15:8] | 0xF0B<br>[31:24] | 0xF0C<br>[15:8] | 0xF0C<br>[31:24] | 0xF0D<br>[15:8] | 0xF0D<br>[31:24] | 0xF0E<br>[15:8] | 0xF0E<br>[31:24] | 0xF0F<br>[15:8] |
| | 15 | 0xB10<br>[31:24] | 0xB11<br>[15:8] | 0xB11<br>[31:24] | 0xB12<br>[15:8] | 0xB12<br>[31:24] | 0xB13<br>[15:8] | 0xB13<br>[31:24] | 0xB14<br>[15:8] | 0xB14<br>[31:24] | 0xB15<br>[15:8] | 0xB15<br>[31:24] | 0xB16<br>[15:8] | 0xB16<br>[31:24] | 0xB17<br>[15:8] | 0xB17<br>[31:24] | 0xB18<br>[15:8] |

FIGURE 49 BYTE MAP FOR 'CENTER' QUARTER PIXEL 16x16 MACROBLOCK--POSITION 9-of-9

Figure 50:
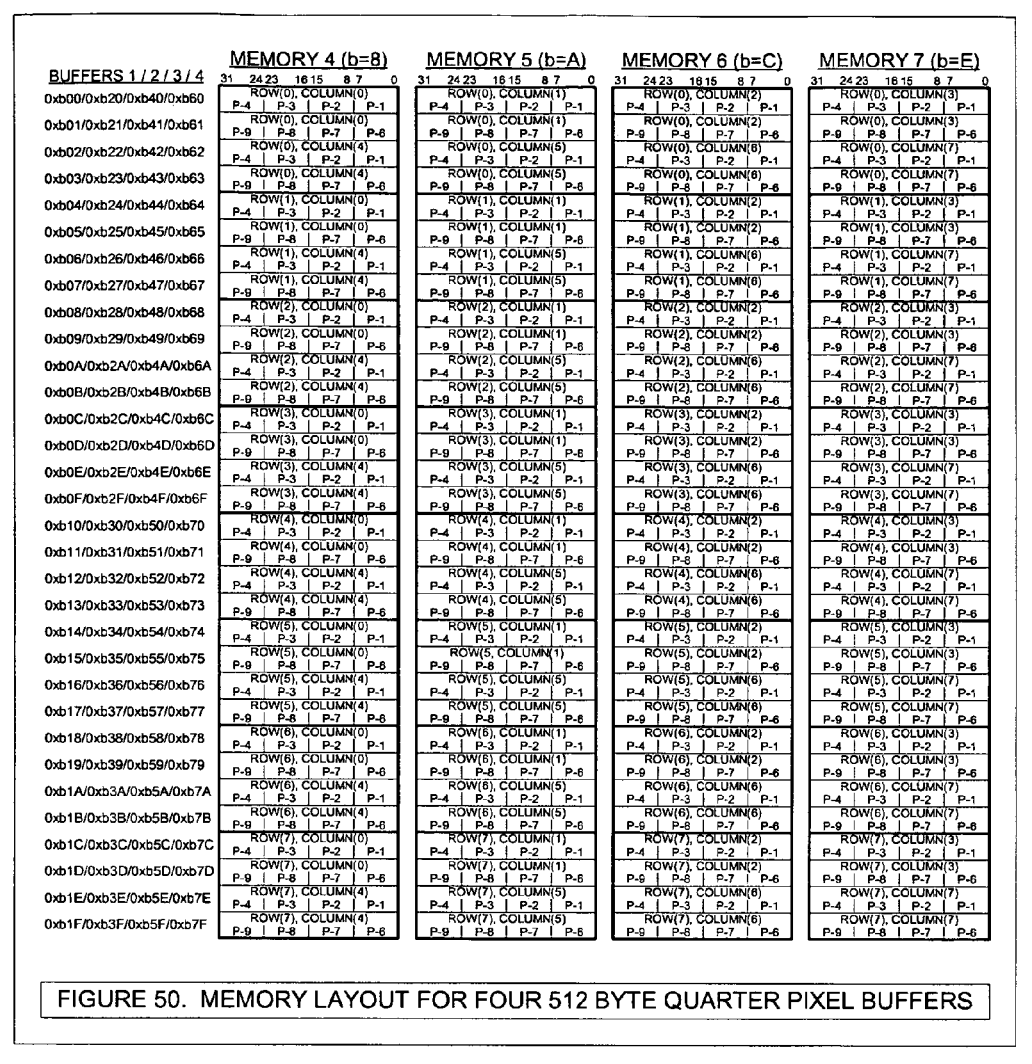

Bit positions for each memory word: 31 24 23 16 15 8 7 0

| BUFFERS 1 / 2 / 3 / 4 | MEMORY 4 (b=8) | MEMORY 5 (b=A) | MEMORY 6 (b=C) | MEMORY 7 (b=E) |
|---|---|---|---|---|
| 0xb00/0xb20/0xb40/0xb60 | ROW(0), COLUMN(0)<br>P-4 P-3 P-2 P-1 | ROW(0), COLUMN(1)<br>P-4 P-3 P-2 P-1 | ROW(0), COLUMN(2)<br>P-4 P-3 P-2 P-1 | ROW(0), COLUMN(3)<br>P-4 P-3 P-2 P-1 |
| 0xb01/0xb21/0xb41/0xb61 | ROW(0), COLUMN(0)<br>P-9 P-8 P-7 P-6 | ROW(0), COLUMN(1)<br>P-9 P-8 P-7 P-6 | ROW(0), COLUMN(2)<br>P-9 P-8 P-7 P-6 | ROW(0), COLUMN(3)<br>P-9 P-8 P-7 P-6 |
| 0xb02/0xb22/0xb42/0xb62 | ROW(0), COLUMN(4)<br>P-4 P-3 P-2 P-1 | ROW(0), COLUMN(5)<br>P-4 P-3 P-2 P-1 | ROW(0), COLUMN(6)<br>P-4 P-3 P-2 P-1 | ROW(0), COLUMN(7)<br>P-4 P-3 P-2 P-1 |
| 0xb03/0xb23/0xb43/0xb63 | ROW(0), COLUMN(4)<br>P-9 P-8 P-7 P-6 | ROW(0), COLUMN(5)<br>P-9 P-8 P-7 P-6 | ROW(0), COLUMN(6)<br>P-9 P-8 P-7 P-6 | ROW(0), COLUMN(7)<br>P-9 P-8 P-7 P-6 |
| 0xb04/0xb24/0xb44/0xb64 | ROW(1), COLUMN(0)<br>P-4 P-3 P-2 P-1 | ROW(1), COLUMN(1)<br>P-4 P-3 P-2 P-1 | ROW(1), COLUMN(2)<br>P-4 P-3 P-2 P-1 | ROW(1), COLUMN(3)<br>P-4 P-3 P-2 P-1 |
| 0xb05/0xb25/0xb45/0xb65 | ROW(1), COLUMN(0)<br>P-9 P-8 P-7 P-6 | ROW(1), COLUMN(1)<br>P-9 P-8 P-7 P-6 | ROW(1), COLUMN(2)<br>P-9 P-8 P-7 P-6 | ROW(1), COLUMN(3)<br>P-9 P-8 P-7 P-6 |
| 0xb06/0xb26/0xb46/0xb66 | ROW(1), COLUMN(4)<br>P-4 P-3 P-2 P-1 | ROW(1), COLUMN(5)<br>P-4 P-3 P-2 P-1 | ROW(1), COLUMN(6)<br>P-4 P-3 P-2 P-1 | ROW(1), COLUMN(7)<br>P-4 P-3 P-2 P-1 |
| 0xb07/0xb27/0xb47/0xb67 | ROW(1), COLUMN(4)<br>P-9 P-8 P-7 P-6 | ROW(1), COLUMN(5)<br>P-9 P-8 P-7 P-6 | ROW(1), COLUMN(6)<br>P-9 P-8 P-7 P-6 | ROW(1), COLUMN(7)<br>P-9 P-8 P-7 P-6 |
| 0xb08/0xb28/0xb48/0xb68 | ROW(2), COLUMN(0)<br>P-4 P-3 P-2 P-1 | ROW(2), COLUMN(1)<br>P-4 P-3 P-2 P-1 | ROW(2), COLUMN(2)<br>P-4 P-3 P-2 P-1 | ROW(2), COLUMN(3)<br>P-4 P-3 P-2 P-1 |
| 0xb09/0xb29/0xb49/0xb69 | ROW(2), COLUMN(0)<br>P-9 P-8 P-7 P-6 | ROW(2), COLUMN(1)<br>P-9 P-8 P-7 P-6 | ROW(2), COLUMN(2)<br>P-9 P-8 P-7 P-6 | ROW(2), COLUMN(3)<br>P-9 P-8 P-7 P-6 |
| 0xb0A/0xb2A/0xb4A/0xb6A | ROW(2), COLUMN(4)<br>P-4 P-3 P-2 P-1 | ROW(2), COLUMN(5)<br>P-4 P-3 P-2 P-1 | ROW(2), COLUMN(6)<br>P-4 P-3 P-2 P-1 | ROW(2), COLUMN(7)<br>P-4 P-3 P-2 P-1 |
| 0xb0B/0xb2B/0xb4B/0xb6B | ROW(2), COLUMN(4)<br>P-9 P-8 P-7 P-6 | ROW(2), COLUMN(5)<br>P-9 P-8 P-7 P-6 | ROW(2), COLUMN(6)<br>P-9 P-8 P-7 P-6 | ROW(2), COLUMN(7)<br>P-9 P-8 P-7 P-6 |
| 0xb0C/0xb2C/0xb4C/0xb6C | ROW(3), COLUMN(0)<br>P-4 P-3 P-2 P-1 | ROW(3), COLUMN(1)<br>P-4 P-3 P-2 P-1 | ROW(3), COLUMN(2)<br>P-4 P-3 P-2 P-1 | ROW(3), COLUMN(3)<br>P-4 P-3 P-2 P-1 |
| 0xb0D/0xb2D/0xb4D/0xb6D | ROW(3), COLUMN(0)<br>P-9 P-8 P-7 P-6 | ROW(3), COLUMN(1)<br>P-9 P-8 P-7 P-6 | ROW(3), COLUMN(2)<br>P-9 P-8 P-7 P-6 | ROW(3), COLUMN(3)<br>P-9 P-8 P-7 P-6 |
| 0xb0E/0xb2E/0xb4E/0xb6E | ROW(3), COLUMN(4)<br>P-4 P-3 P-2 P-1 | ROW(3), COLUMN(5)<br>P-4 P-3 P-2 P-1 | ROW(3), COLUMN(6)<br>P-4 P-3 P-2 P-1 | ROW(3), COLUMN(7)<br>P-4 P-3 P-2 P-1 |
| 0xb0F/0xb2F/0xb4F/0xb6F | ROW(3), COLUMN(4)<br>P-9 P-8 P-7 P-6 | ROW(3), COLUMN(5)<br>P-9 P-8 P-7 P-6 | ROW(3), COLUMN(6)<br>P-9 P-8 P-7 P-6 | ROW(3), COLUMN(7)<br>P-9 P-8 P-7 P-6 |
| 0xb10/0xb30/0xb50/0xb70 | ROW(4), COLUMN(0)<br>P-4 P-3 P-2 P-1 | ROW(4), COLUMN(1)<br>P-4 P-3 P-2 P-1 | ROW(4), COLUMN(2)<br>P-4 P-3 P-2 P-1 | ROW(4), COLUMN(3)<br>P-4 P-3 P-2 P-1 |
| 0xb11/0xb31/0xb51/0xb71 | ROW(4), COLUMN(0)<br>P-9 P-8 P-7 P-6 | ROW(4), COLUMN(1)<br>P-9 P-8 P-7 P-6 | ROW(4), COLUMN(2)<br>P-9 P-8 P-7 P-6 | ROW(4), COLUMN(3)<br>P-9 P-8 P-7 P-6 |
| 0xb12/0xb32/0xb52/0xb72 | ROW(4), COLUMN(4)<br>P-4 P-3 P-2 P-1 | ROW(4), COLUMN(5)<br>P-4 P-3 P-2 P-1 | ROW(4), COLUMN(6)<br>P-4 P-3 P-2 P-1 | ROW(4), COLUMN(7)<br>P-4 P-3 P-2 P-1 |
| 0xb13/0xb33/0xb53/0xb73 | ROW(4), COLUMN(4)<br>P-9 P-8 P-7 P-6 | ROW(4), COLUMN(5)<br>P-9 P-8 P-7 P-6 | ROW(4), COLUMN(6)<br>P-9 P-8 P-7 P-6 | ROW(4), COLUMN(7)<br>P-9 P-8 P-7 P-6 |
| 0xb14/0xb34/0xb54/0xb74 | ROW(5), COLUMN(0)<br>P-4 P-3 P-2 P-1 | ROW(5), COLUMN(1)<br>P-4 P-3 P-2 P-1 | ROW(5), COLUMN(2)<br>P-4 P-3 P-2 P-1 | ROW(5), COLUMN(3)<br>P-4 P-3 P-2 P-1 |
| 0xb15/0xb35/0xb55/0xb75 | ROW(5), COLUMN(0)<br>P-9 P-8 P-7 P-6 | ROW(5, COLUMN(1)<br>P-9 P-8 P-7 P-6 | ROW(5), COLUMN(2)<br>P-9 P-8 P-7 P-6 | ROW(5), COLUMN(3)<br>P-9 P-8 P-7 P-6 |
| 0xb16/0xb36/0xb56/0xb76 | ROW(5), COLUMN(4)<br>P-4 P-3 P-2 P-1 | ROW(5), COLUMN(5)<br>P-4 P-3 P-2 P-1 | ROW(5), COLUMN(6)<br>P-4 P-3 P-2 P-1 | ROW(5), COLUMN(7)<br>P-4 P-3 P-2 P-1 |
| 0xb17/0xb37/0xb57/0xb77 | ROW(5), COLUMN(4)<br>P-9 P-8 P-7 P-6 | ROW(5), COLUMN(5)<br>P-9 P-8 P-7 P-6 | ROW(5), COLUMN(6)<br>P-9 P-8 P-7 P-6 | ROW(5), COLUMN(7)<br>P-9 P-8 P-7 P-6 |
| 0xb18/0xb38/0xb58/0xb78 | ROW(6), COLUMN(0)<br>P-4 P-3 P-2 P-1 | ROW(6), COLUMN(1)<br>P-4 P-3 P-2 P-1 | ROW(6), COLUMN(2)<br>P-4 P-3 P-2 P-1 | ROW(6), COLUMN(3)<br>P-4 P-3 P-2 P-1 |
| 0xb19/0xb39/0xb59/0xb79 | ROW(6), COLUMN(0)<br>P-9 P-8 P-7 P-6 | ROW(6), COLUMN(1)<br>P-9 P-8 P-7 P-6 | ROW(6), COLUMN(2)<br>P-9 P-8 P-7 P-6 | ROW(6), COLUMN(3)<br>P-9 P-8 P-7 P-6 |
| 0xb1A/0xb3A/0xb5A/0xb7A | ROW(6), COLUMN(4)<br>P-4 P-3 P-2 P-1 | ROW(6), COLUMN(5)<br>P-4 P-3 P-2 P-1 | ROW(6), COLUMN(6)<br>P-4 P-3 P-2 P-1 | ROW(6), COLUMN(7)<br>P-4 P-3 P-2 P-1 |
| 0xb1B/0xb3B/0xb5B/0xb7B | ROW(6), COLUMN(4)<br>P-9 P-8 P-7 P-6 | ROW(6), COLUMN(5)<br>P-9 P-8 P-7 P-6 | ROW(6), COLUMN(6)<br>P-9 P-8 P-7 P-6 | ROW(6), COLUMN(7)<br>P-9 P-8 P-7 P-6 |
| 0xb1C/0xb3C/0xb5C/0xb7C | ROW(7), COLUMN(0)<br>P-4 P-3 P-2 P-1 | ROW(7), COLUMN(1)<br>P-4 P-3 P-2 P-1 | ROW(7), COLUMN(2)<br>P-4 P-3 P-2 P-1 | ROW(7), COLUMN(3)<br>P-4 P-3 P-2 P-1 |
| 0xb1D/0xb3D/0xb5D/0xb7D | ROW(7), COLUMN(0)<br>P-9 P-8 P-7 P-6 | ROW(7), COLUMN(1)<br>P-9 P-8 P-7 P-6 | ROW(7), COLUMN(2)<br>P-9 P-8 P-7 P-6 | ROW(7), COLUMN(3)<br>P-9 P-8 P-7 P-6 |
| 0xb1E/0xb3E/0xb5E/0xb7E | ROW(7), COLUMN(4)<br>P-4 P-3 P-2 P-1 | ROW(7), COLUMN(5)<br>P-4 P-3 P-2 P-1 | ROW(7), COLUMN(6)<br>P-4 P-3 P-2 P-1 | ROW(7), COLUMN(7)<br>P-4 P-3 P-2 P-1 |
| 0xb1F/0xb3F/0xb5F/0xb7F | ROW(7), COLUMN(4)<br>P-9 P-8 P-7 P-6 | ROW(7), COLUMN(5)<br>P-9 P-8 P-7 P-6 | ROW(7), COLUMN(6)<br>P-9 P-8 P-7 P-6 | ROW(7), COLUMN(7)<br>P-9 P-8 P-7 P-6 |

FIGURE 50. MEMORY LAYOUT FOR FOUR 512 BYTE QUARTER PIXEL BUFFERS

| | | COLUMN | | | | | | | |
|---|---|---|---|---|---|---|---|---|---|
| | | 0 | 1 | 2 | 3 | 4 | 5 | 6 | 7 |
| ROW | 0 | 0xAC8 [15:8] | 0xAC8 [31:24] | 0xAC9 [15:8] | 0xAC9 [31:24] | 0xACA [15:8] | 0xACA [31:24] | 0xACB [15:8] | 0xACB [31:24] |
| | 1 | 0xEC8 [15:8] | 0xEC8 [31:24] | 0xEC9 [15:8] | 0xEC9 [31:24] | 0xECA [15:8] | 0xECA [31:24] | 0xECB [15:8] | 0xECB [31:24] |
| | 2 | 0xACD [15:8] | 0xACD [31:24] | 0xACE [15:8] | 0xACE [31:24] | 0xACF [15:8] | 0xACF [31:24] | 0xAD0 [15:8] | 0xAD0 [31:24] |
| | 3 | 0xECD [15:8] | 0xECD [31:24] | 0xECE [15:8] | 0xECE [31:24] | 0xECF [15:8] | 0xECF [31:24] | 0xED0 [15:8] | 0xED0 [31:24] |
| | 4 | 0xAD2 [15:8] | 0xAD2 [31:24] | 0xAD3 [15:8] | 0xAD3 [31:24] | 0xAD4 [15:8] | 0xAD4 [31:24] | 0xAD5 [15:8] | 0xAD5 [31:24] |
| | 5 | 0xED2 [15:8] | 0xED2 [31:24] | 0xED3 [15:8] | 0xED3 [31:24] | 0xED4 [15:8] | 0xED4 [31:24] | 0xED5 [15:8] | 0xED5 [31:24] |
| | 6 | 0xAD7 [15:8] | 0xAD7 [31:24] | 0xAD8 [15:8] | 0xAD8 [31:24] | 0xAD9 [15:8] | 0xAD9 [31:24] | 0xADA [15:8] | 0xADA [31:24] |
| | 7 | 0xED7 [15:8] | 0xED7 [31:24] | 0xED8 [15:8] | 0xED8 [31:24] | 0xED9 [15:8] | 0xED9 [31:24] | 0xEDA [15:8] | 0xEDA [31:24] |

HALF PIXEL BUFFER 1

| | | COLUMN | | | | | | | |
|---|---|---|---|---|---|---|---|---|---|
| | | 0 | 1 | 2 | 3 | 4 | 5 | 6 | 7 |
| ROW | 0 | 0xAE4 [15:8] | 0xAE4 [31:24] | 0xAE5 [15:8] | 0xAE5 [31:24] | 0xAE6 [15:8] | 0xAE6 [31:24] | 0xAE7 [15:8] | 0xAE7 [31:24] |
| | 1 | 0xEE4 [15:8] | 0xEE4 [31:24] | 0xEE5 [15:8] | 0xEE5 [31:24] | 0xEE6 [15:8] | 0xEE6 [31:24] | 0xEE7 [15:8] | 0xEE7 [31:24] |
| | 2 | 0xAE9 [15:8] | 0xAE9 [31:24] | 0xAEA [15:8] | 0xAEA [31:24] | 0xAEB [15:8] | 0xAEB [31:24] | 0xAEC [15:8] | 0xAEC [31:24] |
| | 3 | 0xEE9 [15:8] | 0xEE9 [31:24] | 0xEEA [15:8] | 0xEEA [31:24] | 0xEEB [15:8] | 0xEEB [31:24] | 0xEEC [15:8] | 0xEEC [31:24] |
| | 4 | 0xAEE [15:8] | 0xAEE [31:24] | 0xAEF [15:8] | 0xAEF [31:24] | 0xAF0 [15:8] | 0xAF0 [31:24] | 0xAF1 [15:8] | 0xAF1 [31:24] |
| | 5 | 0xEEE [15:8] | 0xEEE [31:24] | 0xEEF [15:8] | 0xEEF [31:24] | 0xEF0 [15:8] | 0xEF0 [31:24] | 0xEF1 [15:8] | 0xEF1 [31:24] |
| | 6 | 0xAF3 [15:8] | 0xAF3 [31:24] | 0xAF4 [15:8] | 0xAF4 [31:24] | 0xAF5 [15:8] | 0xAF5 [31:24] | 0xAF6 [15:8] | 0xAF6 [31:24] |
| | 7 | 0xEF3 [15:8] | 0xEF3 [31:24] | 0xEF4 [15:8] | 0xEF4 [31:24] | 0xEF5 [15:8] | 0xEF5 [31:24] | 0xEF6 [15:8] | 0xEF6 [31:24] |

HALF PIXEL BUFFER 2

| | | COLUMN | | | | | | | |
|---|---|---|---|---|---|---|---|---|---|
| | | 0 | 1 | 2 | 3 | 4 | 5 | 6 | 7 |
| ROW | 0 | 0xB00 [15:8] | 0xB00 [31:24] | 0xB01 [15:8] | 0xB01 [31:24] | 0xB02 [15:8] | 0xB02 [31:24] | 0xB03 [15:8] | 0xB03 [31:24] |
| | 1 | 0xF00 [15:8] | 0xF00 [31:24] | 0xF01 [15:8] | 0xF01 [31:24] | 0xF02 [15:8] | 0xF02 [31:24] | 0xF03 [15:8] | 0xF03 [31:24] |
| | 2 | 0xB05 [15:8] | 0xB05 [31:24] | 0xB06 [15:8] | 0xB06 [31:24] | 0xB07 [15:8] | 0xB07 [31:24] | 0xB08 [15:8] | 0xB08 [31:24] |
| | 3 | 0xF05 [15:8] | 0xF05 [31:24] | 0xF06 [15:8] | 0xF06 [31:24] | 0xF07 [15:8] | 0xF07 [31:24] | 0xF08 [15:8] | 0xF08 [31:24] |
| | 4 | 0xB0A [15:8] | 0xB0A [31:24] | 0xB0B [15:8] | 0xB0B [31:24] | 0xB0C [15:8] | 0xB0C [31:24] | 0xB0D [15:8] | 0xB0D [31:24] |
| | 5 | 0xF0A [15:8] | 0xF0A [31:24] | 0xF0B [15:8] | 0xF0B [31:24] | 0xF0C [15:8] | 0xF0C [31:24] | 0xF0D [15:8] | 0xF0D [31:24] |
| | 6 | 0xB0F [15:8] | 0xB0F [31:24] | 0xB10 [15:8] | 0xB10 [31:24] | 0xB11 [15:8] | 0xB11 [31:24] | 0xB12 [15:8] | 0xB12 [31:24] |
| | 7 | 0xF0F [15:8] | 0xF0F [31:24] | 0xF10 [15:8] | 0xF10 [31:24] | 0xF11 [15:8] | 0xF11 [31:24] | 0xF12 [15:8] | 0xF12 [31:24] |

HALF PIXEL BUFFER 3

| | | COLUMN | | | | | | | |
|---|---|---|---|---|---|---|---|---|---|
| | | 0 | 1 | 2 | 3 | 4 | 5 | 6 | 7 |
| ROW | 0 | 0xB1C [15:8] | 0xB1C [31:24] | 0xB1D [15:8] | 0xB1D [31:24] | 0xB1E [15:8] | 0xB1E [31:24] | 0xB1F [15:8] | 0xB1F [31:24] |
| | 1 | 0xF1C [15:8] | 0xF1C [31:24] | 0xF1D [15:8] | 0xF1D [31:24] | 0xF1E [15:8] | 0xF1E [31:24] | 0xF1F [15:8] | 0xF1F [31:24] |
| | 2 | 0xB21 [15:8] | 0xB21 [31:24] | 0xB22 [15:8] | 0xB22 [31:24] | 0xB23 [15:8] | 0xB23 [31:24] | 0xB24 [15:8] | 0xB24 [31:24] |
| | 3 | 0xF21 [15:8] | 0xF21 [31:24] | 0xF22 [15:8] | 0xF22 [31:24] | 0xF23 [15:8] | 0xF23 [31:24] | 0xF24 [15:8] | 0xF24 [31:24] |
| | 4 | 0xB26 [15:8] | 0xB26 [31:24] | 0xB27 [15:8] | 0xB27 [31:24] | 0xB28 [15:8] | 0xB28 [31:24] | 0xB29 [15:8] | 0xB29 [31:24] |
| | 5 | 0xF26 [15:8] | 0xF26 [31:24] | 0xF27 [15:8] | 0xF27 [31:24] | 0xF28 [15:8] | 0xF28 [31:24] | 0xF29 [15:8] | 0xF29 [31:24] |
| | 6 | 0xB2B [15:8] | 0xB2B [31:24] | 0xB2C [15:8] | 0xB2C [31:24] | 0xB2D [15:8] | 0xB2D [31:24] | 0xB2E [15:8] | 0xB2E [31:24] |
| | 7 | 0xF2B [15:8] | 0xF2B [31:24] | 0xF2C [15:8] | 0xF2C [31:24] | 0xF2D [15:8] | 0xF2D [31:24] | 0xF2E [15:8] | 0xF2E [31:24] |

HALF PIXEL BUFFER 4

FIGURE 51. BYTE MAPS FOR 'CENTER' 1/4 PIXEL 8x8 BLOCK--POSITION 1-of-9

| | | COLUMN | | | | | | | |
|---|---|---|---|---|---|---|---|---|---|
| | | 0 | 1 | 2 | 3 | 4 | 5 | 6 | 7 |
| ROW | 0 | 0xAC8 [23:16] | 0xAC9 [7:0] | 0xAC9 [23:16] | 0xACA [7:0] | 0xACA [23:16] | 0xACB [7:0] | 0xACB [23:16] | 0xACC [7:0] |
| | 1 | 0xEC8 [23:16] | 0xEC9 [7:0] | 0xEC9 [23:16] | 0xECA [7:0] | 0xECA [23:16] | 0xECB [7:0] | 0xECB [23:16] | 0xECC [7:0] |
| | 2 | 0xACD [23:16] | 0xACE [7:0] | 0xACE [23:16] | 0xACF [7:0] | 0xACF [23:16] | 0xAD0 [7:0] | 0xAD0 [23:16] | 0xAD1 [7:0] |
| | 3 | 0xECD [23:16] | 0xECE [7:0] | 0xECE [23:16] | 0xECF [7:0] | 0xECF [23:16] | 0xED0 [7:0] | 0xED0 [23:16] | 0xED1 [7:0] |
| | 4 | 0xAD2 [23:16] | 0xAD3 [7:0] | 0xAD3 [23:16] | 0xAD4 [7:0] | 0xAD4 [23:16] | 0xAD5 [7:0] | 0xAD5 [23:16] | 0xAD6 [7:0] |
| | 5 | 0xED2 [23:16] | 0xED3 [7:0] | 0xED3 [23:16] | 0xED4 [7:0] | 0xED4 [23:16] | 0xED5 [7:0] | 0xED5 [23:16] | 0xED6 [7:0] |
| | 6 | 0xAD7 [23:16] | 0xAD8 [7:0] | 0xAD8 [23:16] | 0xAD9 [7:0] | 0xAD9 [23:16] | 0xADA [7:0] | 0xADA [23:16] | 0xADB [7:0] |
| | 7 | 0xED7 [23:16] | 0xED8 [7:0] | 0xED8 [23:16] | 0xED9 [7:0] | 0xED9 [23:16] | 0xEDA [7:0] | 0xEDA [23:16] | 0xEDB [7:0] |

HALF PIXEL BUFFER 1

| | | COLUMN | | | | | | | |
|---|---|---|---|---|---|---|---|---|---|
| | | 0 | 1 | 2 | 3 | 4 | 5 | 6 | 7 |
| ROW | 0 | 0xAE4 [23:16] | 0xAE5 [7:0] | 0xAE5 [23:16] | 0xAE6 [7:0] | 0xAE6 [23:16] | 0xAE7 [7:0] | 0xAE7 [23:16] | 0xAE8 [7:0] |
| | 1 | 0xEE4 [23:16] | 0xEE5 [7:0] | 0xEE5 [23:16] | 0xEE6 [7:0] | 0xEE6 [23:16] | 0xEE7 [7:0] | 0xEE7 [23:16] | 0xEE8 [7:0] |
| | 2 | 0xAE9 [23:16] | 0xAEA [7:0] | 0xAEA [23:16] | 0xAEB [7:0] | 0xAEB [23:16] | 0xAEC [7:0] | 0xAEC [23:16] | 0xAED [7:0] |
| | 3 | 0xEE9 [23:16] | 0xEEA [7:0] | 0xEEA [23:16] | 0xEEB [7:0] | 0xEEB [23:16] | 0xEEC [7:0] | 0xEEC [23:16] | 0xEED [7:0] |
| | 4 | 0xAEE [23:16] | 0xAEF [7:0] | 0xAEF [23:16] | 0xAF0 [7:0] | 0xAF0 [23:16] | 0xAF1 [7:0] | 0xAF1 [23:16] | 0xAF2 [7:0] |
| | 5 | 0xEEE [23:16] | 0xEEF [7:0] | 0xEEF [23:16] | 0xEF0 [7:0] | 0xEF0 [23:16] | 0xEF1 [7:0] | 0xEF1 [23:16] | 0xEF2 [7:0] |
| | 6 | 0xAF3 [23:16] | 0xAF4 [7:0] | 0xAF4 [23:16] | 0xAF5 [7:0] | 0xAF5 [23:16] | 0xAF6 [7:0] | 0xAF6 [23:16] | 0xAF7 [7:0] |
| | 7 | 0xEF3 [23:16] | 0xEF4 [7:0] | 0xEF4 [23:16] | 0xEF5 [7:0] | 0xEF5 [23:16] | 0xEF6 [7:0] | 0xEF6 [23:16] | 0xEF7 [7:0] |

HALF PIXEL BUFFER 2

| | | COLUMN | | | | | | | |
|---|---|---|---|---|---|---|---|---|---|
| | | 0 | 1 | 2 | 3 | 4 | 5 | 6 | 7 |
| ROW | 0 | 0xB00 [23:16] | 0xB01 [7:0] | 0xB01 [23:16] | 0xB02 [7:0] | 0xB02 [23:16] | 0xB03 [7:0] | 0xB03 [23:16] | 0xB04 [7:0] |
| | 1 | 0xF00 [23:16] | 0xF01 [7:0] | 0xF01 [23:16] | 0xF02 [7:0] | 0xF02 [23:16] | 0xF03 [7:0] | 0xF03 [23:16] | 0xF04 [7:0] |
| | 2 | 0xB05 [23:16] | 0xB06 [7:0] | 0xB06 [23:16] | 0xB07 [7:0] | 0xB07 [23:16] | 0xB08 [7:0] | 0xB08 [23:16] | 0xB09 [7:0] |
| | 3 | 0xF05 [23:16] | 0xF06 [7:0] | 0xF06 [23:16] | 0xF07 [7:0] | 0xF07 [23:16] | 0xF08 [7:0] | 0xF08 [23:16] | 0xF09 [7:0] |
| | 4 | 0xB0A [23:16] | 0xB0B [7:0] | 0xB0B [23:16] | 0xB0C [7:0] | 0xB0C [23:16] | 0xB0D [7:0] | 0xB0D [23:16] | 0xB0E [7:0] |
| | 5 | 0xF0A [23:16] | 0xF0B [7:0] | 0xF0B [23:16] | 0xF0C [7:0] | 0xF0C [23:16] | 0xF0D [7:0] | 0xF0D [23:16] | 0xF0E [7:0] |
| | 6 | 0xB0F [23:16] | 0xB10 [7:0] | 0xB10 [23:16] | 0xB11 [7:0] | 0xB11 [23:16] | 0xB12 [7:0] | 0xB12 [23:16] | 0xB13 [7:0] |
| | 7 | 0xF0F [23:16] | 0xF10 [7:0] | 0xF10 [23:16] | 0xF11 [7:0] | 0xF11 [23:16] | 0xF12 [7:0] | 0xF12 [23:16] | 0xF13 [7:0] |

HALF PIXEL BUFFER 3

| | | COLUMN | | | | | | | |
|---|---|---|---|---|---|---|---|---|---|
| | | 0 | 1 | 2 | 3 | 4 | 5 | 6 | 7 |
| ROW | 0 | 0xB1C [23:16] | 0xB1D [7:0] | 0xB1D [23:16] | 0xB1E [7:0] | 0xB1E [23:16] | 0xB1F [7:0] | 0xB1F [23:16] | 0xB20 [7:0] |
| | 1 | 0xF1C [23:16] | 0xF1D [7:0] | 0xF1D [23:16] | 0xF1E [7:0] | 0xF1E [23:16] | 0xF1F [7:0] | 0xF1F [23:16] | 0xF20 [7:0] |
| | 2 | 0xB21 [23:16] | 0xB22 [7:0] | 0xB22 [23:16] | 0xB23 [7:0] | 0xB23 [23:16] | 0xB24 [7:0] | 0xB24 [23:16] | 0xB25 [7:0] |
| | 3 | 0xF21 [23:16] | 0xF22 [7:0] | 0xF22 [23:16] | 0xF23 [7:0] | 0xF23 [23:16] | 0xF24 [7:0] | 0xF24 [23:16] | 0xF25 [7:0] |
| | 4 | 0xB26 [23:16] | 0xB27 [7:0] | 0xB27 [23:16] | 0xB28 [7:0] | 0xB28 [23:16] | 0xB29 [7:0] | 0xB29 [23:16] | 0xB2A [7:0] |
| | 5 | 0xF26 [23:16] | 0xF27 [7:0] | 0xF27 [23:16] | 0xF28 [7:0] | 0xF28 [23:16] | 0xF29 [7:0] | 0xF29 [23:16] | 0xF2A [7:0] |
| | 6 | 0xB2B [23:16] | 0xB2C [7:0] | 0xB2C [23:16] | 0xB2D [7:0] | 0xB2D [23:16] | 0xB2E [7:0] | 0xB2E [23:16] | 0xB2F [7:0] |
| | 7 | 0xF2B [23:16] | 0xF2C [7:0] | 0xF2C [23:16] | 0xF2D [7:0] | 0xF2D [23:16] | 0xF2E [7:0] | 0xF2E [23:16] | 0xF2F [7:0] |

HALF PIXEL BUFFER 4

FIGURE 52. BYTE MAPS FOR 'CENTER' 1/4 PIXEL 8x8 BLOCK--POSITION 2-of-9

| | | COLUMN | | | | | | | |
|---|---|---|---|---|---|---|---|---|---|
| | | 0 | 1 | 2 | 3 | 4 | 5 | 6 | 7 |
| ROW | 0 | 0xAC8<br>[31:24] | 0xAC9<br>[15:8] | 0xAC9<br>[31:24] | 0xACA<br>[15:8] | 0xACA<br>[31:24] | 0xACB<br>[15:8] | 0xACB<br>[31:24] | 0xACC<br>[15:8] |
| | 1 | 0xEC8<br>[31:24] | 0xEC9<br>[15:8] | 0xEC9<br>[31:24] | 0xECA<br>[15:8] | 0xECA<br>[31:24] | 0xECB<br>[15:8] | 0xECB<br>[31:24] | 0xECC<br>[15:8] |
| | 2 | 0xACD<br>[31:24] | 0xACE<br>[15:8] | 0xACE<br>[31:24] | 0xACF<br>[15:8] | 0xACF<br>[31:24] | 0xAD0<br>[15:8] | 0xAD0<br>[31:24] | 0xAD1<br>[15:8] |
| | 3 | 0xECD<br>[31:24] | 0xECE<br>[15:8] | 0xECE<br>[31:24] | 0xECF<br>[15:8] | 0xECF<br>[31:24] | 0xED0<br>[15:8] | 0xED0<br>[31:24] | 0xED1<br>[15:8] |
| | 4 | 0xAD2<br>[31:24] | 0xAD3<br>[15:8] | 0xAD3<br>[31:24] | 0xAD4<br>[15:8] | 0xAD4<br>[31:24] | 0xAD5<br>[15:8] | 0xAD5<br>[31:24] | 0xAD6<br>[15:8] |
| | 5 | 0xED2<br>[31:24] | 0xED3<br>[15:8] | 0xED3<br>[31:24] | 0xED4<br>[15:8] | 0xED4<br>[31:24] | 0xED5<br>[15:8] | 0xED5<br>[31:24] | 0xED6<br>[15:8] |
| | 6 | 0xAD7<br>[31:24] | 0xAD8<br>[15:8] | 0xAD8<br>[31:24] | 0xAD9<br>[15:8] | 0xAD9<br>[31:24] | 0xADA<br>[15:8] | 0xADA<br>[31:24] | 0xADB<br>[15:8] |
| | 7 | 0xED7<br>[31:24] | 0xED8<br>[15:8] | 0xED8<br>[31:24] | 0xED9<br>[15:8] | 0xED9<br>[31:24] | 0xEDA<br>[15:8] | 0xEDA<br>[31:24] | 0xEDB<br>[15:8] |

HALF PIXEL BUFFER 1

| | | COLUMN | | | | | | | |
|---|---|---|---|---|---|---|---|---|---|
| | | 0 | 1 | 2 | 3 | 4 | 5 | 6 | 7 |
| ROW | 0 | 0xAE4<br>[31:24] | 0xAE5<br>[15:8] | 0xAE5<br>[31:24] | 0xAE6<br>[15:8] | 0xAE6<br>[31:24] | 0xAE7<br>[15:8] | 0xAE7<br>[31:24] | 0xAE8<br>[15:8] |
| | 1 | 0xEE4<br>[31:24] | 0xEE5<br>[15:8] | 0xEE5<br>[31:24] | 0xEE6<br>[15:8] | 0xEE6<br>[31:24] | 0xEE7<br>[15:8] | 0xEE7<br>[31:24] | 0xEE8<br>[15:8] |
| | 2 | 0xAE9<br>[31:24] | 0xAEA<br>[15:8] | 0xAEA<br>[31:24] | 0xAEB<br>[15:8] | 0xAEB<br>[31:24] | 0xAEC<br>[15:8] | 0xAEC<br>[31:24] | 0xAED<br>[15:8] |
| | 3 | 0xEE9<br>[31:24] | 0xEEA<br>[15:8] | 0xEEA<br>[31:24] | 0xEEB<br>[15:8] | 0xEEB<br>[31:24] | 0xEEC<br>[15:8] | 0xEEC<br>[31:24] | 0xEED<br>[15:8] |
| | 4 | 0xAEE<br>[31:24] | 0xAEF<br>[15:8] | 0xAEF<br>[31:24] | 0xAF0<br>[15:8] | 0xAF0<br>[31:24] | 0xAF1<br>[15:8] | 0xAF1<br>[31:24] | 0xAF2<br>[15:8] |
| | 5 | 0xEEE<br>[31:24] | 0xEEF<br>[15:8] | 0xEEF<br>[31:24] | 0xEF0<br>[15:8] | 0xEF0<br>[31:24] | 0xEF1<br>[15:8] | 0xEF1<br>[31:24] | 0xEF2<br>[15:8] |
| | 6 | 0xAF3<br>[31:24] | 0xAF4<br>[15:8] | 0xAF4<br>[31:24] | 0xAF5<br>[15:8] | 0xAF5<br>[31:24] | 0xAF6<br>[15:8] | 0xAF6<br>[31:24] | 0xAF7<br>[15:8] |
| | 7 | 0xEF3<br>[31:24] | 0xEF4<br>[15:8] | 0xEF4<br>[31:24] | 0xEF5<br>[15:8] | 0xEF5<br>[31:24] | 0xEF6<br>[15:8] | 0xEF6<br>[31:24] | 0xEF7<br>[15:8] |

HALF PIXEL BUFFER 2

| | | COLUMN | | | | | | | |
|---|---|---|---|---|---|---|---|---|---|
| | | 0 | 1 | 2 | 3 | 4 | 5 | 6 | 7 |
| ROW | 0 | 0xB00<br>[31:24] | 0xB01<br>[15:8] | 0xB01<br>[31:24] | 0xB02<br>[15:8] | 0xB02<br>[31:24] | 0xB03<br>[15:8] | 0xB03<br>[31:24] | 0xB04<br>[15:8] |
| | 1 | 0xF00<br>[31:24] | 0xF01<br>[15:8] | 0xF01<br>[31:24] | 0xF02<br>[15:8] | 0xF02<br>[31:24] | 0xF03<br>[15:8] | 0xF03<br>[31:24] | 0xF04<br>[15:8] |
| | 2 | 0xB05<br>[31:24] | 0xB06<br>[15:8] | 0xB06<br>[31:24] | 0xB07<br>[15:8] | 0xB07<br>[31:24] | 0xB08<br>[15:8] | 0xB08<br>[31:24] | 0xB09<br>[15:8] |
| | 3 | 0xF05<br>[31:24] | 0xF06<br>[15:8] | 0xF06<br>[31:24] | 0xF07<br>[15:8] | 0xF07<br>[31:24] | 0xF08<br>[15:8] | 0xF08<br>[31:24] | 0xF09<br>[15:8] |
| | 4 | 0xB0A<br>[31:24] | 0xB0B<br>[15:8] | 0xB0B<br>[31:24] | 0xB0C<br>[15:8] | 0xB0C<br>[31:24] | 0xB0D<br>[15:8] | 0xB0D<br>[31:24] | 0xB0E<br>[15:8] |
| | 5 | 0xF0A<br>[31:24] | 0xF0B<br>[15:8] | 0xF0B<br>[31:24] | 0xF0C<br>[15:8] | 0xF0C<br>[31:24] | 0xF0D<br>[15:8] | 0xF0D<br>[31:24] | 0xF0E<br>[15:8] |
| | 6 | 0xB0F<br>[31:24] | 0xB10<br>[15:8] | 0xB10<br>[31:24] | 0xB11<br>[15:8] | 0xB11<br>[31:24] | 0xB12<br>[15:8] | 0xB12<br>[31:24] | 0xB13<br>[15:8] |
| | 7 | 0xF0F<br>[31:24] | 0xF10<br>[15:8] | 0xF10<br>[31:24] | 0xF11<br>[15:8] | 0xF11<br>[31:24] | 0xF12<br>[15:8] | 0xF12<br>[31:24] | 0xF13<br>[15:8] |

HALF PIXEL BUFFER 3

| | | COLUMN | | | | | | | |
|---|---|---|---|---|---|---|---|---|---|
| | | 0 | 1 | 2 | 3 | 4 | 5 | 6 | 7 |
| ROW | 0 | 0xB1C<br>[31:24] | 0xB1D<br>[15:8] | 0xB1D<br>[31:24] | 0xB1E<br>[15:8] | 0xB1E<br>[31:24] | 0xB1F<br>[15:8] | 0xB1F<br>[31:24] | 0xB20<br>[15:8] |
| | 1 | 0xF1C<br>[31:24] | 0xF1D<br>[15:8] | 0xF1D<br>[31:24] | 0xF1E<br>[15:8] | 0xF1E<br>[31:24] | 0xF1F<br>[15:8] | 0xF1F<br>[31:24] | 0xF20<br>[15:8] |
| | 2 | 0xB21<br>[31:24] | 0xB22<br>[15:8] | 0xB22<br>[31:24] | 0xB23<br>[15:8] | 0xB23<br>[31:24] | 0xB24<br>[15:8] | 0xB24<br>[31:24] | 0xB25<br>[15:8] |
| | 3 | 0xF21<br>[31:24] | 0xF22<br>[15:8] | 0xF22<br>[31:24] | 0xF23<br>[15:8] | 0xF23<br>[31:24] | 0xF24<br>[15:8] | 0xF24<br>[31:24] | 0xF25<br>[15:8] |
| | 4 | 0xB26<br>[31:24] | 0xB27<br>[15:8] | 0xB27<br>[31:24] | 0xB28<br>[15:8] | 0xB28<br>[31:24] | 0xB29<br>[15:8] | 0xB29<br>[31:24] | 0xB2A<br>[15:8] |
| | 5 | 0xF26<br>[31:24] | 0xF27<br>[15:8] | 0xF27<br>[31:24] | 0xF28<br>[15:8] | 0xF28<br>[31:24] | 0xF29<br>[15:8] | 0xF29<br>[31:24] | 0xF2A<br>[15:8] |
| | 6 | 0xB2B<br>[31:24] | 0xB2C<br>[15:8] | 0xB2C<br>[31:24] | 0xB2D<br>[15:8] | 0xB2D<br>[31:24] | 0xB2E<br>[15:8] | 0xB2E<br>[31:24] | 0xB2F<br>[15:8] |
| | 7 | 0xF2B<br>[31:24] | 0xF2C<br>[15:8] | 0xF2C<br>[31:24] | 0xF2D<br>[15:8] | 0xF2D<br>[31:24] | 0xF2E<br>[15:8] | 0xF2E<br>[31:24] | 0xF2F<br>[15:8] |

HALF PIXEL BUFFER 4

FIGURE 53. BYTE MAPS FOR 'CENTER' 1/4 PIXEL 8x8 BLOCK--POSITION 3-of-9

| | | COLUMN | | | | | | | |
|---|---|---|---|---|---|---|---|---|---|
| | | 0 | 1 | 2 | 3 | 4 | 5 | 6 | 7 |
| ROW | 0 | 0xCC8 [15:8] | 0xCC8 [31:24] | 0xCC9 [15:8] | 0xCC9 [31:24] | 0xCCA [15:8] | 0xCCA [31:24] | 0xCCB [15:8] | 0xCCB [31:24] |
| | 1 | 0x8CD [15:8] | 0x8CD [31:24] | 0x8CE [15:8] | 0x8CE [31:24] | 0x8CF [15:8] | 0x8CF [31:24] | 0x8D0 [15:8] | 0x8D0 [31:24] |
| | 2 | 0xCCD [15:8] | 0xCCD [31:24] | 0xCCE [15:8] | 0xCCE [31:24] | 0xCCF [15:8] | 0xCCF [31:24] | 0xCD0 [15:8] | 0xCD0 [31:24] |
| | 3 | 0x8D2 [15:8] | 0x8D2 [31:24] | 0x8D3 [15:8] | 0x8D3 [31:24] | 0x8D4 [15:8] | 0x8D4 [31:24] | 0x8D5 [15:8] | 0x8D5 [31:24] |
| | 4 | 0xCD2 [15:8] | 0xCD2 [31:24] | 0xCD3 [15:8] | 0xCD3 [31:24] | 0xCD4 [15:8] | 0xCD4 [31:24] | 0xCD5 [15:8] | 0xCD5 [31:24] |
| | 5 | 0x8D7 [15:8] | 0x8D7 [31:24] | 0x8D8 [15:8] | 0x8D8 [31:24] | 0x8D9 [15:8] | 0x8D9 [31:24] | 0x8DA [15:8] | 0x8DA [31:24] |
| | 6 | 0xCD7 [15:8] | 0xCD7 [31:24] | 0xCD8 [15:8] | 0xCD8 [31:24] | 0xCD9 [15:8] | 0xCD9 [31:24] | 0xCDA [15:8] | 0xCDA [31:24] |
| | 7 | 0x8DC [15:8] | 0x8DC [31:24] | 0x8DD [15:8] | 0x8DD [31:24] | 0x8DE [15:8] | 0x8DE [31:24] | 0x8DF [15:8] | 0xEDF [31:24] |

HALF PIXEL BUFFER 1

| | | COLUMN | | | | | | | |
|---|---|---|---|---|---|---|---|---|---|
| | | 0 | 1 | 2 | 3 | 4 | 5 | 6 | 7 |
| ROW | 0 | 0xCE4 [15:8] | 0xCE4 [31:24] | 0xCE5 [15:8] | 0xCE5 [31:24] | 0xCE6 [15:8] | 0xCE6 [31:24] | 0xCE7 [15:8] | 0xCE7 [31:24] |
| | 1 | 0x8E9 [15:8] | 0x8E9 [31:24] | 0x8EA [15:8] | 0x8EA [31:24] | 0x8EB [15:8] | 0x8EB [31:24] | 0x8EC [15:8] | 0x8EC [31:24] |
| | 2 | 0xCE9 [15:8] | 0xCE9 [31:24] | 0xCEA [15:8] | 0xCEA [31:24] | 0xCEB [15:8] | 0xCEB [31:24] | 0xCEC [15:8] | 0xCEC [31:24] |
| | 3 | 0x8EE [15:8] | 0x8EE [31:24] | 0x8EF [15:8] | 0x8EF [31:24] | 0x8F0 [15:8] | 0x8F0 [31:24] | 0x8F1 [15:8] | 0x8F1 [31:24] |
| | 4 | 0xCEE [15:8] | 0xCEE [31:24] | 0xCEF [15:8] | 0xCEF [31:24] | 0xCF0 [15:8] | 0xCF0 [31:24] | 0xCF1 [15:8] | 0xCF1 [31:24] |
| | 5 | 0x8F3 [15:8] | 0x8F3 [31:24] | 0x8F4 [15:8] | 0x8F4 [31:24] | 0x8F5 [15:8] | 0x8F5 [31:24] | 0x8F6 [15:8] | 0x8F6 [31:24] |
| | 6 | 0xCF3 [15:8] | 0xCF3 [31:24] | 0xCF4 [15:8] | 0xCF4 [31:24] | 0xCF5 [15:8] | 0xCF5 [31:24] | 0xCF6 [15:8] | 0xCF6 [31:24] |
| | 7 | 0x8F8 [15:8] | 0x8F8 [31:24] | 0x8F9 [15:8] | 0x8F9 [31:24] | 0x8FA [15:8] | 0x8FA [31:24] | 0x8FB [15:8] | 0x8FB [31:24] |

HALF PIXEL BUFFER 2

| | | COLUMN | | | | | | | |
|---|---|---|---|---|---|---|---|---|---|
| | | 0 | 1 | 2 | 3 | 4 | 5 | 6 | 7 |
| ROW | 0 | 0xD00 [15:8] | 0xD00 [31:24] | 0xD01 [15:8] | 0xD01 [31:24] | 0xD02 [15:8] | 0xD02 [31:24] | 0xD03 [15:8] | 0xD03 [31:24] |
| | 1 | 0x905 [15:8] | 0x905 [31:24] | 0x906 [15:8] | 0x906 [31:24] | 0x907 [15:8] | 0x907 [31:24] | 0x908 [15:8] | 0x908 [31:24] |
| | 2 | 0xD05 [15:8] | 0xD05 [31:24] | 0xD06 [15:8] | 0xD06 [31:24] | 0xD07 [15:8] | 0xD07 [31:24] | 0xD08 [15:8] | 0xD08 [31:24] |
| | 3 | 0x90A [15:8] | 0x90A [31:24] | 0x90B [15:8] | 0x90B [31:24] | 0x90C [15:8] | 0x90C [31:24] | 0x90D [15:8] | 0x90D [31:24] |
| | 4 | 0xD0A [15:8] | 0xD0A [31:24] | 0xD0B [15:8] | 0xD0B [31:24] | 0xD0C [15:8] | 0xD0C [31:24] | 0xD0D [15:8] | 0xD0D [31:24] |
| | 5 | 0x90F [15:8] | 0x90F [31:24] | 0x910 [15:8] | 0x910 [31:24] | 0x911 [15:8] | 0x911 [31:24] | 0x912 [15:8] | 0xF12 [31:24] |
| | 6 | 0xD0F [15:8] | 0xD0F [31:24] | 0xD10 [15:8] | 0xD10 [31:24] | 0xD11 [15:8] | 0xD11 [31:24] | 0xD12 [15:8] | 0xD12 [31:24] |
| | 7 | 0x914 [15:8] | 0x914 [31:24] | 0x915 [15:8] | 0x915 [31:24] | 0x916 [15:8] | 0x916 [31:24] | 0x917 [15:8] | 0xF17 [31:24] |

HALF PIXEL BUFFER 3

| | | COLUMN | | | | | | | |
|---|---|---|---|---|---|---|---|---|---|
| | | 0 | 1 | 2 | 3 | 4 | 5 | 6 | 7 |
| ROW | 0 | 0xD1C [15:8] | 0xD1C [31:24] | 0xD1D [15:8] | 0xD1D [31:24] | 0xD1E [15:8] | 0xD1E [31:24] | 0xD1F [15:8] | 0xD1F [31:24] |
| | 1 | 0x921 [15:8] | 0x921 [31:24] | 0x922 [15:8] | 0x922 [31:24] | 0x923 [15:8] | 0x923 [31:24] | 0x924 [15:8] | 0x924 [31:24] |
| | 2 | 0xD21 [15:8] | 0xD21 [31:24] | 0xD22 [15:8] | 0xD22 [31:24] | 0xD23 [15:8] | 0xD23 [31:24] | 0xD24 [15:8] | 0xD24 [31:24] |
| | 3 | 0x926 [15:8] | 0x926 [31:24] | 0x927 [15:8] | 0x927 [31:24] | 0x928 [15:8] | 0x928 [31:24] | 0x929 [15:8] | 0x929 [31:24] |
| | 4 | 0xD26 [15:8] | 0xD26 [31:24] | 0xD27 [15:8] | 0xD27 [31:24] | 0xD28 [15:8] | 0xD28 [31:24] | 0xD29 [15:8] | 0xD29 [31:24] |
| | 5 | 0x92B [15:8] | 0x92B [31:24] | 0x92C [15:8] | 0x92C [31:24] | 0x92D [15:8] | 0x92D [31:24] | 0x92E [15:8] | 0x92E [31:24] |
| | 6 | 0xD2B [15:8] | 0xD2B [31:24] | 0xD2C [15:8] | 0xD2C [31:24] | 0xD2D [15:8] | 0xD2D [31:24] | 0xD2E [15:8] | 0xD2E [31:24] |
| | 7 | 0x930 [15:8] | 0x930 [31:24] | 0x931 [15:8] | 0x931 [31:24] | 0x932 [15:8] | 0x932 [31:24] | 0x933 [15:8] | 0x933 [31:24] |

HALF PIXEL BUFFER 4

FIGURE 54. BYTE MAPS FOR 'CENTER' 1/4 PIXEL 8x8 BLOCK--POSITION 4-of-9

| | | COLUMN | | | | | | | |
|---|---|---|---|---|---|---|---|---|---|
| | | 0 | 1 | 2 | 3 | 4 | 5 | 6 | 7 |
| ROW | 0 | 0xCC8 [23:16] | 0xCC9 [7:0] | 0xCC9 [23:16] | 0xCCA [7:0] | 0xCCA [23:16] | 0xCCB [7:0] | 0xCCB [23:16] | 0xCCC [7:0] |
| | 1 | 0x8CD [23:16] | 0x8CE [7:0] | 0x8CE [23:16] | 0x8CF [7:0] | 0x8CF [23:16] | 0x8D0 [7:0] | 0x8D0 [23:16] | 0x8D1 [7:0] |
| | 2 | 0xCCD [23:16] | 0xCCE [7:0] | 0xCCE [23:16] | 0xCCF [7:0] | 0xCCF [23:16] | 0xCD0 [7:0] | 0xCD0 [23:16] | 0xCD1 [7:0] |
| | 3 | 0x8D2 [23:16] | 0x8D3 [7:0] | 0x8D3 [23:16] | 0x8D4 [7:0] | 0x8D4 [23:16] | 0x8D5 [7:0] | 0x8D5 [23:16] | 0x8D6 [7:0] |
| | 4 | 0xCD2 [23:16] | 0xCD3 [7:0] | 0xCD3 [23:16] | 0xCD4 [7:0] | 0xCD4 [23:16] | 0xCD5 [7:0] | 0xCD5 [23:16] | 0xCD6 [7:0] |
| | 5 | 0x8D7 [23:16] | 0x8D8 [7:0] | 0x8D8 [23:16] | 0x8D9 [7:0] | 0x8D9 [23:16] | 0x8DA [7:0] | 0x8DA [23:16] | 0x8DB [7:0] |
| | 6 | 0xCD7 [23:16] | 0xCD8 [7:0] | 0xCD8 [23:16] | 0xCD9 [7:0] | 0xCD9 [23:16] | 0xCDA [7:0] | 0xCDA [23:16] | 0xCDB [7:0] |
| | 7 | 0x8DC [23:16] | 0x8DD [7:0] | 0x8DD [23:16] | 0x8DE [7:0] | 0x8DE [23:16] | 0x8DF [7:0] | 0xEDF [23:16] | 0x8E0 [7:0] |

HALF PIXEL BUFFER 1

| | | COLUMN | | | | | | | |
|---|---|---|---|---|---|---|---|---|---|
| | | 0 | 1 | 2 | 3 | 4 | 5 | 6 | 7 |
| ROW | 0 | 0xCE4 [23:16] | 0xCE5 [7:0] | 0xCE5 [23:16] | 0xCE6 [7:0] | 0xCE6 [23:16] | 0xCE7 [7:0] | 0xCE7 [23:16] | 0xCE8 [7:0] |
| | 1 | 0x8E9 [23:16] | 0x8EA [7:0] | 0x8EA [23:16] | 0x8EB [7:0] | 0x8EB [23:16] | 0x8EC [7:0] | 0x8EC [23:16] | 0x8ED [7:0] |
| | 2 | 0xCE9 [23:16] | 0xCEA [7:0] | 0xCEA [23:16] | 0xCEB [7:0] | 0xCEB [23:16] | 0xCEC [7:0] | 0xCEC [23:16] | 0xCED [7:0] |
| | 3 | 0x8EE [23:16] | 0x8EF [7:0] | 0x8EF [23:16] | 0x8F0 [7:0] | 0x8F0 [23:16] | 0x8F1 [7:0] | 0x8F1 [23:16] | 0x8F2 [7:0] |
| | 4 | 0xCEE [23:16] | 0xCEF [7:0] | 0xCEF [23:16] | 0xCF0 [7:0] | 0xCF0 [23:16] | 0xCF1 [7:0] | 0xCF1 [23:16] | 0xCF2 [7:0] |
| | 5 | 0x8F3 [23:16] | 0x8F4 [7:0] | 0x8F4 [23:16] | 0x8F5 [7:0] | 0x8F5 [23:16] | 0x8F6 [7:0] | 0x8F6 [23:16] | 0x8F7 [7:0] |
| | 6 | 0xCF3 [23:16] | 0xCF4 [7:0] | 0xCF4 [23:16] | 0xCF5 [7:0] | 0xCF5 [23:16] | 0xCF6 [7:0] | 0xCF6 [23:16] | 0xCF7 [7:0] |
| | 7 | 0x8F8 [23:16] | 0x8F9 [7:0] | 0x8F9 [23:16] | 0x8FA [7:0] | 0x8FA [23:16] | 0x8FB [7:0] | 0x8FB [23:16] | 0x8FC [7:0] |

HALF PIXEL BUFFER 2

| | | COLUMN | | | | | | | |
|---|---|---|---|---|---|---|---|---|---|
| | | 0 | 1 | 2 | 3 | 4 | 5 | 6 | 7 |
| ROW | 0 | 0xD00 [23:16] | 0xD01 [7:0] | 0xD01 [23:16] | 0xD02 [7:0] | 0xD02 [23:16] | 0xD03 [7:0] | 0xD03 [23:16] | 0xD04 [7:0] |
| | 1 | 0x905 [23:16] | 0x906 [7:0] | 0x906 [23:16] | 0x907 [7:0] | 0x907 [23:16] | 0x908 [7:0] | 0x908 [23:16] | 0x909 [7:0] |
| | 2 | 0xD05 [23:16] | 0xD06 [7:0] | 0xD06 [23:16] | 0xD07 [7:0] | 0xD07 [23:16] | 0xD08 [7:0] | 0xD08 [23:16] | 0xD09 [7:0] |
| | 3 | 0x90A [23:16] | 0x90B [7:0] | 0x90B [23:16] | 0x90C [7:0] | 0x90C [23:16] | 0x90D [7:0] | 0x90D [23:16] | 0x90E [7:0] |
| | 4 | 0xD0A [23:16] | 0xD0B [7:0] | 0xD0B [23:16] | 0xD0C [7:0] | 0xD0C [23:16] | 0xD0D [7:0] | 0xD0D [23:16] | 0xD0E [7:0] |
| | 5 | 0x90F [23:16] | 0x910 [7:0] | 0x910 [23:16] | 0x911 [7:0] | 0x911 [23:16] | 0x912 [7:0] | 0xF12 [23:16] | 0x913 [7:0] |
| | 6 | 0xD0F [23:16] | 0xD10 [7:0] | 0xD10 [23:16] | 0xD11 [7:0] | 0xD11 [23:16] | 0xD12 [7:0] | 0xD12 [23:16] | 0xD13 [7:0] |
| | 7 | 0x914 [23:16] | 0x915 [7:0] | 0x915 [23:16] | 0x916 [7:0] | 0x916 [23:16] | 0x917 [7:0] | 0xF17 [23:16] | 0x918 [7:0] |

HALF PIXEL BUFFER 3

| | | COLUMN | | | | | | | |
|---|---|---|---|---|---|---|---|---|---|
| | | 0 | 1 | 2 | 3 | 4 | 5 | 6 | 7 |
| ROW | 0 | 0xD1C [23:16] | 0xD1D [7:0] | 0xD1D [23:16] | 0xD1E [7:0] | 0xD1E [23:16] | 0xD1F [7:0] | 0xD1F [23:16] | 0xD20 [7:0] |
| | 1 | 0x921 [23:16] | 0x922 [7:0] | 0x922 [23:16] | 0x923 [7:0] | 0x923 [23:16] | 0x924 [7:0] | 0x924 [23:16] | 0x925 [7:0] |
| | 2 | 0xD21 [23:16] | 0xD22 [7:0] | 0xD22 [23:16] | 0xD23 [7:0] | 0xD23 [23:16] | 0xD24 [7:0] | 0xD24 [23:16] | 0xD25 [7:0] |
| | 3 | 0x926 [23:16] | 0x927 [7:0] | 0x927 [23:16] | 0x928 [7:0] | 0x928 [23:16] | 0x929 [7:0] | 0x929 [23:16] | 0x92A [7:0] |
| | 4 | 0xD26 [23:16] | 0xD27 [7:0] | 0xD27 [23:16] | 0xD28 [7:0] | 0xD28 [23:16] | 0xD29 [7:0] | 0xD29 [23:16] | 0xD2A [7:0] |
| | 5 | 0x92B [23:16] | 0x92C [7:0] | 0x92C [23:16] | 0x92D [7:0] | 0x92D [23:16] | 0x92E [7:0] | 0x92E [23:16] | 0x92F [7:0] |
| | 6 | 0xD2B [23:16] | 0xD2C [7:0] | 0xD2C [23:16] | 0xD2D [7:0] | 0xD2D [23:16] | 0xD2E [7:0] | 0xD2E [23:16] | 0xD2F [7:0] |
| | 7 | 0x930 [23:16] | 0x931 [7:0] | 0x931 [23:16] | 0x932 [7:0] | 0x932 [23:16] | 0x933 [7:0] | 0x933 [23:16] | 0x934 [7:0] |

HALF PIXEL BUFFER 4

FIGURE 55. BYTE MAPS FOR 'CENTER' 1/4 PIXEL 8x8 BLOCK--POSITION 5-of-9

| | | COLUMN | | | | | | | |
|---|---|---|---|---|---|---|---|---|---|
| | | 0 | 1 | 2 | 3 | 4 | 5 | 6 | 7 |
| ROW | 0 | 0xCC8<br>[31:24] | 0xCC9<br>[15:8] | 0xCC9<br>[31:24] | 0xCCA<br>[15:8] | 0xCCA<br>[31:24] | 0xCCB<br>[15:8] | 0xCCB<br>[31:24] | 0xCCC<br>[15:8] |
| | 1 | 0x8CD<br>[31:24] | 0x8CE<br>[15:8] | 0x8CE<br>[31:24] | 0x8CF<br>[15:8] | 0x8CF<br>[31:24] | 0x8D0<br>[15:8] | 0x8D0<br>[31:24] | 0x8D1<br>[15:8] |
| | 2 | 0xCCD<br>[31:24] | 0xCCE<br>[15:8] | 0xCCE<br>[31:24] | 0xCCF<br>[15:8] | 0xCCF<br>[31:24] | 0xCD0<br>[15:8] | 0xCD0<br>[31:24] | 0xCD1<br>[15:8] |
| | 3 | 0x8D2<br>[31:24] | 0x8D3<br>[15:8] | 0x8D3<br>[31:24] | 0x8D4<br>[15:8] | 0x8D4<br>[31:24] | 0x8D5<br>[15:8] | 0x8D5<br>[31:24] | 0x8D6<br>[15:8] |
| | 4 | 0xCD2<br>[31:24] | 0xCD3<br>[15:8] | 0xCD3<br>[31:24] | 0xCD4<br>[15:8] | 0xCD4<br>[31:24] | 0xCD5<br>[15:8] | 0xCD5<br>[31:24] | 0xCD6<br>[15:8] |
| | 5 | 0x8D7<br>[31:24] | 0x8D8<br>[15:8] | 0x8D8<br>[31:24] | 0x8D9<br>[15:8] | 0x8D9<br>[31:24] | 0x8DA<br>[15:8] | 0x8DA<br>[31:24] | 0x8DB<br>[15:8] |
| | 6 | 0xCD7<br>[31:24] | 0xCD8<br>[15:8] | 0xCD8<br>[31:24] | 0xCD9<br>[15:8] | 0xCD9<br>[31:24] | 0xCDA<br>[15:8] | 0xCDA<br>[31:24] | 0xCDB<br>[15:8] |
| | 7 | 0x8DC<br>[31:24] | 0x8DD<br>[15:8] | 0x8DD<br>[31:24] | 0x8DE<br>[15:8] | 0x8DE<br>[31:24] | 0x8DF<br>[15:8] | 0xEDF<br>[31:24] | 0x8E0<br>[15:8] |

HALF PIXEL BUFFER 1

| | | COLUMN | | | | | | | |
|---|---|---|---|---|---|---|---|---|---|
| | | 0 | 1 | 2 | 3 | 4 | 5 | 6 | 7 |
| ROW | 0 | 0xCE4<br>[31:24] | 0xCE5<br>[15:8] | 0xCE5<br>[31:24] | 0xCE6<br>[15:8] | 0xCE6<br>[31:24] | 0xCE7<br>[15:8] | 0xCE7<br>[31:24] | 0xCE8<br>[15:8] |
| | 1 | 0x8E9<br>[31:24] | 0x8EA<br>[15:8] | 0x8EA<br>[31:24] | 0x8EB<br>[15:8] | 0x8EB<br>[31:24] | 0x8EC<br>[15:8] | 0x8EC<br>[31:24] | 0x8ED<br>[15:8] |
| | 2 | 0xCE9<br>[31:24] | 0xCEA<br>[15:8] | 0xCEA<br>[31:24] | 0xCEB<br>[15:8] | 0xCEB<br>[31:24] | 0xCEC<br>[15:8] | 0xCEC<br>[31:24] | 0xCED<br>[15:8] |
| | 3 | 0x8EE<br>[31:24] | 0x8EF<br>[15:8] | 0x8EF<br>[31:24] | 0x8F0<br>[15:8] | 0x8F0<br>[31:24] | 0x8F1<br>[15:8] | 0x8F1<br>[31:24] | 0x8F2<br>[15:8] |
| | 4 | 0xCEE<br>[31:24] | 0xCEF<br>[15:8] | 0xCEF<br>[31:24] | 0xCF0<br>[15:8] | 0xCF0<br>[31:24] | 0xCF1<br>[15:8] | 0xCF1<br>[31:24] | 0xCF2<br>[15:8] |
| | 5 | 0x8F3<br>[31:24] | 0x8F4<br>[15:8] | 0x8F4<br>[31:24] | 0x8F5<br>[15:8] | 0x8F5<br>[31:24] | 0x8F6<br>[15:8] | 0x8F6<br>[31:24] | 0x8F7<br>[15:8] |
| | 6 | 0xCF3<br>[31:24] | 0xCF4<br>[15:8] | 0xCF4<br>[31:24] | 0xCF5<br>[15:8] | 0xCF5<br>[31:24] | 0xCF6<br>[15:8] | 0xCF6<br>[31:24] | 0xCF7<br>[15:8] |
| | 7 | 0x8F8<br>[31:24] | 0x8F9<br>[15:8] | 0x8F9<br>[31:24] | 0x8FA<br>[15:8] | 0x8FA<br>[31:24] | 0x8FB<br>[15:8] | 0x8FB<br>[31:24] | 0x8FC<br>[15:8] |

HALF PIXEL BUFFER 2

| | | COLUMN | | | | | | | |
|---|---|---|---|---|---|---|---|---|---|
| | | 0 | 1 | 2 | 3 | 4 | 5 | 6 | 7 |
| ROW | 0 | 0xD00<br>[31:24] | 0xD01<br>[15:8] | 0xD01<br>[31:24] | 0xD02<br>[15:8] | 0xD02<br>[31:24] | 0xD03<br>[15:8] | 0xD03<br>[31:24] | 0xD04<br>[15:8] |
| | 1 | 0x905<br>[31:24] | 0x906<br>[15:8] | 0x906<br>[31:24] | 0x907<br>[15:8] | 0x907<br>[31:24] | 0x908<br>[15:8] | 0x908<br>[31:24] | 0x909<br>[15:8] |
| | 2 | 0xD05<br>[31:24] | 0xD06<br>[15:8] | 0xD06<br>[31:24] | 0xD07<br>[15:8] | 0xD07<br>[31:24] | 0xD08<br>[15:8] | 0xD08<br>[31:24] | 0xD09<br>[15:8] |
| | 3 | 0x90A<br>[31:24] | 0x90B<br>[15:8] | 0x90B<br>[31:24] | 0x90C<br>[15:8] | 0x90C<br>[31:24] | 0x90D<br>[15:8] | 0x90D<br>[31:24] | 0x90E<br>[15:8] |
| | 4 | 0xD0A<br>[31:24] | 0xD0B<br>[15:8] | 0xD0B<br>[31:24] | 0xD0C<br>[15:8] | 0xD0C<br>[31:24] | 0xD0D<br>[15:8] | 0xD0D<br>[31:24] | 0xD0E<br>[15:8] |
| | 5 | 0x90F<br>[31:24] | 0x910<br>[15:8] | 0x910<br>[31:24] | 0x911<br>[15:8] | 0x911<br>[31:24] | 0x912<br>[15:8] | 0xF12<br>[31:24] | 0x913<br>[15:8] |
| | 6 | 0xD0F<br>[31:24] | 0xD10<br>[15:8] | 0xD10<br>[31:24] | 0xD11<br>[15:8] | 0xD11<br>[31:24] | 0xD12<br>[15:8] | 0xD12<br>[31:24] | 0xD13<br>[15:8] |
| | 7 | 0x914<br>[31:24] | 0x915<br>[15:8] | 0x915<br>[31:24] | 0x916<br>[15:8] | 0x916<br>[31:24] | 0x917<br>[15:8] | 0xF17<br>[31:24] | 0x918<br>[15:8] |

HALF PIXEL BUFFER 3

| | | COLUMN | | | | | | | |
|---|---|---|---|---|---|---|---|---|---|
| | | 0 | 1 | 2 | 3 | 4 | 5 | 6 | 7 |
| ROW | 0 | 0xD1C<br>[31:24] | 0xD1D<br>[15:8] | 0xD1D<br>[31:24] | 0xD1E<br>[15:8] | 0xD1E<br>[31:24] | 0xD1F<br>[15:8] | 0xD1F<br>[31:24] | 0xD20<br>[15:8] |
| | 1 | 0x921<br>[31:24] | 0x922<br>[15:8] | 0x922<br>[31:24] | 0x923<br>[15:8] | 0x923<br>[31:24] | 0x924<br>[15:8] | 0x924<br>[31:24] | 0x925<br>[15:8] |
| | 2 | 0xD21<br>[31:24] | 0xD22<br>[15:8] | 0xD22<br>[31:24] | 0xD23<br>[15:8] | 0xD23<br>[31:24] | 0xD24<br>[15:8] | 0xD24<br>[31:24] | 0xD25<br>[15:8] |
| | 3 | 0x926<br>[31:24] | 0x927<br>[15:8] | 0x927<br>[31:24] | 0x928<br>[15:8] | 0x928<br>[31:24] | 0x929<br>[15:8] | 0x929<br>[31:24] | 0x92A<br>[15:8] |
| | 4 | 0xD26<br>[31:24] | 0xD27<br>[15:8] | 0xD27<br>[31:24] | 0xD28<br>[15:8] | 0xD28<br>[31:24] | 0xD29<br>[15:8] | 0xD29<br>[31:24] | 0xD2A<br>[15:8] |
| | 5 | 0x92B<br>[31:24] | 0x92C<br>[15:8] | 0x92C<br>[31:24] | 0x92D<br>[15:8] | 0x92D<br>[31:24] | 0x92E<br>[15:8] | 0x92E<br>[31:24] | 0x92F<br>[15:8] |
| | 6 | 0xD2B<br>[31:24] | 0xD2C<br>[15:8] | 0xD2C<br>[31:24] | 0xD2D<br>[15:8] | 0xD2D<br>[31:24] | 0xD2E<br>[15:8] | 0xD2E<br>[31:24] | 0xD2F<br>[15:8] |
| | 7 | 0x930<br>[31:24] | 0x931<br>[15:8] | 0x931<br>[31:24] | 0x932<br>[15:8] | 0x932<br>[31:24] | 0x933<br>[15:8] | 0x933<br>[31:24] | 0x934<br>[15:8] |

HALF PIXEL BUFFER 4

FIGURE 56. BYTE MAPS FOR 'CENTER' 1/4 PIXEL 8x8 BLOCK--POSITION 6-of-9

| ROW | COLUMN 0 | 1 | 2 | 3 | 4 | 5 | 6 | 7 |
|---|---|---|---|---|---|---|---|---|
| 0 | 0xEC8 [15:8] | 0xEC8 [31:24] | 0xEC9 [15:8] | 0xEC9 [31:24] | 0xECA [15:8] | 0xECA [31:24] | 0xECB [15:8] | 0xECB [31:24] |
| 1 | 0xACD [15:8] | 0xACD [31:24] | 0xACE [15:8] | 0xACE [31:24] | 0xACF [15:8] | 0xACF [31:24] | 0xAD0 [15:8] | 0xAD0 [31:24] |
| 2 | 0xECD [15:8] | 0xECD [31:24] | 0xECE [15:8] | 0xECE [31:24] | 0xECF [15:8] | 0xECF [31:24] | 0xED0 [15:8] | 0xED0 [31:24] |
| 3 | 0xAD2 [15:8] | 0xAD2 [31:24] | 0xAD3 [15:8] | 0xAD3 [31:24] | 0xAD4 [15:8] | 0xAD4 [31:24] | 0xAD5 [15:8] | 0xAD5 [31:24] |
| 4 | 0xED2 [15:8] | 0xED2 [31:24] | 0xED3 [15:8] | 0xED3 [31:24] | 0xED4 [15:8] | 0xED4 [31:24] | 0xED5 [15:8] | 0xED5 [31:24] |
| 5 | 0xAD7 [15:8] | 0xAD7 [31:24] | 0xAD8 [15:8] | 0xAD8 [31:24] | 0xAD9 [15:8] | 0xAD9 [31:24] | 0xADA [15:8] | 0xADA [31:24] |
| 6 | 0xED7 [15:8] | 0xED7 [31:24] | 0xED8 [15:8] | 0xED8 [31:24] | 0xED9 [15:8] | 0xED9 [31:24] | 0xEDA [15:8] | 0xEDA [31:24] |
| 7 | 0xADC [15:8] | 0xADC [31:24] | 0xADD [15:8] | 0xADD [31:24] | 0xADE [15:8] | 0xADE [31:24] | 0xADF [15:8] | 0xADF [31:24] |

HALF PIXEL BUFFER 1

| ROW | COLUMN 0 | 1 | 2 | 3 | 4 | 5 | 6 | 7 |
|---|---|---|---|---|---|---|---|---|
| 0 | 0xEE4 [15:8] | 0xEE4 [31:24] | 0xEE5 [15:8] | 0xEE5 [31:24] | 0xEE6 [15:8] | 0xEE6 [31:24] | 0xEE7 [15:8] | 0xEE7 [31:24] |
| 1 | 0xAE9 [15:8] | 0xAE9 [31:24] | 0xAEA [15:8] | 0xAEA [31:24] | 0xAEB [15:8] | 0xAEB [31:24] | 0xAEC [15:8] | 0xAEC [31:24] |
| 2 | 0xEE9 [15:8] | 0xEE9 [31:24] | 0xEEA [15:8] | 0xEEA [31:24] | 0xEEB [15:8] | 0xEEB [31:24] | 0xEEC [15:8] | 0xEEC [31:24] |
| 3 | 0xAEE [15:8] | 0xAEE [31:24] | 0xAEF [15:8] | 0xAEF [31:24] | 0xAF0 [15:8] | 0xAF0 [31:24] | 0xAF1 [15:8] | 0xAF1 [31:24] |
| 4 | 0xEEE [15:8] | 0xEEE [31:24] | 0xEEF [15:8] | 0xEEF [31:24] | 0xEF0 [15:8] | 0xEF0 [31:24] | 0xEF1 [15:8] | 0xEF1 [31:24] |
| 5 | 0xAF3 [15:8] | 0xAF3 [31:24] | 0xAF4 [15:8] | 0xAF4 [31:24] | 0xAF5 [15:8] | 0xAF5 [31:24] | 0xAF6 [15:8] | 0xAF6 [31:24] |
| 6 | 0xEF3 [15:8] | 0xEF3 [31:24] | 0xEF4 [15:8] | 0xEF4 [31:24] | 0xEF5 [15:8] | 0xEF5 [31:24] | 0xEF6 [15:8] | 0xEF6 [31:24] |
| 7 | 0xAF8 [15:8] | 0xAF8 [31:24] | 0xAF9 [15:8] | 0xAF9 [31:24] | 0xAFA [15:8] | 0xAFA [31:24] | 0xAFB [15:8] | 0xAFB [31:24] |

HALF PIXEL BUFFER 2

| ROW | COLUMN 0 | 1 | 2 | 3 | 4 | 5 | 6 | 7 |
|---|---|---|---|---|---|---|---|---|
| 0 | 0xF00 [15:8] | 0xF00 [31:24] | 0xF01 [15:8] | 0xF01 [31:24] | 0xF02 [15:8] | 0xF02 [31:24] | 0xF03 [15:8] | 0xF03 [31:24] |
| 1 | 0xB05 [15:8] | 0xB05 [31:24] | 0xB06 [15:8] | 0xB06 [31:24] | 0xB07 [15:8] | 0xB07 [31:24] | 0xB08 [15:8] | 0xB08 [31:24] |
| 2 | 0xF05 [15:8] | 0xF05 [31:24] | 0xF06 [15:8] | 0xF06 [31:24] | 0xF07 [15:8] | 0xF07 [31:24] | 0xF08 [15:8] | 0xF08 [31:24] |
| 3 | 0xB0A [15:8] | 0xB0A [31:24] | 0xB0B [15:8] | 0xB0B [31:24] | 0xB0C [15:8] | 0xB0C [31:24] | 0xB0D [15:8] | 0xB0D [31:24] |
| 4 | 0xF0A [15:8] | 0xF0A [31:24] | 0xF0B [15:8] | 0xF0B [31:24] | 0xF0C [15:8] | 0xF0C [31:24] | 0xF0D [15:8] | 0xF0D [31:24] |
| 5 | 0xB0F [15:8] | 0xB0F [31:24] | 0xB10 [15:8] | 0xB10 [31:24] | 0xB11 [15:8] | 0xB11 [31:24] | 0xB12 [15:8] | 0xB12 [31:24] |
| 6 | 0xF0F [15:8] | 0xF0F [31:24] | 0xF10 [15:8] | 0xF10 [31:24] | 0xF11 [15:8] | 0xF11 [31:24] | 0xF12 [15:8] | 0xF12 [31:24] |
| 7 | 0xB14 [15:8] | 0xB14 [31:24] | 0xB15 [15:8] | 0xB15 [31:24] | 0xB16 [15:8] | 0xB16 [31:24] | 0xB17 [15:8] | 0xB17 [31:24] |

HALF PIXEL BUFFER 3

| ROW | COLUMN 0 | 1 | 2 | 3 | 4 | 5 | 6 | 7 |
|---|---|---|---|---|---|---|---|---|
| 0 | 0xF1C [15:8] | 0xF1C [31:24] | 0xF1D [15:8] | 0xF1D [31:24] | 0xF1E [15:8] | 0xF1E [31:24] | 0xF1F [15:8] | 0xF1F [31:24] |
| 1 | 0xB21 [15:8] | 0xB21 [31:24] | 0xB22 [15:8] | 0xB22 [31:24] | 0xB23 [15:8] | 0xB23 [31:24] | 0xB24 [15:8] | 0xB24 [31:24] |
| 2 | 0xF21 [15:8] | 0xF21 [31:24] | 0xF22 [15:8] | 0xF22 [31:24] | 0xF23 [15:8] | 0xF23 [31:24] | 0xF24 [15:8] | 0xF24 [31:24] |
| 3 | 0xB26 [15:8] | 0xB26 [31:24] | 0xB27 [15:8] | 0xB27 [31:24] | 0xB28 [15:8] | 0xB28 [31:24] | 0xB29 [15:8] | 0xB29 [31:24] |
| 4 | 0xF26 [15:8] | 0xF26 [31:24] | 0xF27 [15:8] | 0xF27 [31:24] | 0xF28 [15:8] | 0xF28 [31:24] | 0xF29 [15:8] | 0xF29 [31:24] |
| 5 | 0xB2B [15:8] | 0xB2B [31:24] | 0xB2C [15:8] | 0xB2C [31:24] | 0xB2D [15:8] | 0xB2D [31:24] | 0xB2E [15:8] | 0xB2E [31:24] |
| 6 | 0xF2B [15:8] | 0xF2B [31:24] | 0xF2C [15:8] | 0xF2C [31:24] | 0xF2D [15:8] | 0xF2D [31:24] | 0xF2E [15:8] | 0xF2E [31:24] |
| 7 | 0xB30 [15:8] | 0xB30 [31:24] | 0xB31 [15:8] | 0xB31 [31:24] | 0xB32 [15:8] | 0xB32 [31:24] | 0xB33 [15:8] | 0xB33 [31:24] |

HALF PIXEL BUFFER 4

FIGURE 57. BYTE MAPS FOR 'CENTER' 1/4 PIXEL 8x8 BLOCK--POSITION 7-of-9

| | | COLUMN | | | | | | | |
|---|---|---|---|---|---|---|---|---|---|
| | | 0 | 1 | 2 | 3 | 4 | 5 | 6 | 7 |
| ROW | 0 | 0xEC8 [23:16] | 0xEC9 [7:0] | 0xEC9 [23:16] | 0xECA [7:0] | 0xECA [23:16] | 0xECB [7:0] | 0xECB [23:16] | 0xECC [7:0] |
| | 1 | 0xACD [23:16] | 0xACE [7:0] | 0xACE [23:16] | 0xACF [7:0] | 0xACF [23:16] | 0xAD0 [7:0] | 0xAD0 [23:16] | 0xAD1 [7:0] |
| | 2 | 0xECD [23:16] | 0xECE [7:0] | 0xECE [23:16] | 0xECF [7:0] | 0xECF [23:16] | 0xED0 [7:0] | 0xED0 [23:16] | 0xED1 [7:0] |
| | 3 | 0xAD2 [23:16] | 0xAD3 [7:0] | 0xAD3 [23:16] | 0xAD4 [7:0] | 0xAD4 [23:16] | 0xAD5 [7:0] | 0xAD5 [23:16] | 0xAD6 [7:0] |
| | 4 | 0xED2 [23:16] | 0xED3 [7:0] | 0xED3 [23:16] | 0xED4 [7:0] | 0xED4 [23:16] | 0xED5 [7:0] | 0xED5 [23:16] | 0xED6 [7:0] |
| | 5 | 0xAD7 [23:16] | 0xAD8 [7:0] | 0xAD8 [23:16] | 0xAD9 [7:0] | 0xAD9 [23:16] | 0xADA [7:0] | 0xADA [23:16] | 0xADB [7:0] |
| | 6 | 0xED7 [23:16] | 0xED8 [7:0] | 0xED8 [23:16] | 0xED9 [7:0] | 0xED9 [23:16] | 0xEDA [7:0] | 0xEDA [23:16] | 0xEDB [7:0] |
| | 7 | 0xADC [23:16] | 0xADD [7:0] | 0xADD [23:16] | 0xADE [7:0] | 0xADE [23:16] | 0xADF [7:0] | 0xADF [23:16] | 0xAE0 [7:0] |

HALF PIXEL BUFFER 1

| | | COLUMN | | | | | | | |
|---|---|---|---|---|---|---|---|---|---|
| | | 0 | 1 | 2 | 3 | 4 | 5 | 6 | 7 |
| ROW | 0 | 0xEE4 [23:16] | 0xEE5 [7:0] | 0xEE5 [23:16] | 0xEE6 [7:0] | 0xEE6 [23:16] | 0xEE7 [7:0] | 0xEE7 [23:16] | 0xEE8 [7:0] |
| | 1 | 0xAE9 [23:16] | 0xAEA [7:0] | 0xAEA [23:16] | 0xAEB [7:0] | 0xAEB [23:16] | 0xAEC [7:0] | 0xAEC [23:16] | 0xAED [7:0] |
| | 2 | 0xEE9 [23:16] | 0xEEA [7:0] | 0xEEA [23:16] | 0xEEB [7:0] | 0xEEB [23:16] | 0xEEC [7:0] | 0xEEC [23:16] | 0xEED [7:0] |
| | 3 | 0xAEE [23:16] | 0xAEF [7:0] | 0xAEF [23:16] | 0xAF0 [7:0] | 0xAF0 [23:16] | 0xAF1 [7:0] | 0xAF1 [23:16] | 0xAF2 [7:0] |
| | 4 | 0xEEE [23:16] | 0xEEF [7:0] | 0xEEF [23:16] | 0xEF0 [7:0] | 0xEF0 [23:16] | 0xEF1 [7:0] | 0xEF1 [23:16] | 0xEF2 [7:0] |
| | 5 | 0xAF3 [23:16] | 0xAF4 [7:0] | 0xAF4 [23:16] | 0xAF5 [7:0] | 0xAF5 [23:16] | 0xAF6 [7:0] | 0xAF6 [23:16] | 0xAF7 [7:0] |
| | 6 | 0xEF3 [23:16] | 0xEF4 [7:0] | 0xEF4 [23:16] | 0xEF5 [7:0] | 0xEF5 [23:16] | 0xEF6 [7:0] | 0xEF6 [23:16] | 0xEF7 [7:0] |
| | 7 | 0xAF8 [23:16] | 0xAF9 [7:0] | 0xAF9 [23:16] | 0xAFA [7:0] | 0xAFA [23:16] | 0xAFB [7:0] | 0xAFB [23:16] | 0xAFC [7:0] |

HALF PIXEL BUFFER 2

| | | COLUMN | | | | | | | |
|---|---|---|---|---|---|---|---|---|---|
| | | 0 | 1 | 2 | 3 | 4 | 5 | 6 | 7 |
| ROW | 0 | 0xF00 [23:16] | 0xF01 [7:0] | 0xF01 [23:16] | 0xF02 [7:0] | 0xF02 [23:16] | 0xF03 [7:0] | 0xF03 [23:16] | 0xF04 [7:0] |
| | 1 | 0xB05 [23:16] | 0xB06 [7:0] | 0xB06 [23:16] | 0xB07 [7:0] | 0xB07 [23:16] | 0xB08 [7:0] | 0xB08 [23:16] | 0xB09 [7:0] |
| | 2 | 0xF05 [23:16] | 0xF06 [7:0] | 0xF06 [23:16] | 0xF07 [7:0] | 0xF07 [23:16] | 0xF08 [7:0] | 0xF08 [23:16] | 0xF09 [7:0] |
| | 3 | 0xB0A [23:16] | 0xB0B [7:0] | 0xB0B [23:16] | 0xB0C [7:0] | 0xB0C [23:16] | 0xB0D [7:0] | 0xB0D [23:16] | 0xB0E [7:0] |
| | 4 | 0xF0A [23:16] | 0xF0B [7:0] | 0xF0B [23:16] | 0xF0C [7:0] | 0xF0C [23:16] | 0xF0D [7:0] | 0xF0D [23:16] | 0xF0E [7:0] |
| | 5 | 0xB0F [23:16] | 0xB10 [7:0] | 0xB10 [23:16] | 0xB11 [7:0] | 0xB11 [23:16] | 0xB12 [7:0] | 0xB12 [23:16] | 0xB13 [7:0] |
| | 6 | 0xF0F [23:16] | 0xF10 [7:0] | 0xF10 [23:16] | 0xF11 [7:0] | 0xF11 [23:16] | 0xF12 [7:0] | 0xF12 [23:16] | 0xF13 [7:0] |
| | 7 | 0xB14 [23:16] | 0xB15 [7:0] | 0xB15 [23:16] | 0xB16 [7:0] | 0xB16 [23:16] | 0xB17 [7:0] | 0xB17 [23:16] | 0xB18 [7:0] |

HALF PIXEL BUFFER 3

| | | COLUMN | | | | | | | |
|---|---|---|---|---|---|---|---|---|---|
| | | 0 | 1 | 2 | 3 | 4 | 5 | 6 | 7 |
| ROW | 0 | 0xF1C [23:16] | 0xF1D [7:0] | 0xF1D [23:16] | 0xF1E [7:0] | 0xF1E [23:16] | 0xF1F [7:0] | 0xF1F [23:16] | 0xF20 [7:0] |
| | 1 | 0xB21 [23:16] | 0xB22 [7:0] | 0xB22 [23:16] | 0xB23 [7:0] | 0xB23 [23:16] | 0xB24 [7:0] | 0xB24 [23:16] | 0xB25 [7:0] |
| | 2 | 0xF21 [23:16] | 0xF22 [7:0] | 0xF22 [23:16] | 0xF23 [7:0] | 0xF23 [23:16] | 0xF24 [7:0] | 0xF24 [23:16] | 0xF25 [7:0] |
| | 3 | 0xB26 [23:16] | 0xB27 [7:0] | 0xB27 [23:16] | 0xB28 [7:0] | 0xB28 [23:16] | 0xB29 [7:0] | 0xB29 [23:16] | 0xB2A [7:0] |
| | 4 | 0xF26 [23:16] | 0xF27 [7:0] | 0xF27 [23:16] | 0xF28 [7:0] | 0xF28 [23:16] | 0xF29 [7:0] | 0xF29 [23:16] | 0xF2A [7:0] |
| | 5 | 0xB2B [23:16] | 0xB2C [7:0] | 0xB2C [23:16] | 0xB2D [7:0] | 0xB2D [23:16] | 0xB2E [7:0] | 0xB2E [23:16] | 0xB2F [7:0] |
| | 6 | 0xF2B [23:16] | 0xF2C [7:0] | 0xF2C [23:16] | 0xF2D [7:0] | 0xF2D [23:16] | 0xF2E [7:0] | 0xF2E [23:16] | 0xF2F [7:0] |
| | 7 | 0xB30 [23:16] | 0xB31 [7:0] | 0xB31 [23:16] | 0xB32 [7:0] | 0xB32 [23:16] | 0xB33 [7:0] | 0xB33 [23:16] | 0xB34 [7:0] |

HALF PIXEL BUFFER 4

FIGURE 58. BYTE MAPS FOR 'CENTER' 1/4 PIXEL 8x8 BLOCK--POSITION 8-of-9

| | | COLUMN | | | | | | | |
|---|---|---|---|---|---|---|---|---|---|
| | | 0 | 1 | 2 | 3 | 4 | 5 | 6 | 7 |
| ROW | 0 | 0xEC8 | 0xEC9 | 0xEC9 | 0xECA | 0xECA | 0xECB | 0xECB | 0xECC |
| | | [31:24] | [15:8] | [31:24] | [15:8] | [31:24] | [15:8] | [31:24] | [15:8] |
| | 1 | 0xACD | 0xACE | 0xACE | 0xACF | 0xACF | 0xAD0 | 0xAD0 | 0xAD1 |
| | | [31:24] | [15:8] | [31:24] | [15:8] | [31:24] | [15:8] | [31:24] | [15:8] |
| | 2 | 0xECD | 0xECE | 0xECE | 0xECF | 0xECF | 0xED0 | 0xED0 | 0xED1 |
| | | [31:24] | [15:8] | [31:24] | [15:8] | [31:24] | [15:8] | [31:24] | [15:8] |
| | 3 | 0xAD2 | 0xAD3 | 0xAD3 | 0xAD4 | 0xAD4 | 0xAD5 | 0xAD5 | 0xAD6 |
| | | [31:24] | [15:8] | [31:24] | [15:8] | [31:24] | [15:8] | [31:24] | [15:8] |
| | 4 | 0xED2 | 0xED3 | 0xED3 | 0xED4 | 0xED4 | 0xED5 | 0xED5 | 0xED6 |
| | | [31:24] | [15:8] | [31:24] | [15:8] | [31:24] | [15:8] | [31:24] | [15:8] |
| | 5 | 0xAD7 | 0xAD8 | 0xAD8 | 0xAD9 | 0xAD9 | 0xADA | 0xADA | 0xADB |
| | | [31:24] | [15:8] | [31:24] | [15:8] | [31:24] | [15:8] | [31:24] | [15:8] |
| | 6 | 0xED7 | 0xED8 | 0xED8 | 0xED9 | 0xED9 | 0xEDA | 0xEDA | 0xEDB |
| | | [31:24] | [15:8] | [31:24] | [15:8] | [31:24] | [15:8] | [31:24] | [15:8] |
| | 7 | 0xADC | 0xADD | 0xADD | 0xADE | 0xADE | 0xADF | 0xADF | 0xAE0 |
| | | [31:24] | [15:8] | [31:24] | [15:8] | [31:24] | [15:8] | [31:24] | [15:8] |

HALF PIXEL BUFFER 1

| | | COLUMN | | | | | | | |
|---|---|---|---|---|---|---|---|---|---|
| | | 0 | 1 | 2 | 3 | 4 | 5 | 6 | 7 |
| ROW | 0 | 0xEE4 | 0xEE5 | 0xEE5 | 0xEE6 | 0xEE6 | 0xEE7 | 0xEE7 | 0xEE8 |
| | | [31:24] | [15:8] | [31:24] | [15:8] | [31:24] | [15:8] | [31:24] | [15:8] |
| | 1 | 0xAE9 | 0xAEA | 0xAEA | 0xAEB | 0xAEB | 0xAEC | 0xAEC | 0xAED |
| | | [31:24] | [15:8] | [31:24] | [15:8] | [31:24] | [15:8] | [31:24] | [15:8] |
| | 2 | 0xEE9 | 0xEEA | 0xEEA | 0xEEB | 0xEEB | 0xEEC | 0xEEC | 0xEED |
| | | [31:24] | [15:8] | [31:24] | [15:8] | [31:24] | [15:8] | [31:24] | [15:8] |
| | 3 | 0xAEE | 0xAEF | 0xAEF | 0xAF0 | 0xAF0 | 0xAF1 | 0xAF1 | 0xAF2 |
| | | [31:24] | [15:8] | [31:24] | [15:8] | [31:24] | [15:8] | [31:24] | [15:8] |
| | 4 | 0xEEE | 0xEEF | 0xEEF | 0xEF0 | 0xEF0 | 0xEF1 | 0xEF1 | 0xEF2 |
| | | [31:24] | [15:8] | [31:24] | [15:8] | [31:24] | [15:8] | [31:24] | [15:8] |
| | 5 | 0xAF3 | 0xAF4 | 0xAF4 | 0xAF5 | 0xAF5 | 0xAF6 | 0xAF6 | 0xAF7 |
| | | [31:24] | [15:8] | [31:24] | [15:8] | [31:24] | [15:8] | [31:24] | [15:8] |
| | 6 | 0xEF3 | 0xEF4 | 0xEF4 | 0xEF5 | 0xEF5 | 0xEF6 | 0xEF6 | 0xEF7 |
| | | [31:24] | [15:8] | [31:24] | [15:8] | [31:24] | [15:8] | [31:24] | [15:8] |
| | 7 | 0xAF8 | 0xAF9 | 0xAF9 | 0xAFA | 0xAFA | 0xAFB | 0xAFB | 0xAFC |
| | | [31:24] | [15:8] | [31:24] | [15:8] | [31:24] | [15:8] | [31:24] | [15:8] |

HALF PIXEL BUFFER 2

| | | COLUMN | | | | | | | |
|---|---|---|---|---|---|---|---|---|---|
| | | 0 | 1 | 2 | 3 | 4 | 5 | 6 | 7 |
| ROW | 0 | 0xF00 | 0xF01 | 0xF01 | 0xF02 | 0xF02 | 0xF03 | 0xF03 | 0xF04 |
| | | [31:24] | [15:8] | [31:24] | [15:8] | [31:24] | [15:8] | [31:24] | [15:8] |
| | 1 | 0xB05 | 0xB06 | 0xB06 | 0xB07 | 0xB07 | 0xB08 | 0xB08 | 0xB09 |
| | | [31:24] | [15:8] | [31:24] | [15:8] | [31:24] | [15:8] | [31:24] | [15:8] |
| | 2 | 0xF05 | 0xF06 | 0xF06 | 0xF07 | 0xF07 | 0xF08 | 0xF08 | 0xF09 |
| | | [31:24] | [15:8] | [31:24] | [15:8] | [31:24] | [15:8] | [31:24] | [15:8] |
| | 3 | 0xB0A | 0xB0B | 0xB0B | 0xB0C | 0xB0C | 0xB0D | 0xB0D | 0xB0E |
| | | [31:24] | [15:8] | [31:24] | [15:8] | [31:24] | [15:8] | [31:24] | [15:8] |
| | 4 | 0xF0A | 0xF0B | 0xF0B | 0xF0C | 0xF0C | 0xF0D | 0xF0D | 0xF0E |
| | | [31:24] | [15:8] | [31:24] | [15:8] | [31:24] | [15:8] | [31:24] | [15:8] |
| | 5 | 0xB0F | 0xB10 | 0xB10 | 0xB11 | 0xB11 | 0xB12 | 0xB12 | 0xB13 |
| | | [31:24] | [15:8] | [31:24] | [15:8] | [31:24] | [15:8] | [31:24] | [15:8] |
| | 6 | 0xF0F | 0xF10 | 0xF10 | 0xF11 | 0xF11 | 0xF12 | 0xF12 | 0xF13 |
| | | [31:24] | [15:8] | [31:24] | [15:8] | [31:24] | [15:8] | [31:24] | [15:8] |
| | 7 | 0xB14 | 0xB15 | 0xB15 | 0xB16 | 0xB16 | 0xB17 | 0xB17 | 0xB18 |
| | | [31:24] | [15:8] | [31:24] | [15:8] | [31:24] | [15:8] | [31:24] | [15:8] |

HALF PIXEL BUFFER 3

| | | COLUMN | | | | | | | |
|---|---|---|---|---|---|---|---|---|---|
| | | 0 | 1 | 2 | 3 | 4 | 5 | 6 | 7 |
| ROW | 0 | 0xF1C | 0xF1D | 0xF1D | 0xF1E | 0xF1E | 0xF1F | 0xF1F | 0xF20 |
| | | [31:24] | [15:8] | [31:24] | [15:8] | [31:24] | [15:8] | [31:24] | [15:8] |
| | 1 | 0xB21 | 0xB22 | 0xB22 | 0xB23 | 0xB23 | 0xB24 | 0xB24 | 0xB25 |
| | | [31:24] | [15:8] | [31:24] | [15:8] | [31:24] | [15:8] | [31:24] | [15:8] |
| | 2 | 0xF21 | 0xF22 | 0xF22 | 0xF23 | 0xF23 | 0xF24 | 0xF24 | 0xF25 |
| | | [31:24] | [15:8] | [31:24] | [15:8] | [31:24] | [15:8] | [31:24] | [15:8] |
| | 3 | 0xB26 | 0xB27 | 0xB27 | 0xB28 | 0xB28 | 0xB29 | 0xB29 | 0xB2A |
| | | [31:24] | [15:8] | [31:24] | [15:8] | [31:24] | [15:8] | [31:24] | [15:8] |
| | 4 | 0xF26 | 0xF27 | 0xF27 | 0xF28 | 0xF28 | 0xF29 | 0xF29 | 0xF2A |
| | | [31:24] | [15:8] | [31:24] | [15:8] | [31:24] | [15:8] | [31:24] | [15:8] |
| | 5 | 0xB2B | 0xB2C | 0xB2C | 0xB2D | 0xB2D | 0xB2E | 0xB2E | 0xB2F |
| | | [31:24] | [15:8] | [31:24] | [15:8] | [31:24] | [15:8] | [31:24] | [15:8] |
| | 6 | 0xF2B | 0xF2C | 0xF2C | 0xF2D | 0xF2D | 0xF2E | 0xF2E | 0xF2F |
| | | [31:24] | [15:8] | [31:24] | [15:8] | [31:24] | [15:8] | [31:24] | [15:8] |
| | 7 | 0xB30 | 0xB31 | 0xB31 | 0xB32 | 0xB32 | 0xB33 | 0xB33 | 0xB34 |
| | | [31:24] | [15:8] | [31:24] | [15:8] | [31:24] | [15:8] | [31:24] | [15:8] |

HALF PIXEL BUFFER 4

FIGURE 59. BYTE MAPS FOR 'CENTER' 1/4 PIXEL 8x8 BLOCK--POSITION 9-of-9

MEMORY 4/5

| | 31 16 | 15 0 |
|---|---|---|
| 0xn48 | H(1) | H(0) |
| 0xn49 | H(3) | H(2) |
| 0xn4A | H(5) | H(4) |
| 0xn4B | H(7) | H(6) |
| 0xn4C | H(9) | H(8) |
| 0xn4D | H(11) | H(10) |
| 0xn4E | H(13) | H(12) |
| 0xn4F | H(15) | H(14) |
| 0xn50 | H(17) | H(16) |
| 0xn51 | H(19) | H(18) |
| 0xn52 | H(21) | H(20) |
| 0xn53 | H(23) | H(22) |
| 0xn54 | H(25) | H(24) |
| 0xn55 | H(27) | H(26) |
| 0xn56 | H(29) | H(28) |
| 0xn57 | H(31) | H(30) |
| 0xn58 | H(33) | H(32) |
| 0xn59 | H(35) | H(34) |
| 0xn5A | H(37) | H(36) |
| 0xn5B | H(39) | H(38) |
| 0xn5C | H(41) | H(40) |
| 0xn5D | H(43) | H(42) |
| 0xn5E | H(45) | H(44) |
| 0xn5F | H(47) | H(46) |
| 0xn60 | H(49) | H(48) |
| 0xn61 | H(51) | H(50) |
| 0xn62 | H(53) | H(52) |
| 0xn63 | H(55) | H(54) |
| 0xn64 | H(57) | H(56) |
| 0xn65 | H(59) | H(58) |
| 0xn66 | H(61) | H(60) |
| 0xn67 | H(63) | H(62) |
| 0xn68 | H(65) | H(64) |
| 0xn69 | H(67) | H(66) |
| 0xn6A | H(69) | H(68) |
| 0xn6B | H(71) | H(70) |
| 0xn6C | H(73) | H(72) |
| 0xn6D | H(75) | H(74) |
| 0xn6E | H(77) | H(76) |
| 0xn6F | H(79) | H(78) |
| 0xn70 | H(81) | H(80) |
| 0xn71 | H(83) | H(82) |
| 0xn72 | H(85) | H(84) |
| 0xn73 | H(87) | H(86) |
| 0xn74 | H(89) | H(88) |
| 0xn75 | H(91) | H(90) |
| 0xn76 | - | H(92) |
| 0xn77 | - | - |

MEMORY 4/5

| | 31 16 | 15 0 |
|---|---|---|
| 0xnA8 | 1/4 PIXEL A | 1/2 PIXEL A' |
| 0xnA9 | 1/4 PIXEL B | 1/2 PIXEL B' |
| 0xnAA | 1/4 PIXEL C | 1/2 PIXEL C' |
| 0xnAB | 1/4 PIXEL D | - |
| 0xnAC | 1/4 PIXEL E | - |
| 0xnAD | 1/4 PIXEL F | - |
| 0xnAE | - | - |
| 0xnAF | - | - |

MEMORY 4/5

| | 31 16 | 15 0 |
|---|---|---|
| 0xn78 | V(1) | V(0) |
| 0xn79 | V(3) | V(2) |
| 0xn7A | V(5) | V(4) |
| 0xn7B | V(7) | V(6) |
| 0xn7C | V(9) | V(8) |
| 0xn7D | V(11) | V(10) |
| 0xn7E | V(13) | V(12) |
| 0xn7F | V(15) | V(14) |
| 0xn80 | V(17) | V(16) |
| 0xn81 | V(19) | V(18) |
| 0xn82 | V(21) | V(20) |
| 0xn83 | V(23) | V(22) |
| 0xn84 | V(25) | V(24) |
| 0xn85 | V(27) | V(26) |
| 0xn86 | V(29) | V(28) |
| 0xn87 | V(31) | V(30) |
| 0xn88 | V(33) | V(32) |
| 0xn89 | V(35) | V(34) |
| 0xn8A | V(37) | V(36) |
| 0xn8B | V(39) | V(38) |
| 0xn8C | V(41) | V(40) |
| 0xn8D | V(43) | V(42) |
| 0xn8E | V(45) | V(44) |
| 0xn8F | V(47) | V(46) |
| 0xn90 | V(49) | V(48) |
| 0xn91 | V(51) | V(50) |
| 0xn92 | V(53) | V(52) |
| 0xn93 | V(55) | V(54) |
| 0xn94 | V(57) | V(56) |
| 0xn95 | V(59) | V(58) |
| 0xn96 | V(61) | V(60) |
| 0xn97 | V(63) | V(62) |
| 0xn98 | V(65) | V(64) |
| 0xn99 | V(67) | V(66) |
| 0xn9A | V(69) | V(68) |
| 0xn9B | V(71) | V(70) |
| 0xn9C | V(73) | V(72) |
| 0xn9D | V(75) | V(74) |
| 0xn9E | V(77) | V(76) |
| 0xn9F | V(79) | V(78) |
| 0xnA0 | V(81) | V(80) |
| 0xnA1 | V(83) | V(82) |
| 0xnA2 | V(85) | V(84) |
| 0xnA3 | V(87) | V(86) |
| 0xnA4 | V(89) | V(88) |
| 0xnA5 | V(91) | V(90) |
| 0xnA6 | - | V(92) |
| 0xnA7 | - | - |

NOTE: FOR COST FUNCTION TABLE A / B, n = 9 / B, RESPECTIVELY

FIGURE 60. MEMORY LAYOUT FOR COST FUNCTION TABLES

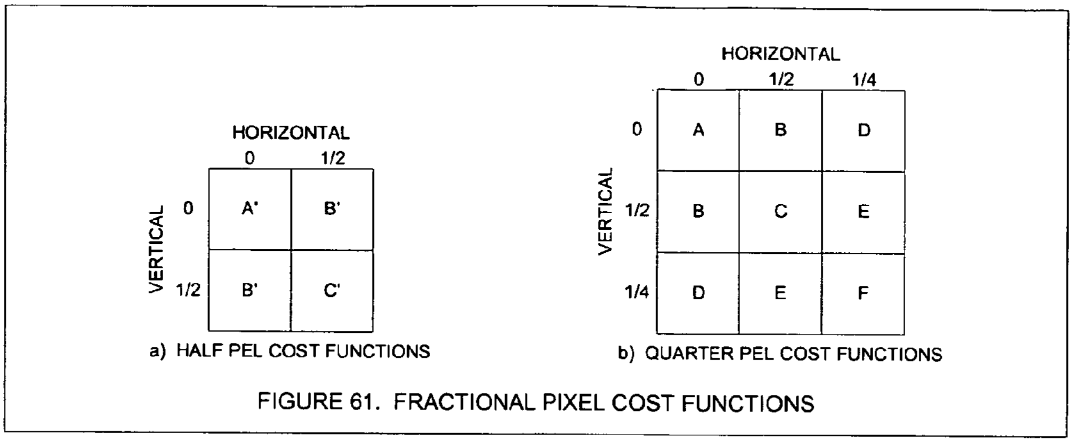
FIGURE 61. FRACTIONAL PIXEL COST FUNCTIONS

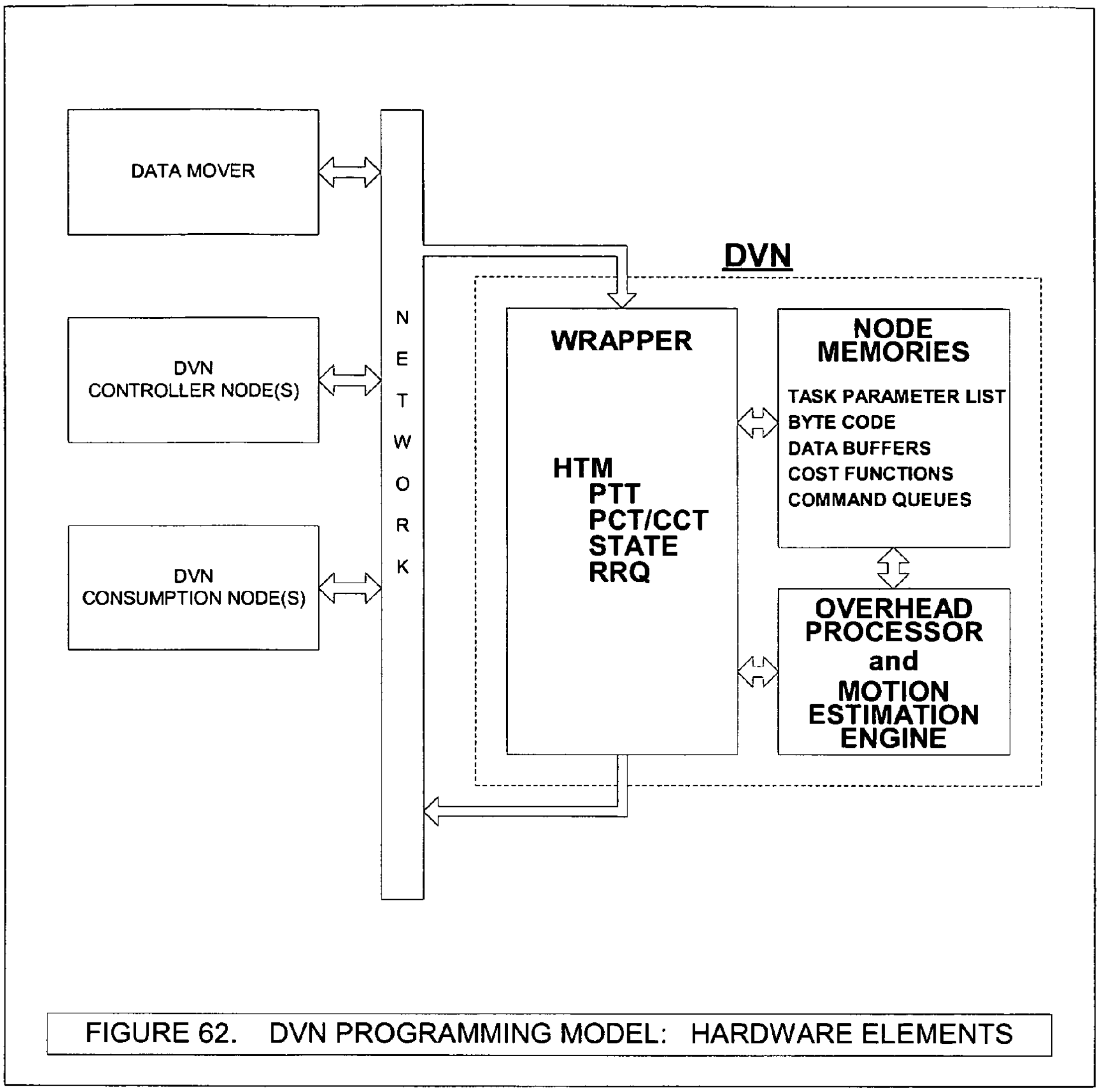
FIGURE 62. DVN PROGRAMMING MODEL: HARDWARE ELEMENTS

NEXT STATE

| CURRENT STATE | 0 0 0 idle | 0 0 1 execute | 0 1 0 wait | 1 0 0 setup | 1 0 1 ack+test | 1 1 1 continue |
|---|---|---|---|---|---|---|
| 0 0 0 idle | idle | | | wrapper asserts eu_run | | |
| 0 0 1 execute | | execute | | | read command queue DONE | |
| 0 1 0 wait | wrapper asserts eu_teardown | | wait | | | wrapper asserts eu_continue |
| 1 0 0 setup | | setup byte code indicates done | | setup | | |
| 1 0 1 ack+test | ack+test byte code indicates teardown | | ack+test byte code indicates ack+test | | ack+test | ack+test byte code indicates continue |
| 1 1 1 continue | | continue byte code indicates done | | | | continue |

Note: Wrapper signals 'not_node_enabled' OR 'eu_abort' force STATE to '0 0 0' , IDLE

FIGURE 63. DVN FSM STATE TRANSITION TABLE

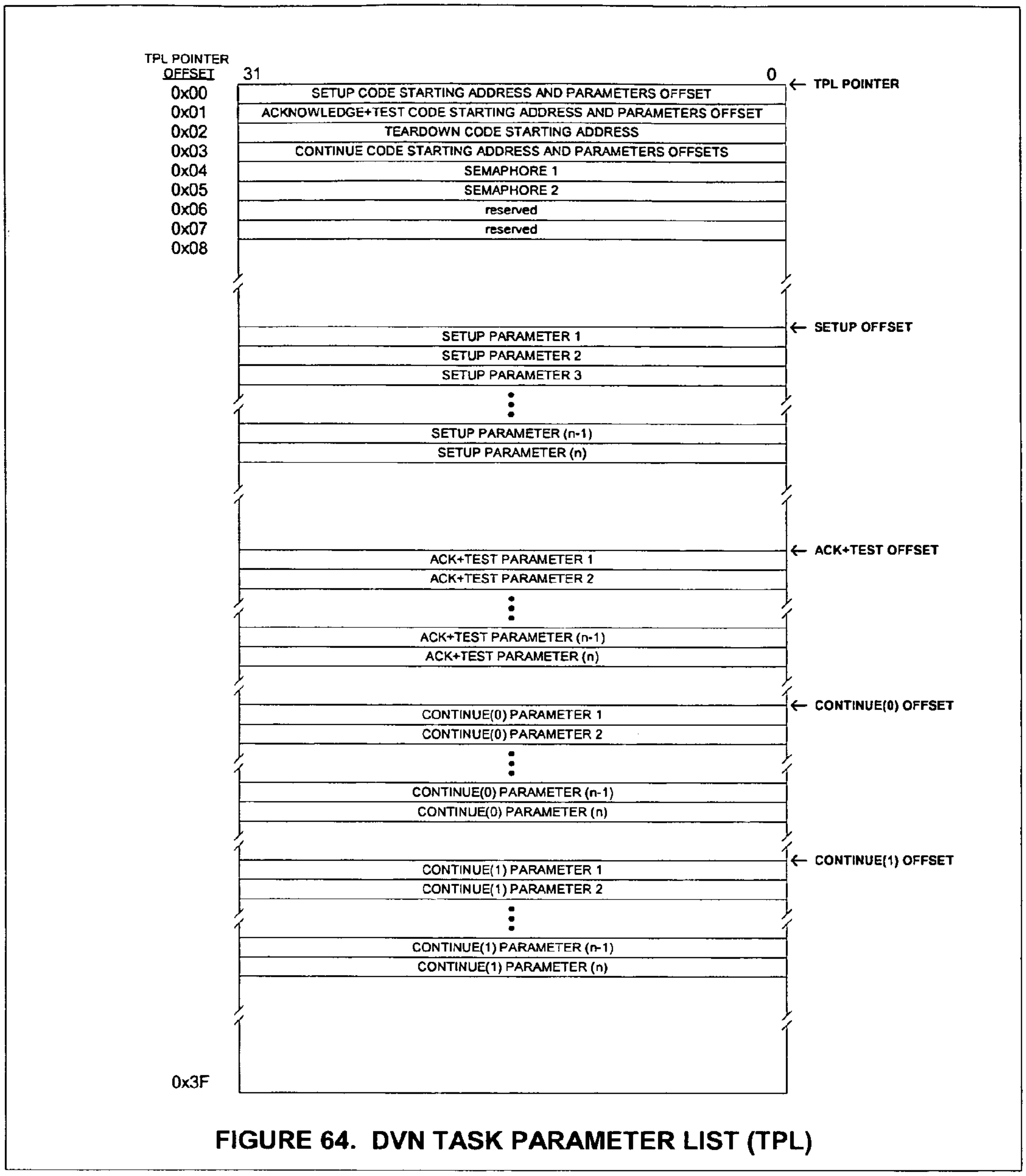
FIGURE 64. DVN TASK PARAMETER LIST (TPL)

| 31–28 | 27–22 | 21–16 | 15–12 | 11–0 |
|---|---|---|---|---|
| reserved | PARMS(1) OFFSET | PARMS(0) OFFSET | rsvd | BYTE CODE LONGWORD STARTING ADDR. |

| TPL LOCATION | CONTENTS |
|---|---|
| 0x00 | SETUP CODE STARTING ADDRESS AND PARAMETERS OFFSETS |
| 0x01 | ACKNOWLEDGE+TEST CODE STARTING ADDRESS AND PARAMETERS OFFSETS |
| 0x02 | TEARDOWN CODE STARTING ADDRESS |
| 0x03 | CONTINUE CODE STARTING ADDRESS AND PARAMETERS OFFSETS |

FIGURE 65. DVN TPL MEMORY / REGISTER FORMAT FOR LOCATIONS 0x00-0x03

| 31 | 30–0 |
|---|---|
| sign | reserved |

| TPL LOCATION | CONTENTS |
|---|---|
| 0x04 | SEMAPHORE 1 |
| 0x05 | SEMAPHORE 2 |

FIGURE 66. DVN TPL MEMORY FORMAT FOR LOCATIONS 0x04, 0x05

| 31–24 | 23–11 | 10–6 | 5–0 |
|---|---|---|---|
| ROUTE | ACK VALUE (sign extended to 14 bits by hardware) | TASK NUMBER | PORT NUMBER |

Note: The ACK type is contained in the byte Codeword

FIGURE 67. DVN TPL MEMORY FORMAT FOR ACKNOWLEDGE+TEST PARAMETERS

Figures 68, 69:
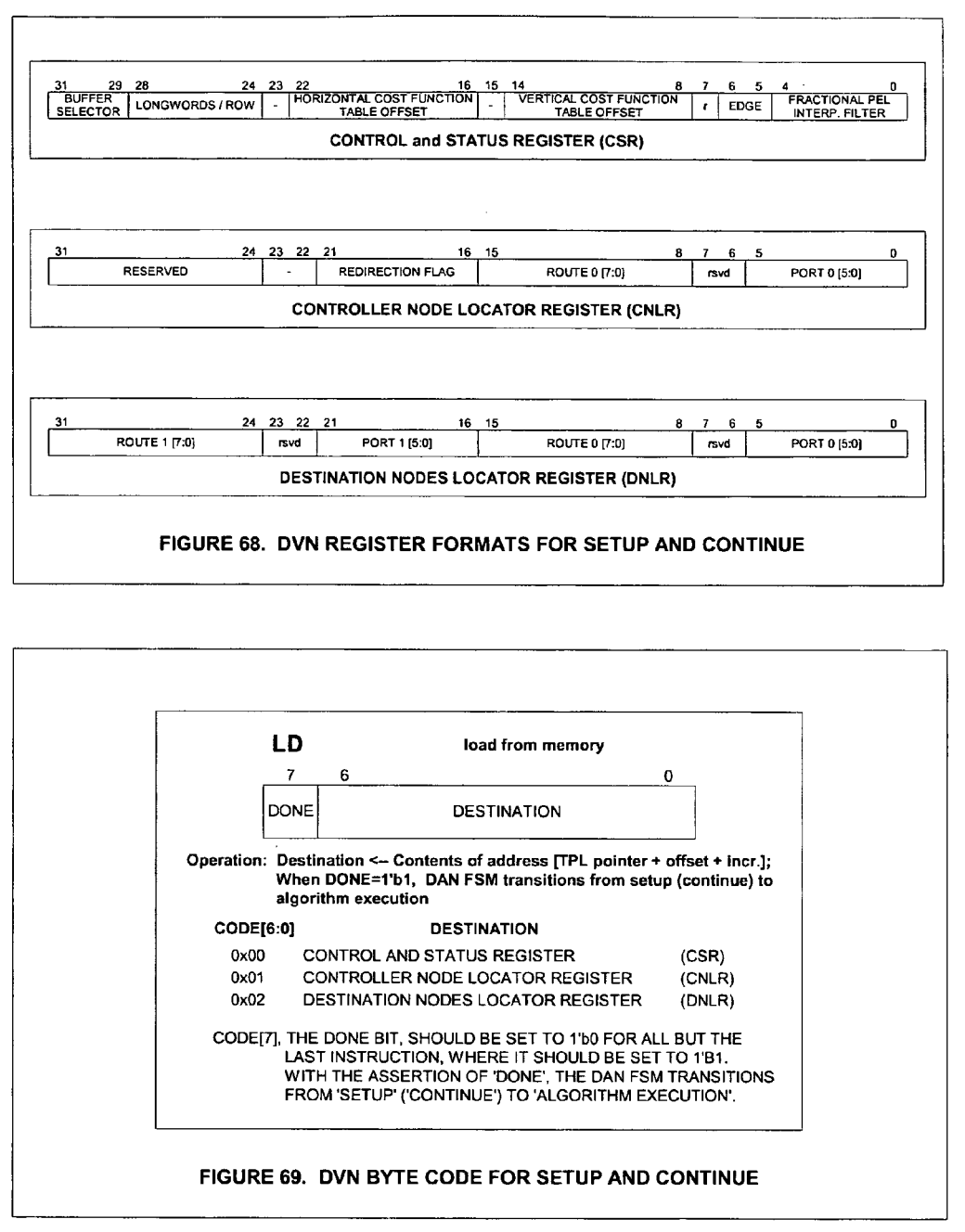

| 31 29 | 28 24 | 23 | 22 16 | 15 | 14 8 | 7 | 6 5 | 4 0 |
|---|---|---|---|---|---|---|---|---|
| BUFFER SELECTOR | LONGWORDS / ROW | - | HORIZONTAL COST FUNCTION TABLE OFFSET | - | VERTICAL COST FUNCTION TABLE OFFSET | r | EDGE | FRACTIONAL PEL INTERP. FILTER |

CONTROL and STATUS REGISTER (CSR)

| 31 24 | 23 22 | 21 16 | 15 8 | 7 6 | 5 0 |
|---|---|---|---|---|---|
| RESERVED | - | REDIRECTION FLAG | ROUTE 0 [7:0] | rsvd | PORT 0 [5:0] |

CONTROLLER NODE LOCATOR REGISTER (CNLR)

| 31 24 | 23 22 | 21 16 | 15 8 | 7 6 | 5 0 |
|---|---|---|---|---|---|
| ROUTE 1 [7:0] | rsvd | PORT 1 [5:0] | ROUTE 0 [7:0] | rsvd | PORT 0 [5:0] |

DESTINATION NODES LOCATOR REGISTER (DNLR)

FIGURE 68. DVN REGISTER FORMATS FOR SETUP AND CONTINUE

LD load from memory

| 7 | 6 0 |
|---|---|
| DONE | DESTINATION |

Operation: Destination <-- Contents of address [TPL pointer + offset + Incr.]; When DONE=1'b1, DAN FSM transitions from setup (continue) to algorithm execution

| CODE[6:0] | DESTINATION | |
|---|---|---|
| 0x00 | CONTROL AND STATUS REGISTER | (CSR) |
| 0x01 | CONTROLLER NODE LOCATOR REGISTER | (CNLR) |
| 0x02 | DESTINATION NODES LOCATOR REGISTER | (DNLR) |

CODE[7], THE DONE BIT, SHOULD BE SET TO 1'b0 FOR ALL BUT THE LAST INSTRUCTION, WHERE IT SHOULD BE SET TO 1'B1. WITH THE ASSERTION OF 'DONE', THE DAN FSM TRANSITIONS FROM 'SETUP' ('CONTINUE') TO 'ALGORITHM EXECUTION'.

FIGURE 69. DVN BYTE CODE FOR SETUP AND CONTINUE

WCSZ stall while sign of counter is '0'

| 7 | 6 | 5 | 4 | 3 | 2 | 1 | 0 |
|---|---|---|---|---|---|---|---|
| 0 | 1 | 1 | 0 | 1 | 0 | 0 | 0 |

Operation: for sign (msb) of counter @ eu_csar[5:0] = '0' | '1', stall | continue

WCSO stall while sign of counter is '1'

| 7 | 6 | 5 | 4 | 3 | 2 | 1 | 0 |
|---|---|---|---|---|---|---|---|
| 0 | 1 | 1 | 0 | 1 | 0 | 0 | 1 |

Operation: for sign (msb) of counter @ eu_csar[5:0] = '1' | '0', stall | continue

WMSZ stall while sign of tpl memory is '0'

| 7 | 6 | 5 | 4 | 3 | 2 | 1 | 0 |
|---|---|---|---|---|---|---|---|
| 0 | 1 | 1 | 0 | 1 | 0 | 1 | 0 |

Operation: for sign (msb) of tpl longword @ tpl_offset = '0' | '1', stall | continue

WMSO stall while sign of tpl memory is '1'

| 7 | 6 | 5 | 4 | 3 | 2 | 1 | 0 |
|---|---|---|---|---|---|---|---|
| 0 | 1 | 1 | 0 | 1 | 0 | 1 | 1 |

Operation: for sign (msb) of tpl longword @ tpl_offset = '1' | '0', stall | continue

FIGURE 70-1. DVN BYTE CODES FOR ACKNOWLEDGE+TEST

Figure 70-2:
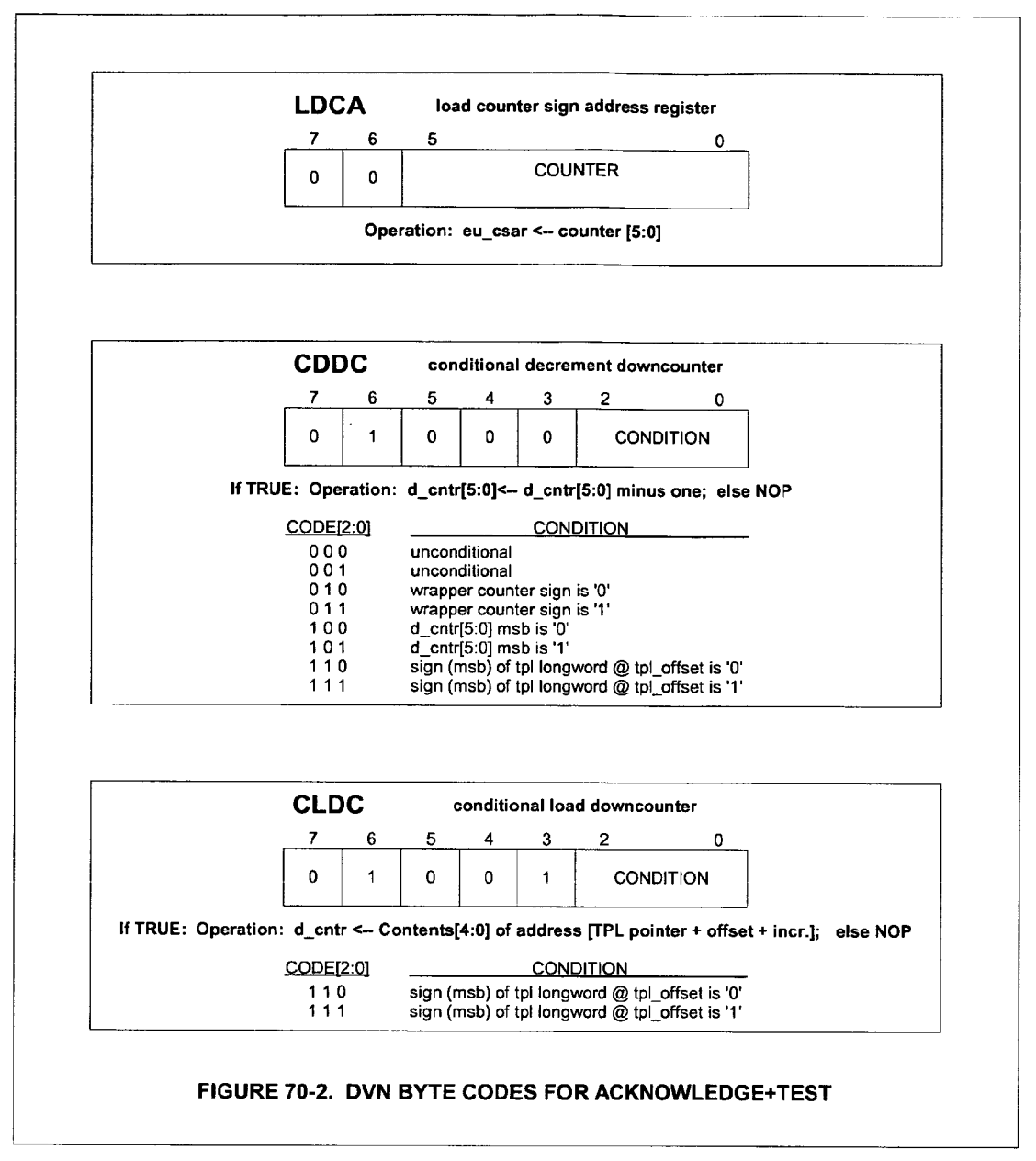

LDCA load counter sign address register

| 7 | 6 | 5 … 0 |
|---|---|---|
| 0 | 0 | COUNTER |

Operation: eu_csar <-- counter [5:0]

CDDC conditional decrement downcounter

| 7 | 6 | 5 | 4 | 3 | 2 … 0 |
|---|---|---|---|---|---|
| 0 | 1 | 0 | 0 | 0 | CONDITION |

If TRUE: Operation: d_cntr[5:0]<-- d_cntr[5:0] minus one; else NOP

| CODE[2:0] | CONDITION |
|---|---|
| 0 0 0 | unconditional |
| 0 0 1 | unconditional |
| 0 1 0 | wrapper counter sign is '0' |
| 0 1 1 | wrapper counter sign is '1' |
| 1 0 0 | d_cntr[5:0] msb is '0' |
| 1 0 1 | d_cntr[5:0] msb is '1' |
| 1 1 0 | sign (msb) of tpl longword @ tpl_offset is '0' |
| 1 1 1 | sign (msb) of tpl longword @ tpl_offset is '1' |

CLDC conditional load downcounter

| 7 | 6 | 5 | 4 | 3 | 2 … 0 |
|---|---|---|---|---|---|
| 0 | 1 | 0 | 0 | 1 | CONDITION |

If TRUE: Operation: d_cntr <-- Contents[4:0] of address [TPL pointer + offset + incr.]; else NOP

| CODE[2:0] | CONDITION |
|---|---|
| 1 1 0 | sign (msb) of tpl longword @ tpl_offset is '0' |
| 1 1 1 | sign (msb) of tpl longword @ tpl_offset is '1' |

FIGURE 70-2. DVN BYTE CODES FOR ACKNOWLEDGE+TEST

CSTC conditional state transition to CONTINUE

| 7 | 6 | 5 | 4 | 3 | 2 0 |
|---|---|---|---|---|---|
| 0 | 1 | 0 | 1 | 0 | CONDITION |

If TRUE: Operation: FSM STATE <--CONTINUE; else NOP

| CODE[2:0] | CONDITION |
|---|---|
| 0 0 0 | unconditional |
| 0 0 1 | uncond; wrapper cntr sign selects parms offset. |
| 0 1 0 | wrapper counter sign is '0' |
| 0 1 1 | wrapper counter sign is '1' |
| 1 0 0 | d_cntr[5:0] msb is '0' |
| 1 0 1 | d_cntr[5:0] msb is '1' |
| 1 1 0 | sign (msb) of tpl longword @ tpl_offset is '0' |
| 1 1 1 | sign (msb) of tpl longword @ tpl_offset is '1' |

CSTI conditional state transition to IDLE, set DONE

| 7 | 6 | 5 | 4 | 3 | 2 0 |
|---|---|---|---|---|---|
| 0 | 1 | 0 | 1 | 1 | CONDITION |

If TRUE: Operation: FSM STATE <--IDLE, assert 'eu_done'; else NOP

| CODE[2:0] | CONDITION |
|---|---|
| 0 0 0 | unconditional |
| 0 0 1 | unconditional |
| 0 1 0 | wrapper counter sign is '0' |
| 0 1 1 | wrapper counter sign is '1' |
| 1 0 0 | d_cntr[5:0] msb is '0' |
| 1 0 1 | d_cntr[5:0] msb is '1' |
| 1 1 0 | sign (msb) of tpl longword @ tpl_offset is '0' |
| 1 1 1 | sign (msb) of tpl longword @ tpl_offset is '1' |

FIGURE 70-3. DVN BYTE CODES FOR ACKNOWLEDGE+TEST

CSM1 clear semaphore 1

| 7 | 6 | 5 | 4 | 3 | 2 | 1 | 0 |
|---|---|---|---|---|---|---|---|
| 0 | 1 | 1 | 0 | 1 | 1 | 0 | 0 |

Operation: Contents of address [TPL pointer + 4] <-- 0x00000000

CSM2 clear semaphore 2

| 7 | 6 | 5 | 4 | 3 | 2 | 1 | 0 |
|---|---|---|---|---|---|---|---|
| 0 | 1 | 1 | 0 | 1 | 1 | 0 | 1 |

Operation: Contents of address [TPL pointer + 5] <-- 0x00000000

SSM1 set semaphore 1

| 7 | 6 | 5 | 4 | 3 | 2 | 1 | 0 |
|---|---|---|---|---|---|---|---|
| 0 | 1 | 1 | 0 | 1 | 1 | 1 | 0 |

Operation: Contents of address [TPL pointer + 4] <-- 0x80000000

SSM2 set semaphore 2

| 7 | 6 | 5 | 4 | 3 | 2 | 1 | 0 |
|---|---|---|---|---|---|---|---|
| 0 | 1 | 1 | 0 | 1 | 1 | 1 | 1 |

Operation: Contents of address [TPL pointer + 5] <-- 0x80000000

FIGURE 70-4. DAN BYTE CODE FOR ACKNOWLEDGE+TEST

ACK0 acknowledgement

| 7 | 6 | 5 | 4 | 3 | 2 | 1 | 0 |
|---|---|---|---|---|---|---|---|
| 0 | 1 | 1 | 1 | 0 | 0 | 0 | 0 |

Operation: Send contents of address [TPL pointer + offset] to network with Aux <--0x00

ACK1 acknowledgement + test

| 7 | 6 | 5 | 4 | 3 | 2 | 1 | 0 |
|---|---|---|---|---|---|---|---|
| 0 | 1 | 1 | 1 | 0 | 0 | 0 | 1 |

Operation: Send contents of address [TPL pointer + offset] to network with Aux <--0x01

ACK2 initialize counter

| 7 | 6 | 5 | 4 | 3 | 2 | 1 | 0 |
|---|---|---|---|---|---|---|---|
| 0 | 1 | 1 | 1 | 0 | 0 | 1 | 0 |

Operation: Send contents of address [TPL pointer + offset] to network with Aux <--0x02

ACK3 increment counter

| 7 | 6 | 5 | 4 | 3 | 2 | 1 | 0 |
|---|---|---|---|---|---|---|---|
| 0 | 1 | 1 | 1 | 0 | 0 | 1 | 1 |

Operation: Send contents of address [TPL pointer + offset] to network with Aux <--0x03

FIGURE 70-5. DVN BYTE CODE FOR ACKNOWLEDGE+TEST

| TPL POINTER OFFSET | 31 ... 0 | |
|---|---|---|
| 0x00 | SETUP CODE STARTING ADDRESS (CSA) AND PARMS OFFSET = 0x8 | ← TPL POINTER |
| 0x01 | ACK+TEST CODE STARTING ADDRESS (CSA+1) AND PARMS OFFSET = 0xA | |
| 0x02 | TEARDOWN CODE STARTING ADDRESS (not used) | |
| 0x03 | CONTINUE CODE STARTING ADDRESS (CSA+4) AND PARMS OFFSETS = 0x0F, 0x12 | |
| 0x04 | SEMAPHORE 1 (not used) | |
| 0x05 | SEMAPHORE 2 (not used) | |
| 0x06 | reserved | |
| 0x07 | reserved | |
| 0x08 | CSR PARAMETERS | ← SETUP OFFSET |
| 0x09 | CNLR PARAMETERS | |
| 0x0A | DNLR PARAMETERS | |
| 0x0B | PRODUCER ACKNOWLEDGEMENT PARAMETERS | ← ACK+TEST OFFSET |
| 0x0C | PRODUCER SELF-ACK PARAMETERS | |
| 0x0D | CONSUMER ACKNOWLEDGEMENT PARAMETERS | |
| 0x0E | CONSUMER SELF-ACK PARAMETERS | |
| 0x0F | CSR(0) PARAMETERS | ← CONTINUE(0) OFFSET |
| 0x10 | CNLR(0) PARAMETERS | |
| 0x11 | DNLR(0) PARAMETERS | |
| 0x12 | CSR(1) PARAMETERS | ← CONTINUE(1) OFFSET |
| 0x13 | CNLR(1) PARAMETERS | |
| 0x14 | DNLR(1) PARAMETERS | |

TASK PARAMETER LIST: 18 LONGWORDS

| 31 ... 24 | 23 ... 16 | 15 ... 8 | 7 ... 0 | |
|---|---|---|---|---|
| - | LD DNLR,DONE | LD CNLR | LD CSR | ← CSA (SETUP) |
| ACK0 | ACK0 | ACK0 | ACK0 | ← CSA+1 (ACK+TEST) |
| WCSO | LDCA (OUT) | WCSZ | LDCA (IN) | |
| - | - | CSTC-001 | LDCA (FLAG) | |
| - | LD DNLR,DONE | LD CNLR | LD CSR | ← CSA+4 (CONTINUE) |

BYTE CODE: 5 LONGWORDS

FIGURE 71. DVN TASK PARAMETER LIST (TPL) AND BYTE CODE FOR 'TYPICAL TASK'

Figure 72:
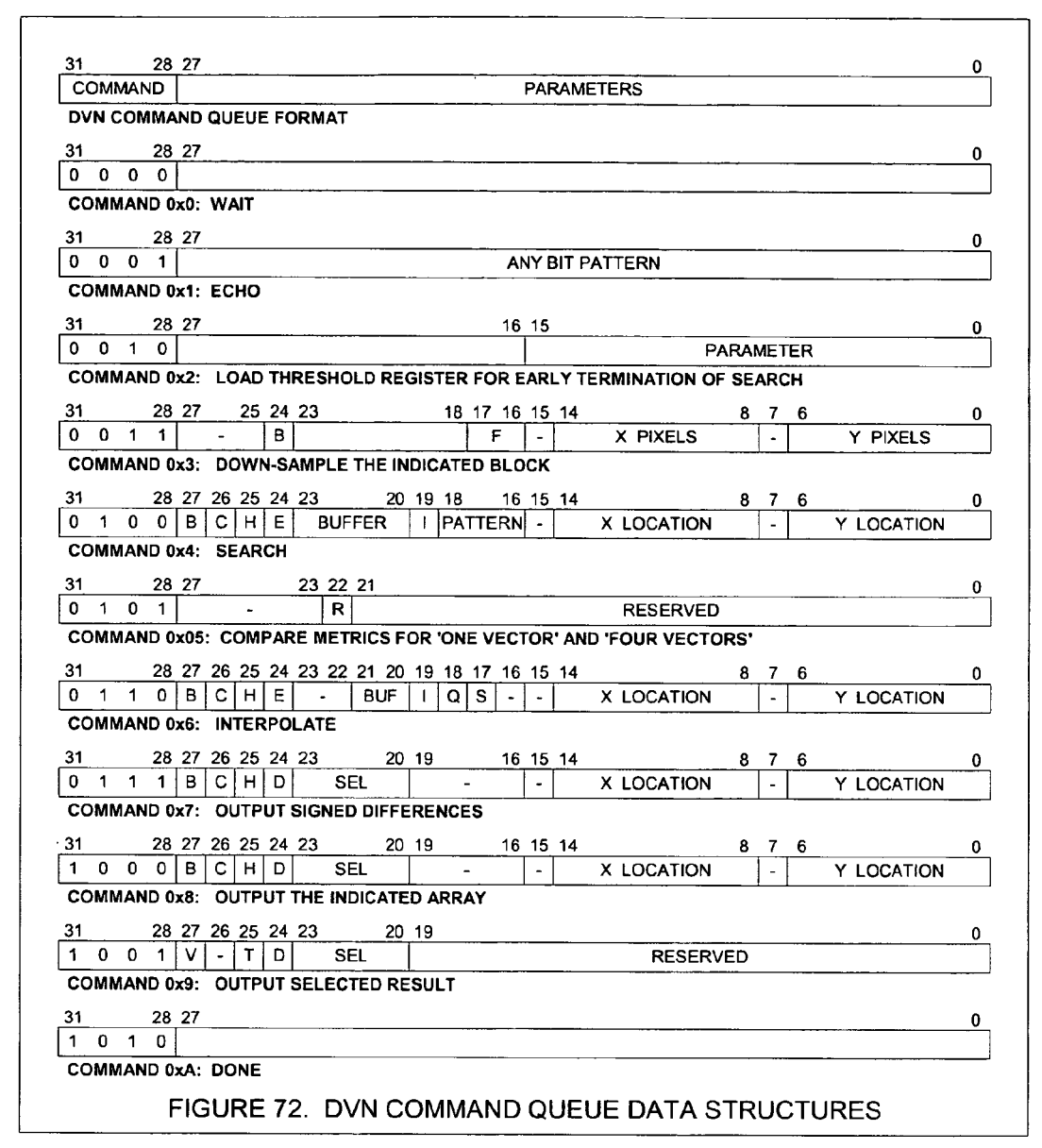

| 31–28 | 27–0 |
|---|---|
| COMMAND | PARAMETERS |

DVN COMMAND QUEUE FORMAT

| 31–28 | 27–0 |
|---|---|
| 0 0 0 0 | |

COMMAND 0x0: WAIT

| 31–28 | 27–0 |
|---|---|
| 0 0 0 1 | ANY BIT PATTERN |

COMMAND 0x1: ECHO

| 31–28 | 27–16 | 15–0 |
|---|---|---|
| 0 0 1 0 | | PARAMETER |

COMMAND 0x2: LOAD THRESHOLD REGISTER FOR EARLY TERMINATION OF SEARCH

| 31–28 | 27–25 | 24 | 23–18 | 17–16 | 15 | 14–8 | 7 | 6–0 |
|---|---|---|---|---|---|---|---|---|
| 0 0 1 1 | - | B | | F | - | X PIXELS | - | Y PIXELS |

COMMAND 0x3: DOWN-SAMPLE THE INDICATED BLOCK

| 31–28 | 27 | 26 | 25 | 24 | 23–20 | 19 | 18–16 | 15 | 14–8 | 7 | 6–0 |
|---|---|---|---|---|---|---|---|---|---|---|---|
| 0 1 0 0 | B | C | H | E | BUFFER | I | PATTERN | - | X LOCATION | - | Y LOCATION |

COMMAND 0x4: SEARCH

| 31–28 | 27–23 | 22 | 21–0 |
|---|---|---|---|
| 0 1 0 1 | - | R | RESERVED |

COMMAND 0x05: COMPARE METRICS FOR 'ONE VECTOR' AND 'FOUR VECTORS'

| 31–28 | 27 | 26 | 25 | 24 | 23–22 | 21–20 | 19 | 18 | 17 | 16 | 15 | 14–8 | 7 | 6–0 |
|---|---|---|---|---|---|---|---|---|---|---|---|---|---|---|
| 0 1 1 0 | B | C | H | E | - | BUF | I | Q | S | - | - | X LOCATION | - | Y LOCATION |

COMMAND 0x6: INTERPOLATE

| 31–28 | 27 | 26 | 25 | 24 | 23–20 | 19–16 | 15 | 14–8 | 7 | 6–0 |
|---|---|---|---|---|---|---|---|---|---|---|
| 0 1 1 1 | B | C | H | D | SEL | - | - | X LOCATION | - | Y LOCATION |

COMMAND 0x7: OUTPUT SIGNED DIFFERENCES

| 31–28 | 27 | 26 | 25 | 24 | 23–20 | 19–16 | 15 | 14–8 | 7 | 6–0 |
|---|---|---|---|---|---|---|---|---|---|---|
| 1 0 0 0 | B | C | H | D | SEL | - | - | X LOCATION | - | Y LOCATION |

COMMAND 0x8: OUTPUT THE INDICATED ARRAY

| 31–28 | 27 | 26 | 25 | 24 | 23–20 | 19–0 |
|---|---|---|---|---|---|---|
| 1 0 0 1 | V | - | T | D | SEL | RESERVED |

COMMAND 0x9: OUTPUT SELECTED RESULT

| 31–28 | 27–0 |
|---|---|
| 1 0 1 0 | |

COMMAND 0xA: DONE

FIGURE 72. DVN COMMAND QUEUE DATA STRUCTURES

| | | |
|---|---|---|
| 6 | 4 | 8 |
| 2 | 1 | 3 |
| 7 | 5 | 9 |

FIGURE 73. SEARCH ORDER FOR HALF / QUARTER PIXEL RESOLUTIONS

| | | | |
|---|---|---|---|
| 13 | 9 | 11 | 15 |
| 5 | 1 | 3 | 7 |
| 6 | 2 | 4 | 8 |
| 14 | 10 | 12 | 16 |

SEARCH ORDER: 4-BY-4 POSITIONS

| | | | | |
|---|---|---|---|---|
| 22 | 18 | 12 | 20 | 24 |
| 14 | 6 | 4 | 8 | 16 |
| 10 | 2 | 1 | 3 | 11 |
| 15 | 7 | 5 | 9 | 17 |
| 23 | 19 | 13 | 21 | 25 |

SEARCH ORDER: 5-BY-5 POSITIONS

FIGURE 74. SEARCH ORDER FOR SETS OF 4-BY-4 AND 5-BY-5 POSITIONS

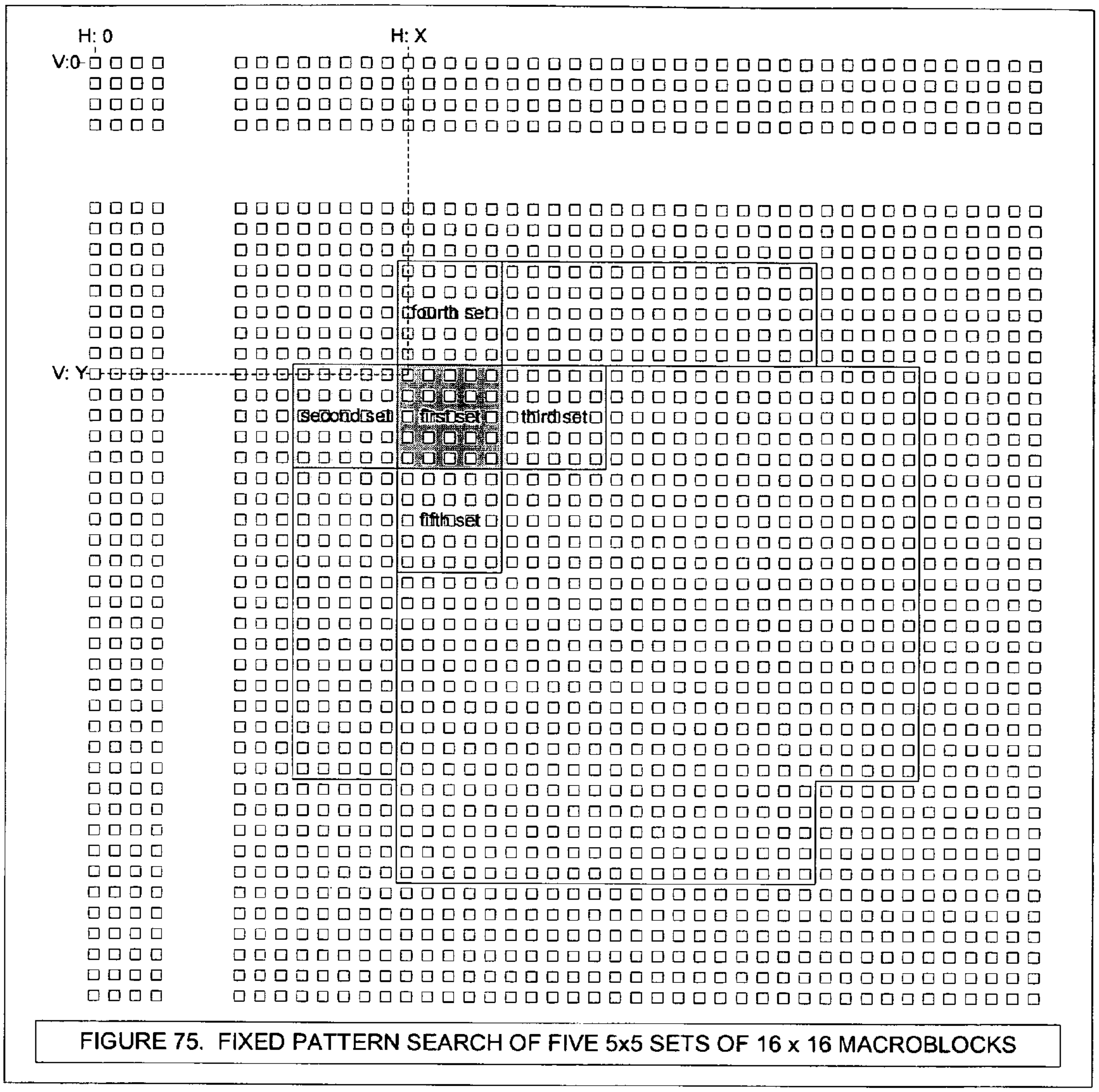
FIGURE 75. FIXED PATTERN SEARCH OF FIVE 5x5 SETS OF 16 x 16 MACROBLOCKS

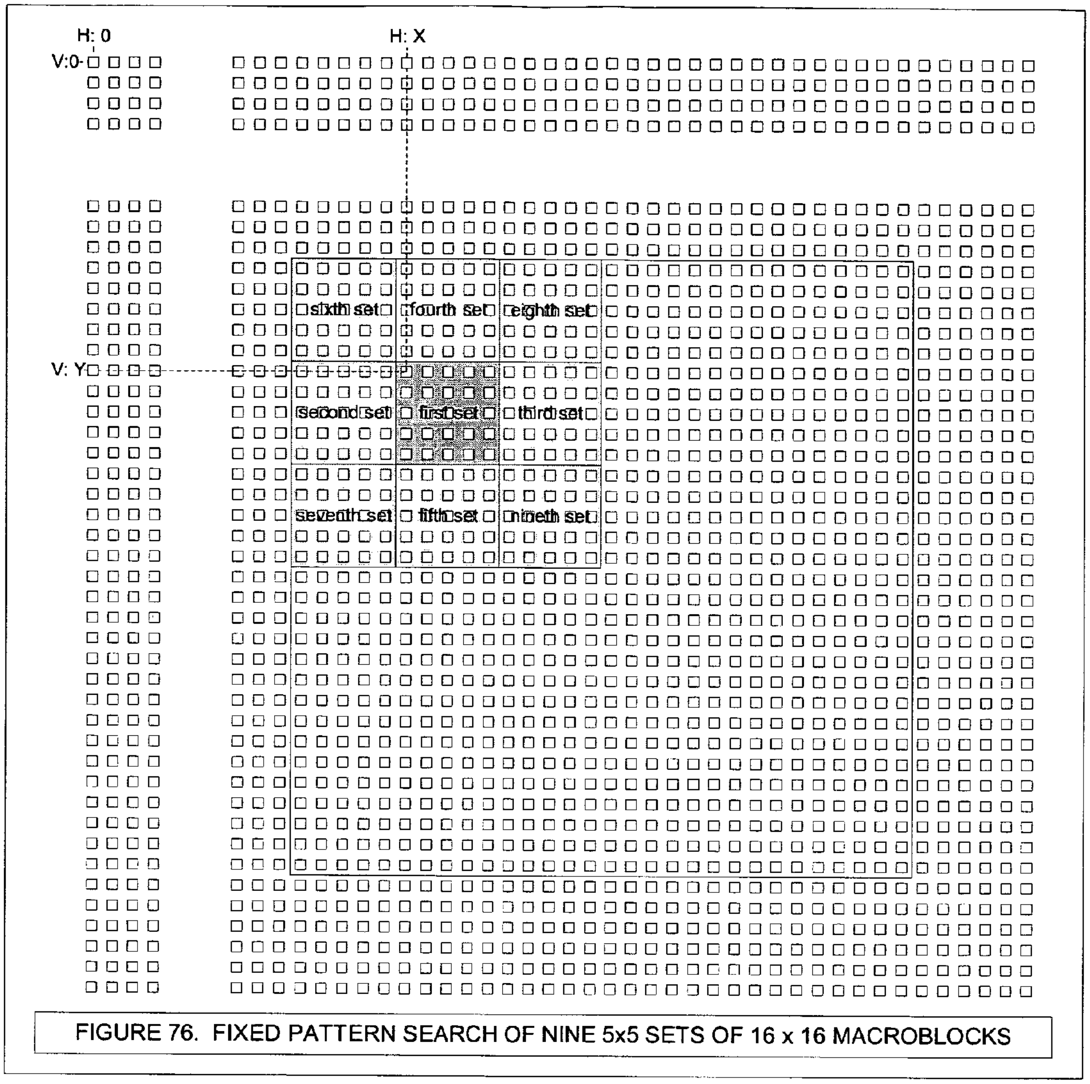
FIGURE 76. FIXED PATTERN SEARCH OF NINE 5x5 SETS OF 16 x 16 MACROBLOCKS

| | MEMORY 4 (b=9) (bits 31–0) | MEMORY 5 (b=B) (bits 31–0) |
|---|---|---|
| 0xbB0 | DOUBLE PIXEL MOTION VECTOR | DOUBLE PIXEL METRIC |
| 0xbB1 | FULL PIXEL MOTION VECTOR (16 x 16) | FULL PIXEL METRIC (16 x 16) |
| 0xbB2 | HALF PIXEL MOTION VECTOR (16 x 16) | HALF PIXEL METRIC (16 x 16) |
| 0xbB3 | QUARTER PIXEL MOTION VECTOR (16 x 16) | QUARTER PIXEL METRIC (16 x 16) |
| 0xbB4 | FULL PIXEL MOTION VECTOR (UPPER LEFTMOST 8 x 8) | FULL PIXEL METRIC (UPPER LEFTMOST 8 x 8) |
| 0xbB5 | FULL PIXEL MOTION VECTOR (UPPER RIGHTMOST 8 x 8) | FULL PIXEL METRIC (UPPER RIGHTMOST 8 x 8) |
| 0xbB6 | FULL PIXEL MOTION VECTOR (LOWER LEFTMOST 8 x 8) | FULL PIXEL METRIC (LOWER LEFTMOST 8 x 8) |
| 0xbB7 | FULL PIXEL MOTION VECTOR (LOWER RIGHTMOST 8 x 8) | FULL PIXEL METRIC (LOWER RIGHTMOST 8 x 8) |
| 0xbB8 | HALF PIXEL MOTION VECTOR (UPPER LEFTMOST 8 x 8) | HALF PIXEL METRIC (UPPER LEFTMOST 8 x 8) |
| 0xbB9 | HALF PIXEL MOTION VECTOR (UPPER RIGHTMOST 8 x 8) | HALF PIXEL METRIC (UPPER RIGHTMOST 8 x 8) |
| 0xbBA | HALF PIXEL MOTION VECTOR (LOWER LEFTMOST 8 x 8) | HALF PIXEL METRIC (LOWER LEFTMOST 8 x 8) |
| 0xbBB | HALF PIXEL MOTION VECTOR (LOWER RIGHTMOST 8 x 8) | HALF PIXEL METRIC (LOWER RIGHTMOST 8 x 8) |
| 0xbBC | QUARTER PIXEL MOTION VECTOR (UPPER LEFTMOST 8 x 8) | QUARTER PIXEL METRIC (UPPER LEFTMOST 8 x 8) |
| 0xbBD | QUARTER PIXEL MOTION VECTOR (UPPER RIGHTMOST 8 x 8) | QUARTER PIXEL METRIC (UPPER RIGHTMOST 8 x 8) |
| 0xbBE | QUARTER PIXEL MOTION VECTOR (LOWER LEFTMOST 8 x 8) | QUARTER PIXEL METRIC (LOWER LEFTMOST 8 x 8) |
| 0xbBF | QUARTER PIXEL MOTION VECTOR (LOWER RIGHTMOST 8 x 8) | QUARTER PIXEL METRIC (LOWER RIGHTMOST 8 x 8) |

| 31–16 | 15–0 |
|---|---|
| | METRIC |

METRICS DATA FORMAT

| 31–25 | 24–18 | 17 | 16 | 15–8 | 8–2 | 1 | 0 |
|---|---|---|---|---|---|---|---|
| | X-OFFSET FULL | 1/2 | 1/4 | | Y-OFFSET FULL | 1/2 | 1/4 |

MOTION VECTORS DATA FORMAT

FIGURE 77. MEMORY LAYOUT FOR RESULTS BUFFER

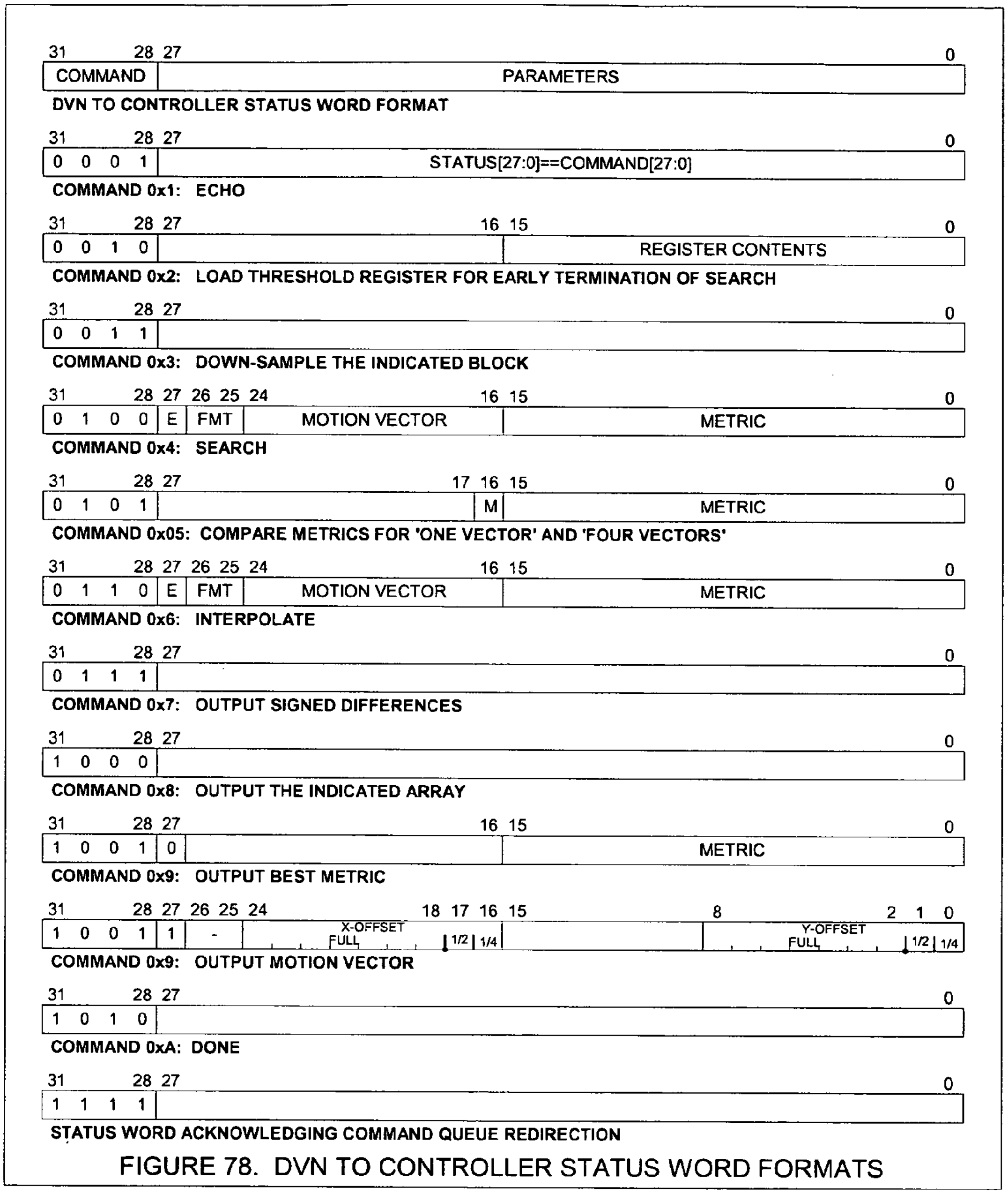
FIGURE 78. DVN TO CONTROLLER STATUS WORD FORMATS

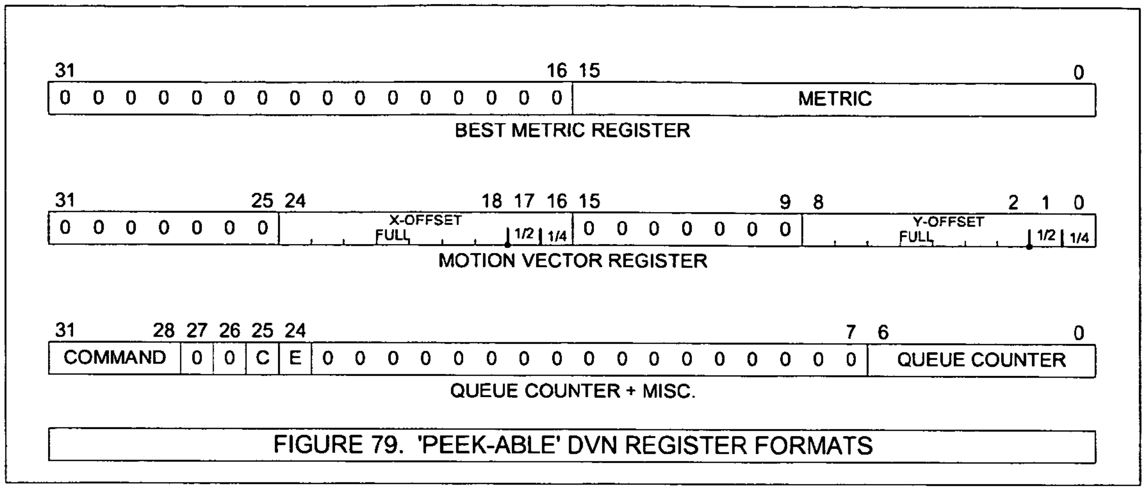
FIGURE 79. 'PEEK-ABLE' DVN REGISTER FORMATS

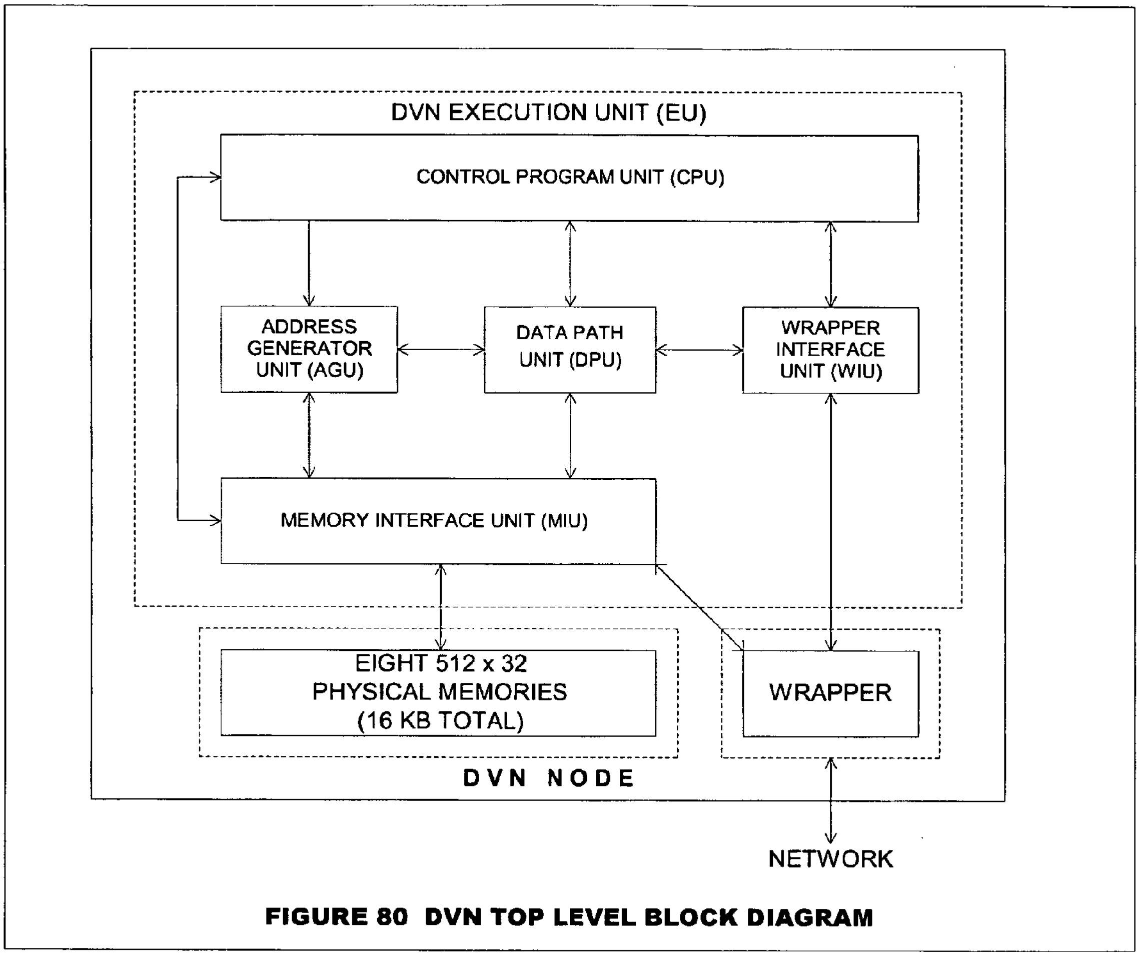
FIGURE 80 DVN TOP LEVEL BLOCK DIAGRAM

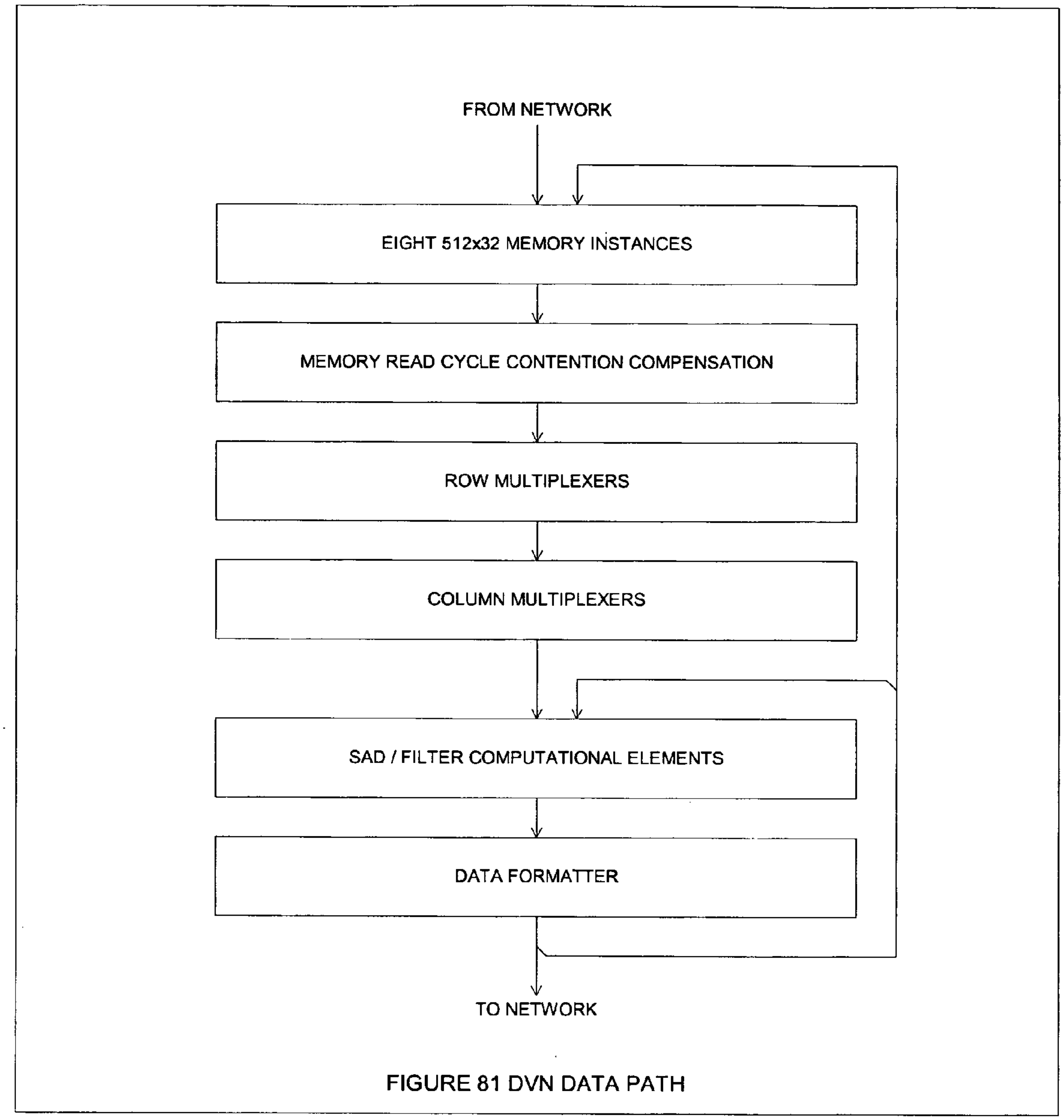
FIGURE 81 DVN DATA PATH

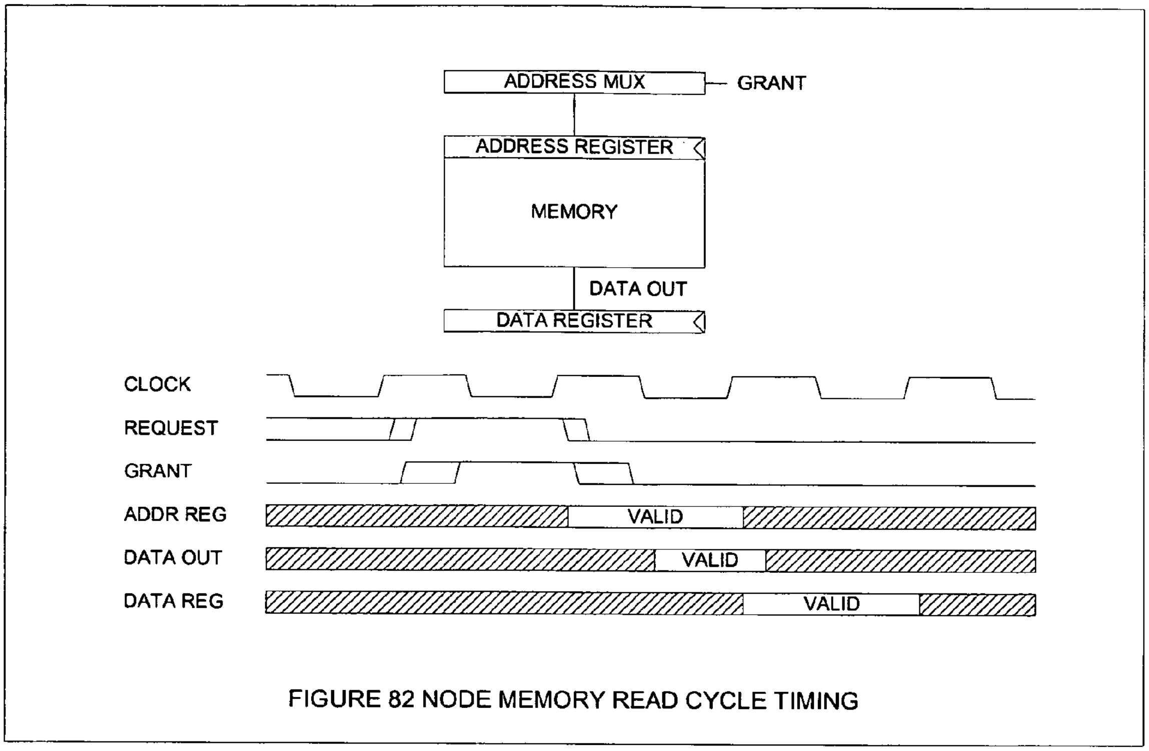
FIGURE 82 NODE MEMORY READ CYCLE TIMING

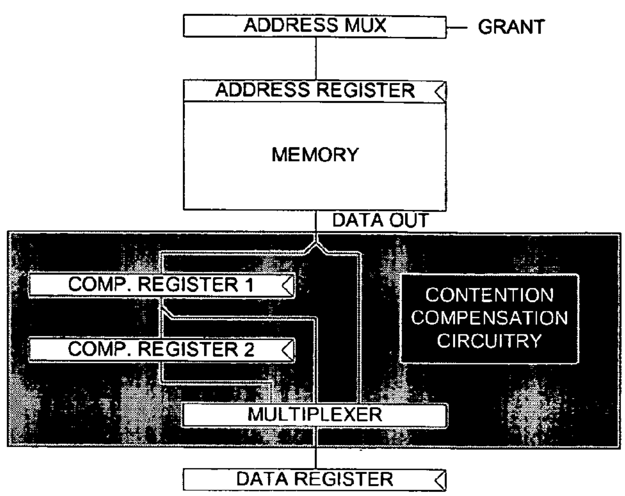
FIGURE 83 NODE MEMORY READ CYCLE CONTENTION COMPENSATION

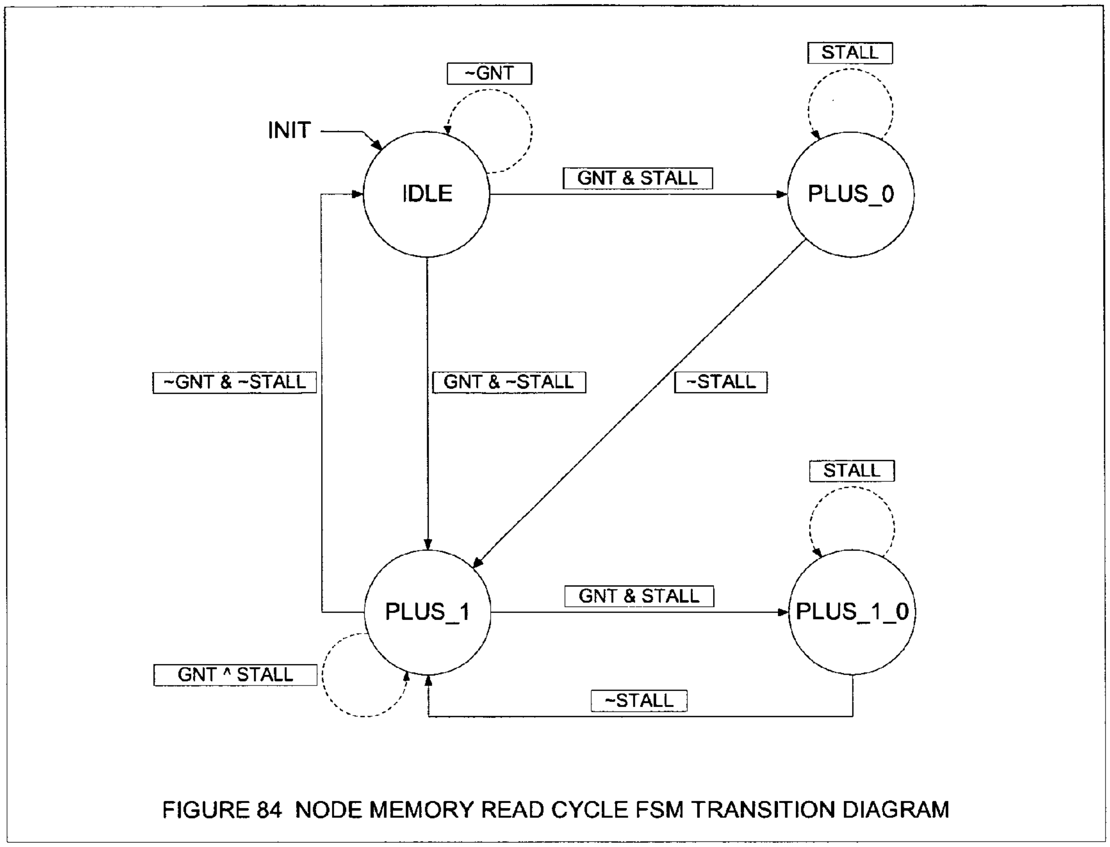
FIGURE 84 NODE MEMORY READ CYCLE FSM TRANSITION DIAGRAM

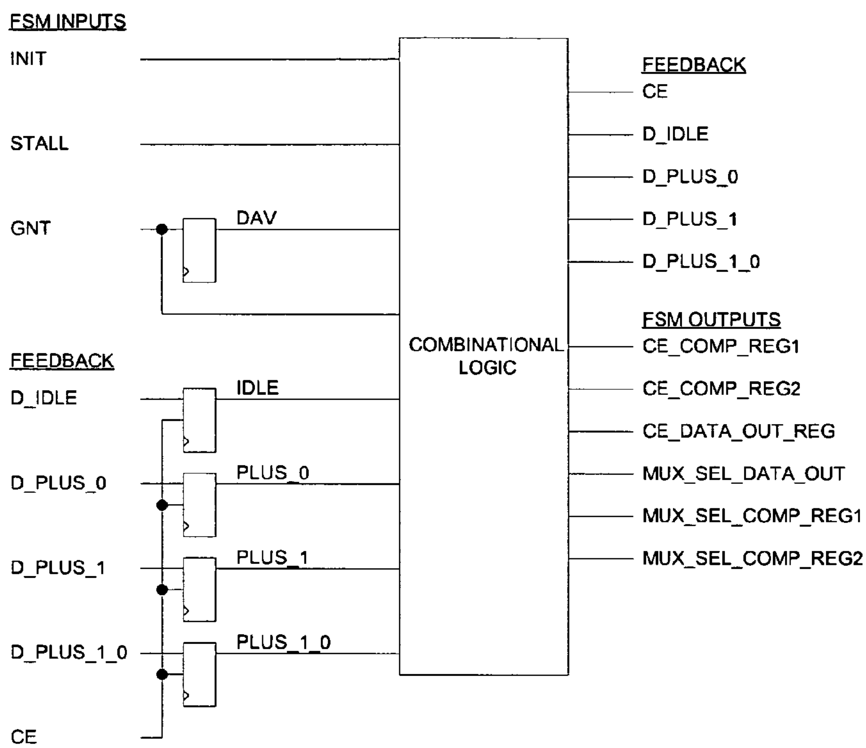

FEEDBACK

CE = INIT | IDLE & GNT | PLUS_0 & ~STALL | PLUS_1 & (GNT ~^ STALL) | PLUS_1_0 & ~STALL;

D_IDLE = INIT | PLUS_1 & ~STALL;

D_PLUS_0 = ~INIT & STALL & IDLE;

D_PLUS_1 = ~INIT & ~STALL & [IDLE | PLUS_0 | PLUS_1_0];

D_PLUS_1_0 = ~INIT & STALL & PLUS_1;

FSM OUTPUTS

CE_COMP_REG1 = DAV & [PLUS_0 | PLUS_1_0 | PLUS_1 & STALL;

CE_COMP_REG2 = DAV & STALL & PLUS_1_0;

CE_DATA_OUT_REG = ~STALL & [PLUS_1 | PLUS_1_0];

MUX_SEL_DATA_OUT = ~STALL & DAV & PLUS_1;

MUX_SEL_COMP_REG1 = ~STALL & [PLUS_1 & ~DAV | PLUS_1_0 & DAV];

MUX_SEL_COMP_REG2 = ~STALL & ~DAV & PLUS_1_0;

FIGURE 85 FSM FOR NODE MEMORY READ CYCLE CONTENTION COMPENSATION

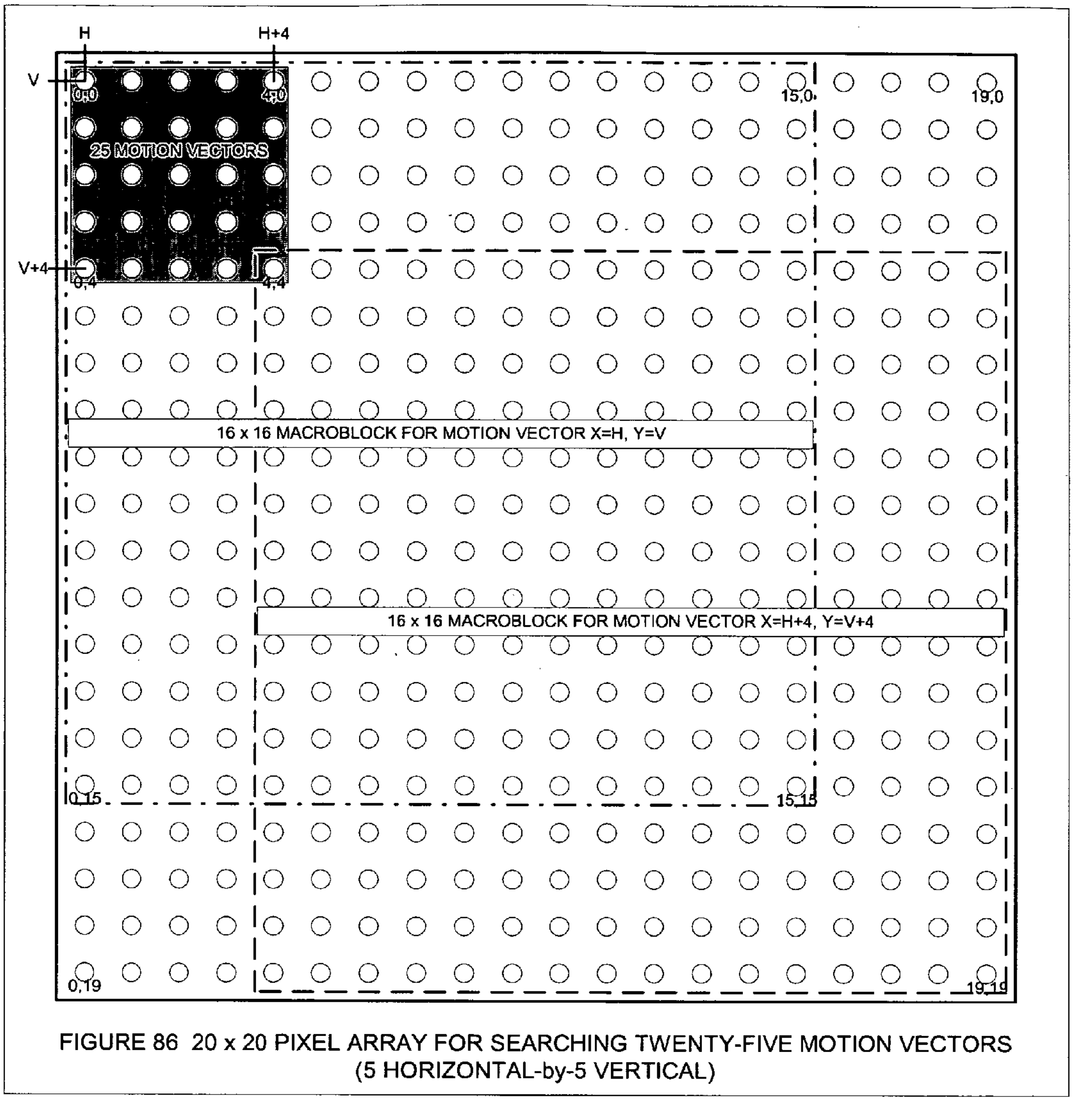
FIGURE 86 20 x 20 PIXEL ARRAY FOR SEARCHING TWENTY-FIVE MOTION VECTORS (5 HORIZONTAL-by-5 VERTICAL)

| | CLOCK CYCLES | | | | | | | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 |
| | ACTIVE SADs | | | | | | | | | | | | | | | | | | | | | | | | | | | | | | | | | | | | | | | |
| | 100 | | | | | | | | 200 | | | | | | | | 200 | | | | | | | | 200 | | | | | | | | 100 | | | | | | | |
| H,V | ROWS 0-3 | | | | | | | | ROWS 4-7 | | | | | | | | ROWS 8-11 | | | | | | | | ROWS 12-15 | | | | | | | | | | | | | | | |
| 0,0 | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 | IDLE | | | | | | | |
| | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 | | | | | | | | |
| 1,0 | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 | | | | | | | | |
| | 2 | 4 | 6 | 8 | 10 | 12 | 14 | 16 | 2 | 4 | 6 | 8 | 10 | 12 | 14 | 16 | 2 | 4 | 6 | 8 | 10 | 12 | 14 | 16 | 2 | 4 | 6 | 8 | 10 | 12 | 14 | 16 | | | | | | | | |
| 2,0 | 2 | 4 | 6 | 8 | 10 | 12 | 14 | 16 | 2 | 4 | 6 | 8 | 10 | 12 | 14 | 16 | 2 | 4 | 6 | 8 | 10 | 12 | 14 | 16 | 2 | 4 | 6 | 8 | 10 | 12 | 14 | 16 | | | | | | | | |
| | 3 | 5 | 7 | 9 | 11 | 13 | 15 | 17 | 3 | 5 | 7 | 9 | 11 | 13 | 15 | 17 | 3 | 5 | 7 | 9 | 11 | 13 | 15 | 17 | 3 | 5 | 7 | 9 | 11 | 13 | 15 | 17 | | | | | | | | |
| 3,0 | 3 | 5 | 7 | 9 | 11 | 13 | 15 | 17 | 3 | 5 | 7 | 9 | 11 | 13 | 15 | 17 | 3 | 5 | 7 | 9 | 11 | 13 | 15 | 17 | 3 | 5 | 7 | 9 | 11 | 13 | 15 | 17 | | | | | | | | |
| | 4 | 6 | 8 | 10 | 12 | 14 | 16 | 18 | 4 | 6 | 8 | 10 | 12 | 14 | 16 | 18 | 4 | 6 | 8 | 10 | 12 | 14 | 16 | 18 | 4 | 6 | 8 | 10 | 12 | 14 | 16 | 18 | | | | | | | | |
| 4,0 | 4 | 6 | 8 | 10 | 12 | 14 | 16 | 18 | 4 | 6 | 8 | 10 | 12 | 14 | 16 | 18 | 4 | 6 | 8 | 10 | 12 | 14 | 16 | 18 | 4 | 6 | 8 | 10 | 12 | 14 | 16 | 18 | | | | | | | | |
| | 5 | 7 | 9 | 11 | 13 | 15 | 17 | 19 | 5 | 7 | 9 | 11 | 13 | 15 | 17 | 19 | 5 | 7 | 9 | 11 | 13 | 15 | 17 | 19 | 5 | 7 | 9 | 11 | 13 | 15 | 17 | 19 | | | | | | | | |
| | ROWS 1-3 | | | | | | | | ROWS 4-7 | | | | | | | | ROWS 8-11 | | | | | | | | ROWS 12-15 | | | | | | | | ROW 16 | | | | | | | |
| 0,1 | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 |
| | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 |
| 1,1 | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 |
| | 2 | 4 | 6 | 8 | 10 | 12 | 14 | 16 | 2 | 4 | 6 | 8 | 10 | 12 | 14 | 16 | 2 | 4 | 6 | 8 | 10 | 12 | 14 | 16 | 2 | 4 | 6 | 8 | 10 | 12 | 14 | 16 | 2 | 4 | 6 | 8 | 10 | 12 | 14 | 16 |
| 2,1 | 2 | 4 | 6 | 8 | 10 | 12 | 14 | 16 | 2 | 4 | 6 | 8 | 10 | 12 | 14 | 16 | 2 | 4 | 6 | 8 | 10 | 12 | 14 | 16 | 2 | 4 | 6 | 8 | 10 | 12 | 14 | 16 | 2 | 4 | 6 | 8 | 10 | 12 | 14 | 16 |
| | 3 | 5 | 7 | 9 | 11 | 13 | 15 | 17 | 3 | 5 | 7 | 9 | 11 | 13 | 15 | 17 | 3 | 5 | 7 | 9 | 11 | 13 | 15 | 17 | 3 | 5 | 7 | 9 | 11 | 13 | 15 | 17 | 3 | 5 | 7 | 9 | 11 | 13 | 15 | 17 |
| 3,1 | 3 | 5 | 7 | 9 | 11 | 13 | 15 | 17 | 3 | 5 | 7 | 9 | 11 | 13 | 15 | 17 | 3 | 5 | 7 | 9 | 11 | 13 | 15 | 17 | 3 | 5 | 7 | 9 | 11 | 13 | 15 | 17 | 3 | 5 | 7 | 9 | 11 | 13 | 15 | 17 |
| | 4 | 6 | 8 | 10 | 12 | 14 | 16 | 18 | 4 | 6 | 8 | 10 | 12 | 14 | 16 | 18 | 4 | 6 | 8 | 10 | 12 | 14 | 16 | 18 | 4 | 6 | 8 | 10 | 12 | 14 | 16 | 18 | 4 | 6 | 8 | 10 | 12 | 14 | 16 | 18 |
| 4,1 | 4 | 6 | 8 | 10 | 12 | 14 | 16 | 18 | 4 | 6 | 8 | 10 | 12 | 14 | 16 | 18 | 4 | 6 | 8 | 10 | 12 | 14 | 16 | 18 | 4 | 6 | 8 | 10 | 12 | 14 | 16 | 18 | 4 | 6 | 8 | 10 | 12 | 14 | 16 | 18 |
| | 5 | 7 | 9 | 11 | 13 | 15 | 17 | 19 | 5 | 7 | 9 | 11 | 13 | 15 | 17 | 19 | 5 | 7 | 9 | 11 | 13 | 15 | 17 | 19 | 5 | 7 | 9 | 11 | 13 | 15 | 17 | 19 | 5 | 7 | 9 | 11 | 13 | 15 | 17 | 19 |
| | ROWS 2-3 | | | | | | | | ROWS 4-7 | | | | | | | | ROWS 8-11 | | | | | | | | ROWS 12-15 | | | | | | | | ROWS 16-17 | | | | | | | |
| 0,2 | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 |
| | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 |
| 1,2 | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 |
| | 2 | 4 | 6 | 8 | 10 | 12 | 14 | 16 | 2 | 4 | 6 | 8 | 10 | 12 | 14 | 16 | 2 | 4 | 6 | 8 | 10 | 12 | 14 | 16 | 2 | 4 | 6 | 8 | 10 | 12 | 14 | 16 | 2 | 4 | 6 | 8 | 10 | 12 | 14 | 16 |
| 2,2 | 2 | 4 | 6 | 8 | 10 | 12 | 14 | 16 | 2 | 4 | 6 | 8 | 10 | 12 | 14 | 16 | 2 | 4 | 6 | 8 | 10 | 12 | 14 | 16 | 2 | 4 | 6 | 8 | 10 | 12 | 14 | 16 | 2 | 4 | 6 | 8 | 10 | 12 | 14 | 16 |
| | 3 | 5 | 7 | 9 | 11 | 13 | 15 | 17 | 3 | 5 | 7 | 9 | 11 | 13 | 15 | 17 | 3 | 5 | 7 | 9 | 11 | 13 | 15 | 17 | 3 | 5 | 7 | 9 | 11 | 13 | 15 | 17 | 3 | 5 | 7 | 9 | 11 | 13 | 15 | 17 |
| 3,2 | 3 | 5 | 7 | 9 | 11 | 13 | 15 | 17 | 3 | 5 | 7 | 9 | 11 | 13 | 15 | 17 | 3 | 5 | 7 | 9 | 11 | 13 | 15 | 17 | 3 | 5 | 7 | 9 | 11 | 13 | 15 | 17 | 3 | 5 | 7 | 9 | 11 | 13 | 15 | 17 |
| | 4 | 6 | 8 | 10 | 12 | 14 | 16 | 18 | 4 | 6 | 8 | 10 | 12 | 14 | 16 | 18 | 4 | 6 | 8 | 10 | 12 | 14 | 16 | 18 | 4 | 6 | 8 | 10 | 12 | 14 | 16 | 18 | 4 | 6 | 8 | 10 | 12 | 14 | 16 | 18 |
| 4,2 | 4 | 6 | 8 | 10 | 12 | 14 | 16 | 18 | 4 | 6 | 8 | 10 | 12 | 14 | 16 | 18 | 4 | 6 | 8 | 10 | 12 | 14 | 16 | 18 | 4 | 6 | 8 | 10 | 12 | 14 | 16 | 18 | 4 | 6 | 8 | 10 | 12 | 14 | 16 | 18 |
| | 5 | 7 | 9 | 11 | 13 | 15 | 17 | 19 | 5 | 7 | 9 | 11 | 13 | 15 | 17 | 19 | 5 | 7 | 9 | 11 | 13 | 15 | 17 | 19 | 5 | 7 | 9 | 11 | 13 | 15 | 17 | 19 | 5 | 7 | 9 | 11 | 13 | 15 | 17 | 19 |
| | ROW 3 | | | | | | | | ROWS 4-7 | | | | | | | | ROWS 8-11 | | | | | | | | ROWS 12-15 | | | | | | | | ROWS 16-18 | | | | | | | |
| 0,3 | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 |
| | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 |
| 1,3 | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 |
| | 2 | 4 | 6 | 8 | 10 | 12 | 14 | 16 | 2 | 4 | 6 | 8 | 10 | 12 | 14 | 16 | 2 | 4 | 6 | 8 | 10 | 12 | 14 | 16 | 2 | 4 | 6 | 8 | 10 | 12 | 14 | 16 | 2 | 4 | 6 | 8 | 10 | 12 | 14 | 16 |
| 2,3 | 2 | 4 | 6 | 8 | 10 | 12 | 14 | 16 | 2 | 4 | 6 | 8 | 10 | 12 | 14 | 16 | 2 | 4 | 6 | 8 | 10 | 12 | 14 | 16 | 2 | 4 | 6 | 8 | 10 | 12 | 14 | 16 | 2 | 4 | 6 | 8 | 10 | 12 | 14 | 16 |
| | 3 | 5 | 7 | 9 | 11 | 13 | 15 | 17 | 3 | 5 | 7 | 9 | 11 | 13 | 15 | 17 | 3 | 5 | 7 | 9 | 11 | 13 | 15 | 17 | 3 | 5 | 7 | 9 | 11 | 13 | 15 | 17 | 3 | 5 | 7 | 9 | 11 | 13 | 15 | 17 |
| 3,3 | 3 | 5 | 7 | 9 | 11 | 13 | 15 | 17 | 3 | 5 | 7 | 9 | 11 | 13 | 15 | 17 | 3 | 5 | 7 | 9 | 11 | 13 | 15 | 17 | 3 | 5 | 7 | 9 | 11 | 13 | 15 | 17 | 3 | 5 | 7 | 9 | 11 | 13 | 15 | 17 |
| | 4 | 6 | 8 | 10 | 12 | 14 | 16 | 18 | 4 | 6 | 8 | 10 | 12 | 14 | 16 | 18 | 4 | 6 | 8 | 10 | 12 | 14 | 16 | 18 | 4 | 6 | 8 | 10 | 12 | 14 | 16 | 18 | 4 | 6 | 8 | 10 | 12 | 14 | 16 | 18 |
| 4,3 | 4 | 6 | 8 | 10 | 12 | 14 | 16 | 18 | 4 | 6 | 8 | 10 | 12 | 14 | 16 | 18 | 4 | 6 | 8 | 10 | 12 | 14 | 16 | 18 | 4 | 6 | 8 | 10 | 12 | 14 | 16 | 18 | 4 | 6 | 8 | 10 | 12 | 14 | 16 | 18 |
| | 5 | 7 | 9 | 11 | 13 | 15 | 17 | 19 | 5 | 7 | 9 | 11 | 13 | 15 | 17 | 19 | 5 | 7 | 9 | 11 | 13 | 15 | 17 | 19 | 5 | 7 | 9 | 11 | 13 | 15 | 17 | 19 | 5 | 7 | 9 | 11 | 13 | 15 | 17 | 19 |
| | | | | | | | | | ROWS 4-7 | | | | | | | | ROWS 8-11 | | | | | | | | ROWS 12-15 | | | | | | | | ROWS 16-19 | | | | | | | |
| 0,4 | IDLE | | | | | | | | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 |
| | | | | | | | | | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 |
| 1,4 | | | | | | | | | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 |
| | | | | | | | | | 2 | 4 | 6 | 8 | 10 | 12 | 14 | 16 | 2 | 4 | 6 | 8 | 10 | 12 | 14 | 16 | 2 | 4 | 6 | 8 | 10 | 12 | 14 | 16 | 2 | 4 | 6 | 8 | 10 | 12 | 14 | 16 |
| 2,4 | | | | | | | | | 2 | 4 | 6 | 8 | 10 | 12 | 14 | 16 | 2 | 4 | 6 | 8 | 10 | 12 | 14 | 16 | 2 | 4 | 6 | 8 | 10 | 12 | 14 | 16 | 2 | 4 | 6 | 8 | 10 | 12 | 14 | 16 |
| | | | | | | | | | 3 | 5 | 7 | 9 | 11 | 13 | 15 | 17 | 3 | 5 | 7 | 9 | 11 | 13 | 15 | 17 | 3 | 5 | 7 | 9 | 11 | 13 | 15 | 17 | 3 | 5 | 7 | 9 | 11 | 13 | 15 | 17 |
| 3,4 | | | | | | | | | 3 | 5 | 7 | 9 | 11 | 13 | 15 | 17 | 3 | 5 | 7 | 9 | 11 | 13 | 15 | 17 | 3 | 5 | 7 | 9 | 11 | 13 | 15 | 17 | 3 | 5 | 7 | 9 | 11 | 13 | 15 | 17 |
| | | | | | | | | | 4 | 6 | 8 | 10 | 12 | 14 | 16 | 18 | 4 | 6 | 8 | 10 | 12 | 14 | 16 | 18 | 4 | 6 | 8 | 10 | 12 | 14 | 16 | 18 | 4 | 6 | 8 | 10 | 12 | 14 | 16 | 18 |
| 4,4 | | | | | | | | | 4 | 6 | 8 | 10 | 12 | 14 | 16 | 18 | 4 | 6 | 8 | 10 | 12 | 14 | 16 | 18 | 4 | 6 | 8 | 10 | 12 | 14 | 16 | 18 | 4 | 6 | 8 | 10 | 12 | 14 | 16 | 18 |
| | | | | | | | | | 5 | 7 | 9 | 11 | 13 | 15 | 17 | 19 | 5 | 7 | 9 | 11 | 13 | 15 | 17 | 19 | 5 | 7 | 9 | 11 | 13 | 15 | 17 | 19 | 5 | 7 | 9 | 11 | 13 | 15 | 17 | 19 |

FIGURE 87 TIME MULTIPLEXING OF 20 x 20 ARRAY FOR 25 MOTION VECTOR SEARCH

| | CLOCK CYCLES | | | | | | | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 |
| | ACTIVE SADs | | | | | | | | | | | | | | | | | | | | | | | | | | | | | | | | | | | | | | | |
| | 100 | | | | | | | | 200 | | | | | | | | 200 | | | | | | | | 200 | | | | | | | | 100 | | | | | | | |
| H,V | ROWS 0-3 | | | | | | | | ROWS 4-7 | | | | | | | | ROWS 8-11 | | | | | | | | ROWS 12-15 | | | | | | | | | | | | | | | |
| 0,0 | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 | | | | | | | | |
| | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 | | | | | | | | |
| 1,0 | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 | | | | | | | | |
| | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 | | | | | | | | |
| 2,0 | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 | IDLE | | | | | | | |
| | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 | | | | | | | | |
| 3,0 | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 | | | | | | | | |
| | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 | | | | | | | | |
| 4,0 | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 | | | | | | | | |
| | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 | | | | | | | | |
| | ROWS 0-2 | | | | | | | | ROWS 3-6 | | | | | | | | ROWS 7-10 | | | | | | | | ROWS 11-14 | | | | | | | | | | | | | | | |
| 0,1 | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 |
| | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 |
| 1,1 | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 |
| | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 |
| 2,1 | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 |
| | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 |
| 3,1 | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 |
| | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 |
| 4,1 | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 |
| | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 |
| | ROWS 0-1 | | | | | | | | ROWS 2-5 | | | | | | | | ROWS 6-9 | | | | | | | | ROWS 10-13 | | | | | | | | ROWS 14-15 | | | | | | | |
| 0,2 | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 |
| | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 |
| 1,2 | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 |
| | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 |
| 2,2 | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 |
| | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 |
| 3,2 | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 |
| | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 |
| 4,2 | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 |
| | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 |
| | ROW 0 | | | | | | | | ROWS 1-4 | | | | | | | | ROWS 5-8 | | | | | | | | ROWS 9-12 | | | | | | | | ROWS 13-15 | | | | | | | |
| 0,3 | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 |
| | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 |
| 1,3 | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 |
| | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 |
| 2,3 | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 |
| | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 |
| 3,3 | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 |
| | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 |
| 4,3 | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 |
| | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 |
| | | | | | | | | | ROWS 0-3 | | | | | | | | ROWS 4-7 | | | | | | | | ROWS 8-11 | | | | | | | | ROWS 12-15 | | | | | | | |
| 0,4 | | | | | | | | | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 |
| | | | | | | | | | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 |
| 1,4 | | | | | | | | | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 |
| | | | | | | | | | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 |
| 2,4 | IDLE | | | | | | | | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 |
| | | | | | | | | | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 |
| 3,4 | | | | | | | | | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 |
| | | | | | | | | | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 |
| 4,4 | | | | | | | | | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 | 0 | 2 | 4 | 6 | 8 | 10 | 12 | 14 |
| | | | | | | | | | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 | 1 | 3 | 5 | 7 | 9 | 11 | 13 | 15 |

FIGURE 88 TIME MULTIPLEXING OF 16 x 16 CURRENT BLOCK FOR 25 MOTION VECTOR SEARCH

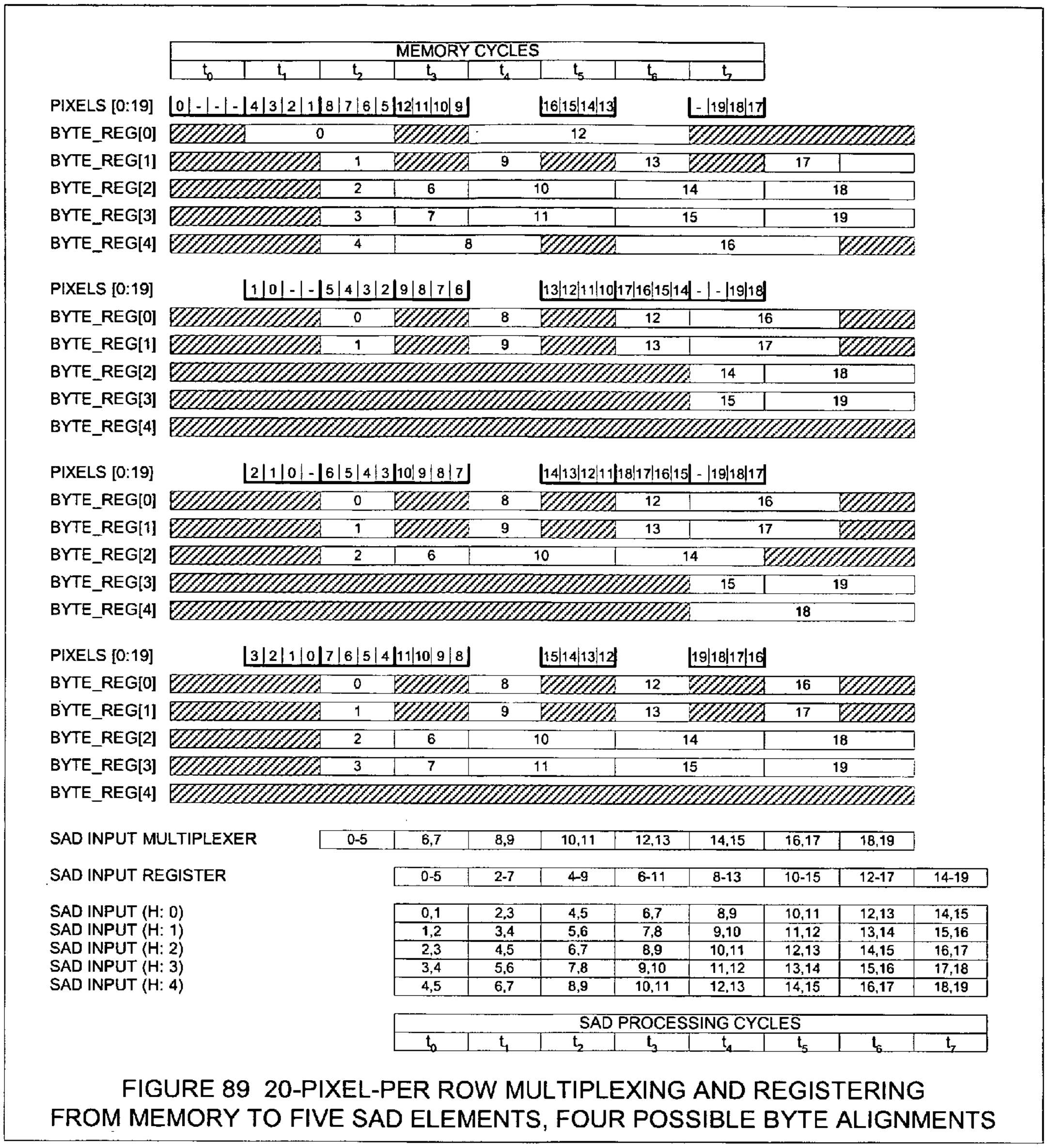
FIGURE 89 20-PIXEL-PER ROW MULTIPLEXING AND REGISTERING FROM MEMORY TO FIVE SAD ELEMENTS, FOUR POSSIBLE BYTE ALIGNMENTS

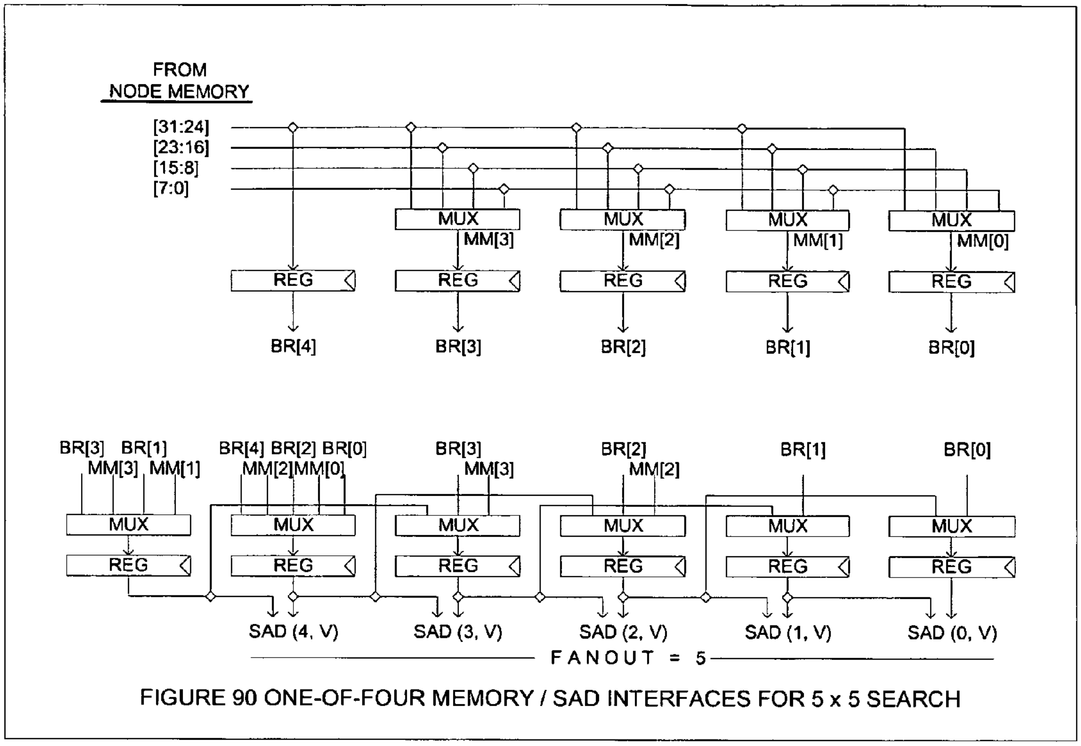
FIGURE 90 ONE-OF-FOUR MEMORY / SAD INTERFACES FOR 5 x 5 SEARCH

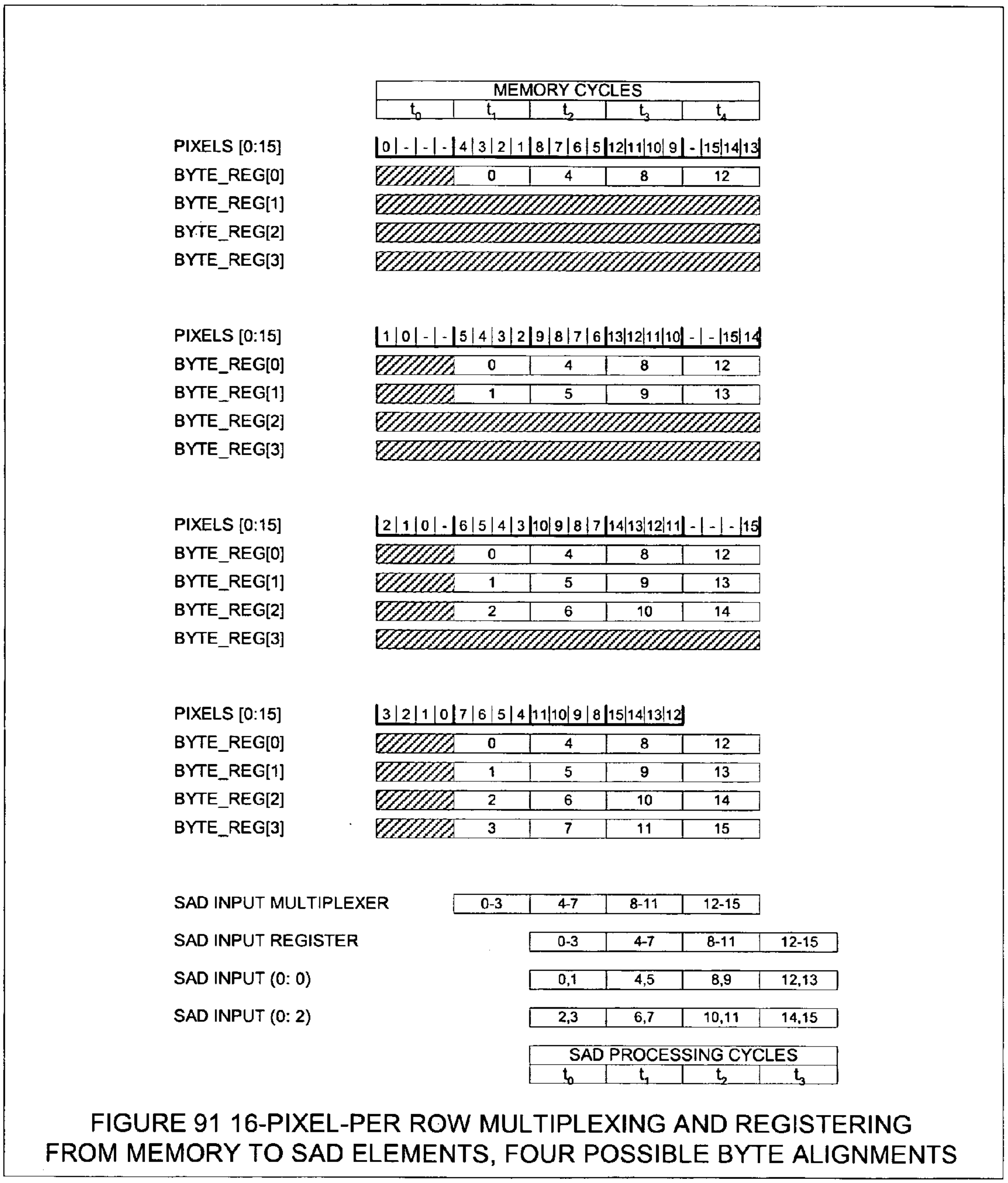
FIGURE 91 16-PIXEL-PER ROW MULTIPLEXING AND REGISTERING FROM MEMORY TO SAD ELEMENTS, FOUR POSSIBLE BYTE ALIGNMENTS

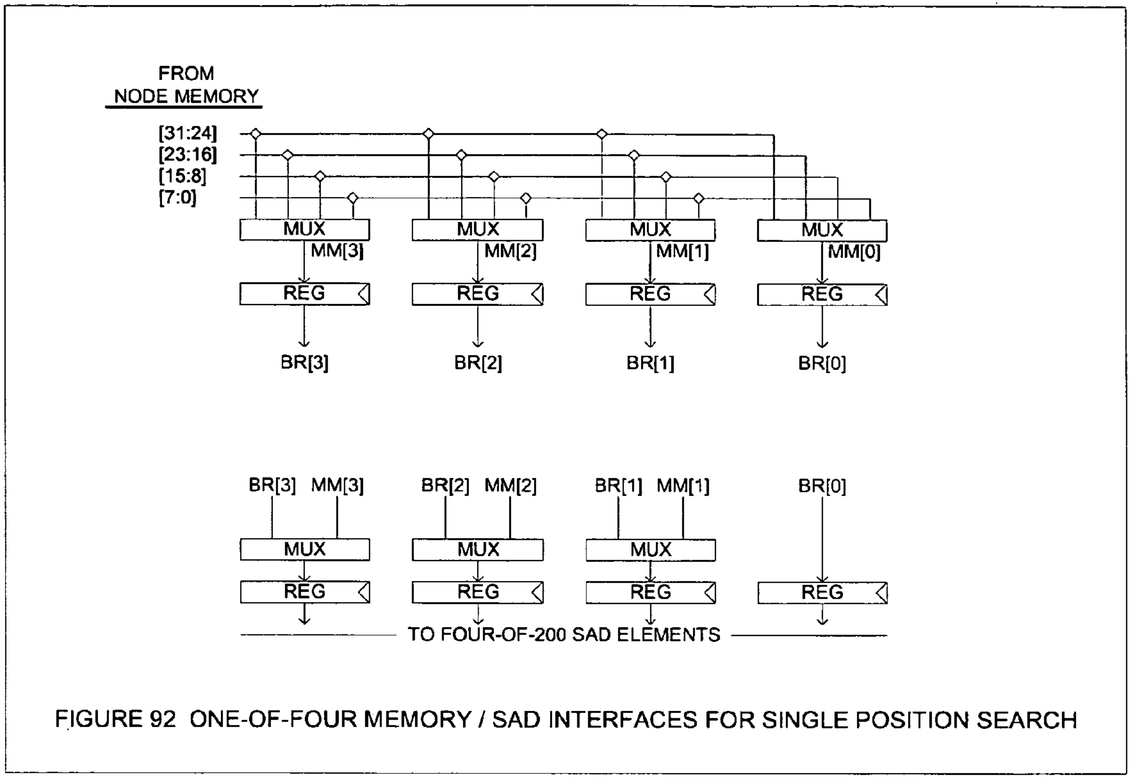
FIGURE 92 ONE-OF-FOUR MEMORY / SAD INTERFACES FOR SINGLE POSITION SEARCH

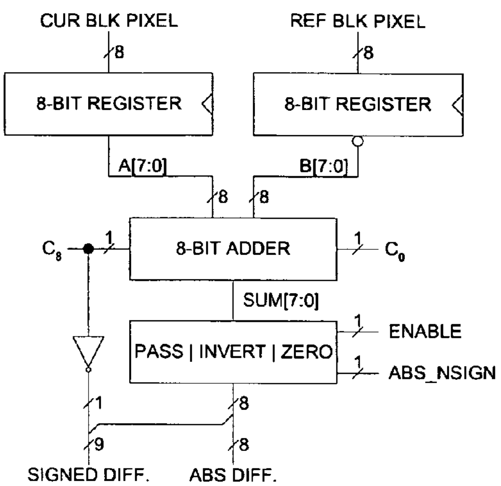

IF ENABLE = 1 'b0, ABS DIFF[7:0] = 0x00, SIGNED DIFF[8:0] = 0x000

ELSE IF ENABLE = 1 'b1 & ABS_NSIGN = 1 'b1

$C_8$ = A[7] & B[7] |
(A[7] | B[7]) & A[6] & B[6] |
(A[7] | B[7]) & (A[6] | B[6]) & A[5] & B[5] |
(A[7] | B[7]) & (A[6] | B[6]) & (A[5] | B[5]) & A[4] & B[4]
(A[7] | B[7]) & (A[6] | B[6]) & (A[5] | B[5]) & (A[4] | B[4]) & A[3] & B[3] |
(A[7] | B[7]) & (A[6] | B[6]) & (A[5] | B[5]) & (A[4] | B[4]) & (A[3] | B[3]) & A[2] & B[2] |
(A[7] | B[7]) & (A[6] | B[6]) & (A[5] | B[5]) & (A[4] | B[4]) & (A[3] | B[3]) & (A[2] | B[2]) & A[1] & B[1] |
(A[7] | B[7]) & (A[6] | B[6]) & (A[5] | B[5]) & (A[4] | B[4]) & (A[3] | B[3]) & (A[2] | B[2]) & (A[1] | B[1]) & A[0] & B[0];

$C_0$ = $C_8$ (END-AROUND CARRY);

IF C8 = 1 'b1, ABS DIFF[7:0] = SUM[7:0] ;

ELSE ABS DIFF[7:0] = ~SUM[7:0] .

ELSE ENABLE = 1 'b1 & ABS_NSIGN = 1 'b0

$C_0$ = 1 'b1;

$C_8$ = A[7] & B[7] |
(A[7] | B[7]) & A[6] & B[6] |
(A[7] | B[7]) & (A[6] | B[6]) & A[5] & B[5] |
(A[7] | B[7]) & (A[6] | B[6]) & (A[5] | B[5]) & A[4] & B[4]
(A[7] | B[7]) & (A[6] | B[6]) & (A[5] | B[5]) & (A[4] | B[4]) & A[3] & B[3] |
(A[7] | B[7]) & (A[6] | B[6]) & (A[5] | B[5]) & (A[4] | B[4]) & (A[3] | B[3]) & A[2] & B[2] |
(A[7] | B[7]) & (A[6] | B[6]) & (A[5] | B[5]) & (A[4] | B[4]) & (A[3] | B[3]) & (A[2] | B[2]) & A[1] & B[1] |
(A[7] | B[7]) & (A[6] | B[6]) & (A[5] | B[5]) & (A[4] | B[4]) & (A[3] | B[3]) & (A[2] | B[2]) & (A[1] | B[1]) & (A[0] | B[0]);

SIGNED DIFF[8:0] = { ~$C_8$ ,SUM[7:0] } ;

FIGURE 93 EIGHT BIT ABSOLUTE DIFFERENCE, NINE BIT SIGNED DIFFERENCE

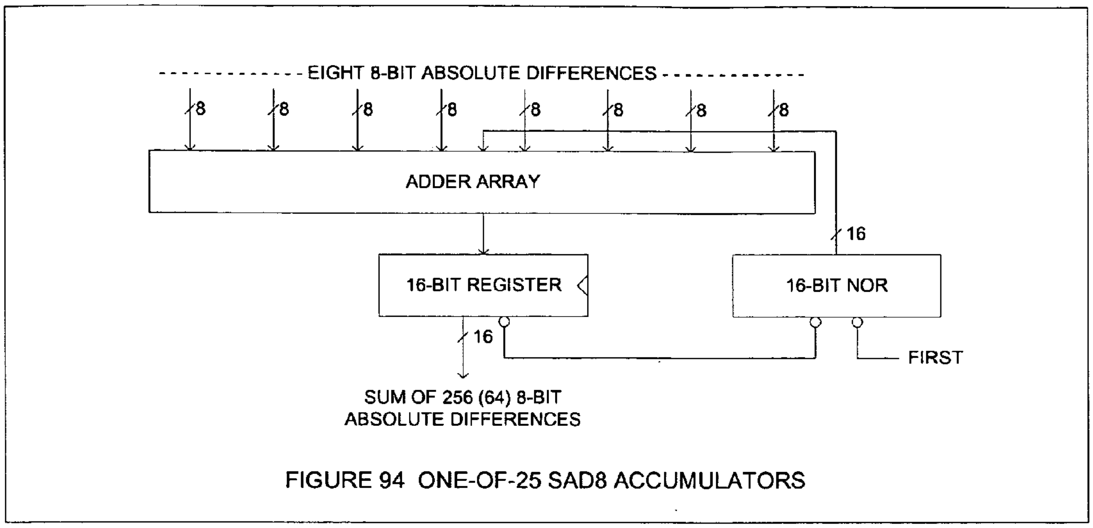
FIGURE 94 ONE-OF-25 SAD8 ACCUMULATORS
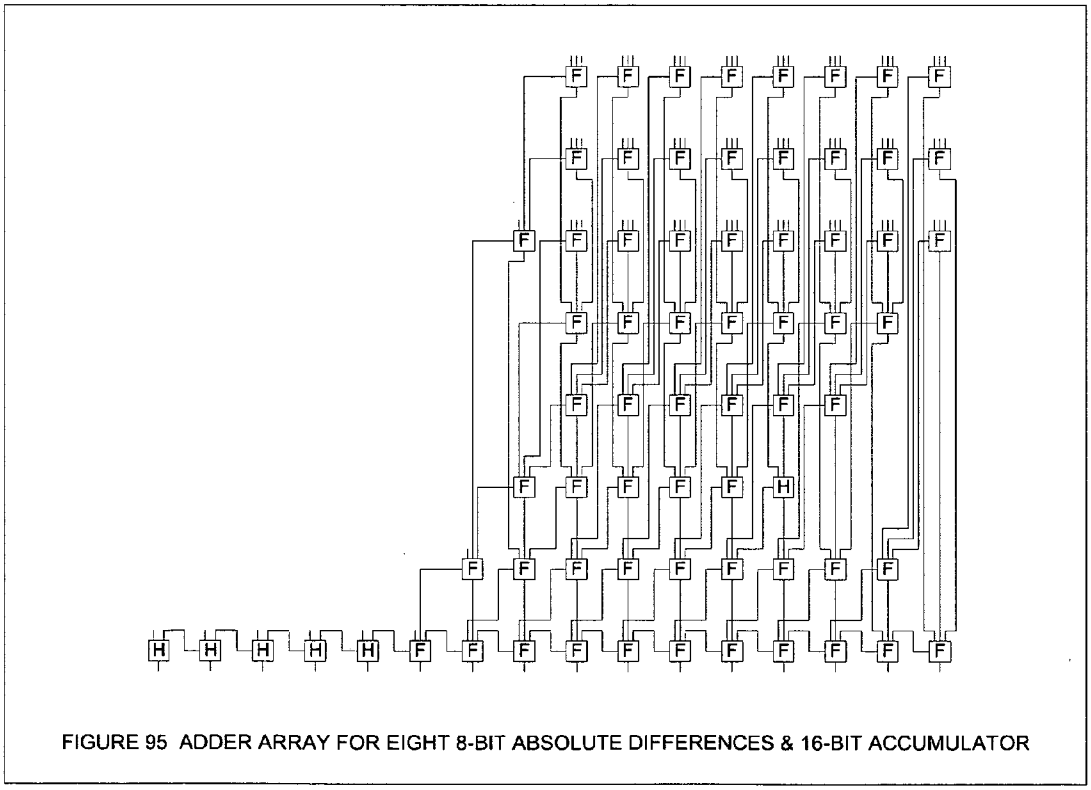
FIGURE 95 ADDER ARRAY FOR EIGHT 8-BIT ABSOLUTE DIFFERENCES & 16-BIT ACCUMULATOR

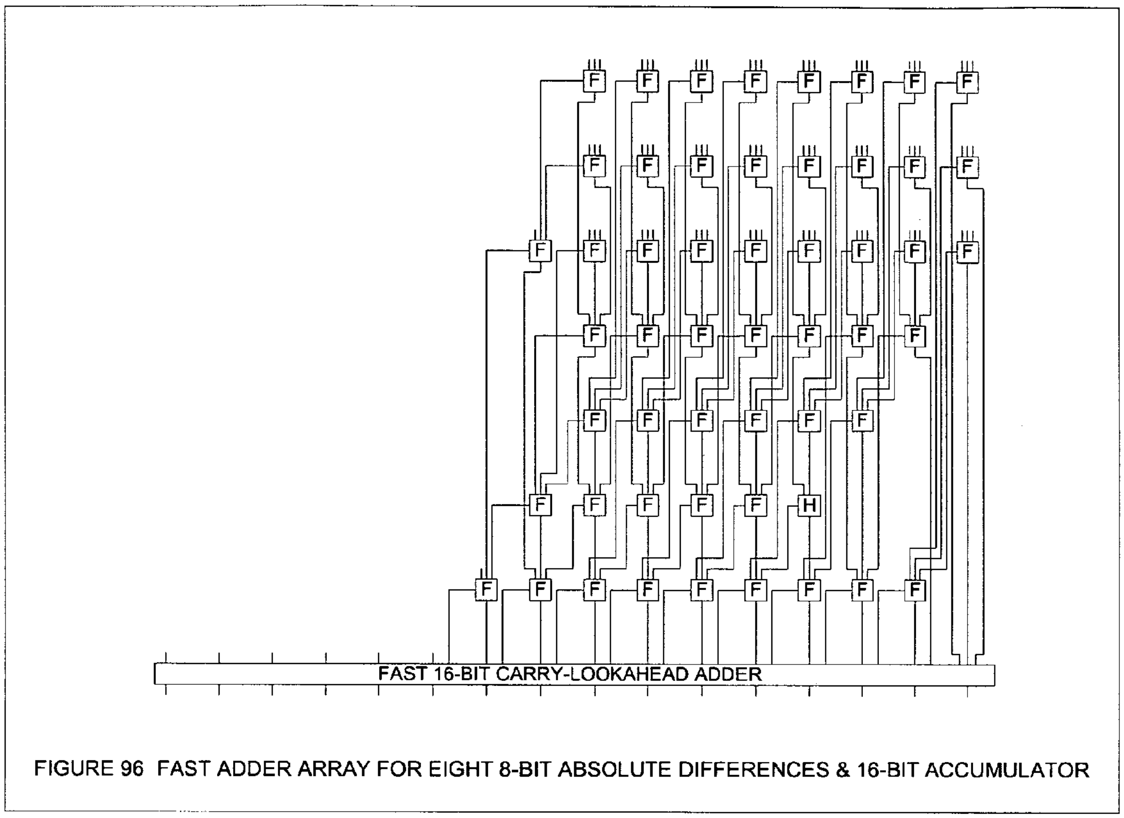
FIGURE 96 FAST ADDER ARRAY FOR EIGHT 8-BIT ABSOLUTE DIFFERENCES & 16-BIT ACCUMULATOR

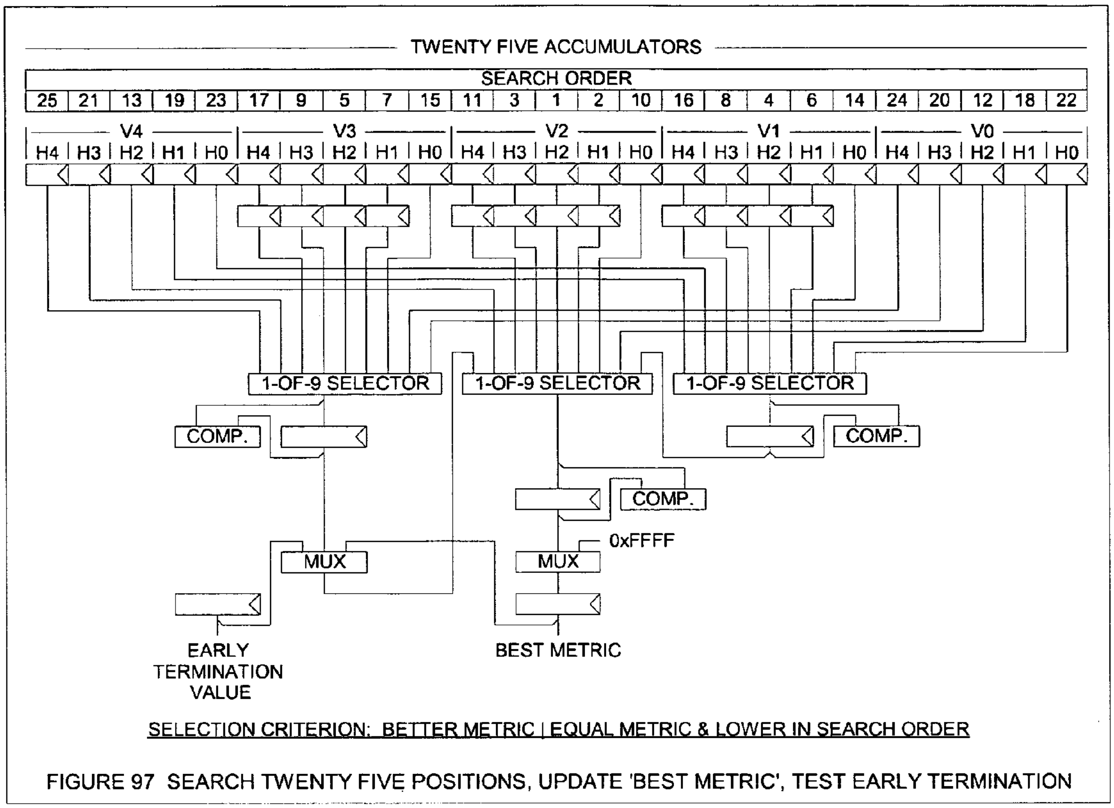
FIGURE 97 SEARCH TWENTY FIVE POSITIONS, UPDATE 'BEST METRIC', TEST EARLY TERMINATION

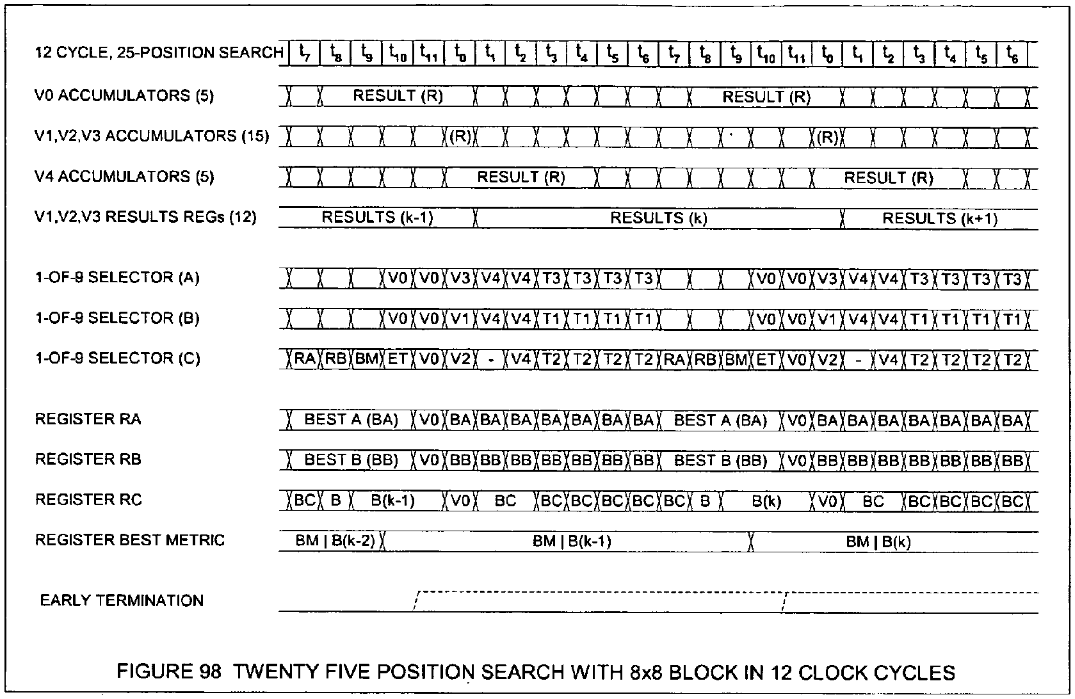
FIGURE 98 TWENTY FIVE POSITION SEARCH WITH 8x8 BLOCK IN 12 CLOCK CYCLES

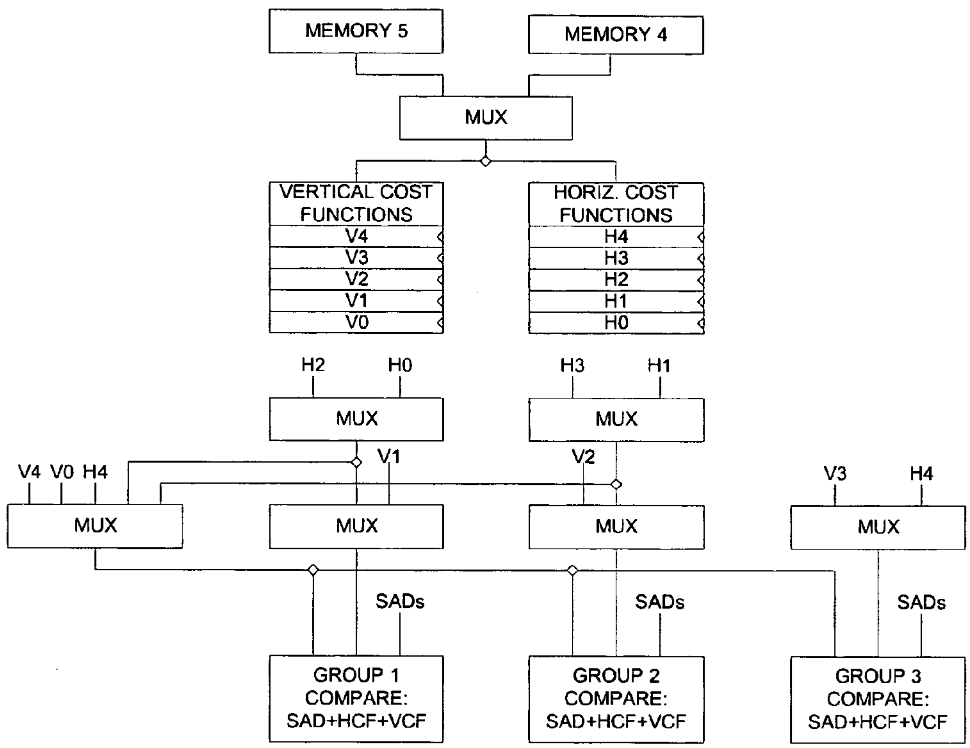
| | $t_0$ | $t_1$ | $t_2$ | $t_3$ | $t_4$ | $t_5$ | $t_6$ | $t_7$ | $t_8$ |
|---|---|---|---|---|---|---|---|---|---|
| ALL GROUPS | V0 | V0 | H0 | V4 | V4 | H1 | H2 | H3 | H4 |
| GROUP 1 | H0 | H2 | V1 | H0 | H2 | V1 | V1 | V1 | V1 |
| GROUP 2 | H1 | H3 | V2 | H1 | H3 | V2 | V2 | V2 | V2 |
| GROUP 3 | - | H4 | V3 | - | H4 | V3 | V3 | V3 | V3 |
FIGURE 99 DISTRIBUTING THE COST FUNCTIONS DURING 5x5 SEARCH, 8x8 BLOCKS

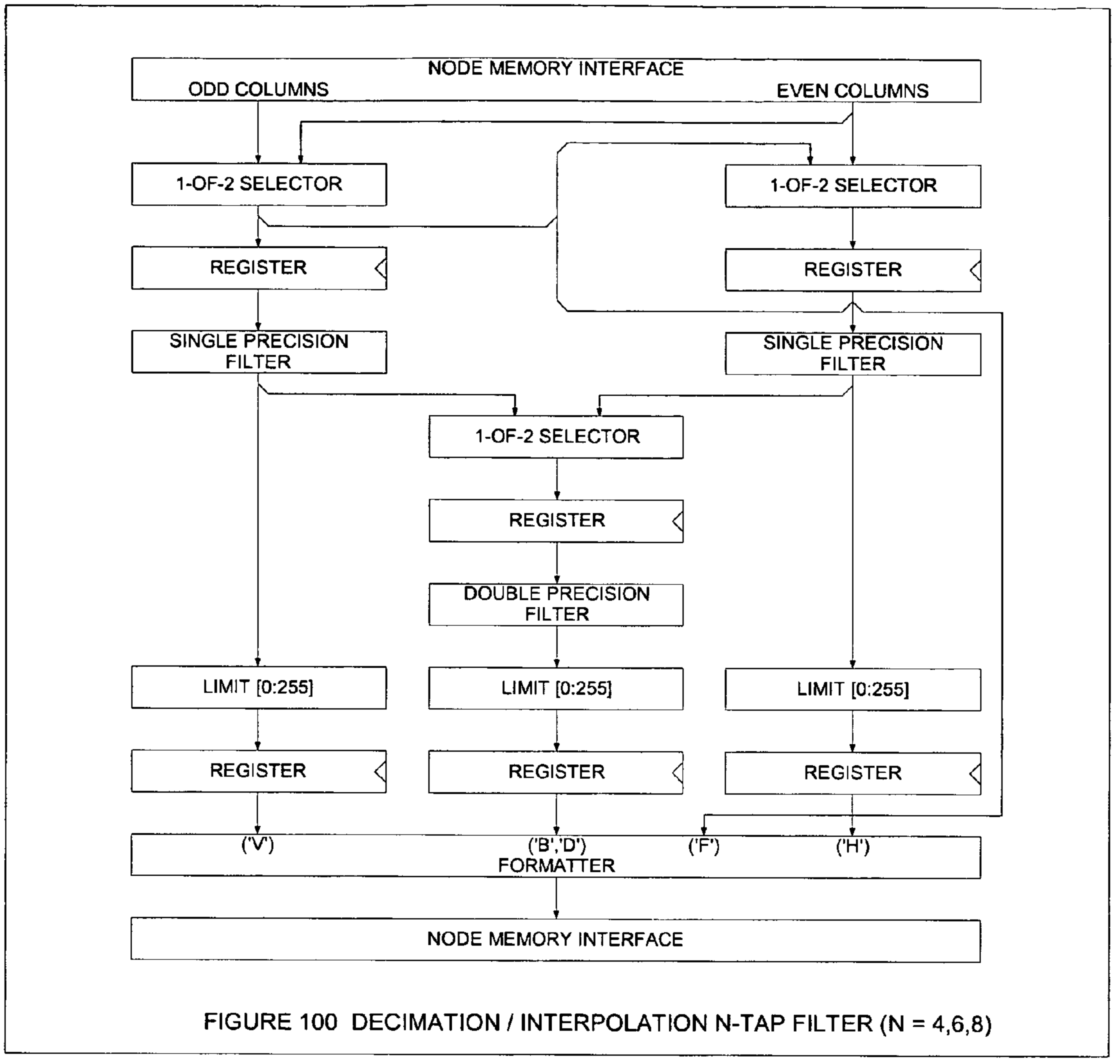
FIGURE 100 DECIMATION / INTERPOLATION N-TAP FILTER (N = 4,6,8)

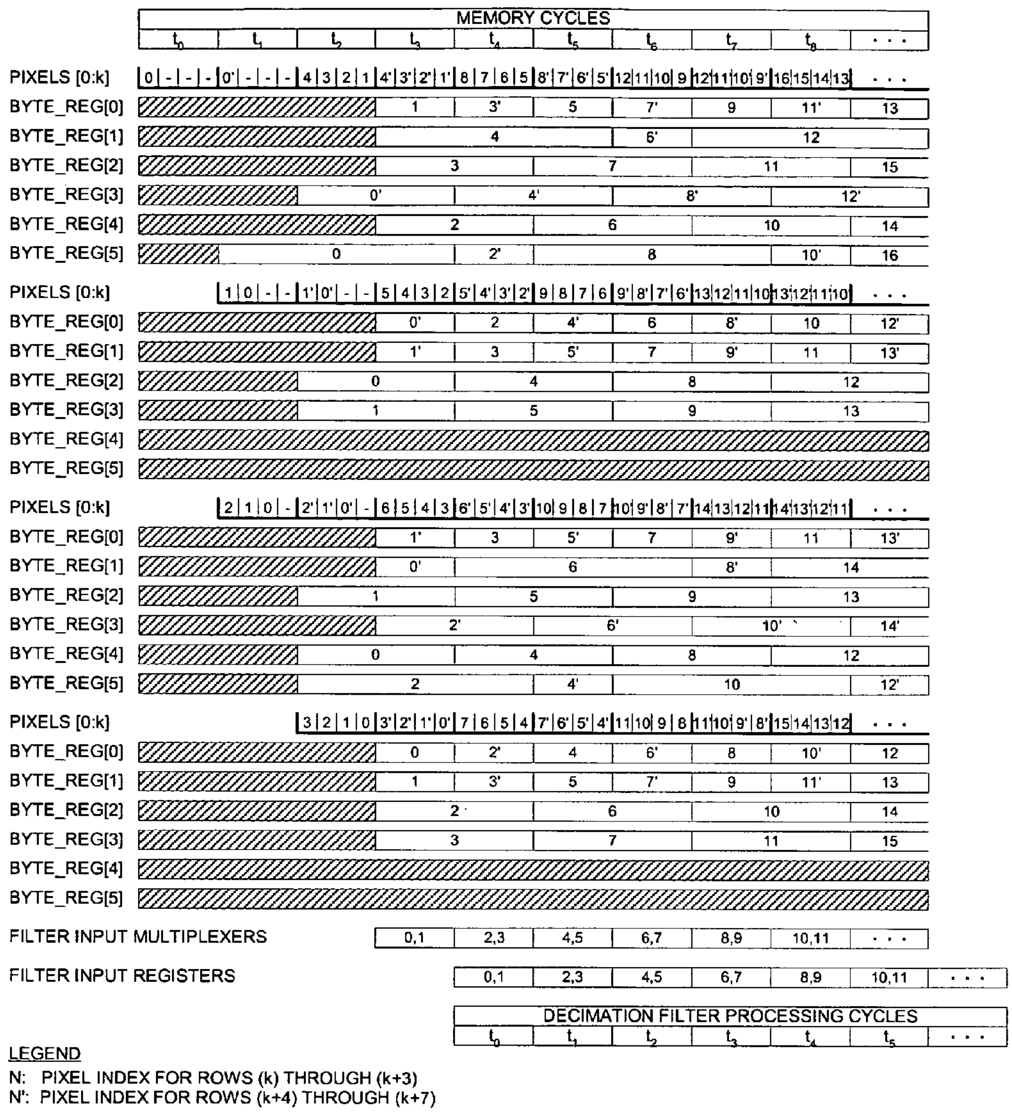
FIGURE 101 MULTIPLEXING AND REGISTERING FROM EACH OF 4 MEMORIES TO TWO 8-TAP DECIMATION FILTERS, FOUR POSSIBLE BYTE ALIGNMENTS

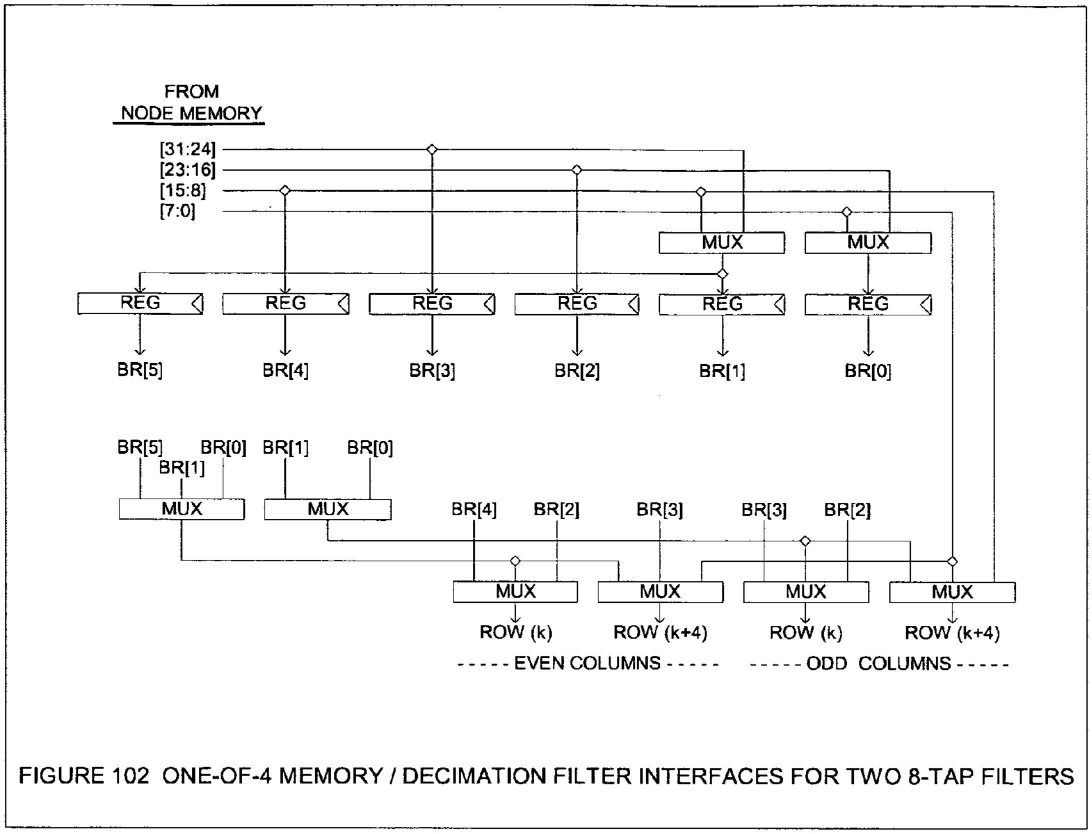
FIGURE 102 ONE-OF-4 MEMORY / DECIMATION FILTER INTERFACES FOR TWO 8-TAP FILTERS

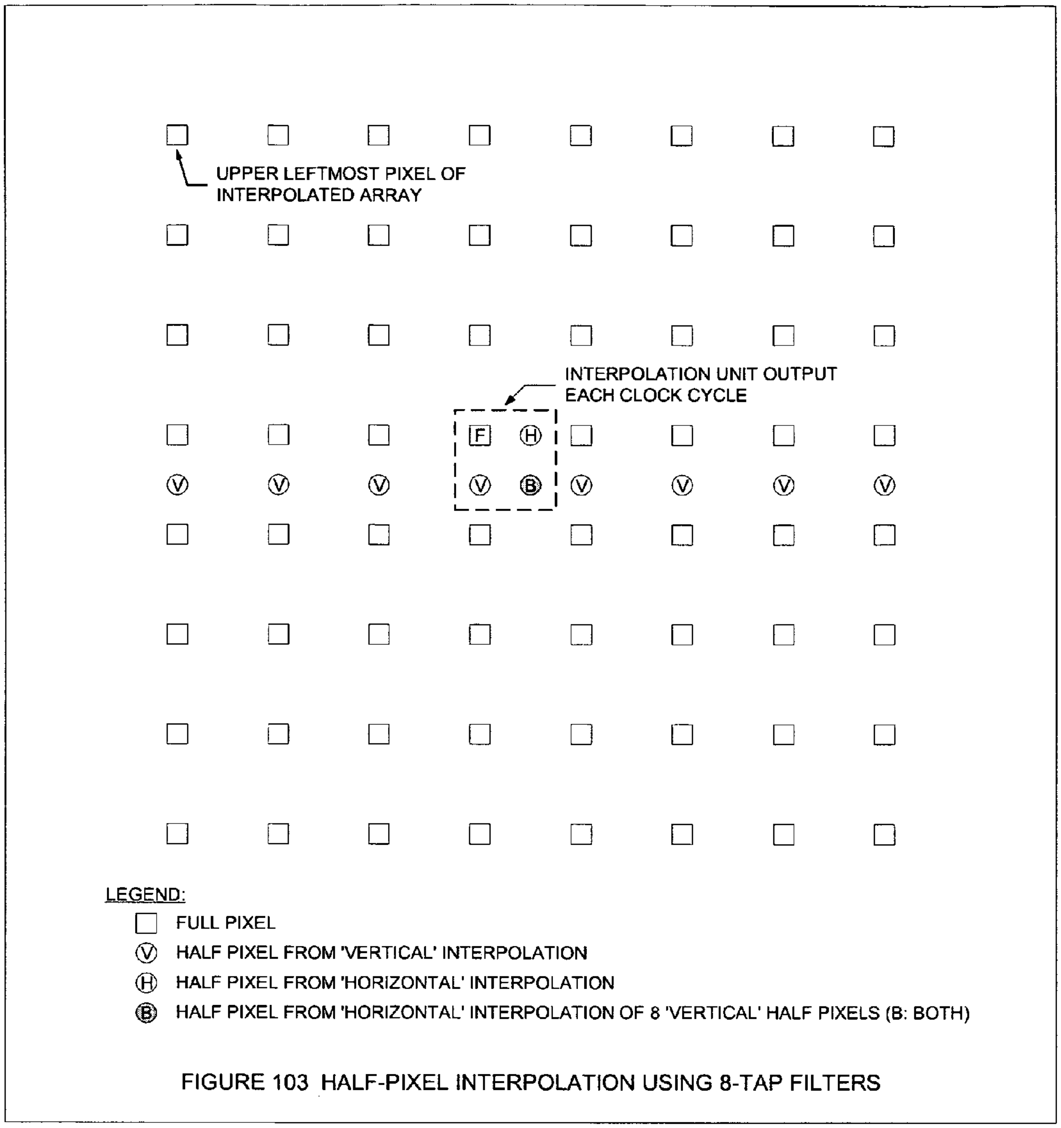
FIGURE 103 HALF-PIXEL INTERPOLATION USING 8-TAP FILTERS

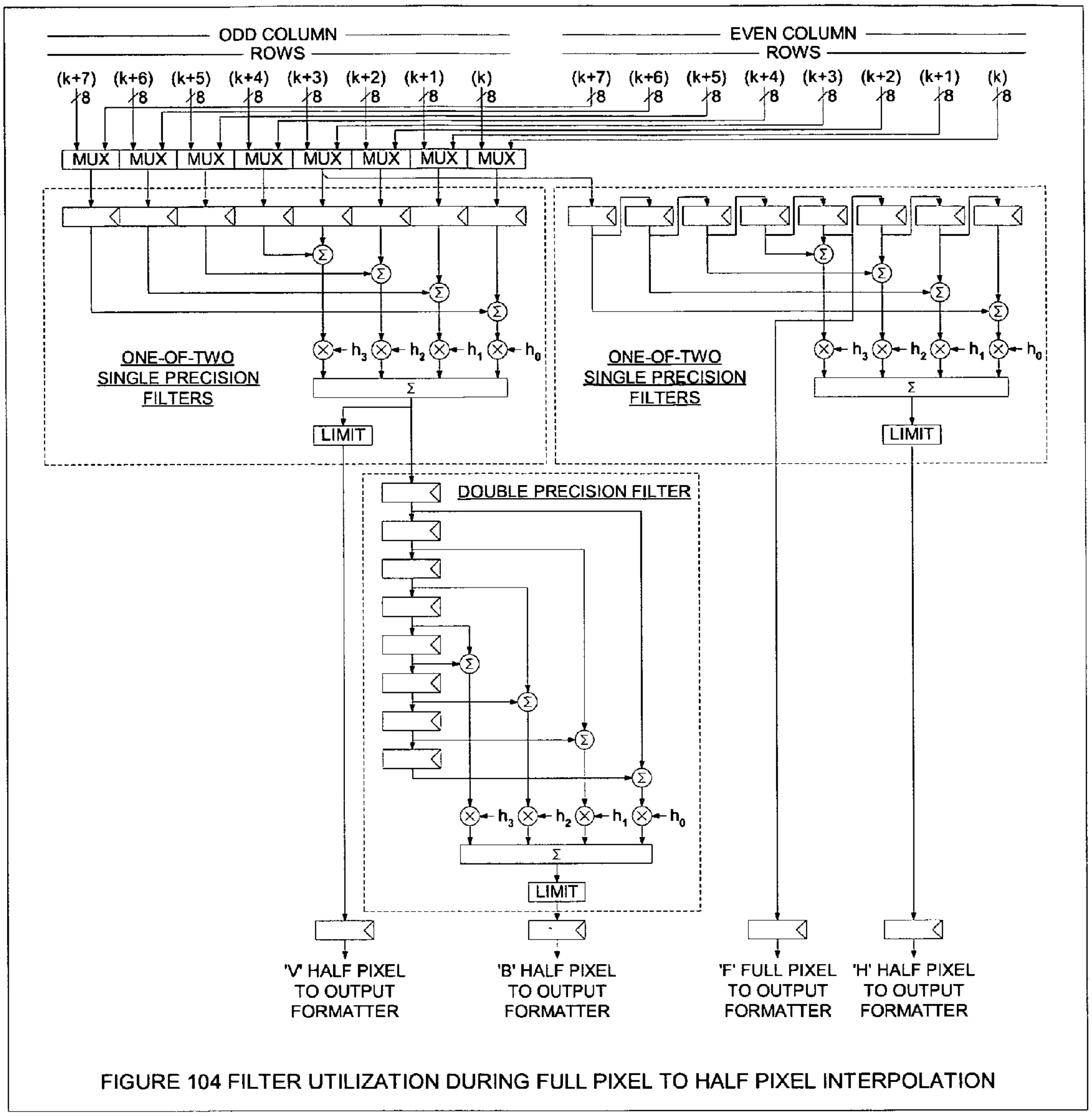
FIGURE 104 FILTER UTILIZATION DURING FULL PIXEL TO HALF PIXEL INTERPOLATION

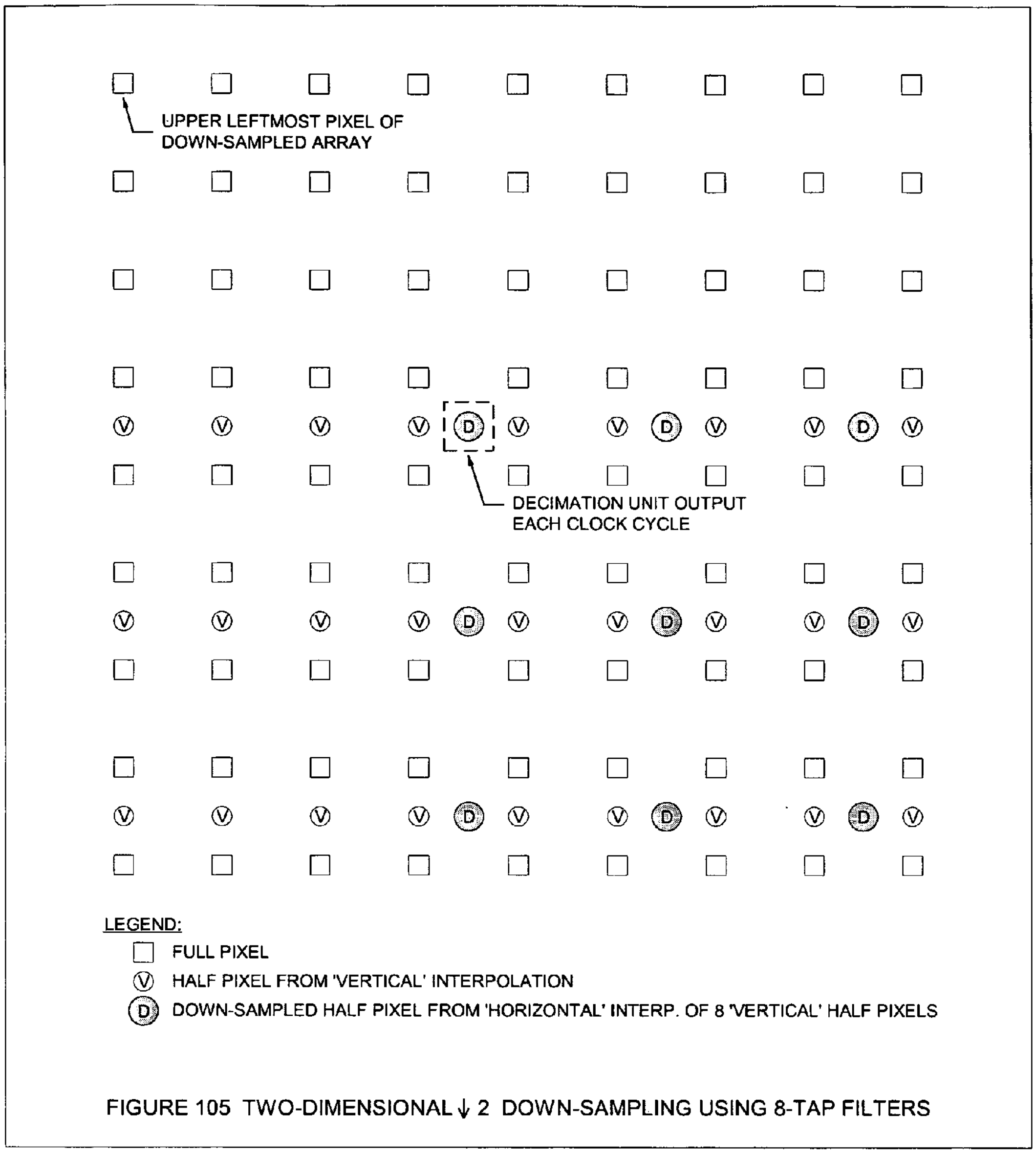
FIGURE 105 TWO-DIMENSIONAL ↓ 2 DOWN-SAMPLING USING 8-TAP FILTERS

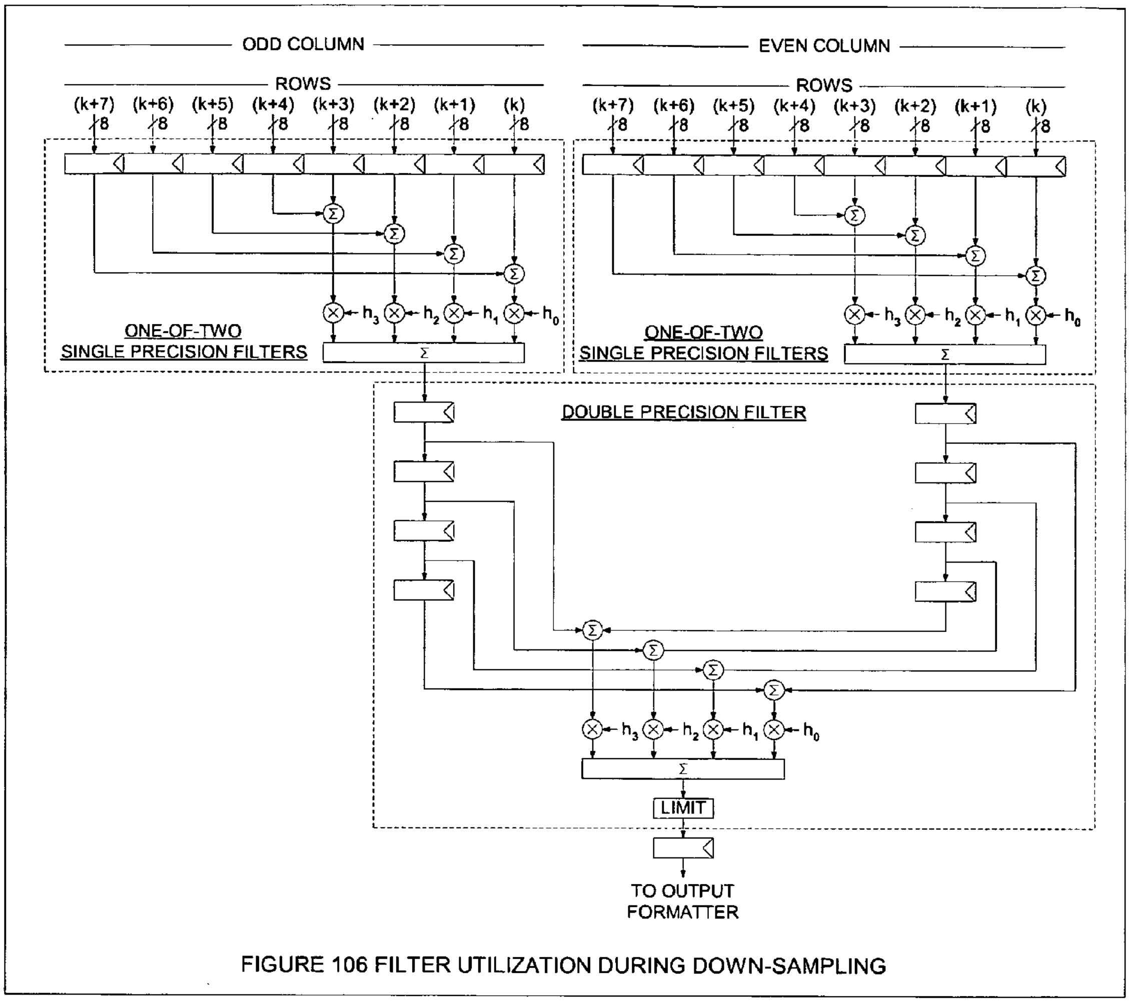
FIGURE 106 FILTER UTILIZATION DURING DOWN-SAMPLING

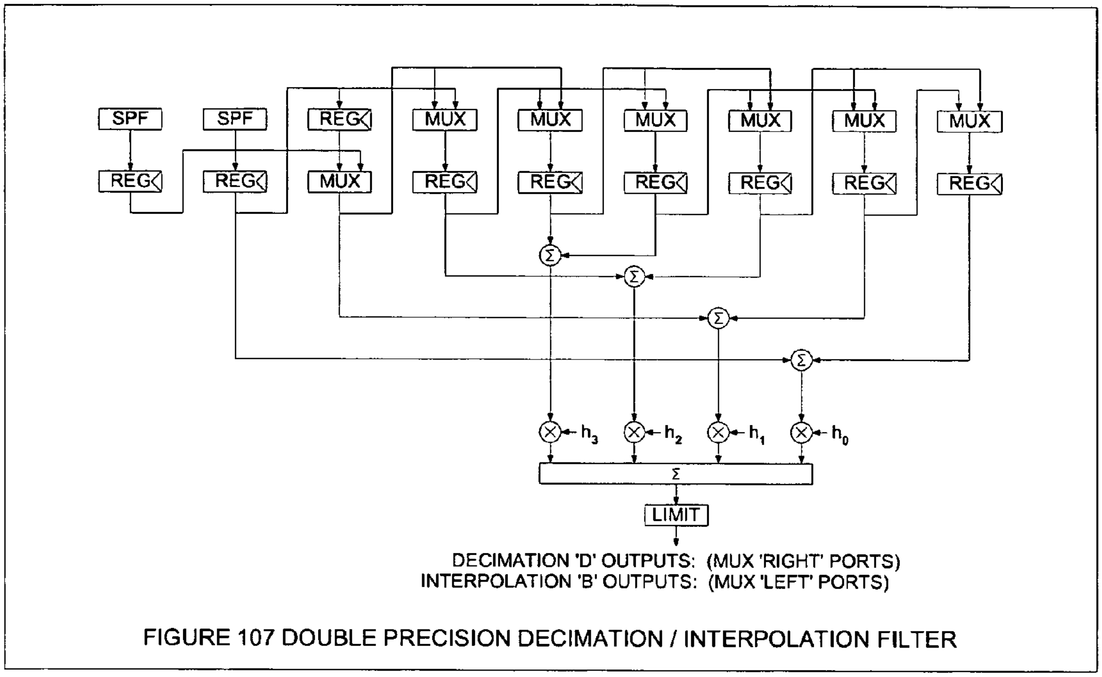
FIGURE 107 DOUBLE PRECISION DECIMATION / INTERPOLATION FILTER

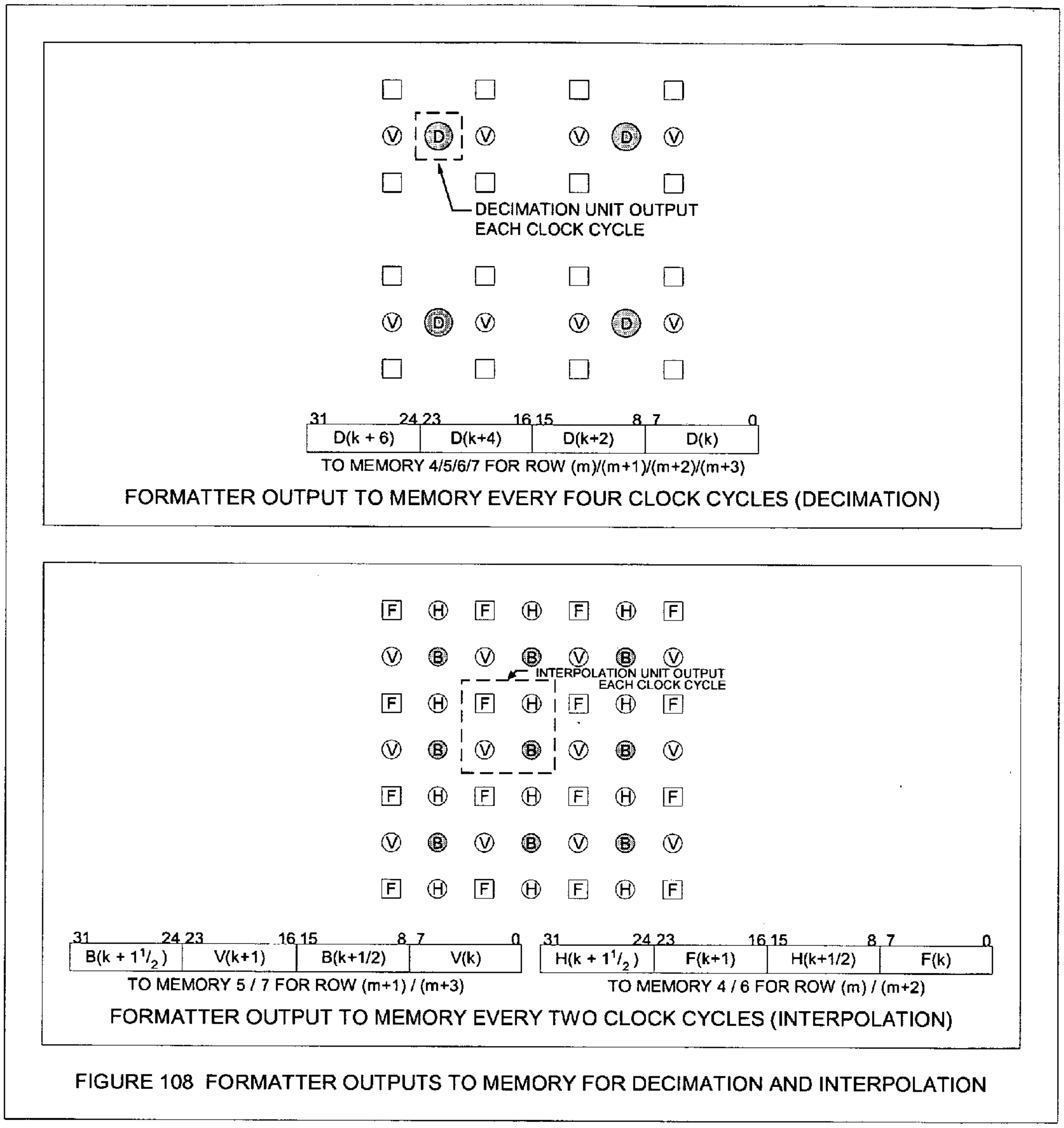
FIGURE 108 FORMATTER OUTPUTS TO MEMORY FOR DECIMATION AND INTERPOLATION

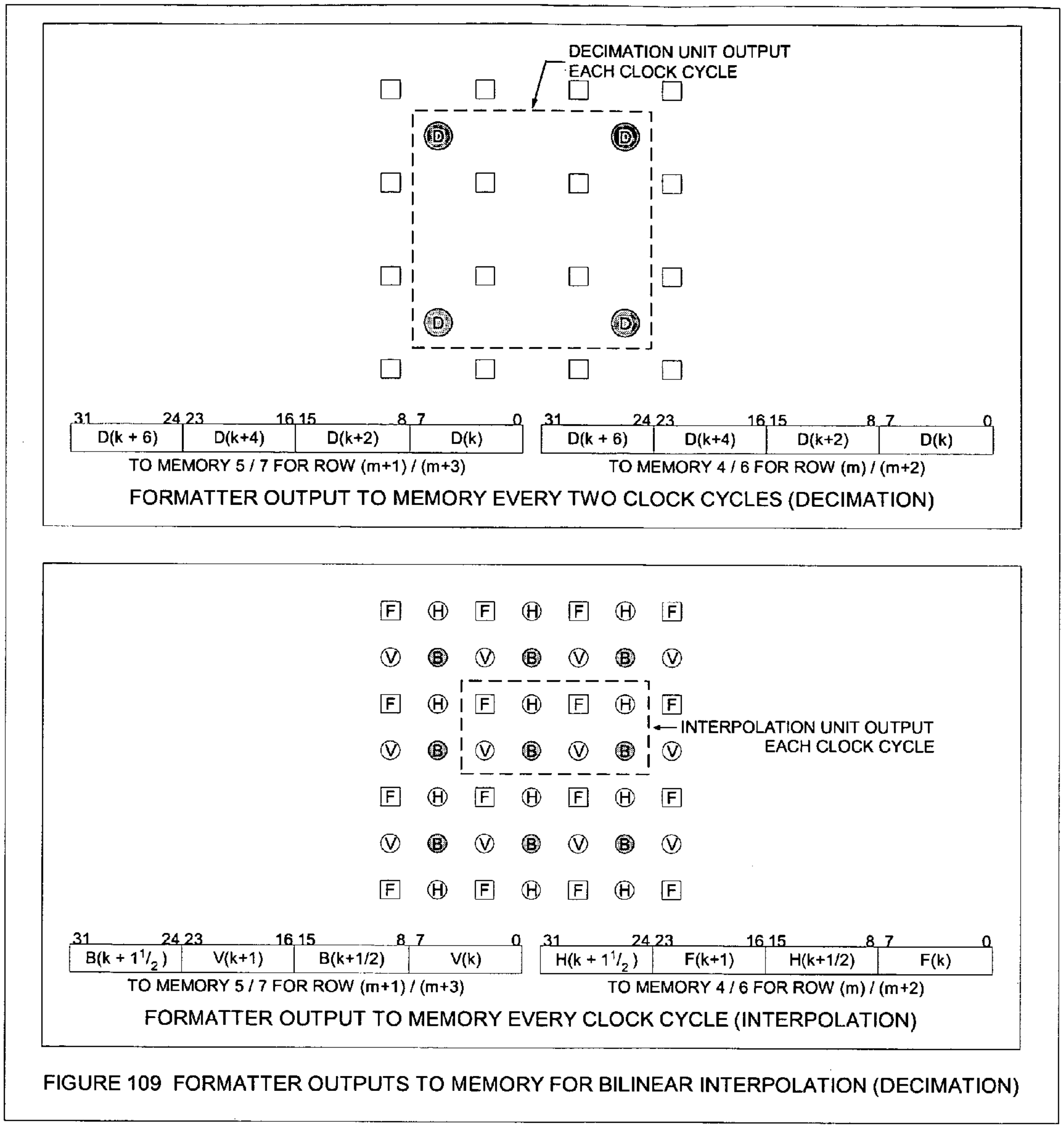
FIGURE 109 FORMATTER OUTPUTS TO MEMORY FOR BILINEAR INTERPOLATION (DECIMATION)

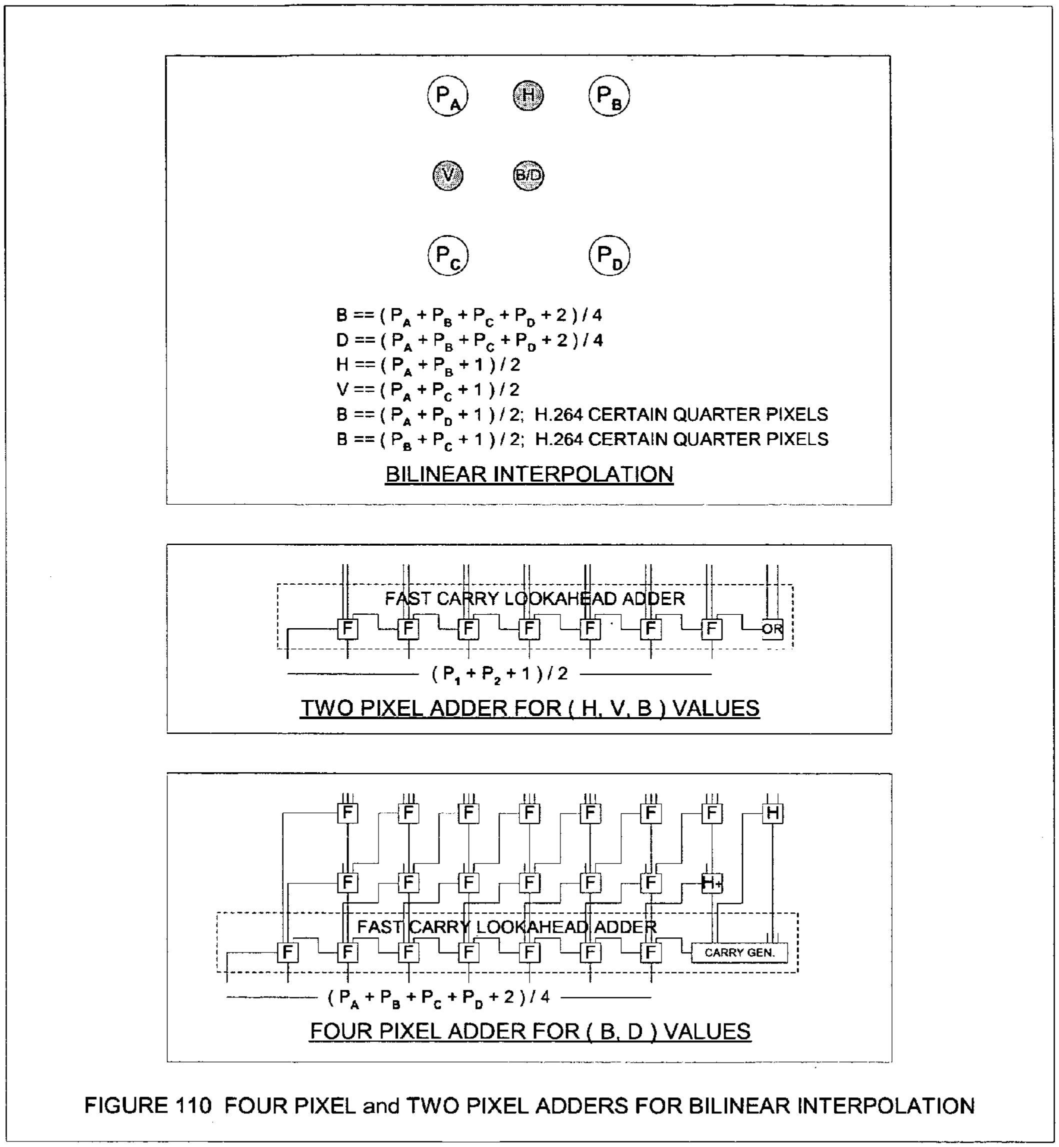
FIGURE 110 FOUR PIXEL and TWO PIXEL ADDERS FOR BILINEAR INTERPOLATION

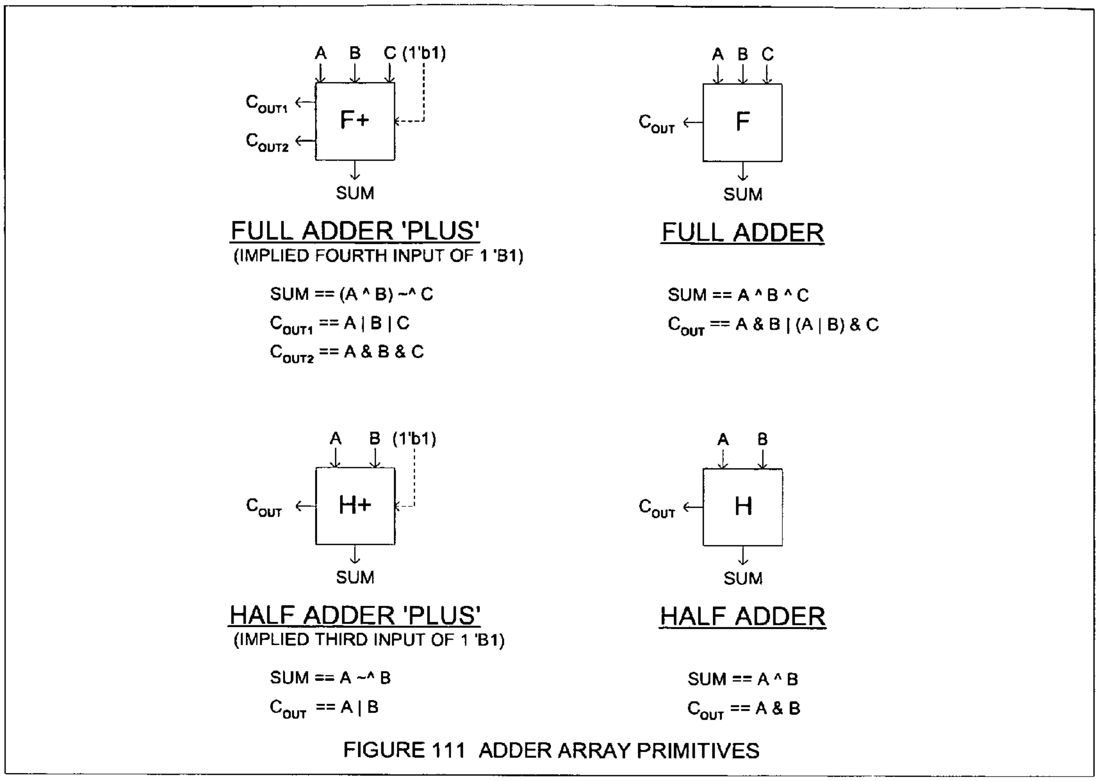
FIGURE 111 ADDER ARRAY PRIMITIVES
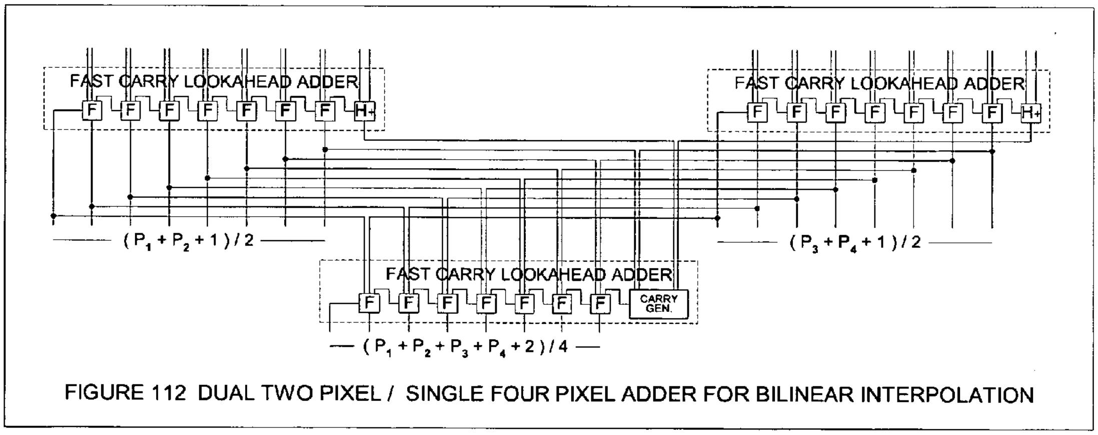
FIGURE 112 DUAL TWO PIXEL / SINGLE FOUR PIXEL ADDER FOR BILINEAR INTERPOLATION

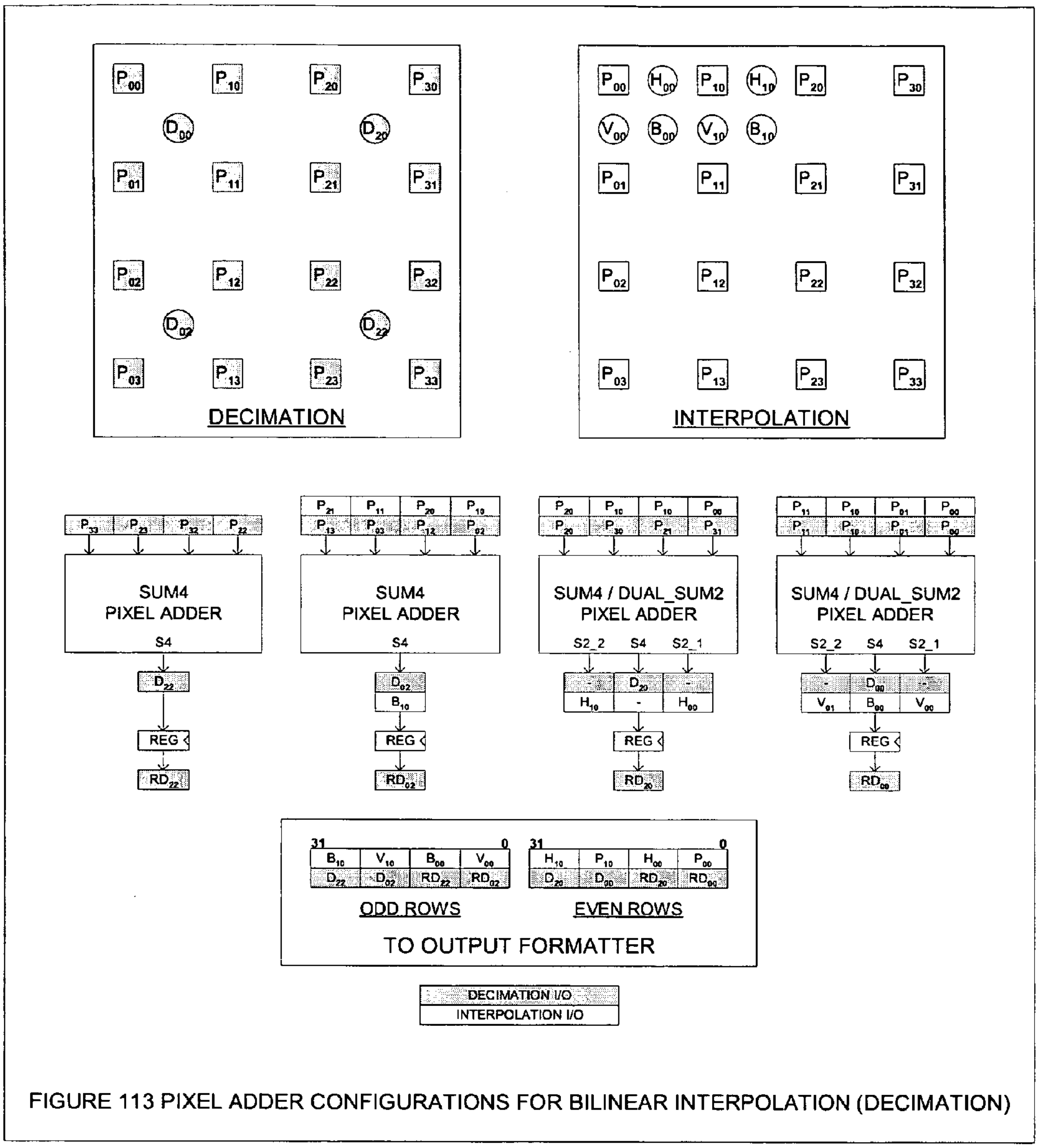
FIGURE 113 PIXEL ADDER CONFIGURATIONS FOR BILINEAR INTERPOLATION (DECIMATION)

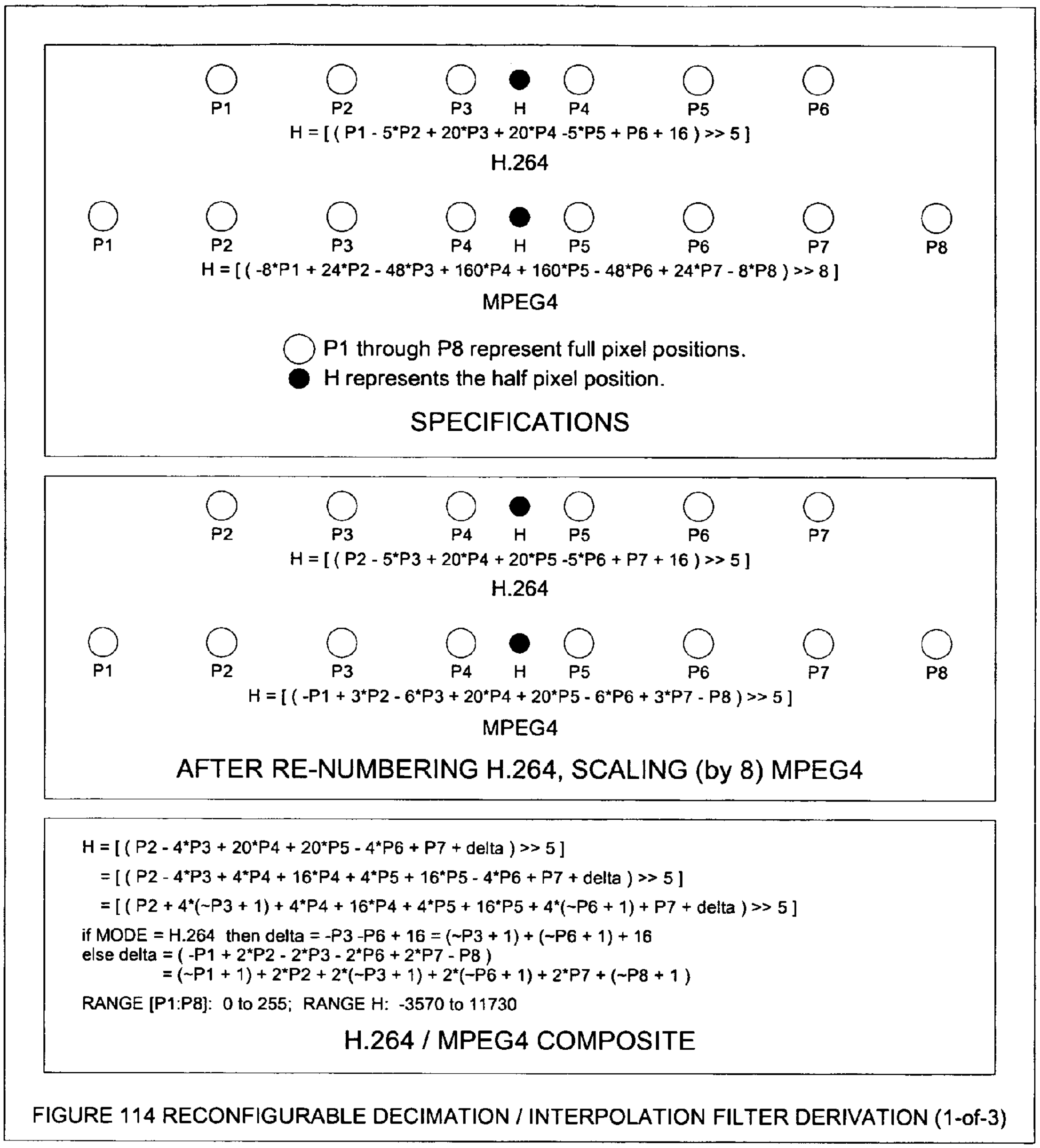
FIGURE 114 RECONFIGURABLE DECIMATION / INTERPOLATION FILTER DERIVATION (1-of-3)

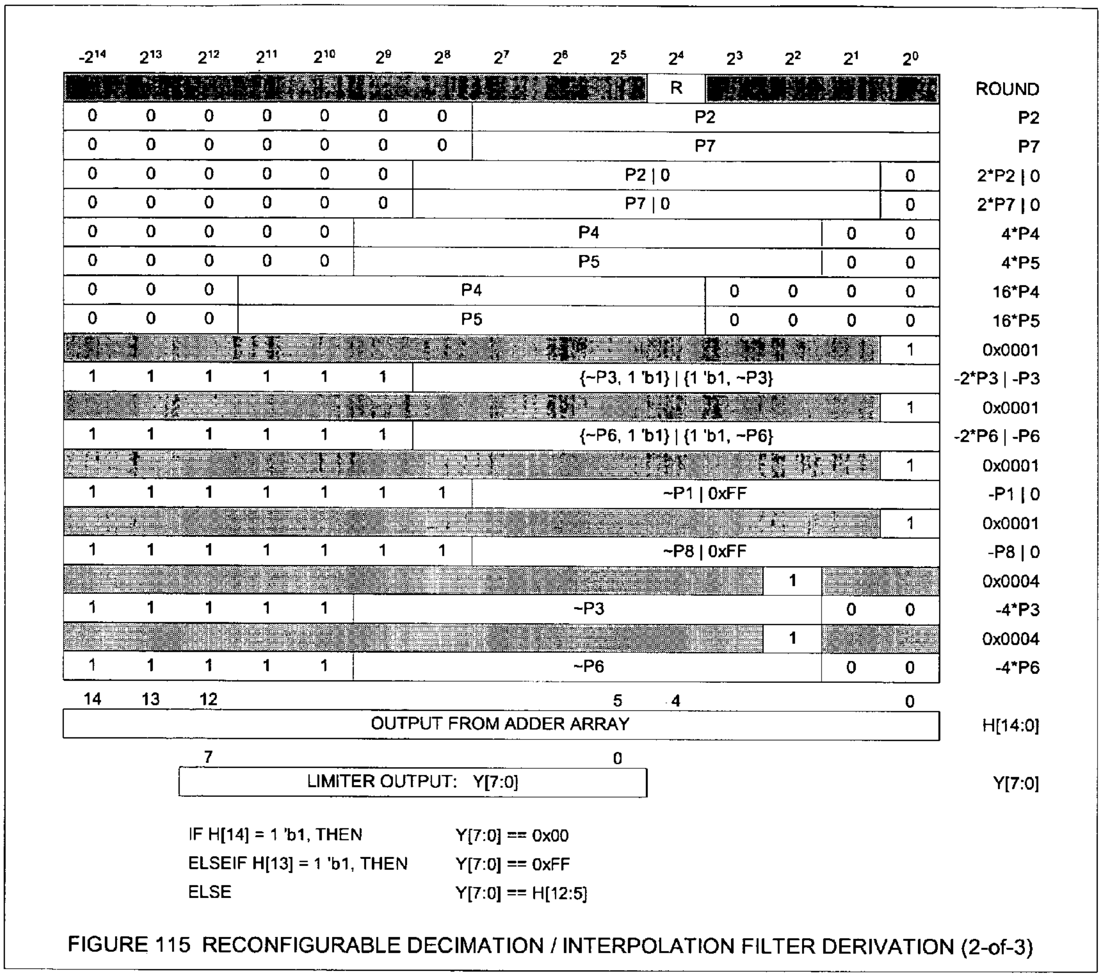
FIGURE 115 RECONFIGURABLE DECIMATION / INTERPOLATION FILTER DERIVATION (2-of-3)

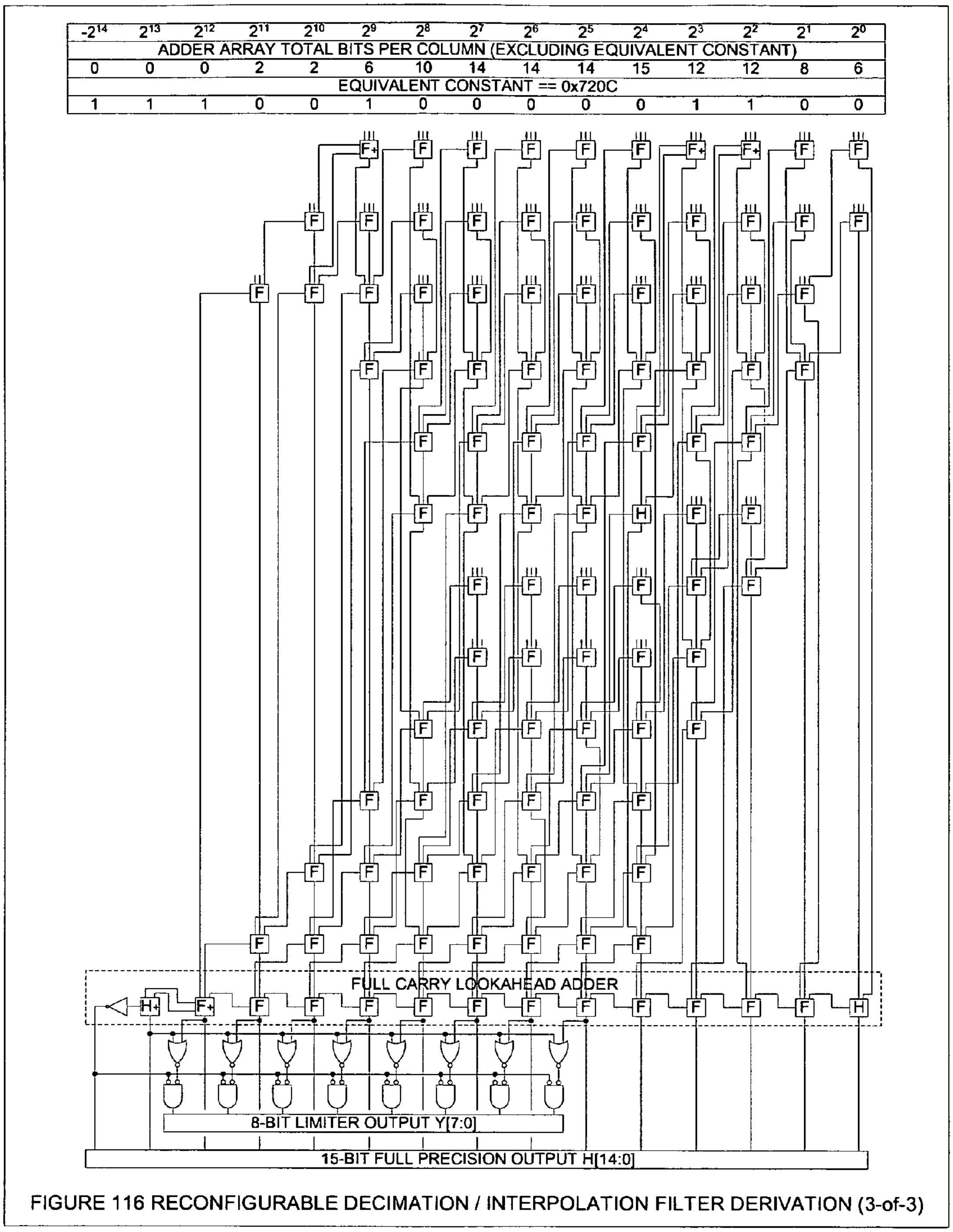
FIGURE 116 RECONFIGURABLE DECIMATION / INTERPOLATION FILTER DERIVATION (3-of-3)

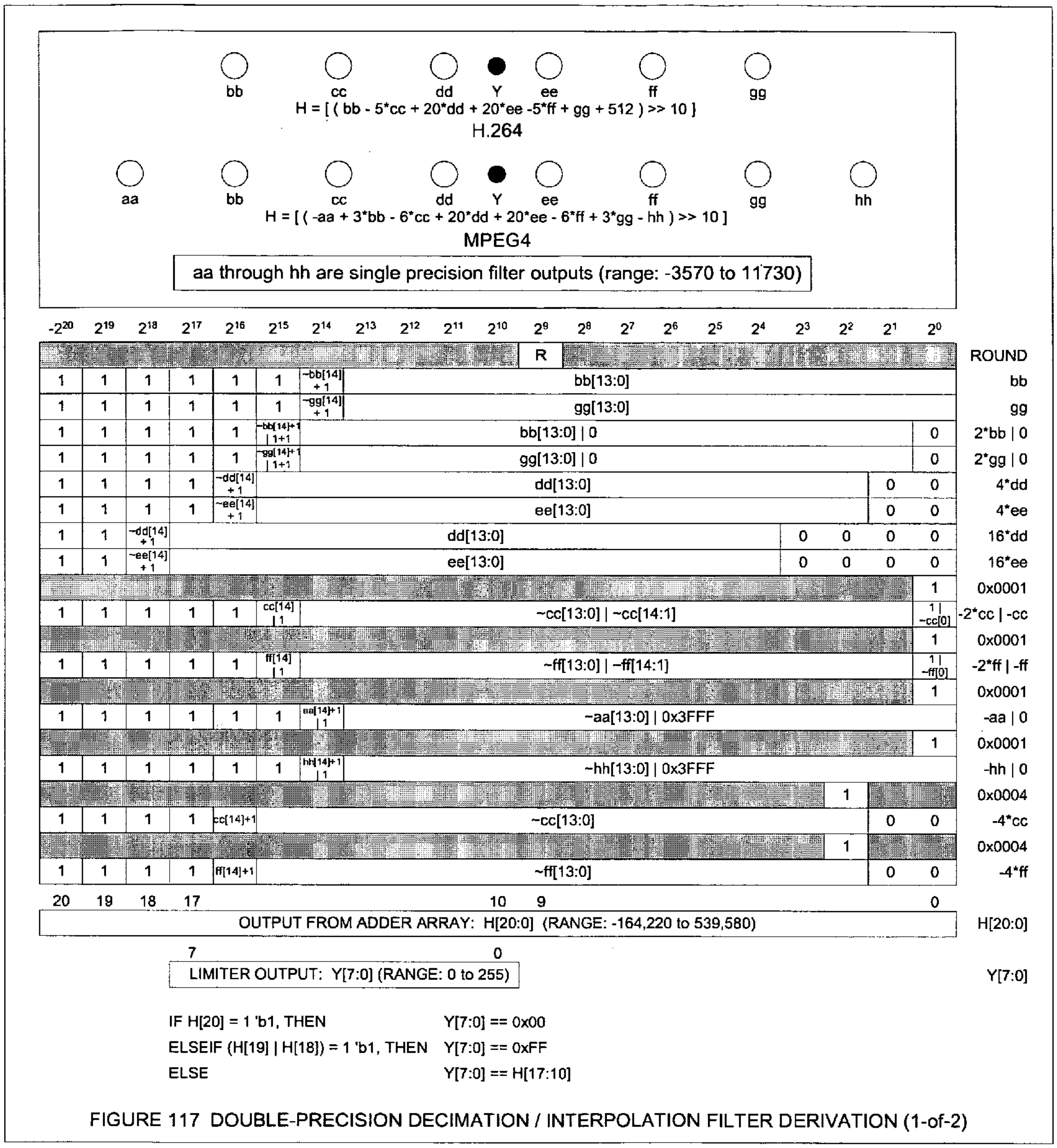
FIGURE 117 DOUBLE-PRECISION DECIMATION / INTERPOLATION FILTER DERIVATION (1-of-2)

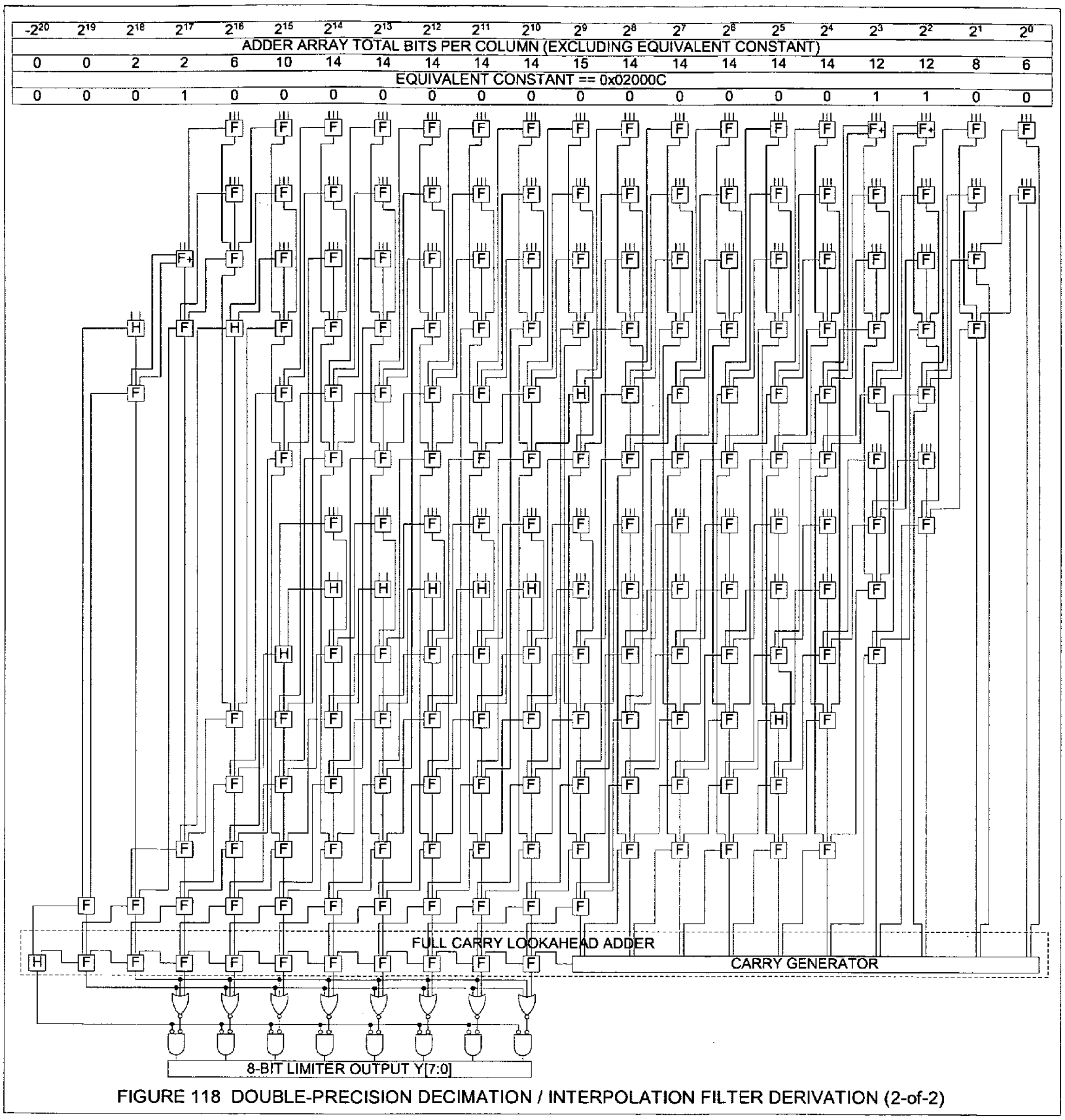
FIGURE 118 DOUBLE-PRECISION DECIMATION / INTERPOLATION FILTER DERIVATION (2-of-2)

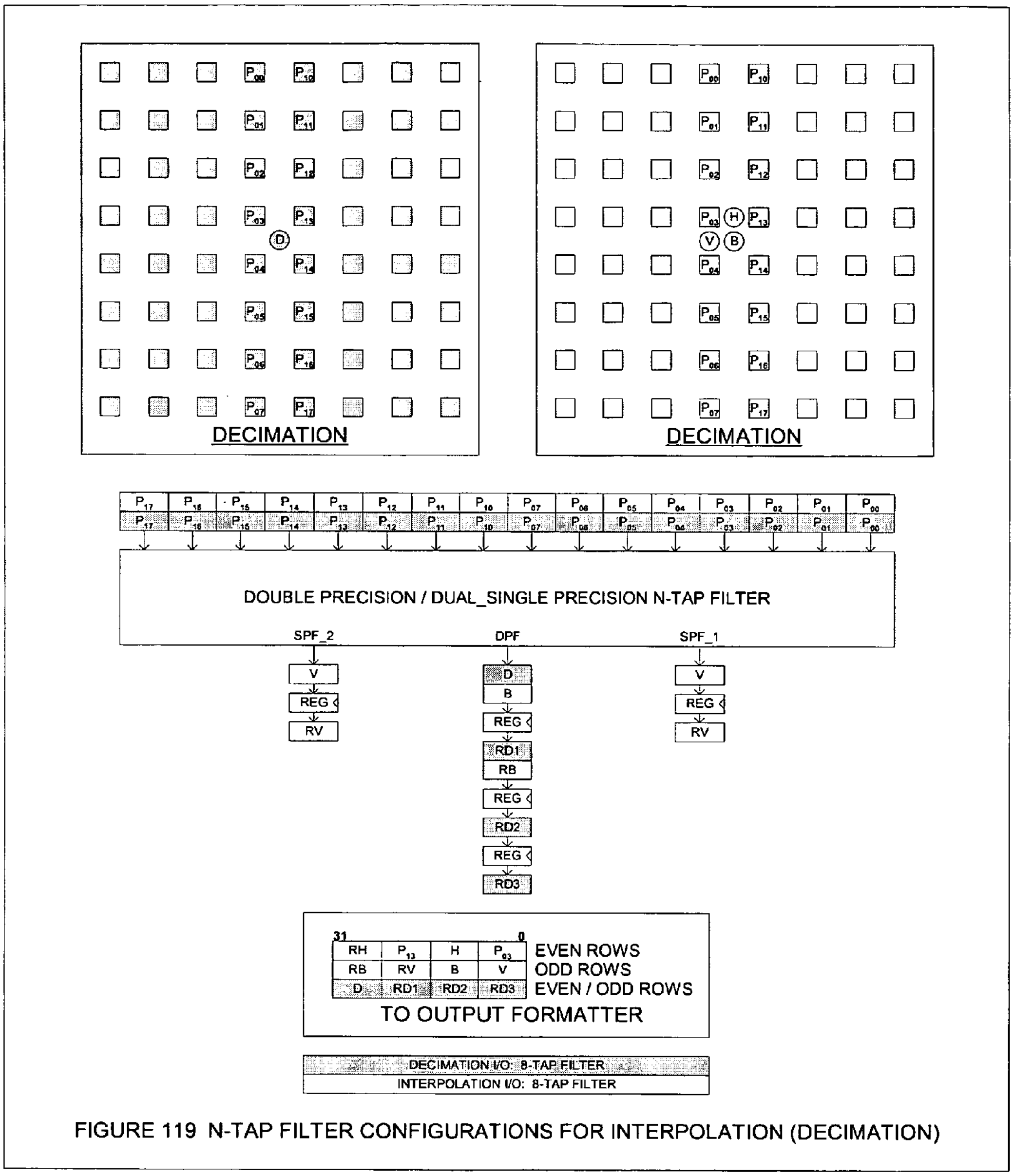
FIGURE 119 N-TAP FILTER CONFIGURATIONS FOR INTERPOLATION (DECIMATION)

DEFINING THE CENTER' SEARCH POSITION

NEXT STATE

| CURRENT STATE | 0 0 0 idle | 0 0 1 execute | 0 1 0 wait | 1 0 0 setup | 1 0 1 ack+test | 1 1 1 continue |
|---|---|---|---|---|---|---|
| 0 0 0 idle | idle | | | wrapper asserts eu_run | | |
| 0 0 1 execute | | execute | | | algorithm terminal count indicates done | |
| 0 1 0 wait | wrapper asserts eu_teardown | | wait | | | wrapper asserts eu_continue |
| 1 0 0 setup | | setup byte code indicates done | | setup | | |
| 1 0 1 ack+test | ack+test byte code indicates teardown | ack+test byte code indicates execute | ack+test byte code indicates ack+test | | ack+test | ack+test byte code indicates continue |
| 1 1 1 continue | | continue byte code indicates done | | | | continue |

Note: Wrapper signals 'not_node_enabled' OR 'eu_abort' force STATE to '0 0 0', IDLE

DVN FSM STATE TRANSITION TABLE

FIG. 133

DVN TPL MEMORY / REGISTER FORMAT FOR LOCATIONS 0x00-0x03

DVN TPL MEMORY FORMAT FOR LOCATIONS 0x04, 0x05

DVN TPL MEMORY FORMAT FOR ACKNOWLEDGE+TEST PARAMETERS

WCSZ stall while sign of counter is '0'

| 7 | 6 | 5 | 4 | 3 | 2 | 1 | 0 |
|---|---|---|---|---|---|---|---|
| 0 | 1 | 1 | 0 | 1 | 0 | 0 | 0 |

Operation: for sign (msb) of counter @ eu_csar[5:0] = '0' | '1', stall | continue WCSO stall while sign of counter is '1'

| 7 | 6 | 5 | 4 | 3 | 2 | 1 | 0 |
|---|---|---|---|---|---|---|---|
| 0 | 1 | 1 | 0 | 1 | 0 | 0 | 1 |

Operation: for sign (msb) of counter @ eu_csar[5:0] = '1' | '0', stall | continue WMSZ stall while sign of tpl memory is '0'

| 7 | 6 | 5 | 4 | 3 | 2 | 1 | 0 |
|---|---|---|---|---|---|---|---|
| 0 | 1 | 1 | 0 | 1 | 0 | 1 | 0 |

Operation: for sign (msb) of tpl longword @ tpl_offset = '0' | '1', stall | continue WMSO stall while sign of tpl memory is '1'

| 7 | 6 | 5 | 4 | 3 | 2 | 1 | 0 |
|---|---|---|---|---|---|---|---|
| 0 | 1 | 1 | 0 | 1 | 0 | 1 | 1 |

Operation: for sign (msb) of tpl longword @ tpl_offset = '1' | '0', stall | continue

DVN BYTE CODES FOR ACKNOWLEDGE+TEST

FIG. 140A

LDCA load counter sign address register

| 7 | 6 | 5 ... 0 |
|---|---|---|
| 0 | 0 | COUNTER |

Operation: eu_csar <-- counter [5:0]

CDDC conditional decrement downcounter

| 7 | 6 | 5 | 4 | 3 | 2 ... 0 |
|---|---|---|---|---|---|
| 0 | 1 | 0 | 0 | 0 | CONDITION |

If TRUE: Operation: d_cntr[5:0]<-- d_cntr[5:0] minus one; else NOP

| CODE[2:0] | CONDITION |
|---|---|
| 0 0 0 | unconditional |
| 0 0 1 | unconditional |
| 0 1 0 | wrapper counter sign is '0' |
| 0 1 1 | wrapper counter sign is '1' |
| 1 0 0 | d_cntr[5:0] msb is '0' |
| 1 0 1 | d_cntr[5:0] msb is '1' |
| 1 1 0 | sign (msb) of tpl longword @ tpl_offset is '0' |
| 1 1 1 | sign (msb) of tpl longword @ tpl_offset is '1' |

CLDC conditional load downcounter

| 7 | 6 | 5 | 4 | 3 | 2 ... 0 |
|---|---|---|---|---|---|
| 0 | 1 | 0 | 0 | 1 | CONDITION |

If TRUE: Operation: d_cntr <-- Contents[4:0] of address [TPL pointer + offset + incr.]; else NOP

| CODE[2:0] | CONDITION |
|---|---|
| 1 1 0 | sign (msb) of tpl longword @ tpl_offset is '0' |
| 1 1 1 | sign (msb) of tpl longword @ tpl_offset is '1' |

DVN BYTE CODES FOR ACKNOWLEDGE+TEST

FIG. 140B

CSTC conditional state transition to CONTINUE

| 7 | 6 | 5 | 4 | 3 | 2 — 0 |
|---|---|---|---|---|---|
| 0 | 1 | 0 | 1 | 0 | CONDITION |

If TRUE: Operation: FSM STATE <--CONTINUE; else NOP

| CODE[2:0] | CONDITION |
|---|---|
| 0 0 0 | unconditional |
| 0 0 1 | uncond; wrapper cntr sign selects parms offset. |
| 0 1 0 | wrapper counter sign is '0' |
| 0 1 1 | wrapper counter sign is '1' |
| 1 0 0 | d_cntr[5:0] msb is '0' |
| 1 0 1 | d_cntr[5:0] msb is '1' |
| 1 1 0 | sign (msb) of tpl longword @ tpl_offset is '0' |
| 1 1 1 | sign (msb) of tpl longword @ tpl_offset is '1' |

CSTI conditional state transition to IDLE, set DONE

| 7 | 6 | 5 | 4 | 3 | 2 — 0 |
|---|---|---|---|---|---|
| 0 | 1 | 0 | 1 | 1 | CONDITION |

If TRUE: Operation: FSM STATE <--IDLE, assert 'eu_done'; else NOP

| CODE[2:0] | CONDITION |
|---|---|
| 0 0 0 | unconditional |
| 0 0 1 | unconditional |
| 0 1 0 | wrapper counter sign is '0' |
| 0 1 1 | wrapper counter sign is '1' |
| 1 0 0 | d_cntr[5:0] msb is '0' |
| 1 0 1 | d_cntr[5:0] msb is '1' |
| 1 1 0 | sign (msb) of tpl longword @ tpl_offset is '0' |
| 1 1 1 | sign (msb) of tpl longword @ tpl_offset is '1' |

DVN BYTE CODES FOR ACKNOWLEDGE+TEST

FIG. 140C

ACK0 acknowledgement

| 7 | 6 | 5 | 4 | 3 | 2 | 1 | 0 |
|---|---|---|---|---|---|---|---|
| 0 | 1 | 1 | 1 | 0 | 0 | 0 | 0 |

Operation: Send contents of address [TPL pointer + offset] to network with Aux <–0x00

ACK1 acknowledgement + test

| 7 | 6 | 5 | 4 | 3 | 2 | 1 | 0 |
|---|---|---|---|---|---|---|---|
| 0 | 1 | 1 | 1 | 0 | 0 | 0 | 1 |

Operation: Send contents of address [TPL pointer + offset] to network with Aux <–0x01

ACK2 initialize counter

| 7 | 6 | 5 | 4 | 3 | 2 | 1 | 0 |
|---|---|---|---|---|---|---|---|
| 0 | 1 | 1 | 1 | 0 | 0 | 1 | 0 |

Operation: Send contents of address [TPL pointer + offset] to network with Aux <–0x02

ACK3 increment counter

| 7 | 6 | 5 | 4 | 3 | 2 | 1 | 0 |
|---|---|---|---|---|---|---|---|
| 0 | 1 | 1 | 1 | 0 | 0 | 1 | 1 |

Operation: Send contents of address [TPL pointer + offset] to network with Aux <–0x03

DVN BYTE CODES FOR ACKNOWLEDGE+TEST

FIG. 140E

| TPL POINTER OFFSET | 31 — 0 | |
|---|---|---|
| 0x00 | SETUP CODE STARTING ADDRESS (CSA) AND PARMS OFFSET = 0x8 | ← TPL POINTER |
| 0x01 | ACK+TEST CODE STARTING ADDRESS (CSA+1) AND PARMS OFFSET = 0xA | |
| 0x02 | TEARDOWN CODE STARTING ADDRESS (not used) | |
| 0x03 | CONTINUE CODE STARTING ADDRESS (CSA+4) AND PARMS OFFSETS = 0x0F, 0x12 | |
| 0x04 | SEMAPHORE 1 (not used) | |
| 0x05 | SEMAPHORE 2 (not used) | |
| 0x06 | reserved | |
| 0x07 | reserved | |
| 0x08 | CSR PARAMETERS | ← SETUP OFFSET |
| 0x09 | CNLR PARAMETERS | |
| 0x0A | DNLR PARAMETERS | |
| 0x0B | PRODUCER ACKNOWLEDGEMENT PARAMETERS | ← ACK+TEST OFFSET |
| 0x0C | PRODUCER SELF-ACK PARAMETERS | |
| 0x0D | CONSUMER ACKNOWLEDGEMENT PARAMETERS | |
| 0x0E | CONSUMER SELF-ACK PARAMETERS | |
| 0x0F | CSR(0) PARAMETERS | ← CONTINUE(0) OFFSET |
| 0x10 | CNLR(0) PARAMETERS | |
| 0x11 | DNLR(0) PARAMETERS | |
| 0x12 | CSR(1) PARAMETERS | ← CONTINUE(1) OFFSET |
| 0x13 | CNLR(1) PARAMETERS | |
| 0x14 | DNLR(1) PARAMETERS | |

TASK PARAMETER LIST: 18 LONGWORDS

| 31 — 24 | 23 — 16 | 15 — 8 | 7 — 0 | | |
|---|---|---|---|---|---|
| - | LD DNLR,DONE | LD CNLR | LD CSR | ← CSA | (SETUP) |
| ACK0 | ACK0 | ACK0 | ACK0 | ← CSA+1 | (ACK+TEST) |
| WCSO | LDCA (OUT) | WCSZ | LDCA (IN) | | |
| - | - | CSTC-001 | LDCA (FLAG) | | |
| - | LD DNLR,DONE | LD CNLR | LD CSR | ← CSA+4 | (CONTINUE) |

BYTE CODE: 5 LONGWORDS

DVN TASK PARAMETER LIST (TPL) AND BYTE CODE FOR 'TYPICAL TASK'

FIG. 141

| VERTICAL SEARCH | | | | HORIZONTAL SEARCH | | | | | | | | | | | | | | | |
|---|---|---|---|---|---|---|---|---|---|---|---|---|---|---|---|---|---|---|---|
| | | | m (x5) sets | 1 | 2 | 3 | 4 | 5 | 6 | 7 | 8 | 9 | 10 | 11 | 12 | 13 | 14 | 15 | 16 |
| | | | search range | 5 | 10 | 15 | 20 | 25 | 30 | 35 | 40 | 45 | 50 | 55 | 60 | 65 | 70 | 75 | 80 |
| | | | columns | 20 | 25 | 30 | 35 | 40 | 45 | 50 | 55 | 60 | 65 | 70 | 75 | 80 | 85 | 90 | 95 |
| n (x5) sets | search range | rows | rows/memory \ longwords | 5 | 7 | 8 | 9 | 10 | 12 | 13 | 14 | 15 | 17 | 18 | 19 | 20 | 22 | 23 | 24 |
| 1 | 5 | 20 | 5 | 25 (40) | 35 (80) | 40 (120) | 45 (160) | 50 (200) | 60 (240) | 65 (280) | 70 (320) | 75 (360) | 85 (400) | 90 (440) | 95 (480) | 100 (520) | 110 (560) | 115 (600) | 120 (640) |
| 2 | 10 | 25 | 7 | 35 (80) | 49 (160) | 56 (240) | 63 (320) | 70 (400) | 84 (480) | 91 (560) | 98 (640) | 105 (720) | 119 (800) | 126 (880) | 133 (960) | 140 (1040) | 154 (1120) | 161 (1200) | 168 (1280) |
| 3 | 15 | 30 | 8 | 40 (120) | 56 (240) | 64 (360) | 72 (480) | 80 (600) | 96 (720) | 104 (840) | 112 (960) | 120 (1080) | 136 (1200) | 144 (1320) | 152 (1440) | 160 (1560) | 176 (1680) | 184 (1800) | 192 (1920) |
| 4 | 20 | 35 | 9 | 45 (160) | 63 (320) | 72 (480) | 81 (640) | 90 (800) | 108 (960) | 117 (1120) | 126 (1280) | 135 (1440) | 153 (1600) | 162 (1760) | 171 (1920) | 180 (2080) | 198 (2240) | 207 (2400) | 216 (2560) |
| 5 | 25 | 40 | 10 | 50 (200) | 70 (400) | 80 (600) | 90 (800) | 100 (1000) | 120 (1200) | 130 (1400) | 140 (1600) | 150 (1800) | 170 (2000) | 180 (2200) | 190 (2400) | 200 (2600) | 220 (2800) | 230 (3000) | 240 (3200) |
| 6 | 30 | 45 | 12 | 60 (240) | 84 (480) | 96 (720) | 108 (960) | 120 (1200) | 144 (1440) | 156 (1680) | 168 (1920) | 180 (2160) | 204 (2400) | 216 (2640) | 228 (2880) | 240 (3120) | ***264*** (3360) | ***276*** (3600) | ***288*** (3840) |
| 7 | 35 | 50 | 13 | 65 (280) | 91 (560) | 104 (840) | 117 (1120) | 130 (1400) | 156 (1680) | 169 (1960) | 182 (2240) | 195 (2520) | 221 (2800) | 234 (3080) | ***247*** (3360) | ***260*** (3640) | ***286*** (3920) | ***299*** (4200) | ***312*** (4480) |
| 8 | 40 | 55 | 14 | 70 (320) | 98 (640) | 112 (960) | 126 (1280) | 140 (1600) | 168 (1920) | 182 (2240) | 196 (2560) | 210 (2880) | 238 (3200) | ***252*** (3520) | ***266*** (3840) | ***280*** (4160) | ***308*** (4480) | ***322*** (4800) | ***336*** (5120) |
| 9 | 45 | 60 | 15 | 75 (360) | 105 (720) | 120 (1080) | 135 (1440) | 150 (1800) | 180 (2160) | 195 (2520) | 210 (2880) | 225 (3240) | ***255*** (3600) | ***270*** (3960) | ***285*** (4320) | ***300*** (4680) | ***330*** (5040) | ***345*** (5400) | ***360*** (5760) |
| 10 | 50 | 65 | 17 | 85 (400) | 119 (800) | 136 (1200) | 153 (1600) | 170 (2000) | 204 (2400) | 221 (2800) | 238 (3200) | ***255*** (3600) | ***289*** (4000) | ***306*** (4400) | ***323*** (4800) | ***340*** (5200) | ***374*** (5600) | ***391*** (6000) | ***408*** (6400) |

NOTES:
1) SINGLE MEMORY MAXIMUM CAPACITY FOR REFERENCE BLOCK IS 240 LONGWORDS (bold-italics-underlined NOT SUPPORTED)
2) AVG. NO. OF PROCESSING CYCLES AVAILABLE FOR D1, 30 FRAMES PER SECOND, AND 200 MHz DVN CLOCK FREQUENCY= 4938.

REFERENCE BLOCK LWORDS per MEMORY (AND CLOCK CYCLES) for m-by-n 5x5 SEARCH RANGES

FIG. 145

PROCESSOR FOR VIDEO DATA ENCODING/DECODING

CROSS-REFERENCE TO RELATED APPLICATIONS

This application claims priority from the following:

Provisional U.S. Patent Application 60/570,087 "Digital Video Node for An Adaptive Computing Machine", by Master et al;

U.S. patent application Ser. No. 11/125,852 now U.S. Pat. No. 8,018,463 "Processor for Video Data," filed on May 9, 2005, by Master, et al Scheuermann;

U.S. Patent Publication No. 2003/0115553 "Computer Processor Architecture Selectively Using Finite-State-Machine for Control Code Execution" by Master et al;

U.S. Patent Application No. 2004/0093601 "Method, System and Program for Developing And Scheduling Adaptive Integrated Circuitry and Corresponding Control or Configuration Information" by Master et al;

U.S. Patent Publication No. 2004/0177225 "External Memory Controller Node" by Master et al;

U.S. Patent Application Publication No. 2004/0181614 "Input/Output Controller Node in an Adaptable Computing Environment" by Master et al.

These applications are each incorporated herein by reference for all purposes, as is U.S. Pat. No. 6,836,839 "Adaptive Integrated Circuitry with Heterogeneous and Reconfigurable Matrices of Diverse and Adaptive Computational Units Having Fixed, Application Specific Computational Elements" by Master et al.

BACKGROUND OF THE INVENTION

Field of the Invention

Video information is ubiquitous in today's world. Children learn from television shows and educational lessons prepared for video. Adults use video for entertainment and to keep informed with current events. Digital versatile disks (DVDs), digital cable, and satellite television use digital video data, in contrast to the older analog mechanisms for recording and distributing video information. Digital video data is becoming more and more prevalent in today's home and office environment.

The amount of numeric computation involved in processing digital video data requires an enormous amount of computational power. Generating digital video data of typical quality for one second's worth of video requires performing between tens of millions and a billion arithmetic computations.

Hardware can be used to speed up video computations, compared with software encoders, decoders, and transcoders for digital video data. However, typical approaches to hardware design operate only with video data in one particular format at one particular resolution. Thus there is a need for hardware that works with video data of different resolutions, standards, formats, etc.

SUMMARY OF EMBODIMENTS OF THE INVENTION

Various embodiments of the invention provide systems and methods for processing video data. In a preferred embodiment, a video processor is configured at run time so as to operate on video data having various attributes. These streams can have various combinations of attributes, including format, standardization, resolution, encoding, compression, or other attributes. The video processor operates on the various streams of video data according to a dynamic control mechanism including, but not limited to, a program or dynamically configurable values held in a register.

Some embodiments of the invention provide a video processor that can be dynamically configured via a sequence of instructions, where the instructions include information on the attributes of the current video data. This information configures the video processor to receive video data with specified attributes, to generate video data with specified attributes, or both.

The operation of the video processor is controlled by at least one sequence of instructions. Multiple sequences may be employed concurrently, thereby enabling the processor to concurrently generate and/or receive video streams of different attributes.

In some embodiments of the invention, one or more control processors provide the instruction sequences to the video processor. The control processors and the video processor are adapted to operate together as coprocessors. Alternatively or additionally, the instruction sequences may be stored in one or more instruction memories or queues associated with the video processor.

Some embodiments of the invention provide an adder array that can be dynamically configured via control mechanisms including but not limited to instructions, register values, control signals, or programmable links. As the processor sends video data through the adder array, the array generates the numerical, logical, or sequential computational results required to process the video data.

Adder arrays are used, in some embodiments of the invention, to compute difference functions and thereby generate error vectors. Error vectors may be used to detect motion among sets of video data that are temporally related. Error vectors may also be used to compute residual data that is encoded in the output video.

Adder arrays are also used, in some embodiments of the invention, to compute filtering functions that are applied to the video data. Such filtering functions include, but are not limited to, interpolation or decimation of the incoming video prior to motion detection.

Decimated or interpolated PELs may be used to generate output video having different attributes than the input video. Alternatively or additionally, decimated or interpolated PELs that persist only during an encoding or compressing process may be used to increase the accuracy or perceived quality of the output video. Such uses include but are not limited to: hierarchical techniques to increase the performance of motion detection based on reducing the resolution of the input video for an initial top-level motion scan; or interpolated techniques for increasing the accuracy of motion detection.

Some embodiments of the invention provide dynamically configurable hardware search operations. Such operations can be used when encoding video for various purposes, including but not limited to, detecting motion among sets of video data that are temporarily related. A single hardware operation compares a reference block within one set of video data to a set of regions within the same or a different set of video data. In addition to the attributes of the video data being dynamically configurable, the number of regions within the set and the relative offset among the various regions is dynamically configurable.

Some embodiments of the invention are implemented using adaptive computing machines (AGMs). An ACM includes a plurality of heterogeneous computational elements, each coupled to an interconnection network.

BRIEF DESCRIPTION OF THE DRAWINGS

Objects, features, and advantages of various embodiments of the invention will become apparent from the descriptions and discussions herein, when read in conjunction with the drawings. Technologies related to the invention, example embodiments of the invention, and example uses of the invention are illustrated in the following figures:

FIG. 1 shows Elements of an ACM Node

FIG. 2 shows Block Matching Motion Estimation

FIG. 3 shows Domain Video Node (DVN) Motion Estimation Engine.

FIG. 4 shows DVN Memory Map

FIG. 5 shows Allowable Combinations for 4032 Byte Reference Blocks

FIG. 6 shows Reference Block L Words/Memory for m-by-n 5×5 Search Ranges

FIG. 7 Allowed Reference Block Combinations and Resulting Double Pixel Block Sizes for Various Decimation Filters FIG. 8 shows Memory Layout for M=50 Column, N=50 Row Reference Block FIG. 9 shows Search Region Within 50×50 Reference Block FIG. 10 shows Searching the Center 5×5 Positions Concurrently FIG. 11 shows Searching the Center Nine Sets of 5×5 Positions FIG. 12 shows Exhaustive Search of Forty Nine Sets of 5×5 Positions FIG. 13 shows Down-sampled 56-by-56 to 27-by-27 Reference Block FIG. 14 shows Memory Layout for M=27 Column, N=27 Row Double Pixel Array FIG. 15 shows Exhaustive Search of Sixteen 5×5 Sets in Down-sampled Reference Block FIG. 16 shows Memory Layout for 16×16, 18×18, 20×20, and 22×22 Current Blocks FIG. 17 shows Down-sampled 16-by-16 to 8-by-8 Current Block FIG. 18 shows 4-Tap, 6-Tap, and 8-Tap Decimation Filters FIG. 19 shows Memory Layout for Down-sampled 8×8 Current Block FIG. 20 shows 4×4 Reference Block Search After Down-sampled Block Search FIG. 21 shows Final Search of Four Sets of 5×5 Positions, 8×8 Blocks FIG. 22 shows Reference Block Sizes for +/−17 Search, No Pre-Interpolation Buffer Reloading FIG. 23 shows Full Pixel Search Areas Requiring Pre-Interpolation Buffer Reloading FIG. 24 shows 60×60 Reference Block Allows +/−17 16×16 Search and 6-Tap H.264 Half Pixel Filters FIG. 25 shows Full Pixel to Half Pixel Bilinear Interpolation FIG. 26 shows Half Pixel Bilinear Interpolation for 16×16 Macroblock FIG. 27 shows Half Pixel Bilinear Interpolation of 8×8 Blocks FIG. 28 shows H.264 6-Tap-Filter-Based Half Pixel Interpolation FIG. 29 shows H.264 6-Tap-Filter-Based Interpolation of 8×8 Blocks FIG. 30 shows MPEG4 8-Tap-Filter-Based Half Pixel Interpolation FIG. 31 shows MPEG4 8-Tap-Filter-Based Interpolation of 8×8 Blocks FIG. 32 shows 43×43 Half Pixel Array to Allow 16×16 and Four 8×8 Search FIG. 33 shows Half Pixel Interpolation FIR Filter Summary FIG. 34 shows Half Pixel Numbering Convention FIG. 35 shows Memory Layout for 43×43 Half Pixel Array (1MV/4MV Mode)

FIG. 36 shows Memory Layout for 35×35 Half Pixel Array from 16×16 Macroblock FIG. 37 shows Memory Layout for 19×19 Half Pixel Array from 8×8 Blocks FIG. 38 shows WMV Sub-Pixel Interpolation FIR Filter Summary FIG. 39 shows Quarter Pixel Numbering Convention FIG. 40 shows Memory Layout for 2048 Byte Quarter Pixel Buffer FIG. 41 shows Byte Map for 'Center' Quarter Pixel 16×16 Macroblock Position 1-of-9

FIG. 42 shows Byte Map for 'Center' Quarter Pixel 16×16 Macroblock Position 2-of-9

FIG. 43 shows Byte Map for 'Center' Quarter Pixel 16×16 Macroblock Position 3-of-9

FIG. 44 shows Byte Map for 'Center' Quarter Pixel 16×16 Macroblock Position 4-of-9

FIG. 45 shows Byte Map for 'Center' Quarter Pixel 16×16 Macroblock Position 5-of-9

FIG. 46 shows Byte Map for 'Center' Quarter Pixel 16×16 Macroblock Position 6-of-9

FIG. 47 shows Byte Map for 'Center' Quarter Pixel 16×16 Macroblock Position 7-of-9

FIG. 48 shows Byte Map for 'Center' Quarter Pixel 16×16 Macroblock Position 8-of-9

FIG. 49 shows Byte Map for 'Center' Quarter Pixel 16×16 Macroblock Position 9-of-9

FIG. 50 shows Memory Layout for Four 512 Byte Quarter Pixel Buffers

FIG. 51 shows Byte Map for 'Center' Quarter Pixel 8×8 Block—Position 1-of-9

FIG. 52 shows Byte Map for 'Center' Quarter Pixel 8×8 Block—Position 2-of-9

FIG. 53 shows Byte Map for 'Center' Quarter Pixel 8×8 Block—Position 3-of-9

FIG. 54 shows Byte Map for 'Center' Quarter Pixel 8×8 Block—Position 4-of-9

FIG. 55 shows Byte Map for 'Center' Quarter Pixel 8×8 Block—Position 5-of-9

FIG. 56 shows Byte Map for 'Center' Quarter Pixel 8×8 Block—Position 6-of-9

FIG. 57 shows Byte Map for 'Center' Quarter Pixel 8×8 Block—Position 7-of-9

FIG. 58 shows Byte Map for 'Center' Quarter Pixel 8×8 Block—Position 8-of-9

FIG. 59 shows Byte Map for 'Center' Quarter Pixel 8×8 Block—Position 9-of-9

FIG. 60 shows Memory Layout for Cost Function Tables

FIG. 61 shows Fractional Pixel Cost Functions

FIG. 62 shows DVN Programming Model: Hardware Elements

FIG. 63 shows DVN FSM State Transition Table

FIG. 64 shows DVN Task Parameter List (TPL)

FIG. 65 shows DVN TPL Memory/Register Format for Locations 0x00-0x03

FIG. 66 shows DVN TPL Memory Format for Locations 0x04-0x05

FIG. 67 shows DVN TPL Memory Format for Acknowledgement+Test Parameters

FIG. 68 shows DVN Register Formats for Setup and Continue

FIG. 69 shows DVN Byte Code for Setup and Continue

FIG. 70 shows DVN Byte Codes for Acknowledge+Test

FIG. 71 shows DVN Task Parameter List (TPL) and Byte Code for 'Typical Task'

FIG. 72 shows DVN Command Queue Data Structures

FIG. 73 shows Search Order for Sets of 4-by-4 and 5-by-5 Positions

FIG. 74 shows Fixed Pattern Search of Five Sets of 16×16 Macroblocks

FIG. 75 shows Fixed Pattern Search of Nine Sets of 16×16 Macroblocks

FIG. 76 shows Search Order for Half/Quarter Pixel Resolutions

FIG. 77 shows Memory Layout for Results Buffer

FIG. 78 shows DVN to Controller Status Word Formats

FIG. 79 shows Peek-able DVN Register Formats

FIG. 80 shows DVN TOP LEVEL BLOCK DIAGRAM

FIG. 81 shows DVN DATA PATH

FIG. 82 shows NODE MEMORY READ CYCLE TIMING

FIG. 83 shows NODE MEMORY READ CYCLE CONTENTION COMPENSATION

FIG. 84 shows NODE MEMORY READ CYCLE FSM TRANSITION DIAGRAM

FIG. 85 shows FSM FOR NODE MEMORY READ CYCLE CONTENTION COMPENSATION

FIG. 86 shows 20×20 PIXEL ARRAY FOR SEARCHING TWENTY-FIVE MOTION VECTORS

FIG. 87 shows TIME MULTIPLEXING OF 20×20 ARRAY FOR 25 Motion Vector Search

FIG. 88 shows TIME MULTIPLEXING OF 16×16 CURRENT BLOCK FOR 25 MOTION VECTOR SEARCH FIG. 89 shows 20-PIXEL-PER ROW MULTIPLEXING AND REGISTERING FROM MEMORY TO FIVE SAD ELEMENTS, FOUR POSSIBLE BYTE ALIGNMENTS FIG. 90 shows ONE-OF-FOUR MEMORY/SAD INTERFACES FOR 5×5 SEARCH FIG. 91 shows 16-PIXEL-PER ROW MULTIPLEXING AND REGISTERING FROM MEMORY TO SAD ELEMENTS, FOUR POSSIBLE BYTE ALIGNMENTS FIG. 92 shows ONE-OF-FOUR MEMORY/SAD INTERFACES FOR SINGLE POSITION SEARCH FIG. 93 shows EIGHT BIT ABSOLUTE DIFFERENCE, NINE BIT SIGNED DIFFERENCE FIG. 94 shows ONE-OF-25 SAD8 ACCUMULATORS FIG. 95 shows ADDER ARRAY FOR EIGHT 8-BIT ABSOLUTE DIFFERENCES & 16-BIT ACCUMULATOR FIG. 96 shows FAST ADDER ARRAY FOR EIGHT 8-BIT ABSOLUTE DIFFERENCES & 16-BIT ACCUMULATOR FIG. 97 shows SEARCH TWENTY FIVE POSITIONS, UPDATE 'BEST METRIC', TEST EARLY TERMINATION FIG. 98 shows TWENTY FIVE POSITION SEARCH WITH 8×8 BLOCK IN 12 CLOCK CYCLES FIG. 99 shows DISTRIBUTING THE COST FUNCTIONS DURING 5×5 SEARCH, 8×8 BLOCKS FIG. 100 shows DECIMATION/INTERPOLATION N-TAP FILTER (N=4, 6, 8)

FIG. 101 shows MULTIPLEXING AND REGISTERING FROM EACH OF 4 MEMORIES TO TWO 8-TAP DECIMATION FILTERS, FOUR POSSIBLE BYTE ALIGNMENTS FIG. 102 shows ONE-OF-4 MEMORY/DECIMATION FILTER INTERFACES FOR TWO 8-TAP FILTERS FIG. 103 shows HALF-PIXEL INTERPOLATION USING 8-TAP FILTERS FIG. 104 shows FILTER UTILIZATION DURING FULL PIXEL TO HALF PIXEL INTERPOLATION FIG. 105 shows TWO-DIMENSIONAL 2 DOWN-SAMPLING USING 8-TAP FILTERS FIG. 106 shows FILTER UTILIZATION DURING DOWN-SAMPLING FIG. 107 shows DOUBLE PRECISION DECIMATION/INTERPOLATION FILTER FIG. 108 shows FORMATTER OUTPUTS TO MEMORY FOR DECIMATION AND INTERPOLATION FIG. 109 shows FORMATTER OUTPUTS TO MEMORY FOR BILINEAR INTERPOLATION (DECIMATION)

FIG. 110 shows FOUR PIXEL and TWO PIXEL ADDERS FOR BILINEAR INTERPOLATION

FIG. 111 shows ADDER ARRAY PRIMITIVES

FIG. 112 shows DUAL TWO PIXEL/SINGLE FOUR PIXEL ADDER FOR BILINEAR INTERPOLATION FIG. 113 shows PIXEL ADDER CONFIGURATIONS FOR BILINEAR INTERPOLATION (DECIMATION)

FIG. 114 shows RECONFIGURABLE DECIMATION/INTERPOLATION FILTER DERIVATION (1-of-3)

FIG. 115 shows RECONFIGURABLE DECIMATION/INTERPOLATION FILTER DERIVATION (2-of-3)

FIG. 116 shows RECONFIGURABLE DECIMATION/INTERPOLATION FILTER DERIVATION (3-of-3)

FIG. 117 shows DOUBLE-PRECISION DECIMATION/INTERPOLATION FILTER DERIVATION (1-of-2)

FIG. 118 shows DOUBLE-PRECISION DECIMATION/INTERPOLATION FILTER DERIVATION (2-of-2)

FIG. 119 shows N-TAP FILTER CONFIGURATIONS FOR INTERPOLATION (DECIMATION).

FIG. 133 shows a state transition table for a finite state machine (FSM) according to an embodiment of the invention.

FIGS. 140A to 140E show formats for acknowledge+test byte codes according to an embodiment of the invention.

FIG. 141 shows formats for "typical" task TPL entries and byte codes according to an embodiment of the invention.

FIG. 145 shows formats for reference block longwords according to memory and clock cycles for M-by-N 5×5 search ranges according to an embodiment of the invention.

DETAILED DESCRIPTION OF EMBODIMENTS OF THE INVENTION

The descriptions, discussions and figures herein illustrate technologies related to the invention and show examples of the invention and of using the invention. Known methods, procedures, systems, circuits, or elements may be illustrated and described without giving details so as to avoid obscuring the principles of the invention. On the other hand, details of specific embodiments of the invention are described, even though such details may not apply to other embodiments of the invention.

Some descriptions and discussions herein use abstract or general terms including but not limited to receive, present, prompt, generate, yes, or no. Those skilled in the art use such terms as a convenient nomenclature for components, data, or operations within a computer, digital device, or electromechanical system. Such components, data, and operations are embodied in physical properties of actual objects including but not limited to electronic voltage, magnetic field, and optical reflectivity. Similarly, perceptive or mental terms including but not limited to compare, determine, calculate, and control may also be used to refer to such components, data, or operations, or to such physical manipulations.

Figure 120:
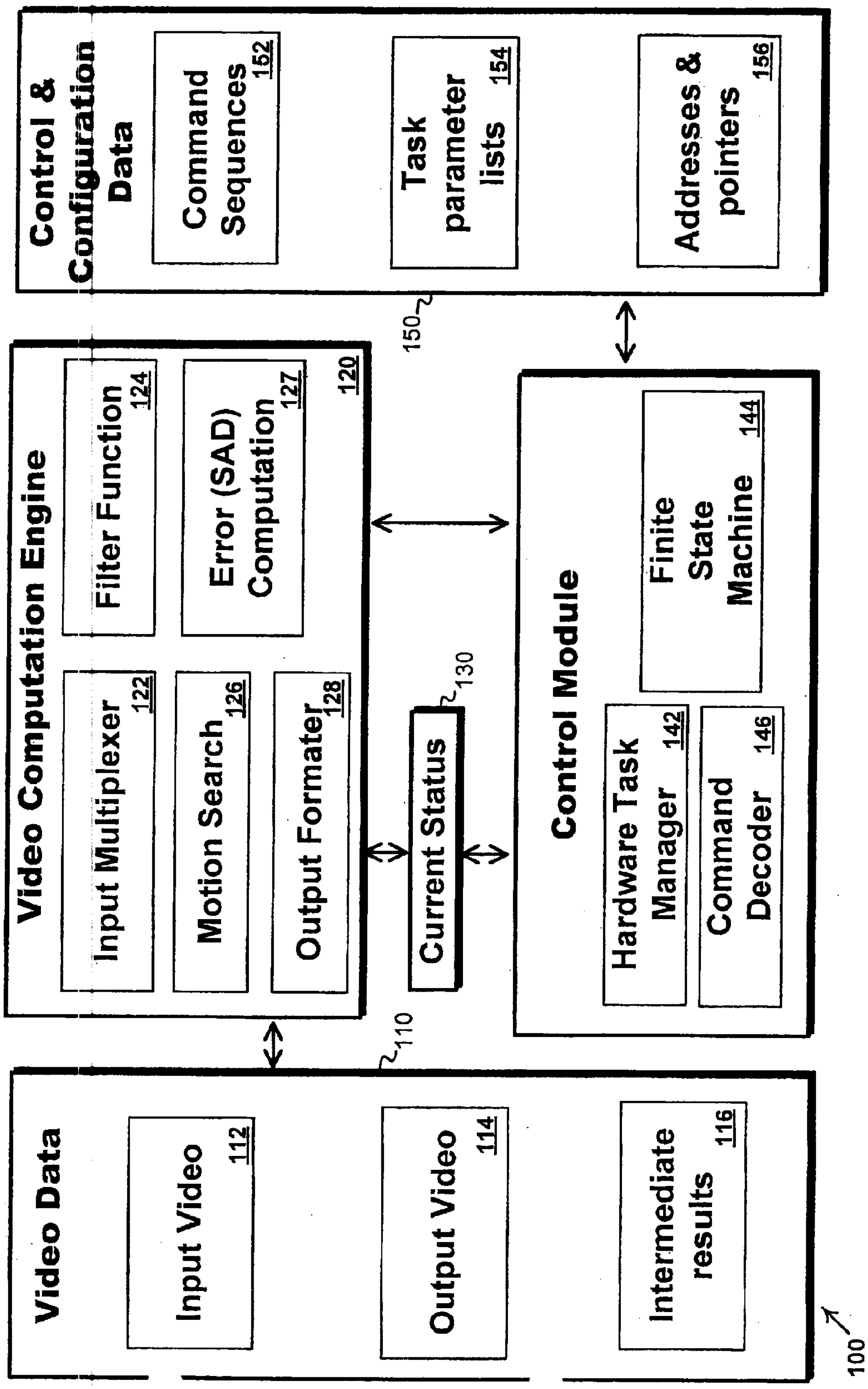
FIG. 120 shows a high level functional block diagram of a video processor according to an embodiment of the invention.

FIG. 120 is a high level functional block diagram of a video processor according to an embodiment of the invention. Video processor 100 includes one or more video data devices 110 that hold or provide network access to video data, one or more video computation engines 120, one or more devices 130 that hold current status information, one or more control modules 140, and one or more control & configuration data devices 150 that hold or provide network access to control & configuration data.

Video data 110 includes, but need not be not limited to, input video data 112, output video data 114, and intermediate results 116. In various embodiments of the invention, video data 110 is held in one or more of: memory modules within the same integrated circuit as the rest of video processor 100; memory devices external to that IC; register files; or other circuitry that holds data.

Video computation engine 120 includes, but need not be limited to the following: input multiplexer 122; filter function circuit 124; motion search circuit 126; error, e.g. sum of absolute differences (SAD) computation circuit 127; and output formatter circuit 128. Motion estimation engine 120 receives input video data 112 and intermediate results 116, and generates intermediate results 116 and output video 114.

The processing functions and operations that video computation engine 120 applies to the data received in order to generate results 116 and 114 is controlled by control signals 146. Under the control of signals 146, various embodiments of engine 120 perform various functions including but not limited to encoding, decoding, transcoding, and motion estimation.

The attributes of video input 112, video output 114, and intermediate results 116 are specified by control signals 146. These attributes include, but need not be limited to, format, standardization, resolution, encoding, or degree of compression.

Control signals 146 are generated by control module 140 based on control & configuration data 150, and current status data 130. Control module 140 includes, but need not be limited to, a hardware task manager 142, finite state machine 144, and a command decoder 146.

Current status 130 includes, but need not be not limited to, indications that various items within video data 110 are ready to be processed, and indications that various data items within control and configuration data 150 are ready to control the processing operations that are applied to video data 110. Current status 130 implements a data flow model of computation, in that processing occurs when the video data and the control & configuration data is ready.

Control and configuration data 150 includes, but need not be not limited to, command sequences 152, task parameter lists 154, and addresses and pointers 156. Addresses and pointers 156 refer to various data items within video data 110, control and configuration data 150, or both. In various embodiments of the invention, video data 110 is held in one or more of: memory modules within the same integrated circuit as the rest of video processor 100; memory devices external to that IC; register files; or other circuits or devices that hold data.

The various components of video data 110 have various attributes, including but not limited to format, standardization, and resolution. A component within video data 110 may have a format that includes at least one of a version of MPEG-2, MPEG-4, a version of Windows media video (WMV), or a version of the International Telecommunications Union (ITU-T) standard X.264. X.264 is also known as joint video team (JVT) after the group who is leading the development of the standard. X.264 is also known as the International Standards Organization/International Electrotechical Commission (ISO/IEC) standard Motion Picture experts Group Layer 4 (MPEG-4) part 10. A component within video data 110 may have a resolution that includes any resolution between about one quarter CEL (as would be used, for example by a still picture taken by cell phone) and about a resolution defined by a version of high definition television (HDTV).

An adaptive computing machine (ACM) includes heterogeneous nodes that are connected by a homogeneous network. Such heterogeneous nodes include, but are not limited to domain video nodes (DVNs). Such a homogeneous network includes, but is not limited to a matrix interconnect network (MIN). Further description of some aspects of some embodiments of the invention, such the MIN and other aspects on adaptive computing machines (ACMs) are described in the patents and patent applications cited above as related applications.

The domain video node (DVN) can be implemented as a node type in an ACM, or it can be implemented in any suitable hardware and/or software design approach. For example, functions of embodiments of the invention can be designed as discrete circuitry, integrated circuits including custom, semi-custom, or other; programmable gate arrays, application-specific integrated circuits (ASICs), etc. Functions may be performed by hardware, software or a combination of both, as desired. Various of the functions described herein may be used advantageously alone, or in combination or subcombination of other functions, including functions known in, the prior art or yet to be developed. The DVN is a reconfigurable digital video processor that achieves a power-area-performance metric comparable to an ASIC.

In one embodiment, the DVN is included in an ACM with the additional benefit of reconfigurability, enabling it to execute a number of commonly used motion estimation algorithms that might require multiple ASICs to achieve the same functionality. However, other embodiments can implement the DVN, or parts or functions of the DVN, in any suitable manner including in a non-configurable, or partially configurable design.

Video processing includes a motion estimation step that requires considerable computational power, especially for higher frame resolutions. The Domain Video Node (DVN) is a type of an ACM node that provides for performing the motion estimation function and other video processing functions.

Figure 121:
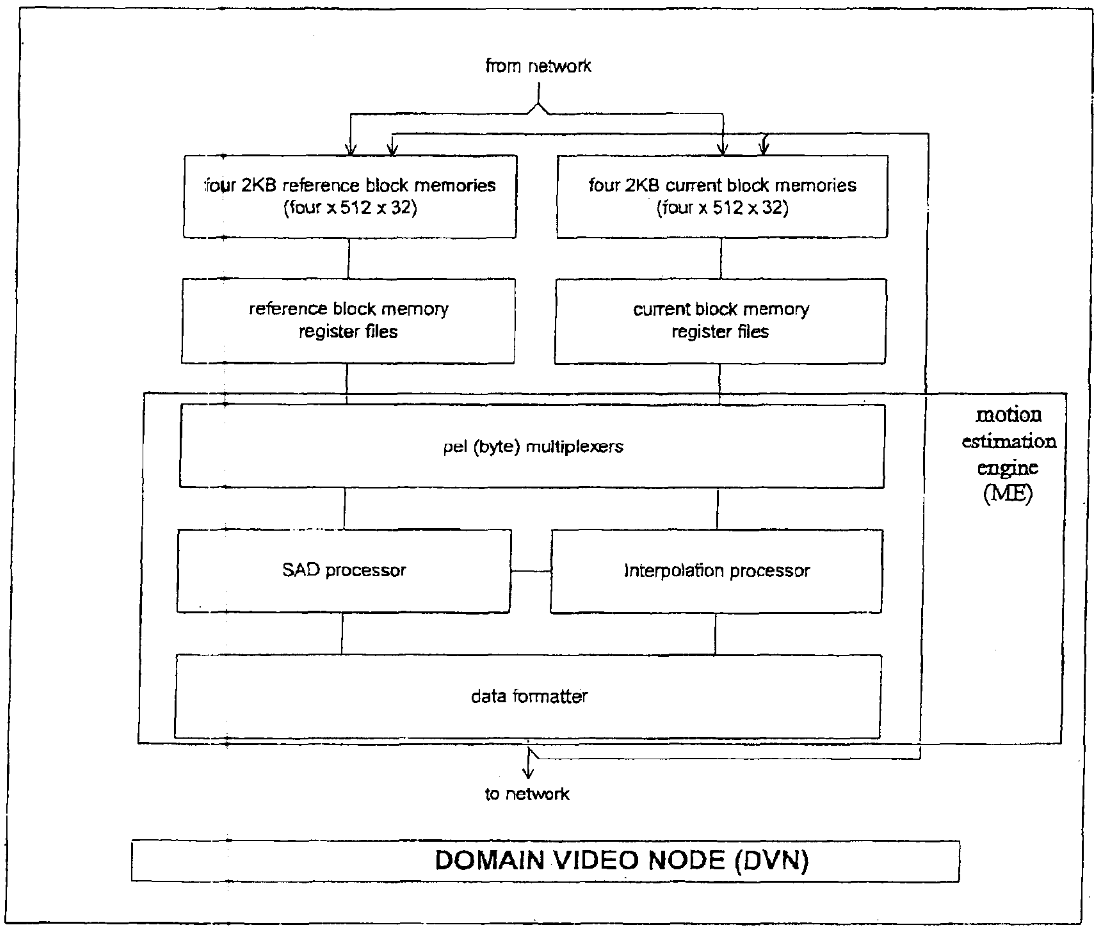
FIG. 121 shows a domain video node (DVN) according to an embodiment of the invention.

A simplified block diagram of the DVN is shown in FIG. 121. Motion estimation consists of comparing a block of picture elements (i.e. PELs) of a current frame with a block from a previous frame, a subsequent frame, or both to locate the blocks(s) with the lowest distortion. Such comparing can, for example, include the commonly used 'sum of absolute differences' (SAD) metric for the selection criterion.

The DVN includes eight 2 KB node memories that allow for sixteen SAD operations each clock cycle. This also allows double buffering for overlapped data input and computation/results output for 16×16 current blocks (macroblocks) and 48×48 reference blocks for search areas of +/−16 PEL in each dimension.

DVN operations include: 1) Full PEL search; 2) 18×18 full PEL to 33×33 half PEL bilinear interpolation; 3) Half PEL search; 4) Output best metric and origin of the associated 16×16 macroblock to the specified node, and output 16×16 macroblock itself to a decoder motion compensation engine.

Full PEL Search: The DVN supports two modes of operation for full PEL search. One mode evaluates each 16×16 position one at a time, performing 16 SAD operations every clock period; the second mode evaluates forty contiguous positions concurrently, performing 160 SAD operations every clock period. For both modes, evaluation consists of calculating the 'sum of absolute differences' (SAD) metric between the current 16×16 macroblock and one-of-1089 16×16 macroblocks from the 48×48 reference block, always saving the best metric and the origin of the associated 16×16 macroblock.

For each mode, the search pattern can be a number of hardwired patterns or a number of positions specified by a list of x,y coordinates (origins) generated by the node and stored in a queue located in the DVN. Various queue data structures can be used and various early completion strategies can be supported.

Figure 122:
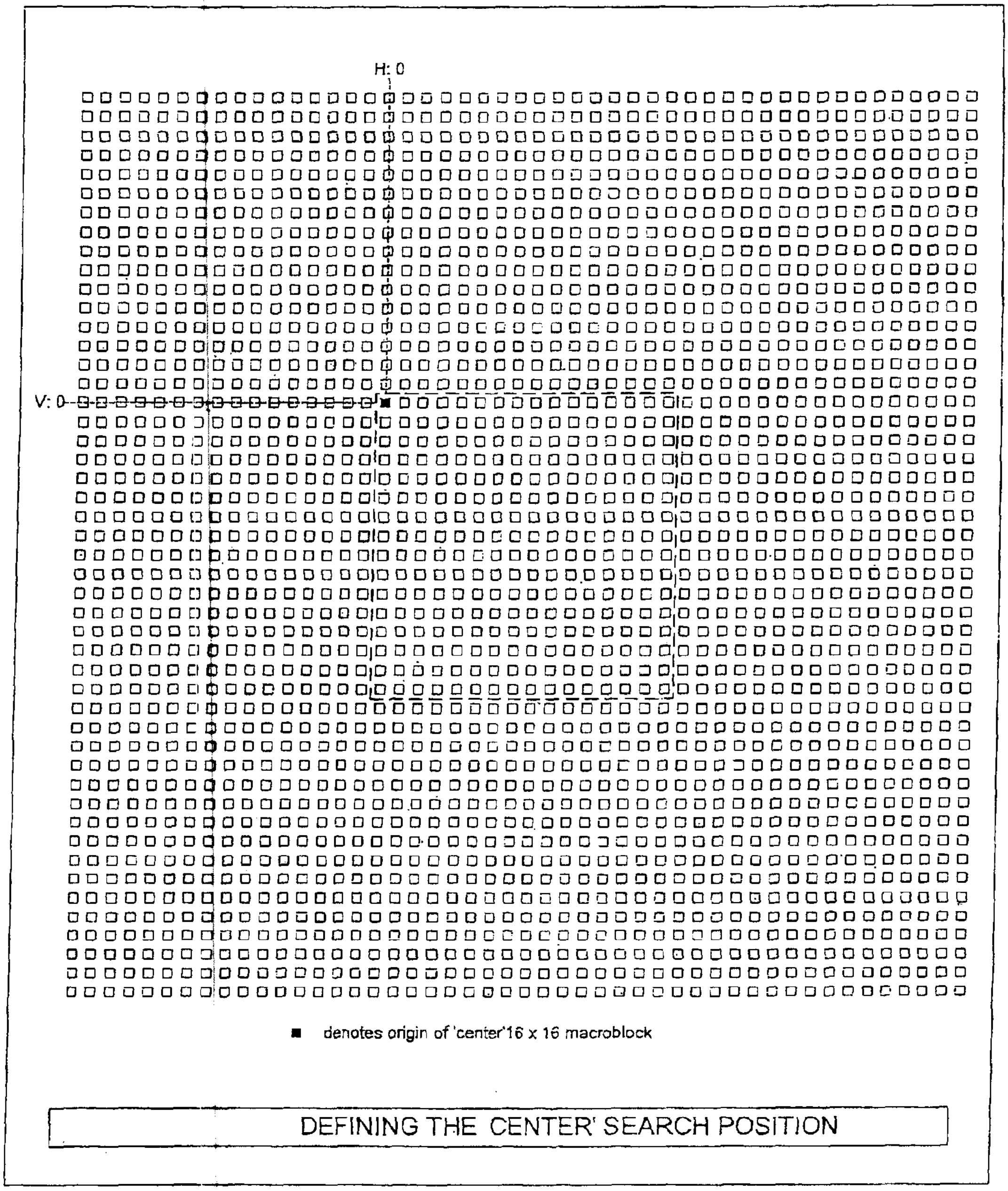
FIG. 122 shows how the center search position is defined according to an embodiment of the invention.
Figure 123:
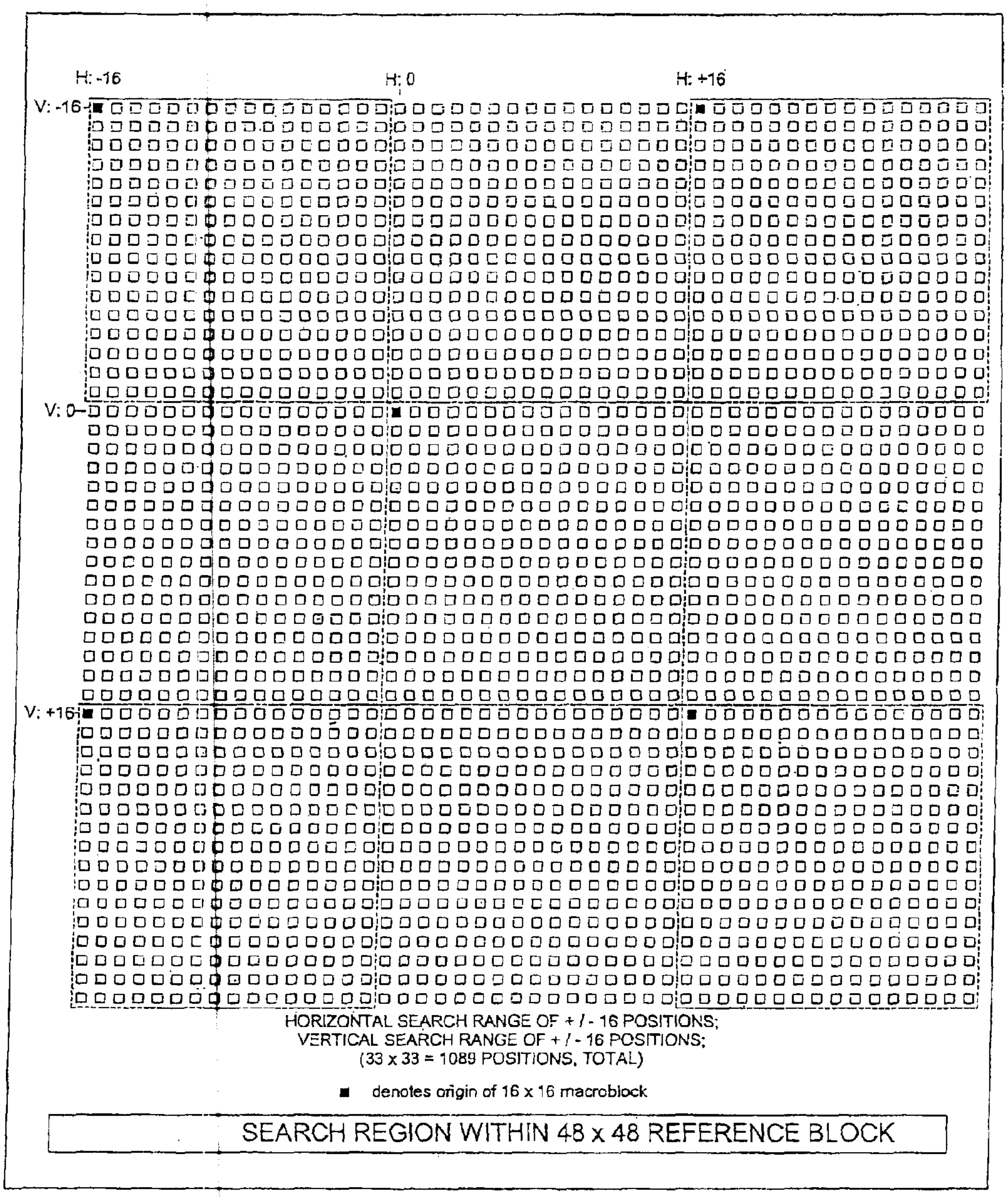
FIG. 123 shows a search region within a 48×48 reference block according to an embodiment of the invention.

There are 1089 candidate search positions within the 48×48 reference block. The 'center' position, with relative coordinates H(0), V(0), is shown in FIG. 122. Five search positions are highlighted in FIG. 123: the center position, H(0), V(0); the upper-leftmost position, H(−16), V(−16); the upper rightmost position, H(+16), V(−16); the lower leftmost position, H(−16), V(+16); and the lower rightmost position, H(+16), V(+16).

Figure 124:
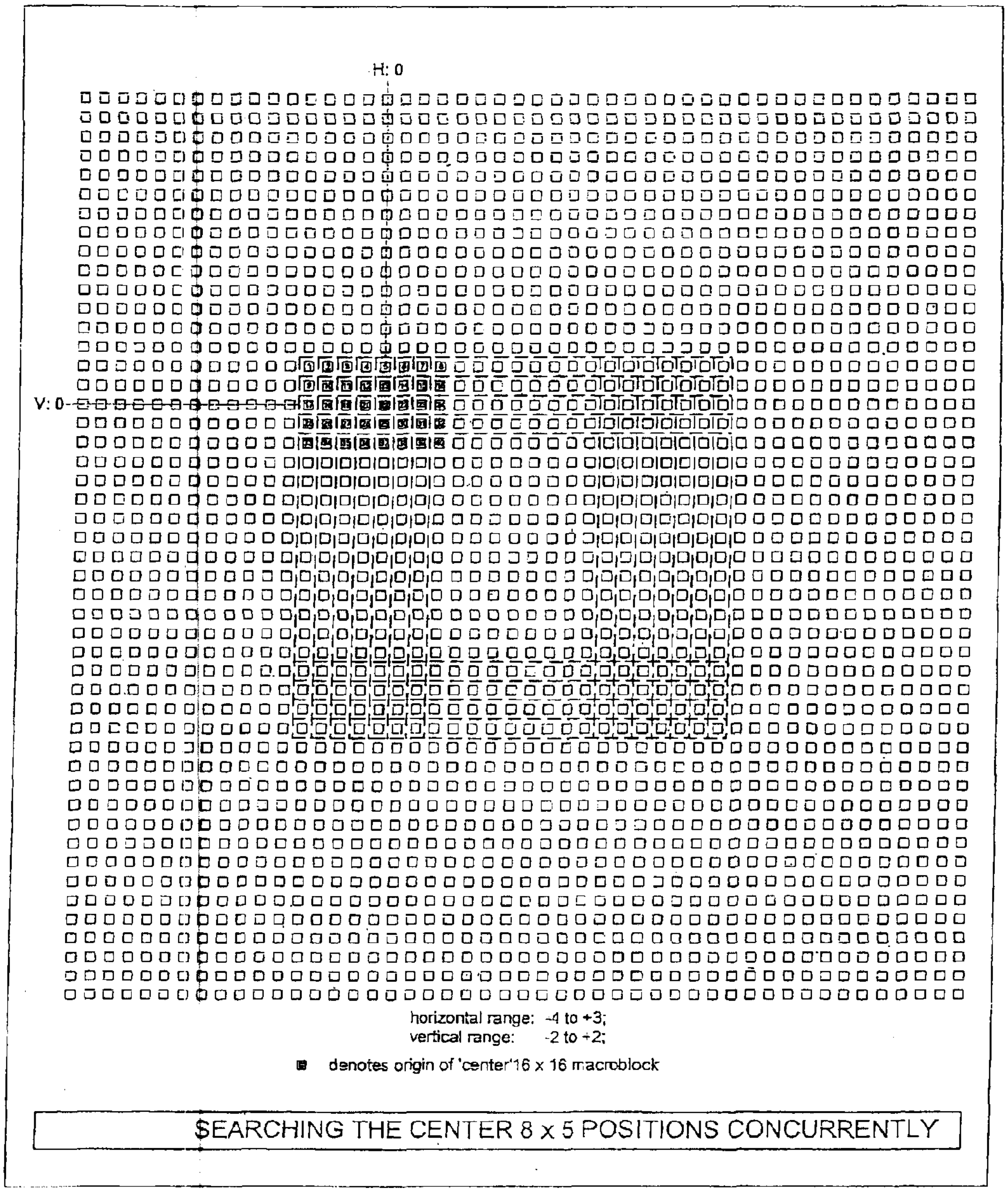
FIG. 124 shows a process of searching the center 8×5 positions concurrently according to an embodiment of the invention.

An example for searching 40 positions concurrently—the 8×5 positions at the center of the 48×48 reference block—is shown in FIG. 124.

Figure 125:
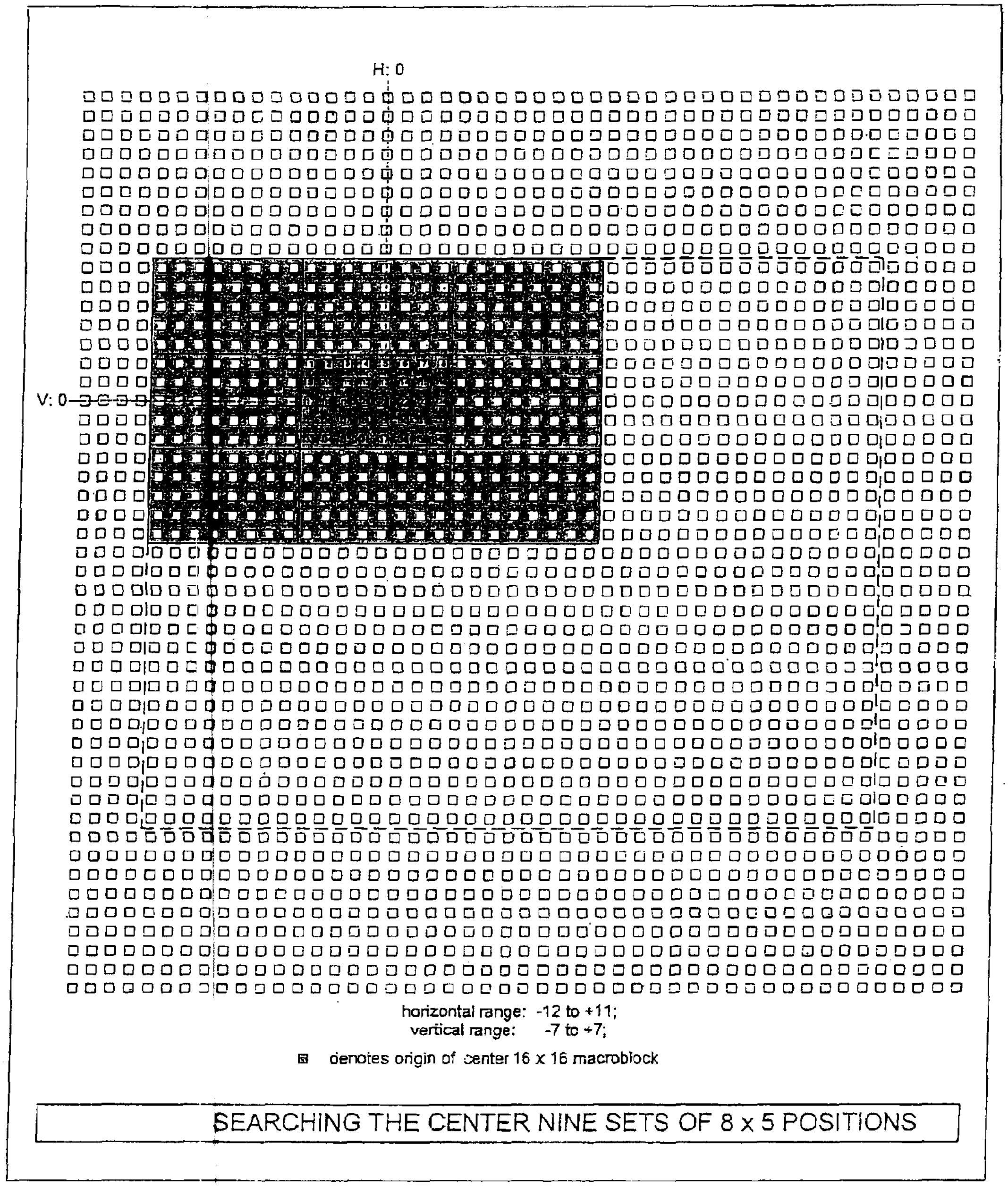
FIG. 125 shows a process of searching the center nine sets of 8×5 positions according to an embodiment of the invention.

An example for searching nine sets of 40 positions at the center of the reference block is shown in FIG. 125. The horizontal search range is −12 to +11, the vertical search range is −7 to +7, and the total number of positions searched is 360.

Figure 126:
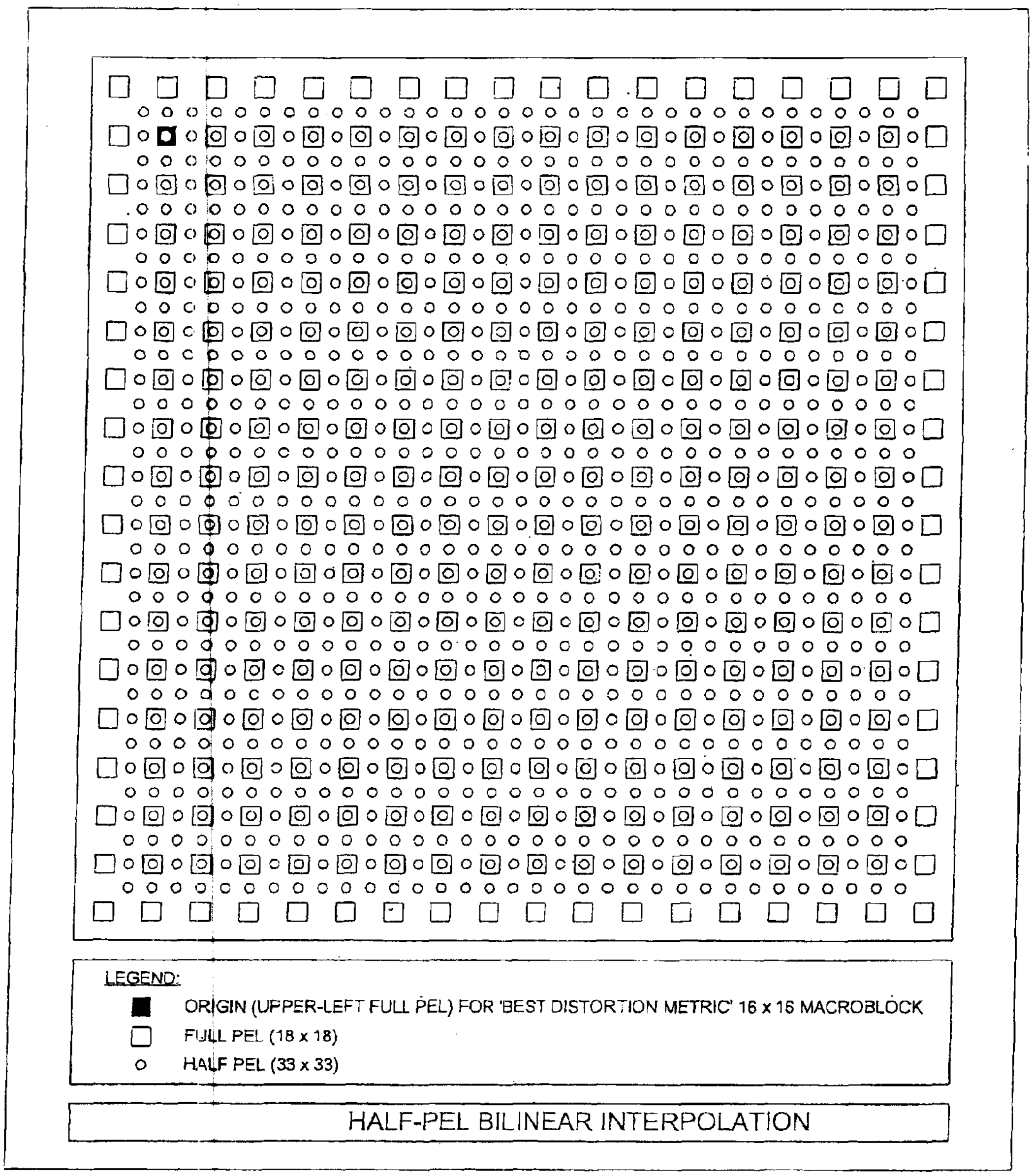
FIG. 126 shows a process of half-PEL bilinear interpolation according to an embodiment of the invention.
Figure 127:
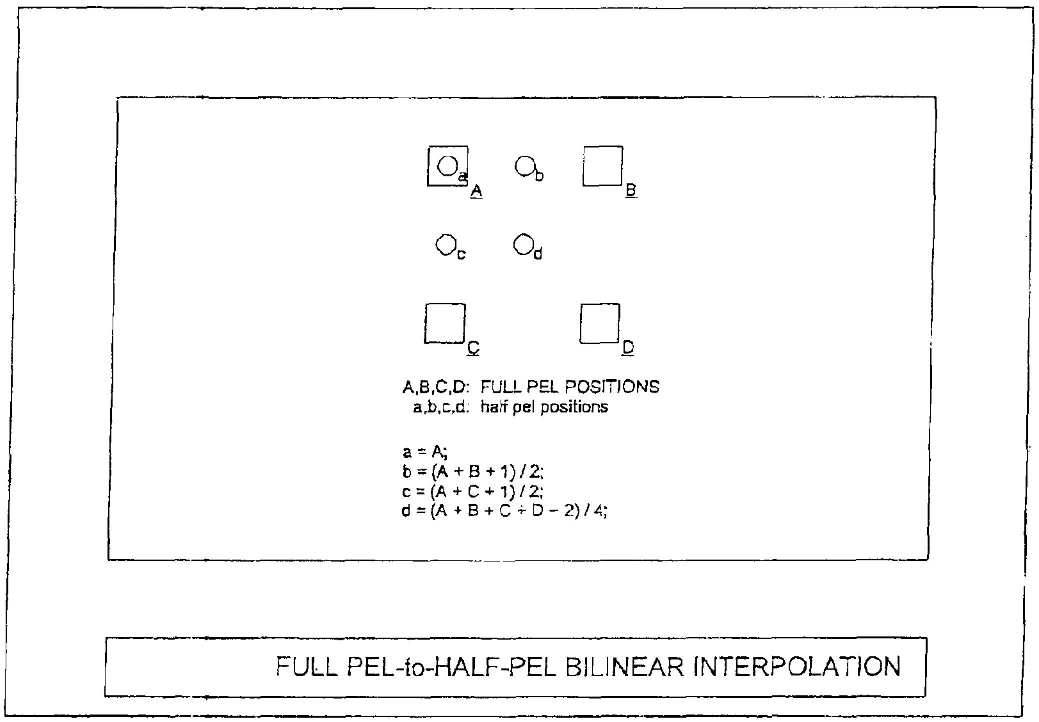
FIG. 127 shows a process of full-PEL to half-PEL bilinear interpolation according to an embodiment of the invention.

Half PEL Bilinear Interpolation: After full PEL search for the 16×16 macroblock with the best distortion metric, bilinear interpolation is performed on the surrounding 18×18 PEL array, yielding a 33×33 half PEL array, as shown in FIG. 126. Calculations used for half PEL bilinear interpolation are summarized in FIG. 127.

Figure 128:
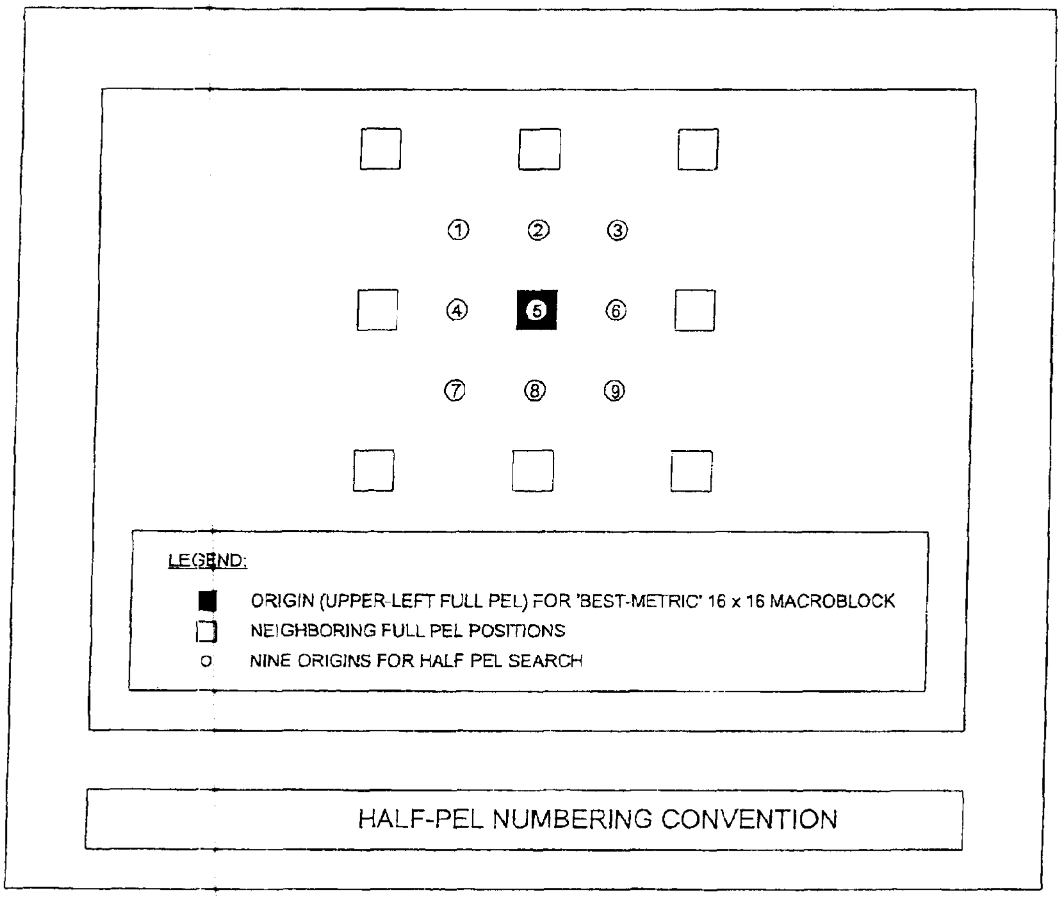
FIG. 128 shows a half-PEL numbering convention according to an embodiment of the invention.
Figure 129:
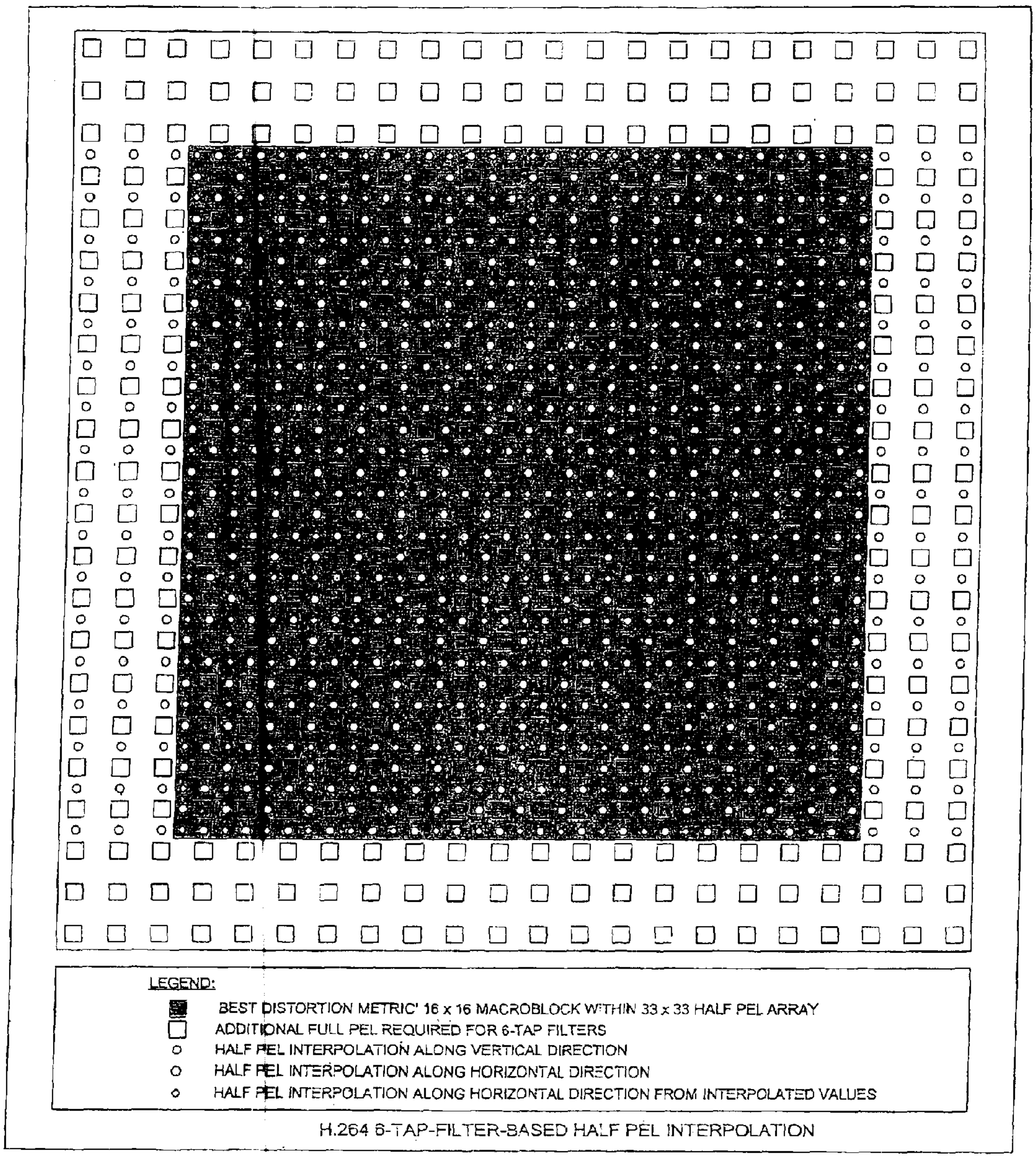
FIG. 129 shows a process of h.264 six-tap-filter-based half PEL interpolation according to an embodiment of the invention.
Figure 130:
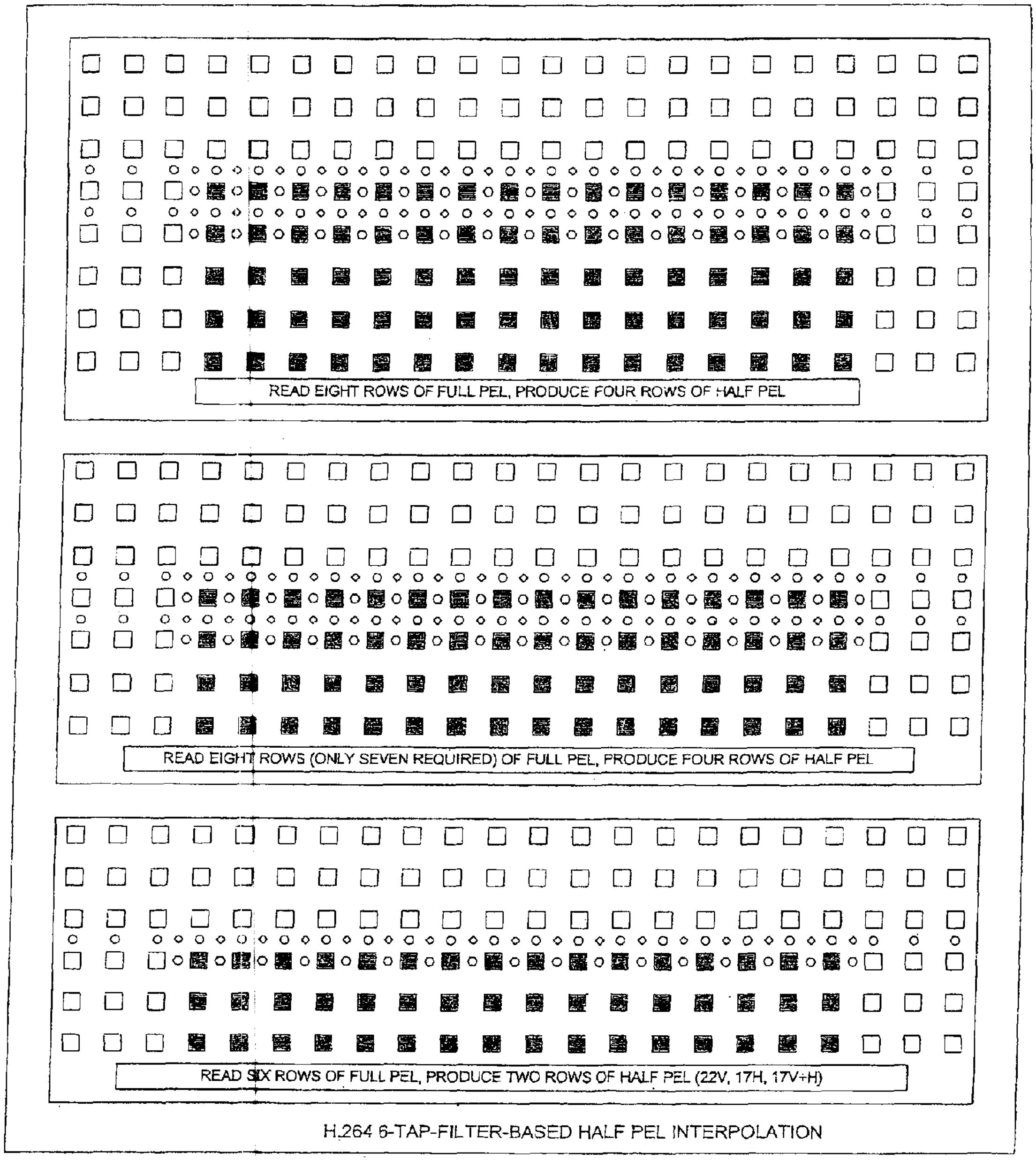
FIG. 130 shows a process of h.264 half PEL interpolation based on a six tap filter according to an embodiment of the invention.

Half PEL Search: After performing bilinear interpolation, the DVN calculates a SAD metric for each of the nine candidate half PEL positions. A numbering convention for the half PEL data is shown in FIG. 128. Note from the figure that the metric for the full PEL position (position '5') has already been calculated. Therefore, half PEL search consists of generating the SAD metrics for each of the other eight half PEL positions to determine which of the nine candidates has the best metric.

Output the Results: Output the best metric and the origin of the associated 16×16 macroblock within the 33×33 half PEL array to the specified node. Output the 16×16 macroblock itself to the decoder's motion compensation engine.

DVN Summary of Operation: The DVN includes the QST Node Wrapper, eight 2 KB node memories (each organized as 512 words by 32 bits), and a motion estimation engine (ME). The ME performs full PEL search, bilinear interpolation, and half PEL search as outlined above. It outputs the best metric and the origin of the associated 16×16 macroblock to the specified node; and it outputs the 16×16 macroblock itself to the decoder's motion compensation engine.

Each of eight node memories is partitioned into a ping pong buffer pair to allow fully overlapped data input and computation/results output. After one data set has been transferred from the specified memory to the eight DVN memories, the DVN ME performs its calculations and outputs its results. During this time, the next data sais transferred from another system memory to the eight DVN memories. And so on.

Each data set consists of a 48×48 PEL array (reference block) and a 16×16 PEL array (current block). These data are distributed among the eight node memories in a manner that optimizes the ME's access to the data. Generally, this includes access to four bytes of data from each of eight node memories every clock period. This allows sixteen SAD operations to be performed each clock period during 'fast search' mode, where one 16×16 search position is evaluated at a time. Additionally, for 'forty concurrent search positions' mode, it allows access to data from four rows of the reference block and data from four rows of the current block every clack period.

Node Memory Access Summary: Each data set is transferred from the specified memory to the eight DVN node memories via the matrix interconnect network (MIN) of the Adaptive Computing Machine (ACM) architecture, controlled by the specified node. For the 48×48 PEL reference block: Rows 0, 4, 8, . . . , 44 are written into sequential locations within node memory one; Rows 1, 5, 9, . . . , 45 are written into sequential locations within node memory two; Rows 2, 6, 10, . . . , 46 are written into sequential locations within node memory three; and Rows 3, 7, 11, . . . , 47 are written into sequential locations within node memory four. For the 16×16 PEL current block: Rows 0, 4, 8, and 12 are written into node memories one and five; Rows 1, 5, 9, and 13 are written into node memories two and six; Rows 2, 6, 10, and 14 are written into node memories three and seven; and Rows 3, 7, 11, and 15 are written into node memories four and eight.

During full PEL search, the ME reads reference block data from memories one through four, and it reads current block data from memories five through eight. During bilinear interpolation, the ME reads full PEL reference block data from memories one through four, and it writes reference block half PEL interpolated data into memories five through eight. During half PEL search, the ME reads reference block half PEL interpolated data from memories five through eight, and it reads current block data from memories one through four. Finally, to output the 16×16 macroblock to the decoder's motion compensation engine, the ME reads from memories five through eight and writes to the MIN.

Node Memory Organization (during data input to the node memories): For node memories one through four, reference block data will be stored sequentially at locations 0x00 to 0x8F; current block data will be stored sequentially at locations 0xC0 to 0xCF. For node memories five through eight, current block data will be stored sequentially at locations 0xC0 to 0xCF.

Node Memory Organization (during bilinear interpolation): For node memories five through eight, half PEL data for candidate position 1(7) will be stored sequentially at locations 0x00 to 0x10. Half PEL data for candidate position 2 (8) will be stored sequentially at locations 0x20 to 0x30. Half PEL data for candidate position 3 (9) will be stored sequentially at locations 0x40 to 0x50. Half PEL data for candidate position 4 will be stored sequentially at locations 0x80 to 0x8F. Half PEL data for candidate position 5 will be stored sequentially at locations 0x90 to 0x9F. Half PEL data for candidate position 6 will be stored sequentially at locations 0xA0 to 0xAF.

DVN Programming Model: All configuration and control information for the DVN will reside in its TPL. Conditional operation will employ a suitable number of the wrapper's 64 counters and a suitable data structure for the search queue. A suitable number end nature of the hardwired search patterns for both full PEL search modes can be used.

Future DVN capabilities can, for example, include but are not limited to: increased SAD strength for faster full PEL search; ¼ PEL processing; and bicubic interpolation.

Figure 131:
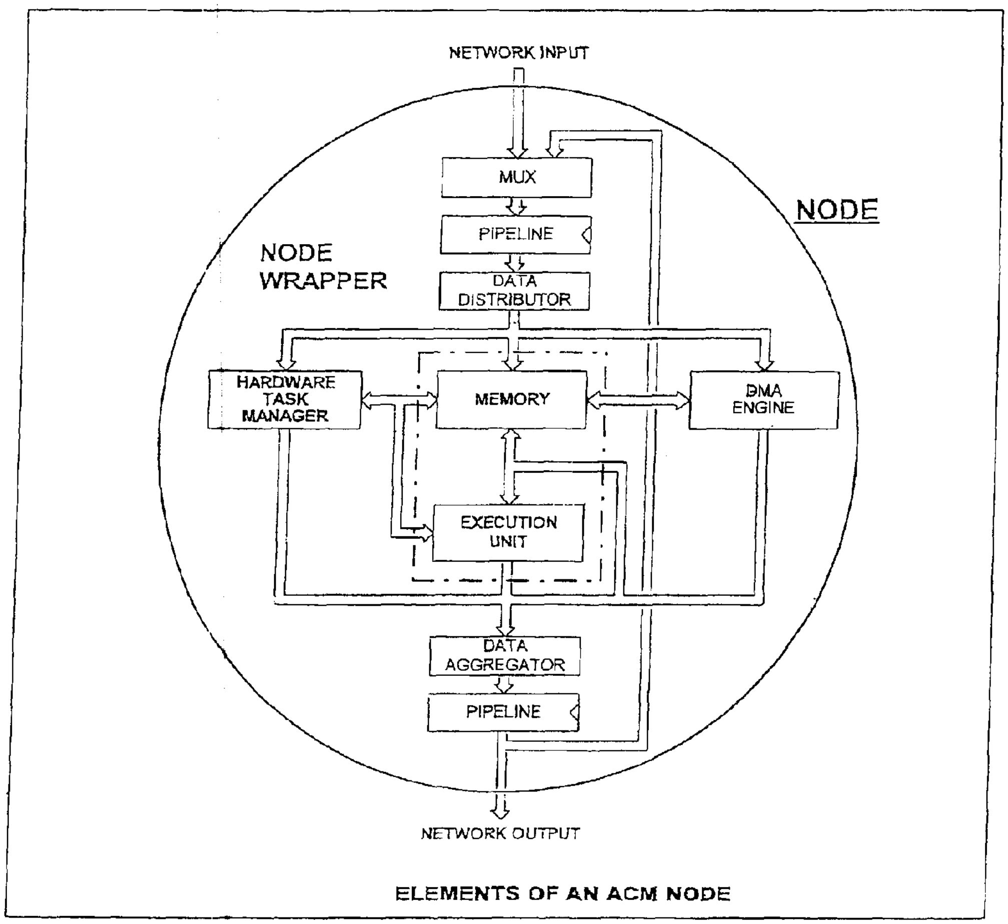
FIG. 131 shows some of the elements of an adaptive computing machine (ACM) node according to an embodiment of the invention.

The adaptive computing machine (ACM) includes heterogeneous nodes that are connected by a homogeneous network. Each node includes three elements: wrapper memory, and execution unit as shown in FIG. 131.

The domain video node (DVN) is a reconfigurable digital video processor that achieves a power-area-performance metric comparable to application specific integrated circuits (ASIC), with the additional benefit of reconfigurability, enabling it to execute a number of commonly used motion estimation algorithms that might require multiple ASICs to achieve the same functionality.

Figure 132:
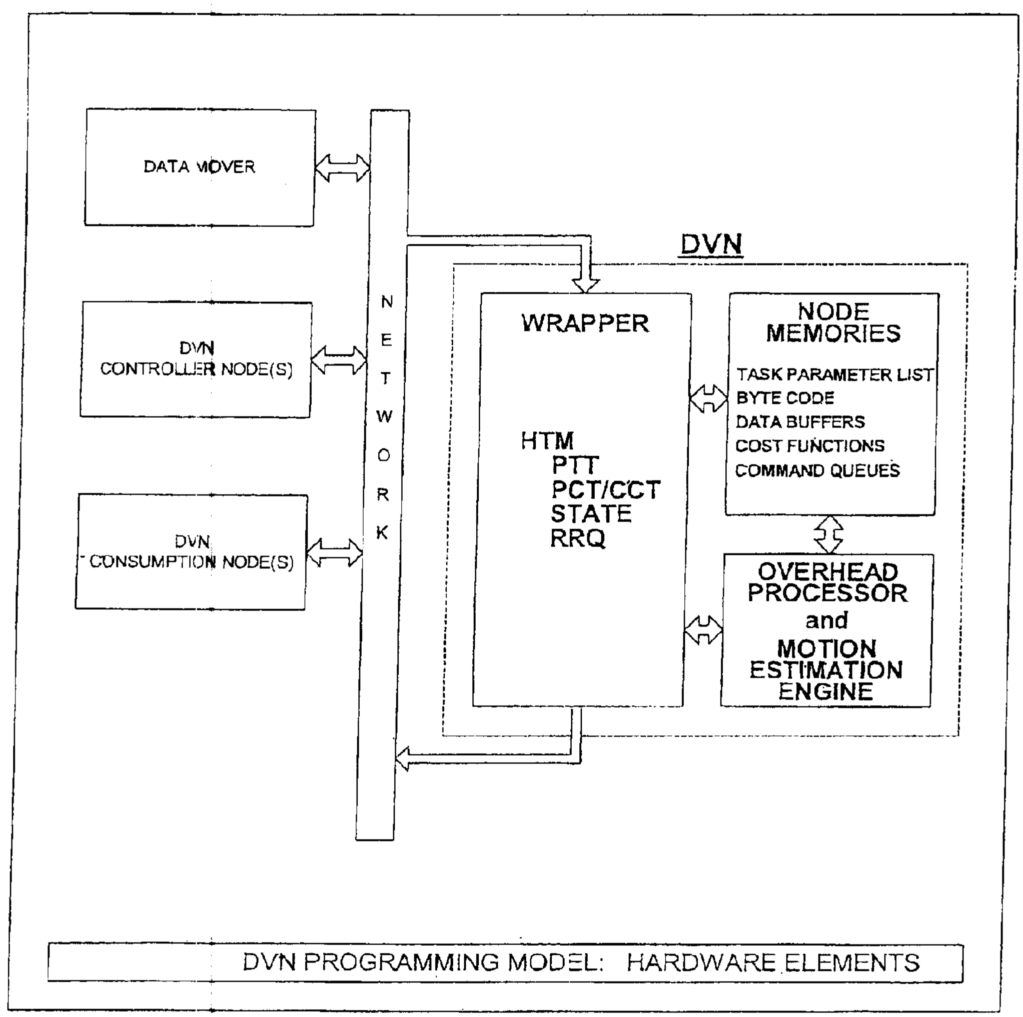
FIG. 132 shows some of the hardware elements within the domain video node (DVN) programming model according to an embodiment of the invention.

A block diagram that depicts the DVN programming environment is shown in FIG. 132. High level control of the DVN is provided by the hardware task manager (HTM) in the DVN node wrapper and a finite state machine (FSM) in the DVN EU. This interface includes the ACM-standard EU_RUN, EU_CONTINUE, and EU_TEARDOWN signals from the wrapper to the EU, and the ACK+TEST and EU_DONE responses from the EU to the wrapper.

The transition table for the FSM is shown in FIG. 133. The FSM assumes one of six states: Idle; Setup; Execute; ACK+TEST; Wait; or Continue. When the node is not enabled or the execution unit (EU) is not enabled, the FSM will enter, and remain in, its idle state. The FSM will also transition to its idle state whenever the node wrapper asserts the 'eu_abort' signal. Additionally, the FSM transitions to the idle state when it exits the wait state in response to the node wrapper's assertion of the 'eu_teardown' signal.

A typical operational sequence for the FSM will include the following transitions:

- Idle to setup in response to the node wrapper's assertion of the 'eu_run' signal: During setup, byte code controls the initialization of the eu, loading its configuration registers with parameters stored in a 'task parameter list' (TPL) located in node memory.
- Setup to execute in response to the 'done' setup byte code. During execute, this eu processes instructions from a command queue to perform the motion estimation operations of full PEL search, fractional PEL interpolation, fractional PEL search, macroblock signed differences, and the outputting of results.

Execute to ACK+TEST when the DONE instruction is read from the command queue. During ACK+TEST, acknowledgements are sent to the network to it how much data was produced and consumed during the motion estimation phase. Typically, the final acknowledgement will include the 'test' indication to query the node wrapper's hardware task manager (HTM): ? what's next ?

ACK+TEST to wait in response to ACK+TEST byte code: ACK+TEST. The FSM remains in its wait state until it receives its ? what's next ? response from the node wrapper.

Wait to idle in response to the node wrapper's assertion of the 'eu_teardown' signal. FSM asserts 'eu_done'.

Wait to continue in response to the node wrapper's assertion of the 'eu_continue' signal. During continue, byte code controls the reloading of certain eu registers with parameters from the TPL located in node memory.

Continue to execute in response to continue 'done' byte.

The above sequence returns control of the FSM to the node wrapper's HTM after ACK+TEST. The DVN also can be programmed to retain control after 'ack-ing'. Options include conditional/unconditional state transitions to continue or idle (after asserting 'eu_done'). Test conditions include the sign (msb) of any of the node wrapper's 64 counters, the sign (msb) of certain TPL entries, and the sign (msb) of a byte code controlled 5-bit down counter.

All of the information required for task execution is contained in a 'task parameter list' (TPL) located in node memory. During setup, DVN hardware retrieves from its node memory a pointer to the TPL. Pointers for up to 31 tasks are stored in 31 consecutive words in node memory at a location specified by the node wrapper signals {tpt_br[8:0], active_task[4:0]}.

Each DVN TPL is assigned 64 longwords of node memory. The first eight entries of the TPL are reserved for specific information. The remaining 56 longwords are available to store parameters for setup, ACK+TEST, and continue.

TPL location 0x00 contains two parameters for setup: the starting address in node memory for its byte code and the offset from the TPL pointer to its parameters. TPL location 0x01 contains two parameters for ACK+TEST: the starting address in node memory for its byte code and the offset from the TPL pointer to its parameters. TPL location 0x02 contains one parameter for teardown: the starting address in node memory for its byte code. (Currently, there is nothing to 'teardown', so this is a placeholder in the event that there is a requirement later on). TPL location 0x03 contains three parameters for continue: the starting address in node memory for its byte code and the offsets from the TPL pointer to its two sets of parameters. TPL locations 0x04 and 0x05 are used for a pair of semaphores that the byte code can manipulate; and locations 0x06 and 0x07 are reserved. TPL locations 0x08 through 0x3F are available for storing all other task parameters.

Figure 134:
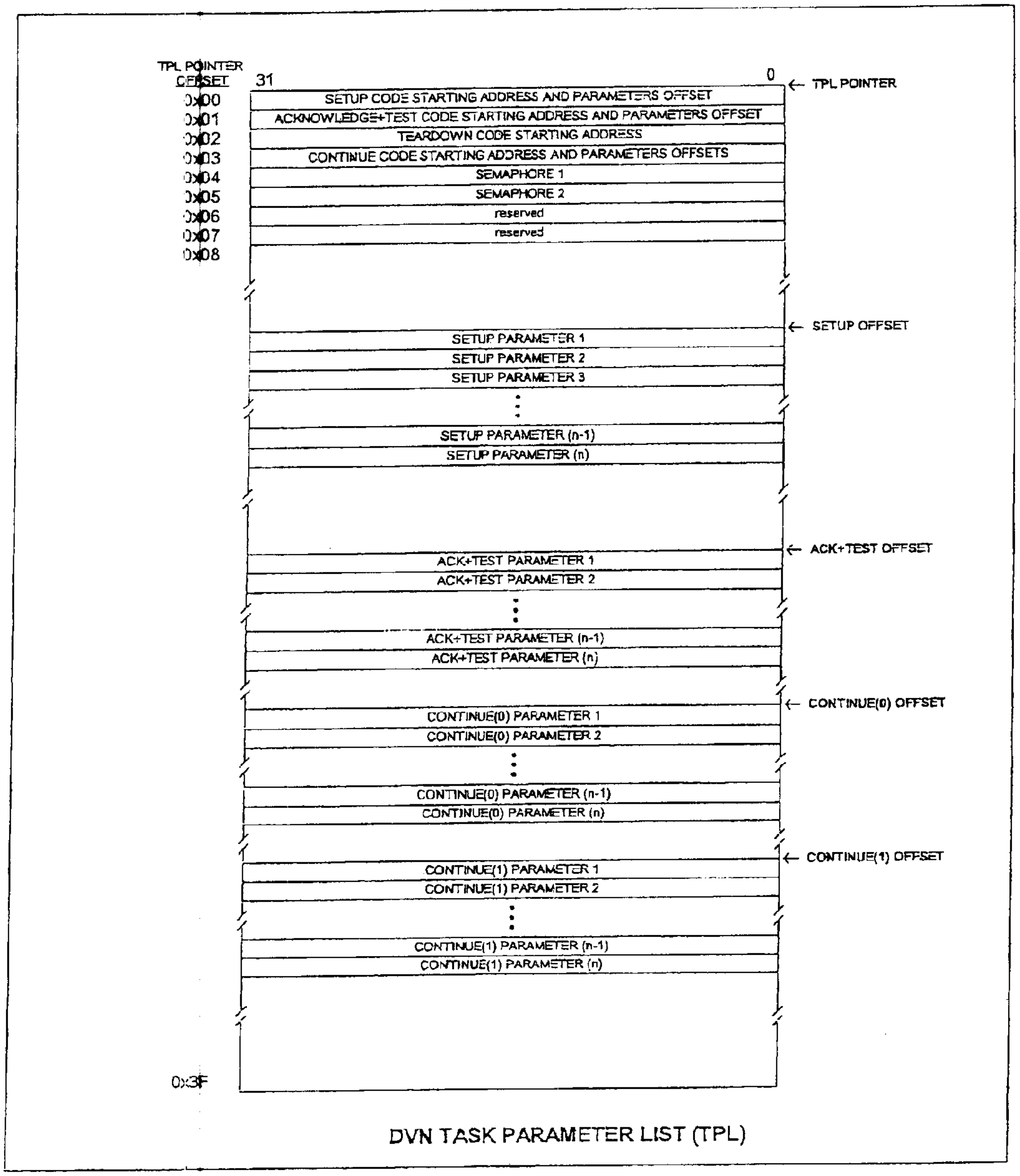
FIG. 134 shows a task parameter list (TPL) for a DVN according to an embodiment of the invention.

The layout for the DVN task parameter list is shown in FIG. 134. The TPL stores sets of parameters for each of three states: setup, ACK+TEST, and continue. For the continue state, there can be two sets of parameters, with each set having the same number of parameters but different TPL pointer offsets. This allows for the conditional selection between one-of-two sets of global parameters, such as consumer node(s) destination, fractional PEL interpolation filters, and so on. The set of parameters for a specific state must be stored in consecutive locations in the TPL. As byte code LOAD instructions execute, the DVN hardware selects the next parameter in the set. The offset from the TPL pointer to the location of the first parameter for that state must be in the range: 0x08 to 0x3F.

Figure 135:
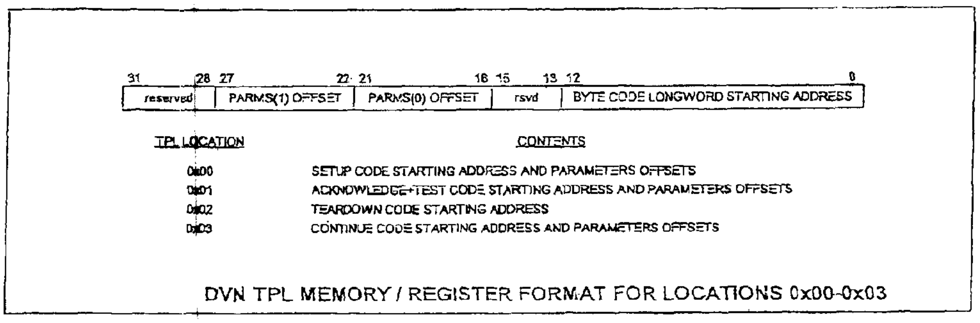
FIG. 135 shows a format for locations 0x00 to 0x03 within a TPL according to an embodiment of the invention.
Figure 136:
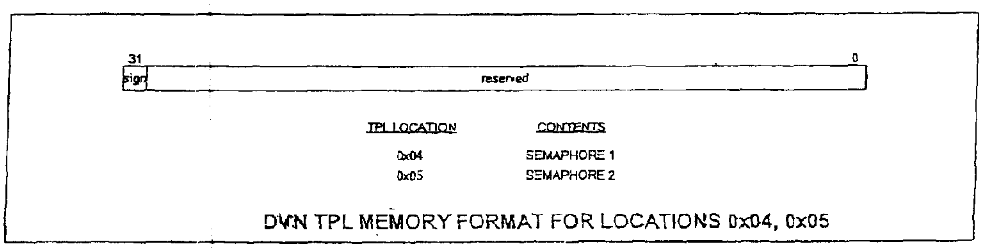
FIG. 136 shows a format for locations 0x04 and 0x05 within a TPL according to an embodiment of the invention.
Figure 137:
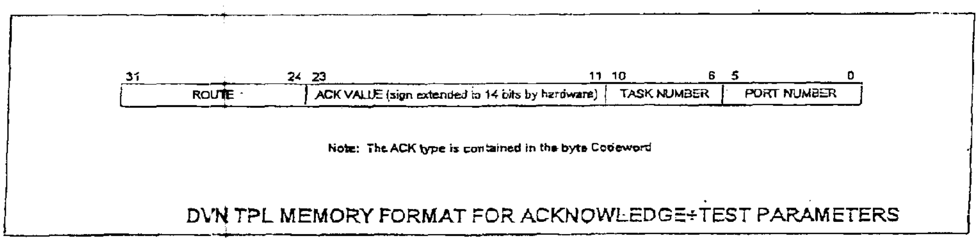
FIG. 137 shows a format for acknowledge+test parameters within a TPL according to an embodiment of the invention.
Figure 138:
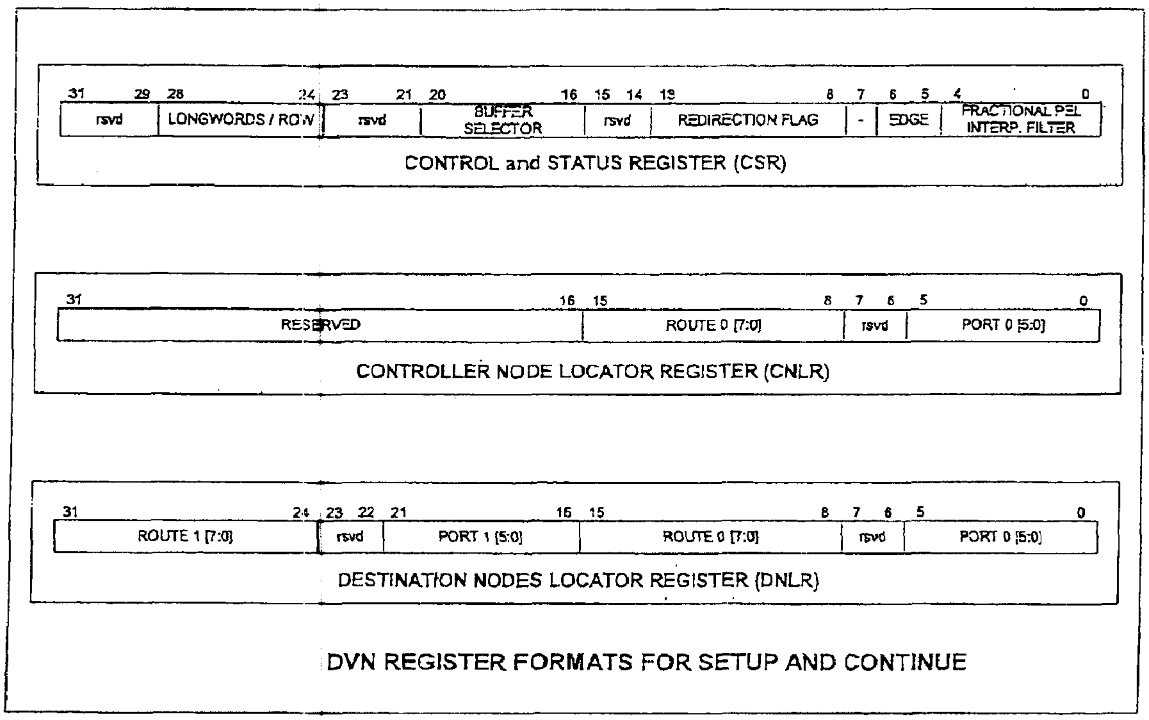
FIG. 138 shows a format for setup and continue registers according to an embodiment of the invention.

DVN TPL Memory/Register Formats: The format for TPL locations 0x00 through 0x03 that contain byte code starting addresses and TPL pointer offsets is shown in FIG. 135. The format for the two semaphores at TPL locations 0x04 and 0x05 is shown in FIG. 136. The format for the ACK+TEST parameters beginning at TPL location (TPL pointer plus ACK+TEST offset) is shown in FIG. 137. The formats for the registers that are loaded with TPL parameters during setup and continue are shown in FIG. 138.

Control and Status Register (CSR): The DVN CSR includes fields which specify which interpolation filters to use, how to interpolate at reference block edges, which of 64 flags indicates 'command queue redirection', which ping/pong buffer pairs to use, and, for the reference block, the number of longwords per row.

Tables 1 and 2 describe bits [6:5] and bits [4:0].

TABLE 1

Fractional PEL Interpolation Filter Selection Bits [4:0]

| Bit 4 3 2 1 0 | Filter |
|---|---|
| 0 0 0 0 1 | Bilinear Interpolation |
| 0 0 0 1 0 | MPEG4 |
| 0 0 1 0 0 | H.264 |
| 0 1 0 0 0 | WMV |
| 1 0 0 0 0 | Reserved |

TABLE 2

Interpolation Method at Reference Block Edges Bits [6:5]

| Bit 6 5 | Method |
|---|---|
| 0 0 | All required PEL are in DVN node memory |
| 0 1 | Mirror |
| 1 0 | Replicate |
| 1 1 | Reserved |

Bits [13:8] are the command queue redirection flag. Always while processing a command queue, the DVN monitors continuously one of 64 wrapper counter sign bits indicated by bits [13:8]. When the counter sign bit is set to 1 'b1, The DVN will clear the bit, send the 'switch' indication to the controller, suspend processing from command queue (A/B), and resume processing from command queue (B/A).

Bits [20:16] are buffer selectors. Each of the five bits selects between a pair of ping/pong buffers. Bit16 is the 'Reference Block Buffer Selection,' where 0 selects reference block A; and 1 selects reference Block B. Bit17 is the 'Current Block Buffer Selection,' where 0 selects current Block A; and 1 selects current block B. Bit18 is the 'Command Queue Buffer Selection,' where 0 selects command queue A; and 1 selects command queue B. Bit19 is the 'Horizontal Cost Function Buffer Selection' where 0 selects horizontal cost function table A; and 1 selects horizontal cost function table B. Bit20 is the 'Vertical Cost Function Buffer Selection,' where 0 selects vertical cost function table A; and 1 selects vertical cost function table B.

Bits [28:24] are the 'Reference Block Longwords per Row.' The number of longwords comprising a reference block row is required by the node memory addressing unit to support strides from row (k) to row (k+4).

Controller Node Locator Register (CNLR): The DVN communicates with its controller using the PTP protocol, which requires a port number (i.e. bits [5:0]) and a node id (i.e. bits [15:8]).

Destination Nodes Locator Register (DNLR): When processing command queue instructions that include output to destination (consumer) nodes, the DVN will use its one bit logical output port field to select one of two destination nodes: When the bit is set to 1 'b0, its output will be directed to node id (i.e. bits(15:8]), port number (i.e. bits [5:0]); and when the bit is set to "b1, its output will be directed to node id (i.e. bits [31:24]), port number (i.e. bits [21:16]).

Figure 139:
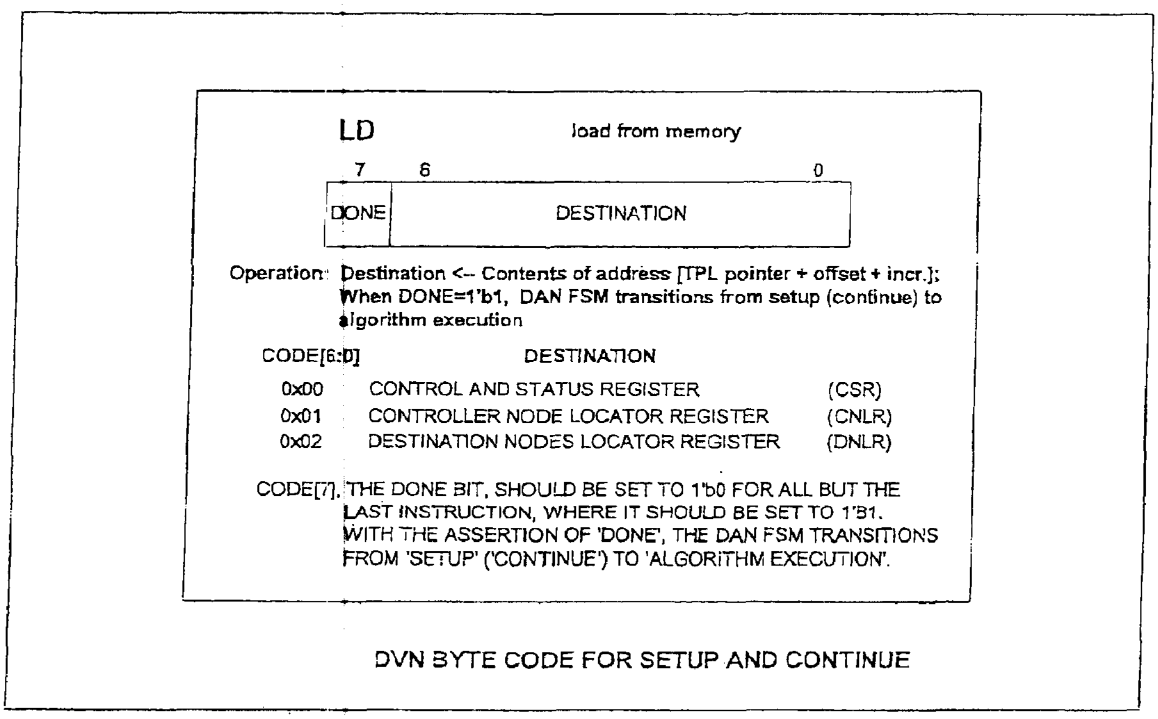
FIG. 139 shows a format for setup and continue byte codes according to an embodiment of the invention.
Figure 140D:
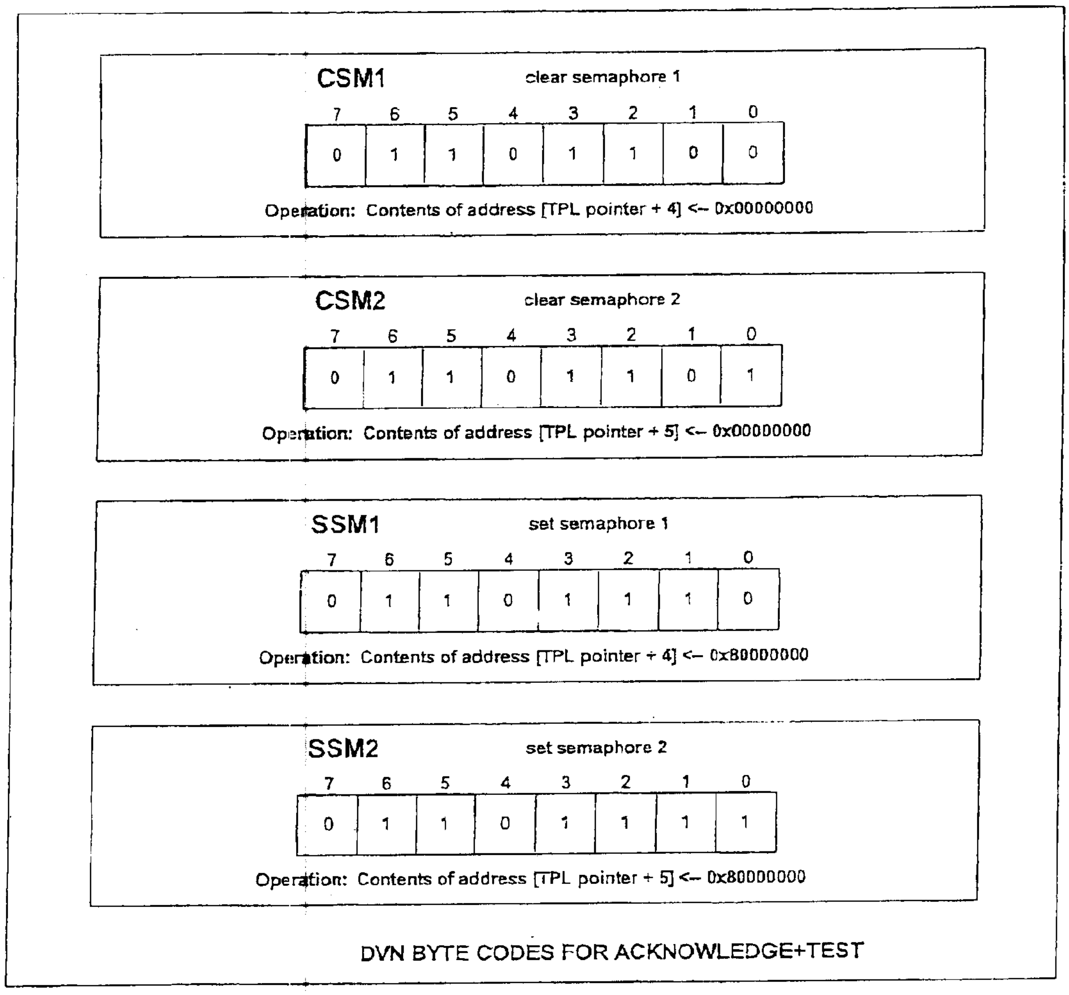

DVN Byte Codes: The DVN overhead processor (OHP) interprets two distinct Sets of byte codes: one for setup and continue and another for ACK+TEST. The FSM state indicates which set should be used by the byte code interpreter. For setup and continue, there is only one byte code: LOAD as shown in FIG. 139. There is a more comprehensive set of byte codes for ACK+TEST. These are summarized in FIGS. 140A through 140E. ACK+TEST byte codes 0x80 through 0xFF are reserved, and may be treated as NOPs, or 'no operation.

For the DVN, one of the programming steps requires writing byte code and generating task parameter lists. Byte code is always executed 'in line', and byte code must start on longword boundaries. Byte code execution is 'little endian'; that is, the first byte code that will be executed is byte[7:0] of the first longword, then byte[15:8], then byte[23:16], then byte[31:24], then byte[7:0] of the second longword, and so on.

TPL/Byte Code Programming Example: The task parameter list and byte code for a 'typical' task are shown in FIG. 141. The TPL consists of 21 longwords, and there are 5 longwords of byte code. Setup requires three clock cycles to load registers, from the TPL; DONE is indicated in the last of three cycles. ACK+TEST requires a minimum of ten clock cycles: two for producer acknowledgements, two for consumer acknowledgements, two (or more) to test (and wait, if necessary) for input buffer ready, two (or more) to test (and wait, if necessary) for output buffer ready, and two to test a counter sign to select one of two sets of configuration registers. Continue requires three clock cycles to update the CSR, CNLR, and DNLR configuration registers.

Command Queue Overview: The Programming Model for the DVN include the creation of sequences of instructions that are stored in command queues in DVN node memory. These instructions control the motion estimation operations of full PEL search, fractional PEL interpolation, fractional PEL search, (perhaps macroblock signed differences) and the outputting of results.

Figure 142:
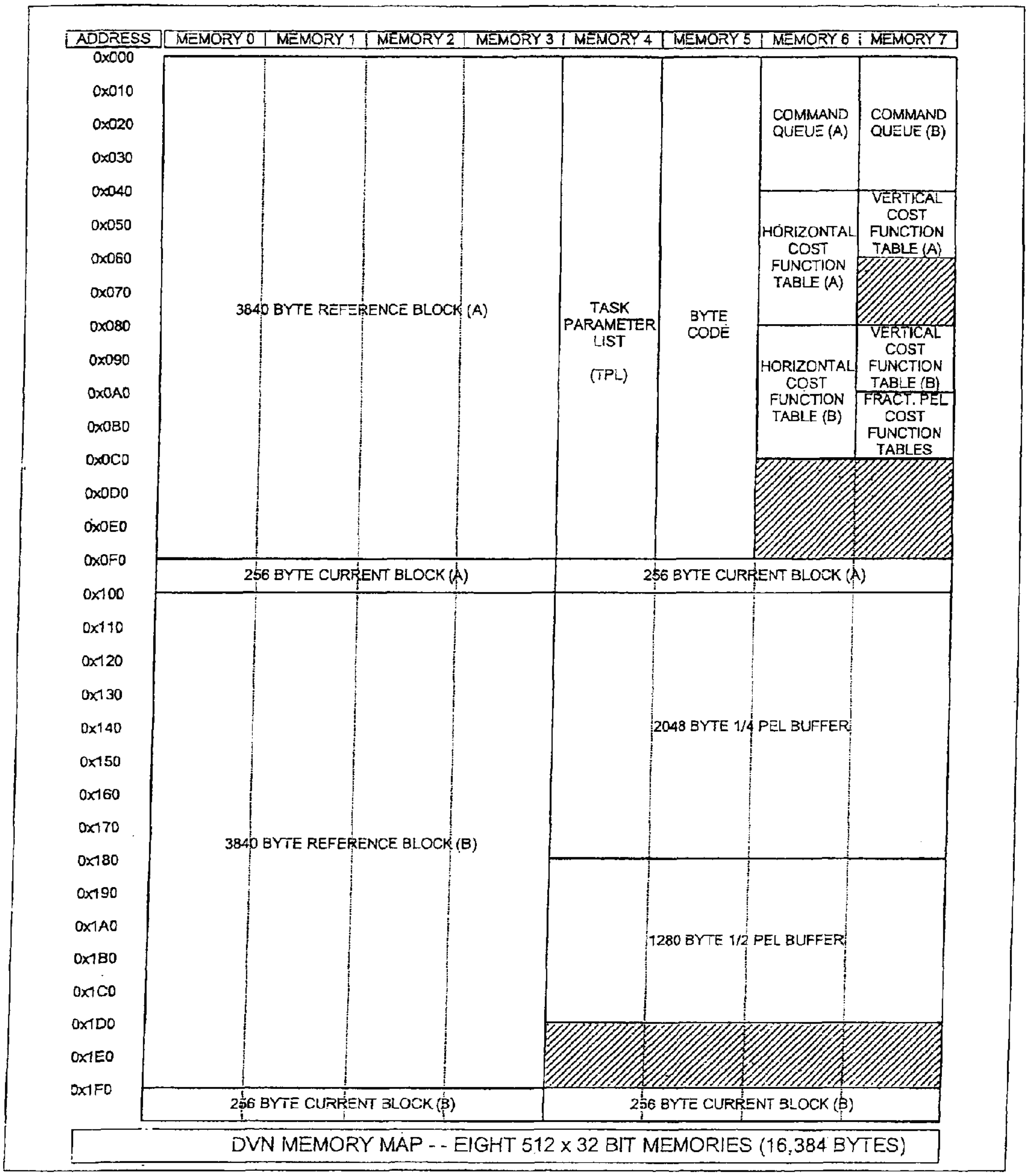
FIG. 142 shows a memory map, according to an embodiment of the invention, for a DVN memory organized as eight banks having 512 words of 32 bits.

The DVN memory map is shown in FIG. 142. For the processing of each macroblock, the DVN will be directed by an entry in its task parameter list (TPL) to fetch its instructions from one of two buffers in its node memory: Command Queue A; or Command Queue B. The data structures for the two will be identical. The intent is to store a fixed set of instructions in one (or both) static command queue(s), or to construct an interactive sequence of commands in one (or both) dynamic command queue(s), and to select between the two buffers on a macroblock-by-macroblock basis. Including a second command queue allows for terminating one sequence of instructions and continuing with a new sequence of instructions, while preserving the entire previous sequence of instructions for subsequent reuse.

Each of the two command queues will be transferred to DVN node memory using the standard ACM PTP (or DMA) protocols (consuming one or two of the available 32 input ports). Command Queue A will consist of 64 longwords (32 bits per longword) in node memory six, locations 0x00 to 0x3F, and Command Queue B will consist of 64 longwords in node memory seven, locations 0x00 to 0x3F.

The DVN controller node initializes Command Queue A (CQA) by writing 0x6C00 into the DVN wrapper port translation table (PTT) at the location corresponding to the assigned DVN input port number. This sets the CQA buffer to a size of 256 bytes (64 longwords) with a starting address of 'memory=6, physical address=0x000'. The initialization value for Command Queue B (CQB)=0x6E00, 'memory=7, physical address=0x000'. The controller loads CQA and CQB, 64-longword circular buffers, using PTP writes. It re-initializes the buffers by rewriting 0x6C00/0x6E00 into the appropriate locations in the DVN PTT. The DVN fetches CQA/CQB instructions using a 6-bit counter (initialized to zero).

Figure 143:
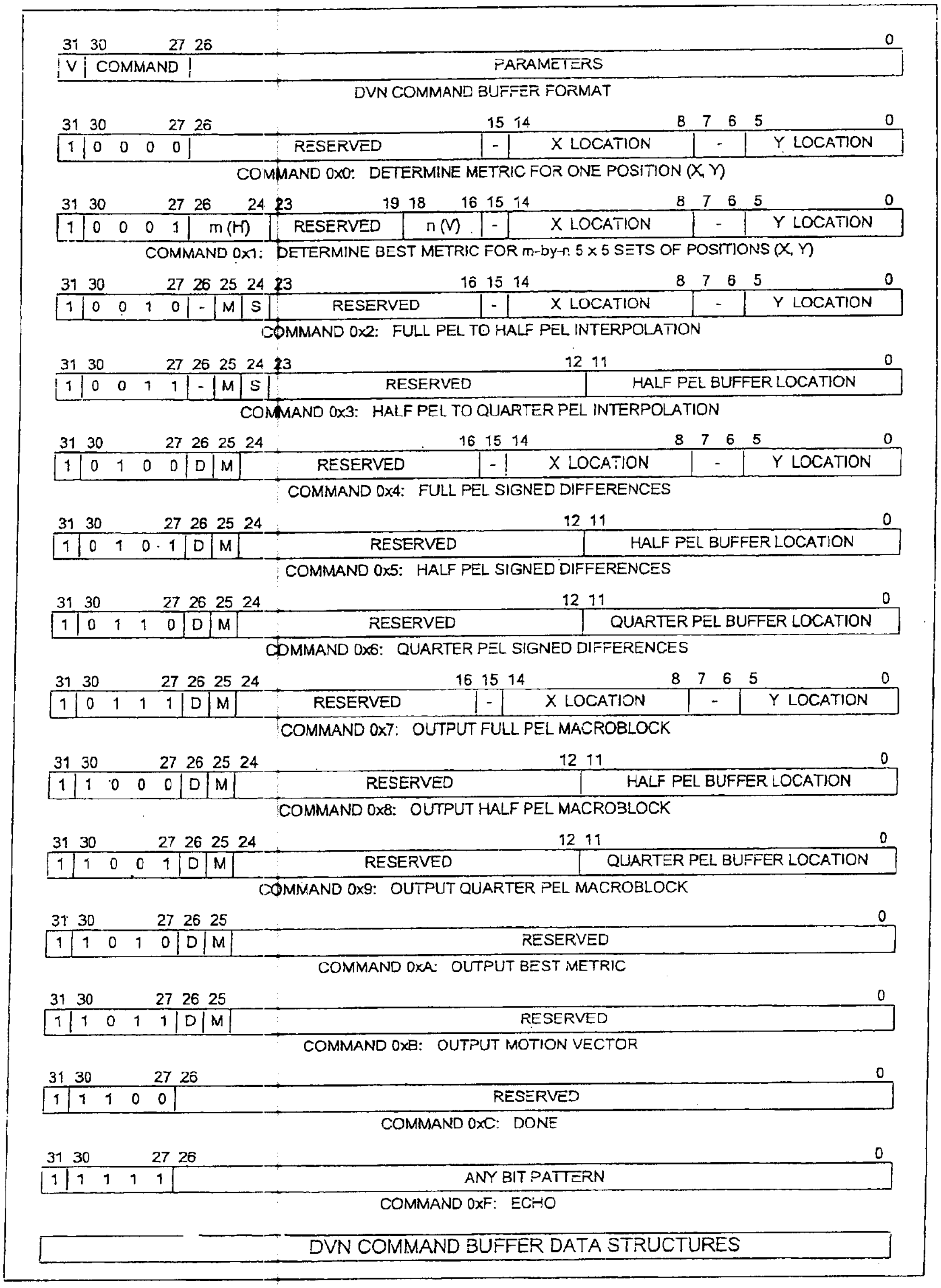
FIG. 143 shows formats for command buffer data structures according to an embodiment of the invention.

The data structure for the command queues is shown in FIG. 143. Bit 31 is used to indicate a 'valid' instruction, and it must be set to 1 'b1 in every instruction that the controller writes into the buffer. When the DVN reads a queue entry with bit 31 set to 1' b0, it will stall until that bit has been set to 1 'b1 or until it is redirected.

While processing an instruction sequence fetched from CQA/CQB, the controller can command the DVN to: 1) terminate its processing of instructions from one queue; 2) clear its pointer to the other queue; or 3) resume its processing from location zero of the other queue. This 'switch' command from the controller to the DVN utilizes one of 64 counter signs in the DVN node wrapper. The controller writes the appropriate PCT/CCT counter with the msb set to 1 'b1. (We assume here that the bit had previously been initialized to 1 'b0). The DVN continuously monitors this bit while processing. At DVN task setup, a six bit register is loaded from the TPL to select the appropriate one-of-64 counter signs to monitor. As part of its 'switch' routine, the DVN will clear this bit by sending the 'self-ack, initialize counter' MIN word, and it will send the 'switch complete' message to the controller (See FIG. 144).

Description of the DVN Command Queue Data Structures: The data structures used in the command queue of the DVN are described below with reference to FIG. 143.

Evaluate the Metric for a Single 16×16 Macroblock—Command 0x0: Determine metric for one position (X, Y), where 0,0 indicates the upper left PEL of the reference block; X is a positive integer in the range of 0 to 79, and Y is a positive integer in the range of 0 to 49. These positive integers indicate the displacements from the upper left PEL. The DVN performs the evaluation of the metric: SAD256 plus horizontal cost function plus vertical cost function. The cost functions are stored in node memory.

Determine Best Metric for One or More Sets of 5×5 Positions—Command 0x1: Determine the best metric from m(H)-by-n(V) 5×5 sets of positions starting at position (X, Y). X is a positive integer in the range of 0 to 79, and Y is a positive integer in the range of 0 to 49. m is a positive integer in the range of 1 through 16; n is a positive integer in the range of 1 through 10 (See FIG. 145).

Half PEL Interpolation—Command 0x2: For a 16×16 macroblock, perform full PEL to half PEL interpolation. Bit [24] is 'Evaluate': 0 means interpolate only; and 1 means interpolate and evaluate eight (nine) half PEL 16×16 macroblocks. Bit [25] is 'Mode': 0 means use 'best metric' vector to select macroblock; and 1 means use (X, Y) reference, i.e. bits [14:8] and bits [5:0], to select the macroblock.

Quarter PEL Interpolation—Command 0x3: Perform quarter PEL interpolation. Bit [24] is 'Evaluate': 0 means interpolate only; and 1 means interpolate and evaluate eight (nine) quarter PEL 16×16 macroblocks. Bit [25] is 'Mode': 0 means use 'best metric' vector from half PEL search to select the macroblock; and 1 means use half PEL buffer location, i.e. bits [11:0], to select the macroblock.

Full PEL Signed Difference—Command 0x4: Perform the signed difference between the 16×16 current block and a 16×16 full PEL macroblock selected from the reference block. Output to the selected destination the 256 values as 16-bit 2's complement integers in the range −255 to 255 packed in 128 longwords. Bit [25] is 'Mode': 0 means use 'best metric' vector from full PEL search to select the macroblock; and 1 means use (X, Y) reference, i.e. bits [14:8] and bits [5:0], to select macroblock. Bit [26] is 'Destination,' which selects from one of two logical output ports. For each port, the TPL contains the associated routing, input port number, and memory mode indication for the selected destination.

Half PEL Signed Difference—Command 0x5: Perform the signed difference between the 16×16 current block and a 16×16 half PEL macroblock selected from the half PEL buffer. Output to the selected destination the 256 values as 16-bit 2's complement integers in the range −255 to 255 packed in 128 longwords. Bit [25] is 'Mode': 0 means use 'best metric' vector from half PEL search to select the macroblock; and 1 means use the half PEL buffer location, i.e. bits [11:0] to select the macroblock. Bit [26] is 'Destination,' which selects from one of two logical output ports. For each one, the TPL contains the associated routing, input port number, and memory mode indication for the selected destination.

Quarter PEL Signed Difference—Command 0x6: Perform the signed difference between the 16×16 current block and a 16×16 quarter PEL macroblock selected from the quarter PEL buffer. Output to the selected destination the 256 values as 16-bit 2's complement integers in the range −255 to 255 packed in 128 longwords. Bit [25] is 'Mode': 0 means use 'best metric' vector from quarter PEL search to select the macroblock; and 1 means use the half PEL buffer location, i.e. bits [11:0] to select the macroblock. Bit [26] is 'Destination,' which selects from one of two logical output ports. For each one, the TPL contains the associated routing, input port number, and memory mode indication for the selected destination.

Output a Full PEL 16×16 Macroblock—Command 0x7: Transfer the selected full PEL 16×16 macroblock from the reference block in DVN node memory to the indicated destination. Bit [25] is 'Mode': 0 means use 'best metric' vector from full PEL search to select the macroblock; and 1 means use the (X,Y) reference, i.e. bits [14:8] and bits [5:0], to select the macroblock. Bit [26] is 'Destination,' which selects from one of two logical output ports. For each one, the TPL contains the associated routing, input port number, and memory mode indication for the selected destination.

Output a Full PEL 16×16 Macroblock—Command 0x7: Transfer the selected full PEL 16×16 macroblock from the reference block in DVN node memory to the indicated destination. Bit [25] is 'Mode': 0 means use 'best metric' vector from full PEL search to select the macroblock; and 1 means use the (X,Y) reference, i.e. bits [14:8] and bits [5:0], to select the macroblock. Bit [26] is 'Destination,' which selects from one of two logical output ports. For each one, the TPL contains the associated routing, input port number, and memory mode indication for the selected destination.

Output a Half PEL 16×16 Macroblock—Command 0x8: Transfer the selected half PEL 16×16 macroblock from the half PEL buffer in DVN node memory to the indicated destination. Bit [25] is 'Mode': 0 means use 'best metric' vector from the half PEL search to select the macroblock; and 1 means use the half PEL buffer location, i.e. bits [11:0] to select the macroblock. Bit [26] is 'Destination,' which selects from one of two logical output ports. For each one, the TPL contains the associated routing, input port number, and memory mode indication for the selected destination.

Output a Quarter PEL 16×16 Macroblock—Command 0x9: Transfer the selected quarter PEL 16×16 macroblock from the quarter PEL buffer in DVN node memory to the indicated destination. Bit [25] is 'Mode': 0 means use 'best metric' vector from the quarter PEL search to select the macroblock; and 1 means use the quarter PEL buffer location, i.e. bits [11:0] to select the macroblock. Bit [26] is 'Destination,' which selects from one of two logical output ports. For each one, the TPL contains the associated routing, input port number, and memory mode indication for the selected destination.

Output Best Metric—Command 0xA: Transfer the best metric (saturated unsigned 16 bit integer) to the indicated destination(s). Bit [25] is 'Mode': 0 means s end to controller only; and 1 means send to controller and send to indicated destination. Bit [26] is 'Destination,' which selects from one of two logical output ports. For each one, the TPL contains the associated routing, input port number, and memory mode indication for the selected destination.

Output Motion Vector—Command 0xB: Transfer the motion vector, with quarter PEL resolution, to the indicated destination(s). Bit [25] is 'Mode': 0 means s end to controller only; and 1 means send to controller and send to indicated destination. Bit [26] is 'Destination,' which selects from one of two logical output ports. For each one, the TPL contains the associated routing, input port number, and memory mode indication for the selected destination.

Done—Command 0xC: The DONE command indicates to the DVN that there is no additional processing to be performed for the 'current block'. After reading this command from the queue, the DVN will send the DONE status word to the controller; and the DVN FSM will transition to the ACK+TEST state.

Echo—Command 0xF: The ECHO command instructs the DVN to return a status word that is the command itself. This is intended to be a diagnostics aid.

Figure 144:
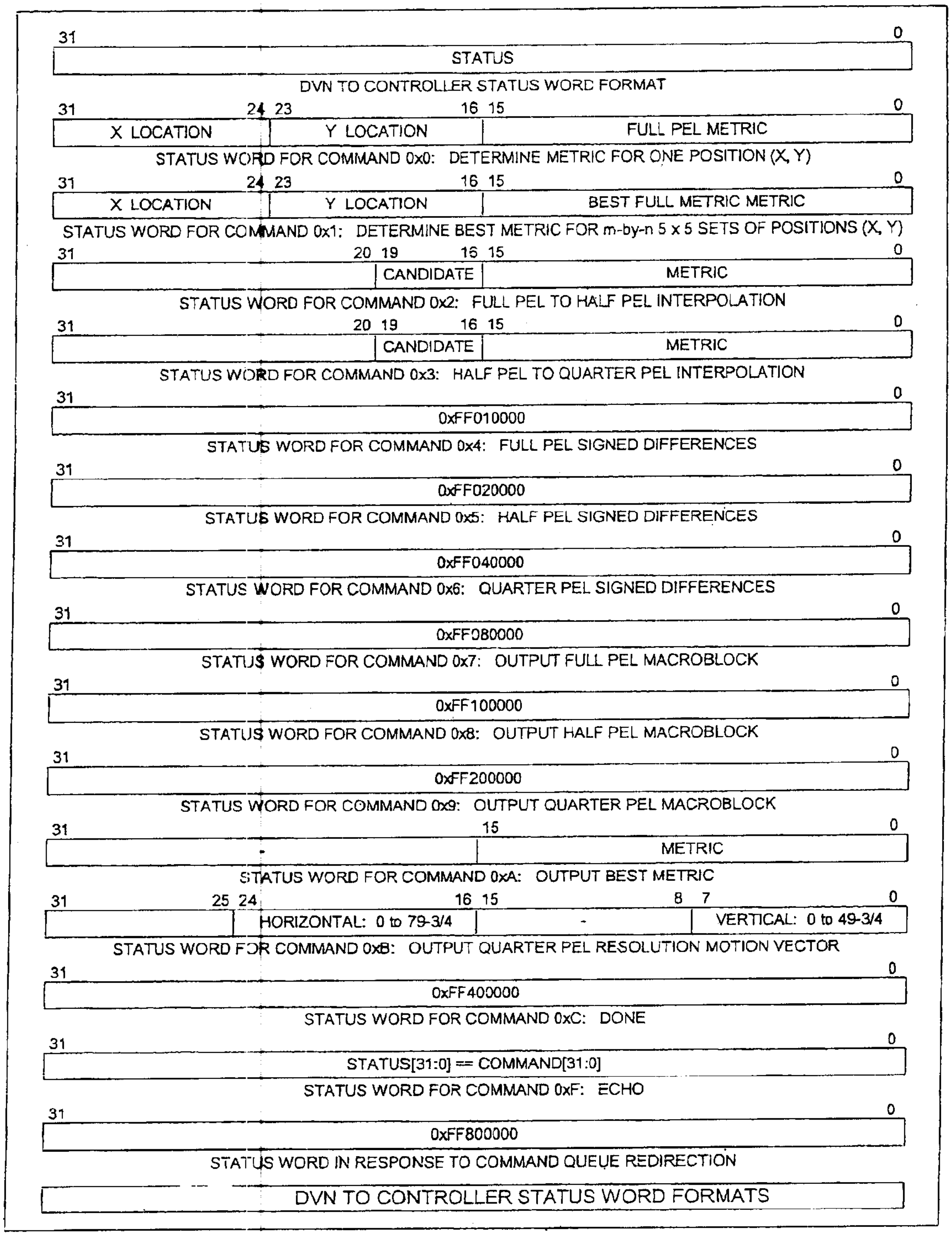
FIG. 144 shows formats for "to controller" status words according to an embodiment of the invention.

DVN to Controller Status Word: After the DVN executes each command, it will send a status word to the controller, using the ACM PTP protocol. The DVN TPL will contain the appropriate routing field, input port number, and memory mode indication that is required to support this operation. This information is transferred to the DVN CNLR during 'setup' and 'continue' operations. A summary of the status word is shown in FIG. 144.

Figure 160:
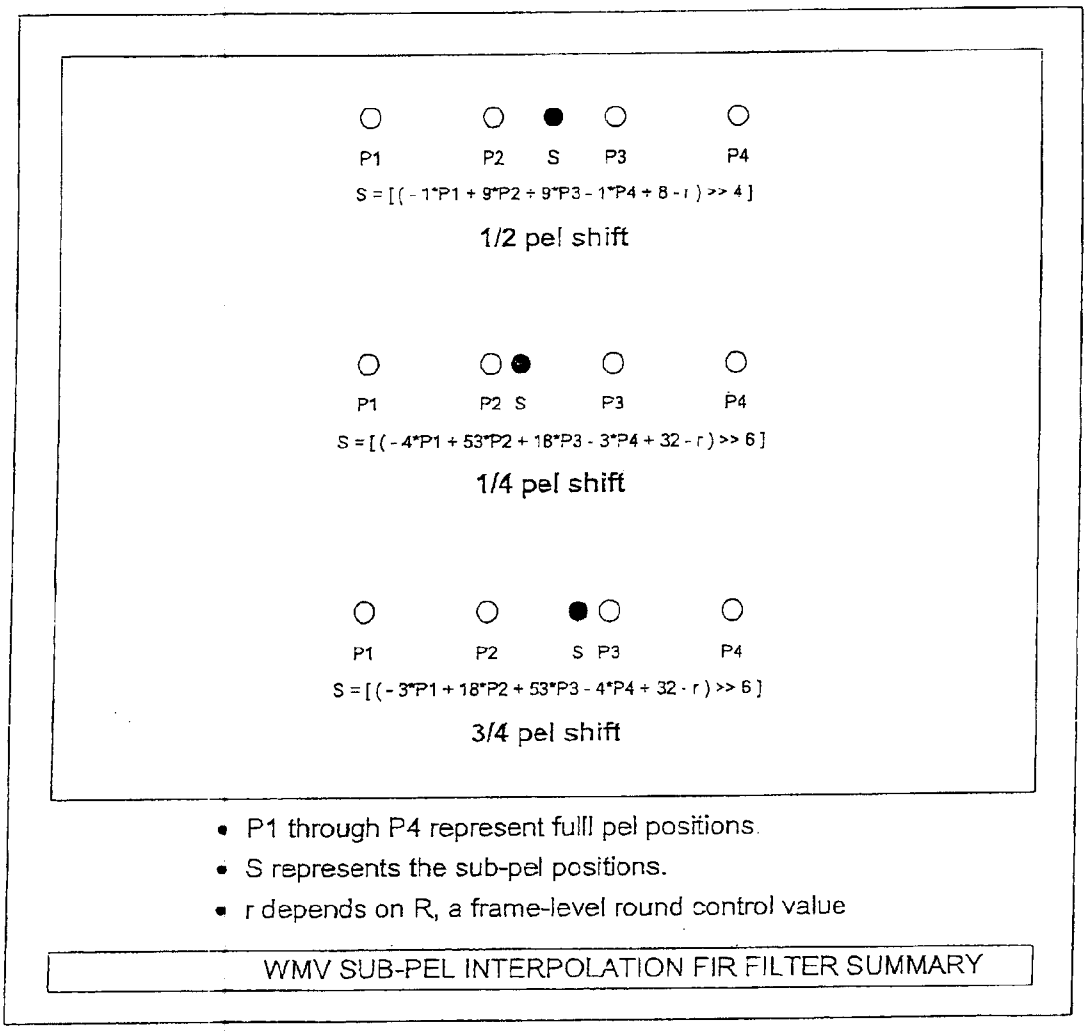
FIG. 160 shows a summary of a sub-PEL interpolation FIR filter for Microsoft Windows® media video (WMV) according to an embodiment of the invention.

For Commands 0x0 and 0x1, the status word includes the best full PEL metric thus far for this particular current block. It also includes the corresponding vector, in full PEL units with a range of 0 to 79 for the horizontal dimension and 0 to 49 for the vertical dimension. For Command 0x2, full PEL to half PEL interpolation, when bit [24] of the command is set to 1 'b1) (interpolate and evaluate), status word bits [15:0] indicate the value for the best half PEL metric, and bits [19:16] indicate with which of nine half PEL candidates the best metric is associated. (The half PEL numbering convention shown in FIG. 160 is used to code bits [19:16]). When bit [24] of the command is set to 1 'b0 (interpolate only), bits [15:0] indicate the value for the previously evaluated best full PEL metric, and bits [19:16] are set to 0xF to indicate interpolation 'done.

Figure 162:
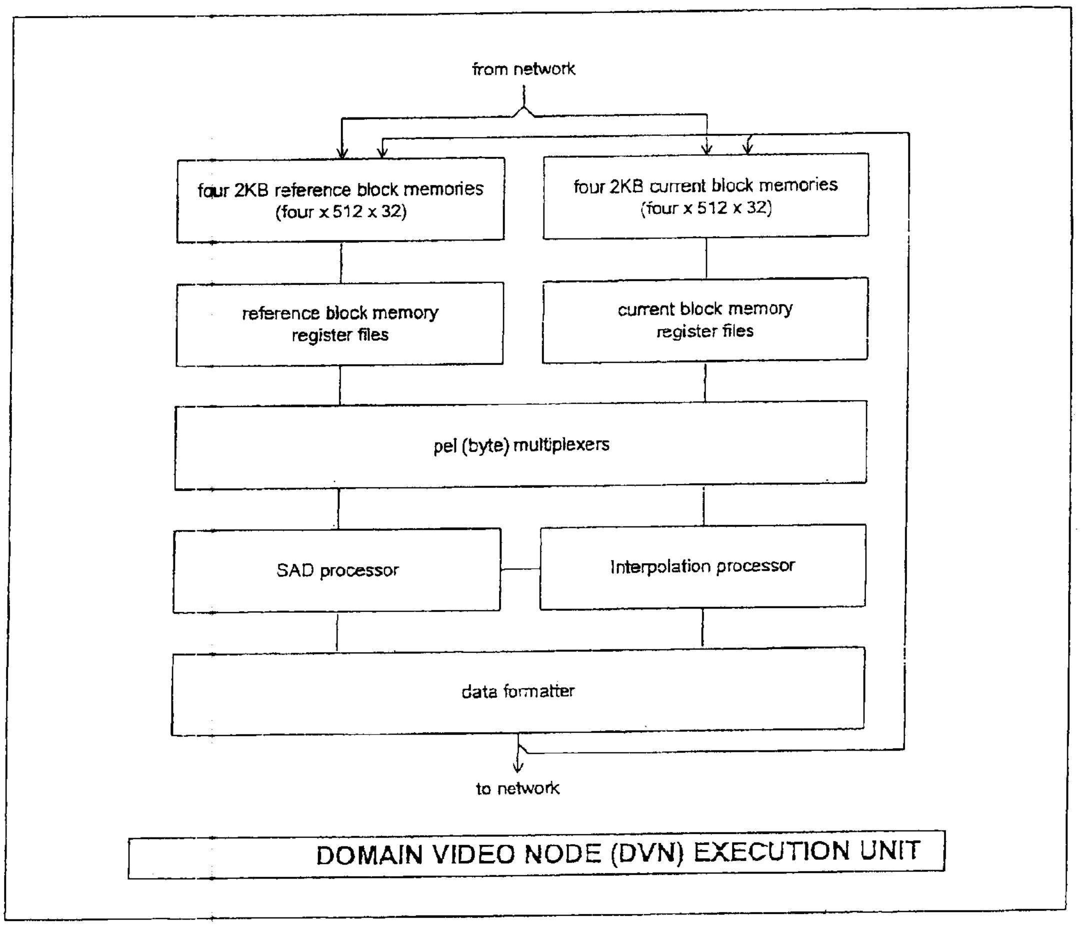
FIG. 162 shows an execution unit for a DVN according to an embodiment of the invention.

For Command 0x3, half PEL to quarter PEL interpolation, when bit [24] of the command is set to 1 'b1 (interpolate and evaluate), status word bits [15:0] indicate the value for the best quarter PEL metric, and bits [19:16] indicate with which of nine quarter PEL candidates the best metric is associated. (The quarter PEL numbering convention shown in FIG. 162 is used to code bits [19:16]). When bit [24] of the command is set to 1 'b0 (interpolate only), bits [15:0] indicate the value for the previously evaluated best metric (either full PEL or half PEL if the latter has been evaluated), and bits [19:16] are set to 0xF to indicate interpolation 'done.

For Commands 0x4, 0x5, 0x6, 0x7, 0x8, and 0x9, the status word will be, respectively, 0xFF010000, 0xFF020000, 0x.FF040000, 0xFF080000, 0xFF100000, and 0xFF200000 to indicate done. For Command 0xA, the status word will be the best metric, a saturated, unsigned 16 bit integer. For Command 0xB, the status word will be the motion vector, with quarter PEL resolution. For Command 0xC, the status word will be 0xFF400000 to indicate done. For Command 0xF, the status word will echo the command itself. This is intended to be a diagnostics aid. In response to the command queue redirection' flag, the status word will be 0xFF800000 to indicate done.

DVN Node Memory: The DVN includes eight 2 KB physical memories, each organized as 512 words-by 32 bits per word, for a total node memory capacity of 16 KB. This allows the reading of 32 bytes of video data and the processing of sixteen 'sum of absolute differences' of these data each clock cycle. The 16 KB capacity also allows double buffering for fully overlapped data input/output and computation.

Any ACM can write into DVN node memory using the PTT in the DVN wrapper and any of the three services: PTP, DMA, or RTI. Additionally, the Knode can PEEK/POKE DVN node memory.

The DVN node memory map is shown in FIG. 142. The allocated buffers are described in Table 3:

TABLE 3

| Memory Map For DVN Node | | |
|---|---|---|
| Buffer | Capacity | Address Range (longwords) |
| Reference Block | 3840 bytes | 0x000 to 0x0EF<br>0x200 to 0x2EF<br>0x400 to 0x4EF<br>0x600 to 0x6EF |
| Reference Block B | 3840 bytes | 0x100 to 0x1EF<br>0x300 to 0x3EF<br>0x500 to 0x5EF<br>0x700 to 0x7EF |
| Current Block A | 256 bytes | 0x0F0 to 0x0FF<br>0x2F0 to 0x2FF<br>0x4F0 to 0x4FF<br>0x6F0 to 0x6FF |
| Current Block B | 256 bytes | 0x1F0 to 0x1FF<br>0x3F0 to 0x3FF<br>0x5F0 to 0x5FF<br>0x7F0 to 0x7FF |
| Current Block A | 256 bytes | 0x8F0 to 0x8FF<br>0xAF0 to 0xAFF<br>0xCF0 to 0xCFF<br>0xEF0 to 0xEFF |
| Current Block B | 256 bytes | 0x9F0 to 0x9FF<br>0xBF0 to 0xBFF<br>0xDF0 to 0xDFF<br>0xFF0 to 0xFFF |
| Task Parameter List | 960 bytes | 0x800 to 0x8EF |
| Byte Code | 960 bytes | 0xA00 to 0xAEF |
| Command Queue A | 256 bytes | 0xC00 to 0xC3F |
| Command Queue B | 256 bytes | 0xE00 to 0xE3F |
| Horizontal Cost Function Table A | 256 bytes | 0xC40 to 0xC7F |
| Horizontal Cost Function Table B | 256 bytes | 0xC80 to 0xCBF |
| Vertical Cost Function Table A | 128 bytes | 0xE40 to 0xE5F |
| Vertical Cost Function Table B | 128 bytes | 0xE80 to 0xE9F |
| Fraction PEL Cost Function Tables | 128 bytes | 0xEA0 to 0xEBF |

TABLE 3-continued

| Memory Map For DVN Node | | |
|---|---|---|
| Buffer | Capacity | Address Range (longwords) |
| Half PEL Buffer | 1280 bytes | 0x980 to 0x9CF<br>0xB80 to 0xBCF<br>0xD80 to 0xDCF<br>0xF80 to 0xFCF |
| Quarter PEL Buffer | 2048 bytes | 0x900 to 0x97F<br>0xB00 to 0xB7F<br>0xD00 to 0xD7F<br>0xF00 to 0xF7F |

This assume that reference blocks and current blocks are transferred from the 'Data Mover' to the eight DVN node memories via the MIN. This also assume that the 'Data Mover' is controlled by a PSN node. Reference blocks are organized M-PEL per row by N-PEL per column. M and N are integer multiples of 5, consistent with the 5×5 positions-at-a-time search strategy. M has a range of 20 to 95 (20, 25, 30, . . . , 90, 95); N has a range of 20 to 65 (20, 25, 30, . . . , 60, 65).

Reference Block Options: A summary of allowable combinations for M and N that do not exceed the 3840 byte reference block capacity, along with the attendant number of exhaustive search processing cycles, is shown in FIG. 145.

For each M-PEL by N-PEL reference block transfer from the Data Mover to DVN node memory as follows: Rows 0, 4, 8, . . . , [M−(M)mod 4] are written into sequential locations in node memory zero; Rows 1, 5, 9, . . . , [M−(M−1)mod 4] are written into sequential locations in node memory one; Rows 2, 6, 10, . . . , [M−(M−2)mod 4] are written into sequential locations in node memory two; and Rows 3, 7, 11, . . . , [M−(M−3)mod 4] are written into sequential locations in node memory three.

For each 16-PEL by 16-PEL current block transfer from the Data Mover to DVN node memory: Rows 0, 4, 8, and 12 are written into node memories zero and four; Rows 1, 5, 9, and 13 are written into node memories one and five; Rows 2, 6, 10, and 14 are written into node memories two and six; and Rows 3, 7, 11, and 15 are written into node memories three and seven.

During full PEL search, the DVN motion estimation engine (ME) reads reference block data from memories zero through three, and it reads current block data from memories four through seven. During half PEL interpolation, the ME reads full PEL reference block data from memories zero through three, and it writes half PEL interpolated data into memories four through seven. When half PEL search is performed concurrently with half PEL interpolation, the ME reads current block data from memories four through seven. During quarter PEL interpolation, the ME reads half PEL interpolated data from memories four through seven, and it writes quarter PEL interpolated data into memories four through seven. When quarter PEL search is performed concurrently with quarter PEL interpolation, the ME reads current block data from memories zero through three. During output, the ME reads full PEL macroblocks from memories zero through three, fractional PEL macroblocks from memories four through seven, and for macroblock signed differences, current blocks from memories zero through three/four through seven for full PEL/fractional PEL macroblocks, respectively.

Cost Function Tables: For each full PEL search position, the DVN evaluates the metric: SAD256 plus horizontal cost function plus vertical cost function. The cost functions are stored in node memory. The cost function is an unsigned 16 bit integer.

For an M-column by N-row reference block, there are M horizontal cost functions and N vertical cost functions. In each horizontal cost function table, two 16 bit integers, a pair of horizontal cost functions, are packed in each 32 bit longword in the table. The cost functions for columns 0 and 1 are stored at table location 0, the cost functions for columns 2 and 3 are stored at table location 1, and so on. Cost functions for even numbered columns are stored in bits [15:0] of the longword; cost functions for odd numbered columns are stored in bits [31:16] of the longword.

Figure 146:
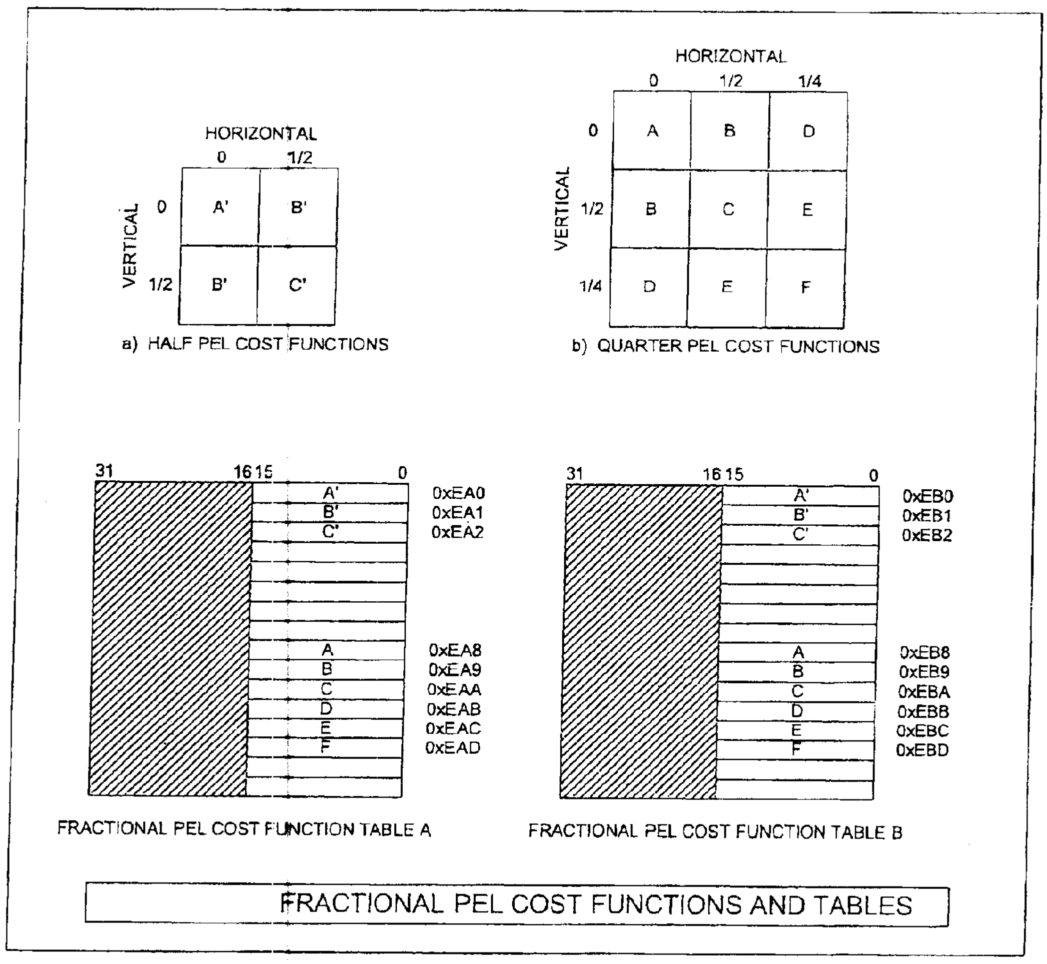
FIG. 146 shows formats for fractional PEL cost functions and tables according to an embodiment of the invention.

In each vertical cost function table, two 16 bit integers, a pair of vertical cost functions, are packed in each 32 bit longword in the table. The cost functions for rows 0 and 1 are stored at table location 0, the cost functions for rows 2 and 3 are stored at table location 1, and so on. Cost functions for even numbered rows are stored in bits [15:0] of the longword; cost functions for odd numbered rows are stored in bits [31:16] of the longword. Fractional PEL cost functions and Cost Function Tables A and B are shown in FIG. 146.

Reference Block Overview: As shown in FIG. 142, two 3840 byte reference block buffers are allocated in DVN node memory. Each buffer is stored in four physical memories to allow access to 16 PEL each clock period. We will employ a numbering convention that is referenced to the upper left PEL, whose (H) horizontal and (V) vertical coordinates will be designated (H:0, V:0). The upper left PEL of reference block A will be stored in the high order byte of memory location 0x000; and the upper left PEL of reference block B will be stored in the high order byte of memory location 0x100. Rows 0, 4, 8, . . . of the reference block will be stored in memory 0; rows 1, 5, 9, . . . will be stored in memory 1; rows 2, 6, 10, . . . will be stored in memory 2; and rows 3, 7, 11, . . . will be stored in memory 3.

Figure 147:
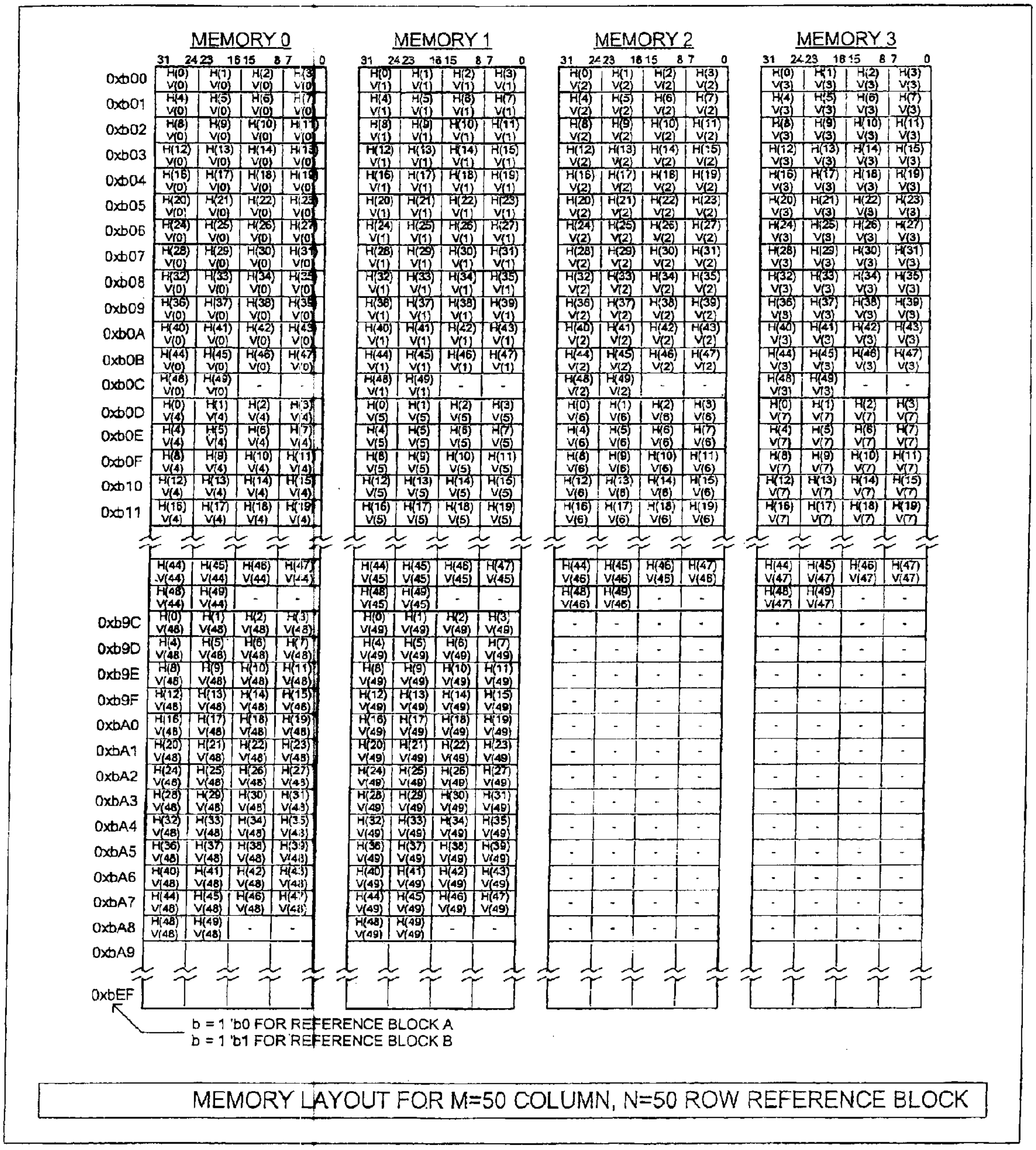
FIG. 147 shows a memory layout for a reference block having M=50 columns and N=50 rows according to an embodiment of the invention.
Figure 148:
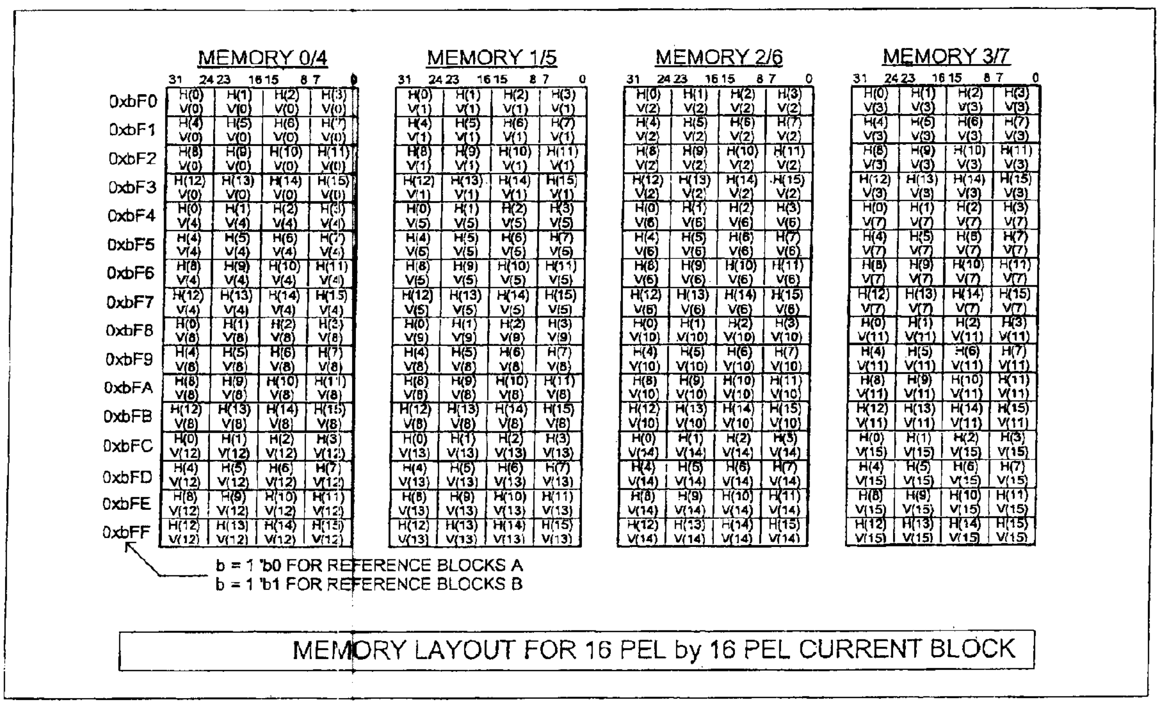
FIG. 148 shows a memory layout for a current block of size 16 PELs by 16 PELs according to an embodiment of the invention.

An M=50 column by N=50 row reference block will be stored in node memories 0 through 3 as shown in FIG. 147. Each 16 PEL by 16 PEL current block will be stored in node memories 0 through 3, and also in node memories 4 through 7, as shown in FIG. 148.

Figure 149:
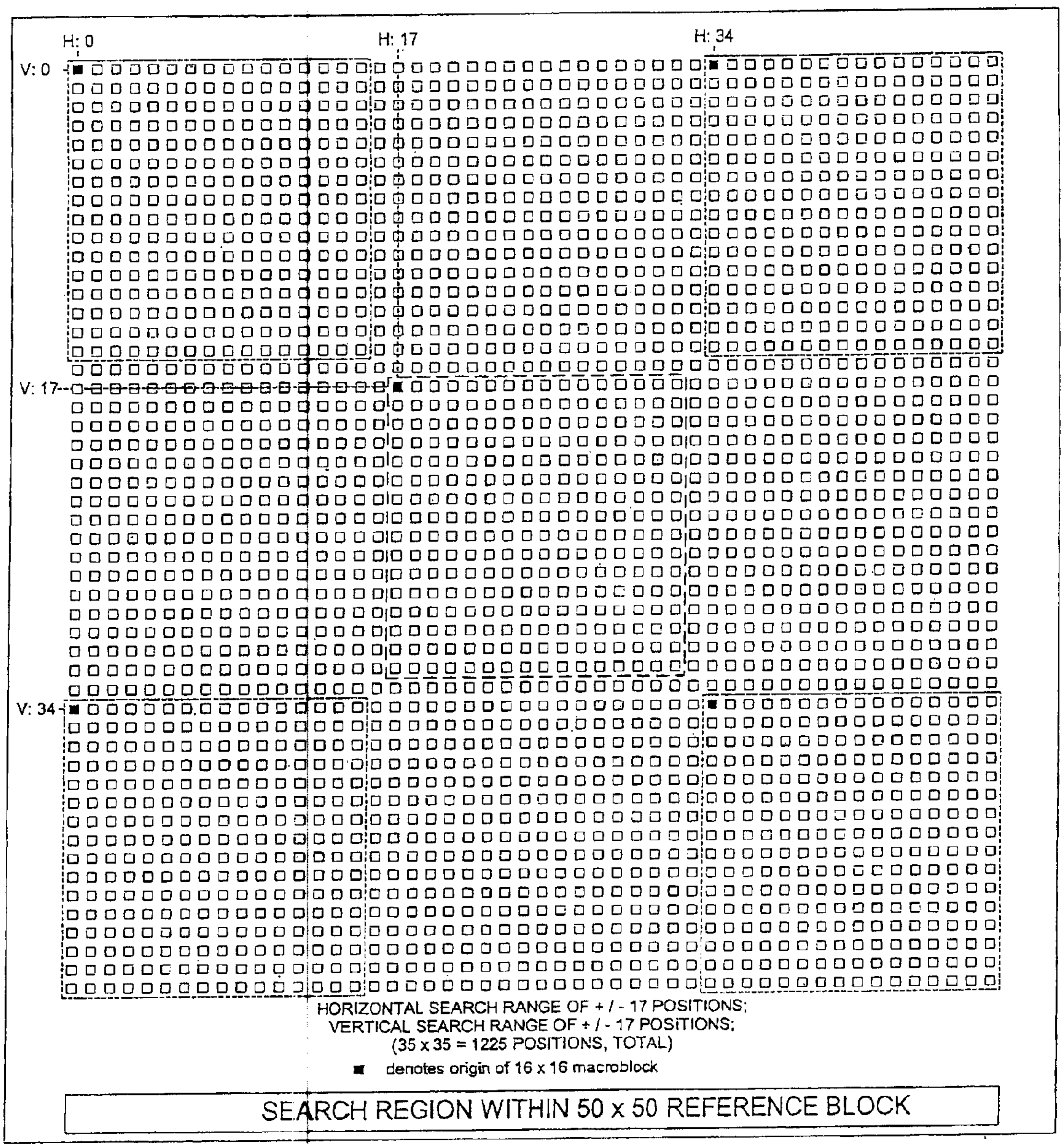
FIG. 149 shows a search region within a 50 by 50 reference block according to an embodiment of the invention.

The 50 PEL by 50 PEL reference block allows for a search range of +/−17 PEL in each dimension (referenced to the center search position at ([H:17, V:17]) as shown in FIG. 149. There are 1225 candidate search positions within a 50 PEL by 50 PEL reference block. The 'center' position, with relative coordinates H(17), V(17), is, shown in FIG. 149. Five search positions are highlighted in FIG. 149: the center position, H(17), V(17); the upper-leftmost position, H(0), V(0); the upper rightmost position, H(34), V(0); the lower leftmost position, H(0), V(34); and the lower rightmost position, H(34), V(34).

Figure 150:
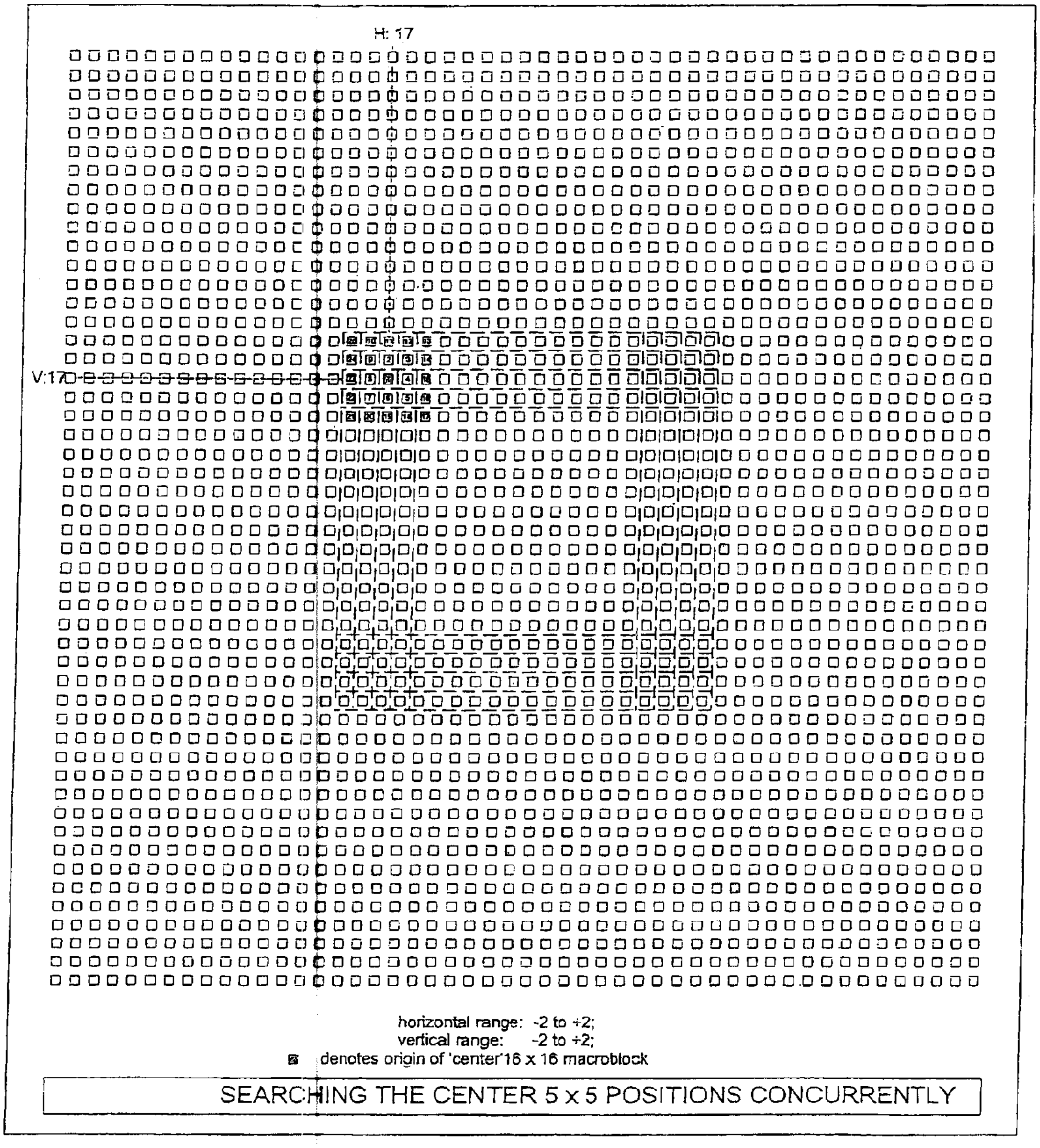
FIG. 150 shows a process of searching the center 5 by 5 positions concurrently according to an embodiment of the invention.
Figure 151:
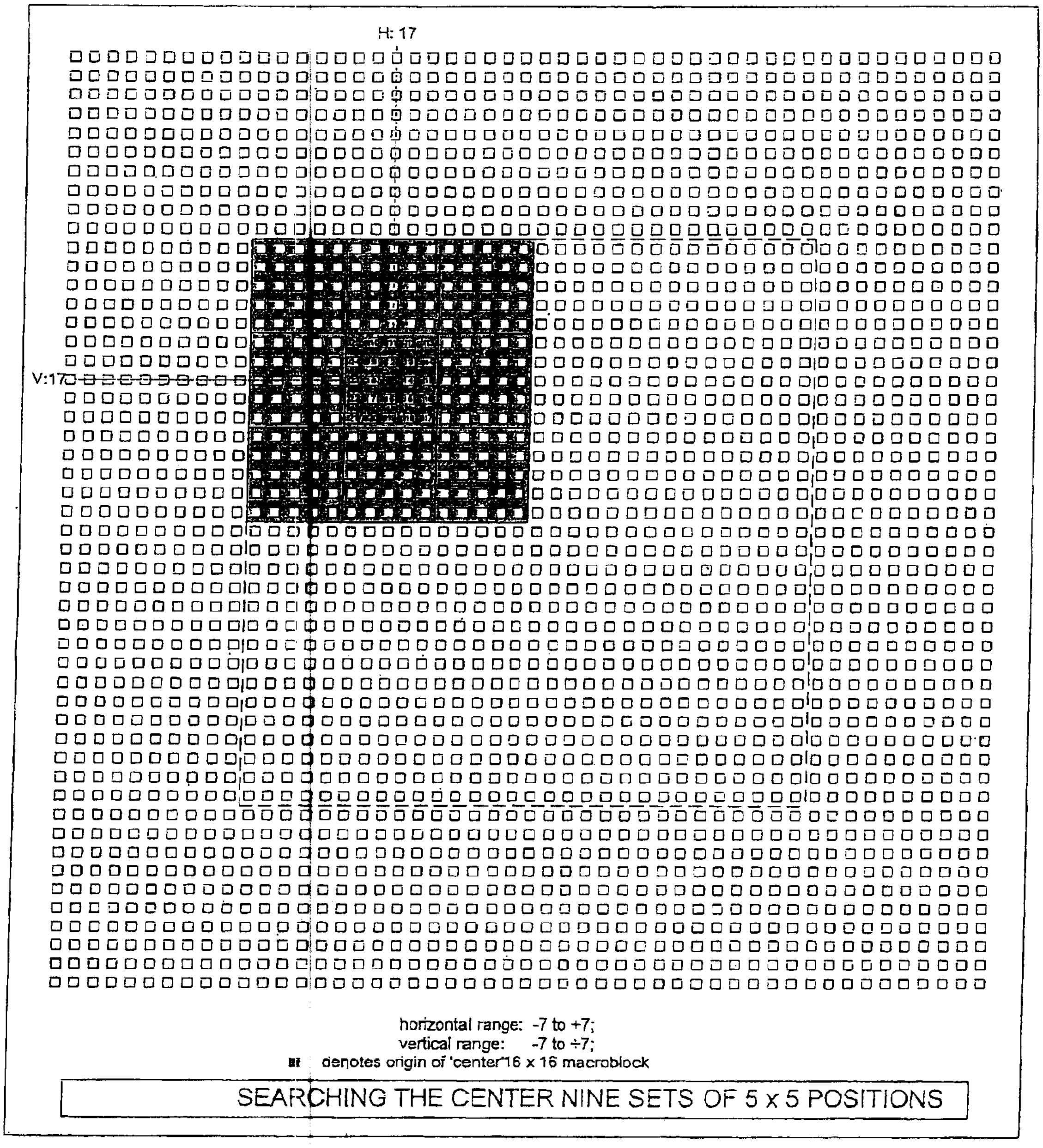
FIG. 151 shows a process of searching the center 9 sets of 5 by 5 positions concurrently according to an embodiment of the invention.
Figure 152:
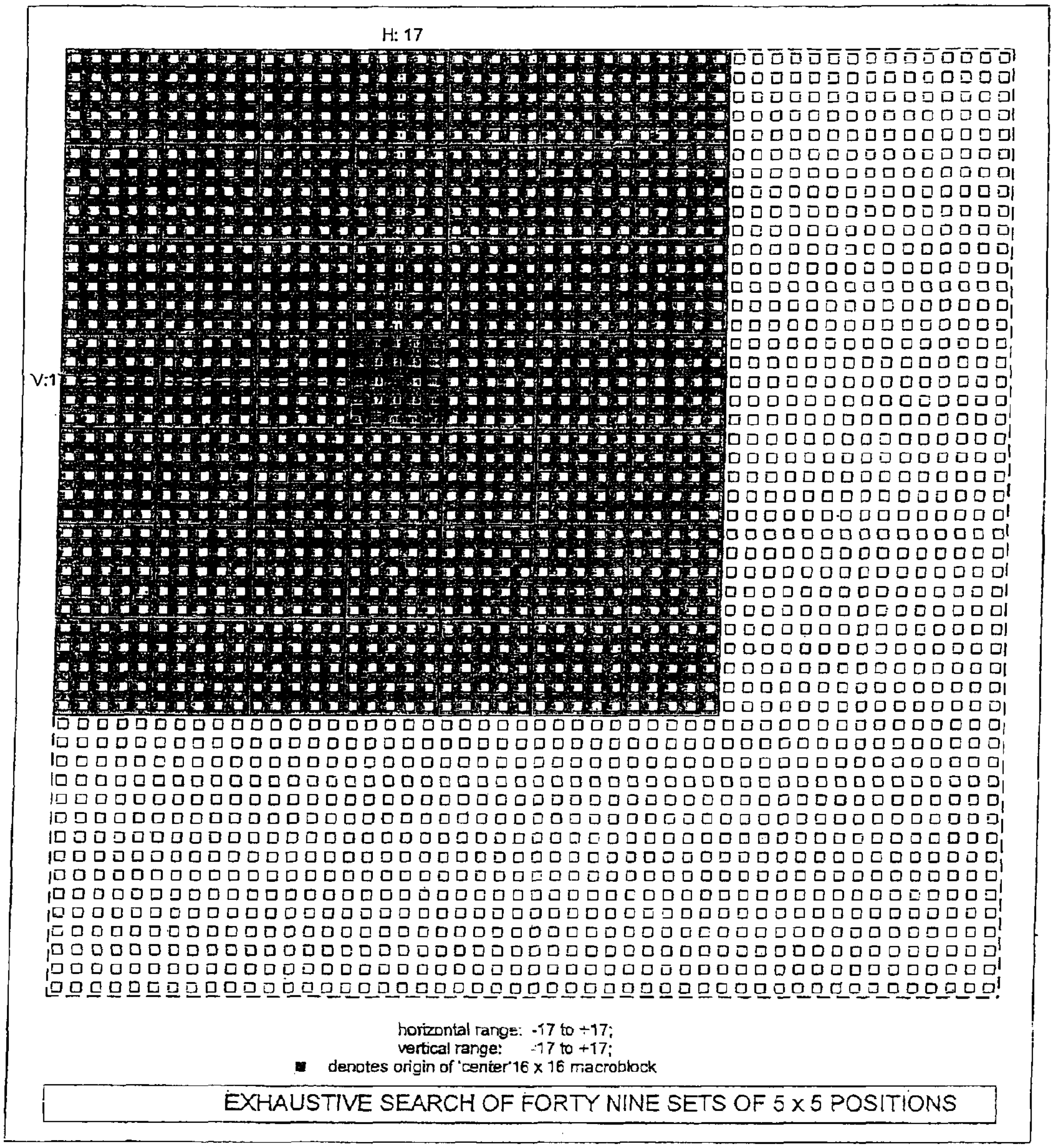
FIG. 152 shows a process of exhaustive search of forty nine sets of 5 by 5 positions according to an embodiment of the invention.
Figure 153:
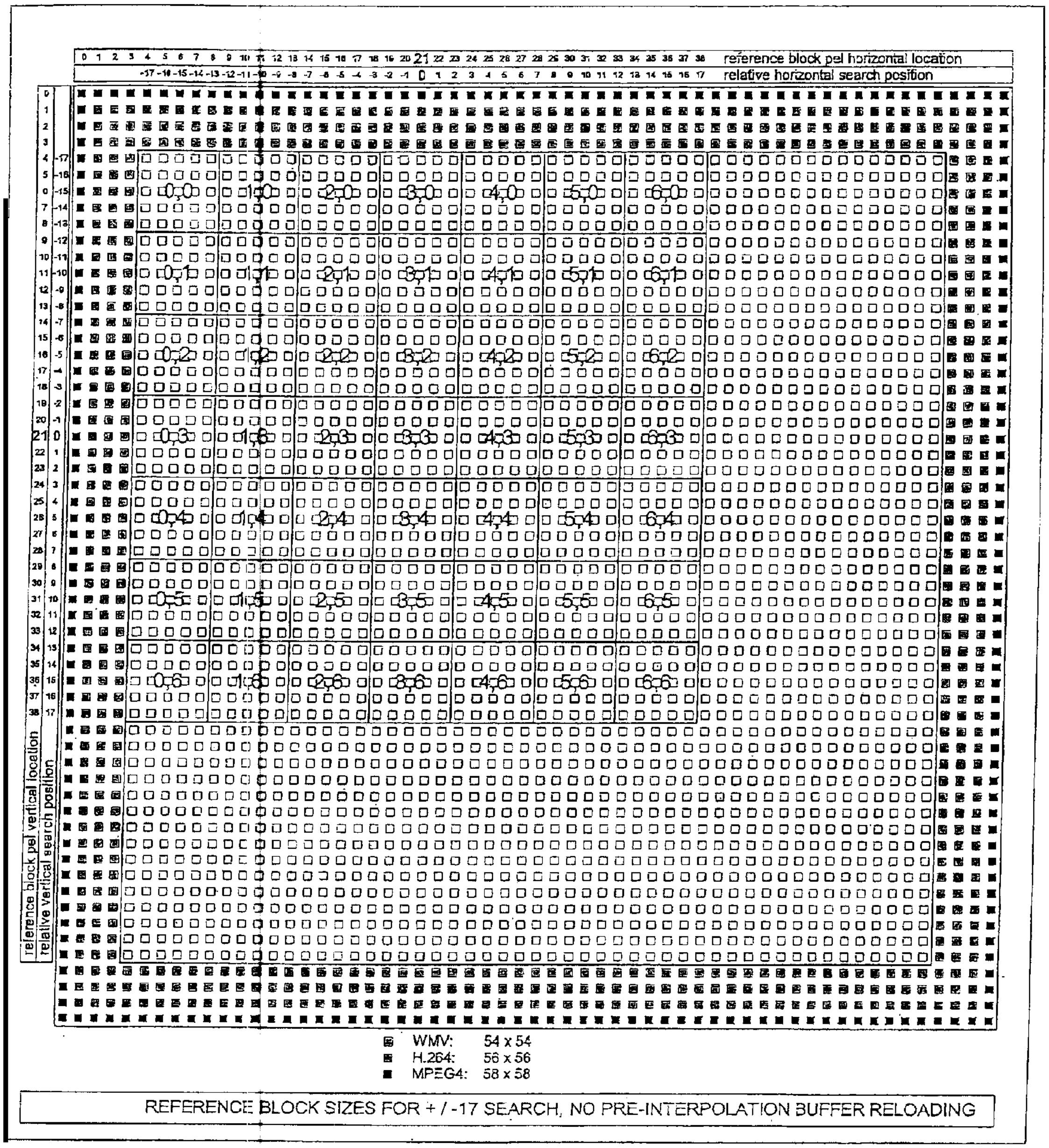
FIG. 153 shows reference block sizes for plus/minus 17 search, without reloading of the pre-interpolation buffer, according to an embodiment of the invention.

Searching the center 5×5 positions currently within such a reference block is shown in FIG. 150. In this case, the total number of positions searched is 25, and the search range is +/−2 PEL in each dimension. Searching the center nine sets of 5×5 positions within such a reference block is shown in FIG. 152. In this case, the total number of positions searched is 9×5×5=225 and the search range is: +/−7 PEL in each dimension. Exhaustively searching all 49 sets of 5×5 positions within such a reference block is shown in FIG. 153. In this case, the total number of positions searched is 49×5×5=1225, and the search range is: +/−17 PEL in each dimension.

Figure 154:
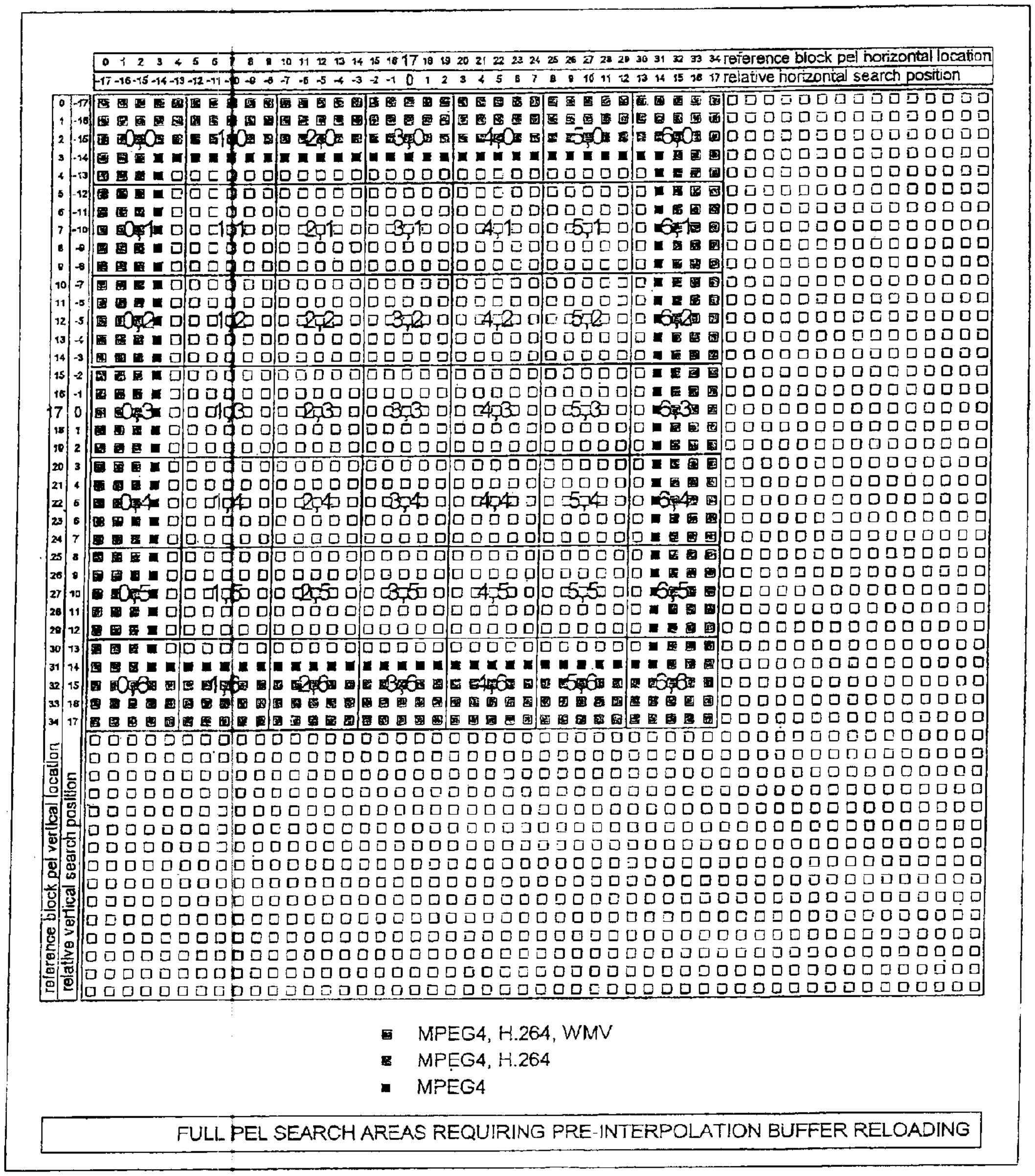
FIG. 154 shows full PEL search areas that require pre-interpolation buffer reloading according to an embodiment of the invention.

When fractional PEL processing is included, the programmer may select between two strategies:

Load an 'oversized' reference block with a sufficient number of PEL to support interpolation for any search outcome. The size of such an oversized reference block can be determined by the size of the current macroblock (m), the search range (h, v) and the number of taps (n) for the half PEL interpolation filter. Specifically, the size will be [m+h+n−1] horizontal PEL by [m+v+n−1] vertical PEL. For example, for a 16×16 PEL macroblock, +/−17 PEL search range horizontally and vertically, and an H.264 6-tap interpolation filter, the reference block must be 56×56 PEL, (3136 bytes) as shown in FIG. 154.

Figure 155:
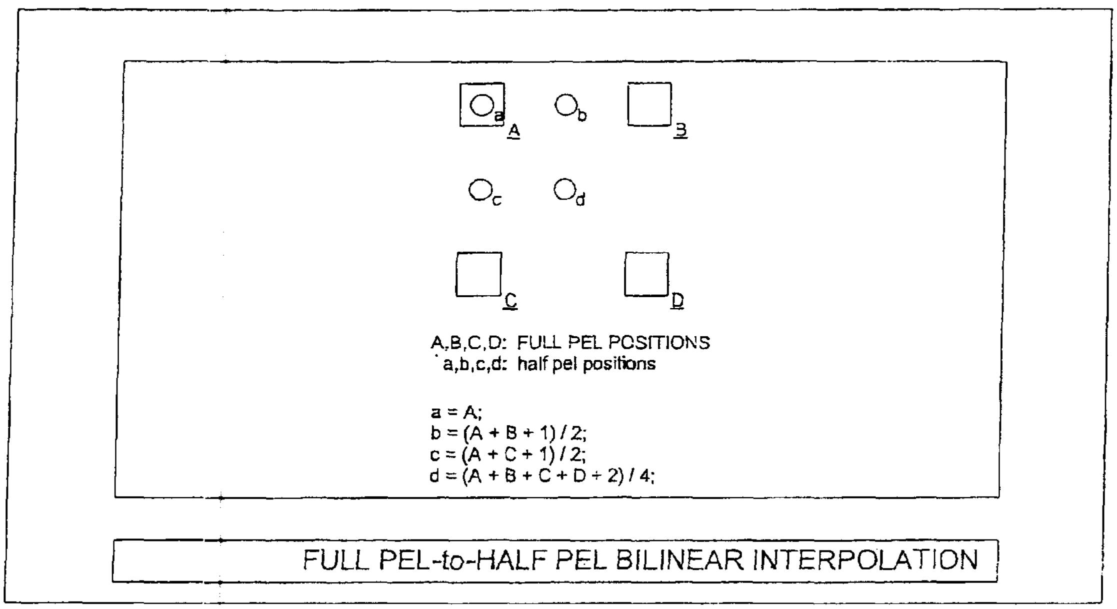
FIG. 155 shows full PEL to half PEL bilinear interpolation according to an embodiment of the invention.

Load a reference block with the minimum number of PEL consistent with the desired search range. The size of such a reference block can be determined by the size of the current macroblock (m) and the search range (h, v). Specifically, the size will be [m+h−1] horizontal PEL by [m+v−1] vertical PEL. For example, for a 16×16 PEL macroblock and a +/−17 PEL search range horizontally and vertically, the reference block will be 50×50 PEL (2500 bytes), considerably smaller than the 3136 bytes required for strategy 1), above. Then, if the search outcome requires, reload the reference block buffer with [m+n] horizontal PEL by [m+n] vertical PEL before proceeding with the interpolation step. This is summarized in FIG. 155.

Full PEL Search: The DVN supports two modes of operation for full PEL search. One mode evaluates an arbitrary 16×16 position within the reference block, performing 16 SAD operations every clock period. The second mode evaluates m-by-n sets of (5×5=25) positions concurrently, performing 200 maximum (160 average) SAD operations every clock period. For both modes, 'evaluation' consists of calculating the 'sum of absolute differences' (SAD) metric between the current 16×16 macroblock and any 16×16 macroblock within the reference block plus a horizontal cost function plus a vertical cost function, always saving the best metric and the origin of the associated 16×16 macroblock. The search pattern is governed by instruction sequences that are written by a controlling PSN node into one of two command queues in DVN memory. Unique command codes for each queue entry indicate whether a single position or m-by-n 5×5 positions should be evaluated for a given (X,Y) origin.

Figure 156:
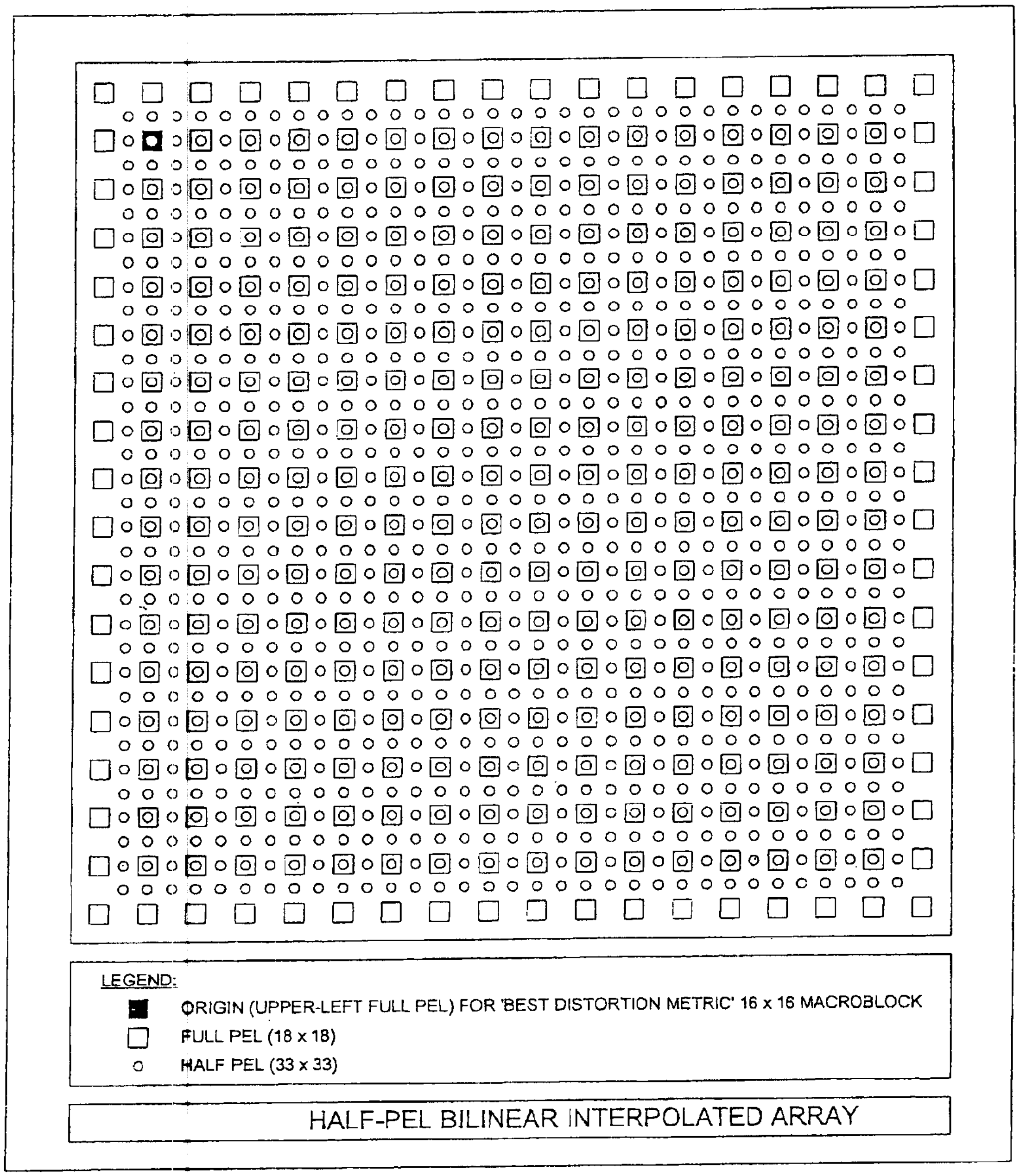
FIG. 156 shows a half-PEL bilinear interpolated array according to an embodiment of the invention.
Figure 157:
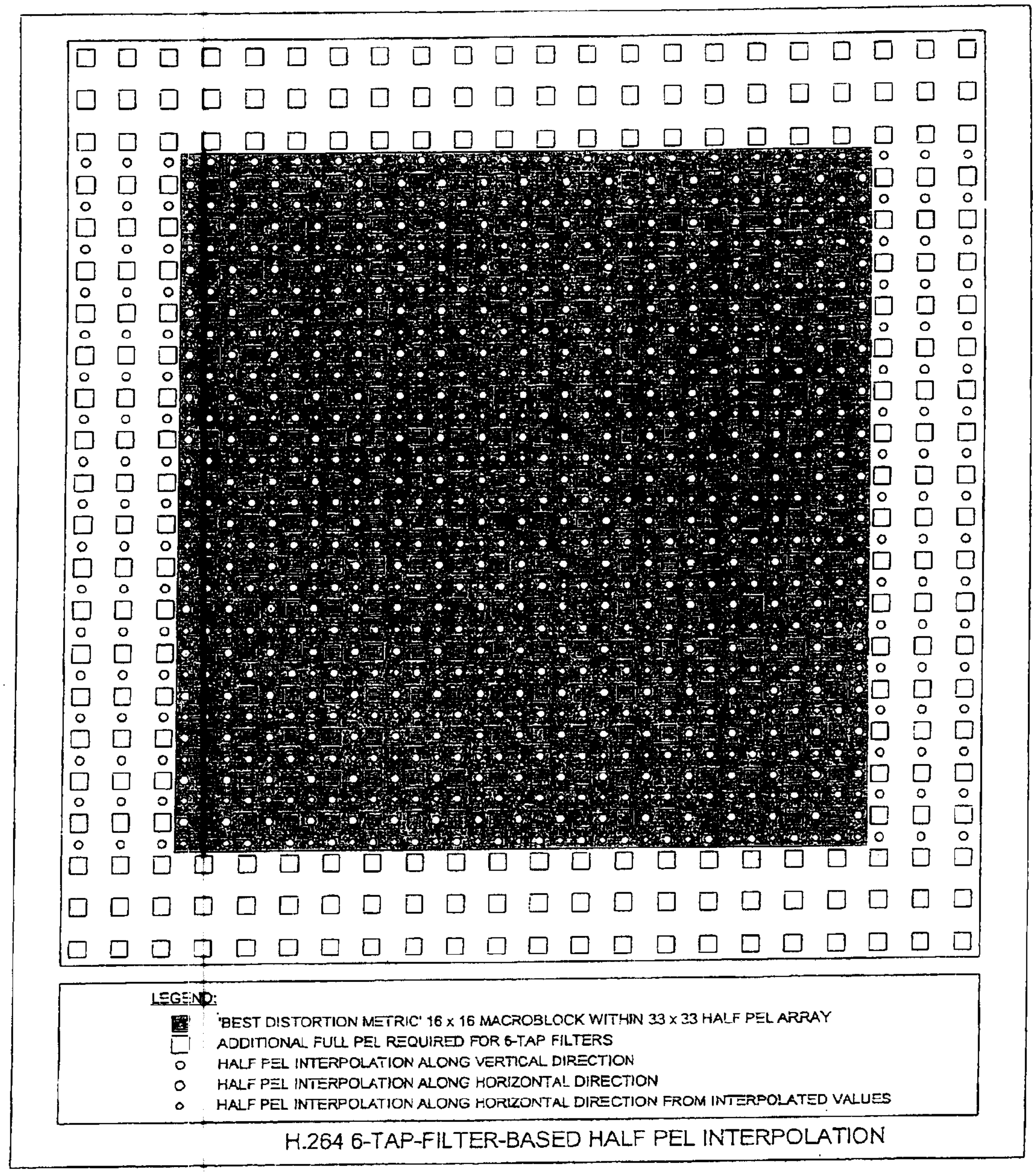
FIG. 157 shows a 6-tap-filter-based half PEL interpolation for H.264 video according to an embodiment of the invention.
Figure 158:
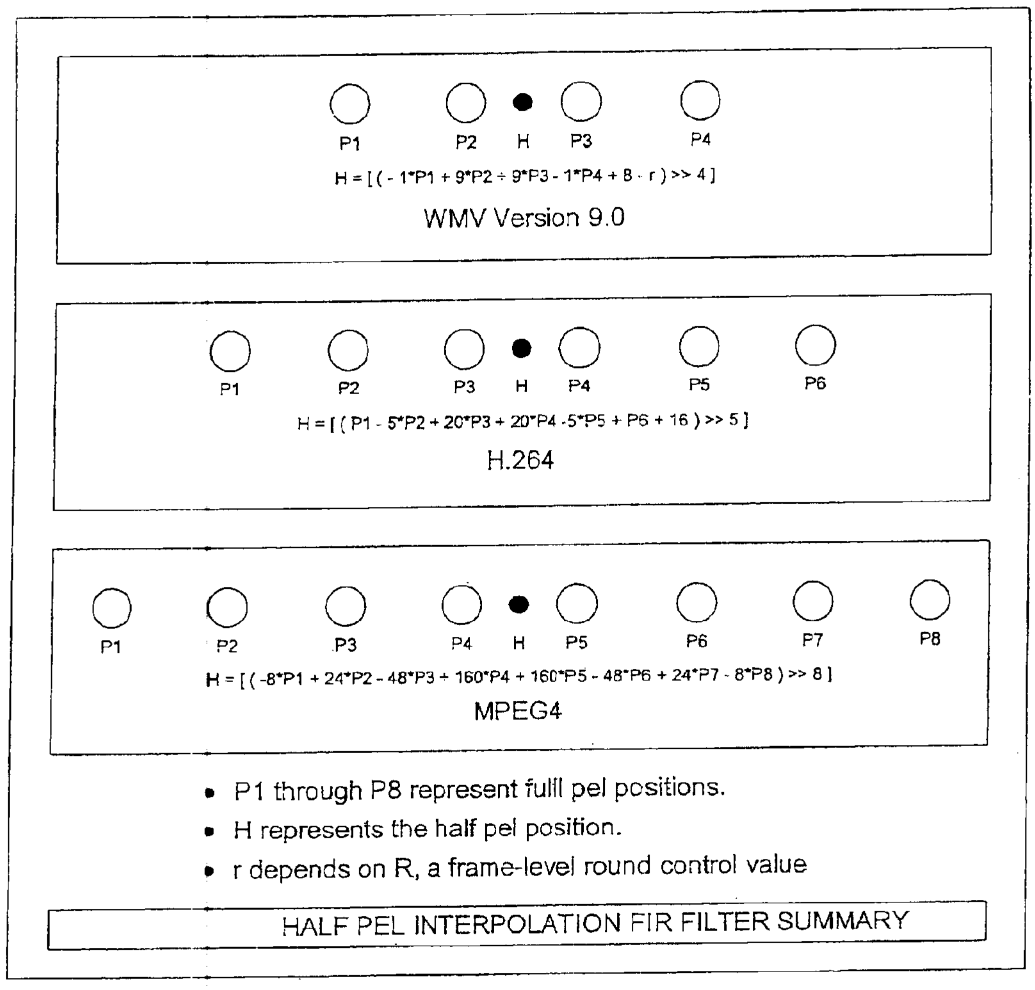
FIG. 158 shows a summary of a half PEL interpolation finite impulse response (FIR) filter according to an embodiment of the invention.
Figure 159:
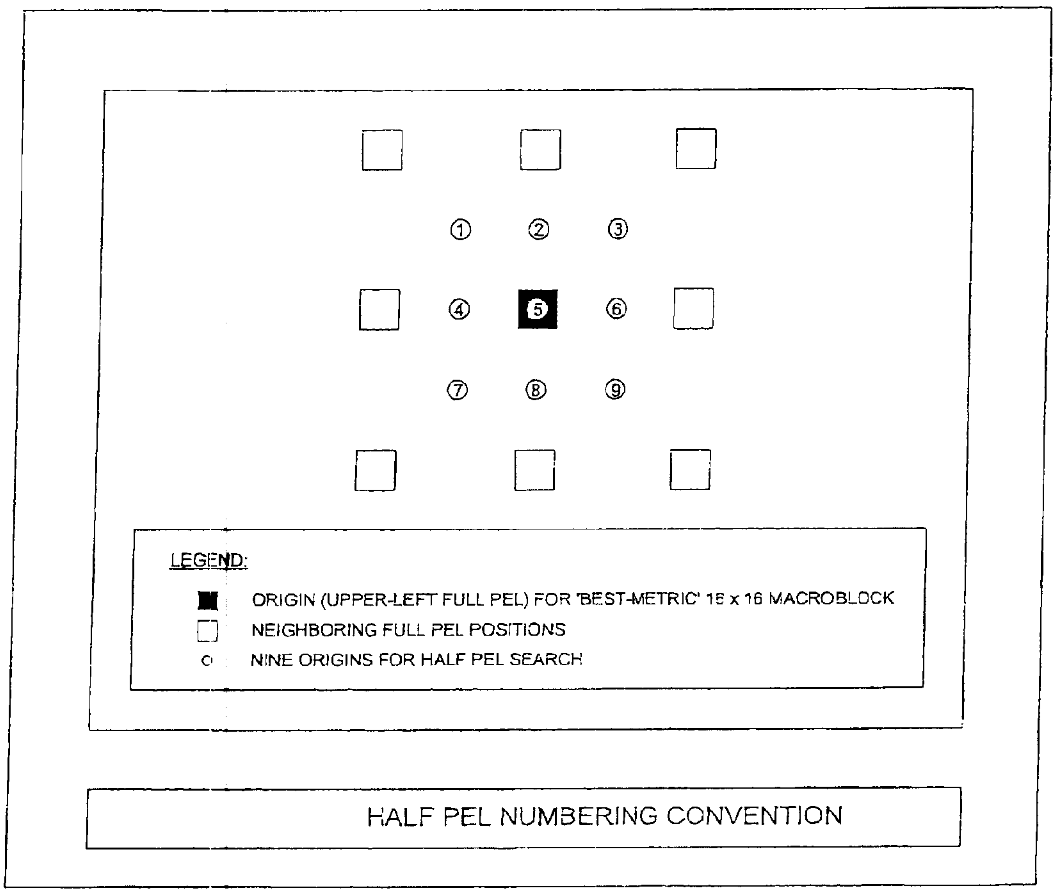
FIG. 159 shows a half PEL numbering convention according to an embodiment of the invention.

Half PEL Interpolation: After full PEL search for the 16×16 macroblock with the best distortion metric, half PEL interpolation is performed on the surrounding ([16+n]×[16+n]) PEL array, where n is the filter order. For bilinear interpolation, WMV, H.264, and MPEG4, n=2, 4, 6, and 8, respectively. The calculations required for half PEL bilinear interpolation are summarized in FIG. 156. The 33×33 half PEL array that results from bilinear interpolation of the 18×18 full PEL array associated with the 'best metric' 16×16 macroblock is shown in FIG. 157. The 33×33 half PEL array that results from H.264 6-tap filter interpolation is shown in FIG. 158. A summary of supported half PEL interpolation FIR filters is shown in FIG. 159. For the half PEL positions of ½ PEL-horizontal-shift and ½ PEL-vertical-shift, the same filters are used on the full PEL, ½ PEL interpolated values, maintaining the full precision of these values.

Half PEL Search: After half PEL interpolation using one of the four filtering options, the half PEL metrics are calculated for each of nine candidate half PEL positions. The metric is the sum of the SAD256 metric plus the half PEL cost function. A numbering convention for the nine candidate half PEL positions is shown in FIG. 160. Note from the figure that the full PEL metric for the full PEL position (position '5') has been calculated previously. However, the half PEL metric for position '5' will be the its full PEL metric, minus its full PEL horizontal and vertical cost functions, plus its half PEL cost function for this position (see FIG. 146). Half PEL search consists of generating the metric of SAD+half PEL cost function for each of the nine candidates and selecting the one that has the best metric.

Figure 161:
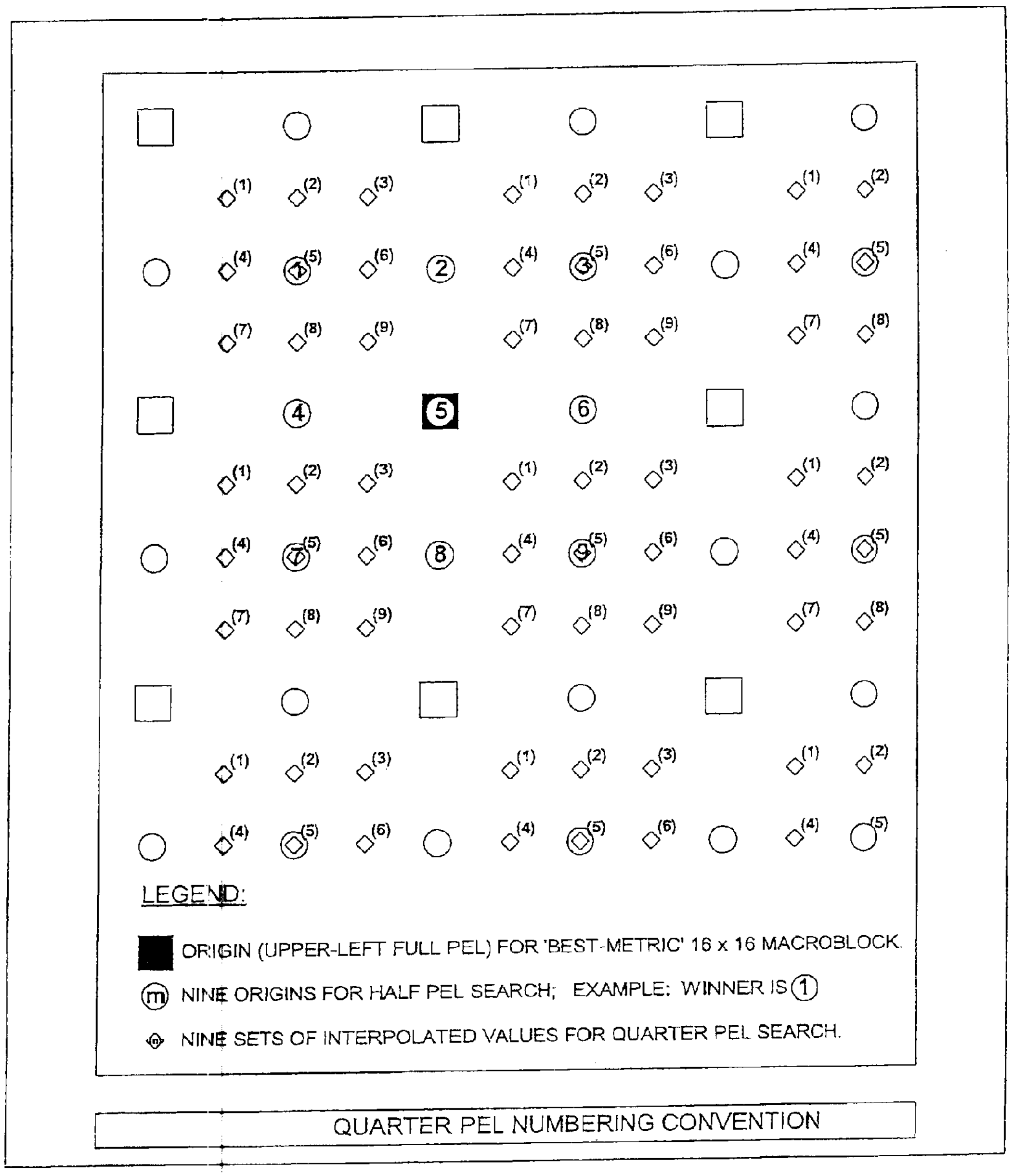
FIG. 161 shows a quarter PEL numbering convention according to an embodiment of the invention.

Quarter PEL Interpolation: After half PEL search for the 16×16 macroblock with the best distortion metric, quarter PEL interpolation is performed on the surrounding ([16+n]×[16+n]) PEL array, where n is the filter order. For WMV, n=4; for H.264, and MPEG4, which use bilinear interpolation, n=2. The WMV sub-PEL four tap FIR filters for the ¼ PEL position, the ½ PEL position, and the ¾ PEL position are summarized in FIG. 161.

Quarter PEL Search: After quarter PEL interpolation, the quarter PEL metrics are calculated for each of nine candidate quarter PEL positions. The metric is the sum of the SAD256 metric plus the quarter PEL cost function. A numbering convention for the nine candidate quarter PEL positions is shown in FIG. 162. Note from the figure that only nine-of-16 quarter PEL positions must be calculated. Note, too, that one metric for the nine candidate quarter PEL positions (position '5') has been calculated previously. However, the quarter PEL metric for position '5' will be its half PEL metric, minus its half PEL cost function, plus its quarter PEL cost function for this position (see FIG. 146). Quarter PEL search consists of generating the metric of SAD+quarter PEL cost function for each of the nine candidates and selecting the one that has the best metric.

Macroblock Signed Differences: The DVN also will be capable of calculating and outputting a 256 element array of 9-bit signed differences between any 16 PEL by 16 PEL macroblock in DVN node memory (full PEL, half PEL, or quarter PEL) and either 16 PEL by 16 PEL current block in DVN node memory. The array is output to a destination node as 128 longwords, where each longword is a packed pair of 16-bit signed integers representing the sign-extended 9-bit signed differences of the 16×16 macroblocks.

Summary of Programming Issues Related to the DVN: Referring to FIG. 132, the following are programming requirements for the DVN: construct and load the task parameter list (TPL) into DVN node memory; construct and load the byte code into DVN node memory; configure the DVN hardware task manager (HTM); direct the Data Mover to construct and transfer to DVN node memory the requisite reference blocks, current blocks, and cost function tables, along with the appropriate data flow acknowledgements; construct and transfer the requisite command queue instruction sequences to DVN node memory; configure the HTM in the DVN's controller node to support its processing of messages from the DVN; and configure DVN destination nodes (consumers) to receive output from the DVN and to send to the DVN the appropriate data flow acknowledgements.

DVN Hardware Overview: A simplified block diagram of the DVN execution unit is shown in FIG. 162. The DVN includes the QST Node Wrapper, eight 2 KB node memories (each organized as 512 words by 32 bits), and an execution unit (EU), consisting of an overhead processor (OHP) and a motion estimation engine (ME). The ME performs full PEL/half PEL/quarter PEL search, half PEL and quarter PEL interpolation, and macroblock signed differences. It outputs the best metric and the origin of the associated 16×16 macroblock to the controller node and a destination node; it outputs the associated 16×16 macroblock to a destination node performing the decoder motion compensation function; and it can output macroblock signed differences to a destination node.

Features of the DVN include: separate control units for the motion estimation engine and the overhead processor for maximum efficiency; compact byte code and efficient TPL load/store operation to minimize overhead for setup, ACK+TEST, and continue; finite state machine (FSM) based PLA control of motion estimation engine for superior power/area metrics compared with sequencer+control memory-based implementations; innovative algorithm implementations for enhanced performance and reduced power; eight physical memory block architecture to allow massive parallelism; and high-performance memory interfaces with 'same write address/read address resolution.

The motion estimation engine includes several functional elements: control program unit (CPU); memory address generator unit (AGU); data path unit (DPU); sum of absolute differences (SAD), signed differences; multi-format sub-PEL interpolation; wrapper interface unit (WIU); and memory interface unit (MIU).

The DVN performs the following operations: 1) full PEL search over (up to) 80 PEL in the horizontal dimension and (up to) 50 PEL in the vertical dimension; 2) full PEL to 35×35 half PEL interpolation using one of four (perhaps more) filters; 3) half PEL search; 4) 35×35 half PEL to nine x16×16 quarter PEL interpolation; 5) quarter PEL search; and 6) output best metric and origin of the associated 16×16 macroblock to the controlling PSN node, and output 16×16 macroblock itself to the node performing decoder motion compensation; 7) calculate and output the 256 signed differences between a selected 16×16 macroblock (full PEL, half PEL, or quarter PEL) and the current 16×16 macroblock.

Each of eight node memories is partitioned into a ping pong buffer pair to allow fully overlapped data input and computation/results output. After one data set has been transferred from the Data Mover to the eight DVN memories, the DVN ME performs its calculations and outputs its results. During this time, the next data set is transferred from the Data Mover to the eight DVN memories. And so on.

Each data set includes a variably sized reference block, a 16×16 PEL array (current block) and fractional PEL cost function tables. These data are distributed among the eight node memories in a manner that optimizes the ME's access to the data. Generally, this includes access to four bytes of data from each of eight node memories every clock period. This allows sixteen SAD operations to be performed each clock period when one 16×16 search position is evaluated at a time. Additionally, for 'twenty five concurrent search positions mode, it allows access to data from four rows of the reference block and data from four rows of the current block every clock period.

An adaptive computing machine (ACM) includes heterogeneous nodes that are connected by a homogeneous network. Each node includes three elements: wrapper, memory, and execution unit as shown in FIG. 1.

The Domain Video Node (DVN) can be implemented as a node type in an ACM, or it can be implemented in any suitable hardware and/or software design approach. For example, functions of embodiments of the invention can be designed as discrete circuitry, integrated circuits including custom, semi-custom, or other; programmable gate arrays, application-specific integrated circuits (ASICs), etc. Functions may be performed by hardware, software or a combination of both, as desired. Various of the functions described herein may be used advantageously alone, or in combination or subcombination of other functions, including functions known in the prior art or yet to be developed. reconfigurable digital video processor that achieves a power-area-performance metric comparable to application specific integrated circuits (ASIC).

In a preferred embodiment, the DVN is included in an ACM with the additional benefit of reconfigurability, enabling it to execute a number of commonly used motion estimation algorithms that might require multiple ASICs to achieve the Same functionality. However, other embodiments can implement the DVN, or parts or functions of the DVN, in any suitable manner including in a non-configurable, or partially configurable design.

Principles of Motion Estimation

Motion estimation creates a model of the current frame based on available data in one or more previously encoded frames. The technique used in the DVN (and in most video codecs) is block matching motion estimation as depicted in FIG. 2. Each of the two frames is divided into macroblocks (MBs) of N×N pixels and for a maximum motion displacement of p pixels per frame, the current MB is matched against a corresponding block at the same co-ordinates in the previous frame within the search window (SW) of N+2p. The best match on the basis of minimizing a cost function yields the displacement (motion vector).

DVN Hardware Overview

A simplified block diagram of the DVN motion estimation engine is shown in FIG. 3.

The DVN includes the QST Node Wrapper, eight 2 KB node memories (each organized as 512 words by 32 bits), and an execution unit (EU), consisting of an overhead processor (OHP) and a motion estimation engine (ME). The ME performs double pixel/full pixel/half pixel/quarter pixel search, half pixel and quarter pixel interpolation, and macroblock signed differences. It outputs the best distortion metric (motion vector) and the origin of the associated 16×16 macroblock (8×8 block) to the controller node and a destination node; it outputs the associated 16×16 macroblock (8×8 block) to a destination node performing the decoder motion compensation function; and it can output 16×16 macroblock (8×8 block) signed differences to a destination node.

Features of the DVN Include:

- Separate control units for the motion estimation engine and the overhead processor for maximum efficiency. [
- Compact byte code and efficient TPL load/store operation to minimize overhead for setup, ack+test, and continue.
- FSM-based PLA control of motion estimation engine for superior power/area metrics compared with sequencer+control memory-based implementations.
- Innovative algorithm implementations for enhanced performance and reduced power.
- Eight physical memory block architecture to allow massive parallelism.
- High-performance memory interfaces with 'same write address/read address' resolution.

The motion estimation engine includes five major functional elements:

- Control Program Unit (CPU)
- Memory Address Generator Unit (AGU)
- Data Path Unit (DPU)
- Sum of Absolute Differences (SAD), Signed Differences Multi-format down-sampling and sub-pixel Interpolation
- Wrapper Interface Unit (WIU)
- Memory Interface Unit (MIU)

The DVN performs the following operations:

1) Double pixel search over (up to) 40 double pixels horizontally and vertically.
2) Full pixel search over (up to) 85 pixels in the horizontal dimension and (up to) 50 pixels in the vertical dimension.
3) Full pixel to 35×35 half pixel interpolation using one of four filters.
4) Half pixel search.
5) 35×35 half pixel to nine by 16×16 quarter pixel interpolation.
6) Quarter pixel search.
7) Output best metric and origin of the associated 16×16 macroblock (8×8 block) to the controller node, and output 16×16 macroblock (8×8 block) itself to the node performing decoder motion compensation.
8) Calculate and output the 256 (64) signed differences between a selected 16×16 macroblock (8×8 block)—full pixel, half pixel, or quarter pixel—and a current 16×16 macroblock (8×8 block).

Each of eight node memories is partitioned into a ping pong buffer pair to allow fully overlapped data input and computation/results output. After one data set has been transferred from the Data Mover to the eight DVN memories, the DVN ME performs its calculations and outputs its results. During this time, the next data set can be transferred from the Data Mover to the eight DVN memories. And so on.

Each data set includes a variably sized reference block, a 16×16 pixel (nominal) array (current block) and fractional pixel cost function tables. These data are distributed among the eight node memories in a manner that optimizes the ME's access to the data. Generally, this includes access to four bytes of data from each of eight node memories every clock period. This allows sixteen SAD operations to be performed each clock period when one 16×16 search position is evaluated at a time.

Additionally, for 'twenty five concurrent search positions' mode, it allows access to data from four rows of the reference block and data from four rows of the current block every clock period.

DVN Node Memory Overview

The DVN includes eight 2 KB physical memories, each organized as 512 words-by 32 bits per word, for a total node memory capacity of 16 KB. This allows the reading of 32 bytes of video data and the processing of sixteen 'sum of absolute differences' of these data each clock cycle. The 16 KB capacity also allows double buffering for fully overlapped data input/output and computation.

Any ACM resource can write into DVN node memory using the PTT in the DVN node wrapper and any one of the three services: PTP, DMA, or RTI. Additionally, the Knode can PEEK/POKE DVN node memory.

The DVN node memory map is shown in FIG. 4. The long-word address ranges for the eight physical memories are summarized below:

| 2 KB Physical Memory | Address Range (longwords) |
|---|---|
| Memory 0 | 0x000 to 0x1FF |
| Memory 1 | 0x200 to 0x3FF |
| Memory 2 | 0x400 to 0x5FF |
| Memory 3 | 0x600 to 0x7FF |
| Memory 4 | 0x800 to 0x9FF |
| Memory 5 | 0xA00 to 0xBFF |
| Memory 6 | 0xC00 to 0xDFF |
| Memory 7 | 0xE00 to 0xFFF |

The following buffers have been allocated within the available 16 KB of node memory:

| Buffer | Capacity | Address Range (longwords) |
|---|---|---|
| Reference Block A | 4032 bytes | 0x000 to 0x0FB<br>0x200 to 0x2FB<br>0x400 to 0x4FB<br>0x600 to 0x6FB |

-continued

| Buffer | Capacity | Address Range (longwords) |
|---|---|---|
| Reference Block B | 4032 bytes | 0x100 to 0x1FB<br>0x300 to 0x3FB<br>0x500 to 0x5FB<br>0x700 to 0x7FB |

| Buffer | Capacity | Address Range (longwords) |
|---|---|---|
| Down-Sampled Current Block (Hierarchical Search) | 64 bytes | 0x0FC to 0x0FF<br>0x2FC to 0x2FF<br>0x4FC to 0x4FF<br>0x6FC to 0x6FF |
| Scratch | 64 bytes | 0x1FC to 0x1FF<br>0x3FC to 0x3FF<br>0x5FC to 0x5FF<br>0x7FC to 0x7FF |
| Quarter Pixel Buffer | 2048 bytes | 0x800 to 0x87F<br>0xA00 to 0xA7F<br>0xC00 to 0xC7F<br>0xE00 to 0xE7F |
| Current Block A | 576 bytes | 0x880 to 0x8A3<br>0xA80 to 0xAA3<br>0xC80 to 0xCA3<br>0xE80 to 0xEA3 |
| Current Block B | 576 bytes | 0x8A4 to 0x8C7<br>0xAA4 to 0xAC7<br>0xCA4 to 0xCC7<br>0xEA4 to 0xEC7 |
| Half Pixel Buffer | 1892 bytes | 0x8C8 to 0x940<br>0xAC8 to 0xB40<br>0xCC8 to 0xD40<br>0xEC8 to 0xF35 |
| Scratch | 40 bytes | 0xF36 to 0xF3F |
| Scratch | 56 bytes | 0x941 to 0x947<br>0xB41 to 0xB47 |
| Cost Function Tables A | 416 bytes | 0x948 to 0x9AF |
| Cost Function Tables B | 416 bytes | 0xB48 to 0xBAF |

| Buffer | Capacity | Address Range (longwords) |
|---|---|---|
| Results--Motion Vectors | 64 bytes | 0x9B0 to 0x9BF |
| Results--Best Metrics | 64 bytes | 0xBB0 to 0xBBF |
| TPL Pointers Table, Byte Code, and Task Parameter List | 508 bytes | 0xD41 to 0xDBF |
| Command Queue | 512 bytes | 0xF40 to 0xFBF |
| Down-Sampled Reference Block | 1024 bytes | 0x9C0 to 0x9FF<br>0xBC0 to 0xBFF<br>0xDC0 to 0xDFF<br>0xFC0 to 0xFFF |

We assume that reference blocks and current blocks are transferred from the 'Date Mover' to the eight DVN node memories via the MIN. We also assume that the 'Data Mover' is controlled by a TBD node.

Reference Block Overview

As shown in FIG. 4, two 4032 byte reference block buffers are allocated in DVN node memory. Each buffer is stored in four physical memories to allow access to 16 pixels each clock period. We will employ a numbering convention that is referenced to the upper left pixel, whose (H) horizontal and (V) vertical coordinates will be designated (H:0, V:0). The upper left pixel of reference block A will be stored in the low order byte of memory location 0x000; and the upper left pixel of reference block B will be stored in the low order byte of memory location 0x100.

Rows 0, 4, 8, . . . of each reference block will be stored in memory 0;

Rows 1, 5, 9, . . . will be stored in memory 1;

Rows 2, 6, 10, . . . will be stored in memory 2; and

Rows 3, 7, 11, . . . will be stored in memory 3.

Reference blocks are organized M-pixels per row by N-pixels per column. Both M and N have a range of 29 to 100. A summary of allowable row/column combinations that do not exceed the 4032 byte reference block capacity is shown in FIG. 5. (Note: The four integer groupings reflect four-pixels-per-longword packing and the storing of the rows, modulo four, in four physical memories).

The DVN supports a number of motion estimation search strategies, and each strategy suggests different organizations of the reference blocks. For all three search strategies, 'searching' consists of calculating the 'sum of absolute differences' (SAD) metric between the current 16×16 macroblock (or 8×8 block) and any 16×16 macroblock (or 8×8 block) within the reference block plus a horizontal cost function plus a vertical cost function, always saving the best metric and the origin of the associated 16×16 macroblock (8×8 block).

The search pattern is governed by instruction sequences that are written by a controller node into the command queues in DVN memory. Unique command codes for each queue entry indicate the desired search mode.

The most general strategy allows for any one-position-at-a-time SAD256 operation on a 16 pixel by 16 pixel current block and any 16 pixel by 16 pixel macroblock within the reference block. For this general case, any combination of reference block rows and columns that does not exceed the 4032 byte reference block capacity is permitted.

A second search strategy evaluates at one time twenty five 16-by-16 pixel macroblocks within the reference block, using a 5-row by 5-column kernel. For this strategy, M (pixels per row) and N (pixels per column) should be integer multiples of 5.

Specifically, for a search range of m×5 by n×5 with an (B=16 pixel) by (B=16 pixel) macroblock:

M=m×5+[(B−1)=15], and

N=n×5+[(B−1)=15].

Allowable combinations for M and N that satisfy these equations and the 4032 byte buffer capacity constraint are shown in FIG. 6.

The third search strategy, hierarchical search, down-samples an m-by-n portion (any or all) of the reference block, and stores the resulting m/2-by-n/2 array in the 1024 byte down-sampled reference block (also referred to as the 'double pixel array'). The 16×16 current block also is down-sampled and the resulting 8-by-8 array is stored in the down-sampled current block buffer. The down-sampled reference block is exhaustively searched with the 8×8 down-sampled current block. The motion vector obtained from this step is used to search a small, 4-by-4 area in the reference block.

The relationship between the M-by-N reference block organization and the down-sampled reference block organization reflects the filter order, t, used in the down-sampling operation and the desired number of m×5 by n×5 searches in the double pixel array using the down-sampled (B=8) by (B=8) current block:

For t=4, 6, 8, the size of the reference block should be:

M=2×{m×5+[(B−1)=7]+(t−2)}, and

N=2×{m×5+[(B−1)=7]+(t−2)}

For resulting double pixel arrays of size:

N.sub.H=m×5+[(B−1)=7], and

N.sub.V=n×5+[(B−1)=7].

(Note: When bilinear interpolation is used for the down-sampling operation, the size of the reference block should be the same as for the t=4 case because the subsequent step of searching a 4×4 region within the reference block may require the additional pixels at the reference block boundaries).

Allowable combinations for M, N, m, n and t that satisfy these equations and the 4032 byte buffer capacity constraint are shown in FIG. 7.

For Each M-Pixel by N-Pixel Reference Block Transfer from the Data Mover to DVN Node Memory:

Rows 0, 4, 8, . . . , [M−(M)mod 4] are written into sequential locations in node memory zero;

Rows 1, 5, 9, . . . , [M−(M−1)mod 4] are written into sequential locations in node memory one;

Rows 2, 6, 10, . . . , [M−(M−2)mod 4] are written into sequential locations in node memory two;

Rows 3, 7, 11, . . . , [M−(M−3)mod 4] are written into sequential locations in node memory three.

An M=50 column by N=50 row reference block will be stored in node memories 0 through 3 as shown in FIG. 8.

The 50 pixel by 50 pixel reference block allows for a search range of +/−17 pixels in each dimension as shown in FIG. 9. There are 1225 candidate search positions within a 50 pixel by 50 pixel reference block. Five search positions are highlighted in FIG. 9: the center position, H(17), V(17); the upper-leftmost position, H(0), V(0); the upper rightmost position, H(34), V(0); the lower leftmost position, H(0), V(34); and the lower rightmost position, H(34), V(34).

Searching the center 5×5 positions concurrently within such a reference block is shown in FIG. 10. The total number of positions searched is 25. The search range is +/−2 pixels in each dimension. By convention, the designator for the upper leftmost pixel of the reference block will be H=0, V=0. The designator for any set of 5×5 macroblocks will be the offset of its upper leftmost pixel from the upper leftmost pixel of the reference block. In FIG. 10, the displacement in the reference block to the center set of 5×5 macroblocks is H=15, V=15.

Searching the center nine sets of 5×5 positions within such a reference block is shown in FIG. 11. The total number of positions searched is 9×(5×5)=225. The search range is +/−7 pixels in each dimension.

Exhaustively searching all 49 sets of 5×5 positions within such a reference block is shown in FIG. 12. The total number of positions searched is 49×(5×5)=1225. The search range is +/−17 pixels in each dimension.

A down-sampled 27×27 double pixel array is shown in FIG. 13. A reference block of 56×56, 58×58, or 60×60 will be required to support this operation for bilinear interpolation/4-tap filters, 6-tap filters, and 8-tap filters, respectively. Note that bilinear interpolation requires the same size reference block as does the 4-tap filter. The outer border is not required for the down-sampling operation; however, it may be required for the 4×4 search within the reference block that follows the searching of the double pixel array.

When the DVN is directed to generate a double pixel array from either of the 4032 byte reference blocks, it will read reference block data from memories 0 through 3, apply the specified filter, and write the double pixel array into the 1024 byte down-sampled reference block buffer in memories 4 through 7. For the 27-by-27 example of FIG. 13, the resulting double pixel array will be stored in memories 4 through 7 as shown in FIG. 14. Storing the array in four memories allows access to 16 bytes of the array each clock cycle during subsequent search operations.

Exhaustive search of the 27×27 double pixel array with a 5×5 kernel and 8×8 blocks requires 4×4=16 iterations to evaluate 16×25=400 positions. This is illustrated in FIG. 15.

Current Block Overview

There are several buffers allocated for the 'Current Block'. (See the DVN memory map, FIG. 4). These buffers are used to support multiple search strategies, including hierarchical search. As shown in FIG. 4, there are a pair of current block buffers, A and B, to support fully overlapped computation and data input. The Current Block Buffers A/B will be transferred from the Data Mover to DVN node memory where they will be written into node memories 4 through 7.

When bilinear interpolation is used to down-sample the reference blocks and the current blocks, each current block buffer will contain a 16 pixel by 16 pixel macroblock, or 256 bytes.

When a 4-tap filter is used for down-sampling, each current block will contain a (16+2=18) pixel by (16+2=18) pixel array, or 324 bytes.

When a 6-tap filter is used for down-sampling, each current block will contain a (16+4=20) pixel by (16+4=20) pixel array, or 400 bytes.

When an 8-tap filter is used for down-sampling, each current block will contain a (16+6=22) pixel by (16+6=22) pixel array, or 484 bytes.

Each current block buffer is stored in four physical memories to allow access to 16 pixels each clock period. For the 16 pixel by 16 pixel current block array:

Rows 0, 4, 8, and 12 will be stored in memory 4;
Rows 1, 5, 9, and 13 will be stored in memory 5;
Rows 2, 6, 10, and 14 will be stored in memory 6; and
Rows 3, 7, 11, and 15 will be stored in memory 7.
This is illustrated in FIG. 16-1.

For the 18 pixel by 18 pixel current block array:
Rows 0, 4, 8, 12, and 16 will be stored in memory 4;
Rows 1, 5, 9, 13 will be stored in memory 5;
Rows 2, 6, 10, 14 will be stored in memory 6; and
Rows −1, 3, 7, 11, 15 will be stored in memory 7.

This is illustrated in FIGS. 16-2. (Note that rows 0 through 15 represent the unpadded 16×16 macroblock; rows −1 and 16 represent the additional pixels required for the 4-tap filter operation).

For the 20 pixel by 20 pixel current block array:
Rows 0, 4, 8, 12, and 16 will be stored in memory 4;
Rows 1, 5, 9, 13, and 17 will be stored in memory 5;
Rows −2, 2, 6, 10, 14 will be stored in memory 6; and
Rows −1, 3, 7, 11, 15 will be stored in memory 7.

This is illustrated in FIGS. 16-3. (Note that rows 0 through 15 represent the unpadded 16×16 macroblock; rows −2, −1, 16 and 17 represent the additional pixels required for the 6-tap filter operation).

For the 22 pixel by 22 pixel current block array:
Rows 0, 4, 8, 12, and 16 will be stored in memory 4;
Rows −3, 1, 5, 9, 13, and 17 will be stored in memory 5;
Rows −2, 2, 6, 10, 14, and 18 will be stored in memory 6; and
Rows −1, 3, 7, 11, 15 will be stored in memory 7.

This is illustrated in FIGS. 16-4. (Note that rows 0 through 15 represent the unpadded 16×16 macroblock; rows −3, −2, −1, 16, 17 and 18 represent the additional pixels required for the 8-tap filter operation).

The down-sampling of these arrays to generate the 8×8 block used for double pixel search is illustrated in FIG. 17.

The DVN programmer may choose bilinear interpolation or one of the even order filters shown in FIG. 18 to down-sample the reference block and the current block prior to performing double pixel search. The 4-tap, 6-tap, and 8-tap, filters shown in FIG. 18 are associated with the WMV, H.264, and MPEG4 formats, respectively.

When the DVN is directed to generate an 8×8 down-sampled current block from either of the 576 byte current block buffers, it will read current block data from memories 4 through 7, apply the specified filter, and write the 64 byte down-sampled current block buffer in memories 0 through 3 as shown in FIG. 19. Storing the array in four memories allows access to 16 bytes of the array each clock cycle during subsequent search operations.

For hierarchical search, the 64 byte down-sampled current block data in memories 0 through 3 is used to search the double pixel array stored in memories 4 through 7. The unpadded 256 byte Current Block data stored in memories 4 through 7 is used to search the reference block data stored in memories 0 through 3. In both cases, this memory organization allows access to 32 bytes of data each clock cycle.

When the DVN programmer favors exhaustive full pixel search over hierarchical search, several of the allocated buffers in the DVN memory map become available for other purposes. When hierarchical search is not employed, the following are not required:

- The additional 320 bytes allocated to each Current Block buffer A/B,
- The 64 byte down-sampled Current Block buffer, and
- The 1024 byte down-sampled Reference Block buffer.

Hierarchical Search Summary

- Select 4032 Byte Reference Block A or 4032 Byte Reference Block B.
- Select 484 Byte Current Block A or 484 Byte Current Block B.
- From the selected reference block, bilinearly interpolate an m-by-n portion (any or all) of the reference block, and store the resulting m/2-by-n/2 array in the 1024 byte down-sampled reference block buffer. Also, bilinearly interpolate the selected 16×16 current block, and store the resulting 8-by-8 array in the down-sampled current block buffer. Alternatively, construct the clown-sampled reference block and current block using a higher even order filter. Note that 4-tap, 6-tap, and 8-tap filters require padded current blocks of 324, 400, and 484 pixels, respectively. (See FIGS. 13 and 17).
- With an 8×8 block, exhaustively search the down-sampled reference block (See FIG. 15).
- Using the motion vector obtained from the previous step, perform one 4×4 search (a subset of the 5×5 search kernel) within the selected reference block with the 16×16 current block stored in memories 4 through 7 as shown in FIG. 20.
- Using the results from the previous step, perform four sets of 5×5 searches with the four 8×8 blocks of the 16×16 current block, searching the 'best metric' 16×16 macroblock from the reference block as shown in FIG. 21.
- Use the motion vector(s) obtained from the previous step(s) as the basis for subsequent fractional pixel processing.

Exhaustive Search Summary

- Select 4032 Byte Reference Block A or 4032 Byte Reference Block B.
- Select 256 Byte Current Block A or 256 Byte Current Block B.
- With the selected 16×16 current block, exhaustively search the reference block (See FIG. 12 for an example of exhaustive search of a 50 pixel by 50 pixel reference block).
- use the motion vector obtained from the previous step as the basis for subsequent fractional pixel processing.

Fractional Pixel Motion Estimation

After determining a motion vector from hierarchical search or exhaustive search, the DVN programmer may choose to improve the motion vector estimate with half pixel search. Additionally, the programmer may choose to further improve the motion vector estimate with quarter pixel search. When fractional pixel processing is performed, the programmer must select between two strategies:

1) Load an 'oversized' reference block with a sufficient number of pixels to support interpolation for any search outcome. The size of such an 'oversized' reference block can be determined by the size of the current macroblock (m), the search range (h, v) and the number of taps (n) for the half pixel interpolation filter. Specifically, the size will be [m+h+n−1] horizontal pixels by [m+v+n−1] vertical pixels. For example, for a 16×16 pixel macroblock, +/−17 pixel search range horizontally and vertically, and an H.264 6-tap interpolation filter, the reference block must be 56×56 pixels, (3136 bytes) as shown in FIG. 22.

or

2) Load a reference block with the minimum number of pixels consistent with the desired search range. The size of such a reference block can be determined by the size of the current macroblock (m) and the search range (h, v). Specifically, the size will be [m+h−1] horizontal pixels by [m+v−1] vertical pixels. For example, for a 16×16 pixel macroblock and a +/−17 pixel search range horizontally and vertically, the reference block will be 50×50 pixels (2500 bytes), considerably smaller than the 3136 bytes required for strategy 1), above. Then, if the search outcome requires, reload the reference block buffer with [m+n] horizontal pixels by [m+n] vertical pixels before proceeding with the interpolation step. This is summarized in FIG. 23.

Note that when the 'four vector' mode is a component of the search strategy, then the size of the reference block must be increased to accommodate the additional search range. For example, for 8×8 searches with +2, −2 search range, the H.264-based 56×56 reference block-depicted in FIG. 22 must be increased by 4 pixels for each dimension to support 'four vector' mode as shown in FIG. 24.

Half Pixel Interpolation

After hierarchical search or exhaustive search to estimate the full pixel motion vector, half pixel interpolation is performed on the surrounding ([16+n]×[16+n]) pixel array, where n is the filter order. For bilinear interpolation, WMV, H.264, and MPEG4, n=2, 4, 6, and 8, respectively.

The calculations required for half pixel bilinear interpolation are summarized in FIG. 25.

The 35×35 half pixel array that results from bilinear interpolation of the 18×18 full pixel array associated with the 'best metric' 16×16 macroblock is shown in FIG. 26.

The 19×19 half pixel array that results from bilinear interpolation of the 10×10 full pixel array associated with an 8×8 block is shown in FIG. 27.

The half pixel array that results from H.264 6-tap filter interpolation is shown in FIG. 28.

The half pixel array that results from H.264 6-tap filter interpolation for an 8×8 block is shown in FIG. 29.

The half pixel array that results from MPEG4 8-tap filter interpolation is shown in FIG. 30.

The half pixel array that results from MPEG4 8-tap filter interpolation for an 8×8 block is shown in FIG. 31.

If one wishes to defer the 1MV/4MV decision until half pixel search has been performed, a 43×43 half pixel array referenced to the full pixel 16×16 motion vector allows one 16×16 search and four 8×8 searches. This is shown in FIG. 32.

Note that the 43×43 array corresponds to full pixel 8×8 search ranges of +2, −2 pixels and half pixel search ranges of +½, −½ pixels for both 16×16 and 8×8 searches).

A summary of supported half pixel interpolation FIR filters is shown in FIG. 33. For the half pixel positions of ½ pixel-horizontal-shift and ½ pixel-vertical-shift, the same filters are used on the full pixel, ½ pixel interpolated values, maintaining the full precision of these values.

Half Pixel Search

After half pixel interpolation using one of the four filtering options, the half pixel metrics are calculated for each of nine candidate half pixel positions. The metric is the sum of the SAD256 (SAD64 for 8×8 blocks) metric plus the half pixel cost function. A numbering convention for the nine candidate half pixel positions is shown in FIG. 34. Note from the figure that the full pixel metric for the full pixel position (position '5') has been calculated previously. However, the half pixel metric for position '5' will be the its full pixel metric, minus its full pixel horizontal and vertical cost functions, plus its half pixel cost function for this position.

Half pixel search consists of generating the metric of SAD+half pixel cost function for each of the nine candidates and selecting the one that has the best metric.

Memory Maps for Half Pixel Arrays

The memory map for the 43×43 half pixel array that allows both one 16×16 search and four 8×8 searches is shown in FIG. 35.

The memory map for the 35×35 half pixel array generated from a 16 pixel×16 pixel Macroblock is shown in FIG. 36.

The memory map for four buffers for 19×19 half pixel arrays that will be generated from 8 pixel×8 pixel blocks is shown in FIG. 37. (The programmer specifies into which of the four buffers the half pixel array should be written.)

Quarter Pixel Interpolation

After half pixel search for the 16×16 macroblock (8×8 blocks) with the best distortion metric, quarter pixel interpolation is performed on the surrounding ([16+n]×[16+n]) pixel array, where n is the filter order. For WMV, n=4; for H.264, and MPEG4, which use bilinear interpolation, n=2.

The WMV sub-pixel four tap FIR filters for the ¼ pixel position, the ½ pixel position, and the ¾ pixel position are summarized in FIG. 38.

Quarter Pixel Search

After quarter pixel interpolation, the quarter pixel metrics are calculated for each of nine candidate quarter pixel positions. The metric is the sum of the SAD256 (SAD64) metric plus the quarter pixel cost function. A numbering convention for the nine candidate quarter pixel positions is shown in FIG. 39. Note from the figure that only nine-of-16 quarter pixel positions must be calculated. Note, too, that one metric for one of the nine candidate quarter pixel positions (position '5') has been calculated previously. However, the quarter pixel metric for position '5' will be its half pixel metric, minus its half pixel cost function, plus its quarter pixel cost function for this position.

Quarter pixel search consists of generating the metric of SAD+quarter pixel cost function for each of the nine candidates and selecting the one that has the best metric.

Memory Maps for Quarter Pixel Arrays

The memory map for the 2048 bytes of quarter pixel data generated from the half pixel array associated with a 16 pixel×16 pixel macroblock is shown in FIG. 40. For the nine candidate quarter pixel 16×16 macroblocks, only eight 16×16 macroblocks, a total of 2048 bytes, are stored in the quarter pixel buffer.

Because of buffer size limitations, the 256 bytes associated with the ninth (center) position ['candidate (5)' shown in FIG. 36] will not be stored in the quarter pixel buffer; these bytes are available in the half pixel buffer which stores the 35-row by 35-column array. The location of this 16×16 macroblock is a function of which of nine candidate half pixel 16×16 macroblocks corresponds to the center position of the quarter pixel data. Specifically:

For half pixel position 1, the 16×16 macroblock is stored in the sixteen columns 1, 3, 5, 7, 9, 11, 13, 15, 17, 19, 21, 23, 25, 27, 29, and 31 of the sixteen rows 1, 3, 5, 7, 9, 11, 13, 15, 17, 19, 21, 23, 25, 27, 29, and 31.

For half pixel position 2, the 16×16 macroblock is stored in the sixteen columns 2, 4, 6, 8, 10, 12, 14, 16, 18, 20, 22, 24, 26, 28, 30, and 32 of the sixteen rows 1, 3, 5, 7, 9, 11, 13, 15, 17, 19, 21, 23, 25, 27, 29, and 31.

For half pixel position 3, the 16×16 macroblock is stored in the sixteen columns 3, 5, 7, 9, 11, 13, 15, 17, 19, 21, 23, 25, 27, 29, 31, and 33 of the sixteen rows 1, 3, 5, 7, 9, 11, 13, 15, 17, 19, 21, 23, 25, 27, 29, and 31.

For half pixel position 4, the 16×16 macroblock is stored in the sixteen columns 1, 3, 5, 7, 9, 11, 13, 15, 17, 19, 21, 23, 25, 27, 29, and 31 of the sixteen rows 2, 4, 6, 8, 10, 12, 14, 16, 18, 20, 22, 24, 26, 28, 30, and 32.

For half pixel position 5, the 16×16 macroblock is stored in the sixteen columns 2, 4, 6, 8, 10, 12, 14, 16, 18, 20, 22, 24, 26, 28, 30, and 32 of the sixteen rows 2, 4, 6, 8, 10, 12, 14, 16, 18, 20, 22, 24, 26, 28, 30, and 32.

For half pixel position 6, the 16×16 macroblock is stored in the sixteen columns 3, 5, 7, 9, 11, 13, 15, 17, 19, 21, 23, 25, 27, 29, 31, and 33 of the sixteen rows 2, 4, 6, 8, 10, 12, 14, 16, 18, 20, 22, 24, 26, 28, 30, and 32.

For half pixel position 7, the 16×16 macroblock is stored in the sixteen columns 1, 3, 5, 7, 9, 11, 13, 15, 17, 19, 21, 23, 25, 27, 29, and 31 of the sixteen rows 3, 5, 7, 9, 11, 13, 15, 17, 19, 21, 23, 25, 27, 29, 31, and 33.

For half pixel position 8, the 16×16 macroblock is stored in the sixteen columns 4, 6, 8, 10, 12, 14, 16, 18, 20, 22, 24, 26, 28, 30, and 32 of the sixteen rows 3, 5, 7, 9, 11, 13, 15, 17, 19, 21, 23, 25, 27, 29, 31, and 33.

For half pixel position 9, the 16×16 macroblock is stored in the sixteen columns 3, 5, 7, 9, 11, 13, 15, 17, 19, 21, 23, 25, 27, 29, 31, and 33 of the sixteen rows 3, 5, 7, 9, 11, 13, 15, 17, 19, 21, 23, 25, 27, 29, 31, and 33.

The byte maps for the nine possibilities are shown in FIGS. 41 through 49, for positions one through nine, respectively.

For fractional pixel processing of 8 pixel×8 pixel blocks, the 2048 byte quarter pixel buffer is organized as four 512 byte quarter pixel buffers. A memory map for these four buffers is shown in FIG. 50. For the nine candidate quarter pixel 8×8 blocks, only eight 8×8 blocks, a total of 512 bytes, are stored in one of the four 512 byte quarter pixel buffers.

Because of buffer size limitations, the 64 bytes associated with the ninth (center) position ['candidate (5)' shown in FIG. 39] will not be stored in the quarter pixel buffer; these bytes are available in the half pixel buffer which stores the 19-row by 19-column array. The location of the center 8×8 block is a function of which of nine candidate half pixel 8×8 blocks corresponds to the center position of the quarter pixel data. Specifically:

For half pixel position 1, the 8×8 block is stored in the eight columns 1, 3, 5, 7, 9, 11, 13, and 15 of the eight rows 1, 3, 5, 7, 9, 11, 13, and 15.

For half pixel position 2, the 8×8 block is stored in the eight columns 2, 4, 6, 8, 10, 12, 14, and 16 of the eight rows 1, 3, 5, 7, 9, 11, 13, and 15.

For half pixel position 3, the 8×8 block is stored in the eight columns 3, 5, 7, 9, 11, 13, 15, and 17 of the eight rows 1, 3, 5, 7, 9, 11, 13, and 15.

For half pixel position 4, the 8×8 block is stored in the eight columns 1, 3, 5, 7, 9, 11, 13, and 15 of the eight rows 2, 4, 6, 8, 10, 12, 14, and 16.

For half pixel position 5, the 8×8 block is stored in the eight columns 2, 4, 6, 8, 10, 12, 14, and 16 of the eight rows 2, 4, 6, 8, 10, 12, 14, and 16.

For half pixel position 6, the 8×8 block is stored in the eight columns 3, 5, 7, 9, 11, 13, 15, and 17 of the eight rows 2, 4, 6, 8, 10, 12, 14, and 16.

For half pixel position 7, the 8×8 block is stored in the eight columns 1, 3, 5, 7, 9, 11, 13, and 15 of the eight rows 3, 5, 7, 9, 11, 13, 15, and 17.

For half pixel position 8, the 8×8 block is stored in the eight columns 2, 4, 6, 8, 10, 12, 14, and 16 of the eight rows 3, 5, 7, 9, 11, 13, 15, and 17.

For half pixel position 9, the 8×8 block is stored in the eight columns 3, 5, 7, 9, 11, 13, 15, and 17 of the eight rows 3, 5, 7, 9, 11, 13, 15, and 17.

The byte maps for the nine origins are shown in FIGS. 51 through 59, for positions one through nine, respectively.

When (if the 1MV/4MV decision is deferred until results are compared for half pixel Searches, then locating the center of nine candidate positions in the 43×43 half pixel array for subsequent quarter pixel searches becomes more challenging (See FIG. 32). For the 16×16 motion vector, there are nine possibilities. The upper leftmost pixel of the center of nine possibilities is located in column 6 of row 6 of the half pixel array (columns and rows numbered from 0 through 42). The physical location in memory for this pixel is: memory 6, address 0x0D4, bits[23:16].

For each of four 8×8 searches, there are twenty five possible motion vectors for half pixel search, and for each of the 25, nine possible motion vectors for subsequent quarter pixel search! One (and only one) example:-)

For the lower right 8×8 block, for a full pixel vector (relative to the 16×16 motion vector) of H=10, V=10 and a half pixel vector (relative to this 8×8 full pixel vector) of H=−½, V=−½, the upper leftmost pixel of the center of nine possibilities for the quarter pixel search is located in column 25 of row 25 of the half pixel array (columns and rows numbered from 0 through 42). The physical location in memory for this pixel is: memory 5, address 0x110, bits[15:8].

Cost Function Tables

The cost function tables are stored in node memory. The cost function is an unsigned 16 bit integer. For an M-column by N-row reference block, there are (M−7) horizontal cost functions and (N−7) vertical cost functions. In each cost function table, two 16 bit integer cost functions are packed into each 32 bit longword in the table.

Cast Function Tables A/B will be stored in node memories 4 and 5 as shown in FIG. 60.

The fractional pixel cost functions are shown in FIG. 61. Three 16 bit integers are required for the half pixel cost functions; six 16 bit integers are required for the quarter pixel cost functions.

For each full pixel search position, the DVN evaluates the metric:

SAD256 plus horizontal cost function plus vertical cost function.

For an M-column by N-row reference block, there are (M−15) horizontal cost functions and (N−15) vertical cost functions.

For each double pixel search position, the DVN evaluates the metric:

SAD64 plus (horizontal cost function plus vertical cost function)/4.

For hierarchical search, for the final four sets of 8×8 block evaluations, there are four pairs of horizontal/vertical cost functions. The DVN evaluates the metric:

SAD64 plus (horizontal cost function plus vertical cost function)/4.

For fractional pixel searches with a 16×16 macroblock, the DVN evaluates the metric:

SAD256 plus fractional pixel horizontal cost function plus fractional pixel vertical cost function.

For fractional pixel searches with an 8×8 block, the DVN evaluates the metric:

SAD64 plus (fractional pixel horizontal cost function plus fractional pixel vertical cost function)/4.

DVN Node Memory Access Summary

During double pixel search, the DVN motion estimation engine (ME) reads down-sampled reference block data from memories four through seven, and it reads down-sampled current block data from memories zero through three.

During full pixel search, the DVN motion estimation engine (ME) reads reference block data from memories zero through three, and it reads current block data from memories four through seven.

During half pixel interpolation, the ME reads full pixel reference block data from memories zero through three, and it writes half pixel interpolated data into memories four through seven. When half pixel search is performed concurrently with half pixel interpolation, the ME reads current block data from memories four through seven.

During quarter pixel interpolation, the ME reads half pixel interpolated data from memories four through seven, and it writes quarter pixel interpolated data into memories four through seven. When quarter pixel search is performed concurrently with quarter pixel interpolation, the ME reads current block data from memories four through seven.

During output, the ME reads full pixel macroblocks from memories zero through three, fractional pixel macroblocks from memories four through seven; and for macroblock signed differences, current blocks from memories four through seven.

Macroblock Signed Differences

The DVN will be capable of calculating and outputting a 256 (64) element array of 9-bit signed differences between any 16 pixel by 16 pixel macroblock (8 pixel by 8 pixel block) in DVN node memory (full pixel, half pixel, or quarter pixel) and either 16 pixel by 16 pixel current block (8 pixel by 8 pixel block) in DVN node memory. The array is output to a destination node as 128 (32) longwords, where each longword is a packed pair of 16-bit signed integers representing the sign-extended 9-bit signed differences of the 16×16 macroblocks (8×8 blocks).

The first element of the array is packed into bits[15:0] of the first longword, the second element of the array is packed into bits[31:16] of the first longword, the third element of the array is packed into bits[15:0] of the second longword, and so on.

Programming Issues Related to the DVN

A block diagram that depicts the DVN programming environment is shown in FIG. 62.

High level control of the DVN is provided by the hardware task manager (HTM) in the DVN node wrapper and a finite state machine (FSM) in the DVN EU. This interface includes the ACM-standard EU_RUN, EU_CONTINUE, and EU_TEARDOWN signals from the wrapper to the EU, and the ACK+TEST and EU_DONE responses from the EU to the wrapper.

The transition table for the FSM is shown in FIG. 63.

The FSM assumes one of six states:

Idle

Setup

Execute

Ack+test

Wait

Continue

When the node is not enabled or the eu is not enabled, the FSM will enter, and remain in, its idle state. The FSM will also transition to its idle state whenever the node wrapper asserts the 'eu_abort' signal. Additionally, the FSM transitions to the idle state when it exits the wait state in response to the node wrapper's assertion of the 'eu_teardown' signal.

A typical operational sequence for the FSM will include the following transitions:

idle to setup in response to the node wrapper's assertion of the 'eu_run' signal.

During setup, byte code controls the initialization of the eu, loading its configuration registers with parameters stored in a 'task parameter list' (TPL) located in node memory.

Setup to execute in response to the setup byte code: DONE.

During execute, the eu processes instructions from a command queue to perform the motion estimation operations of full pixel search, fractional pixel interpolation, fractional pixel search, macroblock signed differences, and the outputting of results.

execute to ack+test when the DONE instruction is read from the command queue.

During ack+test, acknowledgements are sent to the network to indicate how much data was produced and consumed during the motion estimation phase. Typically, the final acknowledgement will include the 'test' indication to query the node wrapper's hardware task manager (HTM): ? what's next ?

ack+test to wait in response to ack+test byte code: ACK+TEST.

The FSM remains in its wait state until it receives its ? what's next ? response from the node wrapper.

wait to idle in response to the node wrapper's assertion of the 'eu_teardown' signal. FSM asserts 'eu_done wait to continue in response to the node wrapper's assertion of the 'eu_continue' signal.

During continue, byte code controls the reloading of certain eu registers with parameters from the TPL located in node memory.

continue to execute in response to continue byte code: DONE.

The above sequence returns control of the FSM to the node wrapper's HTM after ack+test. The DVN also can be programmed to retain control after 'ack-ing'. Options include conditional/unconditional state transitions to continue or idle (after asserting 'eu_done'). Test conditions include the sign (msb) of any of the node wrapper's 64 counters, the sign (msb) of certain TPL entries, and the sign (msb) of a byte code controlled 5-bit down counter.

All of the information required for task execution is contained in a 'task parameter list' (TPL) located in node memory. During setup, DVN hardware retrieves from its node memory a pointer to the TPL. Pointers for up to 31 tasks are stored in 31 consecutive words in node memory at a location specified by the node wrapper signals: {tpt_br[8:0], active_task[4:0]}.

Each DVN TPL is assigned 64 longwords of node memory. The first eight entries of the TPL are reserved for specific information. The remaining 56 longwords are available to store parameters for setup, ack+test, and continue.

TPL location 0x00 contains two parameters for setup: the starting address in node memory for its byte code and the offset from the TPL pointer to its parameters.

TPL location 0x01 contains two parameters for ack+test: the starting address in node memory for its byte code and the offset from the TPL pointer to its parameters.

TPL location 0x02 contains one parameter for teardown: the starting address in node memory for its byte code. (Currently, there is nothing to 'teardown', so this is a placeholder in the event that there is a requirement later on).

TPL location 0x03 contains three parameters for continue: the starting address in node memory for its byte code and the offsets from the TPL pointer to its two sets of parameters.

TPL locations 0x04 and 0x05 are used for a pair of semaphores that the byte code can manipulate; and locations 0x06 and 0x07 are reserved for tbd.

TPL locations 0x08 through 0x3F are available for storing all other task parameters.

The layout for the DVN task parameter list is shown in FIG. 64.

The TPL stores sets of parameters for each of three states: setup, ack+test, and continue. For the continue state, there can be two sets of parameters, with each set having the same number of parameters but different TPL pointer offsets. This allows for the conditional selection between one-of-two sets of global parameters, such as consumer node(s) destination, fractional pixel interpolation filters, and so on.

The set of parameters for a specific state must be stored in consecutive locations in the TPL. As byte code LOAD instructions execute, the DVN hardware selects the next parameter in the set.

The offset from the TPL pointer to the location of the first parameter for that state must be in the range: 0x08 to 0x3F.

DVN TPL Memory/Register Formats

The format for TPL locations 0x00 through 0x03 that contain byte code starting addresses and TPL pointer offsets is shown in FIG. 65.

The format for the two semaphores at TPL locations 0x04 and 0x05 is shown in FIG. 66.

The format for the ack+test parameters beginning at TPL location (TPL pointer plus ack+test offset) is shown in FIG. 67.

The formats for the registers that are loaded with TPL parameters during setup and continue are shown in FIG. 68.

Control and Status Register (CSR)

The DVN CSR includes fields which specify which interpolation filters to use, how to interpolate at reference block edges, offsets for the horizontal/vertical cost function tables, the number of longwords per row in the selected reference block buffer, and which ping/pong buffer pairs to use.

Fractional Pixel Interpolation Filter Selection Bits[4:0]

| 4 3 2 1 0 | Filter |
|---|---|
| 0 0 0 0 1 | Bilinear Interpolation |
| 0 0 0 1 0 | MPEG4 |
| 0 0 1 0 0 | H.264 |
| 0 1 0 0 0 | WMV |
| 1 0 0 0 0 | TBD |

Interpolation Method at Reference Block Edges Bits[6:5]

| Bit 6 | Bit 5 | Method |
|---|---|---|
| 0 | 0 | all required pixels are in DVN node memory |
| 0 | 1 | mirror |
| 1 | 0 | replicate |
| 1 | 1 | ? other ? |

WMV Version 9.0 Frame-Level Round Control Value Bit[7]

Vertical Cost Function Table Offset Bits[14:8]

Bits[14:8] represent an unsigned 7-bit integer that is added to the vertical displacement of a macroblock to form the address of the vertical cost function table. This allows for possible cost function table reuse for more than one current block.

Horizontal Cost Function Table Offset Bits[22:16]

Bits[22:16] represent an unsigned 7-bit integer that is added to the horizontal displacement of a macroblock to form the address of the horizontal cost function table. This allows for possible cost function table reuse for more than one current block.

Reference Block Longwords Per Row Bits[28:24]

The number of longwords comprising a reference block row is required by the node memory addressing unit to support strides from row (k) to row (k+4). The range for bits[28:24] is 8 through 25. (See FIG. 5).

Buffer Elector Bits[31:29]

Each of three bits selects between a pair of ping/pong buffers:

| Bit 29 | Reference Block Buffer Selection |
|---|---|
| 0 | Reference Block A |
| 1 | Reference Block B |

| Bit 30 | Current Block Buffer Selection |
|---|---|
| 0 | Current Block A |
| 1 | Current Block B |

| Bit 31 | Cost Function Buffer Selection |
|---|---|
| 0 | Cost Function Table A |
| 1 | Cost Function Table B |

Controller Node Locator Register (CNLR)

The DVN communicates with its controller using the PTP protocol, which requires a port number (bits[5:0]) and a node id (bits[15:8]). Additionally, this register indicates which of the node wrapper's 64 flags will be used for Command Queue Redirection.

Command Queue Redirection Flag Bits[21:16]

While processing a command queue, the DVN will monitor one of 64 node wrapper counter sign bits indicated by bits[31:16] after it completes the execution of each instruction. When the counter sign bit is set to 1 'b1, the DVN will clear the bit, send the Command Queue Redirection Acknowledgement to the controller, load the queue 7-bit program counter with the value in the controller-programmable 7-bit redirection register, and resume processing at this location.

Destination Nodes Locator Register (DNLR)

When processing command queue instructions that include output to destination (consumer) nodes, the DVN will use its one bit logical output port field to select one of two destination nodes: When the bit is set to 1 'b0, its output will be directed to node id (bits(15:8), port number (bits[5:0]); and when the bit is set to "b1, its output will be directed to node id (bits[31:24]), port number (bits[21:16]).

DVN Byte Codes

The DVN overhead processor (OHP) interprets two distinct sets of byte codes: one for setup and continue and another for ack+test. The FSM state indicates which set should be used by the byte code interpreter.

For setup and continue, there is only one byte code: LOAD as shown in FIG. 69.

There is a more comprehensive set of byte codes for ack+test. These are summarized in FIGS. 70-1 through 70-5.

Note

At this time, ack+test byte codes 0x80 through 0xFF are reserved, and the current implementation treats these codes as NOPs, or 'no operation'.

For the DVN, one of the programming steps requires writing byte code and generating task parameter lists. Byte code is always executed 'in line', and byte code must start on longword boundaries. Byte code execution is 'little endian'; that is, the first byte code that will be executed is byte[7:0] of the first longword, then byte[15:8], then byte[23:16], then byte[31:24], then byte[7:0] of the second longword, and so on.

TPL/Byte Code Programming Example:

The task parameter list and byte code for a 'typical' task are shown in FIG. 71. The TPL consists of 21 longwords, and there are 5 longwords of byte code.

Setup requires three clock cycles to load registers from the TPL; DONE is indicated in the last of three cycles.

ack+test requires a minimum of ten clock cycles: two for producer acknowledgements, two for consumer acknowledgements, two (or more) to test (and wait, if necessary) for input buffer ready, two (or more) to test (and wait, if necessary) for output buffer ready, and two to test a counter sign to select one of two sets of configuration registers.

continue requires three clock cycles to, update the CSR, CNLR, and DNLR configuration registers.

Command Queue Overview

Introduction

Programming requirements for the DVN include the creation of sequences of instructions that are stored in the command queue in DVN node memory (the DVN memory map is shown in FIG. 4). These instructions control the motion estimation operations of double pixel search, full pixel search, fractional pixel interpolation, fractional pixel search, perhaps macroblock signed differences, and the outputting of results.

In the memory map, the 512 byte command queue is located in node memory 7 at physical addresses 0x140 to 0x1BF. The programmer could view this resource as two distinct queues that store a fixed set of instructions in one (or both) static command queue(s); or the programmer could construct an interactive sequence of commands in one (or both) dynamic command queue(s), and select between the two queues on a macroblock-by-macroblock basis. Including a second command queue allows for terminating one sequence of instructions and continuing with a new sequence of instructions, while preserving the entire previous sequence of instructions for subsequent reuse.

In general, the programmer can manage the 128 longword command queue resource in any number of ways. The programmer may view this resource as one 128-longword queue, two 64-longword queues, one larger queue that holds the 'most likely' sequences of instructions plus a smaller queue used as a 'scratch' for 'if' sequences of instructions, and so on.

The DVN controller node writes into the command queue using the PTP protocol after it has initialized the appropriate entry in the DVN wrapper port translation table (PTT).

To initialize the PTT, the programmer will use Service Code 0x6:

Poke Address+Data(D16+A12),EU=0.

A12={7 'b0100000, p[4:0]}, where p[4:0] is the desired port number.

D16={9 'b011110101, a[6:0]}, where a[6:0] is the one of 128 locations in the command queue where the first entry will be written.

It is important to note that after each PTP write operation, the node wrapper PTT address generator post increments by one (modulo buffer size, which is 128 in this example), so that the command queue addressing sequence will be 0, 1, . . . , 126, 127, 0, 1 and so on.

The DVN fetches command queue instructions using a queue 7-bit counter. When the counter is initialized to zero, it will be pointing to location 0 of the command queue. After each command queue instruction has been processed, the counter will be incremented by one. When the counter state is 0x7F, corresponding to the last location in the queue, its next state will be 0x00, the first location in the queue.

There is a poke-able 7-bit 'redirection' register in the DVN that allows the programmer to alter the contents of the queue counter.

To write this register, the programmer will use Service Code 0x6: Poke Address+Data (D16+A12), EU=1.
A12=12 'b000000000000; and
D16={9 'b000000000, reg_val[6:0]}.

The following events will result in the loading of the 7-bit queue counter with the contents of this 7-bit register.

1) the DVN FSM state: setup+byte code: DONE.

2) 2) the DVN responding to the Command Queue Redirection Indication (QRI).

While the DVN is processing an instruction sequence fetched from the command queue, the controller can redirect the DVN to a different instruction using the QRI. The QRI is simply one of 64 counter signs in the DVN node wrapper. The controller writes the appropriate PCT/CCT counter with the msb set to 1 'b1. (We assume here that the bit had previously been initialized to 1 'b0). The DVN will sample this bit after it has completed the processing of an instruction; it will also sample this bit while it is waiting for the next valid instruction to be written into the queue; finally, when there is 'search early termination', the DVN command queue interpreter will continuously sample the QRI until it is asserted.

At DVN task setup, a six bit register is loaded from the TPL to select the appropriate one-of-64 counter signs that will be used for the QRI. In response to QRI recognition by the DVN, it will clear this bit by sending the 'self-ack, initialize counter' MIN word, and it will send the Command Queue Redirection Acknowledgement to the controller (See below).

Description of the DVN Command Queue Data Structures

The data structure for the command queue is shown in FIG. 72.

Command 0x0 Wait.

Command 0x0 is used for the 'wait' instruction. When the DVN reads a queue entry: 'Command 0x0, Wait', it will stall until some other command is written into that entry or until it is redirected by the QRI.

Command 0x1 Echo

The ECHO command instructs the DVN to return a status word that is the bit pattern cif the command itself. This is intended to be a diagnostics aid.

Command 0x2 Load Threshold Register for Early Termination of Search

This command instructs the DVN to load its Search Threshold Register (STR) with Bits[15:0] of the command. During search, the DVN will compare the 'best metric' with the STR contents. When the early termination indication is enabled and the 'best metric' is less than this value, the 'threshold bettered' indication will be asserted in the DVN message to the controller node. The command queue interpreter will stall until it receives its QRI redirection indication from the controller node telling it 'what's next?'

Command 0x3 Down-Sample the Indicated Block

When Bit[24]=1 'b0/1'b1, down-sample the reference block/current block using the filter indicated by Bits [17:16] to generate a double pixel array.

| Bits [17:16] | Filter |
|---|---|
| 0 0 | Bilinear Interpolation |
| 0 1 | 4-tap WMV |
| 1 0 | 6-tap H.264 |
| 1 1 | 8-tap MPEG4 |

The entire reference block will be down-sampled, and its size must be specified by bits[14:8], X pixels, for the number of pixels per row, and by bits[6:0], Y pixels, for the number of pixels per column. Allowable combinations for X and Y which do not exceed the 4032 byte reference block capacity are summarized in FIG. 5.

For the current block, the input array must be 16×16=256 pixels, 18×18=324 pixels, 20×20=400 pixels, or 22×22=484 pixels for bilinear interpolation, 4-tap filter, 6-tap filter, and 8-tap filter, respectively.

Command 0x4 Search

Evaluate the Sum of Absolute Differences (SAD) plus Horizontal Cost Function plus Vertical Cost Function for a single position or one or more sets of positions for 16×16 macroblocks or 8×8 blocks.

The various search parameters allow for a number of different search strategies:

| Bit[27] | Block Size |
|---|---|
| 0 | 8 × 8 Block |
| 1 | 16 × 16 Macroblock |

When bit[27], block size, is set to 1 'b0, search will be performed with an 8×8 block from the current block or the down-sampled current block. (The specific block is indicated with bits[23:20]). The evaluated metric will be:

SAD64 plus (horizontal cost function plus vertical cost function)/4

When bit[27] is set to 1 'b1, search will be performed with the 16×16 current block. The evaluated metric will be:

SAD256 plus horizontal cost function plus vertical cost function.

| Bit[26] | Search Origin |
|---|---|
| 0 | Motion vector from previously determined 'Best Metric' |
| 1 | X location (bits[14:8]), Y location (bits[6:0]) |

When bit[26] is set to 1 'b0, the search origin will be X, Y offsets stored in the motion vector register (or the Results Buffer in Node Memory). When bit[26] is set to 1 'b1, the search origin will be the X,Y locations indicated by bits[14:8] and bits[6:0], respectively, of the search command.

When the X,Y option is selected for double pixel search of the down-sampled reference block (where all motion vectors are at ½ pixel positions), the '½' pixel component of the motion vector is implied.

Note that the upper leftmost motion vector for the down-sampled reference block will be X=Y=11/2, X=Y=21/2, or X=Y=31/2 when the down-sampling was performed with bilinear interpolation or 4-tap filter, 6-tap filter, or 8-tap filter, respectively.

| Bit[25] | Half Pixel Buffer Organization |
|---|---|
| 0 | 'Normal'; 16 × 16 -> 35 × 35 and 8 × 8 -> 19 × 19 |
| 1 | 1 MV/4MV; combined 16 × 16, 8 × 8 -> 43 × 43 |

When the search strategy includes 1MV/4MV comparisons at half pixel resolution, bit[25] should be set to 1 'b1 to indicate that a 43×43 half pixel array exists in node memory. Otherwise, bit[25] should be set to 1 'b0 to indicate that a 35×35 half pixel array (for 16×16 searches) or four 19×19 half pixel arrays (for 8×8 searches) exists in node memory.

| Bit[24] | Early Termination |
|---|---|
| 0 | Disable |
| 1 | Enable |

For all search commands, bit[24], early termination, may be set to either 1 'b0 or 1 'b1 to disable/enable the early termination function.

When early termination is enabled, any trial that produces a metric less than the value in the STR will result in the DVN terminating the search, sending appropriate status to the controller node, and stalling until it receives a QRI.

(Note: When the search is over a set of positions, all positions will be evaluated before the resulting 'best metric' is compared with the value in the STR).

When early termination is disabled, the DVN will process the command, send status to the controller node, then fetch the next command from the queue.

| Bits[23:20] | Buffer Select |
|---|---|
| 0 0 0 0 | Search the down-sampled double pixel reference block |
| 0 0 0 1 | Search the reference block (16 × 16) |
| 0 1 0 0 | Search the reference block (8 × 8 upper left) |
| 0 1 0 1 | Search the reference block (8 × 8 upper right) |
| 0 1 1 0 | Search the reference block (8 × 8 lower left) |
| 0 1 1 1 | Search the reference block (8 × 8 upper right) |
| 1 0 0 0 | Search half pixel buffer 1 |
| 1 0 0 1 | Search half pixel buffer 2 |
| 1 0 1 0 | Search half pixel buffer 3 |
| 1 0 1 1 | Search half pixel buffer 4 |
| 1 1 0 0 | Search quarter pixel buffer 1 |
| 1 1 0 1 | Search quarter pixel buffer 2 |
| 1 1 1 0 | Search quarter pixel buffer 3 |
| 1 1 1 1 | Search quarter pixel buffer 4 |

For 16×16 fractional pixel searches (One Vector Mode), the programmer must set bits[23:20] to select the buffers 1, that is 0x8 for half pixel buffer 1 and 0xC for quarter pixel buffer 1.

For 8×8 fractional pixel searches (Four Vector Mode), the buffers 1, 2, 3, and 4 are associated with the upper leftmost 8×8 block, the upper rightmost 8×8 block, the lower leftmost 8×8 block, and the lower rightmost 8×8 block, respectively. Therefore:

for the upper leftmost 8×8 block, the programmer must set bits[23:20] to 0x8 for half pixel buffer 1 and 0xC for quarter pixel buffer 1;

for the upper rightmost 8×8 block, the programmer must set bits[23:20] to 0x9 for half pixel buffer 2 and 0xD for quarter pixel buffer 2, for the lower leftmost 8×8 block, the programmer must set bits[23:20] to 0xA for half pixel buffer 3 and 0xE for quarter pixel buffer 3; and for the lower rightmost 8×8 block, the programmer must set bits[23:20] to 0xB for half pixel buffer 4 and 0xF for quarter pixel buffer 4.

When bits[23:20], buffer select, are set to 0x0, search will be performed within the down-sampled double pixel reference block using the down-sampled 8×8 current block. (Note: Bit[27] must be set to 1 'b0 when bits[23:20] are set to 0x0).

The evaluated metric will be:

SAD64 plus (horizontal cost function plus vertical cost function)/4.

When bits[23:20] are set to 0x1, search will be performed within the reference block using the 16×16 current block. Bit[27] must be set to 1 'b1.

The evaluated metric will be:

SAD256 plus horizontal cost function plus vertical cost function.

When bits[23:20] are set to 0x4, 0x5, 0x6, or 0x7, search will be performed within the reference block using the upper left, upper right, lower left, or lower right 8×8 block of the current block, respectively. Bit[27] must be set to 1 'b0.

The evaluated metric will be:

SAD64 plus (horizontal cost function plus vertical cost function)/4.

When bits[23:20] are set to 0x8, full search with half pixel resolution will be performed on the nine candidate positions within half pixel buffer 1 (or the corresponding area of the 43×43 half pixel array for combined 1MV/4MV mode). With bit[27], block size, the programmer can select either 16×16 or 8×8 search mode. For the 8×8 mode, the upper leftmost 8×8 block of the current block will be used.

For half pixel searches with a 16×16 macroblock, the DVN evaluates the metric:

SAD256 plus half pixel horizontal cost function plus half pixel vertical cost function.

For half pixel searches with an 8×8 block, the DVN evaluates the metric:

SAD64 plus (half pixel horizontal cost function plus half pixel vertical cost function)/4.

When bits[23:20] are set to 0x9, full search with half pixel resolution will be performed on the nine candidate positions within half pixel buffer 2 (or the corresponding area of the 43×43 half pixel array for combined 1MV/4MV mode). Bit [27] must be set to 1 'b0 to indicate 8×8 search mode, and the upper rightmost 8×8 block of the current block will be used.

When bits[23:20] are set to 0xA, full search with half pixel resolution will be performed on the nine candidate positions within half pixel buffer 3 (or the corresponding area of the 43×43 half pixel array for combined 1MV/4MV mode). Bit [27] must be set to 1 'b0 to indicate 8×8 search mode, and the lower leftmost 8×8 block of the current block will be used.

When bits[23:20] are set to 0xB, full search with half pixel resolution will be performed on the nine candidate positions within half pixel buffer 3 (or the corresponding area of the 43×43 half pixel array for combined 1MV/4MV mode). Bit [27] must be set to 1 'b0 to indicate 8×8 search mode, and the lower rightmost 8×8 block of the current block will be used.

When bits[23:20] are set to 0xC, full search with quarter pixel resolution will be performed on eight of the nine candidate positions within quarter pixel buffer 1 plus the center of nine candidate positions within half pixel buffer 1. With bit [27], block size, the programmer can select either 16×16 or 8×8 search mode. For the 8×8 mode, the upper leftmost 8×8 block of the current block will be used.

For quarter pixel searches with a 16×16 macroblock, the DVN evaluates the metric:.

SAD256 plus quarter pixel horizontal cost function plus quarter pixel vertical cost function For quarter pixel searches with an 8×8 block, the DVN evaluates the metric:

SAD64 plus (quarter pixel horizontal cost function plus quarter pixel vertical cost function)/4.

When bits[23:20] are set to 0xD, full search with quarter pixel resolution will be performed on eight of the nine candidate positions within quarter pixel buffer 2 plus the center of nine candidate positions within half pixel buffer 2. Bit[27] must be set to 1 'b0 to indicate 8×8 search mode, and the upper rightmost 8×8 block of the current block will be used.

When bits[23:20] are set to 0xE, full search with quarter pixel resolution will be performed on eight of the nine candidate positions within quarter pixel buffer 3 plus the center of nine candidate positions within half pixel buffer 3. Bit[27] must be set to 1 'b0 to indicate 8×8 search mode, and the lower leftmost 8×8 block of the current block will be used.

When bits[23:20] are set to 0xF, full search with quarter pixel resolution will be performed on eight of the nine candidate positions within quarter pixel buffer 4 plus the center of nine candidate positions within half pixel buffer 4. Bit[27] must be set to 1 'b0 to indicate 8×8 search mode, and the lower rightmost 8×8 block of the current block will be used.

Note: For fractional pixel search, bits[18:16], search pattern, must be set to 3 'b001 to indicate search 3×3 candidate fractional pixel positions.

| Bit[19] | Initialize Registers |
|---|---|
| 0 | No Operation |
| 1 | Initialize 'Best Metric' Register to 0xFFFF, Motion Vector Register to X = 0, Y = 0. |

For all search commands, bit[19], initialize registers, may be set to either 1 'b0 or 1'b1 to disable/enable the initialization of the 'best metric' register and the motion vector register. When bit[19] is set to 1 'b1, the 'best metric' register is initialized to 0xFFFF, and the motion vector register is initialized to zero (X=0, Y=0) before the search operation is initiated.

When bit[19] is set to 1 'b0, the contents of these registers will not be modified before the search operation is initiated. Subsequently, during the search operation, the contents of these registers will be modified if (and only if) an evaluation returns a metric that is less than the current value in the 'best metric' register.

| Bits[18:16] | Search Pattern |
|---|---|
| 0 0 0 | Evaluate one position |
| 0 0 1 | Evaluate 3 × 3 candidate fractional pixel positions |
| 0 1 0 | Evaluate one set of 4 × 4 positions |
| 0 1 1 | Evaluate one set of 5 × 5 positions |
| 1 0 0 | Evaluate five sets of 5 × 5 positions |
| 1 0 1 | Evaluate nine sets of 5 × 5 positions |

Bits[18:16] are used to select the search pattern

When bits[18:16] are set to 3 'b000:

A single position will be searched. Generally, with this option, bit[26], 'Search Origin', will be set to 1 'b1 to select: X location, Y location. The DVN will evaluate the metric for a single position (X, Y), where 0,0 indicates the upper left pixel of the reference block. X is a positive integer in the range of 0 to (M-b), where M is the number of pixels in each row of the reference block; Y is a positive integer in the range of 0 to (N−b), where N is the number of pixels in each column of the reference block; and b is 8 or 16 for block sizes of 8×8 or 16×16, respectively. These positive integers indicate displacements to the indicated search position from the upper leftmost pixel of the reference block. (See FIG. 5 for allowable combinations of M and N).

When bits[18:16] are set to 3 'b001:

Nine candidate fractional pixel positions will be searched using a 16×16 macroblock or an 8×8 block. The search order for the nine positions is shown in FIG. 73.

When bits[18:16] are set to 3 'b010:

A set of four-by-four positions will be searched. For the intended use of this pattern, the DVN will determine the best metric from one-of-sixteen 16×16 macroblocks surrounding the motion vector at the half pixel position that was determined by a search of the down-sampled reference block. (See FIG. 20). For each of the evaluated 16 positions, the DVN calculates the metric:

SAD256 plus horizontal cost function plus vertical cost function.

The four-by-four search uses the 5×5 search kernel with the nine SAD elements corresponding to the right-most column and the bottom-most row disabled.

The search order is shown in FIG. 74. When the metric for two or more positions is the same, and that metric is better (lower) than all other evaluated metrics, the resulting contents of the motion vector register will correspond to the first search position that returned the better metric. This results from the register replacement criterion requiring the current trial to return a metric that is less than the value stored in the 'best metric' register.

When bits[18:16] are set to 3 'b011:

A set of five-by-five positions will be searched using the 5×5 search kernel. The five-by-five positions correspond to (X to X+4, Y to Y+4), where X and Y are positive integers. (Refer to FIG. 6 for representative combinations for X and Y).

The search order is shown in FIG. 74. When the metric for two or more positions is the same, and that metric is better (lower) than all other evaluated metrics, the resulting contents of the motion vector register will correspond to the first search position that returned the better metric. This results from the register replacement criterion requiring the current trial to return a metric that is less than the value stored in the 'best metric' register.

When bits[18:16] are set to 3 'b100:

Five sets of five-by-five positions will be searched using the 5×5 search kernel. The search order for a set of five-by-five positions is shown in FIG. 74. The search order for the five sets is shown in FIG. 75.

When early termination is enabled and all positions for one set have been evaluated, if the resulting 'best metric' for that set is less than the value in the STR, the DVN will terminate the search, send the appropriate status to the controller node, and stall until it receives a QRI.

Note that the programmer can use multiple search instructions with bits[18:16] set to 3 'b010: 'Evaluate one set of 5×5 positions' to realize any arbitrary search order of sets of 5×5 macroblocks.

When bits[18:16] are set to 3 'b101:

Nine sets of five-by-five positions will be searched using the 5×5 search kernel. The search order for a set of five-by-five positions is shown in FIG. 74. The search order for the nine sets is shown in FIG. 76.

When early termination is enabled and all positions for one set have been evaluated, if the resulting 'best metric' is less than the value in the STR, the DVN will terminate the search, send the appropriate status to the controller node, and stall until it receives a QRI.

Bits[14:8] X Location

When bit[26], search origin, is set to 1 'b1, bits[14:8] are used to indicate the offset from the upper leftmost pixel in a row of the reference block. The resolution is one full pixel.

When bit[26] is set to 1 'b0, bits[14:8] are don't care.

Bits[6:0] Y Location

When bit[26], search origin, is set to 1 'b1, bits[6:0] are used to indicate the offset from the upper leftmost pixel in a column of the reference block. The resolution is one full pixel.

When bit[26] is set to 1 'b0, bits[6:0] are don't care (FIGS. 75 and 76).

Command 0x5 Compare Metrics for 'One Vector' and 'Four Vectors'

Compare the 'One Vector' and 'Four Vectors' metrics. Specifically, add the four metrics saved from searching four sets of 5×5 positions with four 8×8 blocks, and compare the result with the metric for a search with the 16×16 current block. Send a message to the controller node indicating which mode produced the better metric, then stall until the QRI is asserted.

This is a major decision point where the controller node determines whether to continue with fraction pixel processing, and, if it does continue, to select 'One Vector' mode or 'Four Vectors' mode.

| Bit[22] | Resolution |
|---|---|
| 0 | Full Pixel |
| 1 | Half Pixel |

The programmer sets Bit[22] to 1 'b0 for a comparison of the full pixel metrics or to 1 'b1 for a comparison of the half pixel metrics. All metrics are stored in the Results Buffer in node memory (See FIG. 77).

Command 0x6 Interpolate

Perform full pixel to half pixel or half pixel to quarter pixel interpolation. Various parameters allow for a number of different interpolation options:

| Bit[27] | Block Size |
|---|---|
| 0 | 8 × 8 Block |
| 1 | 16 × 16 Macroblock |

When bit[25]=1 'b0: Normal Half Pixel Buffer Organization:

When bit[27], block size, is set to 1 b0, full pixel to half pixel interpolation will produce a 19×19 half pixel array; half pixel to quarter pixel interpolation will produce eight 8×8 quarter pixel arrays.

When bit[27] is set to 1 'b1, full pixel to half pixel interpolation will produce a 35×35 half pixel array; half pixel to quarter pixel interpolation will produce eight 16×16 quarter pixel arrays.

When bit[25]=1 b1: Combined 1MV/4MV Half Pixel Buffer Organization:

When bit[18] is set to 1 'b0 for full pixel to half pixel interpolation, bit[27] must be set 1 'b1. A 43×43 half pixel array will be produced.

When bit[18] is set to 1 'b1 for half pixel to quarter pixel interpolation:

When bit[27] is set to 1 'b0, eight 8×8 quarter pixel arrays will be produced; and When bit[27] is set to 1 'b1, eight 16×16-quarter pixel arrays will be produced.

| Bit[26] | Search Origin |
|---|---|
| 0 | Motion vector from previously determined 'Best Metric' |
| 1 | X location (bits[14:8]), Y location (bits[6:0]) |

When the search option has been enabled for this command:

When bit[26] is set to 1 'b0, the search origin will be X, Y offsets stored in the motion vector register (or the Results Buffer in Node Memory). When bit[26] is set to 1 'b1, the search origin will be the X,Y locations indicated by bits[14:8] and bits[6:0], respectively, of the search command.

When the search option has not been enabled for this command, bit[26] is don't care.

| Bit[25] | Half Pixel Buffer Organization |
|---|---|
| 0 | 'Normal'; 16 × 16 -> 35 × 35 and 8 × 8 -> 19 × 19 |
| 1 | 1 MV/4MV; combined 16 × 16, 8 × 8 -> 43 × 43 |

When the search strategy includes 1MV/4MV comparisons at half pixel resolution, bit[25] should be set to 1 'b1 to indicate that a 43×43 half pixel array will be created for full pixel to half pixel interpolation (bit[18] set to 1 'b0) or that a previously interpolated 43×43 half pixel array exists in node memory (bit[18] set to 1'b1: hall pixel to quarter pixel interpolation).

Otherwise, bit[25] should be set to 1 'b0 to indicate that a 35×35 half pixel array (for 16×16 macroblocks) or four 19×19 half pixel arrays (for 8×8 blocks) will be created for full pixel to half pixel interpolation (bit[18] set to 1 'b0) or that a previously interpolated 35×35 half pixel array or four 19×19 half pixel arrays exist in node memory (bit[18] set to 1'b1: half pixel to quarter pixel interpolation).

| Bit[24] | Early Termination |
|---|---|
| 0 | Disable |
| 1 | Enable |

For all interpolation commands for which the search function is enabled, bit[24], early termination, may be set to either 1 'b0 or 1 'b1 to disable/enable the early termination function.

When early termination is enabled and search is enabled (bit[17] is set to 1 'b1), after all nine candidate positions have been evaluated, the resulting ‘best metric’ will be compared with the value in the STR. When the metric is less than the value in the STR, the DVN will send appropriate status to the controller node, and it will stall until it receives a QRI.

When early termination is disabled or search is disabled (or both are disabled), the DVN will process the command, send status to the controller node, then fetch the next command from the queue.

| Bits[21:20] | Buffer Selection |
|---|---|
| 0 0 | Buffer 1 |
| 0 1 | Buffer 2 |
| 1 0 | Buffer 3 |
| 1 1 | Buffer 4 |

For Full Pixel to Half Pixel Interpolation with Bit[25]=1 'b0: Normal Half Pixel Buffer Organization:

When a full pixel 16×16 macroblock is interpolated to produce a 35×35 half pixel array (bit[27]=1'b1, bit[18]=1 'b0), that array will be stored in the 1892 byte half pixel buffer in node memory as shown in FIG. 36. For this operation, bits[21:20] are ‘don’t care’.

When a full pixel 8×8 block is interpolated to produce a 19×19 half pixel array (bit[27]=1 'b0, bit[18]=1 'b0), that array will be stored in the appropriate one of four 400 byte half pixel buffers in node memory as shown in FIG. 37. Bits[21:20] should be set to:

2 'b00 to select Buffer 1 for the upper leftmost 8×8 block; starting address=0x8C8.

2 'b01 to select Buffer 2 for the upper rightmost 8×8 block; starting address=0x8E4.

2 'b10 to select Buffer 3 for the lower leftmost 8×8 block; starting address=0x900.

2 'b11 to select Buffer 4 for the lower rightmost 8×8 block; starting address=0x91C.

For Full Pixel to Half Pixel Interpolation with Bit[25]=1' b1: Combined 1MV/4MV Half Pixel Buffer Organization:

For full pixel to half pixel interpolation in the combined 1MV/4MV mode (bit[25]=1 'b1), the DVN will produce a 43×43 half pixel array as shown in FIG. 35. For this operation, bits[21:20] are ‘don’t care’.

For Half Pixel to Quarter Pixel Interpolation

When bit[27] is set to 1'b1, a 1296 byte half pixel buffer will be interpolated to produce eight 16×16 quarter pixel arrays (a total of 2048 bytes), and those results will be stored in the 2048 byte quarter pixel buffer in node memory. For this operation, bits[21:20] should be set to 2 'b00.

When bit[27] is set to 1 'b0, a 19×19 half pixel array will be interpolated to produce eight 8×8 quarter pixel arrays (a total of 512 bytes), and those results will be stored in the indicated one of four 512 quarter pixel buffers in node memory (See FIG. 5C). Bits[21:20] should be set to:

2 'b00 to select Buffer 1 for the upper leftmost 8×8 block.

2 'b01 to select Buffer 2 for the upper rightmost 8×8 block.

2 'b10 to select Buffer 3 for the lower leftmost 8×8 block.

2 'b11 to select Buffer 4 for the lower rightmost 8×8 block.

| Bit[19] | Initialize Registers |
|---|---|
| 0 | No Operation |
| 1 | Initialize ‘Best Metric’ Register to 0xFFFF, Motion Vector Register to X = 0, Y = 0. |

For all interpolation commands where search is enabled (bit[17]=1 'b1), bit[19], ‘initialize registers’, may be set to either 1 'b0 or 1'b1 to disable/enable the initialization of the ‘best metric’ register and the motion vector register. When bit[19] is set to 1 'b1, the appropriate ‘best metric’ register is initialized to 0xFFFF, and the associated motion vector register is initialized to zero (X=0, Y=0) before the search operation is initiated. When bit[19] is set to 1 'b0, the contents of these registers are preserved before the search operation is initiated. Subsequently, during the search operation, the contents of these registers will be modified if (and only if) an evaluation returns a metric that is less than the current value in the ‘best metric’ register.

| Bit[18] | Half/Quarter Pixel Selection |
|---|---|
| 0 | Full Pixel to Half Pixel Interpolation |
| 1 | Half Pixel to Quarter Pixel Interpolation |

For full pixel to half pixel interpolation, the programmer sets bit[18] to 1 'b0.

For half pixel to quarter pixel interpolation, the programmer sets bit[18] to 1 'b1.

| Bit[17] | Search Enable |
|---|---|
| 0 | No operation |
| 1 | Perform the search function on the nine candidate positions |

The search order is shown in FIG. 73. For the ‘Combined 1MV/4MV’ mode of full pixel to half pixel interpolation, if search enable is set to 1 'b1, only the 16×16 search will be performed. The ‘search command’ (Command 0x4) should be used for the 8×8 searches.

Bits[14:8] X Location

When the search option has been enabled for this command and bit[26], search origin, has been set to 1 'b1, bits[14:8] are used to indicate the offset from the upper leftmost pixel in a row of the reference block. The resolution is one full pixel.

When the search option has not been enabled or when bit[26] is set to 1 'b0 (or both), bits[14:8] are don’t care.

Bits[6:0] Y Location

When the search option has been enabled for this command and bit[26], search origin, has been set to 1 'b1, bits[6:0] are used to indicate the offset from the upper leftmost pixel in a column of the reference block. The resolution is one full pixel.

When the search option has not been enabled or when bit[26] is set to 1 'b0 (or both), bits[6:0] are don’t care.

Command 0x7 Output Signed Difference

Perform the signed difference between the indicated blocks. The indicated reference block/fractional pixel block will be subtracted from the current block. Various parameters allow for a number of options:

For signed difference between 16×16 blocks, the DVN will output to the selected destination the 256 values as 16-bit 2's complement integers in the range −255 to 255, packed into 128 longwords.

For signed difference between 8×8 blocks, the DVN will output to the selected destination the 64 values as 16-bit 2's complement integers in the range −255 to 255, packed into 32 longwords.

| Bit[27] | Block Size |
|---|---|
| 0 | 8 × 8 Block |
| 1 | 16 × 16 Macroblock |

When bit[27], block size, is set to 1 'b0, the DVN will perform the signed difference between an 8×8 block from the current block and an 8×8 reference block/fractional pixel block.

When bit[27] is set to 1 'b1, the DVN will perform the signed difference between the 16×16 current block and a 16×16 reference block/fractional pixel block.

| Bit[26] | Buffer Origin |
|---|---|
| 0 | Motion vector from previously determined 'Best Metric' |
| 1 | X location (bits[14:8]), Y location (bits[6:0]) |

When bits[23:20] are set to 0x1 to select the reference block buffer:

When bit[26] is set to 1 'b0, the reference block buffer origin will be X, Y offsets stored in the motion vector register (or the Results Buffer in Node Memory) associated with the 'best metric'. When bit[26] is set to 1 'b1, the origin will be the X,Y locations indicated by bits[14:8] and bits[6:0], respectively, of the 'Output Signed Differences' command.

For all other values for bits[23:20], bit[26] must be set to 1' b0, and the buffer origin will be indicated by a previously determined motion vector associated with a 'best metric'.

| Bit[25] | Half Pixel Buffer Organization |
|---|---|
| 0 | 'Normal'; 16 × 16 -> 35 × 35 and 8 × 8 -> 19 × 19 |
| 1 | 1 MV/4MV; combined 16 × 16, 8 × 8 -> 43 × 43 |

When the output signed difference is for a fractional pixel array, bit[25] should be set to 1 'b1 when a 43×43 half pixel array exists in node memory, and it should be set to 1 'b0 when a 35×35 half pixel array or four 19×19 half pixel arrays exist in node memory.

When the output signed difference is for a full pixel array, bit[25] is 'don't care'.

| Bit[24] | Destination |
|---|---|
| 0 | Logical Output Port 0 |
| 1 | Logical Output Port 1 |

Bit[24] allows the programmer to select from one of two logical output ports. For each one, the DNLR will contain the associated routing, input port number, and memory mode indication for the selected destination (See FIG. 68).

| Bits[23:20] | Buffer Selection |
|---|---|
| 0 0 0 1 | Reference Block Buffer (16 × 16) |
| 0 1 0 0 | Reference Block Buffer (8 × 8 upper left) |
| 0 1 0 1 | Reference Block Buffer (8 × 8 upper right) |
| 0 1 1 0 | Reference Block Buffer (8 × 8 lower left) |
| 0 1 1 1 | Reference Block Buffer (8 × 8 upper right) |
| 1 0 0 0 | Half Pixel Buffer 1 |
| 1 0 0 1 | Half Pixel Buffer 2 |
| 1 0 1 0 | Half Pixel Buffer 3 |
| 1 0 1 1 | Half Pixel Buffer 4 |
| 1 1 0 0 | Quarter Pixel Buffer 1 |
| 1 1 0 1 | Quarter Pixel Buffer 2 |
| 1 1 1 0 | Quarter Pixel Buffer 3 |
| 1 1 1 1 | Quarter Pixel Buffer 4 |

Bits[23:20] indicate the buffer whose elements will be differenced from the corresponding elements of the 16×16 current block (8×8 block).

When bit[27], block size, is set to 1 'b0 for an 8×8 block, any of the buffer selection codes except 0x1 can be selected.

When bit[27] is set to 1 'b1 for a 16×16 block, only codes 0x1 (reference block buffer), 0x8 (half pixel buffer 1), and 0xC (quarter pixel buffer 1) are allowed.

Bits[14:8] X Location

When bit[26], buffer origin, has been set to 1 'b1, bits[14:8] are used to indicate the offset from the upper leftmost pixel in a row of the reference block. The resolution is one full pixel.

Bits[6:0] Y Location

When bit[26] has been set to 1 b1, bits[6:0] are used to indicate the offset to the buffer origin from the upper leftmost pixel in a column of the reference block. The resolution is one full pixel.

Command 0x8 Output the Indicated Array

Output the indicated array to the indicated destination. Various parameters allow for a number of options:

| Bit[27] | Block Size |
|---|---|
| 0 | 8 × 8 Block |
| 1 | 16 × 16 Macroblock |

When bit[27], block size, is set to 1 'b0, the DVN will output an 8×8 block. The 64 values will be 8-bit unsigned integers in the range 0 to 255 packed into 16 longwords.

When bit[27] is set to 1 'b1, the DVN will output a 16×16 macroblock. The 256 values will be 8-bit unsigned integers in the range 0 to 255 packed into 64 longwords.

| Bit[26] | Buffer Origin |
|---|---|
| 0 | Motion vector from previously determined 'Best Metric' |
| 1 | X location (bits[14:8]), Y location (bits[6:0]) |

When bits[23:20] are set to 0x1 to select the reference block buffer:

When bit[26] is set to 1 'b0, the reference block buffer origin will be X, Y offsets stored in the motion vector register (or the Results Buffer in Node Memory) associated with the 'best metric'. When bit[26] is set to 1 'b1, the origin will be the X,Y locations indicated by bits[14:8] and bits[6:0], respectively, of the command.

For all other values for bits[23:20], bit[26] must be set to 1 'b0, and the buffer origin will be indicated by the motion vector associated with a previously determined 'best metric'.

| Bit[25] | Half Pixel Buffer Organization |
|---|---|
| 0 | 'Normal'; 16 × 16 -> 35 × 35 and 8 × 8 -> 19 × 19 |
| 1 | 1 MV/4MV; combined 16 × 16, 8 × 8 -> 43 × 43 |

When the output is a fractional pixel array, bit[25] should be set to 1 'b1 when a 43×43 half pixel array exists in node memory, and it should be set to 1 'b0 when a 35×35 half pixel array or four 19×19 half pixel arrays exist in node memory.

When the output is for a full pixel array, bit[25] is 'don't care'.

| Bit[24] | Destination |
|---|---|
| 0 | Logical Output Port 0 |
| 1 | Logical Output Port 1 |

Bit[24] allows the programmer to select between one of two logical output ports as the indicated destination. For each one, the DNLR will contain the associated routing, input port number, and memory mode indication for the selected destination (See FIG. 68).

| Bits[23:20] | Buffer Selection |
|---|---|
| 0 0 0 1 | Reference Block Buffer (16 × 16) |
| 0 1 0 0 | Reference Block Buffer (8 × 8 upper left) |
| 0 1 0 1 | Reference Block Buffer (8 × 8 upper right) |
| 0 1 1 0 | Reference Block Buffer (8 × 8 lower left) |
| 0 1 1 1 | Reference Block Buffer (8 × 8 upper right) |
| 1 0 0 0 | Half Pixel Buffer 1 |
| 1 0 0 1 | Half Pixel Buffer 2 |
| 1 0 1 0 | Half Pixel Buffer 3 |
| 1 0 1 1 | Half Pixel Buffer 4 |
| 1 1 0 0 | Quarter Pixel Buffer 1 |
| 1 1 0 1 | Quarter Pixel Buffer 2 |
| 1 1 1 0 | Quarter Pixel Buffer 3 |
| 1 1 1 1 | Quarter Pixel Buffer 4 |

Bits[23:20] indicate the specific buffer that the DVN should output.

When bit[27], block size, is set to 1 'b0 for an 8.times.8 block, any of buffer selection codes except 0x01 can be selected.

When bit[27] is set to 1 'b1 for a 16.times.16 block, only codes 0x1 (reference block buffer), 0x8 (half pixel buffer 1), and 0xC (quarter pixel buffer 1) are allowed.

Bits[14:8] X Location.

When bit[26], buffer origin, has been set to 1 'b1, bits[14:8] are used to indicate the offset from the upper leftmost pixel in a row of the reference block to the buffer origin. The resolution is one full pixel.

Bits[6:0] Y Location

When bit[26], buffer origin, has been set to 1 'b1, bits[6:0] are used to indicate the offset from the upper leftmost pixel in a column of the reference block to the buffer origin. The resolution is one full pixel.

Command 0x9 Output the Indicated Result

Output the indicated result to the indicated destination(s). Various parameters allow for a number of options:

| Bit[27] | Group Select |
|---|---|
| 0 | Best Metric |
| 1 | Motion Vector |

For bit[27] set to 1 'b0, transfer the indicated best metric (saturated unsigned 16 bit integer) to the selected destination(s).

For bit[27] set to 1 'b1, transfer the indicated motion vector, with quarter pixel resolution, to the indicated destination(s).

These data are stored in the Results Buffer in node memory as shown in FIG. 77.

| Bit[25] | Mode |
|---|---|
| 0 | Send to controller only |
| 1 | Send to controller and send to indicated destination |

| Bit[24] | Destination |
|---|---|
| 0 | Logical Output Port 0 |
| 1 | Logical Output Port 1 |

Bit[24] allows the programmer to select from one of two logical output ports. For each one, the DNLR will contain the associated routing, input port number, and memory mode indication for the selected destination (See FIG. 68).

| Bits[23:20] | Indicated Best Metric/Motion Vector |
|---|---|
| 0 0 0 0 | Down-sampled 'Double Pixel' |
| 0 0 0 1 | Full Pixel, 16 × 16 |
| 0 0 1 0 | Half Pixel, 16 × 16 |
| 0 0 1 1 | Quarter Pixel, 16 × 16 |
| 0 1 0 0 | Full Pixel, upper left 8 × 8 |
| 0 1 0 1 | Full Pixel, upper right 8 × 8 |
| 0 1 1 0 | Full Pixel, lower left 8 × 8 |
| 0 1 1 1 | Full Pixel, lower right 8 × 8 |
| 1 0 0 0 | Half Pixel, upper left 8 × 8 |
| 1 0 0 1 | Half Pixel, upper right 8 × 8 |
| 1 0 1 0 | Half Pixel, lower left 8 × 8 |
| 1 0 1 1 | Half Pixel, lower right 8 × 8 |
| 1 1 0 0 | Quarter Pixel, upper left 8 × 8 |
| 1 1 0 1 | Quarter Pixel, upper right 8 × 8 |
| 1 1 1 0 | Quarter Pixel, lower left 8 × 8 |
| 1 1 1 1 | Quarter Pixel, lower right 8 × 8 |

Command 0xA Done

The DONE command indicates to the DVN that there is no additional processing to be performed for the 'current block'. After reading this command from the queue, the DVN will send the DONE status word to the controller; and the DVN FSM will transition to the ACK+TEST state.

DVN to Controller Status Word Summary

After the DVN executes each command, it will send a status word(s) to the controller, using the ACM PTP protocol. The DVN TPL in node memory will contain the appropriate routing field, input port number, and memory mode indication that is required to support this operation. This information will be transferred from the TPL to the CNLR during 'setup' and 'continue' operations. For each of these status words, bits[31:28] will echo command bits[31:28].

Bits[31:28] will be set to 0xF for the status word that acknowledges the 'Command Queue Redirection' Indication.

The status word summary is shown in FIG. 78. All unused fields will be set to zero.

There is no status word associated with Command 0x0: Wait.

For the following commands, the status word simply echoes command bits[31:28]; bits[27:0] are set to zeros. The DVN sends the status word(s) to the controller to indicate that the corresponding command has been executed.

| | |
|---|---|
| Command 0x3 | Down-Sample the Indicated Block |
| Command 0x7 | Output Signed Differences |
| Command 0x8 | Output the Indicated Array |
| Command 0xA | Done |

For the following commands, the status word also echoes command bits[31:28], and additionally it includes some result that was produced during the execution of the corresponding command.

Command 0x1 Echo

Bits[31:0] of this status word will echo command bits[31:0]. This is intended to be a diagnostics aid.

Command 0x2 Load Threshold Register for Early Termination of Search

Bits[15:0] of this status word indicate the value stored in the threshold register for early termination of search.

Command 0x4 Search

If the search command included the enabling of early termination (Bit[24] set to 1 'b1) and the best metric produced is less than the value in the STR, Bit[27] will be set to indicating that the DVN has stalled, waiting for the QRI; otherwise Bit[27] will be set to 1 'b0, indicating that DVN processing will continue.

Bits[26:25] of this status word indicate whether it is the only one that will be sent after the completed execution of the last search command, or whether it is the first or second of two status words sent after the completed execution of the last search command:

| Bits[26:25] | Status Word Identifier |
|---|---|
| 0 0 | One-of-one |
| 1 0 | One-of-two |
| 1 1 | Two-of-two |

When the search command instructed the DVN to search one or more sets of 5.times.5 positions or nine candidate fractional pixel positions, two status words will be sent to the controller following the execution of the command; otherwise, one status word will be sent.

When a Single Status Word is Sent:

Bits[24:16] will be set to zero.

Bits[15:0] will indicate the 'best metric' produced during the execution of the search command.

When the First of Two Status Words is Sent:

Bits[24:16] will be set to the Y component of the motion vector associated with the 'best metric' produced during the execution of the search command. The resolution will be quarter pixel.

Bits[15:0] will indicate the 'best metric' produced during the execution of the command.

When the Second of Two Status Words is Sent:

Bits[24:16] will be set to the X component of the motion vector associated with the 'best metric' produced during the execution of the search command. The resolution will be quarter pixel.

Bits[15:0] will indicate the metric associated with the center position of the 5.times.5 set that produced the 'best metric' during the execution of the command.

Compound 0x5 Compare Metrics for 'One Vector' and 'Four Vectors'

A comparison is made between the 'best metric' produced for searches with the 16.times.16 current block and the sum of the four 'best metrics' produced by successive searches with each of four 8.times.8 blocks. These data are stored in the Results Buffer in node memory (See FIG. 77).

Bits[15:0] of this status word indicate the better metric; and Bit[16]=1 'b0/1 'b1 indicates that the better metric resulted from 'One Vector' Mode/'Four Vector' Mode), respectively.

Command 0x6 Interpolate

If the interpolate command included the enabling of early termination (Bit[24] set to 1 'b1), the enabling of search function (Bit[17] set to 1 'b1), and the best metric produced is less than the value in the STR, Bit[27] will be set to 1 'b1, indicating that the DVN has stalled, waiting for the QRI; otherwise Bit[27] will be set to 1 'b0, indicating that DVN processing will continue.

Bits[26:25] of this status word indicate whether it is the only one that will be sent after the completed execution of the last interpolate command, or whether it is the first: or second of two status words sent after the completed execution of the last interpolate command:

| Bits[26:25] | Status Word Identifier |
|---|---|
| 0 0 | One-of-one |
| 1 0 | One-of-two |
| 1 1 | Two-of-two |

When bit[17] of the interpolate command was set to 1' b1, enabling the search function, two status words will be sent to the controller following the execution of the command;

When bit[17] was set to 1 'b0, only one status word will be sent.

When a single Status Word is Sent:

Bits[24:0] will be set to zero.

When the First of Two Status Words is Sent:

Bits[24:16] will be set to the Y component of the motion vector associated with the 'best metric' produced during the execution of the command. The resolution will be quarter pixel.

Bits[15:0] will indicate the 'best metric' produced during the search of the nine fractional pixel candidate positions.

When the Second of Two Status Words is Sent:

Bits[24:16] will be set to the X component of the motion vector associated with the 'best metric' produced during the execution of the command. The resolution will be quarter pixel.

Bits[15:0] will indicate the metric associated with the center position of the nine fractional pixel candidates.

Command 0x9 Output Selected Result

When bit[27] of the command was set to 1 'b0, bits[15:0] of this status word will be the selected 'best metric', a saturated, unsigned 16 bit integer. Bit[27] of the status word will be set to 1 'b0 to echo bit[27] of the command.

When bit[27] of the command was set to 1 'b1, bits[24:16] and bits[8:0] of this status word represent, respectively, the X and Y components of the selected motion vector, with quarter pixel resolution. X and Y represent the displacement from the upper leftmost pixel of the reference block, for which (by convention) the motion vector is X=0, Y=0. Bit[27] of the status word will be set to 1 'b1 to echo bit[27] of the command.

Command Queue Redirection Acknowledgement

Bits[31:28] of this status word will be set to 0xF to indicate the detection of QRI. After the DVN sends this status word to the controller, it will update its 7-bit queue counter with the contents of the programmable 7-bit register and continue processing.

PEEKing DVN Registers

The controller node can read/peek certain DVN registers. This is accomplished by the controller node POKEing the DVN 'send' register, and the DVN sending a message to the controller that includes the 'read/peek' data.

To write the 'send' register, the programmer will use Service Code 0x6: Poke Address+Data (D16+A12), EU=1.

A12=12 'b000000000001; and

D16={14 'b00000000000000, reg_sel[1:0]}.

| For reg_sel[1:0] | DVN sends to controller node |
|---|---|
| 0 1 | Queue Counter |
| 1 0 | Best Metric Register Contents |
| 1 1 | Motion Vector Register Contents |

The DVN will use 'Service Code 0xA, EU-targeted Messages' to send the 'read/peek' data to the controller node. Aux[5:0] will be set to 6 'b000000. The data formats are shown in FIG. 79. For QUEUE COUNTER+MISC, Bits[31:28] will be the corresponding bits of the instruction fetched from the queue at location QUEUE COUNTER[6:0]. Bit[25] will be set to 1 'b1 when the 'compare' command 0x5 has been executed, indicating a stalled DVN waiting for QRI. Bit[24] will be set to 1 'b1 when the early termination criterion has been satisfied, indicating a stalled DVN waiting for QRI.

Summary of Programming Issues Related to the DVN

The following have been identified as programming requirements for the DVN (likely there will be others). There is no implied order for these numerous operations.

- Construct and load the task parameter list (TPL) into DVN node memory.
- Construct and load the byte code into DVN node memory.
- Configure the DVN hardware task manager (HTM).
- Direct the Data Mover to construct and transfer to DVN node memory the requisite reference blocks, current blocks, and cost function tables, along with the appropriate data flow acknowledgements.
- Construct and transfer the requisite command queue instruction sequences to DVN node memory.
- Configure the HTM in the DVN's controller node to support its processing of messages from the DVN.
- Configure DVN destination nodes (consumers) to receive output from the DVN and to send to the DVN the appropriate data flow acknowledgements.

FIGS. 80-119 illustrate possible hardware designs for various of the functions and components described above.

Any suitable programming language can be used to implement the routines of the present invention including C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, Kernel, etc. The routines can operate in an operating system environment or as stand-alone routines occupying all, or a substantial part, of the system processing. Functions can be performed in hardware, software or a combination of both. Unless otherwise stated, functions may also be performed manually, in whole or in part.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nano-engineered systems, components and mechanisms may be used. In general, the functions of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/FIGs. should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", an and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

I claim:

1. A system for processing video data, comprising:

a reconfigurable digital video processor including an array of adders configured to perform motion estimation on a sequence of frames by performing a plurality of sum of absolute differences (SAD) operations, wherein performing motion estimation includes comparing a block of picture elements (PELs) associated with a current frame with a block of PELs associated with a frame before the current frame or with a block of PELs associated with a frame subsequent to the current frame, wherein the reconfigurable digital video processor includes heterogeneous processing nodes connected by a matrix interconnect network; and a control processor configured to provide instructions to the reconfigurable digital video processor that dynamically configure the heterogeneous processing nodes and the matrix interconnect network included in the reconfigurable digital video processor to receive input video data associated with a first format and to generate output video data associated with a second format, wherein the instructions include information related to both the first format and a first resolution of the input video data as well as the second format and a second resolution of the output video data, and wherein the instructions further include degree of compression information.

2. The system of claim 1, wherein the control processor includes a decoder configured to decode instructions, for determining therefrom the first format associated with the input video data.

3. The system of claim 1, wherein the array of adders includes:

an interpolation filter configured to receive the input video data, to generate interpolated PELs from the input video data, and to generate preprocessed video that includes PELs from the input video data and interpolated PELs where the interpolated PELs are generated by the array of adders; and an encoder/decoder configured to generate the output video from the preprocessed video, wherein the interpolation filter is programmable based on the first format associated with the input video data and based on a resolution of the input video data.

4. The system of claim 3, wherein fractional PEL processing is performed.

5. The system of claim 4, wherein an oversized reference block is used.

6. The system of claim 4, wherein a minimum number of PELs consistent with a desired range is used.

7. The system of claim 1 where the array of adders forms a sum of absolute differences (SAD) computer.

8. The system of claim 1, where the input video data has a format including one or more properties of MPEG-2, MPEG-4, Windows media video (WMV), or X.264.

9. The system of claim 1, where the output video data has a predetermined resolution.

10. The system of claim 1, where the processor is implemented based on an adaptive computing machine (ACM).

* * * * *